US005748633A

United States Patent [19]

Lawler et al.

[11] Patent Number: 5,748,633

[45] Date of Patent: May 5, 1998

[54] METHOD AND APPARATUS FOR THE CONCURRENT RECEPTION AND TRANSMISSION OF PACKETS IN A COMMUNICATIONS INTERNETWORKING DEVICE

[75] Inventors: Christopher P. Lawler, Wellesley; David C. Ready, Sudbury, both of Mass.

[73] Assignee: 3Com Corporation, Santa Clara, Calif.

[21] Appl. No.: 501,588

[22] Filed: Jul. 12, 1995

[51] Int. Cl.[6] .................................... H04L 12/46

[52] U.S. Cl. .................................... 370/401; 370/466

[58] Field of Search .................... 370/85.13, 85.14, 370/94.1, 60, 351, 356, 360, 389, 390, 401, 402, 466; 395/200.01, 200.02, 200.03, 200.12, 200.08, 250

[56] References Cited

U.S. PATENT DOCUMENTS

| | | | |
|---|---|---|---|
| 4,455,602 | 6/1984 | Baxter, III et al. | 364/200 |
| 4,488,004 | 12/1984 | Bogart et al. | 179/18 AD |
| 4,525,780 | 6/1985 | Bratt et al. | 364/200 |
| 4,562,436 | 12/1985 | Coleman et al. | 340/825 |
| 4,578,796 | 3/1986 | Charalambous et al. | 375/8 |
| 4,587,651 | 5/1986 | Nelson et al. | 370/88 |
| 4,597,077 | 6/1986 | Nelson et al. | 370/88 |
| 4,645,874 | 2/1987 | Fildes | 379/93 |
| 4,663,748 | 5/1987 | Karbowiak et al. | 370/89 |
| 4,679,191 | 7/1987 | Nelson et al. | 370/84 |
| 4,713,806 | 12/1987 | Oberlander et al. | 370/58 |
| 4,720,850 | 1/1988 | Oberlander et al. | 379/90 |
| 4,737,953 | 4/1988 | Koch et al. | 370/94 |
| 4,748,618 | 5/1988 | Brown et al. | 370/94 |
| 4,750,114 | 6/1988 | Hirtle | 364/200 |
| 4,768,149 | 8/1988 | Konopik et al. | 364/200 |
| 4,831,620 | 5/1989 | Conway et al. | 370/85 |
| 4,835,674 | 5/1989 | Collins et al. | 364/200 |
| 4,843,606 | 6/1989 | Bux et al. | 370/89 |
| 4,872,158 | 10/1989 | Richards | 370/58.1 |
| 4,872,159 | 10/1989 | Hemmady et al. | 370/60 |
| 4,872,160 | 10/1989 | Hemmady et al. | 370/60 |
| 4,875,206 | 10/1989 | Nichols et al. | 370/85.15 |
| 4,893,302 | 1/1990 | Hemmady et al. | 370/60 |
| 4,894,824 | 1/1990 | Hemmady et al. | 370/58.3 |
| 4,899,333 | 2/1990 | Roediger | 370/60 |
| 4,912,656 | 3/1990 | Cain et al. | 364/514 |
| 4,922,486 | 5/1990 | Lidinsky et al. | 370/60 |
| 4,933,846 | 6/1990 | Humphrey et al. | 364/200 |
| 4,939,728 | 7/1990 | Markkula, Jr. et al. | 370/94.3 |
| 4,954,951 | 9/1990 | Hyatt | 364/200 |
| 4,955,018 | 9/1990 | Twitty et al. | 370/85.1 |
| 4,958,341 | 9/1990 | Hemmady et al. | 370/60.1 |
| 5,021,949 | 6/1991 | Morton et al. | 364/200 |
| 5,042,000 | 8/1991 | Baldwin | 364/726 |
| 5,048,014 | 9/1991 | Fischer | 370/85.5 |
| 5,095,480 | 3/1992 | Fenner | 370/94.1 |
| 5,101,402 | 3/1992 | Chiu et al. | 370/17 |
| 5,113,522 | 5/1992 | Dinwiddie, Jr. et al. | 395/700 |
| 5,123,029 | 6/1992 | Bantz et al. | 375/1 |

(List continued on next page.)

OTHER PUBLICATIONS

EtherSwitch®, EPS-1500, Kalpana product literature, Sep. 1993, two pages.

EtherSwitch®, Ethernet Packet Processor, Kalpana product literature, undated, two pages.

Switch.NLM v1.0-SW2000, Kalpana product literature, Mar. 1994, two pages.

*Primary Examiner*—Hassan Kizou

*Assistant Examiner*—Kwang Bin Yao

*Attorney, Agent, or Firm*—Weingarten, Schurgin, Gagnebin & Hayes LLP

[57] ABSTRACT

A method and apparatus for increasing the throughput of a communications internetworking device using concurrent reception and transmission of data packets. The method involves the beginning of a retransmission by the communications internetworking device, to a destination network, of a frame undergoing reception by the communications internetworking device, from a source network, prior to the completion the reception of the frame from the source network by the communications internetworking device.

10 Claims, 89 Drawing Sheets

U.S. PATENT DOCUMENTS

| | | | |
|---|---|---|---|
| 5,127,104 | 6/1992 | Dennis | 395/650 |
| 5,144,692 | 9/1992 | Baker et al. | 395/425 |
| 5,155,809 | 10/1992 | Baker et al. | 395/200 |
| 5,163,138 | 11/1992 | Thirumalai | 395/325 |
| 5,185,877 | 2/1993 | Bissett et al. | 395/425 |
| 5,200,954 | 4/1993 | Teel, Jr. et al. | 370/94.1 |
| 5,210,748 | 5/1993 | Onishi et al. | 370/85.13 |
| 5,235,595 | 8/1993 | O'Dowd | 370/94.1 |
| 5,251,205 | 10/1993 | Callon et al. | 370/60 |
| 5,265,207 | 11/1993 | Zak et al. | 395/200 |
| 5,280,474 | 1/1994 | Nickolls et al. | 370/60 |
| 5,282,199 | 1/1994 | Hertzberg et al. | 370/85.14 |
| 5,283,868 | 2/1994 | Baker et al. | 395/200 |
| 5,291,444 | 3/1994 | Scott et al. | 365/189.05 |
| 5,299,193 | 3/1994 | Szczepanek | 370/85.1 |
| 5,301,303 | 4/1994 | Abraham et al. | 395/500 |
| 5,305,280 | 4/1994 | Hayano | 365/230.03 |
| 5,305,317 | 4/1994 | Szczepanek | 370/85.5 |
| 5,307,345 | 4/1994 | Lozowick et al. | 370/61 |
| 5,309,432 | 5/1994 | Kanakia | 370/60 |
| 5,317,568 | 5/1994 | Bixby et al. | 370/85.6 |
| 5,321,819 | 6/1994 | Szczepanek | 395/325 |
| 5,321,843 | 6/1994 | Shoji et al. | 395/800 |
| 5,325,356 | 6/1994 | Lyles | 370/60 |
| 5,327,421 | 7/1994 | Hiller et al. | 370/60.1 |
| 5,327,428 | 7/1994 | Van As et al. | 370/94.2 |
| 5,329,630 | 7/1994 | Baldwin | 395/425 |
| 5,331,191 | 7/1994 | Sugiura et al. | 257/336 |
| 5,331,315 | 7/1994 | Crosetto | 340/825.02 |
| 5,331,634 | 7/1994 | Fischer | 370/85.13 |
| 5,333,268 | 7/1994 | Douglas et al. | 395/200 |
| 5,355,365 | 10/1994 | Bhat et al. | 370/85.13 |
| 5,355,453 | 10/1994 | Row et al. | 395/200 |
| 5,379,296 | 1/1995 | Johnson et al. | 370/60 |
| 5,434,864 | 7/1995 | Perlman et al. | 370/85.13 |
| 5,440,691 | 8/1995 | Carrafiello et al. | 395/250 |
| 5,465,331 | 11/1995 | Yang et al. | 395/200.08 |
| 5,471,472 | 11/1995 | McClure et al. | 370/85.13 |
| 5,477,547 | 12/1995 | Sugiyama | 370/85.13 |
| 5,481,540 | 1/1996 | Huang | 370/85.13 |
| 5,483,640 | 1/1996 | Isfeld et al. | 395/200.03 |
| 5,502,726 | 3/1996 | Fischer | 370/94.1 |
| 5,511,024 | 4/1996 | Ware et al. | 365/189.04 |

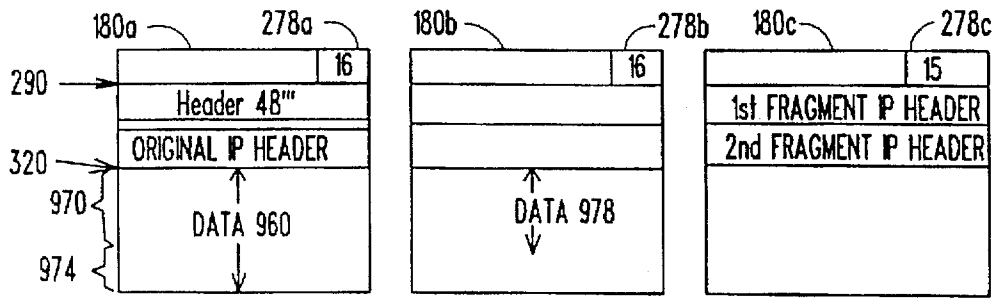

TRANSMIT QUEUE ENTRIES 160 596 598 600

| | DESTINATION PORT/MAC | BUFFER | EDF | FB | PH | DATA DESCRIPTION |
|---|---|---|---|---|---|---|
| ENTRY 1 | non-receiving FDDI MAC | 180a | 1 | 0 | 0 | HEADER 48'''; ORIGINAL IP HEADER; DATA 960 |
| ENTRY 2 | non-receiving FDDI-MAC | 180b | 0 | 0 | 1 | DATA 978 |
| ENTRY 3 | 1st ETHERNET MAC-1st FRAGMENT | 180a | 1 | 1 | 1 | HEADER 48''' |
| ENTRY 4 | 1st ETHERNET MAC-1st FRAGMENT | 180c | 1 | 1 | 1 | 1st FRAGMENT IP HEADER |
| ENTRY 5 | 1st ETHERNET MAC-1st FRAGMENT | 180a | 0 | 1 | 1 | DATA 970 |
| ENTRY 6 | 1st ETHERNET MAC-2nd FRAGMENT | 180a | 1 | 1 | 1 | HEADER 48''' |
| ENTRY 7 | 1st ETHERNET MAC-2nd FRAGMENT | 180c | 1 | 0 | 1 | 2nd FRAGMENT IP HEADER |
| ENTRY 8 | 1st ETHERNET MAC-2nd FRAGMENT | 180a | 1 | 0 | 1 | DATA 974 |
| ENTRY 9 | 1st ETHERNET MAC-2nd FRAGMENT | 180b | 0 | 0 | 1 | DATA 978 |
| ENTRY 10 | 2nd ETHERNET MAC-1st FRAGMENT | 180a | 1 | 1 | 1 | HEADER 48''' |
| ENTRY 11 | 2nd ETHERNET MAC-1st FRAGMENT | 180c | 1 | 1 | 1 | 1st FRAGMENT IP HEADER |
| ENTRY 12 | 2nd ETHERNET MAC-1st FRAGMENT | 180a | 0 | 1 | 1 | DATA 970 |
| ENTRY 13 | 2nd ETHERNET MAC-2nd FRAGMENT | 180a | 1 | 1 | 1 | HEADER 48''' |
| ENTRY 14 | 2nd ETHERNET MAC-2nd FRAGMENT | 180c | 1 | 0 | 1 | 2nd FRAGMENT IP HEADER |
| ENTRY 15 | 2nd ETHERNET MAC-2nd FRAGMENT | 180a | 1 | 0 | 1 | DATA 974 |
| ENTRY 16 | 2nd ETHERNET MAC-2nd FRAGMENT | 180b | 0 | 0 | 1 | DATA 978 |

```
IF
    (dest_group_address = not set          [From Bit 31 RBSM AMA Status Reg. 2]
    dest_address_match = set               [From Bit 22 RBSM AMA Status Reg. 1]
    rx_disable_on = not set                [From Circuit 706]
    port_blocking_on = not set             [From Circuit 716]
    src_port_not_forwarding = not set      [From Circuit 720]
    dest_internal = not set                [From Bit 13 RBSM AMA Status Reg. 1]
    tx_monitor_on = set                    [From Circuit 712]
    tx_disable_on = not set                [From Circuit 708]
    dest_port_blocking = not set           [From Circuit 718]
    dest_port_not_forwarding = not set     [From Circuit 720]
    )
         THEN
              destination_monitor = set

ELSIF
     (dest_group_address = not set         [From Bit 31 RBSM AMA Status Reg. 2]
    dest_address_match = not set           [From Bit 22 RBSM AMA Status Reg. 1]
    rx_disable_on = not set                [From Circuit 706]
    port_blocking_on = not set             [From Circuit 716]
    src_port_not_forwarding = not set      [From Circuit 720]
    positive_forward_enable = not set      [From FPU Interface]
    any_dest_monitor_on = set              [From Circuit 746
    )
         THEN
              destination_monitor = set
```

FIG. 16A

```
ELSIF
      (dest_group_address = set                [From Bit 31 RBSM AMA Status Reg. 2]
     rx_disable_on = not set                   [From Circuit 706]
     port_blocking_on = not set                [From Circuit 716]
     src_port_not_forwarding = not set         [From Circuit 720]
     rx_multicast_disable_on = not set         [From Circuit 714]
     ((dest_address_match = set AND            [From Bit 22 RBSM AMA Status Reg. 1]
     dest_internal = not set) OR               [From Bit 13 RBSM AMA Status Reg. 1]
     dest_address_match = not set)             [From Bit 22 RBSM AMA Status Reg. 1]
     any_dest_multicast_monitor_on = set       [From Circuit 748]
     )
          THEN
               destination_monitor = set

ELSE

     destination_monitor = not set

ENDIF
```

FIG. 16B

```
IF
    (positive_forward_enable = set OR          [From FPU Interface]
    rxport_equals_bbone = not set              [From Circuit 728]
    )
        THEN

    IF
        (dest_group_address = not set AND      [From Bit 31 RBSM AMA Status Reg. 2]
        dest_address_match = set AND           [From Bit 22 RBSM AMA Status Reg. 1]
        dest_internal = not set AND            [From Bit 13 RBSM AMA Status Reg. 1]
        dest_port_equal = set AND              [From Bit 30 RBSM AMA Status Reg. 2]
        src_address_match = set AND            [From Bit 21 RBSM AMA Status Reg. 1]
        src_internal = not set AND             [From Bit 13 RBSM AMA Status Reg. 3]
        src_port_equal = set AND               [From Bit 30 RBSM AMA Status Reg. 3]
        dest_port_type = src_port_type
        )
            THEN
                filter_frame = set
    ELSE
        filter_frame = set
ENDIF
```

FIG. 16C

```
ELSIF
     (positive_forward_enable = set AND        [From FPU Interface]
     rxport_equals_bbone = set AND             [From Circuit 728]
     ((dest_group_address = not set AND        [From Bit 31 RBSM AMA Status Reg. 2]
     dest_address_match = not set AND          [From Bit 22 RBSM AMA Status Reg. 1]
     src_address_match = not set) OR           [From Bit 21 RBSM AMA Status Reg. 1]
     src_group_address = set)
     )
          THEN
               filter_frame = set
ELSIF
     (positive_forward_enable = set AND        [From FPU Interface]
     rxport_equals_bbone = set AND             [From Circuit 728]
     dest_group_address = not set AND          [From Bit 31 RBSM AMA Status Reg. 2]
     dest_address_match = set AND              [From Bit 22 RBSM AMA Status Reg. 1]
     dest_port_equal = set AND
     dest_internal = set AND                   [From Bit 13 RBSM AMA Status Reg. 1]
     src_address_match = not set               [From Bit 21 RBSM AMA Status Reg. 1]
     )
          THEN
               filter_frame = set
ELSE
     filter_frame = not set
ENDIF
```

FIG. 16D

```
IF
     (disable_enet_collide = set AND          [From FPU interface]
     src_ct_active = not set AND              [From Circuit SRC_CT_ACTIVE]
     frame_collision = set                    [From Bit 14 Ethernet status Reg.]
     )
          THEN
               enet_abort = set

ELSIF
     (disable_enet_collide = not set AND      [From FPU interface]
     src_ct_active = not set AND              [From Circuit SRC_CT_ACTIVE]
     frame_collision= set AND                 [From Bit 14 Ethernet status Reg.]
     late_collision = not set
     )
          THEN
               enet_abort = set

ELSE
     enet_abort = not set

ENDIF
```

FIG. 16E

```
IF
    (frame_format_error = not set AND        [From Bit 21 FDDI status Reg.]
    frame_strip_error = not set AND          [From Bit 20 FDDI status Reg.]
    token_receive_error = not set AND        [From Bit 13 FDDI status Reg.]
    rx_end_of_buffer = not set AND           [From Bit 16 FDDI status Reg.]
    (rx_fifo_full_error = set OR             [From Bit 30 FDDI status Reg.]
    fddi_fcs_error = set OR                  [From Bit 25 FDDI status Reg.]
    data_length_error = set OR               [From Bit 24 FDDI status Reg.]
    big_frame = set OR                       [From Bit 23 FDDI status Reg.]
    mac_reset = set OR                       [From Bit 22 FDDI status Reg.]
    really_big_frame = set OR                [From Bit 14 FDDI status Reg.]
    e_indication = set OR                    [From Bit 17 FDDI status Reg.]
    invalid_dest_port = set OR
    reserved_frame_type = set)               [From Bit 28 FDDI status Reg.]
    )
        THEN
            fddi_rx_error = set

ELSIF
    (frame_format_error = not set AND        [From Bit 21 FDDI status Reg.]
    frame_strip_error = not set AND          [From Bit 20 FDDI status Reg.]
    token_receive_error = not set AND        [From Bit 13 FDDI status Reg.]
    rx_end_of_buffer = not set AND           [From Bit 16 FDDI status Reg.]
    rcv_abort = set                              [From Bit 15 FDDI status Reg.]
    )
        THEN
            fddi_rx_error = set
ELSE
    fddi_rx_error = not set

ENDIF
```

FIG. 16F

```
IF
    (cont_scan = set                                          [From Circuit CONT_SCAN]
    ethernet_eof = set                                        [From Circuit ETHERNET_EOF]
    enet_abort = not set                                      [From Circuit ENET_ABORT]
    ethernet_rx_error = not set                               [From Circuit ETHERNET_RX_ERROR]
    rx_monitor_on = not set                                   [From Circuit 710]
    dest_monitor = not set                                    [From Circuit DESTINATION_MONITOR]
    filter_frame = not set                                    [From Circuit FILTER_FRAME]
    cut_thru_end = not set                                    [From Circuit CUT_THRU_END]
    rx_disable_on = not set                                   [From Circuit 706]
    dest_group_address = not set                              [From Bit 31 RBSM AMA Status Reg. 2]
    (dest_address_match = set OR                              [Bit 22 of AMA Status Reg 1 399]
    (dest_address_match = not set AND                         [Bit 22 of AMA Status Reg 1 399]
    positive_forward_enable = set))                           [From FPU Interface 562]
    dest_internal = not set                                   [Bit 13 of AMA Status Reg 2 403]
    port_blocking_on = not set                                [From Circuit 716]
    src_port_not_forwarding = not set                         [From Circuit 720]
    ((positive_forward_enable = not set AND                   [From FPU Interface 562]
    src_address_status = sa_known_with_good_port) OR          [From Circuit
                                                              SRC_ADDRESS_STATUS]
```

FIG. 17A

```
    (positive_forward_enable = set AND                   [From FPU Interface 562]
    rx_port_equals_bbone = not set AND                   [From Circuit 728]
    src_address_status = sa_known_with_good_port) OR     [From Circuit
                                                         SRC_ADDRESS_STATUS]
    (positive_forward_enable = set AND                   [From FPU Interface 562]
    rxport_equals_bbone = set AND                        [From Circuit 728]
    src_address_status = sa_unknown))                    [From Circuit
                                                         SRC_ADDRESS_STATUS]
    tx_disable_on = not set                              [From Circuit 708]
    dest_port_blocking = not set                         [From Circuit 718]
    dest_port_not_forwarding = not set                   [From Circuit 750]
    rx_filter_on = not set                               [From Circuit 702]
    tx_filter_on = not set                               [From Circuit 704]
    dest_port_type = ethernet                            [From Circuit 752]
    )
        THEN
            code vector = CV_UNICAST_NO_TRANSLATION

ELSIF
    (cont_scan = set                                     [From Circuit CONT_SCAN]
    fddi_eof = set                                       [From Circuit RBSM_UNLOAD]
    fddi_abort = not set                                 [From Circuit FDDI_ABORT]
    fddi_rx_error = not set                              [From Circuit
                                                         FDDI_RX_ERROR]
    rx_monitor_on = not set                              [From Circuit 710]
    dest_monitor = not set                               [From Circuit
                                                         DESTINATION_MONITOR]
```

FIG. 17B

```
    filter_frame = not set                              [From Circuit FILTER_FRAME]
    llc_frame_type = set                                [From Bit 27 FDDI Status Reg.]
    rx_disable_on = not set                             [From Circuit 706]
    dest_group_address = not set                        [From Bit 31 RBSM AMA
                                                        Status Reg. 2]
    (dest_address_match = set OR                        [Bit 22 of AMA Status Reg 1 399]
    (dest_address_match = not set AND                   [Bit 22 of AMA Status Reg 1 399]
    positive_forward_enable = set))                     [From FPU Interface 562]
    dest_internal = not set                             [Bit 13 of AMA Status Reg 2 403]
    port_blocking_on = not set                          [From Circuit 716]
    src_port_not_forwarding = not set                   [From Circuit 720]
    ((positive_forward_enable = not set AND             [From FPU Interface 562]
    src_address_status = sa_known_with_good_port) OR    [From Circuit SRC_ADDRESS_STATUS]
    (positive_forward_enable = set AND                  [From FPU Interface 562]
    rxport_equals_bbone = not set AND                   [From Circuit 728]
    src_address_status = sa_known_with_good_port) OR    [From Circuit SRC_ADDRESS_STATUS]
    (positive_forward_enable = set AND                  [From FPU Interface 562]
    rxport_equals_bbone = set AND                       [From Circuit 728]
    srt_address_status = sa_unknown))                   [From Circuit SRT_ADDRESS_STATUS]
    tx_disable_on = not set                             [From Circuit 708]
    dest_port_blocking = not set                        [From Circuit 718]
    dest_port_not_forwarding = not set                  [From Circuit 750]
    rx_filter_on = not set                              [From Circuit 702]
    tx_filter_on = not set                              [From Circuit 704]
    fddi_multi-buffer = not set                         [From Circuit FDDI_MULTI-BUFFER]
    dest_port_type = fddi                               [From Circuit 752]
    )
         THEN
              code vector = CV_UNICAST_NO_TRANSLATION
ENDIF
```

FIG. 17C

```
IF
    (cont_scan = set                                [From Circuit CONT_SCAN]
    src_ct_allowed = set                            [From Circuit 756]
    dest_ct_allowed = set                           [From Circuit 752]
    dest_group_address = not set                    [From Bit 31 RBSM AMA
                                                    Status Reg. 2]
    (positive_forward_enable = not set OR           [From FPU Interface 562]
    positive_forward_enable = set AND               [From FPU Interface 562]
    rxport_equals_bbone = not set))                 [From Circuit 728]
    (rx_filter_on = set OR                          [From Circuit 702]
    tx_filter_on = set)                             [From Circuit 704]
    )
        THEN
            code vector = CV_UNICAST_NO_TRANSLATION_FILTERS
```

FIG. 17D

```
ELSIF
     (cont_scan = set                         [From Circuit CONT_SCAN]
     bbone_src_ct = set                       [From Circuit 722]
     dest_ct_allowed = set                    [From Circuit 752]
     dest_group_address = not set             [From Bit 31 RBSM AMA
                                              Status Reg. 2]
     positive_forward_enable = set            [From FPU Interface 562]
     rx_port_equals_bbone = set               [From Circuit 728]
     (rx_filter_on = set OR                   [From Circuit 702]
     tx_filter_on = set)                      [From Circuit 704]
     )
          THEN
               code vector = CV_UNICAST_NO_TRANSLATION_FILTERS

ELSIF
     (cont_scan = set                         [From Circuit CONT_SCAN]
     bbone_src_ct = set                       [From Circuit 722]
     dest_ct_allowed = set                    [From Circuit 752]
     dest_group_address = not set             [From Bit 31 RBSM AMA
                                              Status Reg. 2]
     positive_forward_enable = set            [From FPU Interface 562]
     rxport_equals_bbone = not set            [From Circuit 728]
     (rx_filter_on = set OR                   [From Circuit 702]
     tx_filter_on = set)                      [From Circuit 704]
     )
          THEN
               code vector = CV_UNICAST_NO_TRANSLATION_FILTERS
```

FIG. 17E

```
ELSIF
     (cont_scan = set                                  [From Circuit CONT_SCAN]
     ethernet_eof = set                                [From Circuit ETHERNET_EOF]
     enet_abort = not set                              [From Circuit ENET_ABORT]
     ethernet_rx_error = not set                       [From Circuit
                                                       ETHERNET_RX_ERROR]
     rx_monitor_on = not set                           [From Circuit 710]
     dest_monitor = not set                            [From Circuit
                                                       DESTINATION_MONITOR]
     filter_frame = not set                            [From Circuit FILTER_FRAME]
     cut_thru_end = not set                            [From Circuit CUT_THRU_END]
     rx_disable_on = not set                           [From Circuit 706]
     dest_group_address = not set                      [From Bit 31 RBSM AMA
                                                       Status Reg. 2]
     (dest_address_match = set OR                      [Bit 22 of AMA Status
                                                       Reg 1 399]
     (dest_address_match = not set AND                 [Bit 22 of AMA Status
                                                       Reg 1 399]
     positive_forward_enable = set))                   [From FPU Interface 562]
     dest_internal = not set                           [Bit 13 of AMA Status
                                                       Reg 2 403]
     port_blocking_on = not set                        [From Circuit 716]
     srt_port_not_forwarding = not set                 [From Circuit 720]
     ((positive_forward_enable = not set AND           [From FPU Interface 562]
     src_address_status = sa_known_with_good_port) OR  [From Circuit
                                                       SRC_ADDRESS_STATUS]
```

FIG. 17F

```
(positive_forward_enable = set AND                  [From FPU Interface 562]
rxport_equals_bbone = not set AND                   [From Circuit 728]
src_address_status = sa_known_with_good_port) OR    [From Circuit
                                                    SRC_ADDRESS_STATUS]
(positive_forward_enable = set AND                  [From FPU Interface 562]
rxport_equals_bbone = set AND                       [From Circuit 728]
src_address_status = sa_unknown))                   [From Circuit
                                                    SRC_ADDRESS_STATUS]
tx_disable_on = not set                             [From Circuit 708]
dest_port_blocking = not set                        [From Circuit 718]
dest_port_not_forwarding = not set                  [From Circuit 750]
dest_port_type = ethernet                           [From Circuit 752]
(rx_filter_on = set OR                              [From Circuit 702]
tx_filter_on = set)                                 [From Circuit 704]
)
     THEN
          code vector = CV_UNICAST_NO_TRANSLATION_FILTERS
```

FIG. 17G

```
ELSIF
     (cont_scan = set                                    [From Circuit CONT_SCAN]
     fddi_eof = set                                      [From Circuit RBSM_UNLOAD]
     fddi_abort = not set                                [From Circuit FDDI_ABORT]
     fddi_rx_error = not set                             [From Circuit FDDI_RX_ERROR]
     rx_monitor_on = not set                             [From Circuit 710]
     dest_monitor = not set                              [From Circuit DESTINATION_MONITOR]
     filter_frame = not set                              [From Circuit FILTER_FRAME]
     llc_frame_type = set                                [From Bit 27 FDDI Status Reg.]
     rx_disable_on = not set                             [From Circuit 706]
     dest_group_address = not set                        [From Bit 31 RBSM AMA
                                                         Status Reg. 2]
     (dest_address_match = set OR                        [Bit 22 of AMA Status Reg 1 399]
     (dest_address_match = not set AND                   [Bit 22 of AMA Status Reg 1 399]
     positive_forward_enable = set))                     [From FPU Interface 562]
     dest_internal = not set                             [Bit 13 of AMA Status Reg 2 403]
     port_blocking_on = not set                          [From Circuit 716]
     src_port_not_forwarding = not set                   [From Circuit 720]
     ((positive_forward_enable = not set AND             [From FPU Interface 562]
     src_address_status = sa_known_with_good_port) OR    [From Circuit SRC_ADDRESS_STATUS]
     (positive_forward_enable = set AND                  [From FPU Interface 562]
     rx_port_equals_bbone = not set AND                  [From Circuit 728]
     src_address_status = sa_known_with_good_port) OR    [From Circuit SRC_ADDRESS_STATUS]
     (positive_forward_enable = set AND                  [From FPU Interface 562]
     rxport_equal_bbone = set AND                        [From Circuit 728]
     src_address_status = sa_unknown))                   [From Circuit SRC_ADDRESS_STATUS]
```

FIG. 17H

```
     tx_disable_on = not set                          [From Circuit 708]
     dest_port_blocking = not set                     [From Circuit 718]
     dest_port_not_forwarding = not set               [From Circuit 750]
     fddi_multi_buffer = not set                      [From Circuit
                                                      FDDI_MULTI-BUFFER]
     dest_port_type = fddi                            [From Circuit 752]
     (rx_filter_on_set OR                             [From Circuit 702]
     tx_filter_on = set)                              [From Circuit 704]
     )
          THEN
               code vector = CV_UNICAST_NO_TRANSLATION_FILTERS
ENDIF

IF
     (cont_scan = set                                 [From Circuit CONT_SCAN]
     src_ct_allowed = set                             [From Circuit 756]
     dest_ct_allowed = set                            [From Circuit 758]
     dest_group_address = not set                     [From Bit 31 RBSM AMA
                                                      Status Reg. 2]
     (positive_forward_enable = not set OR            [From FPU Interface 562]
     (positive_forward_enable = set AND               [From FPU Interface 562]
     rxport_equals_bbone = not set))                  [From Circuit 728]
     rx_filter_on = not set                           [From Circuit 702]
     tx_filter_on = not set                           [From Circuit 704]
     )
          THEN
               code vector = CV_UNICAST_NO_TRANSLATION_CUTTHRU
```

FIG. 17I

```
ELSIF
     (cont_scan = set                          [From Circuit CONT_SCAN]
     bbone_src_ct = set                        [From Circuit 722]
     dest_ct_allowed = set                     [From Circuit 752]
     dest_group_address = set                  [From Bit 31 RBSM AMA
                                               Status Reg. 2]
     positive_forward_enable = set             [From FPU Interface 562]
     rx_port_equals_bbone = set                [From Circuit 728]
     rx_filter_on = not set                    [From Circuit 702]
     tx_filter_on = not set                    [From Circuit 704]
     )
          THEN
               code vector = CV_UNICAST_NO_TRANSLATION_CUTTHRU

ELSIF
     (cont_scan = set                          [From Circuit CONT_SCAN]
     bbone_dest_ct = set                       [From Circuit 724]
     src_ct_allowed = set                      [From Circuit 756]
     dest_group_address = not set              [From Bit 31 RBSM AMA
                                               Status Reg. 2]
     positive_forward_enable = set             [From FPU Interface 562]
     rxport_equals_bbone = not set             [From Circuit 728]
     rx_filter_on = not set                    [From Circuit 702]
     tx_filter_on = not set                    [From Circuit 704]
     )
          THEN
               code vector = CV_UNICAST_NO_TRANSLATION_CUTTHRU

ENDIF
```

FIG. 17J

```
IF
    (cont_scan = set                              [From Circuit CONT_SCAN]
    dest_group_address = set                      [From Bit 31 RBSM AMA
                                                  Status Reg. 2]
    enet_abort = set                              [From Circuit ENET_ABORT]
    cut_thru_end = set                            [From Circuit CUT_THRU_END]
    ethernet_rx_error = not set                   [From Circuit
                                                  ETHERNET_RX_ERROR]
    rx_monitor_on = not set                       [From Circuit 710]
    dest_monitor = not set                        [From Circuit
                                                  DESTINATION_MONITOR]
    filter_frame = not set                        [From Circuit FILTER_FRAME]

        THEN
            code vector = CV_UNICAST_NO_TRANSLATION_CUTTHRU_END
ENDIF

IF
    (cont_scan = set                              [From Circuit CONT_SCAN]
    ethernet_eof = act                            [From Circuit ETHERNET_EOF]
    enet_abort = not set                          [From Circuit ENET_ABORT]
    ethernet_rx_error = not set                   [From Circuit
                                                  ETHERNET_RX_ERROR]
    rx_monitor_on = not set                       [From Circuit 710]
    dest_monitor = not set                        [From Circuit
                                                  DESTINATION_MONITOR]
    filter_frame = not set                        [From Circuit FILTER_FRAME]
    cut_thru_end = not set                        [From Circuit CUT_THRU_END]
    rx_disable_on = not set                       [From Circuit 706]
```

FIG. 17K

| | |
|---|---|
| dest_group_address = not set | [From Bit 31 RBSM AMA Status Reg. 2] |
| (dest_address_match = set OR | [Bit 22 of AMA Status Reg 1 399] |
| (dest_address_match = not set AND | [Bit 22 of AMA Status Reg 1 399] |
| positive_forward_enable = set)) | [From FPU Interface 562] |
| dest_internal = not set | [Bit 13 of AMA Status Reg 2 403] |
| port_blocking_on = not set | [From Circuit 716] |
| src_port_not_forwarding = not set | [From Circuit 720] |
| ((positive_forward_enable = not set AND | [From FPU Interface 562] |
| src_address_status = sa_known_with_good_port) OR | [From Circuit SRC_ADDRESS_SA_STATUS] |
| positive_forward_enable = set AND | [From FPU Interface 562] |
| rxport_equals_bbone = not set AND | [From Circuit 728] |
| src_address_status = sa_known_with_good_port) OR | [From Circuit SRC_ADDRESS_STATUS] |
| (positive_forward_enable = set AND | [From FPU Interface 562] |
| rxport_equals_bbone = set AND | [From Circuit 728] |
| src_address_status = sa_unknown)) | [From Circuit SRC_ADDRESS_STATUS] |
| tx_disable_on = not set | [From Circuit 708] |
| dest_port_blocking = not set | [From Circuit 718] |
| dest_port_not_forwarding = not set | [From Circuit 750] |

FIG. 17L

```
    rx_filter_on = not set                          [From Circuit 702]
    tx_filter_on + not set                          [From Circuit 704]
    dest_port_type = fddi                           [From Circuit 752]
    )
         THEN
              code vector = CV_UNICAST_ETHERNET_TO_FDDI

ENDIF

IF
     (cont_scan = set                               [From Circuit CONT_SCAN]
    ethernet_eof = set                              [From Circuit ETHERNET_EOF]
    enet_abort = not set                            [From Circuit ENET_ABORT]
    ethernet_rx_error = not set                     [From Circuit
                                                    ETHERNET_RX_ERROR]
    rx_monitor_on = not set                         [From Circuit 710]
    dest_monitor = not set                          [From Circuit
                                                    DESTINATION_MONITOR]
    filter_frame = not set                          [From Circuit FILTER_FRAME]
    cut_thru_end = not set                          [From Circuit CUT_THRU_END]
    rx_disable_on = not set                         [From Circuit 706]
    dest_group_address = not set                    [From Bit 31 RBSM AMA
                                                    Status Reg. 2]
     (dest_address_match = set OR                   [Bit 22 of AMA Status Reg 1 399]
     (dest_address_match = not set AND              [Bit 22 of AMA Status Reg 1 399]
```

FIG. 17M

```
    positive_forward_enable = set))                          [From FPU Interface 562]
    dest_internal = not set                                  [Bit 13 of AMA Status
                                                             Reg 2 403]
    port_blocking_on = not set                               [From Circuit 716]
    src_port_not_forwarding = not set                        [From Circuit 750]
    ((positive_forward_enable = not set AND                  [From FPU Interface 562]
    src_address_status = sa_known_with_good_port) OR         [From Circuit
                                                             SRC_ADDRESS_STATUS]
    (positive_forward_enable = set AND                       [From FPU Interface 562]
    rxport_equals_bbone = not set AND                        [From Circuit 728]
    src_address_status = sa_known_with_good_port) OR         [From Circuit
                                                             SRC_ADDRESS_STATUS]
    (positive_forward_enable = set AND                       [From FPU Interface 562]
    rx_port_equals_bbone = set AND                           [From Circuit 728]
    src_address_status = sa_unknown))                        [From Circuit
                                                             SRC_ADDRESS_STATUS]
    tx_disable_on = not set                                  [From Circuit 708]
    dest_port_blocking = not set                             [From Circuit 718]
    dest_port_not_forwarding = not set                       [From Circuit 750]
    dest_port_type = fddi                                    [From Circuit 752]
    (rx_filter_on = set OR                                   [From Circuit 702]
    tx_filter_on = set)                                      [From Circuit 704]
    )
        THEN
            code vector = CV_UNICAST_ETHERNET_TO_FDDI_FILTERS

ENDIF
```

FIG. 17N

```
IF
    (cont_scan = set                                 [From Circuit CONT_SCAN]
    fddi_eof = set                                   [From Circuit RBSM_UNLOAD]
    fddi_rx_error = not set                          [From Circuit
                                                     FDDI_RX_ERROR]
    rx_monitor_on = not set                          [From Circuit 710]
    dest_monitor = not set                           [From Circuit
                                                     DESTINATION_MONITOR]
    filter_frame = not set                           [From Circuit FILTER_FRAME]
    llc_frame_type = set                             [From Bit 27 FDDI
                                                     Status Reg.]
    rx_disable_on = not set                          [From Circuit 706]
    dest_group_address = not set                     [From Bit 31 RBSM AMA
                                                     Status Reg. 2]
    (dest_address_match = set OR                     [Bit 22 of AMA Status
                                                     Reg 1 399]
    (dest_address_match = not set AND                [Bit 22 of AMA Status
                                                     Reg 1 399]
    positive_forward_enable = set))                  [From FPU Interface 562]
    dest_internal = not set                          [Bit 13 of AMA Status
                                                     Reg 2 403]
    port_blocking_on = not set                       [From Circuit 716]
    src_port_not_forwarding = not set                [From Circuit 720]
    ((positive_forward_enable = not set AND          [From FPU Interface 562]
    src_address_status = sa_known_with_good_port) OR [From Circuit
                                                     SRC_ADDRESS_STATUS]
```

FIG. 17O

```
    (positive_forward_enable = set AND                    [From FPU Interface 562]
    rxport_equals_bbone = not set AND                     [From Circuit 728]
    src_address_status = sa_known_with_good_port) OR      [From Circuit
                                                          SRC_ADDRESS_STATUS]
    (positive_forward_enable = set AND                    [From FPU Interface 562]
    rxport_equals_bbone = set AND                         [From Circuit 728]
    src_address_status = sa_unknown))                     [From Circuit
                                                          SRC_ADDRESS_STATUS]
    tx_disable_on = not set                               [From Circuit 708]
    dest_port_blocking = not set                          [From Circuit 718]
    dest_port_not_forwarding = not set                    [From Circuit 750]
    dest_port_type = ethernet                             [From Circuit 752]
    fragment_frame = not set                              [From Circuit RBSM_FRAG]
    rx_filter_on = not set                                [From Circuit 702]
    tx_filter_on = not set                                [From Circuit 704]
    )
        THEN
            code vector = CV_UNICAST_FDDI_TO_ETHERNET
ENDIF

IF
    (cont_scan = set                                      [From Circuit CONT_SCAN]
    fddi_eof = set                                        [From Circuit RBSM_UNLOAD]
    fddi_abort = not set                                  [From Circuit FDDI_ABORT]
    fddi_rx_error = not set                               [From Circuit
                                                          FDDI_RX_ERROR]
    rx_monitor_on = not set                               [From Circuit 710]
    dest_monitor = not set                                [From Circuit
                                                          DESTINATION_MONITOR]
```

FIG. 17P

```
     filter_frame = not set                                  [From Circuit FILTER_FRAME]
     llc_frame_type = set                                    [From Bit 27 FDDI Status Reg.]
     rx_disable_on = not set                                 [From Circuit 706]
     dest_group_address = not set                            [From Bit 31 RBSM AMA
                                                             Status Reg. 2]
     (dest_address_match = set OR                            [Bit 22 of AMA Status Reg 1 399]
     (dest_address_match = not set AND                       [Bit 22 of AMA Status Reg 1 399]
     positive_forward_enable = set))                         [From FPU Interface 562]
     dest_internal = not set                                 [Bit 13 of AMA Status Reg 2 403]
     port_blocking_on = not set                              [From Circuit 716]
     src_port_not_forwarding = not set                       [From Circuit 720]
     ((positive_forward_enable = not set AND                 [From FPU Interface 562]
     src_address_status = sa_known_with_good_port) OR        [From Circuit SRC_ADDRESS_STATUS]
     (positive_forward_enable = set AND                      [From FPU Interface 562]
     rxport_equals_bbone = not set AND                       [From Circuit 728]
     src_address_status = sa_known_with_good_port) OR        [From Circuit SRC_ADDRESS_STATUS]
     (positive_forward_enable = set AND                      [From FPU Interface 562]
     rxport_equals_bbone = set AND                           [From Circuit 728]
     src_address_status = sa_unknown))                       [From Circuit SRC_ADDRESS_STATUS]
     tx_disable_on = not set                                 [From Circuit 708]
     dest_port_blocking = not set                            [From Circuit 718]
     dest_port_not_forwarding = not set                      [From Circuit 750]
     dest_port_type = ethernet                               [From Circuit 752]
     fragment_frame = not set                                [From Circuit RBSM_FRAG]
     (rx_filter_on = set OR                                  [From Circuit 702]
     tx_filter_on = set)                                     [From Circuit 704]
     )
          THEN
               code vector = CV_UNICAST_FDDI_TO_ETHERNET_FILTERS
ENDIF
```

FIG. 17Q

```
IF
    (cont_scan = set                          [From Circuit CONT_SCAN]
    fddi_eof = set                            [From Circuit RBSM_UNLOAD]
    fddi_abort = not set                      [From Circuit FDDI_ABORT]
    fddi_rx_error = not set                   [From Circuit
                                              FDDI_RX_ERROR]
    rx_monitor_on = not set                   [From Circuit 710]
    dest_monitor = not set                    [From Circuit
                                              DESTINATION_MONITOR]
    filter_frame = not set                    [From Circuit FILTER_FRAME]
    llc_frame_type = set                      [From Bit 27 FDDI
                                              Status Reg.]
    rx_disable_on = not set                   [From Circuit 706]
    dest_group_address = not set              [From Bit 31 RBSM AMA
                                              Status Reg. 2]
    (dest_address_match = set OR              [Bit 22 of AMA Status
                                              Reg 1 399]
    (dest_address_match = not set AND         [Bit 22 of AMA Status
                                              Reg 1 399]
```

FIG. 17R

```
    positive_forward_enable = set))                   [From FPU Interface 562]
    dest_internal = not set                           [Bit 13 of AMA Status
                                                      Reg 2 403]
    port_blocking_on = not set                        [From Circuit 716]
    src_port_not_forwarding = not set                 [From Circuit 720]
    ((positive_forward_enable = not set AND           [From FPU Interface 562]
    src_address_status = sa_known_with_good_port) OR  [From Circuit
                                                      SRC_ADDRESS_STATUS]
    (positive_forward_enable = set AND                [From FPU Interface 562]
    rxport_equals_bbone = not set AND                 [From Circuit 728]
    src_address_status = sa_known_with_good_port) OR  [From Circuit
                                                      SRC_ADDRESS_STATUS]
    (positive_forward_enable = set AND                [From FPU Interface 562]
    rxport_equals_bbone = set AND                     [From Circuit 728]
    src_address_status = sa_unknown))                 [From Circuit
                                                      SRC_ADDRESS_STATUS]
    tx_disable_on = not set                           [From Circuit 708]
    dest_port_blocking = not set                      [From Circuit 718]
    dest_port_not_forwarding = not set                [From Circuit 750]
    dest_port_type = ethernet                         [From Circuit 752]
    fragment_frame = set                              [From Circuit RBSM_FRAG]
    )
        THEN
            code vector = CV_UNICAST_FDDI_TO_ETHERNET_FRAG

ENDIF
```

FIG. 17S

```
IF
     (cont_scan = set                           [From Circuit CONT_SCAN]
     ethernet_eof = set                         [From Circuit ETHERNET_EOF]
     enet_abort = not set                       [From Circuit ENET_ABORT]
     ethernet_rx_error = not set                [From Circuit
                                                ETHERNET_RX_ERROR]
     rx_monitor_on = not set                    [From Circuit 710]
     dest_monitor = not set                     [From Circuit
                                                DESTINATION_MONITOR]
     filter_frame = not set                     [From Circuit FILTER_FRAME]
     cut_thru_end = not set                     [From Circuit CUT_THRU_END]
     rx_disable_on = not set                    [From Circuit 706]
     dest_group_address = not set               [From Bit 31 RBSM AMA
                                                Status Reg. 2]
     port_blocking_on = not set                 [From Circuit 716]
     positive_forward_enable = not set          [From FPU Interface 562]
     dest_address_match = not set               [Bit 22 of AMA Status
                                                Reg 1 399]
     )
          THEN
               code vector = CV_UNICAST_DA_UNKNOWN

ELSIF
     (cont_scan = set                           [From Circuit CONT_SCAN]
     fddi_eof = set                             [From Circuit RBSM_UNLOAD]
     fddi_abort = not set                       [From Circuit FDDI_ABORT]
     fddi_rx_error = not set                    [From Circuit
                                                FDDI_RX_ERROR]
```

FIG. 17T

```
    rx_monitor_on = not set                         [From Circuit 710]
    dest_monitor = not set                          [From Circuit
                                                    DESTINATION_MONITOR]
    filter_frame = not set                          [From Circuit FILTER_FRAME]
    llc_frame_type = set                            [From Bit 27 FDDI
                                                    Status Reg.]
    rx_disable_on = not set                         [From Circuit 706]
    dest_group_address = not set                    [From Bit 31 RBSM AMA
                                                    Status Reg. 2]
    port_blocking_on = not set                      [From Circuit 716]
    positive_forward_enable = not set               [From FPU Interface 562]
    dest_address_match = not set                    [Bit 22 of AMA Status
                                                    Reg 1 399]
    )    THEN
             code vector = CV_UNICAST_DA_UNKNOWN
ENDIF
IF
    (cont_scan = set                                [From Circuit CONT_SCAN]
    ethernet_eof = set                              [From Circuit ETHERNET_EOF]
    enet_abort = not set                            [From Circuit ENET_ABORT]
    ethernet_rx_error = not set                     [From Circuit
                                                    ETHERNET_RX_ERROR]
    rx_monitor_on = not set                         [From Circuit 710]
    dest_monitor = not set                          [From Circuit
                                                    DESTINATION_MONITOR]
    filter_frame = not set                          [From Circuit FILTER_FRAME]
    cut_thru_end = not set                          [From Circuit CUT_THRU_END]
    rx_disable_on = not set                         [From Circuit 706]
    dest_group_address = not set                    [From Bit 31 RBSM AMA
                                                    Status Reg. 2]
```

FIG. 17U

```
(dest_address_match = set OR                             [Bit 22 of AMA Status
                                                         Reg 1 399]
(dest_address_match = not set AND                        [Bit 22 of AMA Status
                                                         Reg 1 399]
positive_forward_enable = set))                          [From FPU Interface 562]
dest_internal = not set                                  [Bit 13 of AMA Status
                                                         Reg 2 403]
port_blocking_on = not set                               [From Circuit 716]
(src_port_not_forwarding = set OR                        [From Circuit 720]
(positive_forward_enable = not set AND                   [From FPU Interface 562]
src_address_status = sa_known_with_good_port) OR         [From Circuit
                                                         SRC_ADDRESS_STATUS]
(rxport_equals_bbone = not set AND                       [From Circuit 728]
src_address_status = sa_known_with_good_port) OR         [From Circuit
                                                         SRC_ADDRESS_STATUS]
(positive_forward_enable = set AND                       [From FPU Interface 562]
rxport_equals_bbone = set AND                            [From Circuit 728]
src_address_status = sa_unknown) OR                      [From Circuit
                                                         SRC_ADDRESS_STATUS]
tx_disable_on = set OR                                   [From Circuit 708]
dest_port_blocking = set OR                              [From Circuit 718]
dest_port_not_forwarding = set)                          [From Circuit 750]
)
    THEN
        code vector = CV_UNICAST_EXCEPTION
```

FIG. 17V

```
ELSIF
     (cont_scan = set                                      [From Circuit CONT_SCAN]
     fddi_eof = set                                        [From Circuit RBSM_UNLOAD]
     fddi_abort = not set                                  [From Circuit FDDI_ABORT]
     fddi_rx_error = not set                               [From Circuit
                                                           FDDI_RX_ERROR]
     rx_monitor_on = not set                               [From Circuit 710]
     dest_monitor = not set                                [From Circuit
                                                           DESTINATION_MONITOR]
     filter_frame = not set                                [From Circuit FILTER_FRAME]
     llc_frame_type = set                                  [From Bit 27 FDDI
                                                           Status Reg.]
     rx_disable_on = not set                               [From Circuit 706]
     dest_group_address = not set                          [From Bit 31 RBSM AMA
                                                           Status Reg. 2]
     (dest_address_match = set OR                          [Bit 22 of AMA Status
                                                           Reg 1 399]
     (dest_address_match = not set AND                     [Bit 22 of AMA Status
                                                           Reg 1 399]
     positive_forward_enable = set))                       [From FPU Interface 562]
     dest_internal = not set                               [Bit 13 of AMA Status
                                                           Reg 2 403]
     port_blocking_on = not set                            [From Circuit 716]
     (src_port_not_forwarding = set OR                     [From Circuit 720]
     (positive_forward_enable = not set AND                [From FPU Interface 562]
     src_address_status = sa_known_with_good_port) OR      [From Circuit
                                                           SRC_ADDRESS_STATUS]
```

FIG. 17W

```
     rxport_equals_bbone = not set AND                [From Circuit 728]
     src_address_status = sa_known_with_good_port) OR [From Circuit
                                                      SRC_ADDRESS_STATUS]
     (positive_forward_enable = set AND               [From FPU Interface 562]
     rxport_equal_bbone = set AND                     [From Circuit 728]
     src_address_status = sa_unknown) OR [From Circuit
                                                      SRC_ADDRESS_STATUS]
     tx_disable_on = set OR                           [From Circuit 708]
     dest_port_blocking = set OR                      [From Circuit 718]
     dest_port_not_forwarding = set)                  [From Circuit 750]
     )
          THEN
               code vector = CV_UNICAST_EXCEPTION
ENDIF
IF
     (cont_scan = set                                 [From Circuit CONT_SCAN]
     src_ct_allowed = set                             [From Circuit 756]
     multicast_ct_allowed = set                       [From Circuit 760]
     dest_group_address = set                         [From Bit 31 RBSM AMA
                                                      Status Reg. 2]
     rx_filter_on = not set                           [From Circuit 702]
     rx_multicast_filter_on = not set                 [From Circuit 762
     any_multicast_cut_thru_disabled = not set        [From Circuit 732]
     any_enet_dest_tx_filter = not set                [From Circuit 734]
     any_enet_dest_tx_multicast_filter = not set      [From Circuit 736]
     )
          THEN
               code vector = CV_MULTICAST_FROM_ETHERNET
```

FIG. 17X

```
ELSIF
     (cont_scan = set                                         [From Circuit CONT_SCAN]
     bbone_multicast_ct = set                                 [From Circuit 726]
     dest_group_address = set                                 [From Bit 31 RBSM AMA
                                                              Status Reg. 2]
     rx_filter_on = not set                                   [From Circuit 702
     rx_multicast_filter_on = not set                         [From Circuit 762]
     any_multicast_cut_thru_disabled = not set                [From Circuit 732]
     any_enet_dest_tx_filter = not set                        [From Circuit 734]
     any_enet_dest_tx_multicast_filter = not set              [From Circuit 736]
     )
          THEN
               code vector = CV_MULTICAST_FROM_ETHERNET
ELSIF
     (cont_scan = set                                         [From Circuit CONT_SCAN]
     ethernet_eof = set                                       [From Circuit ETHERNET_EOF]
     enet_abort = not set                                     [From Circuit ENET_ABORT]
     ethernet_rx_error = not set                              [From Circuit
                                                              ETHERNET_RX_ERROR]
     rx_monitor_on = not set                                  [From Circuit 710]
     destination_monitor = not set                            [From Circuit
                                                              DESTINATION_MONITOR]
     cut_thru_end = not set                                   [From Circuit CUT_THRU_END]
     rx_disable_on = not set                                  [From Circuit 706]
     dest_group_address = set                                 [From Bit 31 RBSM AMA
                                                              Status Reg. 2]
     (dest_address_match = not set OR                         [Bit 22 of AMA Status
                                                              Reg 1 399]
     dest_internal = not set)                                 [Bit 13 of AMA Status
                                                              Reg 2 403]
```

FIG. 17Y

```
    rx_multicast_disable_on = not set                       [From Circuit 714]
    port_blocking_on = not set                              [From Circuit 716]
    src_port_not_forwarding = not set                       [From Circuit 720]
    ((positive_forward_enable = not set AND                 [From FPU Interface 562]
    src_address_status = sa_known_with_good_port) OR        [From Circuit
                                                            SRC_ADDRESS_STATUS]
    (positive_forward_enable = set AND                      [From FPU Interface 562]
    rxport_equals_bbone = not set AND                       [From Circuit 728]
    src_address_status = sa_known_with_good_port) OR        [From Circuit
                                                            SRC_ADDRESS_STATUS]
    (positive_forward_enable = set AND                      [From FPU Interface 562]
    rxport_equals_bbone = set AND                           [From Circuit 728]
    src_address_status = sa_unknown))                       [From Circuit
                                                            SRC_ADDRESS_STATUS]
    rx_filter_on = not set                                  [From Circuit 702]
    rx_multicast_filter_on = not set                        [From Circuit 762]
    any_dest_tx_disabled = not set                          [From Circuit 738]
    any_dest_tx_multicast_disabled = not set                [From Circuit 740]
    any_dest_port_blocking = not set                        [From Circuit 744
    any_dest_tx_filter = not set                            [From Circuit 766]
    any_dest_tx_multicast_filter = not set                  [From Circuit 768]
    any_dest_port_not_forwarding = not set                  [From Circuit 742]
    )
         THEN
              code vector = CV_MULTICAST_FROM_ETHERNET
ENDIF
```

FIG. 17Z

```
IF
    (cont_scan = set                                [From Circuit CONT_SCAN]
    src_ct_allowed = set                            [From Circuit 756]
    multicast_ct_allowed = set                      [From Circuit 760]
    dest_group_address = set                        [From Bit 31 RBSM AMA
                                                    Status Reg. 2]
    (rx_filter_on = set OR                          [From Circuit 702]
    rx_multicast_filter_on = set OR                 [From Circuit 762]
    any_multicast_cut_thru_disabled = set OR        [From Circuit 732]
    any_enet_dest_tx_filter = set OR                [From Circuit 734]
    any_enet_dest_tx_multicast_filter = set)        [From Circuit 736]
    )
        THEN
            code vector = CV_MULTICAST_FROM_ETHERNET_EXCEPTION
```

FIG. 18A

```
ELSIF
    (cont_scan = set                                  [From Circuit CONT_SCAN]
    bbone_multicast_ct = set                          [From Circuit 726]
    dest_group_address = set                          [From Bit 31 RBSM AMA Status Reg. 2]
    (rx_filter_on = set OR                            [From Circuit 702]
    rx_multicast_filter_on = set OR                   [From Circuit 762]
    any_multicast_cut_thru_disable = set OR           [From Circuit 732]
    any_enet_dest_tx_filter = set OR                  [From Circuit 734]
    any_enet_dest_tx_multicast_filter = set)          [From Circuit 736]
    )
        THEN
            code vector = CV_MULTICAST_FROM_ETHERNET_EXCEPTION
ELSIF
    (cont_scan = set                                  [From Circuit CONT_SCAN]
    ethernet_eof = set                                [From Circuit ETHERNET_EOF]
    enet_abort = not set                              [From Circuit ENET_ABORT]
    ethernet_rx_error = not set                       [From Circuit ETHERNET_RX_ERROR]
    rx_monitor_on = not set                           [From Circuit 710]
    dest_monitor = not set                            [From Circuit DESTINATION_MONITOR]
    cut_thru_end = not set                            [From Circuit CUT_THRU_END]
    rx_disable_on = not set                           [From Circuit 706]
    dest_group_address = set                          [From Bit 31 RBSM AMA Status Reg. 2]
    (dest_address_match = not set OR                  [Bit 22 of AMA Status Reg 1 399]
    dest_internal = not set)                          [Bit 13 of AMA Status Reg 2 403]
    rx_multicast_disable_on = not set                 [From Circuit 714]
    port_blocking_on = not set                        [From Circuit 716]
    src_port_not_forwarding = not set                 [From Circuit 720]
    ((positive_forward_enable = not set AND           [From FPU Interface 562]
    src_address_status = sa_known_with_good_port) OR  [From Circuit SRC_ADDRESS_STATUS]
    (positive_forward_enable = set AND                [From FPU Interface 562]
    rxport_equals_bbone = not set AND                 [From Circuit 728]
    src_address_status = sa_known_with_good_port) OR  [From Circuit SRC_ADDRESS_STATUS]
```

FIG. 18B

```
    (positive_forward_enable = set AND               [From FPU Interface 562]
    rxport_equals_bbone = set AND                    [From Circuit 728]
    src_address_status = sa_unknown))                [From Circuit
                                                     SRC_ADDRESS_STATUS]
    (rx_filter_on = set OR                           [From Circuit 702]
    rx_multicast_filter_on = set OR                  [From Circuit 762]
    any_dest_tx_disabled = set OR                    [From Circuit 738]
    any_dest_tx_multicast_disabled = set OR          [From Circuit 740]
    any_dest_port_blocking = set OR                  [From Circuit 744]
    any_dest_tx_filter = set OR                      [From Circuit 766]
    any_dest_tx_multicast_filter = set OR            [From Circuit 768]
    any_dest_port_not_forwarding = set)              [From Circuit 742]
    )
        THEN
            code vector = CV_MULTICAST_FROM_ETHERNET_EXCEPTION
ENDIF
IF
    (cont_scan = set                                 [From Circuit CONT_SCAN]
    cut_thru_end = set                               [From Circuit CUT_THRU_END]
    enet_abort = not set                             [From Circuit ENET_ABORT]
    ethernet_rx_error = not set                      [From Circuit
                                                     ETHERNET_RX_ERROR]
    rx_monitor_on = not set                          [From Circuit 710]
    destination_monitor = not set                    [From Circuit
                                                     DESTINATION_MONITOR]
    dest_group_address = set                         [From Bit 31 RBSM AMA
                                                     Status Reg. 2]
    )
        THEN
            code vector = CV_MULTICAST_FROM_ETHERNET_CUTTHRU_END
ENDIF
```

FIG. 18C

```
IF
    (cont_scan = set                                  [From Circuit CONT_SCAN]
    fddi_eof = set                                    [From Circuit RBSM_UNLOAD]
    fddi_abort = not set                              [From Circuit FDDI_ABORT]
    fddi_rx_error = not set                           [From Circuit
                                                      FDDI_RX_ERROR]
    rx_monitor_on = not set                           [From Circuit 710]
    destination_monitor = not set                     [From Circuit
                                                      DESTINATION_MONITOR]
    llc_frame_type = set                              [From Bit 27 FDDI
                                                      Status Reg.]
    rx_disable_on = not set                           [From Circuit 706]
    dest_group_address = set                          [From Bit 31 RBSM AMA
                                                      Status Reg. 2]
    (dest_address_match = not set OR                  [Bit 22 of AMA Status
                                                      Reg 1 399]
    dest_internal = not set)                          [Bit 13 of AMA Status
                                                      Reg 2 403]
    rx_multicast_disable_on = not set                 [From Circuit 714]
    port_blocking_on = not set                        [From Circuit 716]
    fragment_frame = not set                          [From Circuit RBSM_FRAG]
    src_port_not_forwarding = not set                 [From Circuit 720]
    ((positive_forward_enable = not set AND           [From FPU Interface 562]
    src_address_status = sa_known_with_good_port) OR  [From Circuit
                                                      SRC_ADDRESS_STATUS]
```

FIG. 18D

```
    (positive_forward_enable = set AND                    [From FPU Interface 562]
    rxport_equals_bbone = not set AND                     [From Circuit 728]
    src_address_status = sa_known_with_good_port) OR      [From Circuit
                                                          SRC_ADDRESS_STATUS]
    (positive_forward_enable = set AND                    [From FPU Interface 562]
    rxport_equals_bbone = set AND                         [From Circuit 728]
    src_address_status = sa_unknown))                     [From Circuit
                                                          SRC_ADDRESS_STATUS]
    rx_filter_on = not set                                [From Circuit 702]
    rx_multicast_filter_on = not set                      [From Circuit 762]
    any_dest_tx_disabled = not set                        [From Circuit 738]
    any_dest_tx_multicast_disabled = not set              [From Circuit 740]
    any_dest_port_blocking = not set                      [From Circuit 744]
    any_dest_port_not_forwarding = not set                [From Circuit 742]
    any_dest_tx_filter = not set                          [From Circuit 766]
    any_dest_tx_multicast_filter = not set                [From Circuit 736]
    )
        THEN
            code vector = CV_MULTICAST_FROM_FDDI
ENDIF
IF
    (cont_scan = set                                      [From Circuit CONT_SCAN]
    fddi_eof = set                                        [From Circuit RBSM_UNLOAD]
    fddi_abort = not set                                  [From Circuit FDDI_ABORT]
    fddi_rx_error = not set                               [From Circuit FDDI_RX_ERROR]
    rx_monitor_on = not set                               [From Circuit 710]
    destination_monitor = not set                         [From Circuit DESTINATION_MONITOR]
    llc_frame_type = set                                  [From Bit 27 FDDI Status Reg.]
    rx_disable_on = not set                               [From Circuit 706]
```

FIG. 18E

```
dest_group_address = set                                   [From Bit 31 RBSM AMA
                                                           Status Reg. 2]
(dest_address_match = not set OR                           [Bit 22 of AMA Status
                                                           Reg 1 399]
dest_internal = not set)                                   [Bit 13 of AMA Status
                                                           Reg 2 403]
rx_multicast_disable_on = not set                          [From Circuit 714]
port_blocking_on = not set                                 [From Circuit 716]
fragment_frame = not set                                   [From Circuit RBSM_FRAG]
src_port_not_forwarding = not set                          [From Circuit 720]
((positive_forward_enable = not set AND                    [From FPU Interface 562]
src_address_status = sa_known_with_good_port) OR           [From Circuit
                                                           SRC_ADDRESS_STATUS]
(positive_forward_enable = set AND                         [From FPU Interface 562]
rxport_equals_bbone = not set                              AND  [From Circuit 728]
src_address_status = sa_known_with_good_port) OR           [From Circuit
                                                           SRC_ADDRESS_STATUS]
(positive_forward_enable = set AND                         [From FPU Interface 562]
rxport_equals_bbone = set AND                              [From Circuit 728]
src_address_status = sa_unknown))                          [From Circuit
                                                           SRC_ADDRESS_STATUS]
```

FIG. 18F

```
    (rx_filter_on = set OR                              [From Circuit 702]
    rx_multicast_filter_on = set OR                     [From Circuit 762]
    any_dest_tx_disable = set OR                        [From Circuit 738]
    any_dest_tx_multicast_disable = set OR              [From Circuit 740]
    any_dest_port_not_forwarding = set OR               [From Circuit 742]
    any_dest_port_blocking = set OR                     [From Circuit 744]
    any_dest_tx_filter = set OR                         [From Circuit 766]
    any_dest_tx_multicast_filter = set)
    )
        THEN
            code vector = CV_MULTICAST_FROM_FDDI_EXCEPTION
ENDIF
IF
    (cont_scan = set                                    [From Circuit CONT_SCAN]
    fddi_eof = set                                      [From Circuit RBSM_UNLOAD]
    fddi_abort = not set                                [From Circuit FDDI_ABORT]
    fddi_rx_error = not set                             [From Circuit
                                                        FDDI_RX_ERROR]
    rx_monitor_on = not set                             [From Circuit 710]
    dest_monitor = not set                              [From Circuit
                                                        DESTINATION_MONITOR]
    llc_frame_type = set                                [From Bit 27 FDDI
                                                        Status Reg.]
    rx_disable_on = not set                             [From Circuit 706]
    dest_group_address = set                            [From Bit 31 RBSM AMA
                                                        Status Reg. 2]
```

FIG. 18G

```
(dest_address_match = not set OR                               [Bit 22 of AMA Status
                                                               Reg 1 399]
dest_internal = not set)                                       [Bit 13 of AMA Status
                                                               Reg 2 403]
rx_multicast_disable_on = not set                              [From Circuit 714]
port_blocking_on = not set                                     [From Circuit 716]
src_port_not_forwarding = not set                              [From Circuit 720]
((positive_forward_enable = not set AND                        [From FPU Interface 562]
src_address_status = sa_known_with_good_port) OR               [From Circuit
                                                               SRC_ADDRESS_STATUS]
(positive_forward_enable = set AND                             [From FPU Interface 562]
rxport_equals_bbone = not set AND                              [From Circuit 728]
src_address_status = sa_known_with_good_port) OR               [From Circuit
                                                               SRC_ADDRESS_STATUS]
(positive_forward_enable = set AND                             [From FPU Interface 562]
rxport_equals_bbone = set AND                                  [From Circuit 728]
src_address_status = sa_unknown)) AND                          [From Circuit
                                                               SRC_ADDRESS_STATUS]
fragment_frame = set                                           [From Circuit RBSM_FRAG]
)
     THEN
          code vector = CV_MULTICAST_FROM_FDDI_FRAG

ENDIF
```

FIG. 18H

```
IF
    (cont_scan = set                                        [From Circuit CONT_SCAN]
    ethernet_eof = set                                      [From Circuit ETHERNET_EOF]
    enet_abort = not set                                    [From Circuit ENET_ABORT]
    ethernet_rx_error = not set                             [From Circuit ETHERNET_RX_ERROR]
    rx_monitor_on = not set                                 [From Circuit 710]
    dest_monitor = not set                                  [From Circuit DESTINATION_MONITOR]
    cut_thru_end = not set                                  [From Circuit CUT_THRU_END]
    rx_disable_on = not set                                 [From Circuit 706]
    dest_group_address = set                                [From Bit 31 RBSM AMA
                                                            Status Reg. 2]
    (dest_address_ match = not set OR                       [From Bit 22 RBSM AMA
                                                            Status Reg. 1]
    dest_internal = not set)                                [Bit 13 of AMA Status Reg 2 403]
    rx_multicast_disable_on = not set                       [From Circuit 714]
    port_blocking_on = not set                              [From Circuit 716]
    (src_port_not_forwarding = set OR                       [From Circuit 720]
    (positive_forward_enable = not set AND                  [From FPU Interface 562]
    src_address_status = sa_known_with_good_port) OR        [From Circuit SRC_ADDRESS_STATUS]
    (rxport_equals_bbone = not set AND                      [From Circuit 728]
    src_address_status = sa_known_with_good_port) OR        [From Circuit SRC_ADDRESS_STATUS]
    (positive_forward_enable = set AND                      [From FPU Interface 562]
    rxport_equals_bbone = set AND                           [From Circuit 728]
    src_address_status = sa_unknown))                       [From Circuit SRC_ADDRESS_STATUS]
    )
        THEN
            code vector = CV_MULTICAST_EXCEPTION
```

FIG. 18I

```
ELSIF
    (cont_scan = set                                     [From Circuit CONT_SCAN]
    fddi_eof = set                                       [From Circuit RBSM_UNLOAD]
    fddi_abort = not set                                 [From Circuit FDDI_ABORT]
    fddi_rx_error = not set                              [From Circuit
                                                         FDDI_RX_ERROR]
    rx_monitor_on = not set                              [From Circuit 710]
    dest_monitor = not set                               [From Circuit
                                                         DESTINATION_MONITOR]
    llc_frame_type = set                                 [From Bit 27 FDDI
                                                         Status Reg.]
    rx_disable_on =  not set                             [From Circuit 706]
    dest_group_address = set                             [From Bit 31 RBSM AMA
                                                         Status Reg. 2]
    (dest_address_match = not set OR                     [Bit 22 of AMA Status
                                                         Reg 1 399]
    dest_internal = not set)                             [Bit 13 of AMA Status
                                                         Reg 2 403]
    rx_multicast_disable_on = not set                    [From Circuit 714]
    port_blocking_on = not set                           [From Circuit 716]
    (src_port_not_forwarding = set OR                    [From Circuit 720]
    (positive_forward_enable = not set AND               [From FPU Interface 562]
    src_address_status = sa_known_with_good_port) OR     [From Circuit
                                                         SRC_ADDRESS_STATUS]
```

FIG. 18J

```
    (rxport_equals_bbone = not set AND                        [From Circuit 728]
    src_address_status = sa_known_with_good_port) OR          [From Circuit
                                                              SRC_ADDRESS_STATUS]
    (positive_forward_enable = set AND                        [From FPU Interface 562]
    rxport_equals_bbone = set AND                             [From Circuit 728]
    src_address_status = sa_unknown))                         [From Circuit
                                                              SRC_ADDRESS_STATUS]
    )
        THEN
            code vector = CV_MULTICAST_EXCEPTION
ENDIF
IF
    (cont_scan = set                                          [From Circuit CONT_SCAN]
    ethernet_eof = set                                        [From Circuit ETHERNET_EOF]
    enet_abort = not set                                      [From Circuit ENET_ABORT]
    ethernet_rx_error = set                                   [From Circuit
                                                              ETHERNET_RX_ERROR]
    )
        THEN
            code vector = CV_RECEIVE_FRAME_ERROR
ELSIF
    (cont_scan = set                                          [From Circuit CONT_SCAN]
    fddi_eof = set                                            [From Circuit RBSM_UNLOAD]
    fddi_abort = not set                                      [From Circuit FDDI_ABORT]
    fddi_rx_error = set                                       [From Circuit
                                                              FDDI_RX_ERROR]
    )
        THEN
            code vector = CV_RECEIVE_FRAME_ERROR

ENDIF
```

FIG. 18K

```
IF
     (cont_scan = set                        [From Circuit CONT_SCAN]
     fddi_eof = set                          [From Circuit RBSM_UNLOAD]
     fddi_abort = not set                    [From Circuit FDDI_ABORT]
     fddi_rx_error = not set                 [From Circuit
                                             FDDI_RX_ERROR]
     rx_monitor_on = not set                 [From Circuit 710]
     dest_monitor = not set                  [From Circuit
                                             DESTINATION_MONITOR]
     filter_frame = not set                  [From Circuit FILTER_FRAME]
     llc_frame_type = not set                [From Bit 27 FDDI
                                             Status Reg.]
     )
          THEN
               code vector = CV_NON_LLC_FRAME

ENDIF
```

FIG. 18L

```
IF
    (cont_scan = set                                       [From Circuit CONT_SCAN]
    ethernet_eof = set                                     [From Circuit ETHERNET_EOF]
    enet_abort = not set                                   [From Circuit ENET_ABORT]
    ethernet_rx_error = not set                            [From Circuit ETHERNET_RX_ERROR]
    rx_monitor_on = not set                                [From Circuit 710]
    destination_monitor = not set                          [From Circuit DESTINATION_MONITOR]
    filter_frame = not set                                 [From Circuit FILTER_FRAME]
    cut_thru_end = not set                                 [From Circuit CUT_THRU_END]
    rx_disable_on = not set                                [From Circuit 706]
    dest_group_address = not set                           [From Bit 31 RBSM AMA
                                                           Status Reg. 2]
    dest_address_match = set                               [Bit 22 of AMA Status Reg 1 399]
    dest_internal = set                                    [Bit 13 of AMA Status Reg 2 403]
    port_blocking_on = not set                             [From Circuit 716]
    src_port_not_forwarding = not set                      [From Circuit 720]
    ((positive_forward_enable = not set AND                [From FPU Interface 562]
    src_address_status = sa_known_with_good_port) OR       [From Circuit SRC_ADDRESS_STATUS]
    (positive_forward_enable = set AND                     [From FPU Interface 562]
    rxport_equals_bbone = not set AND                      [From Circuit 728]
    src_address_status = sa_known_with_good_port) OR]     [From Circuit SRC_ADDRESS_STATUS]
    (positive_forward_enable = set AND                     [From FPU Interface 562]
    rxport_equals_bbone = set AND                          [From Circuit 728]
    src_address_status = sa_unknown))                      [From Circuit SRC_ADDRESS_STATUS]
    )
        THEN
            code vector = CV_INTERNAL_UNICAST
```

FIG. 18M

```
ELSIF
     (cont_scan = set                                    [From Circuit CONT_SCAN]
     fddi_eof = set                                      [From Circuit RBSM_UNLOAD]
     fddi_abort = not set                                [From Circuit FDDI_ABORT]
     fddi_rx_error = not set                             [From Circuit
                                                         FDDI_RX_ERROR]
     rx_monitor_on = not set                             [From Circuit 710]
     destination_monitor = not set                       [From Circuit
                                                         DESTINATION_MONITOR]
     filter_frame = not set                              [From Circuit FILTER_FRAME]
     llc_frame_type = set                                [From Bit 27 FDDI
                                                         Status Reg.]
     rx_disable_on = not set                             [From Circuit 706]
     dest_group_address = not set                        [From Bit 31 RBSM AMA
                                                         Status Reg. 2]
     dest_address_match = set                            [Bit 22 of AMA Status
                                                         Reg 1 399]
     dest_internal = set                                 [Bit 13 of AMA Status
                                                         Reg 2 403]
     port_blocking_on = not set                          [From Circuit 716]
     src_port_not_forwarding = not set                   [From Circuit 720]
     ((positive_forward_enable = not set AND             [From FPU Interface 562]
     src_address_status = sa_known_with_good_port) OR    [From Circuit
                                                         SRC_ADDRESS_STATUS]
```

FIG. 18N

```
    (positive_forward_enable = set AND                   [From FPU Interface 562]
    rxport_equals_bbone = not set AND                    [From Circuit 728]
    src_address_status = sa_known_with_good_port) OR     [From Circuit
                                                         SRC_ADDRESS_STATUS]
    (positive_forward_enable = set AND                   [From FPU Interface 562]
    rxport_equals_bbone = set AND                        [From Circuit 728]
    src_address_status = sa_unknown))                    [From Circuit
                                                         SRC_ADDRESS_STATUS]
    )
        THEN
            code vector = CV_INTERNAL_UNICAST
ENDIF
IF
    (cont_scan = set                                     [From Circuit CONT_SCAN]
    ethernet_eof = set                                   [From Circuit ETHERNET_EOF]
    enet_abort = not set                                 [From Circuit ENET_ABORT]
    ethernet_rx_error = not set                          [From Circuit
                                                         ETHERNET_RX_ERROR]
    rx_monitor_on = not set                              [From Circuit 710]
    destination_monitor = not set                        [From Circuit
                                                         DESTINATION_MONITOR]
    filter_frame = not set                               [From Circuit FILTER_FRAME]
    cut_thru_end = not set                               [From Circuit CUT_THRU_END]
    rx_disable_on = not set                              [From Circuit 706]
    dest_group_address = not set                         [From Bit 31 RBSM AMA
                                                         Status Reg. 2]
    dest_address_match = set                             [Bit 22 of AMA Status
                                                         Reg 1 399]
```

FIG. 18O

```
    dest_internal = set                                       [Bit 13 of AMA Status
                                                              Reg 2 403]
    (port_blocking_on = set OR                                [From Circuit 716]
    src_port_not_forwarding = set OR                          [From Circuit 720]
    (positive_forward_enable = not set AND                    [From FPU Interface 562]
    src_address_status = sa_known_with_good_port) OR          [From Circuit
                                                              SRC_ADDRESS_STATUS]
    (rxport_equals_bbone = not set AND                        [From Circuit 728]
    src_address_status = sa_known_with_good_port) OR          [From Circuit
                                                              SRC_ADDRESS_STATUS]
    (positive_forward_enable = set AND                        [From FPU Interface 562]
    rxport_equals_bbone = set AND                             [From Circuit 728]
    src_address_status = sa_unknown))                         [From Circuit
                                                              SRC_ADDRESS_STATUS]
    )
        THEN
            code vector = CV_INTERNAL_UNICAST_EXCEPTION

ELSIF
    (cont_scan = set                                          [From Circuit CONT_SCAN]
    fddi_eof = set                                            [From Circuit RBSM_UNLOAD]
    fddi_abort = not set                                      [From Circuit FDDI_ABORT]
    fddi_rx_error = not set                                   [From Circuit
                                                              FDDI_RX_ERROR]
```

FIG. 18P

```
     rx_monitor_on = not set                                   [From Circuit 710]
     destination_monitor = not set                             [From Circuit
                                                               DESTINATION_MONITOR]
     filter_frame = not set                                    [From Circuit FILTER_FRAME]
     llc_frame_type = set                                      [From Bit 27 FDDI
                                                               Status Reg.]
     rx_disable_on = not set                                   [From Circuit 706]
     dest_group_address = not set                              [From Bit 31 RBSM AMA
                                                               Status Reg. 2]
     dest_address_match = set                                  [Bit 22 of AMA Status
                                                               Reg 1 399]
     dest_internal = set                                       [Bit 13 of AMA Status
                                                               Reg 2 403]
     (port_blocking_on = set OR                                [From Circuit 716]
     src_port_not_forwarding = set OR                          [From Circuit 720]
     (positive_forward_enable = not set AND                    [From FPU Interface 562]
     src_address_status = sa_known_with_good_port) OR          [From Circuit
                                                               SRC_ADDRESS_STATUS]
     (rxport_equals_bbone = not set AND                        [From Circuit 728]
     src_address_status = sa_known_with_good_port) OR          [From Circuit
                                                               SRC_ADDRESS_STATUS]
     (positive_forward_enable = set AND                        [From FPU Interface 562]
     rxport_equals_bbone = set AND                             [From Circuit 728]
     src_address_status = sa_unknown))                         [From Circuit
                                                               SRC_ADDRESS_STATUS]
     )
          THEN
               code vector = CV_INTERNAL_UNICAST_EXCEPTION
ENDIF
```

FIG. 18Q

```
IF
     (cont_scan = set                                [From Circuit CONT_SCAN]
     ethernet_eof = set                              [From Circuit ETHERNET_EOF]
     enet_abort =  not set                           [From Circuit ENET_ABORT]
     ethernet_rx_error = not set                     [From Circuit
                                                     ETHERNET_RX_ERROR]
     rx_monitor_on = not set                         [From Circuit 710]
     destination_monitor = not set                   [From Circuit
                                                     DESTINATION_MONITOR]
     cut_thru_end = not set                          [From Circuit CUT_THRU_END]
     rx_disable_on = not set                         [From Circuit 706]
     dest_group_address = set                        [From Bit 31 RBSM AMA
                                                     Status Reg. 2]
     dest_address_match = set                        [Bit 22 of AMA Status
                                                     Reg 1 399]
     dest_internal = set                             [Bit 13 of AMA Status
                                                     Reg 2 403]
     rx_multicast_disable_on = not set               [From Circuit 714]
     dest_broadcast = not set)                       [Bit 15 AMA Status
                                                     Reg 2 403]
     )
          THEN
               code vector = CV_INTERNAL_MULTICAST
ENDIF
```

FIG. 18R

```
IF
    (cont_scan = set                        [From Circuit CONT_SCAN]
    ethernet_eof = set                      [From Circuit ETHERNET_EOF]
    enet_abort = not set                    [From Circuit ENET_ABORT]
    ethernet_rx_error = not set             [From Circuit
                                            ETHERNET_RX_ERROR]
    rx_monitor_on = not set                 [From Circuit 710]
    destination_monitor = not set           [From Circuit
                                            DESTINATION_MONITOR]
    cut_thru_end = not set                  [From Circuit CUT_THRU_END]
    rx_disable_on = not set                 [From Circuit 706]
    dest_group_address = set                [From Bit 31 RBSM AMA
                                            Status Reg. 2]
    dest_address_match = set                [Bit 22 of AMA Status
                                            Reg 1 399]
    dest_internal = set                     [Bit 13 of AMA Status
                                            Reg 2 403]
    rx_multicast_disable_on = not set       [From Circuit 714]
    dest_broadcast = set)                   [Bit 15 AMA Status
                                            Reg 2 403]
    )
        THEN
            code vector = CV_INTERNAL_BROADCAST
```

FIG. 18S

```
IF
     (cont_scan = set                               [From Circuit CONT_SCAN]
     fddi_eof = set                                 [From Circuit RBSM_UNLOAD]
     fddi_abort = not set                           [From Circuit FDDI_ABORT]
     fddi_rx_error = not set                        [From Circuit
                                                    FDDI_RX_ERROR]
     rx_monitor_on = not set                        [From Circuit 710]
     destination_monitor = not set                  [From Circuit
                                                    DESTINATION_MONITOR]
     llc_frame_type = set                           [From Bit 27 FDDI
                                                    Status Reg.]
     rx_disable_on = not set                        [From Circuit 706]
     dest_group_address = set                       [From Bit 31 RBSM AMA
                                                    Status Reg. 2]
     dest_address_match = set                       [Bit 22 of AMA Status
                                                    Reg 1 399]
     dest_internal = set                            [Bit 13 of AMA Status
                                                    Reg 2 403]
     rx_multicast_disable_on = not set              [From Circuit 714]
     dest_broadcast = set                           [Bit 15 AMA Status
                                                    Reg 2 403]
     )
          THEN
               code vector = CV_INTERNAL_BROADCAST
ENDIF
IF
     (cont_scan = set                               [From Circuit CONT_SCAN]
     fddi_eof = not set                             [From Circuit RBSM_UNLOAD]
     (filter_frame = not set OR                     [From Circuit FILTER_FRAME]
     (filter_frame = set AND                        [From Circuit FILTER_FRAME]
```

FIG. 18T

```
     rx_monitor_on = set))                         [From Circuit 710]
     fddi_multi_buffer = set                       [From Circuit
                                                   FDDI_MULTI-BUFFER]
     )
          THEN
               code vector = CV_MULTIBUFFER_NOT_LAST_BUFFER
ENDIF
IF
     (cont_scan = set                              [From Circuit CONT_SCAN]
     fddi_eof = set                                [From Circuit RBSM_UNLOAD]
     fddi_abort = not set                          [From Circuit FDDI_ABORT]
     fddi_rx_error = not set                       [From Circuit
                                                   FDDI_RX_ERROR]
     rx_monitor_on = not set                       [From Circuit 710]
     destination_monitor = not set                 [From Circuit
                                                   DESTINATION_MONITOR]
     filter_frame_type = not set                   [From Circuit FILTER_FRAME]
     llc_frame_type = set                          [From Bit 27 FDDI
                                                   Status Reg.]
     rx_disable_on = not set                       [From Circuit 706]
     dest_group_address = not set                  [From Bit 31 RBSM AMA
                                                   Status Reg. 2]
     (dest_address_match = set OR                  [Bit 22 of AMA Status
                                                   Reg 1 399]
     (dest_address_match = not set AND             [Bit 22 of AMA Status
                                                   Reg 1 399]
     positive_forward_enable = set))               [From FPU Interface 562]
     dest_internal = not set                       [Bit 13 of AMA Status
                                                   Reg 2 403]
     port_blocking_on = not set                    [From Circuit 716]
```

FIG. 18U

```
src_port_not_forwarding = not set                 [From Circuit 720]
((positive_forward_enable = not set AND           [From FPU Interface 562]
src_address_status = sa_known_with_good_port) OR  [From Circuit
                                                  SRC_ADDRESS_STATUS]
(positive_forward_enable = set AND                [From FPU Interface 562]
rxport_equals_bbone = not set AND                 [From Circuit 728]
src_address_status = sa_known_with_good_port) OR  [From Circuit
                                                  SRC_ADDRESS_STATUS]
(positive_forward_enable = set AND                [From FPU Interface 562]
rxport_equals_bbone = set AND                     [From Circuit 728]
src_address_status = sa_unknown))                 [From Circuit
                                                  SRC_ADDRESS_STATUS]
tx_disable_on = not set                           [From Circuit 708]
dest_port_blocking = not set                      [From Circuit 718]
dest_port_not_forwarding = not set                [From Circuit 750]
fddi_multi_buffer = set                           [From Circuit
                                                  FDDI_MULTI-BUFFER]
dest_port_type = FDDI                             [From Circuit 752]
rx_filter_on = not set                            [From Circuit 702]
tx_filter_on = not set)                           [From Circuit 704]
)
    THEN
        code vector = CV_MULTIBUFFER_NO_TRANSLATION
```

FIG. 18V

```
IF
    (cont_scan = se                                  [From Circuit CONT_SCAN]t
    fddi_eof = set                                   [From Circuit RBSM_UNLOAD]
    fddi_abort = not set                             [From Circuit FDDI_ABORT]
    fddi_rx_error = not set                          [From Circuit
                                                     FDDI_RX_ERROR]
    rx_monitor_on = not set                          [From Circuit 710]
    dest_monitor = not set                           [From Circuit
                                                     DESTINATION_MONITOR]
    filter_frame = not set                           [From Circuit FILTER_FRAME]
    llc_frame_type = set                             [From Bit 27 FDDI
                                                     Status Reg.]
    rx_disable_on = not set                          [From Circuit 706]
    dest_group_address = not set                     [From Bit 31 RBSM AMA
                                                     Status Reg. 2]
    (dest_address_match = set OR                     [Bit 22 of AMA Status
                                                     Reg 1 399]
    (dest_address_match = not set AND                [Bit 22 of AMA Status
                                                     Reg 1 399]
    positive_forward_enable = set))                  [From FPU Interface 562]
    dest_internal = not set                          [Bit 13 of AMA Status
                                                     Reg 2 403]
    port_blocking_on = not set                       [From Circuit 716]
    src_port_not_forwarding = not set                [From Circuit 720]
    ((positive_forward_enable = not set AND          [From FPU Interface 562]
    src_address_status = sa_known_with_good_port OR  [From Circuit
                                                     SRC_ADDRESS_STATUS]
    (positive_forward_enable = set AND               [From FPU Interface 562]
    rxport_equals_bbone = not set AND                [From Circuit 728]
```

FIG. 18W

```
     src_address_status = sa_known_with_good_port OR   [From Circuit
                                                       SRC_ADDRESS_STATUS]
     (positive_forward_enable = set AND                [From FPU Interface 562]
     rxport_equals_bbone = set AND                     [From Circuit 728]
     src_address_status = sa_unknown))                 [From Circuit
                                                       SRC_ADDRESS_STATUS]
     tx_disable_on = not set                           [From Circuit 708]
     dest_port_blocking = not set                      [From Circuit 718]
     dest_port_not_forwarding = not set                [From Circuit 750]
     fddi_multi_buffer = set                           [From Circuit
                                                       FDDI_MULTI-BUFFER]
     dest_port_type = FDDI                             [From Circuit 752]
     (rx_filter_on = set OR                            [From Circuit 702]
     tx_filter_on = set)                               [From Circuit 704]
     )
          THEN
               code vector = CV_MULTIBUFFER_NO_TRANSLATION_FILTERS
ENDIF
IF
     (cont_scan = set                                  [From Circuit CONT_SCAN]
     fddi_eof = set                                    [From Circuit RBSM_UNLOAD]
     fddi_abort = set                                  [From Circuit FDDI_ABORT]
     fddi_multi_buffer = set)                          [From Circuit
                                                       RBSM_MULTI_BUFFER]
     )
```

FIG. 18X

```
        THEN
             code vector = CV_MULTIBUFFER_DISCARD_FRAME
ELSIF
     (cont_scan = set                                  [From Circuit CONT_SCAN]
     fddi_eof = set                                    [From Circuit RBSM_UNLOAD]
     fddi_abort = not set                              [From Circuit FDDI_ABORT]
     fddi_rx_error = not set                           [From Circuit
                                                       FDDI_RX_ERROR]
     rx_monitor_on = not set                           [From Circuit 710]
     destination_monitor = not set                     [From Circuit
                                                       DESTINATION_MONITOR]
     filter_frame = not set                            [From Circuit FILTER_FRAME]
     llc_frame_type = set                              [From Bit 27 FDDI
                                                       Status Reg.]
     rx_disable_on = set                               [From Circuit 706]
     fddi_multi_buffer = set)                          [From Circuit
                                                       RBSM_MULTI_BUFFER]
     )
        THEN
             code vector = CODECV_MULTIBUFFER_DISCARD_FRAME
```

FIG. 18Y

```
ELSIF
    (cont_scan = set                              [From Circuit CONT_SCAN]
    fddi_eof = set                                [From Circuit RBSM_UNLOAD]
    fddi_abort = not set                          [From Circuit FDDI_ABORT]
    fddi_rx_error = not set                       [From Circuit
                                                  FDDI_RX_ERROR]
    rx_monitor_on = not set                       [From Circuit 710]
    destination_monitor = not set                 [From Circuit
                                                  DESTINATION_MONITOR]
    filter_frame = not set                        [From Circuit
                                                  RBSM_STATUS_REGISTERS
    llc_frame_type = set                          [From Bit 27 FDDI
                                                  Status Reg.]
    rx_disable_on = not set                       [From Circuit 706]
    dest_group_address = not set                  [From Bit 31 RBSM AMA
                                                  Status Reg. 2]
    dest_address_match = not set                  [Bit 22 of AMA Status
                                                  Reg 1 399]
    port_blocking_on = set                        [From Circuit 716]
    fddi_multi_buffer = set)                      [From Circuit
                                                  RBSM_MULTI_BUFFER]
    )
        THEN
            code vector = CV_MULTIBUFFER_DISCARD_FRAME
```

FIG. 18Z

```
ELSIF
     (cont_scan = set                           [From Circuit CONT_SCAN]
     fddi_eof = set                             [From Circuit RBSM_UNLOAD]
     fddi_abort = not set                       [From Circuit FDDI_ABORT]
     fddi_rx_error = not set                    [From Circuit
                                                FDDI_RX_ERROR]
     rx_monitor_on = not set                    [From Circuit 710]
     destination_monitor = not set              [From Circuit
                                                DESTINATION_MONITOR]
     filter_frame = not set                     [From Circuit FILTER_FRAME]
     llc_frame_type = set                       [From Bit 27 FDDI
                                                Status Reg.]
     rx_disable_on = not set                    [From Circuit 706]
     dest_group_address = not set               [From Bit 31 RBSM AMA
                                                Status Reg. 2]
     dest_address_match = set                   [Bit 22 of AMA Status
                                                Reg 1 399]
     port_blocking_on = set                     [From Circuit 716]
     fddi_multi_buffer = set)                   [From Circuit
                                                RBSM_MULTI_BUFFER]
     )
          THEN
               code vector = CV_MULTIBUFFER_DISCARD_FRAME
ELSIF
     (cont_scan = set                           [From Circuit CONT_SCAN]
     fddi_eof = set                             [From Circuit RBSM_UNLOAD]
     fddi_abort = not set                       [From Circuit FDDI_ABORT]
     fddi_rx_error = not set                    [From Circuit FDDI_RX_ERROR]
     rx_monitor_on = not set                    [From Circuit 710]
     destination_monitor = not set              [From Circuit DESTINATION_MONITOR]
```

FIG. 19A

```
     filter_frame = not set                       [From Circuit FILTER_FRAME]
     llc_frame_type = set                         [From Bit 27 FDDI
                                                  Status Reg.]
     rx_disable_on = not set                      [From Circuit 706]
     dest_group_address = set                     [From Bit 31 RBSM AMA
                                                  Status Reg. 2]
     fddi_multi_buffer = set                      [From Circuit
                                                  RBSM_MULTI_BUFFER]
     (rx_multicast_disable_on = set OR            [From Circuit 714]
     ((dest_address_match = not set OR            [Bit 22 of AMA Status
                                                  Reg 1 399]
     dest_internal = not set) AND                 [Bit 13 of AMA Status
                                                  Reg 2 403]
     port_blocking_on = set))                     [From Circuit 716]

     )
          THEN
               code vector = CV_MULTIBUFFER_DISCARD_FRAME
ENDIF
IF
     (cont_scan = set                             [From Circuit CONT_SCAN]
     ethernet_eof = set                           [From Circuit ETHERNET_EOF]
     enet_abort = not set                         [From Circuit ENET_ABORT]
     ethernet_rx_error = not set                  [From Circuit
                                                  ETHERNET_RX_ERROR]
     rx_monitor_on = set)                         [From Circuit 710]
     )
```

FIG. 19B

```
        THEN
            code vector = CV_MONITOR_SOURCE < = set:
ELSIF
    (cont_scan = set                             [From Circuit CONT_SCAN]
    fddi_eof = set                               [From Circuit RBSM_UNLOAD]
    fddi_abort = not set                         [From Circuit FDDI_ABORT]
    fddi_rx_error = not set                      [From Circuit
                                                 FDDI_RX_ERROR]
    rx_monitor_on = set)                         [From Circuit 710]
    )
        THEN
            code vector = CV_MONITOR_SOURCE
ENDIF
IF
    (cont_scan = set                             [From Circuit CONT_SCAN]
    ethernet_eof = set                           [From Circuit ETHERNET_EOF]
    enet_abort = not set                         [From Circuit ENET_ABORT]
    ethernet_rx_error = not set                  [From Circuit
                                                 ETHERNET_RX_ERROR]
    rx_monitor_on = not set                      [From Circuit 710]
    destination_monitor = set)                   [From Circuit
                                                 DESTINATION_MONITOR]
    )
        THEN
            code vector = CV_MONITOR_DESTINATION
```

FIG. 19C

```
ELSIF
     (cont_scan = set                          [From Circuit CONT_SCAN]
     fddi_eof = set                            [From Circuit RBSM_UNLOAD]
     fddi_abort = not set                      [From Circuit FDDI_ABORT]
     fddi_rx_error = not set                   [From Circuit
                                               FDDI_RX_ERROR]
     rx_monitor_on = not set                   [From Circuit 710]
     destination_monitor = set)                [From Circuit
                                               DESTINATION_MONITOR]
     )
          THEN
               code vector = CV_MONITOR_DESTINATION

ENDIF
```

FIG. 19D

TRANSLATION CODE GENERATION

```
{1}
IF
     (rx_monitor_on = set                      [From Circuit 710]
     ethernet_eof = set                        [From Circuit ETHERNET_EOF]
     enet_abort = not set                      [From Circuit ENET_ABORT]
     ethernet_rx_error = not set               [From Circuit
                                               ETHERNET_RX_ERROR]
     dest_address_match = set                  [Bit 31 of AMA status word 380]
     dest_internal = set                       [AMA status word 396]
     )
          THEN
               translation code = MC_INTERNAL

{2}
ELSIF
     (rx_monitor_on = set                      [From Circuit 710]
     ethernet_eof = set                        [From Circuit ETHERNET_EOF]
     enet_abort = not set                      [From Circuit ENET_ABORT]
     ethernet_rx_error = not set               [From Circuit
                                               ETHERNET_RX_ERROR]
     dest_address_match = set                  [Bit 22 of AMA status
                                               Reg 1 399]
     dest_internal = not set                   [Bit 13 of AMA status
                                               Reg 2 403]
     dest_port_type = FDDI                     [From Circuit 752]
     )
          THEN
               translation code = MC_UNICAST_ETHERNET_TO_FDDI
```

FIG. 20A

```
{3}
ELSIF
     (rx_monitor_on = set                          [From Circuit 710]
     ethernet_eof = set                            [From Circuit ETHERNET_EOF]
     enet_abort = not set                          [From Circuit ENET_ABORT]
     ethernet_rx_error = not set                   [From Circuit
                                                   ETHERNET_RX_ERROR]
     dest_address_match = set                      [Bit 31 of AMA status
                                                   word 3809]
     dest_group_address = not set                  [Bit 30 of AMA status word 380]
     )
          THEN
               translation code = MC_UNICAST_DA_UNKNOWN

{4}
ELSIF
     (rx_monitor_on = set                          [From Circuit 710]
     ethernet_eof = set                            [From Circuit ETHERNET_EOF]
     enet_abort = not set                          [From Circuit ENET_ABORT]
     ethernet_rx_error = not set                   [From Circuit
                                                   ETHERNET_RX_ERROR]
     dest_group_address = set                      [Bit 30 of AMA status word 380]
     (dest_address_match = not set OR              [Bit 22 of AMA status
                                                   Reg 1 399]
     dest_internal = not set)                      [Bit 13 of AMA status
                                                   Reg 2 403]
     )
          THEN
               translation code = MC_MULTICAST_FROM_ETHERNET
```

FIG. 20B

```
{5}
ELSIF
    (tx_monitor_on = set                          [From Circuit 712]
    ethernet_eof = set                            [From Circuit ETHERNET_EOF]
    enet_abort = not set                          [From Circuit ENET_ABORT]
    ethernet_rx_error = not set                   [From Circuit ETHERNET_RX_ERROR]
    rx_disable_on = not set                       [From Circuit 706]
    port_blocking_on = not set                    [From Circuit 716]
    src_port_not_forwarding = not set             [From Circuit 720]
    dest_address_match = set                      [Bit 22 of AMA status Reg 1 399]
    dest_internal = not set                       [Bit 13 of AMA status Reg 2 403]
    dest_group_address = not set                  [Bit 30 of AMA status word 380]
    tx_disable_on = not set                       [From Circuit 708]
    dest_port_blocking = not set                  [From Circuit 718]
    dest_port_not_forwarding = not set            [From Circuit 750]
    dest_port_type = FDDI                         [From Circuit 752]
    )
        THEN
            translation code = MC_UNICAST_ETHERNET_TO_FDDI
{6}
ELSIF
    ethernet_eof = set                            [From Circuit ETHERNET_EOF]
    enet_abort = not set                          [From Circuit ENET_ABORT]
    ethernet_rx_error = not set                   [From Circuit ETHERNET_RX_ERROR]
    rx_disable_on = not set                       [From Circuit 706]
    port_blocking_on = not set                    [From Circuit 716]
    src_port_not_forwarding = not set             [From Circuit 720]
    dest_address_match = not set                  [Bit 22 of AMA status Reg 1 399]
    dest_group_address = not set                  [Bit 30 of AMA status word 380]
    positive_forward_enable = not set             [From FPU interface 562]
    any_dest_monitor_on = set                     [From Circuit 746]
    )   THEN
            translation code = MC_UNICAST_DA_UNKNOWN
```

FIG. 20C

```
{7}
ELSIF
     (ethernet_eof = set                       [From Circuit ETHERNET_EOF]
     enet_abort = not set                      [From Circuit ENET_ABORT]
     ethernet_rx_error = not set               [From Circuit ETHERNET_RX_ERROR]
     rx_disable_on = not set                   [From Circuit 706]
     rx_multicast_disable_on = not set         [From Circuit 714]
     port_blocking_on = not set                [From Circuit 716]
     src_port_not_forwarding = not set         [From Circuit 720]
     dest_address_match = set                  [Bit 22 of AMA status
                                               Reg 1 399]
     dest_internal = not set                   [Bit 13 of AMA status
                                               Reg 2 403]
     dest_group_address = set                  [Bit 30 of AMA status word 380]
     any_dest_multicast_monitor_on = set       [From Circuit 748]
     )
          THEN
               translation code = MC_MULTICAST_FROM_ETHERNET
```

FIG. 20D

```
{8}
ELSIF
    (ethernet_eof = set                           [From Circuit ETHERNET_EOF]
    enet_abort = not set                          [From Circuit ENET_ABORT]
    ethernet_rx_error = not set                   [From Circuit ETHERNET_RX_ERROR]
    rx_disable_on = not set                       [From Circuit 706]
    rx_multicast_disable_on = not set             [From Circuit 714]
    port_blocking_on = not set                    [From Circuit 716]
    src_port_not_forwarding = not set             [From Circuit 720]
    dest_address_match = not set                  [Bit 22 of AMA status Reg 1 399
    dest_group_address = set                      [Bit 30 of AMA status word 380]
    any_dest_multicast_monitor_on = set           [From Circuit 748]
    )
        THEN
            translation code = MC_MULTICAST_FROM_ETHERNET

{9}
ELSIF
    (rx_monitor_on = set                          [From Circuit 710]
    fddi_eof = set                                [From Circuit RBSM_UNLOAD]
    fddi_abort = not set                          [From Circuit FDDI_ABORT]
    fddi_rx_error = not set                       [From Circuit FDDI_RX_ERROR]
    dest_address_match = set                      [Bit 22 of AMA status
                                                  Reg 1 399]
    dest_internal = set                           [Bit 13 of AMA status Reg 2 403]
    )
        THEN
            translation code = MC_INTERNAL
```

FIG. 20E

```
{10}
ELSIF
    (rx_monitor_on = set                    [From Circuit 710]
    fddi_eof = set                          [From Circuit RBSM_UNLOAD]
    fddi_abort = not set                    [From Circuit FDDI_ABORT]
    fddi_rx_error = not set                 [From Circuit FDDI_RX_ERROR]
    dest_address_match = set                [Bit 22 of AMA status Reg 1 399]
    dest_internal = not set                 [Bit 13 of AMA status Reg 2 403]
    dest_group_address = not set            [Bit 30 of AMA status word 380]
    dest_port_type = ETHERNET               [From Circuit 752]
    fragment_frame = set                    [From Circuit RBSM_FRAG]
    )
        THEN
            translation code = MC_UNICAST_FDDI_TO_ETHERNET_FRAG

{11}
ELSIF
    (rx_monitor_on = set                    [From Circuit 710]
    fddi_eof = set                          [From Circuit RBSM_UNLOAD]
    fddi_abort = not set                    [From Circuit FDDI_ABORT]
    fddi_rx_error = not set                 [From Circuit FDDI_RX_ERROR]
    dest_address_match = set                [Bit 22 of AMA status Reg 1 399]
    dest_internal = not set                 [Bit 13 of AMA status Reg 2 403]
    dest_group_address = not set            [Bit 30 of AMA status word 380]
    dest_port_type = ETHERNET               [From Circuit 752]
    fragment_frame = not set                [From Circuit RBSM_FRAG]
    )
        THEN
            translation code = MC_UNICAST_FDDI_TO_ETHERNET
```

FIG. 20F

```
{12}
ELSIF
     (rx_monitor_on = set                    [From Circuit 710]
     fddi_eof = set                          [From Circuit RBSM_UNLOAD]
     fddi_abort = not set                    [From Circuit FDDI_ABORT]
     fddi_rx_error = not set                 [From Circuit FDDI_RX_ERROR]
     dest_address_match = not set            [Bit 22 of AMA status
                                             Reg 1 399]
     dest_group_address = not set            [Bit 30 of AMA status word 380]
     )
          THEN
               translation code = MC_UNICAST_DA_UNKNOWN

{13}
ELSIF
     (rx_monitor_on = set                    [From Circuit 710]
     fddi_eof = set                          [From Circuit RBSM_UNLOAD]
     fddi_abort = not set                    [From Circuit FDDI_ABORT]1
     fddi_rx_error = not set                 [From Circuit FDDI_RX_ERROR]
     dest_group_address = set                [Bit 30 of AMA status word 380]
     (dest_address_match = not set OR        [Bit 22 of AMA status
                                             Reg 1 399]
     dest_internal = not set)                [Bit 13 of AMA status
                                             Reg 2 403]
     )
          THEN
               translation code = MC_MULTICAST_FROM_FDDI
```

FIG. 20G

```
{14}
ELSIF
     (tx_monitor_on = set                          [From Circuit 708]
     fddi_eof = set                                [From Circuit RBSM_UNLOAD]
     fddi_abort = not set                          [From Circuit FDDI_ABORT]
     fddi_rx_error = not set                       [From Circuit FDDI_RX_ERROR]
     rx_disable_on = not set                       [From Circuit 706]
     port_blocking_on = not set                    [From Circuit 716]
     src_port_not_forwarding = not set             [From Circuit 720]
     dest_address_match = set                      [Bit 22 of AMA status Reg 1 399]
     dest_internal = not set                       [Bit 13 of AMA status Reg 2 403]
     dest_group_address = not set                  [Bit 30 of AMA status word 380]
     tx_disable_on = not set                       [From Circuit 708]
     dest_port_blocking = not set                  [From Circuit 718]
     dest_port_not_forwarding = not set            [From Circuit 750]
     dest_port_type = ETHERNET                     [From Circuit 752]
     fragment_frame = not set                      [From Circuit RBSM_FRAG
     )
          THEN
               translation code = MC_UNICAST_FDDI_TO_ETHERNET

{15}
ELSIF
     (tx_monitor_on = set                          [From Circuit 710]
     fddi_eof = set                                [From Circuit RBSM_UNLOAD]
     fddi_abort = not set                          [From Circuit FDDI_ABORT]
     fddi_rx_error = not set                       [From Circuit FDDI_RX_ERROR]
     rx_disable_on = not set                       [From Circuit 706]
     port_blocking_on = not set                    [From Circuit 716]
     src_port_not_forwarding = not set             [From Circuit 720]
     dest_address_match = set                      [Bit 22 of AMA status reg  1 399]
```

FIG. 20H

```
    dest_internal = not set                          [Bit 13 of AMA status Reg 2 403
    dest_group_address = not set                     [Bit 30 of AMA status word 380]
    tx_disable_on = not set                          [From Circuit 708]
    dest_port_blocking = not set                     [From Circuit 718]
    dest_port_not_forwarding = not set               [From Circuit 750]
    dest_port_type = ETHERNET                        [From Circuit 752]
    fragment_frame = set                             [From Circuit RBSM_FRAG]
    )
        THEN
            translation code = MC_UNICAST_FDDI_TO_ETHERNET_FRAG

{16}
ELSIF
    (fddi_eof = set                                  [From Circuit RBSM_UNLOAD]
    fddi_abort = not set                             [From Circuit FDDI_ABORT]
    fddi_rx_error = not set                          [From Circuit FDDI_RX_ERROR]
    rx_disable_on = not set                          [From Circuit 706]
    port_blocking_on = not set                       [From Circuit 716]
    src_port_not_forwarding = not set                [From Circuit 720]
    dest_address_match = not set                     [Bit 22 of AMA status Reg 1 399]
    dest_group_address = not set                     [Bit 30 of AMA status word 380]
    positive_forward_enable = not set                [From FPU interface 562]
    any_dest_monitor_on = set                        [From Circuit 746]
    )
        THEN
            translation code = MC_UNICAST_DA_UNKNOWN
```

FIG. 20I

```
{17}
ELSIF
    (fddi_eof = set                                      [From Circuit RBSM_UNLOAD]
    fddi_abort = not set                                 [From Circuit FDDI_ABORT]
    fddi_rx_error = not set                              [From Circuit FDDI_RX_ERROR]
    rx_disable_on = not set                              [From Circuit 706]
    rx_multicast_disable_on = not set                    [From Circuit 714]
    port_blocking_on = not set                           [From Circuit 716]
    src_port_not_forwarding = not set                    [From Circuit 720]
    dest_address_match = set                             [Bit 22 of AMA status Reg 1 399]
    dest_internal = not set                              [Bit 13 of AMA status Reg 2 403]
    dest_group_address = set                             [Bit 30 of AMA status word 380]
    any_dest_multicast_monitor_on = set                  [From Circuit 748]
    )
        THEN
            translation code = MC_UNICAST_FROM_FDDI
{18}
ELSIF
    (fddi_eof = set                                      [From Circuit RBSM_UNLOAD]
    fddi_abort = not set                                 [From Circuit FDDI_ABORT]
    fddi_rx_error = not set                              [From Circuit FDDI_RX_ERROR]
    rx_disable_on = not set                              [From Circuit 706]
    rx_multicast_disable_on = not set                    [From Circuit 714]
    port_blocking_on = not set                           [From Circuit 716]
    src_port_not_forwarding = not set                    [From Circuit 720]
    dest_address_match = not set                         [Bit 22 of AMA status Reg 1 399]
    dest_group_address = set                             [Bit 30 of AMA status word 380]
    any_dest_multicast_monitor_on = set                  [From Circuit 748]
    )
        THEN
            translation code = MC_MULTICAST_FROM_FDDI
{19}
ELSE        translation code = MC_UNICAST_NO_TRANSLATION
```

FIG. 20J

METHOD AND APPARATUS FOR THE CONCURRENT RECEPTION AND TRANSMISSION OF PACKETS IN A COMMUNICATIONS INTERNETWORKING DEVICE

FIELD OF THE INVENTION

The invention relates to communication internetworking devices and specifically to the concurrent reception and retransmission of a data packet by a communications internetworking device.

BACKGROUND OF THE INVENTION

A computer network consists of a number of computers or nodes interconnected by a communications medium. Each network is defined by a predetermined communications protocol by which the nodes communicate. A network protocol determines, among other things, the structure of message packets passed between the nodes of the network. Message packets may be transmitted to a single other node (such a transmission being called a unicast) or may be transmitted to many other nodes (such a transmission being called a multicast).

Typically a network message packet contains a header portion, a trailer portion and a data portion. The header portion includes a source field containing the network address of the source node which transmitted the message and a destination field containing the network address of the destination node to which the message is directed. The trailer portion includes an error checking field such as a cyclic redundancy check (CRC), while the data portion contains the data to be transmitted between the nodes.

Multiple networks using either the same or different protocols may be interconnected by way of a internetworking device, such as bridge or router. When a internetworking device interconnects two or more networks having different protocols the internetworking device is responsible for converting the format of packet, which arrives from a source node operating on a first network using one protocol, to a format which may be transmitted on a network using the different format. A internetworking device thus must examine the arriving packet, determine if a protocol translation is required and, if so perform the conversion prior to transmitting the packet on the second network.

In addition to protocol conversion, the internetworking device must perform other functions such as checking for errors, determining if the packet is to be sent to more than one network, and determining if the connection or the port, corresponding to the destination network, allows the requested transmission to occur. Further, the internetworking device must perform these operations without introducing a significant delay in the transmission of the packet. As network transmission speeds increase, the possibility that a internetworking device will become a "bottleneck", limiting the performance of the networks, becomes significant.

SUMMARY OF THE INVENTION

The invention relates to a method and apparatus for increasing the throughput of a network communications internetworking device by beginning the retransmission of a data packet received by the network communications internetworking device prior to the completed reception of the packet by the network communications internetworking device.

The apparatus makes use of hardware which permits a decision to be made as to how the received data packet should be retransmitted in a rapid enough manner such that the decision is completed prior to the completion of the reception of the data packet. If certain predetermined criteria are met, such as no translation being required, retransmission of the data packet begins immediately.

BRIEF DESCRIPTION OF THE DRAWINGS

FIG. 13 shows illustrative buffers containing a received FDDI packet and Transmit Queue entries associated with multicast transmission of the packet;

FIGS. 16*a–f* shows an embodiment of a pseudocode representation of intermediate logic circuits of the combinatorial logic circuit of the RBSM shown in FIG. 15;

FIGS. 17A–17Z, 18A–18Z, and 19A–19D show an embodiment of a pseudocode representation of the code vector generator for the RBSM shown in FIG. 15;

FIGS. 20A–20J show an embodiment of a pseud)code representation of the monitor translation code logic circuit shown in FIG. 15.

DESCRIPTION OF THE PREFERRED EMBODIMENT

Figure 1:
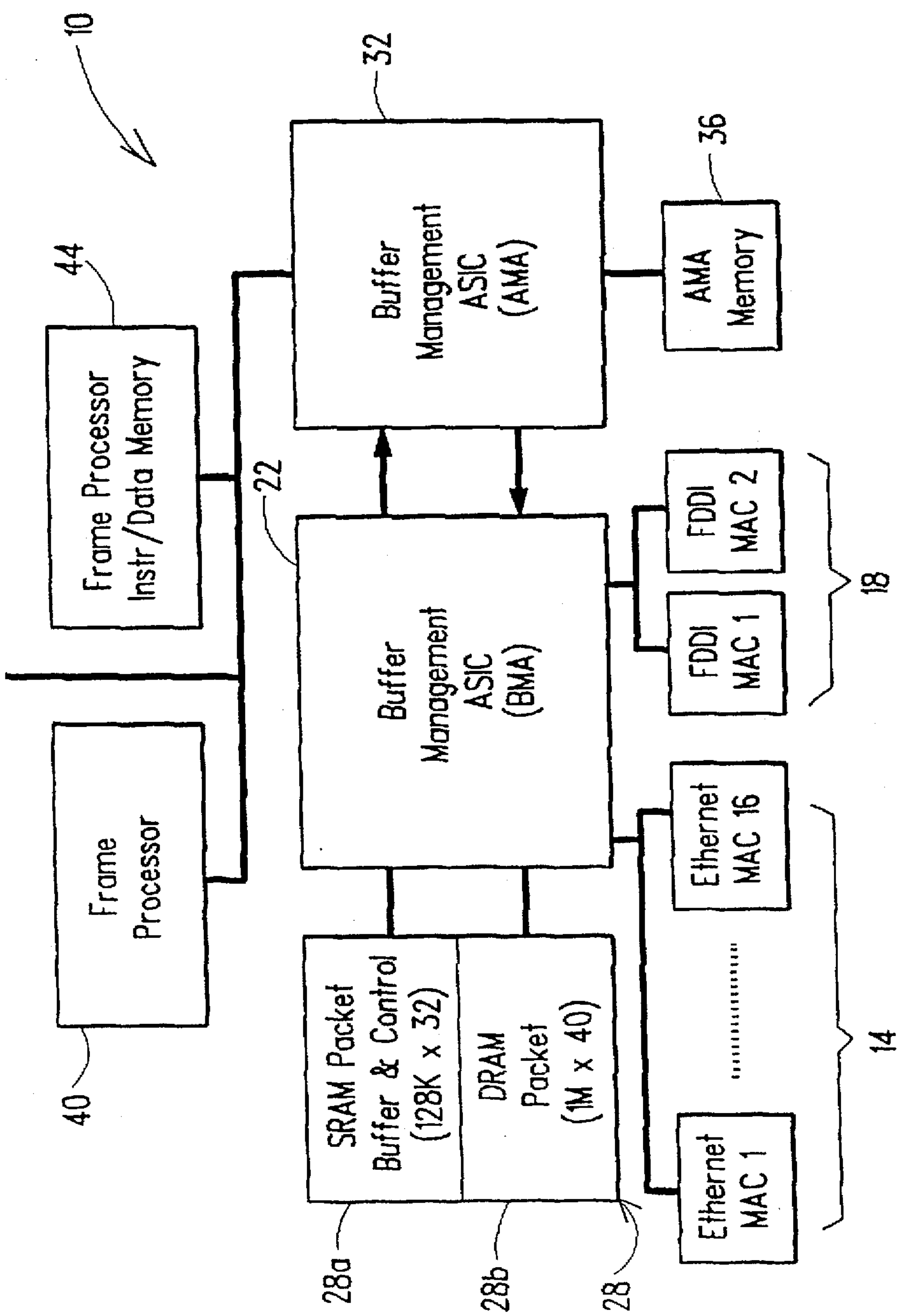
FIG. 1 is a block diagram of an embodiment of an internetworking device in accordance with the invention.

In brief overview and referring to FIG. 1, the presently disclosed internetworking device 10 includes a plurality of Ethernet Media Access Controllers (MACs) 14 (in one embodiment a total of sixteen) and one or more FDDI MACs 18 (in one embodiment a total of two). Each of the MACs provides a port for reception and transmission of data packets (frames) from/to the respective Ethernet or FDDI network (not shown). The network from which a data packet is received is referred to as a source network and the network to which a data packet is transmitted is referred to as a destination network. More specifically, the node attached to a network which from which a packet is received is referred to as a source node and the node to which a packet is transmitted is designated as a destination node. A data packet received from a source network by a MAC 14, 18 is stored in a buffer memory 28 under the control of a Buffer Management ASIC (BMA) 22 as described hereinafter. Illustrative internetworking devices 10 are bridges, or switches, which control packet communication based on data link layer information, and routers which control packet communication based on network layer information.

Figure 2:
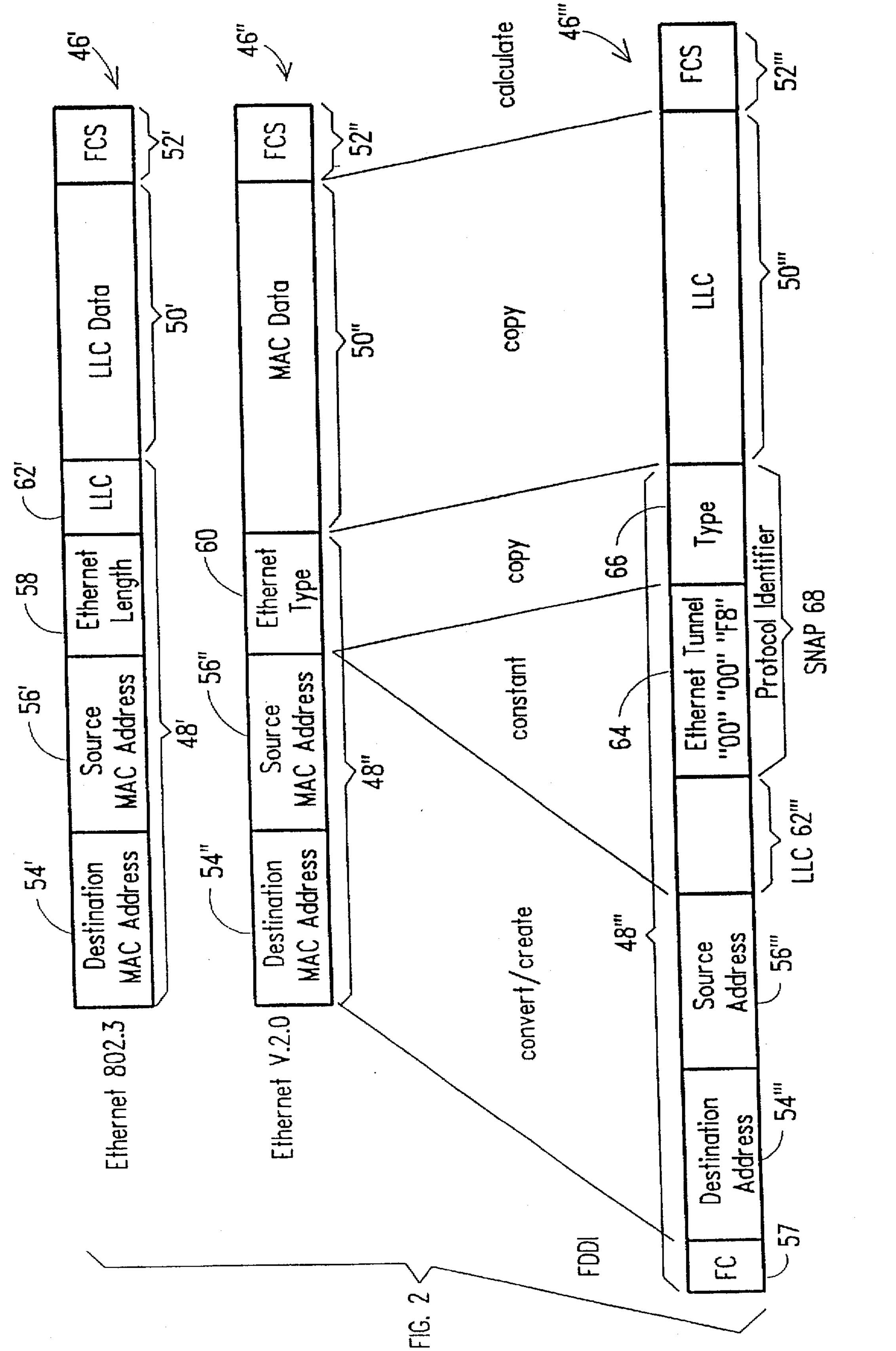
FIG. 2 shows the frame formats associated with Ethernet version 2.0, Ethernet 802.3, and FDDI networks.

Referring also to FIG. 2, the format of data packets (referred to hereinafter generally as 46) associated with an Ethernet 802.3 network (46'), an Ethernet version 2.0 network (46") and an FDDI network (46'"), respectively, is shown. Each of the data packets 46 includes a header portion, or packet header (referred to generally as 48), a data portion (referred to generally as 50), and a trailer portion (referred to generally as 52). More particularly, the Ethernet 802.3 packet 46' has a header 48', data 50' and a trailer 52', the Ethernet version 2.0 packet 46" has a header 48", data 50" and a trailer 52", and the FDDI packet 46'" has a header 48'", data 50'" and a trailer 52'".

The header portion 48 of each of the data packets 46 includes a destination node address (referred to hereinafter generally as 54) and a source node address (referred to hereinafter generally as 56). The packet headers 48 further include network specific information. Specifically, the Ethernet 802.3 packet header 48' additionally includes a length field 58 and an LLC field 62'. The Ethernet version 2.0 packet header 48" additionally includes a type field 60. The FDDI packet header 48'" additionally includes a frame control entry 57, preceding the destination address 54'", an LLC field 62'", an Ethernet tunnel field 64 and a type field 66, following the source address 56'". The FDDI tunnel field 64 and type field 56 are only present in certain instances and are referred to collectively as a SNAP portion 68.

The data portion 50 of the respective frames contains the information to be transferred between the networks. The trailer 52 typically includes an error detection field, such as a Cyclic Redundancy Check (CRC) or Frame Check Sequence (FCS).

The BMA 22 sends the source address 56 and the destination address 54 of the packet 46, as well as other information, to an Address Management ASIC (AMA) 32 and causes the entire data packet 46 to be stored in one or more packet buffers, located in memory 28. The portion of buffer memory 28 used to store the respective packet is associated with the respective MAC 14, 18 receiving the data packet as hereinafter described.

Figure 6:
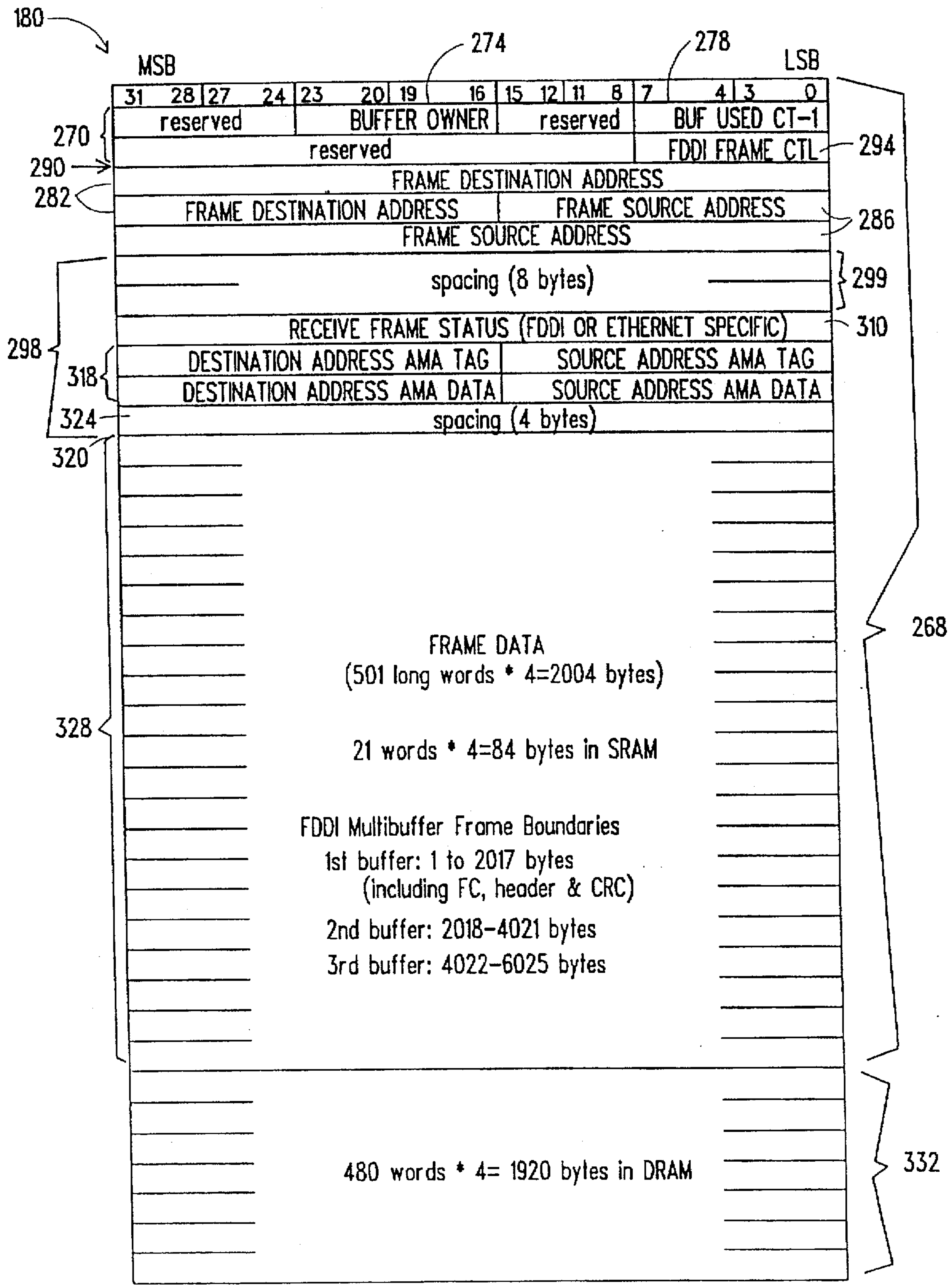
FIG. 6 is illustrative of the format of data stored in the buffer memory of FIG. 4A.

The first 96 bytes of a received Ethernet packet (or the first 97 bytes of a received FDDI packet) are stored in an SRAM portion 28*a* of memory 28 and any remaining bytes of the received packet are stored in a DRAM portion 28*b* of memory 28. After a predetermined number of bytes (which include the destination and source addresses) have been stored in SRAM 28*a*, a gap is "inserted" in the buffer memory 28 between the source address 56 and the remainder of the packet (as shown in FIG. 6 and described in detail below). That is, after the destination and source addresses are stored sequentially, the remaining portion of the received packet is stored beginning at a memory location separated from the last used buffer address so as to create a gap in memory 28. This gap is used by the device 10 to facilitate translation of the header 48 received from a source network when the packet must be reconfigured to a header format compatible with a destination network which differs from the source network, as described in a co-pending patent application entitled "Internetworking Device with Enhanced Packet Header Translation and Memory" (Attorney Docket No. SYNER-105XX) filed on even date herewith and assigned to the Assignee of the present invention and incorporated herein by reference.

The AMA 32 uses the information received from the BMA 22 to attempt to determine to which MAC 14, 18, (referred to also as port) the network associated with the destination node address of the received data packet is attached. The information may also be used by the AMA 32 either to learn of the existence of a source node which is not recognized by the AMA 32 or to determine that the source node of the data packet is an active node whose address should not be removed ("aged") from a table of node addresses located in AMA memory 36 as a result of inactivity.

The AMA 32 determines which MAC 14, 18 or port is to transmit the packet 46 by searching the address table in AMA memory 36. This table contains a list of known node addresses and additionally a designation for the respective MAC 14, 18 corresponding to each node address. The source address 56 is searched in the address table using a binary search technique. Likewise, the destination address 54 is searched in the address table using a binary search technique. The searches are conducted substantially simultaneously by interleaving the source address and destination address searches during alternate clock cycles, as described in a co-pending patent application entitled "Address Management for an Internetworking Device" (Attorney Docket No. SYNER-106XX) filed on even date herewith and assigned to the assignee of the present invention and incorporated herein by reference.

Using information provided by the AMA 32, the BMA 22 generates, within a small number of clock cycles, a code vector which determines whether and how the received stored data packet 46 is to be processed by a frame processor unit (FPU) 40 and transmitted from the device 10, as is described in greater detail in a co-pending patent application entitled "Packet Characterization Using Code Vectors" (Attorney Docket No. SYNER-103XX) filed on even date herewith and assigned to the assignee of the present invention and incorporated herein by reference. For example, in the case where the received data packet 46 has a destination address 54 corresponding to a different type of network than the source network thereby requiring translation of the packet header 48, such as by the insertion of additional header information, a predetermined code vector is generated by the BMA 22. The predetermined code vector instructs the FPU 40 to execute a program stored in a frame processor memory 44 and to write the necessary header information into the gap in the buffer in which the received packet 46 is stored.

Conversely, if the received data packet 46 has a destination address 54 corresponding to the same type of network as the source network (and if certain other criteria are met), then another code vector is generated by the BMA 22. This code vector instructs the FPU 40 to execute code stored in frame processor memory 44 to begin transmitting the packet 46 to the destination address 54 before the packet 46 is entirely received by the device 10. The technique of beginning data transmission prior to the receipt of the entire packet 46 is referred to as cut-through. Cut-through is achieved without manipulation of the stored packet 46 by the FPU 40 as described below.

Thus, the two above-described conditions result in the generation of two different code vectors by the BMA 22. In one embodiment, thirty-one different code vectors may be generated in response to thirty-one different states of the internetworking device 10 and received packet 46.

The code executed by the FPU 40 instructs the BMA 22 to enqueue a Transmit Queue entry on a Transmit Queue, and then instructs the BMA 22 to transmit the packet 46 from the device 10 to the destination address 54. Once the Transmit Queue entry is enqueued, the FPU 40 can continue processing subsequent packets 46. After the data packet is transmitted by the respective MAC 14, 18 associated with the destination address 54, the buffer in which the packet 46 was stored may be returned and reused to store subsequent packets 46.

Figure 3:
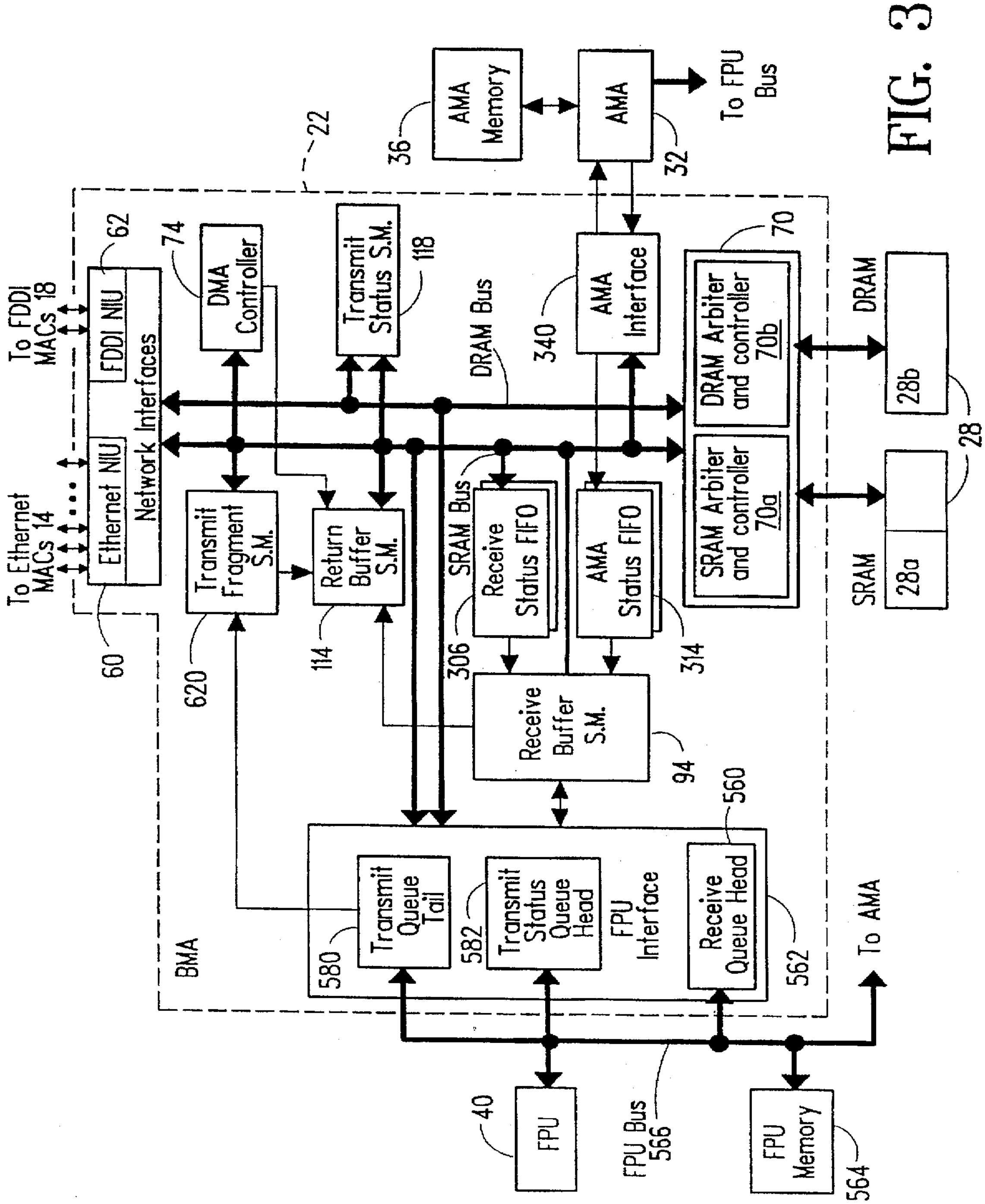
FIG. 3 is a further block diagram of the device of FIG. 1 showing an embodiment of the BMA in greater detail.

Referring to FIG. 3, a packet 46 received at a MAC 14, 18 from a source network is then passed to an associated Network Interface Unit (NIU) 60, 62, respectively. The Ethernet or FDDI NIU 60, 62 sends a request for memory access to a Direct Memory Access (DMA) controller 74. The DMA controller 74 channels the request to one of two arbiters and controllers 70*a*, 70*b* (forming an arbiter and controller pair 70) in accordance with whether the predetermined number of bytes to be stored in SRAM 28*a* have been received. The arbiter pair 70 includes an SRAM arbiter and controller 70*a* and a DRAM arbiter and controller 70*b*, each in communication with a respective portion 28*a*, 28*b* of memory 28. Each arbiter/controller 70*a*, 70*b* grants access to the respective portion of memory 28 and notifies both the DMA controller 74 and the receiving NIU 60, 62 of the grant. The DMA controller 74 provides an address identifying an available buffer in the memory 28 and causes the packet 46 to be transferred from the NIU 60, 62 into the specified buffer.

Figure 4A:
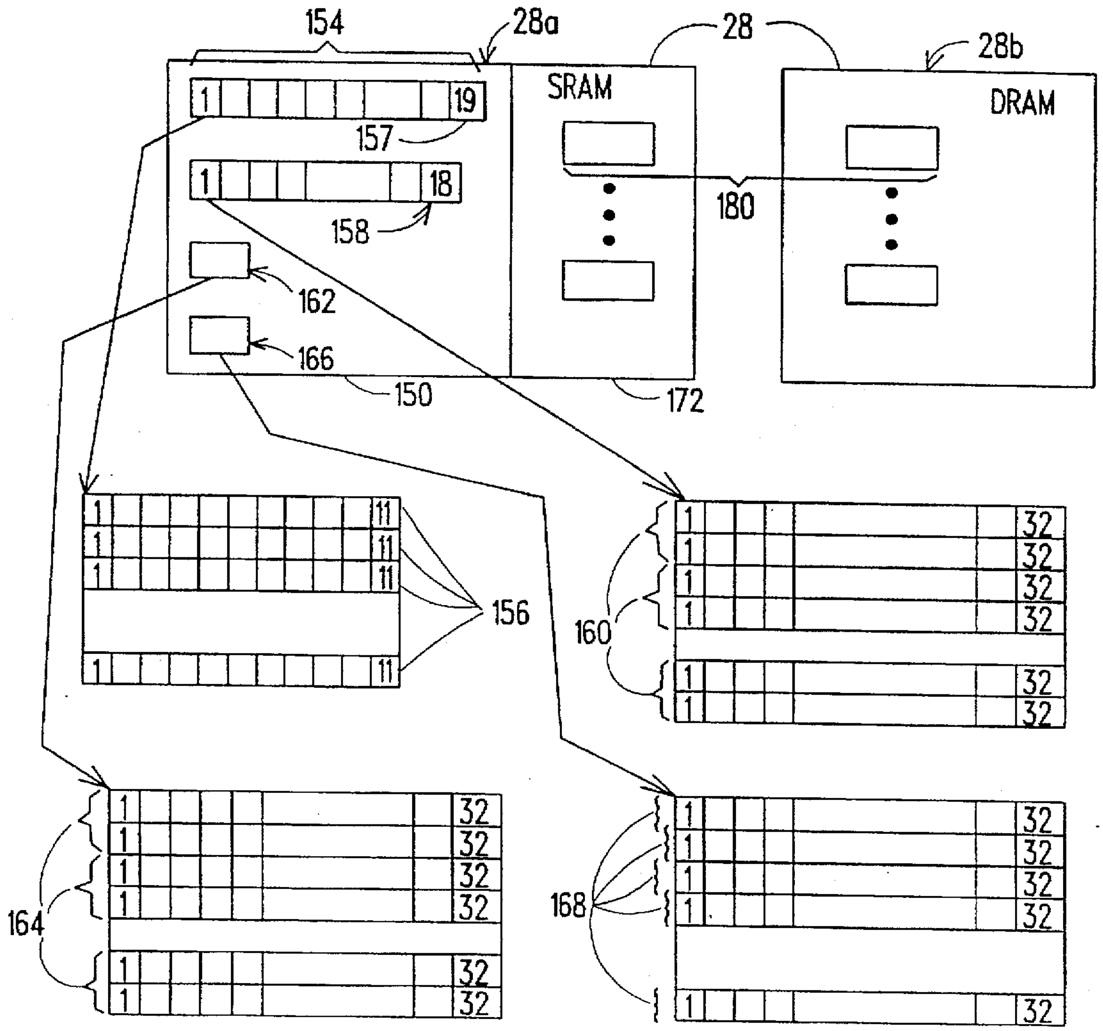
FIG. 4A shows an embodiment of the memory associated with the BMA in FIG. 3.

Referring also to FIG. 4A, the memory 28 includes an SRAM portion 28*a* and a DRAM portion 28*b*, as mentioned above. In one embodiment, the size of the SRAM portion 28*a* is 512KB and the size of the DRAM portion 28*b* is 4MB. Not all of the 4MB DRAM portion is used however, since in the present embodiment the addresses of the SPAM are interleaved with addresses of the DRAM, as described below in conjunction with FIG. 4B. The SRAM 28*a* is divided into a control portion 150, including thirty-nine circular Queues 154, 157, 158, 162 and 166, and a buffer portion 172. The buffer portion 172 of SRAM 28*a* and the DRAM 28*b* provide buffers 180, some of which are assigned at system initialization to the MACs 14, 18. In one embodiment, the buffer portion 172 and DRAM 28*b* are divided into 2048 buffers 180.

Figure 4B:
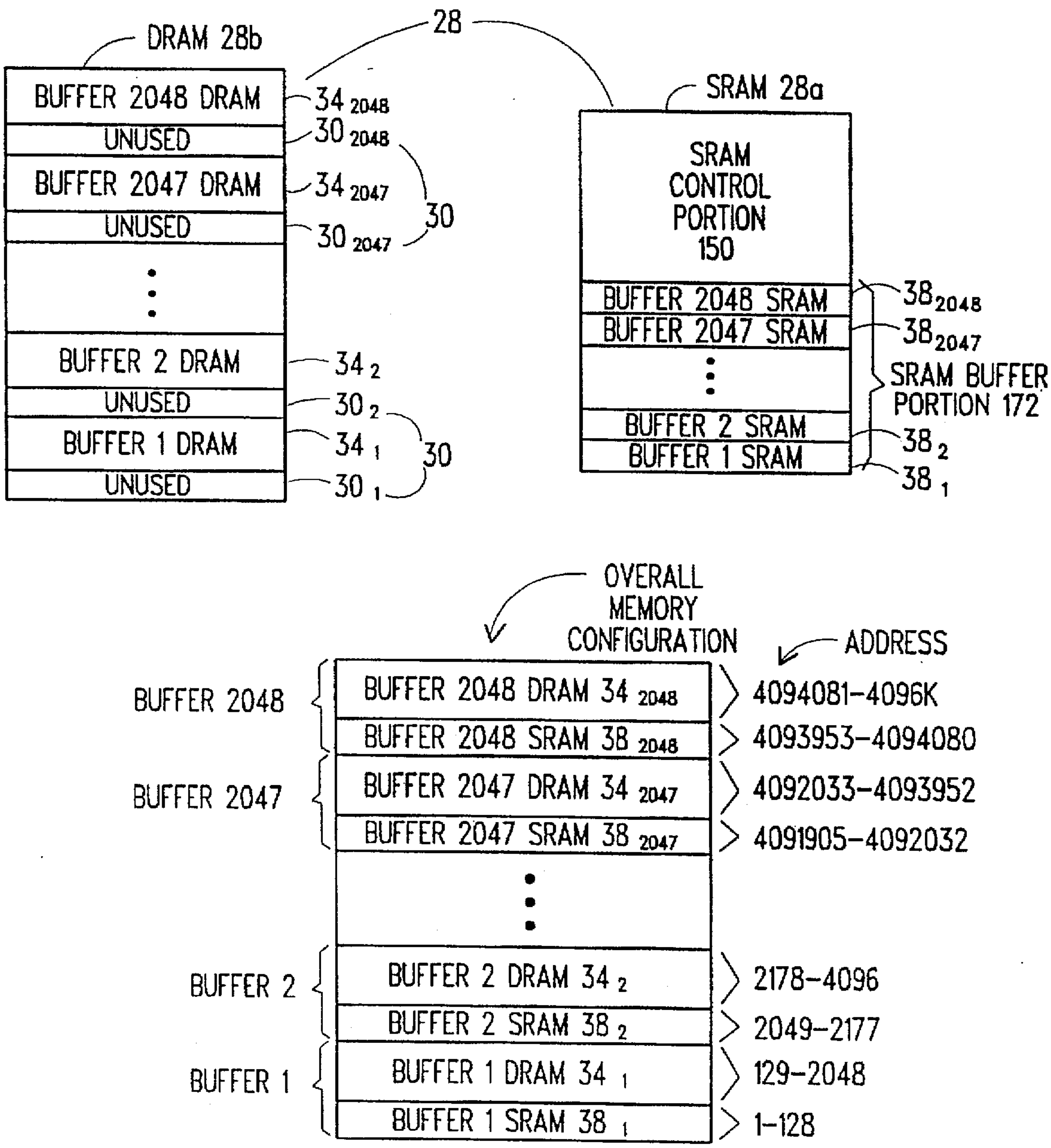
FIG. 4B shows the configuration of the individual SRAM and DRAM memory portions and the overall memory configuration interleaving portions of SRAM and DRAM.

Referring also to FIG. 4B, the configuration of SRAM and DRAM portions 28*a* , 28*b* of memory 28 are shown. As is apparent from the view of DRAM 28*b* in FIG. 4B, unused buffer portions $\mathbf{30}_1$–$\mathbf{30}_{2048}$ are interleaved with portions of DRAM that make up the buffers 180. Specifically, each unused DRAM portion $\mathbf{30}_1$–$\mathbf{30}_{2048}$ is 128 bytes in length and logically precedes a portion of DRAM $\mathbf{34}_1$–$\mathbf{34}_{2048}$ dedicated to a buffer. For example, the first unused block $\mathbf{30}_1$ of DRAM precedes a portion $\mathbf{34}_1$ of DRAM, with the unused portion $\mathbf{30}_1$ and the portion $\mathbf{34}_1$ providing the DRAM of the first buffer. Similarly, the last unused block $\mathbf{30}_{2048}$ of DRAM precedes a portion $\mathbf{34}_{2048}$ of DRAM associated with buffer number 2048. The buffer portion 172 of SRAM 28*a* is divided into 2048 blocks $\mathbf{38}_1$–$\mathbf{38}_{2048}$, each 128 bytes long and associated with a respective one of the 2048 buffers.

Also shown in FIG. 4B is the overall memory configuration achieved by interleaving addresses of the SRAM portion 28*a* with addresses of the DRAM portion 28*b*. More particularly, the overall memory configuration has sequential addresses, which correspond to blocks of SRAM 28*a* interleaved with blocks of DRAM 28*b*. In the illustrative embodiment, the first 128 bytes of memory, at addresses 1–128, correspond to the first 128 bytes of the SRAM buffer portion 172 (i.e., portion $\mathbf{38}_1$). The second block of memory, from addresses 129–2048, corresponds to the DRAM buffer portion $\mathbf{34}_1$. Together the SRAM portion $\mathbf{38}_1$ and the DRAM portion 34, provide buffer 1. The SRAM and DRAM portions $\mathbf{38}_1$–$\mathbf{38}_{2048}$, $\mathbf{34}_1$–$\mathbf{34}_{2048}$ are interleaved in this manner to provide buffers 1 through 2048, as shown in the overall memory configuration of FIG. 4B.

At system initialization, a predetermined number of buffers are assigned to each MAC 14, 18 under program control in a manner described below. Specifically, in one embodiment 64 buffers are assigned to each MAC 14, 18. The remaining buffers 180 are assigned to a common pool of buffers which may be used in the event a MAC 14, 18 has used all of its preassigned buffers. A portion of this common pool can be reserved for use by the FPU 40. In one embodiment, the distribution of such buffers is determined at initialization. In another embodiment of the present invention, the distribution of such buffers between MACs 14, 18 and the common pool of buffers is adjusted actively according to measured network activity. Both are described in greater detail in the co-pending patent application entitled "Method and Apparatus for Internetwork Buffer Management" (Attorney Docket No. SYNER-107XX) filed on even date herewith and assigned to the assignee of the present invention and incorporated herein by reference.

Each buffer 180 includes locations in buffer portion 172 of SRAM 28*a* and locations in DRAM 28*b*, as will be discussed below in conjunction with FIG. 6. The packets 46 are stored in buffers 180 so as to ensure that, in cases where it is necessary for the memory 28 to be accessed for purposes of header translation, it is the SRAM portion 172 of the buffer 180 that is accessed. Since SRAM has shorter access times than DRAM, requiring memory accesses to be to SRAM advantageously reduces header translation time, as will be described.

Referring to the control portion 150 of the SRAM 28*a*, nineteen of the thirty-nine circular queues are referred to as Free Buffer Queues (generally labelled 154, 157); eighteen of the queues are Transmit Queues (generally labelled 158); one queue is a Receive Queue 162 and one queue is a Transmit Status Queue 166 containing transmit status information provided by a Transmit Status State Machine (TSSM) 118 in the BMA 22 shown in FIG. 3.

Each of the Free Buffer Queues 154, 157 contains a list of unused buffers 180. The first eighteen Free Buffer Queues 154 correspond to the eighteen MACs 14, 18 and contain lists of buffers 180 available only to the respective MAC 14, 18. In the illustrative embodiment in which each of the MACs initially has sixty-four unused dedicated buffers, each of the Free Buffer Queues 154 contains sixty-four entries 156. The Free Buffer Queue entries 156 contain the eleven bit address of the respective buffer 180 in memory 28. In the same illustrative embodiment, the eleven bit entries enable addressing 2048 buffers. The nineteenth Free Buffer Queue 157 is a common Free Buffer Queue which lists buffers which may be used by any of the MACs 14, 18 in the event that the supply of buffers originally assigned to the per port Free Buffer Queues 154 is exhausted.

Each of the eighteen Transmit Queues 158 is associated with a corresponding one of the MACs 14, 18 and contains entries corresponding to packet transmissions enqueued by the FPU 40 for processing by the respective MAC 14, 18. More particularly, the Transmit Queues 158 are configurable to between 0 and 1500 entries deep, with each entry 160 comprising two, thirty-two bit words, as shown. In one embodiment, each Transmit Queue 158 is 500 entries deep. The content of the transmit entries 160 will be described further in conjunction with FIGS. 14*a* and 14*b*.

The Receive Queue 162 contains entries 164 corresponding to packets 46 received by the device 10 for processing by the FPU 40. The Receive Queue 162 is configurable to between 0 and 4096 entries deep, with each entry 164 comprising two, thirty-two bit words. In one embodiment, the Receive Queue 162 is 4096 entries deep. The format of the Receive Queue entries 164 will be described below in conjunction with FIGS. 12*a* and 12*b*.

The Transmit Status Queue 166 contains an entry 168 for each packet 46 that has been transmitted from the internetworking device 10 in error. More particularly, the transmit status entries 168 indicate which error(s) occurred in the transmission of the corresponding packet 46 from the device 10. The Transmit Status Queue 166 is configurable to between 0 and 4096 entries deep, and, in one embodiment is 2048 entries deep, with each entry 168 being one, thirty-two bit word.

Figure 5:
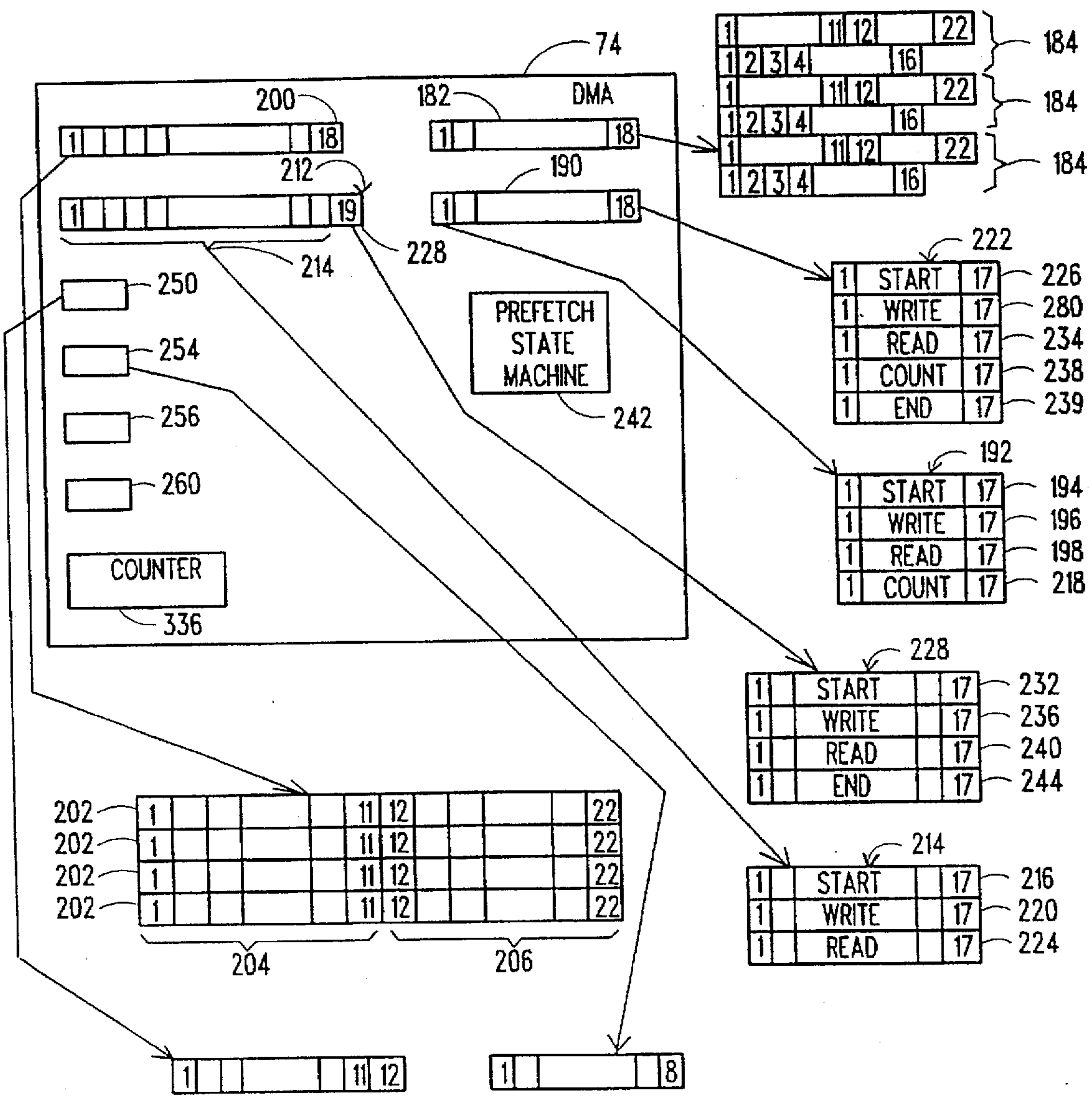
FIG. 5 shows the DMA controller of FIG. 3 in greater detail.

Referring also to FIG. 5, the DMA controller 74 includes eighteen Free Buffer Prefetch Queues 200, corresponding to the eighteen MACs 14, 18. Each queue contains four prefetch entries 202 received from a respective Free Buffer Queue 154 in memory 28. More particularly, the Prefetch Queue entries 202 include the address of buffers available to the respective MAC 14, 18, as will be described. With this arrangement, the DMA controller 74 is able to allocate an incoming packet 46 to a buffer 180 quickly, without having to access the respective Free Buffer Queue 154 in the SRAM control portion 150 (FIG. 4A). Each entry 202 of the Free Buffer Prefetch Queues 200 is twenty-two bits long, with the first eleven bits 204 providing the address of the available buffer and the second eleven bits 206 providing a body offset pointer (i.e., a pointer to the buffer location following the gap). The first eleven bits 204 are taken from the respective Free Buffer Queue 154, and the second eleven bits 206 are taken from a Body Offset Register 260 of the DMA controller 74 (discussed below).

The DMA controller 74 further contains nineteen Free Buffer Queue Control Blocks (QCBs) 212. Each of the nineteen QCBs 212 corresponds to one of the nineteen Free Buffer Queues 154, 157 (FIG. 4A) in the SRAM control portion 150. The QCBs 212 maintain pointers to the Free Buffer Queues 154, 157, with one of the pointers indicating the next available buffer 180 in the respective queues 154, 157 for storing incoming packets 46. Thus, when one of the entries 202 in a Free Buffer Prefetch Queue 200 is used (i.e., is assigned to store an incoming packet 46), the DMA controller 74 prefetches the address of the next available buffer within the respective Free Buffer Queue 154 based upon the current pointers in the respective QCB 212. Alternatively, if there are no available buffers remaining in the respective Free Buffer Queue 154, then the DMA controller 74 prefetches the next available buffer within the common Free Buffer Queue 157. Then, the DMA controller 74 adjusts the pointers in that QCB 212 to reflect the use of the prefetched buffer.

To this end, each of the first eighteen Free Buffer QCBs 214 contains three pointers, a START pointer 216, a WRITE pointer 220, and a READ pointer 224. The nineteenth Free Buffer QCB 228 contains four pointers, a START pointer 232, a WRITE pointer 236, a READ pointer 240, and an END pointer 244. Each of the pointers in the QCBs 212 is seventeen bits long, corresponding to an address in the control portion of SRAM where the Free Buffer Queue 154, 157 resides. While the first eighteen QCBs 214 do not contain END pointers 244, the function of the END pointer 244 (i.e., to indicate when the WRITE pointer 236 and the READ pointer 240 are to loop back to the head of the respective Free Buffer Queue) is provided by the START pointer 216 of the next sequential QCB 214, 228.

At initialization, the START pointer 216, 232 and the WRITE pointer 220, 236 of each QCB 214, 228, respectively, point to the first location in the respective Free Buffer Queue 154, 157, which after initialization contains the address of the first buffer associated with the respective port. The READ pointer 224, 240 indicates the location preceding the location at which the address of the next buffer to be returned after use is written. The END pointer 244, in the nineteenth QCB 228, points to the last buffer in the common Free Buffer Queue 157.

The START pointer 216, 232 is fixed at the first entry in the respective Free Buffer Queue 154, 157. The WRITE pointer 220, 236 is incremented during operation, as buffers in the Free Buffer Queues 154, 157 are assigned to incoming packets 46. The READ pointer 224, 240 is incremented during operation as buffers are returned to their respective Free Buffer Queues 154, 157 after use. The END pointer 244 is fixed at the last buffer in the common Free Buffer Queue 157.

When the WRITE pointer 220, 236 points to the same location as the END pointer 244 (or equivalently, the START pointer 216 of the next sequential QCB 214, 228), the WRITE pointer 220, 236 is incremented to the location of the fixed START pointer 216, 232, so as to cause the WRITE pointer 220, 236 to "loop back" to the beginning of the buffer list, thereby treating this list as a circular queue. Likewise, when the READ pointer 224, 240 points to the same location as the END pointer 244 (or to the START pointer 216 of the next sequential QCB 214), the READ pointer 224, 240 is incremented to the location of the fixed START pointer 216, 232, causing the READ pointer 224, 240 to "loop back" to the beginning of the buffer list.

The transmission components of the DMA controller 74 somewhat mirror the buffer allocation components in that, the DMA controller 74 contains eighteen Transmit Prefetch Queues 182, corresponding to the eighteen MACs 14, 18. Each Transmit Prefetch Queue 182 contains three entries 184. A Transmit Prefetch Queue entry 184 consists of a 22 bit buffer address and a sixteen bit control and length word. The control and length word consists of three control bits and a 13 bit packet length field. The control bits indicate "cut-through", "end of frame" and "do not free buffer". The two words of each Transmit Prefetch Queue entry 184 correspond to an entry 160 (FIGS. 14*a* and 14*b*) in a Transmit Queue 158.

The DMA controller 74 additionally includes eighteen Transmit QCBs 190, each likewise corresponding to one of the eighteen MACs 14, 18. The first seventeen Transmit QCBs 192 contain a COUNT field 218 and three pointers: a START pointer 194, a WRITE pointer 196, and a READ pointer 198. The START, READ, and WRITE pointers are as described above in conjunction with the Free Buffer QCBs 212. The COUNT field 218 maintains a count of transmitted Transmit Queue entries 184. The last Transmit QCB 222 contains five pointers: a START pointer 226, a WRITE pointer 280, a READ pointer 234, and COUNT pointer 238 and an END pointer 239. The END pointer 239 functions as described above in conjunction with the nineteenth Free Buffer QCB 228. Each Transmit QCB pointer is seventeen bits long, corresponding to an address in the control portion of SRAM where the Transmit Queue 158 resides.

When a Free Buffer Prefetch Queue 200 contains less than four entries 202, a Prefetch State Machine 242 prefetches the address of the next available buffer within the respective Free Buffer Queue 154, 157 in response to the pointers in the Free Buffer QCBs 212. Similarly, when a Transmit Queue 182 contains less than three entries 184, the Prefetch State Machine 242 prefetches the next entry within the respective Transmit Queue 158 in response to the Transmit QCBs 190.

In operation and considering illustrative Free Buffer QCB 214, initially, the START and WRITE pointers 216, 220 point to the first location of the respective Free Buffer Queue 154 and the READ pointer 224 points to the last entry in the respective Free Buffer Queue 154. When the associated Free Buffer Prefetch Queue 200 becomes not full the DMA controller 74 reads the address of the buffer pointed to by the WRITE pointer 220 and WRITES it into the next available location in the Free Buffer Prefetch Queue 200. Thereafter, the WRITE pointer is incremented by one.

Conversely, once use of a buffer is completed and the buffer is returned to the respective Free Buffer Queue 154, the address of the buffer to be returned is written into the location of the Free Buffer Queue 154 subsequent to the location pointed to by the READ pointer 224. Thereafter, the READ pointer 224 is incremented by one.

Recall that the Free Buffer Queues 154, 157 contain sixty-four entries 156. However, each of the Free Buffer Queues 154, 157 contains an additional location which is used to indicate whether the Free Buffer Queues 154, 157 are empty or full. When the WRITE pointer 220 and the READ pointer 224 are separated by one queue entry, then the respective Free Buffer Queue 154, 157 is full (i.e., no buffers have been used and all are available). When the WRITE pointer 220 points to the same location as the READ pointer 224, the respective Free Buffer Queue 154, 157 is empty (i.e., there are no more assigned buffers available for receiving incoming packets). When the Prefetch State Machine 242 attempts to "fetch" a buffer and determines that there are no more available buffers assigned to the respective MAC 14, 18, then the Prefetch State Machine looks to the last Free Buffer Prefetch QCB 228 associated with the common Free Buffer Queue 157 to fetch a buffer address.

The DMA controller 74 further includes two registers 250, 254 dedicated to allocating buffers 180 from memory 28 for use by the FPU 40 for network management purposes. The first such register is an FPU Available Buffer register 250 which includes the address of the next available buffer from the common Free Buffer Queue 157 for use by the FPU 40. The FPU Available Buffer register 250 is twelve bits wide. The first eleven bits are buffer address bits. The twelfth bit indicates whether the buffer address in the first eleven bits is available for use. The second such register is an FPU Buffer Reserve Count register 254 which specifies how many buffers 180 are reserved for use by the FPU 40. This number is initialized by the FPU 40.

A Header Offset Register 256 is provided in the DMA controller 74 for each buffer 180 and stores the first address in the respective buffer at which the destination address 54 of the packet header 48 is stored. Similarly, a Body Offset register 260 is provided in the DMA controller 74 for each buffer 180 and stores a pointer to the first location in the respective buffer after the header and gap.

An illustrative packet buffer 180 from one of the Free Buffer Queues 154, 157 is shown in FIG. 6 to have a length of 2048 bytes. The first 128 bytes of the buffer 180 are located in the buffer portion 172 of SRAM 28*a* (FIG. 4A) and provide an SRAM storage area 268 of the buffer 180, while the remaining 1920 bytes of the buffer 180 are located in the DRAM 28*b* and provide a DRAM storage area 332. A first predetermined number of bytes of the buffer 180 (i.e., the control storage area 270) are reserved for buffer control information, including a Buffer Owner field 274 and a Buffer Used Count field 278. In the illustrative embodiment, the control storage area 270 is seven bytes in length.

The Buffer Owner field 274 identifies the Free Buffer Queue 154, 157 in which the buffer 180 is listed. This field 274 is used in the releasing of the buffer 180 after the last transmission of a packet 46 contained therein. Upon initialization, an identifier is written into the Buffer Owner field 274, identifying which of the MACs 14, 18 is assigned the particular buffer 180. With this arrangement, when it is time to return the buffer 180, a Return Buffer State Machine 114 (FIG. 3) can associate the buffer 180 with a particular MAC 14, 18. A value of 0–17 in the Buffer Owner field 274 indicates that the buffer 180 is assigned to a Free Buffer Queue 154 associated with one of the MACs 14, 18. A Buffer Owner field 274 having the value of 255 indicates that the buffer 180 is assigned to the common Free Buffer Queue 157. Buffer Owner field values of 18–253 indicate that the packet buffer 180 is reserved for network port expansion. Finally, a Buffer Owner field 274 with a value of 254 indicates that the packet buffer 180 is permanently allocated to the FPU 40, and is never to be returned.

The Buffer Used Count field 278 is also used in the return of the buffer 180 after the last transmission of a packet stored therein and, specifically, indicates whether the buffer 180 should be returned for reuse. The Buffer Used Count field 278 contains a value indicating the number of times the buffer 180 is to be transmitted before the buffer is returned. The Buffer Used Count field 278 is used primarily for multicast transmissions, where data from a single buffer is transmitted by multiple ports before the buffer is returned, as described below in conjunction with FIG. 13.

The source 56 and destination 54 addresses of the packet header 48 are read into an address header storage area, including a destination address field 282 and a source address field 286 of the buffer 180. In the illustrative embodiment, the address header storage area contains twelve bytes, for storing the six bytes of destination address 54 and the six bytes of source address 56. A configurable header offset pointer 290, stored in the Header Offset Register 256 of the DMA controller 74, defines the starting location of the destination address field 282 within the buffer 180. Thus, the position of the destination 54 and source 56 addresses within the buffer 180 is always the same, regardless of packet type. The header offset pointer 290 is selected so as to leave a one byte location preceding the destination address field 282 (i.e. the FDDI frame control field 294) for storage of a frame control entry 57 (FIG. 2) associated with an FDDI packet 46'''. Thus, in a buffer 180 assigned to an FDDI MAC 18, the frame control entry 57 is stored in the FDDI frame control field 294 preceding the destination address storage field 282.

A predetermined number of bytes of the SRAM storage area 268, following the source address field 286, are reserved for the translation gap 298. This gap 298 is reserved for the addition of translation bytes (i.e., bytes which may be overwritten by the FPU 40 for the purpose of translating the packet 46 from one network format to another). This reserved space within the buffer 180 permits the FPU 40 to perform translation without having to relocate or move either the packet header 48 or data 50 within the buffer 180. In the present embodiment, the translation gap 298 is twenty-four bytes in length.

Figure 9A:
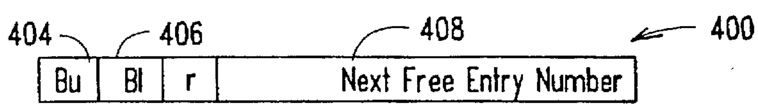
FIGS. 9*a* and 9*b* depict an illustrative data format for the AMA Status FIFO.
Figure 9B:
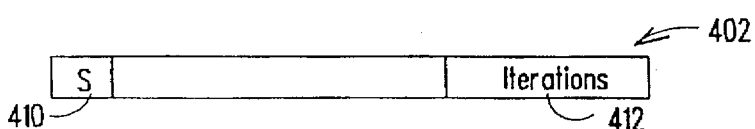
Figure 10A:
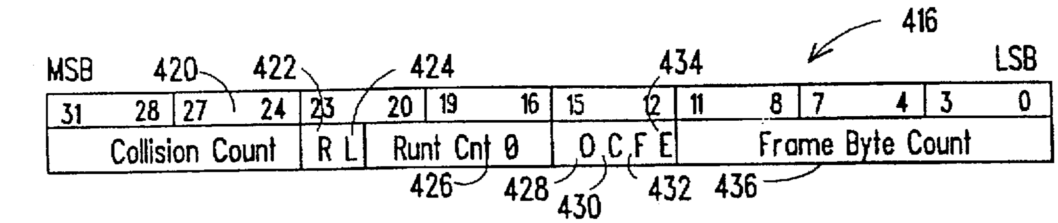
FIGS. 10*a* and 10*b* show an illustrative data format for the Receive Status FIFO (for both the Ethernet and FDDI networks)
Figure 10B:
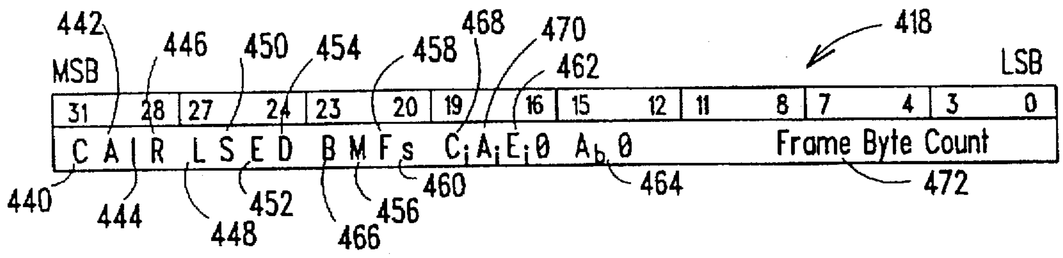

Receive status, provided by a Receive Status FIFO 306 (FIG. 3) and described below in conjunction with FIGS. 10*a* and 10*b*, is temporarily stored in a receive status field 310 of the buffer 180, within the translation gap 298. Information provided by an AMA Status FIFO 314 and described below in conjunction with FIGS. 7–9*b*, is stored in an AMA field 318 of the buffer 180, immediately following the receive status field 310.

A configurable body offset pointer 320 stored in the Body Offset Register 260 in the DMA controller 74 points to a predetermined number of words beyond the AMA field 318. In the buffer 180 shown, the body offset pointer 320 is spaced from the end of the AMA field 318 by four bytes The remainder of the received packet 46, including the data 50, is stored starting in the remainder of the SRAM portion 172, referred to as the after gap storage area 328. If the packet 46 requires more than the eighty-four bytes available in the after gap storage area 328, the remainder of the packet 46 is read into the DRAM storage area 332 of the buffer 180 located in the DRAM portion 28*b* of memory 28.

Upon receiving a packet 46, the DMA controller 74 assigns a buffer 180 to the received packet 46 from the respective Free Buffer Prefetch Queue 200 (FIG. 5). Thereafter, the destination 54 and source 56 addresses of the packet header 48 are written into the destination address field 282 and the source address field 286 of the buffer 180, beginning at the header offset pointer 290. A counter 336 located in the DMA controller 74 (FIG. 5) counts the first twelve bytes of the received packet in the case of an Ethernet source node or the first thirteen bytes in the case of an FDDI source node, based upon the type of port (FDDI or Ethernet) receiving the packet 46.

Once the appropriate count occurs, the DMA controller 74 increments the address in the SRAM storage area 268 to which the packet 46 is being transferred to the body offset pointer 320. In the illustrative embodiment, the SRAM address is incremented by twenty-four bytes, corresponding to an eight byte space 299, the four byte receive status field 310, the eight byte AMA field 318, and a four byte space 324. The remainder of the packet 46 is then written into the buffer 180 starting at the body offset pointer 320. If the packet 46 exceeds the eighty-four bytes available in the after gap storage area 328, then the remainder of the packet 46 is written into the DRAM storage area 332.

The twelve bytes of the received packet 46, which include the source 56 and destination 54 addresses for the packet 46, are written not only to the buffer 180 as described above, but also through an AMA interface 340 (FIG. 3) to the AMA 32. While the packet 46 is being stored in memory 28, the AMA 32 searches the address table in the AMA memory 36 for the source 56 and destination 54 addresses contained in the packet 46.

The FPU 40 issues commands to the AMA 32 and receives command results from the AMA 32 through a direct processor interface. The AMA's response to the FPU's command is reported to the FPU 40 in two, sixteen bit words 400, 402 (FIGS. 9*a* and 9*b*). The highest order bit (Bu) 404 of the first word 400 (FIG. 9*a*) indicates whether the AMA 32 is presently busy and is executing the last issued command. Bit 14 (B1) 406 indicates that the AMA 32 is currently blocked and is copying command data in preparation for executing a command. Bits twelve through zero 408 are the address of the next free entry 344 in the AMA memory 36.

The highest order bit (S) 410 of the second word 402 (FIG. 9*b*) returns the status result of the last command executed by the AMA 32. Whether the bit is set or cleared depends upon the command executed. Bits three through zero 412 specify the maximum number of search iterations which can be performed by the AMA 32 before an error condition is generated. The remaining bits are unspecified.

Figure 7:
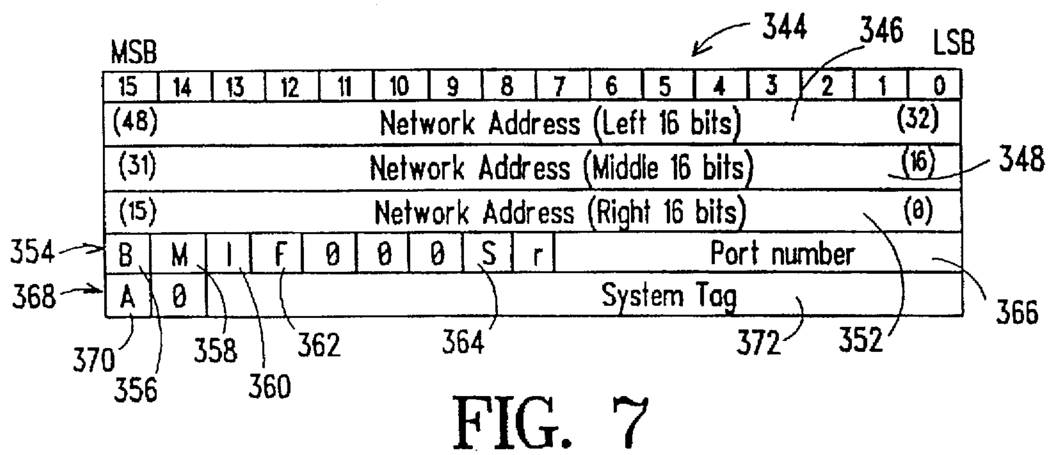
FIG. 7 shows an embodiment of an entry in AMA memory.
Figure 8A:
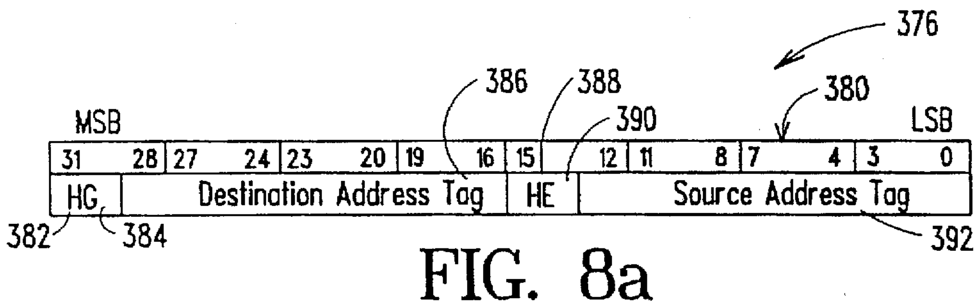
FIGS. 8*a* and 8*b* depict an embodiment of AMA status words.
Figure 8B:
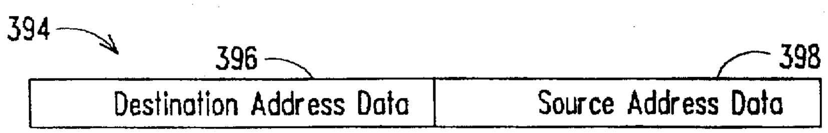

The form of the address table in the AMA memory 36 is shown in FIG. 7. Each entry 344 in the table corresponds to a node known to the AMA 32. The 48 bits of the network address of each node known to the AMA 32 are stored as three, sixteen bit shortwords 346, 348 and 352 beginning each table entry 344. A fourth shortword 354 of the table entry 344 provides various flags and a port number for this particular address. A fifth shortword 368 provides aging information and a system tag.

Specifically, the highest order bit in the fourth shortword 354, designated (B) 356 indicates that this network address is a broadcast address. The next highest bit, designated (M) 358 indicates that this network address is a multicast address. Bit 13, the internal bit (I) 360 indicates that this address belongs to the receiving MAC. If a frame belongs to a receiving MAC, it is either a frame to be routed or a network management frame. Bit 12, the (F) bit 362 indicates that the node's address is associated with an address filter. Filters are used to filter out (i.e., not forward) frames that meet certain criteria. Filters are configurable and the FPU 40 makes filtering decisions on a per frame basis. Bit 8, the static bit (S) 364 indicates that the address is static and was entered by a system manager, rather than being dynamic or learned by the system through packet transfers. Bits six through zero 366 designate the MAC 14, 18 associated with the node having the specified address. All remaining bits are unspecified or reserved.

The fifth shortword 368 of the entry 344 contains fifteen bits, an aging bit (A) 370 and fourteen bits 372 providing a system tag. The aging bit 370 is set whenever the source address 56 of the received packet 46 matches the address entry in the table. The aging bit 370 is periodically cleared by the FPU 40 and, if the bit is not set within a predetermined amount of time, the node address is cleared from the AMA memory 36. Addresses designated as static, by the setting of the static bit 364 (S), cannot be aged from the table. Bits thirteen through zero 372 provide a system tag which is a logical address to the AMA table (as opposed to a physical address). More particularly, a table of logical addresses to the AMA entries is maintained in the SPU's memory 40. This table maintains certain information about the ports, such as filtering information. The reason that the logical address system tag 372 is fourteen bits long (as opposed to the thirteen bits necessary to address each location of the AMA table) is to prevent two AMA table physical addresses from being given the same logical address while the table is being updated, i.e., during the period when one entry is being purged and another added. The remaining bit, bit 14, is unused.

Once the AMA 32 has completed the search of the address table in the AMA memory 36, it returns the information retrieved from the table to the BMA 22 through the AMA interface 340. A Receive Buffer State Machine (RBSM) 94 of the BMA 22 processes this data from the AMA 32 and formats it into two, thirty-two bit words, termed AMA status words 376 shown in FIGS. 8*a* and 8*b*. Bit 31 (H) 382 of the first word 380 (FIG. 8*a*) is a destination hit bit indicating that the packet's destination address 54 was located in the AMA table of addresses. Bit 30 is the group bit (G) 384 indicating that destination address 54 is either a broadcast or a multicast address. Bits twenty-nine through sixteen 386 form a 14 bit identifier used to identify, to the FPU 40, the entry 344 corresponding to the destination address 54. Similarly, bit fifteen is a source hit bit (H) 388 indicating that the packet's source address 56 was located in the AMA table of addresses. Bit fourteen (E) 390 indicates that the port upon which the source address 56 was received is different from the port upon which this address was last learned. Bits thirteen through zero 392 form a fourteen bit identifier used to identify the source memory entry to the FPU 40.

The first 16 bits of the second word 394 (FIG. 8*b*) contain data 396 associated with the destination node, such as the port through which the node with the destination address 54 can be accessed. The last 16 bits contain data 396 associated with the source address including the port upon which the packet is received.

When a packet 46 has been completely received by the BMA 22 the receive status indicated by the MAC 14, 18 is stored in the Receive Status FIFO 306 associated with the MAC 14, 18. The format of entries 416, 418 in the Receive Status FIFO 306 is shown in FIGS. 10*a* and 10*b* for the Ethernet and FDDI networks, respectively.

Specifically, the format for an entry 416 (FIG. 10*a*) in the Receive Status FIFO 306 associated with an Ethernet network is thirty-two bits long and utilizes bits 31 through 24 as a counter 420 indicating the number of collisions detected on the network since the last successfully received packet 46. Bits 23 and 22 (labelled 422 and 424 respectively) are error condition bits indicating that the packet 46 was too short (a runt frame) or too long, respectively. Bits 21 through 17 define a counter 426 which indicates the number of runt frames received since the last successfully received packet. Bits 15 through 12 are error bits which indicate typical Ethernet error conditions, such as: an overrun (O) 428 of a receive FIFO in the Ethernet MAC 14; a collision (C) 430; a framing error (F) 432; or a frame check sequence (FCS) (E) 434. Bits eleven through zero 436 indicate the number of bytes in the received packet 46. Bit 16 is unspecified. Similarly, the format of an entry 418 (FIG. 10*b*) in the Receive Status FIFO 306 associated with an FDDI network is also thirty-two bits long. Bits 31 through 26 indicate that the received packet has characteristics as specified by the frame control entry 57 (FIG. 2). Specifically, bit 31 defines the synchronous class frame bit (C) 440; bit 30 defines the short MAC address frame bit (A) 442 (a received frame error condition); bit 29 is the implementer frame type bit (I) 444 as specified in the frame control field definition of the FDDI ANSI standard; bit 28 is the reserved frame type bit (R) 446; bit 27 is the LLC frame type bit (L) 448 and bit 26 is the SMT/MAC frame type bit (S) 450. Bits 444, 446, 448 and 450 define frame types within FDDI, of which only two (bits 448 and 450) are used for normal data traffic. Bits 25, 24, 22 through 20, 17 and 15 indicate various receive frame errors. Specifically, bit 25 indicates a Frame Check Sequence (FCS) Error (E) 452; bit 24 indicates a data length error (D) 454; bit 22 indicates that a MAC Reset has been issued and is set as a result of a software or hardware reset, or internal errors (M) 456; bit 21 indicates a format error (non-DATA, IDLE or Ending Delimiter Symbol) (F) 458; and bit 20 indicates that an IDLE symbol was received while expecting part of a Protocol Data Unit (PDU) (usually indicating that the PDU was stripped by a previous node on the network) (s) 460; bit 17 (Ei) 462 indicates that the FDDI MAC 28 detected an error on receive and set an "E" bit in the outgoing frame (at the end of the FDDI frame); and bit 15 (Ab) 464 indicates that the received packet 46 was aborted.

Bit 23, the big frame bit (B) 466, indicates that the received packet 46 contained more than 4500 bytes. Bit 19, the ($C_i$) indication bit 468 indicates that a frame copied indication was detected, while bit 18, the ($A_i$) indication bit 470, indicates that an address recognized indication was detected. Finally, bits thirteen through zero 472 indicate the received frame byte count length, including the trailer 52. The remaining bits are unspecified.

Figure 11:
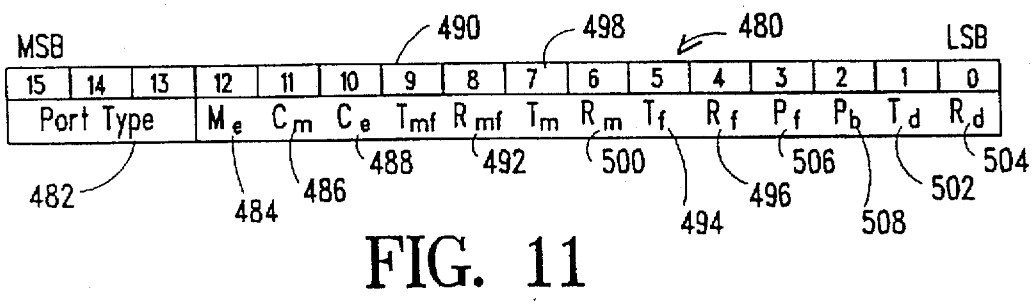
FIG. 11 shows an illustrative data format for the Port Status register of FIG. 3.
Figure 15A:
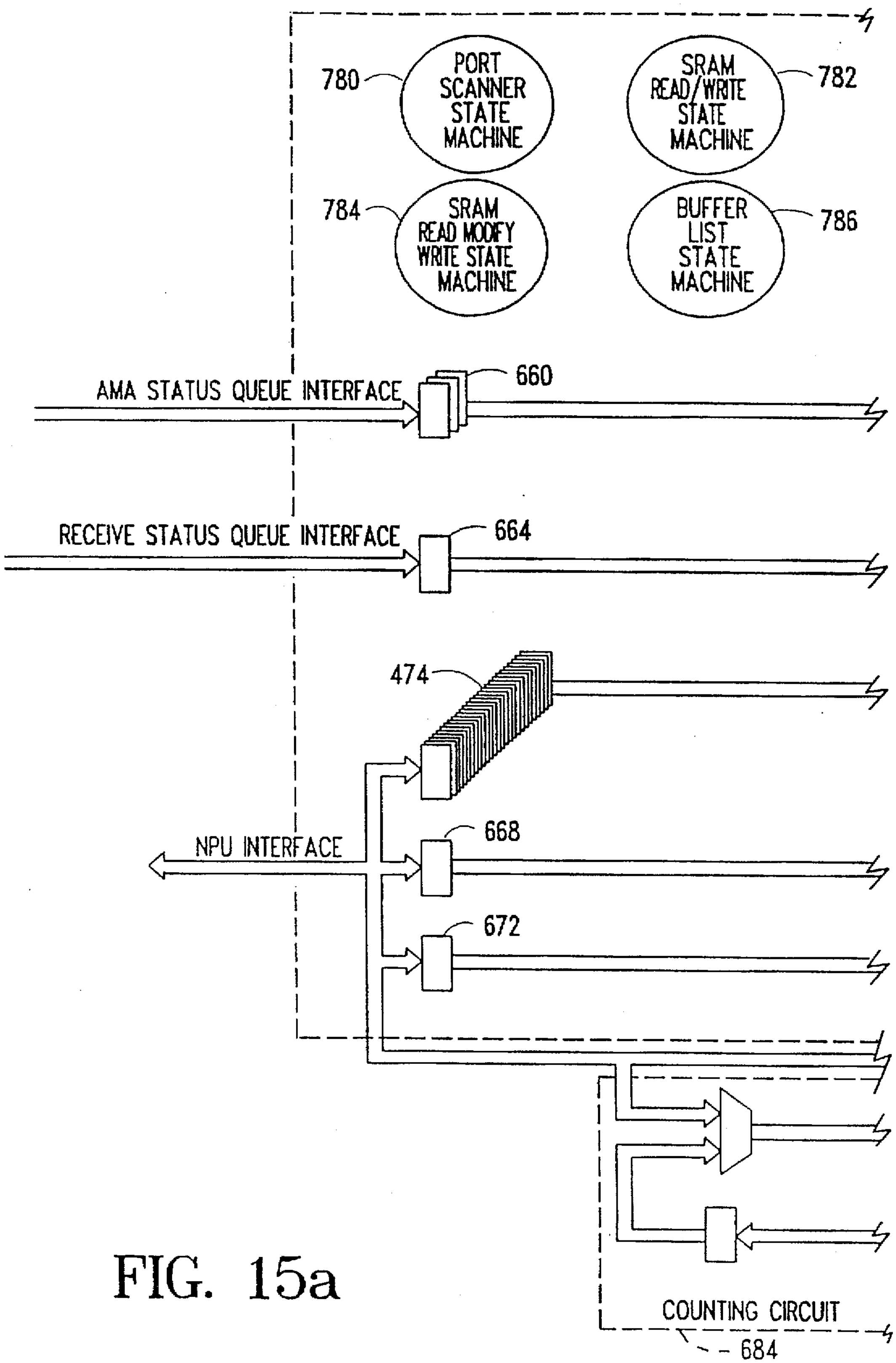
FIGS. 15*a–c* are block diagrams of an embodiment of the RBSM of FIG. 3.

In addition to the Receive Status FIFO 306 (FIG. 3), Port Configuration registers 474 (FIG. 15*a*) located in the RBSM 94 are also associated with each MAC 14, 18 and contain entries having a format shown in FIG. 11 indicating the current configuration for both the receive and transmit data communications paths associated with the MAC 14, 18. The illustrative Port Configuration register word 480 shown in FIG. 11 is sixteen bits long. Bits fifteen through thirteen 482 contain an indication of the type of MAC 14, 18 associated with the Port Configuration register 474. Bit 12, the monitor enable (Me) bit 484 is set if the MAC 14, 18 is being monitored by a remote monitor. In such a case, all packets 46 received and transmitted by the MAC 14, 18 must also be sent to the monitor. Bit 11, the cut-through multicast enable bit ($C_m$) 486, indicates that multicast packets received or sent to this port may undergo cut-through. Similarly, Bit 10, the cut-through enable bit ($C_e$) 488, indicates that unicast packets received from and sent to this port may undergo cut-through. Bits 9, 8, 5 and 4 indicate that a user-defined filter that has been manually assigned to the port is enabled. Specifically, bit nine ($T_{mf}$) 490 indicates a transmit multicast path filter is enabled and should be applied to all multicast packets presented to this port for transmit; bit eight ($R_{mf}$) 492 indicates a receive multicast path filter is enabled and should be applied to all multicast packets received on this port to determine whether or not the multicast packet should be multicasted through the device 10; bit five ($T_f$) 494 indicates a transmit path filter is enabled and should be applied to all packets presented to this port for transmit; and bit four ($R_f$) 496 indicates a receive path filter is enabled and should be applied to all packets received on this port.

Bits 7, 6, 1, and 0 indicate that various paths for this port have been manually disabled at the MAC layer and that all packets presented on this port should be discarded. The setting of these bits causes packets to be discarded by the BMA 22, as contrasted to filtering by the FPU 40. Specifically, bit seven ($T_m$) 498 provides an indication for the transmit multicast path; bit six ($R_m$) 500 provides an indication for the receive multicast path; bit one ($T_d$) 502 provides an indication for the transmit path; and bit zero ($R_d$) 504 provides an indication for the receive path.

Bit three ($P_f$) 506 is used to indicate that the network port is not currently in a "bridge" forwarding state and is not allowed to forward frames. When bit 3 is set, the device 10 can learn addresses from this port, and it must receive and process all network management messages from other internetworking devices. Bit two ($P_b$) 508 is used to indicate that this network port is currently in a "bridge" blocking state and the device 10 is not allowed to forward packet 46 or learn network addresses received on this port, although the device 10 must still receive and process all application messages.

Referring to FIG. 3, the Receive Buffer State Machine (RBSM) 94 polls the Receive Status FIFO 306, the AMA Status FIFO 314 and the Port Configuration Registers 474 to determine how the received packet 46 should be handled.

From this information the RBSM 94 generates a two long word Receive Queue entry 164, which includes a code vector and other information required by the FPU 40 in determining how to process the received packet 46.

Figure 12A:
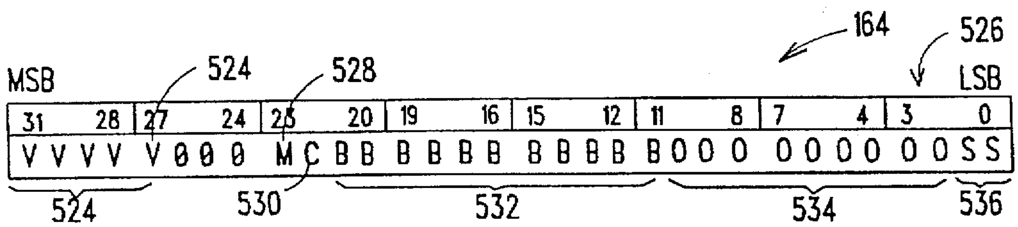
FIGS. 12*a* and 12*b* show an illustrative Receive Queue entry in a Receive Queue.
Figure 12B:
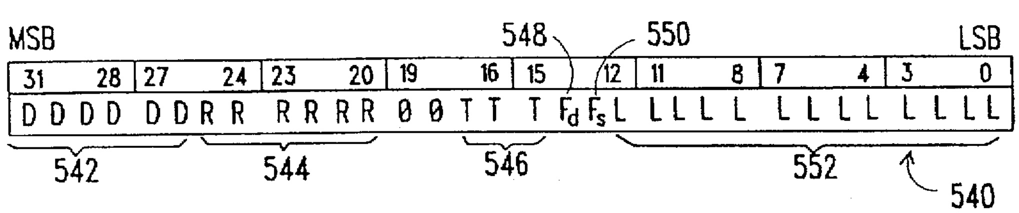

Referring to FIGS. 12*a* and 12*b*, the format of the Receive Queue entry 164 is shown. The five highest order bits thirty-one through twenty-seven 524 of the first word 526 (FIG. 12*a*) of the Receive Queue entry 164 define the code vector which indicates to the FPU 40 which software algorithm should be executed by the FPU 40. Bit twenty-three (M) 528 indicates that the buffer 180 associated with the packet 46 is part of a multi-buffer packet. Bit twenty-two (C) 530 indicates that the packet 46 should be handled as a cut-through packet. Bits twenty-one through eleven 532 indicate which buffer 180 contains the received packet 46. Bits ten through two 534 indicate the body offset pointer 320 (FIG. 6). Finally, bits one and zero 536 identify specific conditions associated with the source address of the received packet 46. The remaining bits are unspecified.

Bits thirty-one through twenty-six 542 of the second word 540 (FIG. 12*b*) of the Receive Queue entry 164, indicate the destination port of the received packet 46, as determined by the AMA 32. Bits twenty-five through twenty 544 indicate the port number on which the packet 46 was actually received. Bits seventeen through fifteen 546 provide a translation code, indicating the specific packet translation processing required to transmit the received packet information to a remote monitor. Bit fourteen ($F_d$) 548 is set if the destination address 54 was found in the AMA memory 36 and if a filter is enabled in the Port Configuration Register for the destination port. Bit thirteen ($F_s$) 550 is set if the source address 56 was found in the AMA memory 36 and if a filter is enabled in the Port Configuration Register for the source port. Finally, bits twelve through zero 552 specify the length (in bytes) of the received packet 46, exclusive of the trailer 52. The remaining bits are unspecified.

Since the packet length can only be known once an entire packet 46 is received, there is no way for a packet undergoing cut-through to have a valid length field entry 552. Thus, for cut-through packets, the length field 552 is set to zero.

Figure 14A:
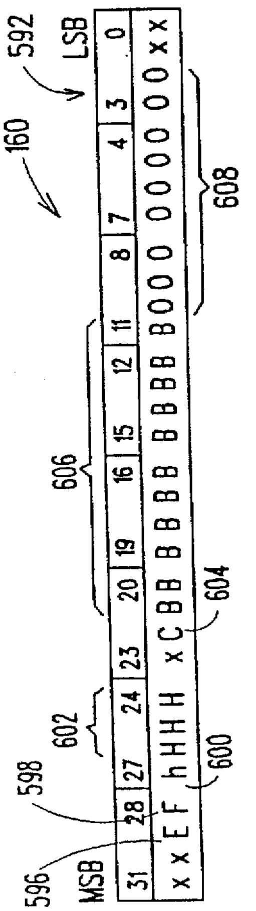
FIGS. 14*a* and 14*b* show an illustrative data format for a Transmit Queue entry in a Transmit Queue.
Figure 14B:
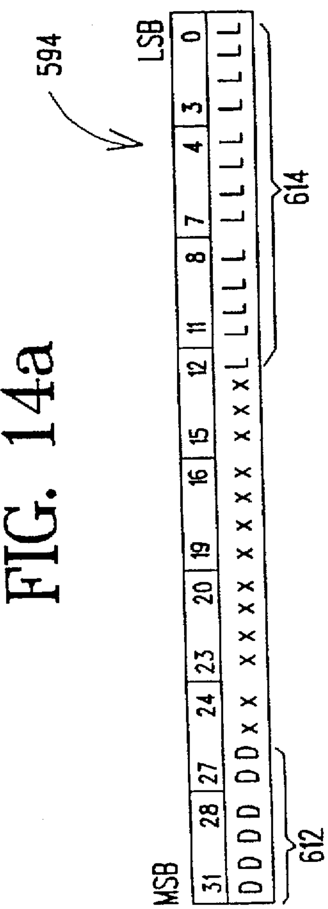

The RBSM 94 (FIG. 3) transfers the Receive Queue entry 164 to the Receive Queue 162 located in the control portion 150 of SRAM 28*a* (FIG. 4A). The RBSM 94 copies entries 164 from the SRAM Receive queue 162 into a Receive Queue Head 560 located in an FPU interface 562. The Receive Queue Head 560 contains one entry that is two words long. The FPU 40 reads an entry from the Receive Queue Head 560 and executes an appropriate algorithm from the frame processor memory 564 in response to the code vector 524 and, if applicable, the translation code 546 contained in the Receive Queue entry 164 for that packet (FIG. 12*a*). When processing requires the FPU 40 to access the packet 46 in the buffer 180, a buffer pointer is used by the FPU 40 to retrieve packet data 50 from the buffer 180. The buffer pointer includes a field specifying the address of the BMA 22, a field specifying the buffer 180 to be accessed and a field specifying the type of buffer access. Illustrative types of buffer access are direct access, in which the FPU 40 reads data from a buffer 180 and processes such data, or request response access in which a read operation is requested, but the FPU bus 566 is available for other data transfer operations and reads the requested data from a register once the data is read from memory. Communication between the FPU 40, the frame processor memory 564, the BMA 22, and the AMA 32 is via the FPU Bus 566. Once the FPU 40 has completed the algorithm invoked by the code vector 524, the FPU 40 enqueues, in a Transmit Queue Tail 580 (FIG. 3), a Transmit Queue entry 160. In one embodiment, the Transmit Queue Tail 580 can contain up to three entries, each two long words in length. The Transmit Queue entry 160 defines the transmission parameters, as shown in FIGS. 14*a* and 14*b*, and includes two, thirty-two bit words 592, 594. Bit 29 (E) 596 of the first word 592 (FIG. 14*a*) is a "not end of frame" bit, which indicates that the data described by the Transmit Queue entry is part of a multi-fragment frame. Subsequent entries in the Transmit Queue Tail 580 define the remaining data for this packet. Bit 28 (F) 598 is a "do not free buffer" bit which is used by the DMA controller 74 to determine whether or not to return the buffer 180. Whether the packet buffer 180 is actually returned depends additionally upon the Buffer Used Count field 278 (FIG. 6), as described below in conjunction with FIG. 13. Bit 27 (h) 600 of the Transmit Queue entry 160 is a "do not prefix header" bit indicating whether or not to prefix the buffer contents starting at the body offset pointer 320 with the buffer contents starting at the header offset pointer 290. Bits twenty-six through twenty-four 602 define a header supplement length field indicating the number of additional bytes (written into the translation gap 298 by the FPU 40) to be transmitted with the buffer contents starting at the header offset pointer 290 as a result of frame translation. A header supplement length field value of zero indicates that no supplemental header bytes are to be transmitted four. In cases where the "do not prefix header" bit 600 is set, the header supplement length field 602 is ignored, since the header portion in the buffer 180 is not to be transmitted.

Bit 22 (C) 604 is a cut-through frame bit indicating whether or not the internetworking device 10 is to begin re-transmitting the received packet 46 prior to the packet being completely received by the device. Bits twenty-one through eleven 606 define a transmit buffer number specifying the number of the buffer 180 containing the packet 46 to be transmitted, while bits ten through two 608 specify the body offset pointer 320. The remaining bits are unspecified.

Bits thirty-one through twenty-six 612 of the second word 594 (FIG. 14*b*) define a destination port field identifying to which of the eighteen MACs 14, 18 the transmission is to be sent. Bits twelve through zero 614 provide a packet length field specifying the number of bytes in the packet 46 to be transmitted. Note, however, the trailer portion 52 (FIG. 2) of the packet 46 is not included in the packet length field 614 since the trailer 52 is added by the transmitting MAC 14, 18. The remaining bits are unspecified.

Referring to FIG. 13, the operation of the Buffer Used Count field 278 (FIG. 6) and the "do not free buffer" bit 598 in the return of buffers 180 for re-use will be described in conjunction with illustrative buffers 180*a*, 180*b* and 180*c*. Buffers 180*a* and 180*b* contain an FDDI frame received by the BMA 22 in the manner described above. Initially, the FDDI header 48''' and a portion 960 of the received FDDI data 50''' are stored in buffer 180*a*. The remaining portion 978 of the received FDDI data 50''' is stored in the second buffer 180*b*, as shown. In the illustrative example, the received packet is intended for multicast transmission to all of the other MACs 14, 18. That is, the received FDDI data 50''' is intended for transmission to the non-receiving one of the two FDDI MACs 18 and to the sixteen Ethernet MACs 14. To this end, the Buffer Used Count field 278*a*, 278*b* of each buffer 180*a*, 180*b*, respectively, is initialized to a value of sixteen (i.e., the number of ports on which the data in the respective buffer is to be transmitted minus one), corresponding to transmission of the data contained in each of the buffers 180*a*, 180*b* by the seventeen other MACs. Buffer 180*c* contains IP headers which are written during the header translation process and from which IP headers are taken when frames are fragmented for transmission, as described below. The Buffer Used Cont 278*c* associated with buffer 180*c* is initialized to a value of fifteen since the IP headers contained therein are used in the fragmented transmission of the received FDDI frame to the sixteen Ethernet MACs only (i.e., buffer 180*c* is not used in the transmission to the other FDDI MAC).

Also shown in FIG. 13 are selected fields with the Transmit Queue entries 160 associated with multicast transmission of the received FDDI packet. Specifically, the destination port/MAC and the buffer identifiers are depicted. Also shown in FIG. 13 are the "not end of frame" bit 596, the "do not free buffer" bit 598, and the "do not prefix header" bit 600. A "not end of frame" bit value of one indicates that the respective entry is not the last transmission of the particular frame. A "do not prefix header" bit value of one indicates that the address header stored in the respective buffer is not to be transmitted with the data specified by the respective Transmit Queue entry 160, because the packet is part of a multi-fragment frame and an IP header from buffer 180*c* is associated with that IP fragment transmission.

The "do not free buffer" bit 598 operates as an enable/disable bit for controlling the counter that decrements the Buffer Used Count 278. A "do not free buffer" bit value of one indicates that the buffer is not a candidate for return to the respective Free Buffer Queue 154, 157 and hence the Buffer Used Count 278 will not be decremented. If the "do not free buffer" bit 598 is zero, then the respective Buffer Used Count 278 may be decremented. The "do not free buffer" bit is zero when the buffer contents are being transmitted by the designated port (i.e., MAC) for the last time.

The first two entries in the Transmit Queue 158 correspond to transmission of the received FDDI packet to the non-receiving FDDI MAC 18. More particularly, the first entry corresponds to transmission of the data 960 from buffer 180*a* to the non-receiving FDDI MAC 18 and the second entry corresponds to transmission of the data 978 from buffer 180*b* to the non-receiving FDDI MAC 18.

In the first entry in the Transmit Queue 158, the "not end of frame" bit 596 is set, indicating that this transmission is not the end of the FDDI frame. The "do not free buffer" bit 598 on the other hand is zero, indicating that the contents of buffer 180*a* are being transmitted for the last time to the particular port, in this case, the non-receiving FDDI port. In response to the "not end of frame" bit 598 being zero, the Buffer Used Count 278*a* of the associated buffer 180*a* is decremented. Thus, after entry 1 in the Transmit Queue 158 is transmitted, the Buffer Used Count 278*a* is decremented to fifteen. Also, the "do not prefix header" bit 600 is zero indicating that the transmission of the data 960 of buffer 180*a* is to be prefixed with the header 48''' stored in buffer 180*a*.

In the second entry in the Transmit Queue 158 associated with transmission of data 978 from buffer 180*b*, the "not end of frame" bit 596 is zero, thereby indicating that this entry corresponds to the end of the particular frame. The "do not free buffer" bit 598 is also zero, indicating that the contents of buffer 180*b* are being transmitted for the last time by the non-receiving FDDI MAC 18. Thus, after entry 2 is transmitted, the Buffer Used Count field 278*b* associated with buffer 180*b* is decremented to a value of fifteen. The "do not prefix header" bit 600 is set, indicating that a header is not to be transmitted from buffer 180*b*..

Once the first and second Transmit Queue entries have been transmitted, the received FDDI packet is transmitted to a first one of the Ethernet MACs 14. The transmission of the received FDDI frame to the first Ethernet MAC 14 is accomplished by the transmission of two IP fragments, since the received FDDI frame is larger than a single Ethernet frame. A first IP frame fragment is transmitted to the first Ethernet MAC 14 by Transmit Queue entries 3, 4 and 5 and includes a first portion 970 of the data 960 stored in buffer 180*a*. A second IP frame fragment is transmitted to the first Ethernet MAC 14 by Transmit Queue entries 6, 7, 8 and 9 and contains the remainder 974 of the data 960 stored in buffer 180*a*, as well as the data 978 from buffer 180*b*..

Entry 3 begins the first IP frame fragment transmitted by the first Ethernet MAC 14 and more specifically corresponds to transmission of the address header stored in buffer 180*a*. More particularly, in entry 3, the "not end of frame" bit 596 is set, indicating that this transmission is not the last of the particular frame and the "do not prefix header" bit 600 is set indicating that the header stored in buffer 180*a* is not to be transmitted. The "do not free buffer" bit 598 is set in this case, thereby disabling the counter that decrements the Buffer Used Count 278*a*, since the contents of buffer 180*a* are not being transmitted to the first Ethernet MAC for the last time.

The fourth entry in Transmit Queue 158 corresponds to the transmission of the first fragment IP header from buffer 180*c*. The "not end of frame" bit 596 is set in entry 4, indicating that this transmission is not the last of the particular frame fragment. The "do not free buffer" frame 598 is set, thereby disabling the counter which decrements the Buffer Used Count 278*c*, since the contents of buffer 180*c* are not being transmitted by the first Ethernet MAC 14 for the last time. The "do not prefix header" frame 600 is also set, indicating that an address header from buffer 180*c* is not to be transmitted.

The transmission of the first IP frame fragment of the received FDDI frame by the first Ethernet MAC 14 is completed with the fifth entry, in which the "not end of frame" bit 596 is not set, indicating that entry 5 represents the end of the first IP frame fragment. The "do not free buffer" bit 598 is set, specifying that the contents of buffer 180*a* are being used for the last time for transmission by the first Ethernet MAC 14 and the "do not prefix header" bit 600 is set, indicating that no address header from buffer 180*a* is to be transmitted with entry 5. Entry 6 begins the second IP frame fragment transmitted by the first Ethernet MAC 14 and more specifically corresponds to transmission of the address header stored in buffer 180*a*. To this end, the "not end of frame" bit 596 is set, since entry 6 does not represent the end of the particular frame fragment. Also, the "do not free buffer bit" 598 is set, thereby disabling the Buffer Used Count counter since buffer 180*a* is not being used for the last time by the first Ethernet MAC 14. Also, the "do not prefix header" bit 600 is set, preventing the address header 48''' stored in buffer 180*a* from being transmitted. Entry 7 corresponds to transmission of an IP header with this second IP frame fragment. Specifically, in entry 7, the "not end of frame" bit 596 is set since this entry is not the last of the particular IP frame fragment. The "do not free buffer" bit is not set, thereby enabling the counter that decrements the Buffer Used Count 278*c* associated with buffer 180*c* to decrement the count to fourteen, since buffer 180*c* is being used for the last time by the first Ethernet MAC. Also, the "do not prefix header" bit 600 is set, indicating that an address header from buffer 180*c* is not to be transmitted. Entry 8 corresponds to the transmission of the rest of the data 974 in buffer 180*a*. More particularly, in entry 8, the "not end of frame" bit 596 is set since this entry does not represent the last entry of the second IP frame fragment. The "do not free buffer" bit 598 is not set, causing the Buffer Used count 278*a* associated with buffer 180*a* to be decremented to fourteen, since buffer 180*a* is being used for the last time in the transmission by the first Ethernet MAC 14. The "do not prefix header" bit 600 is set, thereby preventing the address header 48''' stored in buffer 180*a* from being transmitted with the second IP frame fragment. Entry 9 corresponds to the transmission of the data 978 from buffer 180*b* and is the last entry associated with the second IP frame fragment transmitted by the first Ethernet MAC 14. Thus, the "not end of frame" bit 596 in entry 9 is not set, indicating the end of the frame fragment. The "do not free buffer" bit 598 is not set, thereby permitting the Buffer Used count 278*b* associated with buffer 180*b* to be decremented to fourteen, since this is the last time buffer 180*b* is used by the first Ethernet MAC.

Bits 596, 598 and 600 of entries 10, 11 and 12 are identical to like bits in entries 3, 4 and 5 and correspond to a first IP frame fragment of the received FDDI frame being transmitted by the second Ethernet MAC. Similarly, bits 596, 598 and 600 of entries 13, 14, 15 and 16 are identical to like bits in entries 6, 7, 8 and 9 and correspond to a second IP frame fragment of the received FDDI frame being transmitted by the second Ethernet MAC. In view of the above discussion, it will become apparent that the multicast transmission of the received FDDI packet requires ninety-eight additional entries in the Transmit Queue 158 which are not shown in FIG. 13 but which are identical to entries 3–9, albeit specifying the remaining fourteen Ethernet MACs.

The Transmit Fragment State Machine (TFSM) 620 transfers entries from the Transmit Queue Tail 580 into a Transmit Queue 158, located in the control portion 150 of the SRAM 28*a*, and associated with the destination MAC 14, 18. The Prefetch State Machine 242 of the DMA controller 74 polls each of the Transmit Prefetch Queues 182 to determine whether any such Queues 182 has an empty location. If any of the Transmit Prefetch Queues can accept another entry, then the Prefetch State Machine 242 polls the respective Transmit Queue 158 in accordance with the pointers stored in the respective Transmit QCB 190 and loads the next entry for transmission into the respective Transmit Prefetch Queue 182. Thereafter, the DMA controller 74 sends a request to one of the arbiters 70*a*, 70*b* for permission to access a buffer to transmit the contents thereof to the destination MAC 14, 18 associated with that queue entry. Upon the grant of such a request by the arbiter 70, the packet 46 is transmitted to the destination MAC 14, 18 under the control of the DMA controller 74.

Once the transmission is completed to the destination network, the transmitting MAC 14, 18 provides transmit status information to the TSSM 118 through the NIU 60, 62, including whether any transmission errors were encountered. Transmit status information may be monitored by the FPU 40 via a Transmit Status Queue Head 582 for statistical purposes. The Transmit Status Queue Head 582 works in similar fashion to the Receive Queue Head 560 in providing information to the FPU 40. In this case, only error transmit status from the TSSM 118 is made available to the FPU 40 via the Transmit Status Queue Head 582 for analysis.

After the data described by a Transmit Prefetch Queue Entry has been transmitted by the DMA controller 74, the DMA controller 74 checks to see if the "do not free" bit is set in that entry. If it is, then the DMA controller 74 is done with this transmit operation. If the "do not free" bit is reset, then the DMA controller 74 passes the buffer number from the Transmit Prefetech Queue Entry to the Return Buffer State Machine 114. The Return Buffer State Machine 114 then uses this buffer number to read the Buffer Used Count field 278 of the transmitted buffer 180. If the Buffer Used Count is at a value of zero, then the buffer 180 is returned to the respective Free Buffer Queue 154, 157 for re-use.

Upon return, the buffer's address is stored in the Free Buffer Queue 154, 157 at the location subsequent to the location indicated by the READ pointer 224, 240. Subsequent increments of the WRITE pointer 220, 236 are permitted to point to the returned buffer 180, thereby permitting the returned buffer to be once again fetched by the DMA controller 74 for inclusion in the respective Free Buffer Prefetch Queue 200.

As discussed above, if the received packet 46 has a destination address 54 of a node on a network of the same type as the source network, and if certain other criteria are met, then the RBSM 94 does not wait for the Receive Status FIFO 306 information before enqueueing the Receive Queue entry 164 (FIGS. 11*a* and 11*b*). In such a case, the packet 46 is enqueued by the FPU 40 in the Transmit Queue Tail 580 prior to the packet 46 being completely received and stored in the buffer 180.

Alternatively, it may be determined by the RBSM 94 that a received packet should not be transmitted by the device 10. In this case, the RBSM 94 provides the buffer number to the Return Buffer state machine 114, and the previously described process for returning the packet receiving buffer 180 to the Free Buffer Queue 154, 157 is repeated.

In more detail, code vector generation occurs in the RBSM 94 portion of the BMA 22. Code vector generation begins with the RBSM 94 examining certain characteristics of the received data packet as indicated in the Receive Status FIFO 306 (for example whether the data packet has been damaged due to buffer overrun) and the AMA Status FIFO 314 (for example whether the source and destination addresses of the packet are known to the AMA 32) in addition to certain characteristics of the transmit and receive ports of the internetworking device as indicated by the Port Configuration Registers 474 (for example whether the port has filtering enabled).

From this information the RBSM 94 generates, within approximately 20 clock cycles, one of a predetermined number of code vectors (in one embodiment thirty two possible vectors) Table 1. The code vector instructs the FPU 40 as to which algorithm from FPU memory 564 the FPU 40 should execute in transmitting the data packet 46 to the correct network port.

By using hardware, in one embodiment an application specific integrated circuit (ASIC), to generate the code vector, a significant amount of time is saved over the previously used method of having the FPU 40 examine the FIFOs and registers and making such a determination in software. Using such a system permits data packets 46 which need minimal processing (such as cut-through frames) to be dealt with using limited algorithms. Conversely, data packets 46 requiring extensive processing (such as those requiring exception processing) can be dealt with by extensive exception routines. By permitting specific algorithms to match specific data packet requirements, the algorithms used by the internetworking device need no longer be exhaustive code paths, burdened by worst-case data packet contingencies.

Figure 15B:
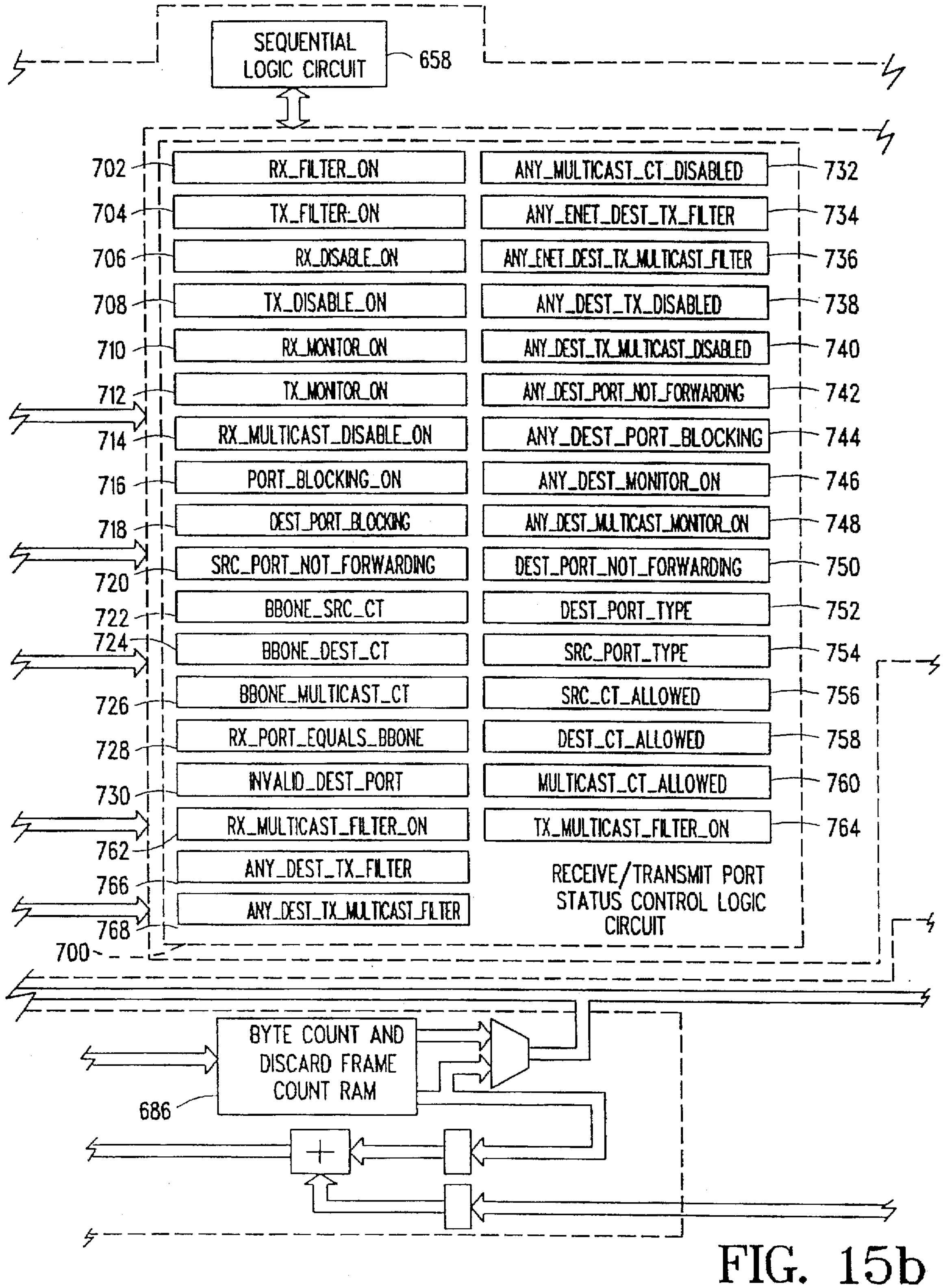
Figure 15C:
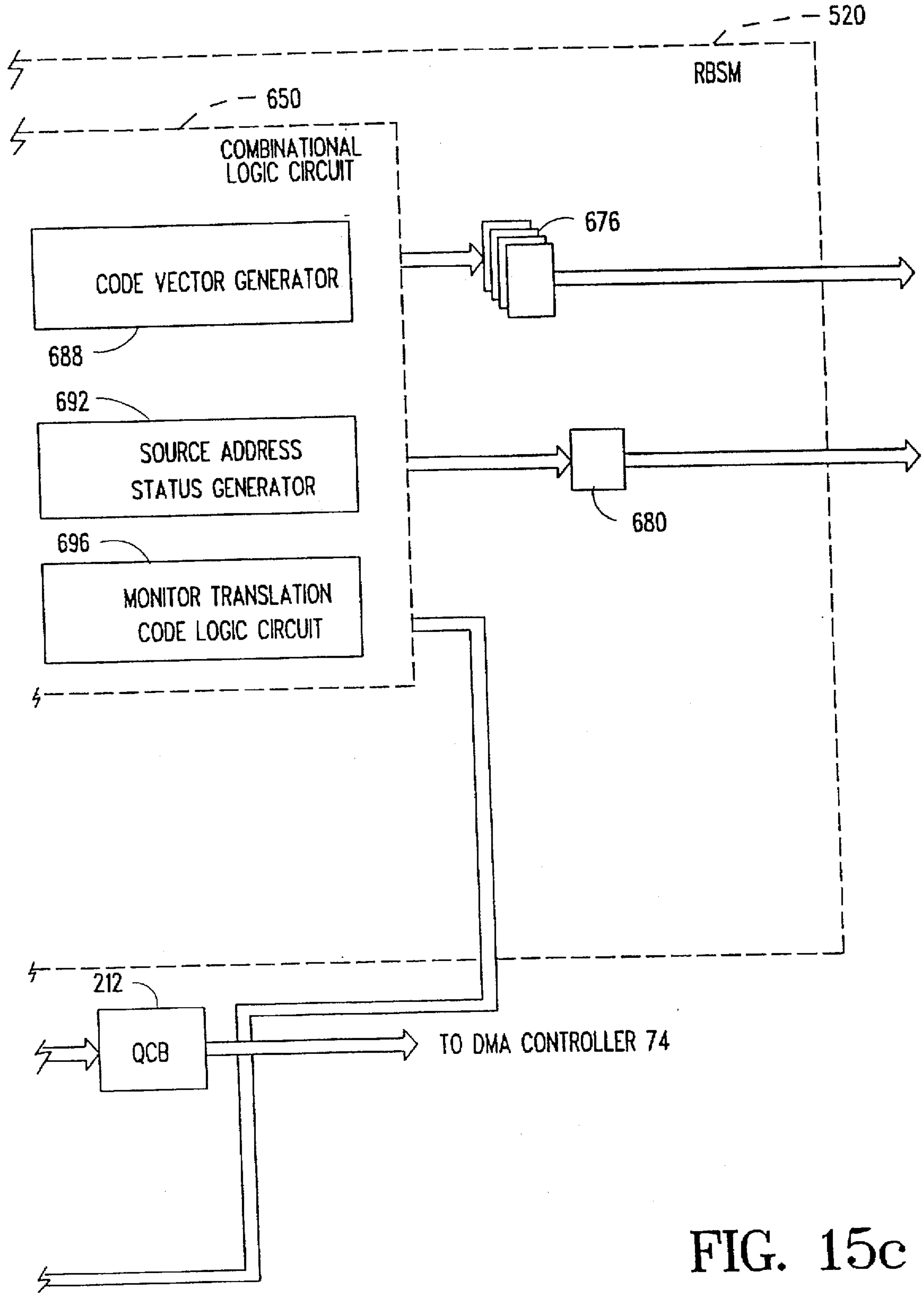
Figure 21A:
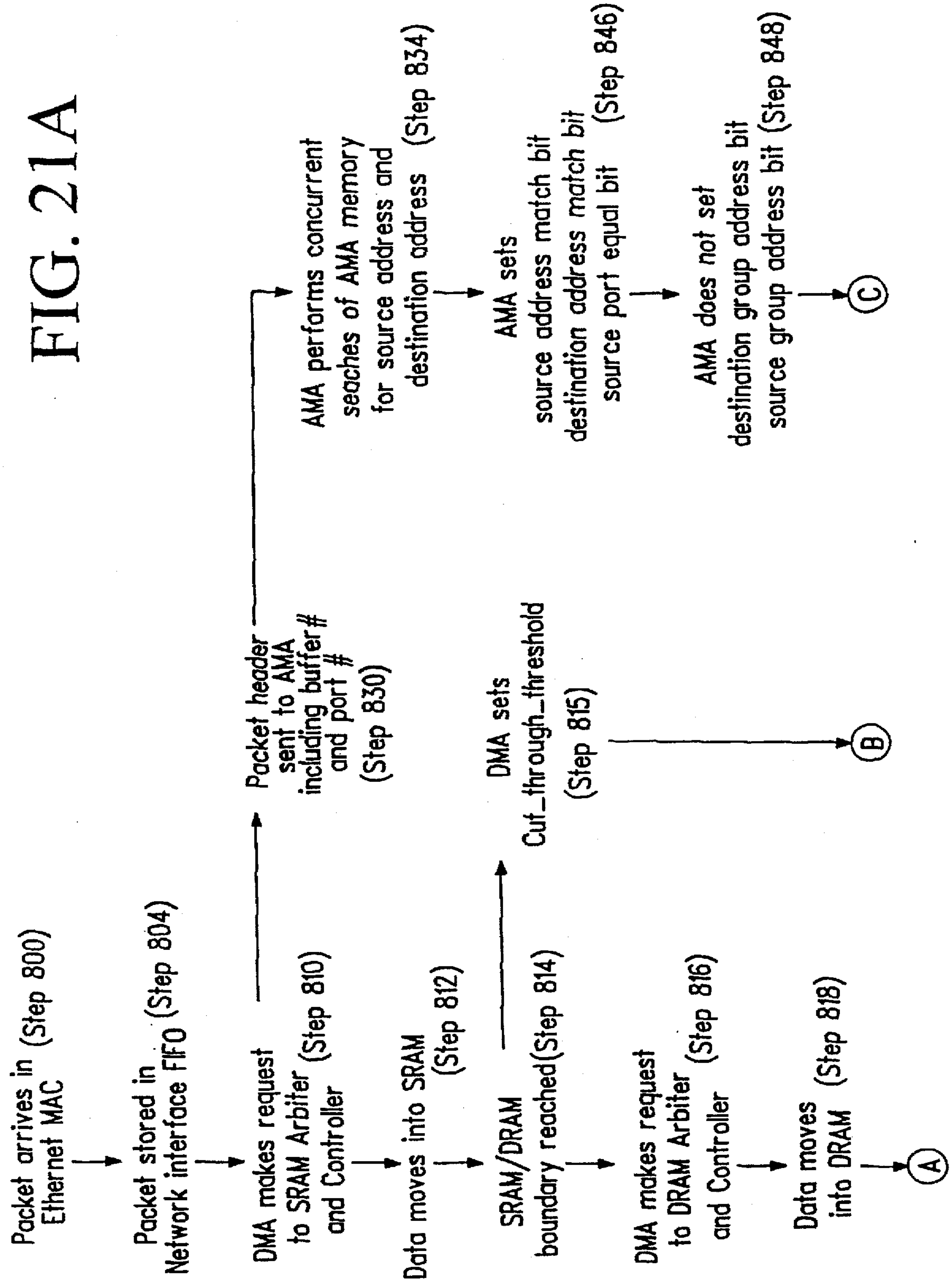
FIGS. 21A–21C depict a flow diagram of a data packet undergoing cut-through according to the present invention.
Figure 21B:
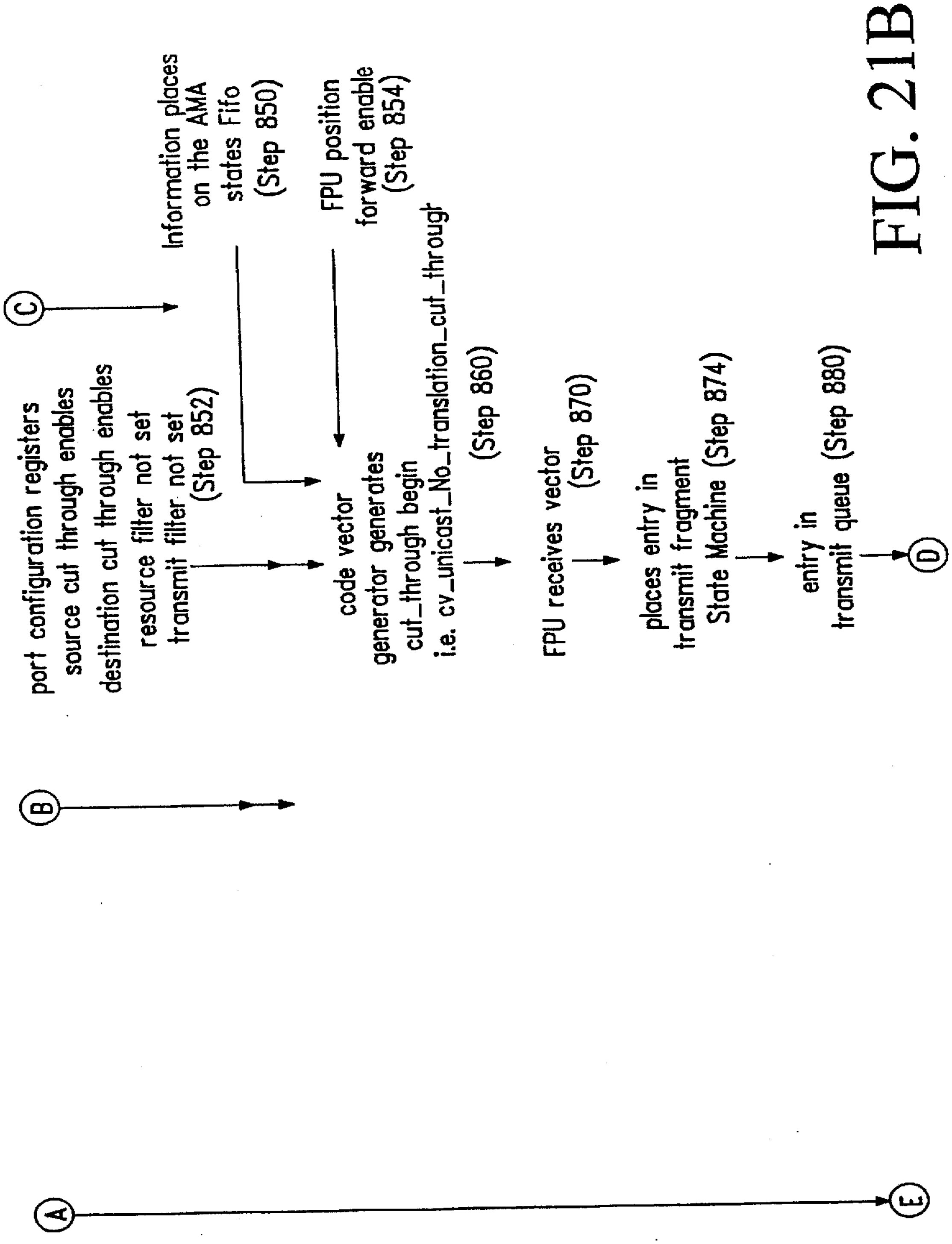
Figure 21C:
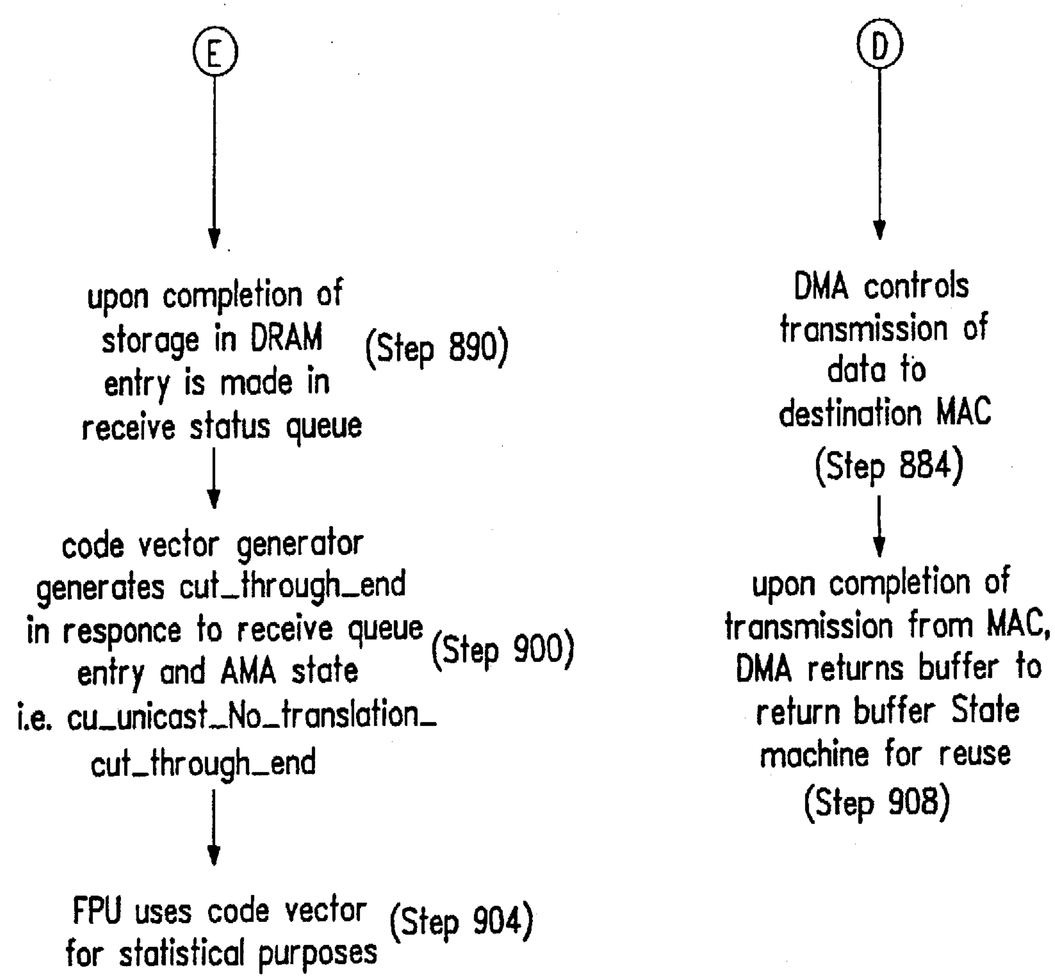

Referring to FIGS. 15 *a–c*, although in one embodiment the RBSM 94 is, in actuality, a single ASIC, for the purposes of explanation, the RBSM 94 may be considered to include combinatorial logic 650, sequential logic 658, a plurality of state machines 780, 782, 784, 786 and a plurality of internal registers 660, 664, 474, 668, 672, 676, 680 which will be described in more detail below. The combinatorial logic 650 of the RBSM 94 generates, for each received packet 46, a Receive Queue entry 164 in response to the AMA Status FIFO 314, the receive status word 416, 418 in the Receive Status FIFO 306, and the Port Configuration word 480 in the Port Configuration register 474.

The RBSM 94 includes an AMA Status register 660 for storing the AMA status information received by the RBSM 94 from the AMA Status FIFO 314, a Receive Status register 664 for storing the receive status word 416, 418 received from the Receive Status FIFO 306, and Port configuration registers 474, which store configuration information regarding the ports, such as whether a filter is applied to the port or whether a port is enabled for cutthrough.

Additionally, the RBSM 94 includes a Backbone Port register 668 which stores the port number associated with a network which has been designated as the backbone network for the purpose of positive forwarding. Positive forwarding is a feature whereby an incoming packet having a network address which is unknown to the AMA 32 is transmitted only to the designated backbone port. In this way, all the addresses in a network with a large number of nodes need not be stored by the AMA, since the backbone port is treated as a default port when the port corresponding to the destination address of a data packet is unknown.

The RBSM 94 also includes a Frame Fragment register 672, which stores the packet length above which an incoming packet is segmented into multiple packets for storage and transmission. This may occur, for example, if an FDDI packet 46''' having a length greater than 1518 bytes is to be transmitted to an Ethernet MAC 14 having a maximum Ethernet packet length of 1518 bytes.

The Port Configuration registers 474, the Backbone Port register 668, and the Frame Fragment register 672 are all loaded by the FPU 40 at system initialization. The RBSM 94 polls the AMA Status FIFOs 314, to determine if the status needs to be moved from the FIFOs 314 into registers 660. The combinatorial logic 650 then uses the status information loaded into the registers 660 to generate the code vector.

The Receive Queue entry 164, generated by the combinatorial logic 650 for each packet 46, is stored in an RBSM pipeline register 676 prior to being enqueued in the Receive Queue 162. A Buffer Number register 680 is used to store the address in memory of a buffer 180 which contains a packet 46 having a destination address on the same network as the source address. This address is provided to the Return Buffer state machine 114 for release of the buffer to its Free Buffer queue 154, for reuse.

The RBSM 94 additionally includes four state machines 780, 782, 784, 786 which control the operation of the RBSM 94. State machine 780 is a port scanner state machine which is used to determine if any of the ports have AMA status information and receive status information in the AMA Status FIFO 314 or Receive Status FIFO 306. If status is available, the state machine 780 will move the status from the FIFOs 314, 306 into registers 660, 664 so that the combinatorial logic 650 can process the information. The SRAM READ/WRITE state machine 782 is used to move the AMA status information from the AMA Status FIFO 314 and the Receive Queue entry 164 from the RBSM pipeline register 676 into SRAM, and to move the Receive Queue entry 164 from SRAM 28 into the receive head queue 562.

The SRAM Read Modify Write State Machine 784 is used to update receive frame byte counts and discard frame counts which are stored in the byte count and discard frame count RAM 686. A Buffer List State Machine 786 provides the number of a buffer 180 which is to be released for reuse, that is, it provides the buffer number to the Return Buffer State machine 114.

The Sequential Logic circuit 658 stores the state of each port 14, 18 and, with information from the Port Scanner state machine 780, synchronizes the polling of the registers 660, 664, 474, 668, 672 by the Combinatorial Logic circuit 650, so that at any given time the Combinatorial Logic circuit 650 processes the information associated with a single packet 46.

Again, for the purposes of discussion, the Combinatorial Logic circuit 650 can be characterized as including a number of individual circuits including a Code Vector generator 688, a Source Address Status generator 692, a Monitor Translation Code Logic circuit 696 and a Receive/Transmit Port Status Control Logic circuit ("Control Logic circuit") 700. In actuality however, the Combinatorial Logic circuit 650 is a network of logic gates within the BMA 22 generated using a hardware descriptor language. In one embodiment, the hardware descriptor language is VHDL. The C-language pseudocode and the VHDL descriptor code generated from the C-language pseudocode used to produce the Combinatorial Logic circuit 650, the Code Vector generator 688 and the Monitor Translation Code logic circuit 696 are provided in Appendices A1 and A2, respectively.

Briefly, the Code Vector generator 688 generates code vectors (bits thirty-one through twenty-seven 524 in the first word 526 of the Receive Queue entry 164) in response to input signals from the Control Logic circuit 700. The Source Address Status generator provides bits 1 and 0 (536) in the first word (526) of the Receive Queue entry 164 which indicate whether the source address was found in the table in AMA memory 36, whether the receive port is the same as the port upon which the source address was originally learned and whether the source address is a group address or a unicast address.

The Monitor Translation Code Logic circuit 696 provides bits seventeen through fifteen 546 in the second word 540 in the Receive Queue entry 164. These bits are used by the code vector generator 688 when a translation code vector for a source monitor (CV_MONITOR_SOURCE (vector 29)) or a destination monitor (CV_MONITOR_DESTINATION (vector 30)) is required. The monitor translation code indicates to the FPU 40 whether or not packet translation is required to send the received packet to the remote monitor.

The Control Logic circuit 700 is shown, again only for ease of discussion, to include thirty-four individual logic circuits 702–768, each providing a single output signal. Also, for the purposes of discussion the same name is used to designate both the particular logic circuit and the signal which the circuit generates. Each logic circuit 702–768 receives input from one or more registers 474, 660, 664, 668, 672 and produces an output signal in response thereto.

First considering each circuit which is responsive to a bit set in the Port Configuration word 480 in the Port Configuration register 474, the RX_FILTER_ON logic circuit 702 and the TX_FILTER_ON logic circuit 704 each provide a signal indicating whether a filter is to be applied to the receive port and the transmit port, respectively. Such signals are generated in response to the setting of bit four 496 and bit five 494, respectively, of the Port Configuration word 480. Similarly, the RX_DISABLE_ON logic circuit 706 and TX_DISABLE_ON logic circuit 708 each provide a signal indicating whether the respective transmit and receive paths are disabled in response to the setting of bits zero 504 and one 502, respectively, of the Port Configuration word 480. The RX_MONITOR_ON logic circuit 710 and the TX_MONITOR_ON logic circuit 712 are both responsive to bit twelve 484 of the Port Configuration word 480 to provide output signals indicative of whether remote monitoring is enabled for the respective port.

The RX_MULTICAST_DISABLE_ON logic circuit 714 is responsive to bit six 500 of the Port Configuration word 480 to generate a signal indicating whether the receive port is receptive to multicast transmissions, while the PORT_BLOCKING_ON logic circuit 716 generates a signal indicating whether the port being processed is in the blocking state. The PORT_BLOCKING_ON signal is generated in response to bit two 508 of the Port Configuration word 480. Likewise, the DEST_PORT_BLOCKING logic circuit 718 provides an output signal indicating whether port blocking is on for the destination port. The DEST_PORT_BLOCKING signal is generated in response to bit two 508 of the Port Configuration word 480 for the destination port. The DEST_PORT_FORWARDING logic circuit 750 is responsive to bit three 506 of the Port Configuration word 480 contained in the Port Configuration register 474 for the destination ports to indicate that the respective port is not forwarding, as described above. The RX_MULTICAST_FILTER_ON logic circuit 762 indicates that the receive multicast filter bit is set (bit eight 492 of the Port Configuration register 480). Similarly, the TX_MULTICAST_FILTER_ON logic circuit 764 indicates that the transmit multicast filter bit is set (bit seven 498 of the Port Configuration register 480).

The ANY_MULTICAST_CT_DISABLED logic circuit 732 indicates whether cut-through is disabled for any of the Ethernet ports 14 in response to bit eleven 486 of Port Configuration word 480. The ANY_ENET_DEST_TX_FILTER logic circuit 734 provides an output signal indicating whether any of the Ethernet ports 14 has a transmit filter applied thereto (as indicated by bit five 494 of Port Configuration word 480). The ANY_ENET_DEST_TX_MULTICAST_FILTER logic circuit 736 provides an output signal indicating whether any of the Ethernet ports 14 has a multicast transmit filter applied thereto (as indicated by bit nine 490 of Port Configuration word 480). The ANY_DEST_TX_FILTER logic circuit 766 is used to indicate if any of the possible destination ports has a transmit filter applied to it (bit five 494 of the Port Configuration word 480). The ANY_DEST_TX_MULTICAST_FILTER logic circuit 768 is used to indicate if any of the possible destination ports has a transmit multicast filter applied to it (bit nine 490 of the Port Configuration word 480). The ANY_DEST_TX_DISABLED logic circuit 738 is used to indicate if any of the possible transmit ports is disabled (bit one 502 of the Port Configuration word 480). The ANY_DEST_TX_MULTICAST_DISABLED logic circuit 740 indicates whether the transmit multicast path for any of the possible destination ports has been manually disabled (bit seven 498 of the Port Configuration word 480). The ANY_DEST_PORT_NOT_FORWARDING logic circuit 742 indicates whether any of the possible destination ports are not forwarding (bit three 506 of the Port Configuration word 480). The ANY_DEST_PORT_BLOCKING logic circuit 744 provides an output signal indicating whether any of the possible destination ports is in the internetworking device blocking state (bit two 508 of the Port Configuration word 480).

The following logic circuits are responsive to multiple bits being set in the Port Configuration word 480. The ANY_DEST_MONITOR_ON logic circuit 746 indicates whether any of the possible destination ports has its monitor bit set (bit twelve 484 of the Port Configuration word 480) and whether the following bits are not set: the transmit disable bit (bit one 502 of the Port Configuration word 480), the port blocking bit (bit two 508 of the Port Configuration word 480), and the port not forwarding bit (bit three 506 of the Port Configuration word 480). The ANY_DEST_MULTICAST_MONITOR_ON logic circuit 748 indicates whether any of the possible destination ports has its multicast monitor bit set (bit twelve 484 of the Port Configuration word 480) and whether the following bits are not set: the transmit disable bit (bit one 502 of the Port Configuration word 480), the transmit multicast disable bit (bit seven 498 of the Port Configuration word 480), the port blocking bit (bit two 508 of the Port Configuration word 480), and the port not forwarding bit (bit three 506 of the Port Configuration word 480).

Considering next the circuits which are responsive to signals from multiple registers, the BBONE_SRC_CT logic circuit 722 provides an output signal indicating that cut-through is enabled for the source port (bit ten 488 of Port Configuration word 480), that the low latency threshold has been reached as indicated by a signal from the DMA controller 74, that the AMA 32 has not located the source address in the address table of the AMA memory 36, and that the source address is not a multicast address. This circuit indicates to the RBSM 94 that the frame could be a cut_through frame and therefore the latency through the internetworking device can be lower than a frame which is completely stored before being forwarded. The BBONE_DEST_CT logic circuit 724 similarly provides an output signal indicating that cut-through is enabled for the backbone port (bit ten 488 of Port Configuration word 480), that the destination address (indicated by bit 31 382 of AMA Status word 380) was not found by the AMA 32 (i.e. that the destination port is the backbone port) and that the backbone port is an Ethernet port (bits fifteen through thirteen 482 of the Port Configuration word 480). The DEST_PORT_TYPE logic circuit 752 and SRC_PORT_TYPE logic circuit 754 provide signals representative of whether the destination and source ports, respectively, are Ethernet, FDDI, or unknown port types. These signals are provided in response to bits thirteen through fifteen 482 of the Port Configuration word 480 and bits twenty-two through sixteen 396 and bits six through zero 398, respectively, of the second word 394 of the AMA Status word 376 which is stored in the SRAM storage area 268 of buffer 180.

The SRC_CT_ALLOWED logic circuit 756 indicates that the cutthrough for the source port being processed is enabled (bit ten 488 of the Port Configuration word 480 in the Port Configuration register 474), that the low latency threshold as indicated by a signal from the DMA controller 74 has been reached, that the AMA 32 has located the source address in the address table of the AMA memory 36 (bit 15 388 AMA Status word 380), that the source multicast address is not set (from a signal from the AMA), that the source address is not an internal address (from 398 AMA Status word), and that the frame was received on the same port from which the port address was first learned. The DEST_CT_ALLOWED logic circuit 758 provides an output signal indicating that the cutthrough enable bit is enabled for the destination port is set (bit ten 488 of Port Configuration word 480), the destination port is an Ethernet port (bits fifteen through thirteen 482 of the Port Configuration word 480), the destination address was found by the AMA 32 (bit 31 382 of AMA Status word 380), that the destination port address is not an internal address (from 396 AMA Status word), and the destination port is not equal to the port on which the packet was received. The MULTICAST_CT_ALLOWED logic circuit 760 indicates that the source port multicast cut-through is enabled (bit eleven 486 of Port Configuration word 480) and that the destination address was not found by the AMA 32 in the address table in the AMA memory 36 (indicated by bit 31 (382) of the AMA Status word 380). The BBONE_MULTICAST_CT logic circuit 726 provides an output signal indicating that the source port multicast cutthrough bit is enabled (bit eleven 486 in the Port Configuration word 480), that the destination and source addresses were not found by the AMA 32 (bits 31 382 and 15 388 of the AMA Status word 380), that the source cut-through is enabled (bit ten 488 of the Port Configuration word 480), the cut-through low latency level has been reached as set by the DMA controller 74 and that the receive port is a backbone port as indicated from the Backbone Port register 668. The INVALID_DEST_PORT logic circuit 730 indicates that the destination port is an invalid port, even though the AMA 32 located the destination address in the address table (bit 31 382 of the AMA Status word), but was unable to find a destination group address (bit 30 384 of the AMA Status word 380) and the destination address is not the internal address (AMA Status word 396).

Finally, the RX_PORT_EQUALS_BBONE 728 logic circuit provides an output signal indicating whether the port being processed is the designated backbone port, and is responsive to only the Backbone Port register 668. The VHDL code which generates these circuits may be found in Appendix A2 in the module entitled RBSM-CONFIG.

Again for the purposes of discussion only, what can be considered to be a second level of logic circuits utilize signals from the Receive/Transmit Port Status Control Logic circuit 700 and other registers to generate other intermediate signals which are used by the Code Vector generator 688. Again using the name of the circuit as the name of the signal generated by the circuit, an RBSM_FRAG logic circuit compares the byte count 472 of the received FDDI frame located in the FDDI Status entry 418 with the fragment threshold from the fragment register 672 and asserts an RBSM_FRAG signal if the byte count is greater than the threshold.

An RBSM_SA_STATUS logic circuit sets a signal identified as SRC_ADDRESS_STATUS with different values according to various parameters returned by the AMA 32 into the RBSM AMA Status registers 660. Specifically, if the source address match bit 388 of AMA Status word 380 is not set, SRC_ADDRESS_STATUS is set to SA_UNKNOWN. If the source port equal bit 390 of AMA Status word 380 is not set, the SRC_ADDRESS_STATUS is set to SA_KNOWN_WITH_BAD_PORT. If the source group address bit from the AMA 32 is set, the SRC_ADDRESS_STATUS is set to SA_MULTICAST. If none of these conditions hold SRC_ADDRESS_STATUS is set to SA_KNOWN_GOOD_PORT.

An RBSM_MULTI_BUFFER module is used to create two sequential circuits, one for each FDDI port. An FDDI frame can be up to 4500 bytes long. Therefore, a large FDDI frame would consume up to three 2KB buffers. This module therefore is used to determine if more than one buffer has been consumed by the reception of an FDDI frame. The output of this FDDI_MULTI_BUFFER_MODULE is then used to generate the proper code vectors.

An RBSM_STATUS_REGISTER logic circuit sets a signal identified as FILTER FRAME under the condition shown in FIG. 16B. The RBSM_UNLOAD logic circuit asserts a signal identified as FDDI_EOF in response to a RX_END_OF_BUFFER bit being not set. When the RX_END_OF_BUFFER bit is set all of the other bits in the received_status word are ignored. If an FDDI frame spans more than one buffer, the DMA controller causes an entry to be loaded into the RECEIVE STATUS FIFO 306 with bit 16 set. The setting of this bit informs the RBSM 94 that more than one buffer is being used by the FDDI frame.

In addition, four other intermediate circuits named, DESTINATION_MONITOR, FILTER_FRAME, ENET_ABORT and FDDI_RX_ERROR, shown in FIGS. 16*a*–16*d* respectively, indicate whether all necessary conditions are met such that if a frame is to be transmitted to the destination port it should also be sent to the probe port, whether the frame is to be filtered, whether a transmission on the Ethernet has been aborted, and whether a receive error has occurred on an FDDI network, respectively. As discussed previously, the conditions which cause the circuits to assert a signal are shown in the figures, with the source of each condition being indicated in brackets to the right of the pseudocode. The VHDL code which is used to generate these circuits may be found in the modules entitled RBSM_CODE_VECTORS and RBSM_STATUS_REGISTERS in Appendix A2.

The Code Vector generator 688 is responsive to the output signals generated by the Receive/Transmit Port Status Control Logic circuit 700 and the intermediate signals generated by the second level of intermediate logic circuits described above to provide one of thirty-two possible code vectors (TABLE 1). In one embodiment one of the possible code vectors is unused. For example, the CV_UNICAST_NO_TRANSLATION_CUTTHRU_END vector (vector 3) indicates that the processed packet 46 is intended for unicast transmission, that the source network type is the same as the destination network type (i.e., no translation required), that cut-through has begun, and that the end of the packet 46 has been received by the Ethernet MAC 14. This code vector (code vector 3) is generated in response to the ENET_ABORT signal not being asserted by the ENET_ABORT intermediate circuit, the CUT_THRU_END signal from the intermediate circuit RBSM_CT_ACTIVE being asserted, the ETHERNET_RX_ERROR signal and the RX_MONITOR_ON logic signal 710 not being asserted by the Logic circuits 700 above, and the DESTINATION_MONITOR signal and the FILTER_FRAME signals not being asserted by their respective intermediate logic circuits. The RBSM_CT_ACTIVE intermediate logic circuit is used to save the state of a port which has a cut-through frame in progress. Therefore, a cut-through begin code vector was issued and the state maintained until the end of frame condition occurs and the receive status arrives, in which case the CUT_THRU_END signal is generated and the CT_ACTIVE bit reset upon the generation of a cut-thru end code vector. In response to these signals, CV_UNICAST_NO_TRANSLATION_CUTTHRU_END (vector 3) is generated. The code for creating the circuits responsible for the generation of vectors 0-31 is contained in the RBSM_CODE_VECTORS portion of the VHDL code in Appendix A2.

As mentioned above, the Monitor Translation Code Logic circuit 696 provides bits seventeen through fifteen 546 in the second word 540 in the Receive Queue entry 164 to indicate to the FPU 40 whether packet translation is required in order to send the received packet to a remote monitor (as enumerated in Table 2). This circuit, responsible for the generation of the eight Monitor Translation codes listed in Table 2, is generated by the RBSM_TRANS_CODE module of the VHDL code provided in Appendix A2.

These translation codes are generated by the monitor translation code logic circuit 696 in response to one or more input signals received from the Receive/Transmit Port Status Control logic circuit 700 and other intermediate circuits. A brief pseudocode description of the conditions which generate each of the Monitor Translation codes is shown in FIGS. 18*a–f*. Again, in this figure, both the value of the input signal (set indicating that the signal is enabled or asserted) and from where the signal is derived (as indicated by brackets [ ] adjacent the signal ) are presented.

Consider for example case number 18, indicated in braces { } above the conditions of the case. In this example, if none of the previous cases 1–17 have been satisfied and the set of listed conditions are satisfied, then the monitor translation code is MC_MULTICAST_FROM_FDDI. If these conditions are not set then the code becomes {19} MC_UNICAST_NO_TRANSLATION. Again, although the translation codes are depicted as being generated by a sequential list of IF-THEN-ELSE decisions, it must be remembered that the hardware generated by the VHDL code of Appendix A2, permits the decisions to be made substantially simultaneously and thus the translation codes are generated within 20 clock cycles.

FIGS. 19*a–c* depicts a flow diagram of the steps which occur in receiving a packet, generating a code vector, and transmitting the packet, when the data packet is capable of undergoing cut-through. In one embodiment cut-through is supported only for packets being received and forwarded between Ethernet type only ports.

When a data packet arrives (Step 800) in the Ethernet MAC 14, the data packet is stored (Step 804) in a FIFO in the network interface unit 60 (FIG. 3). The DMA controller 74 then requests (Step 810) access to SRAM 28*a* from the SRAM Arbiter and Controller 70*a*. When the request is granted, data is stored (Step 812) into the SRAM 28*a*. Since, in this example, the data packet is large enough, when the SRAM/DRAM address boundary is reached (Step 814), the DMA controller 74 sets the cut-through threshold bit (step 815) and the DMA controller 74 requests (Step 816) access to DRAM 28*b* from the DRAM Arbiter and Controller 70*b*. Again, once the request is granted, data is stored (Step 818) in DRAM 28*b*.

Concurrently, the data packet header 48, including buffer number and port number, is transferred (Step 830) through the AMA interface 340 to the AMA 32. The AMA 32 performs a concurrent search of AMA memory 36 for the source address and the destination address (Step 834) specified in the packet. Since, in this example, both the source and destination addresses are known and the address of the source port corresponds to an address in the AMA table for the port on which the address was originally learned, the source address hit (match) bit 15 388, the destination address hit (match) bit 31 382 and the source port equal bit 14 390 are set (Step 846). The AMA 32 does not set the destination group address bit 30 389 or the source group address bit since in this case the packet received is a unicast packet (Step 848).

The information is placed (Step 850) in the AMA Status registers 314. The code vector generator 688 examines the AMA Status register 314, the Port Configuration register 474 (which have set source and destination cut-through enabled and transmit and receive filters not enabled (Step 852)), the DMA cut-through threshold bits and the FPU interface 562 (to determine the state of the positive forward enable bit (Step 854)). Because, there is a source address match, a destination address match, a source port equal bit set, a destination port equal bit set, cut-through is enabled on the source and destination ports, the source and destination networks are Ethernet, and that the SRAM/DRAM address boundary has been crossed, the code vector generator 688 generates (Step 860) a cut-through code vector (CV_UNICAST_NO_TRANSLATION_CUT-THROUGH (Vector 2)).

The FPU 40 receives the code vector (Step 870) and places an entry in the Transmit Fragment State Machine FIFO 620 (Step 874) and an entry is entered in the transmit queue 158 (Step 880). The DMA controller 74 then controls the transmission of the data to the destination MAC 14 (Step 884).

During these steps, the incoming packet is stored in DRAM 28*b* and upon completion of the reception of the packet, an entry is made in the Receive Status queue 306 (Step 890). The code vector generator 688, upon reading the entry in the Receive Status queue 306, and knowing that a cut-through is in progress, generates (Step 900) a cut-through end vector, in this case a CV_UNICAST_NO_TRANSLATION_CUT-THRU_END vector 3, which is used by the FPU 40 for statistical purposes (Step 904). Upon completion of transmission of the packet from the MAC 14, the DMA controller 74 returns the buffer to the Return Buffer State Machine 114, for reuse (Step 908).

Having shown the preferred embodiment, those skilled in the art will realize many variations are possible which will still be within the scope and spirit of the claimed invention. Therefore, it is the intention to limit the invention only as indicated by the scope of the claims.

TABLE 1

| Number | Code Path | Vectors |
|---|---|---|
| 0 | Unicast No Translation | ENET or FDDI |
| 1 | Unicast No Translation with Filters | ENET (check for cut-thru or FDDI |
| 2 | Unicast No Translation Cut-thru | ENET cut-thru only |
| 3 | Unicast No Translation Cut-Thru End | ENET cut-thru only |
| 4 | Unicast Ethernet To FDDI | ENET only |
| 5 | Unicast Ethernet To FDDI with Filters | ENET only |
| 6 | Unicast FDDI To Ethernet | FDDI only |
| 7 | Unicast FDDI To Ethernet with Filters | FDDI only |
| 8 | Unicast FDDI To Ethernet Fragment | FDDI only (check for multi-buffer) |
| 9 | Unicast DA Unknown | ENET or FDDI (check for multi-buffer) |
| 10 | Unicast Exception | ENET or FDDI (check for multi-buffer) |
| 11 | Multicast From Ethernet | ENET only (check for cut-thru) |
| 12 | Multicast From Ethernet Exception | ENET only (check for cut-thru) |
| 13 | Multicast From Ethernet Cut-thru End | ENET cut-thru only |
| 14 | Multicast From FDDI | FDDI only (no fragmentation required) |
| 15 | Multicast From FDDI Exception | FDDI only (no fragmentation required) |
| 16 | Multicast From FDDI Fragmentation | FDDI only (check for multi-buffer) |
| 17 | Multicast Exception | ENET or FDDI (check for multi-buffer) |

TABLE 1-continued

| Number | Code Path Vectors | |
|---|---|---|
| 18 | Receive Frame Error | ENET (cut-thru) or FDDI (multi-buffer) |
| 19 | Non LLC Frame | FDDI only (check for multi-buffer) |
| 20 | Internal Unicast | ENET or FDDI (check for multi-buffer) |
| 21 | Internal Unicast Exception | ENET or FDDI (check for multi-buffer) |
| 22 | Internal Multicast | ENET or FDDI (check for multi-buffer) |
| 23 | Internal Broadcast | ENET or FDDI (check for multi-buffer) |
| 24 | MULTI-buffer Not Last Buffer | FDDI only |
| 25 | MULTI-buffer No Translation | FDDI only |
| 26 | MULTI-buffer No Translation with Filters | FDDI only |
| 27 | MULTI-buffer Discard Frame | FDDI only |
| 28 | reserved | |
| 29 | Monitor Source | ENET (cut-thru) or FDDI (multi-buffer) |
| 30 | Monitor Destination | ENET (cut-thru) or FDDI (multi-buffer) |
| 31 | Receive Queue Empty | |

TABLE 2

| Number | Code Path Vectors |
|---|---|
| 0 | Unicast No Translation |
| 1 | Unicast Ethernet To FDDI |
| 2 | Unicast FDDI To Ethernet |
| 3 | Unicast FDDI To Ethernet Fragmentation |
| 4 | Unicast DA Unknown |
| 5 | Multicast From Ethernet |
| 6 | Multicast From FDDI |
| 7 | Internal |

APPENDIX A1

```
/*
 *  "bma_rcv_code.c" - BMA Receive State Machine Pseudo Code
 *
 *  (c) COPYRIGHT 1993-1994 SYNERNETICS INC. ALL RIGHTS RESERVED
 *  This software is licensed and not sold. The terms of the
 *  license are set forth in a separate written agreement,
 *  which all qualified users have signed.
 *
 *  RESTRICTED RIGHTS LEGEND
 *  Use, duplication, or disclosure by the Government is subject
 *  to restrictions as set forth in subdivision (c)(1)(ii) of the
 *  Rights in Technical Data and Computer Software Clause at
 *  DFARS 252.227-7013.
 *
 *  Change history:
 *
 *    09/13/94  dcr  Address Table & management interface updates
 *    09/02/94  del  Re-map ap/fp indices
 *    08/26/94  del  Print DISCARD_BUFFER message only for runType==runTest
 *    06/20/94  del  Use FMAC/EMAC_TO_PORT_INDEX from dl.h.
 *    05/07/94  dcr  Added positive forwarding functionality.
 *    03/09/94  del  Mods for quake
 *    10/11/93  dcr  Converted to actual functional module.
 *    08/25/93  dcr  Update 2
 *    07/23/93  dcr  Update
 *    07/05/93  dcr  Initial coding
 */


#include "standard.h"
#include "os.h"


/*
```

```
*/

/*
 * The following list represents (signal) inputs to the BMA Receive State Machine
 * Machine, which it uses in formulating entries into the Receive Queue.
 *
 * NOTE that indentation (other than section headers) represents dependency.
 *
 *     1. Receive Frame Status
 *
 *         a) FDDI
 *
 *             end of buffer
 *
 *             end of frame
 *                 synchronous class frame                  (no impact on code vectors)
 *                 frame type - LLC
 *                 frame type - SMT/MAC
 *                 frame type - Implemeter
 *                 frame type - reserved                    (receive frame error for diags)
 *                 frame byte count
 *                     <= 1516
 *                     > 1516
 *                 A indication                             (no impact on code vectors)
 *                 C indication                             (no impact on code vectors)
 *
 *                 frame abort error
 *
 *                 FCS error                                (receive frame error)
 *                 data length error                        (receive frame error)
 *                 big frame                                (receive frame error)
 *                 very big frame                           (receive frame error)
 *                 MAC reset                                (receive frame error)
 *                 E indication                             (receive frame error)
 *                 BMA receive FIFO full                    (receive frame error)
 *
 *                 frame format error                       (aborted (punted) frame)
 *                 frame strip error                        (aborted (punted) frame)
 *                 unexpected token error                   (aborted (punted) frame)
 *
 *         b) Ethernet
 *
 *             end of frame
 *                 collision count                          (no impact on code vectors)
 *                 runt count                               (no impact on code vectors)
 *                 frame byte count                         (no impact on code vectors)
 *
 *                 runt frame                               (receive frame error)
 *                 frame too long                           (receive frame error)
 *                 MACE overflow                            (receive frame error)
 *                 frame collision                          (receive frame error)
 *                 framing error                            (receive frame error)
```

```
*               FCS error                              (receive frame error)
*
*     2. AMA Input
*
*             buffer number                            (no impact on code vectors)
*
*             receive port
*
*             group destination address                (multicast & broadcast)
*
*             destination address hit
*                 destination port equal               (da data port = receive port)
*                 destination address tag              (no impact on code vectors)
*                 destination address data port
*                 destination address data bits
*                     broadcast
*                     multicast
*                     internal
*                     filter
*
*             group source address                     (invalid multicast or source-routing)
*
*             source address hit
*                 source port equal                    (sa data port = receive port)
*                 source address tag                   (no impact on code vectors)
*                 source address data port
*                 source address data bits
*                     broadcast
*                     multicast
*                     internal
*                     filter
*
*/

/*
```

```
*/
/*
 *      1. Receive Frame Status (FDDI & Ethernet)
 */

/*
 *          a) FDDI
 */

typedef struct {
    unsigned int synchronous_class_frame     : 1;    /* no impact on code vectors */
    unsigned int bma_receive_fifo_full       : 1;    /* receive frame error */
    unsigned int frame_type_Implemeter       : 1;    /* non-LLC code vector */
    unsigned int frame_type_reserved         : 1;    /* receive frame error (for diags) */
    unsigned int frame_type_LLC              : 1;
    unsigned int frame_type_SMT              : 1;    /* non-LLC code vector */
    unsigned int FCS_error                   : 1;    /* receive frame error */
    unsigned int data_length_error           : 1;    /* receive frame error */
    unsigned int big_frame                   : 1;    /* receive frame error */
    unsigned int MAC_reset                   : 1;    /* receive frame error */
    unsigned int frame_format_error          : 1;    /* aborted (punted) frame */
    unsigned int frame_strip_error           : 1;    /* aborted (punted) frame */
    unsigned int A_indication                : 1;    /* no impact on code vectors */
    unsigned int C_indication                : 1;    /* no impact on code vectors */
    unsigned int E_indication                : 1;    /* receive frame error */
    unsigned int reserved_by_hardware        : 1;
    unsigned int frame_abort_error           : 1;    /* receive frame error */
    unsigned int very_big_frame              : 1;    /* receive frame error */
    unsigned int unexpected_token            : 1;    /* aborted (punted) frame */
    unsigned int frame_length                : 13;
} fddi_rcv_frame_status_t;

extern fddi_rcv_frame_status_t fddi_rfs;

/*
 *          b) Ethernet
 */

typedef struct {
    unsigned int collision_count         : 8;        /* no impact on code vectors */
    unsigned int runt_frame              : 1;        /* receive frame error */
    unsigned int frame_too_long          : 1;        /* receive frame error */
    unsigned int runt_count              : 5;        /* no impact on code vectors */
    unsigned int unused                  : 1;
    unsigned int MACE_overflow           : 1;        /* receive frame error */
    unsigned int frame_collision         : 1;        /* receive frame error */
    unsigned int framing_error           : 1;        /* receive frame error */
    unsigned int FCS_error               : 1;        /* receive frame error */
    unsigned int frame_length            : 12;       /* no impact on code vectors */
} enet_rcv_frame_status_t;
```

```
extern enet_rcv_frame_status_t enet_rfs;

extern int32u frame_byte_count;


/*
 *      2. AMA Input
 */

extern int32u  buffer_number;                         /* no impact on code vectors */

extern int32u  receive_port;

extern boolean group_destination_address;             /* multicast & broadcast */

extern boolean destination_address_hit;
extern boolean destination_port_equal;                /* da data port = receive port */
extern int16u  destination_address_tag;               /* no impact on code vectors */
extern int16u  destination_address_data;
extern boolean destination_address_data_bit_broadcast;
extern boolean destination_address_data_bit_multicast;
extern boolean destination_address_data_bit_internal;
extern boolean destination_address_data_bit_filter;
extern int8u   destination_address_data_port;

extern boolean group_source_address;                  /* invalid multicast or source-routing */

extern boolean source_address_hit;
extern boolean source_port_equal;                     /* sa data port = receive port */
extern int16u  source_address_tag;                    /* no impact on code vectors */
extern int16u  source_address_data;
extern boolean source_address_data_bit_broadcast;
extern boolean source_address_data_bit_multicast;
extern boolean source_address_data_bit_internal;
extern boolean source_address_data_bit_filter;
extern int8u   source_address_data_port;


/*
```

```
 */

/*  Configurable System Constants  */

#define CFG_FRAME_HEADER_LONGWORD_BUFFER_OFFSET     2
#define CFG_FRAME_DATA_LONGWORD_BUFFER_OFFSET       11
#define CFG_FDDI_FRAGMENT_BYTE_SIZE                 1517    /* frame control byte is always stripped */


/*  Port Type definitions  */

#define PORT_TYPE_FDDI      0
#define PORT_TYPE_ENET      1
#define PORT_TYPE_HSI       2
#define PORT_TYPE_ATM       3


/*  BMA-to-29K FIFO (receive frame queue) two-longword entry definitions  */

/*  NOTE: Bit-field structure definitions assume left-to-right assignment.  */

union {
    unsigned int allfields;
    struct {
        unsigned int code_vector        : 5;
        unsigned int unused             : 3;    /* must be zeros */
        unsigned int multi_buffer_flag  : 1;
        unsigned int cut_thru_flag      : 1;
        unsigned int frame_data_ptr     : 20;
        unsigned int src_addr_status    : 2;    /* LSB */
    } field;
} fifo_word1;

union {
    unsigned int allfields;
    struct {
        unsigned int dest_port          : 6;
        unsigned int src_port           : 6;
        unsigned int unused             : 2;    /* must be zeros */
        unsigned int monitor_code       : 3;    /* only for monitor vectors; zeros otherwise */
        unsigned int da_filter_flag     : 1;
        unsigned int sa_filter_flag     : 1;
        unsigned int frame_length       : 13;   /* LSB */
    } field;
} fifo_word2;


/*  Code Vector definitions  */

#define CV_UNICAST_NO_TRANSLATION               0       /* ENET or FDDI */
#define CV_UNICAST_NO_TRANSLATION_FILTERS       1       /* ENET (check for cut-thru) or FDDI */
#define CV_UNICAST_NO_TRANSLATION_CUTTHRU       2       /* ENET cut-thru only */
```

```
#define CV_UNICAST_NO_TRANSLATION_CUTTHRU_END       3       /* ENET cut-thru only */
#define CV_UNICAST_ETHERNET_TO_FDDI                 4       /* ENET only */
#define CV_UNICAST_ETHERNET_TO_FDDI_FILTERS         5       /* ENET only */
#define CV_UNICAST_FDDI_TO_ETHERNET                 6       /* FDDI only */
#define CV_UNICAST_FDDI_TO_ETHERNET_FILTERS         7       /* FDDI only */
#define CV_UNICAST_FDDI_TO_ETHERNET_FRAG            8       /* FDDI only (check for multi-buffer) */
#define CV_UNICAST_DA_UNKNOWN                       9       /* ENET or FDDI (check for multi-buffer) */
#define CV_UNICAST_EXCEPTION                        10      /* ENET or FDDI (check for multi-buffer) */

#define CV_MULTICAST_FROM_ETHERNET                  11      /* ENET (check for cut-thru) */
#define CV_MULTICAST_FROM_ETHERNET_EXCEPTION        12      /* ENET (check for cut-thru) */
#define CV_MULTICAST_FROM_ETHERNET_CUTTHRU_END      13      /* ENET cut-thru only */
#define CV_MULTICAST_FROM_FDDI                      14      /* FDDI only */
#define CV_MULTICAST_FROM_FDDI_EXCEPTION            15      /* FDDI only */
#define CV_MULTICAST_FROM_FDDI_FRAG                 16      /* FDDI only (check for multi-buffer) */
#define CV_MULTICAST_EXCEPTION                      17      /* ENET or FDDI (check for multi-buffer) */

#define CV_RECEIVE_FRAME_ERROR                      18      /* ENET (cut-thru) or FDDI (multi-buffer) */
#define CV_NON_LLC_FRAME                            19      /* FDDI only (check for multi-buffer) */

#define CV_INTERNAL_UNICAST                         20      /* ENET or FDDI (check for multi-buffer) */
#define CV_INTERNAL_UNICAST_EXCEPTION               21      /* ENET or FDDI (check for multi-buffer) */
#define CV_INTERNAL_MULTICAST                       22      /* ENET or FDDI (check for multi-buffer) */
#define CV_INTERNAL_BROADCAST                       23      /* ENET or FDDI (check for multi-buffer) */

#define CV_MULTIBUFFER_NOT_LAST_BUFFER              24      /* FDDI only */
#define CV_MULTIBUFFER_NO_TRANSLATION               25      /* FDDI only */
#define CV_MULTIBUFFER_NO_TRANSLATION_FILTERS       26      /* FDDI only */
#define CV_MULTIBUFFER_DISCARD_FRAME                27      /* FDDI only */

#define CV_unused                                   28      /* ??? */

#define CV_MONITOR_SOURCE                           29      /* ENET (cut-thru) or FDDI (multi-buffer) */
#define CV_MONITOR_DESTINATION                      30      /* ENET (cut-thru) or FDDI (multi-buffer) */

#define CV_FIFO_EMPTY                               31

/*  Source Address Status definitions  */

#define SA_KNOWN_WITH_GOOD_PORT 0
#define SA_KNOWN_WITH_BAD_PORT  1
#define SA_UNKNOWN              2
#define SA_MULTICAST            3       /* multicast/source routing bit set */

/*  Monitor Translation Code definitions  */

#define MC_UNICAST_NO_TRANSLATION           0
#define MC_UNICAST_ETHERNET_TO_FDDI         1
#define MC_UNICAST_FDDI_TO_ETHERNET         2
#define MC_UNICAST_FDDI_TO_ETHERNET_FRAG    3
```

```
#define MC_UNICAST_DA_UNKNOWN             4
#define MC_MULTICAST_FROM_ETHERNET        5
#define MC_MULTICAST_FROM_FDDI            6
#define MC_INTERNAL                       7

/*
```

```
 */

/*  Port Status longword definition  */

/*  NOTE: Port status array should be initialized to all ones so that   *
 *        unused port numbers will automatically be "disabled".        */

struct {
    unsigned int unused                             : 16;
    unsigned int port_type                          : 3;
    unsigned int monitor_enabled                    : 1;
    unsigned int cut_thru_multicast_enabled         : 1;
    unsigned int cut_thru_enabled                   : 1;
    unsigned int xmt_multicast_path_filter_enabled  : 1;
    unsigned int rcv_multicast_path_filter_enabled  : 1;
    unsigned int xmt_multicast_path_disabled        : 1;
    unsigned int rcv_multicast_path_disabled        : 1;
    unsigned int xmt_path_filter_enabled            : 1;
    unsigned int rcv_path_filter_enabled            : 1;
    unsigned int port_not_forwarding                : 1;
    unsigned int port_blocking                      : 1;
    unsigned int xmt_path_disabled                  : 1;
    unsigned int rcv_path_disabled                  : 1;    /* LSB */
} port_status[MAX_TOTAL_PORT_COUNT];

/*  BMA Internal State variables  */

boolean multi_buffer_frame = FALSE;
boolean cut_thru_frame = FALSE;

/*  BMA Internal counters  */

int32u port_received_octets[MAX_TOTAL_PORT_COUNT];
int32u port_received_frame_discards[MAX_TOTAL_PORT_COUNT];
int32u port_transmit_octets[MAX_TOTAL_PORT_COUNT];

void DISCARD_BUFFER (int32u code)
{
    if (config_blk.runType == runTest) {
        PRINTF("DISCARD_BUFFER:  code = %d  buffer number = %d\n", code, buffer_number);
    }
}

/*
```

```
*/
/*
 *  Positive Forwarding features:
 *
 *      Defines a "backbone" port which allows unlimited stations.
 *
 *      The backbone port will only receive frames with known destination
 *      addresses (i.e., frames with destination addresses for stations
 *      known to live off one of the other bridge ports).
 *
 *      The backbone port does not learn source addresses.
 *
 *      The backbone port is the destination for all frames with unknown
 *      destination addresses received by the other bridge ports.  Unknown
 *      destination addresses are assumed to live off the backbone port.
 *      Unknown destination address "flooding" is not performed.
 *
 *
 *  Postive Forwarding additions:
 *
 *      Add a system-level configuration "positive forwarding" switch (bit)
 *      to one of the BMA Configuration Registers.
 *
 *      Add a 7-bit "backbone port" specification register to identify the
 *      backbone port if positive forwarding is enabled.
 *
 *
 *  Notes:
 *
 *      RMON monitoring of the backbone port will not be allowed (software
 *      restriction).
 */

/*  BMA Internal State variables  */

boolean positive_forwarding = FALSE;
int8u   backbone_port;

/*
```

```
*/
/*
*********************************************************************************
*                                                                               *
*         BMA Ethernet Receive Frame Cut-Thru Processing Algorithm.             *
*                                                                               *
*********************************************************************************
*/

boolean bma_ethernet_cut_thru (int32u *rcv_q_word1, int32u *rcv_q_word2)
{

    int i;
    int32u transmit_port;

    /*
     *  This is an Ethernet port, so cut-thru is a possibility if it is
     *  enabled for the port.
     */

    /*  Identify the unique transmit port if there is one.  If there was a
        destination address "hit", then the AMA has provided the unique
        transmit port.  If there was a destination address "miss", but the
        system is in positive forwarding mode and the destination address
        is unicast, then the unique transmit port is the backbone port.
        Otherwise, there is no unique transmit port.  */

    if (destination_address_hit)
        transmit_port = destination_address_data_port;
    else if (positive_forwarding && !group_destination_address)
        transmit_port = backbone_port;
    else
        transmit_port = 0x3F;    /* unassigned */

    cut_thru_frame = FALSE;      /* initialize */

    /*  If cut-thru is enabled for the receive port, then cut-thru for this
        frame is a possibility.  */

    if (port_status[receive_port].cut_thru_enabled) {

        /*
         *  Unicast and Multicast cut-thru qualifications are different, so
         *  split them here.
         */

        if (!group_destination_address) {       /* unicast frame  */

            if (!positive_forwarding) {                      /* NOT positive forwarding */
```

RECEIVE PORT CUT-THRU ENABLED

UNICAST FRAME

```
    if (!group_source_address &&
            source_address_hit &&
              !source_address_data_bit_internal &&
                source_port_equal &&
                  destination_address_hit &&
                    !destination_address_data_bit_internal &&
                      port_status[transmit_port].port_type == PORT_TYPE_ENET &&
                        !destination_port_equal &&
                          port_status[transmit_port].cut_thru_enabled)

        cut_thru_frame = TRUE;

} else if (receive_port == backbone_port) {         /* positive forwarding -             */
                                                    /*    (receive port is backbone port) */
    if (!group_source_address &&
            !source_address_hit &&
              destination_address_hit &&
                !destination_address_data_bit_internal &&
                  port_status[transmit_port].port_type == PORT_TYPE_ENET &&
                    !destination_port_equal &&
                      port_status[transmit_port].cut_thru_enabled)

        cut_thru_frame = TRUE;

} else if (destination_address_hit) {               /* positive forwarding -                 */
                                                    /*    (transmit port is NOT backbone port) */
    if (!group_source_address &&
            source_address_hit &&
              !source_address_data_bit_internal &&
                source_port_equal &&
                  !destination_address_data_bit_internal &&
                    port_status[transmit_port].port_type == PORT_TYPE_ENET &&
                      !destination_port_equal &&
                        port_status[transmit_port].cut_thru_enabled)

        cut_thru_frame = TRUE;

} else {                                            /* positive forwarding -             */
                                                    /*    (transmit port is backbone port) */
    if (!group_source_address &&
            source_address_hit &&
              !source_address_data_bit_internal &&
                source_port_equal &&
                  port_status[transmit_port].port_type == PORT_TYPE_ENET &&
                    port_status[transmit_port].cut_thru_enabled)

        cut_thru_frame = TRUE;
}

/*  If this frame is eligible for cut-thru, then generate
    a cut-thru code vector.  */
```

```
if (cut_thru_frame) {

    /*  Clear all fields of the two (long) word entry to the Receive FIFO to start.  */

    fifo_word1.allfields = 0;
    fifo_word2.allfields = 0;

    /*  Assign the code vector depending on whether filters are enabled on either
        the receive or transmit port.  */

    if (port_status[receive_port].rcv_path_filter_enabled ||
            port_status[transmit_port].xmt_path_filter_enabled)
        fifo_word1.field.code_vector = CV_UNICAST_NO_TRANSLATION_FILTERS;
    else
        fifo_word1.field.code_vector = CV_UNICAST_NO_TRANSLATION_CUTTHRU;

    /*  Fill in the cut-thru flag field.  */

    fifo_word1.field.cut_thru_flag = 1;

    /*  Fill in the frame data pointer field.  The frame data pointer is at a constant
        (configurable by software) offset into the buffer.  */

    fifo_word1.field.frame_data_ptr = (buffer_number << 9) + CFG_FRAME_DATA_LONGWORD_BUFFER_OFFSET;

    /*  Fill in the source address status field.  */

    if (source_address_hit)
        fifo_word1.field.src_addr_status = SA_KNOWN_WITH_GOOD_PORT;
    else
        fifo_word1.field.src_addr_status = SA_UNKNOWN;

    /*  Fill in the destination port (as specified by the AMA destination address
        lookup results) and the receive port fields.  */

    fifo_word2.field.dest_port = transmit_port;
    fifo_word2.field.src_port  = receive_port;

    /*  Fill in the destination address and source address filter bits
        (as available from the AMA address lookup operations).  */

    fifo_word2.field.da_filter_flag = (destination_address_hit & destination_address_data_bit_filter);
    fifo_word2.field.sa_filter_flag = (source_address_hit & source_address_data_bit_filter);

    goto enet_cutthru_end;
}

/*
 *                                                              MULTICAST FRAME
 */

} else {                        /* multicast/broadcast frame */
```

```
if (port_status[receive_port].cut_thru_multicast_enabled) {

    if (!positive_forwarding || receive_port != backbone_port) {

        if (!group_source_address &&
                source_address_hit &&
                  !source_address_data_bit_internal &&
                    source_port_equal &&
                      !destination_address_hit)

            cut_thru_frame = TRUE;

    } else {

        if (!group_source_address &&
                !source_address_hit &&
                  !destination_address_hit)

            cut_thru_frame = TRUE;
    }

    /*  If this frame is eligible for cut-thru, then generate
        a cut-thru code vector.  */

    if (cut_thru_frame) {

        /*  Clear all fields of the two (long) word entry to the Receive FIFO to start.  */

        fifo_word1.allfields = 0;
        fifo_word2.allfields = 0;

        /*  Fill in the cut-thru flag field.  */

        fifo_word1.field.cut_thru_flag = 1;

        /*  Fill in the frame data pointer field.  The frame data pointer is at a constant
            (configurable by software) offset into the buffer.  */

        fifo_word1.field.frame_data_ptr = (buffer_number << 9) + CFG_FRAME_DATA_LONGWORD_BUFFER_OFFSET;

        /*  Fill in the source address status field.  */

        if (source_address_hit)
            fifo_word1.field.src_addr_status = SA_KNOWN_WITH_GOOD_PORT;
        else
            fifo_word1.field.src_addr_status = SA_UNKNOWN;

        /*  Fill in the destination port (as specified by the AMA destination address
            lookup results) and the receive port fields. */
```

```
            fifo_word2.field.dest_port = 0;
            fifo_word2.field.src_port  = receive_port;

            /*  Fill in the destination address and source address filter bits
                (as available from the AMA address lookup operations).  */

            fifo_word2.field.da_filter_flag = 0;
            fifo_word2.field.sa_filter_flag = (source_address_hit & source_address_data_bit_filter);

            /*  Assign the code vector depending on whether filters are enabled on either
                the receive or transmit port.  */

            if (port_status[receive_port].rcv_path_filter_enabled ||
                            port_status[receive_port].rcv_multicast_path_filter_enabled) {

                fifo_word1.field.code_vector = CV_MULTICAST_FROM_ETHERNET_EXCEPTION;

                goto enet_cutthru_end;
            }

            for (i = 2; i < MAX_TOTAL_PORT_COUNT; i++) {

                if (i != receive_port) {

                    if (!port_status[i].cut_thru_multicast_enabled ||
                                port_status[i].xmt_path_filter_enabled ||
                                    port_status[i].xmt_multicast_path_filter_enabled) {

                        fifo_word1.field.code_vector = CV_MULTICAST_FROM_ETHERNET_EXCEPTION;

                        goto enet_cutthru_end;
                    }
                }
            }

            fifo_word1.field.code_vector = CV_MULTICAST_FROM_ETHERNET;

            goto enet_cutthru_end;
        }
    }       /* endif (port_status[receive_port].cut_thru_multicast_enabled) */
  }       /* endelseif (!group_destination_address) */
}       /* endif (port_status[receive_port].cut_thru_enabled) */

/*
 *  NO Receive FIFO entry has been created.
 */

return (FALSE);

enet_cutthru_end:

/*
```

```
     *  A valid Receive FIFO entry has been created.
     */

    *rcv_q_word1 = fifo_word1.allfields;
    *rcv_q_word2 = fifo_word2.allfields;

    return (TRUE);
}

/*
```

```
 */
/*
 ******************************************************************************
 *                                                                            *
 *      BMA Ethernet Receive Frame Processing Algorithm for "End-of-Frame"    *
 *      notifications from the Receive State Machines.  Note the Ethernet     *
 *      Receive State Machines guarantee that a frame will never overflow     *
 *      a single BMA buffer.  Invalid long frames (greater than one buffer)   *
 *      are terminated by the state machines.                                 *
 *                                                                            *
 ******************************************************************************
 */

boolean bma_ethernet_end_of_frame (int32u *rcv_q_word1, int32u *rcv_q_word2)
{

    int i;
    int32u transmit_port;

    /*
     *  Clear all fields of the two (long) word entry to the Receive FIFO to start.  ________ BEGIN RECEIVE FIFO ENTRY
     */

    fifo_word1.allfields = 0;
    fifo_word2.allfields = 0;

    /*  Fill in the cut-thru flag field.  */

    if (cut_thru_frame)
        fifo_word1.field.cut_thru_flag = 1;

    /*  Fill in the frame data pointer field.  The frame data pointer is at a constant
        (configurable by software) offset into the buffer.  */

    fifo_word1.field.frame_data_ptr = (buffer_number << 9) + CFG_FRAME_DATA_LONGWORD_BUFFER_OFFSET;

    /*  Establish source address status field.  */

    if (!source_address_hit)
        fifo_word1.field.src_addr_status = SA_UNKNOWN;
    else if (!source_port_equal)
        fifo_word1.field.src_addr_status = SA_KNOWN_WITH_BAD_PORT;
    else if (group_source_address)
        fifo_word1.field.src_addr_status = SA_MULTICAST;
    else
        fifo_word1.field.src_addr_status = SA_KNOWN_WITH_GOOD_PORT;

    /*  Identify the unique transmit port if there is one.  If there was a
        destination address "hit", then the AMA has provided the unique
        transmit port.  If there was a destination address "miss", but the
```

```
    system is in positive forwarding mode and the destination address
    is unicast, then the unique transmit port is the backbone port.
    Otherwise, there is no unique transmit port.  */

if (destination_address_hit)
    transmit_port = destination_address_data_port;
else if (positive_forwarding && !group_destination_address)
    transmit_port = backbone_port;
else
    transmit_port = 0x3F;   /* unassigned */

/*  Fill in the destination port (as specified by the AMA destination address
    lookup results) and the receive port fields. */

fifo_word2.field.dest_port = transmit_port;
fifo_word2.field.src_port  = receive_port;

/*  Fill in the destination address and source address filter bits
    (as available from the AMA address lookup operations).  */

fifo_word2.field.da_filter_flag = (destination_address_hit & destination_address_data_bit_filter);
fifo_word2.field.sa_filter_flag = (source_address_hit & source_address_data_bit_filter);

/*  Fill in the frame length field.  */

fifo_word2.field.frame_length = frame_byte_count - 4;   /* minus FCS bytes */

/*
 *  Count the received octets at the end-of-frame.  The Receive Octets
 *  statistic is the count of all bytes seen on a port, regardless of
 *  whether or not the frame is in error.
 */

port_received_octets[receive_port] += frame_byte_count;

/*
 *  Identify "errorred" frames.
 */

if (enet_rfs.runt_frame ||
      enet_rfs.frame_too_long ||
        enet_rfs.MACE_overflow ||
          enet_rfs.frame_collision ||
            enet_rfs.framing_error ||
              enet_rfs.FCS_error) {

    fifo_word1.field.code_vector = CV_RECEIVE_FRAME_ERROR;

    goto enet_end;
}
```

COUNT RECEIVE OCTETS

ERRORRED FRAME

MONITOR SOURCE

```
/*
 * All frames sourced on the segment attached to a "monitored" port
 * must be passed to the remote monitor "probe" port. Note that
 * the backbone port (in positive forwarding mode) cannot be
 * configured as the monitored port (software inhibited).
 */

if (port_status[receive_port].monitor_enabled) {

    /* Establish monitor translation code field. */

    if (!group_destination_address) {

        if (destination_address_hit) {

            if (destination_address_data_bit_internal)
                fifo_word2.field.monitor_code = MC_INTERNAL;
            else if (port_status[transmit_port].port_type == PORT_TYPE_ENET)
                fifo_word2.field.monitor_code = MC_UNICAST_NO_TRANSLATION;
            else
                fifo_word2.field.monitor_code = MC_UNICAST_ETHERNET_TO_FDDI;

        } else {
            fifo_word2.field.monitor_code = MC_UNICAST_DA_UNKNOWN;
        }

    } else {

        if (destination_address_hit && destination_address_data_bit_internal)
            fifo_word2.field.monitor_code = MC_INTERNAL;
        else
            fifo_word2.field.monitor_code = MC_MULTICAST_FROM_ETHERNET;
    }

    /* Establish code vector field. */

    fifo_word1.field.code_vector = CV_MONITOR_SOURCE;

    goto enet_end;
}
```

MONITOR DESTINATION

```
/*
 * All frames actually bridged to the segment attached to a "monitored"
 * port must also be passed to the remote monitor "probe" port.
 */

if (!(destination_address_hit && destination_address_data_bit_internal) &&  /* not internal */
        !port_status[receive_port].rcv_path_disabled &&
          !port_status[receive_port].port_blocking &&
            !port_status[receive_port].port_not_forwarding) {
```

```
if (!group_destination_address) {

    if (destination_address_hit) {

        /*  If the specific destination port is being monitored and the frame
            will be bridged onto that segment, then the frame must be passed
            to the probe port.  */

        if (port_status[transmit_port].monitor_enabled &&
                !port_status[transmit_port].xmt_path_disabled &&
                  !port_status[transmit_port].port_blocking &&
                    !port_status[transmit_port].port_not_forwarding) {

            /*  Establish monitor translation code field.  */

            if (port_status[transmit_port].port_type == PORT_TYPE_ENET)
                fifo_word2.field.monitor_code = MC_UNICAST_NO_TRANSLATION;
            else
                fifo_word2.field.monitor_code = MC_UNICAST_ETHERNET_TO_FDDI;

            /*  Establish code vector field.  */

            fifo_word1.field.code_vector = CV_MONITOR_DESTINATION;

            goto enet_end;
        }

    } else if (!positive_forwarding) {

        /*  Unknown unicast destination address flooding.  If any one of the
            destination ports is being monitored and the frame will be bridged
            onto that segment, then the frame must be passed to the probe port.
            In positive forwarding mode, there is no unknown DA flooding and
            the backbone port cannot be monitored.  */

        for (i = 0; i < MAX_TOTAL_PORT_COUNT; i++) {
            if (i != receive_port) {

                if (port_status[i].monitor_enabled &&
                        !port_status[i].xmt_path_disabled &&
                          !port_status[i].port_blocking &&
                            !port_status[i].port_not_forwarding) {

                    /*  Establish monitor translation code field.  */

                    fifo_word2.field.monitor_code = MC_UNICAST_DA_UNKNOWN;

                    /*  Establish code vector field.  */

                    fifo_word1.field.code_vector = CV_MONITOR_DESTINATION;

                    goto enet_end;
```

```
                    }
                }
            }
        }
    } else if (!port_status[receive_port].rcv_multicast_path_disabled) {

        /*  Group destination address.  If any one of the destination ports
            is being monitored and the frame will be bridged onto that segment,
            then the frame must be passed to the probe port.  */

        for (i = 0; i < MAX_TOTAL_PORT_COUNT; i++) {
            if (i != receive_port) {

                if (port_status[i].monitor_enabled &&
                        !port_status[i].xmt_path_disabled &&
                         !port_status[i].xmt_multicast_path_disabled &&
                          !port_status[i].port_blocking &&
                           !port_status[i].port_not_forwarding) {

                    /*  Establish monitor translation code field.  */

                    fifo_word2.field.monitor_code = MC_MULTICAST_FROM_ETHERNET;

                    /*  Establish code vector field.  */

                    fifo_word1.field.code_vector = CV_MONITOR_DESTINATION;

                    goto enet_end;
                }
            }
        }
    }
}

/*
 *  Identify and discard same segment frames (destination port = source port)
 *  right off the bat.  Note that these frames cannot be discarded if the
 *  source address needs to be learned or the source address currently known
 *  on (assigned to) another port.
 */

if (!positive_forwarding || receive_port != backbone_port) {

    if (!group_destination_address &&
            destination_address_hit &&
              !destination_address_data_bit_internal &&
                source_address_hit &&
                  !source_address_data_bit_internal &&
                    source_port_equal &&
                      port_status[transmit_port].port_type == port_status[receive_port].port_type &&
                        destination_port_equal) {
```

SAME SEGMENT DISCARDS

```
        port_received_frame_discards[receive_port]++;

        DISCARD_BUFFER(1);

        goto enet_quit;
    }
} else {            /* positive_forwarding && receive_port == backbone_port */

    if ((!group_destination_address &&
            !destination_address_hit &&
              !source_address_hit)    ||
                group_source_address) {

        port_received_frame_discards[receive_port]++;

        DISCARD_BUFFER(1);

        goto enet_quit;
    }
}

/*
 *  Identify "end" of cut-thru frames.                                END OF CUT-THRU
 */

if (cut_thru_frame) {
    cut_thru_frame = FALSE;

    if (group_destination_address)
        fifo_word1.field.code_vector = CV_MULTICAST_FROM_ETHERNET_CUTTHRU_END;
    else
        fifo_word1.field.code_vector = CV_UNICAST_NO_TRANSLATION_CUTTHRU_END;

    goto enet_end;
}

/*
 *  If the MAC receive path (all traffic) is disabled, then discard the frame.   MAC RECEIVE PATH DISABLED
 */

if (port_status[receive_port].rcv_path_disabled) {

    port_received_frame_discards[receive_port]++;

    DISCARD_BUFFER(2);

    goto enet_quit;
}
```

```
/*  Split unicast and multicast/broadcast frame processing paths.  */

if (!group_destination_address) {

    /*
     *  THIS IS A GOOD, LLC, UNICAST FRAME.
     */

    /*
     *  Identify good, LLC, unicast frames with unknown destination addresses.
     *  Note that the "Unicast DA Unknown" code vector is NOT generated while
     *  the system is in positive forwarding mode.  The DA might be unknown,
     *  but the transmit port in this case is the backbone port (i.e.,
     *  unknown DA flooding is NOT performed).
     */

    if (!destination_address_hit) {

        /*  If the bridge port is BLOCKING, then discard the frame.  */

        if (port_status[receive_port].port_blocking) {

            port_received_frame_discards[receive_port]++;

            DISCARD_BUFFER(3);

            goto enet_quit;

        } else if (!positive_forwarding) {

            fifo_word1.field.code_vector = CV_UNICAST_DA_UNKNOWN;

            goto enet_end;
        }
    }

    /*
     *  Identify good, LLC, unicast frames addressed to "internal"
     *  (destination) addresses.  These are probably "routable" frames.
     */

    if (destination_address_data_bit_internal) {

        if (port_status[receive_port].port_blocking ||
                port_status[receive_port].port_not_forwarding ||
                  ((!positive_forwarding || receive_port != backbone_port) &&
                            fifo_word1.field.src_addr_status != SA_KNOWN_WITH_GOOD_PORT) ||
                  ((positive_forwarding && receive_port == backbone_port) &&
                            fifo_word1.field.src_addr_status != SA_UNKNOWN))

            fifo_word1.field.code_vector = CV_INTERNAL_UNICAST_EXCEPTION;
```

UNICAST FRAME

UNKNOWN UNICAST DA

INTERNAL UNICAST DA

```
    else
        fifo_word1.field.code_vector = CV_INTERNAL_UNICAST;

    goto enet_end;
}

/*
 *  If the bridge port is BLOCKING, then discard the frame.
 */

if (port_status[receive_port].port_blocking) {

    port_received_frame_discards[receive_port]++;

    DISCARD_BUFFER(4);

    goto enet_quit;

}

/*
 *  Identify receive port exceptions, source address exceptions and transmit
 *  port exceptions for this good, LLC, unicast, known external destination
 *  address frame.  Note that if the system is in positive forwarding mode
 *  and the receive port is the backbone port, then a source address
 *  exception is other than "SA Unknown".
 */

if (port_status[receive_port].port_not_forwarding ||
      ((!positive_forwarding || receive_port != backbone_port) &&
              fifo_word1.field.src_addr_status != SA_KNOWN_WITH_GOOD_PORT) ||
      ((positive_forwarding && receive_port == backbone_port) &&
              fifo_word1.field.src_addr_status != SA_UNKNOWN) ||
        port_status[transmit_port].xmt_path_disabled ||
          port_status[transmit_port].port_blocking ||
            port_status[transmit_port].port_not_forwarding) {

    fifo_word1.field.code_vector = CV_UNICAST_EXCEPTION;

    goto enet_end;
}

/*
 *  Identify receive and transmit port filter enabled for this good, LLC,
 *  unicast, known destination address frame.
 */

if (port_status[receive_port].rcv_path_filter_enabled ||
        port_status[transmit_port].xmt_path_filter_enabled) {

    if (port_status[transmit_port].port_type == PORT_TYPE_ENET)
        fifo_word1.field.code_vector = CV_UNICAST_NO_TRANSLATION_FILTERS;
```

BRIDGE PORT BLOCKING

RECEIVE PORT, SA STATUS & TRANSMIT PORT EXCEPTIONS

RECEIVE & TRANSMIT PATH FILTERS ENABLED

```
        else
            fifo_word1.field.code_vector = CV_UNICAST_ETHERNET_TO_FDDI_FILTERS;

        goto enet_end;
    }
```

FAST-PATH UNICAST FRAME

```
    /*
     *  Identify the fast path code vector for this good, LLC, unicast, known
     *  destination address frame.
     */

    if (port_status[transmit_port].port_type == PORT_TYPE_ENET)
        fifo_word1.field.code_vector = CV_UNICAST_NO_TRANSLATION;
    else
        fifo_word1.field.code_vector = CV_UNICAST_ETHERNET_TO_FDDI;

    goto enet_end;

} else {        /* group_destination_address */
```

MULTICAST FRAME

```
    /*
     *  THIS IS A GOOD, LLC, MULTICAST OR BROADCAST FRAME.
     */
```

MAC RECEIVE MULTICAST
PATH DISABLED

```
    /*
     *  If the MAC receive multicast path is disabled, then discard the frame.
     *
     */

    if (port_status[receive_port].rcv_multicast_path_disabled) {

        port_received_frame_discards[receive_port]++;

        DISCARD_BUFFER(5);

        goto enet_quit;

    }
```

INTERNAL MULTICAST &
BROADCAST DA

```
    /*
     *  Identify good, LLC, multicast/broadcast frames addressed to "internal"
     *  (destination) addresses.  These are probably management application frames
     *  addressed to predefined group addresses.  Note that the broadcast address
     *  can be configured as an internal address, allowing the system to special
     *  case it for routing considerations.  Also note that a multicast/broadcast
     *  address in the AMA cache must be an "internal" type.
     */

    if (destination_address_hit &&
            destination_address_data_bit_internal) {
```

```
    if (destination_address_data_bit_broadcast)
        fifo_word1.field.code_vector = CV_INTERNAL_BROADCAST;
    else
        fifo_word1.field.code_vector = CV_INTERNAL_MULTICAST;

    goto enet_end;
}

/*
 *  If the bridge port is BLOCKING, then discard the frame.
 */

if (port_status[receive_port].port_blocking) {

    port_received_frame_discards[receive_port]++;

    DISCARD_BUFFER(6);

    goto enet_quit;

}

/*
 *  Identify receive port exceptions and source address exceptions for
 *  this good, LLC, multicast destination address frame.  Note that if
 *  the system is in positive forwarding mode and the receive port is
 *  the backbone port, then a source address exception is other than
 *  "SA Unknown".
 */

if (port_status[receive_port].port_not_forwarding ||
      ((!positive_forwarding || receive_port != backbone_port) &&
              fifo_word1.field.src_addr_status != SA_KNOWN_WITH_GOOD_PORT) ||
      ((positive_forwarding && receive_port == backbone_port) &&
              fifo_word1.field.src_addr_status != SA_UNKNOWN)) {

    fifo_word1.field.code_vector = CV_MULTICAST_EXCEPTION;

    goto enet_end;
}

/*
 *  Identify receive (multicast) path filter enabled.
 *
 */

if (port_status[receive_port].rcv_path_filter_enabled ||
      port_status[receive_port].rcv_multicast_path_filter_enabled) {

    fifo_word1.field.code_vector = CV_MULTICAST_FROM_ETHERNET_EXCEPTION;

    goto enet_end;
```

BRIDGE PORT BLOCKING

RECEIVE PORT & SA STATUS EXCEPTIONS

RECEIVE (MULTICAST) PATH FILTERS ENABLED

```
    }

    /*
     *  Identify any transmit port exceptions or any transmit (multicast)
     *  path filter enabled for this good, LLC, multicast destination
     *  address frame.
     */

    for (i = 0; i < MAX_TOTAL_PORT_COUNT; i++) {

        if (i != receive_port) {

            if (port_status[i].xmt_path_disabled ||
                    port_status[i].xmt_multicast_path_disabled ||
                      port_status[i].port_blocking ||
                        port_status[i].port_not_forwarding ||
                          port_status[i].xmt_path_filter_enabled ||
                            port_status[i].xmt_multicast_path_filter_enabled) {

                fifo_word1.field.code_vector = CV_MULTICAST_FROM_ETHERNET_EXCEPTION;

                goto enet_end;
            }
        }
    }

    /*
     *  Identify the fast path code vector for this good, LLC, multicast
     *  destination address frame.
     */

    fifo_word1.field.code_vector = CV_MULTICAST_FROM_ETHERNET;

    goto enet_end;
}

enet_end:

    /*
     *  A valid Receive FIFO entry has been created.
     */

    *rcv_q_word1 = fifo_word1.allfields;
    *rcv_q_word2 = fifo_word2.allfields;

    return (TRUE);

enet_quit:

    /*
     *  NO Receive FIFO entry has been created.
```

TRANSMIT PORT EXCEPTIONS & TRANSMIT (MULTICAST) PATH FILTERS ENABLED

FAST-PATH MULTICAST FRAME

```
     */
    return (FALSE);
}

/*
```

```
*/
/*
*****************************************************************************
*                                                                           *
*     BMA FDDI Receive Frame Processing Algorithm for "End-of-Buffer"       *
*     notifications from the Receive State Machines.                        *
*                                                                           *
*****************************************************************************
*/

boolean bma_fddi_end_of_buffer (int32u *rcv_q_word1, int32u *rcv_q_word2)
{

    int32u transmit_port;

    /*
     *  Process "end-of-buffer" but NOT "end-of-frame" events.  These are
     *  multi-buffer frames.
     */

    /*  Identify the unique transmit port if there is one.  If there was a
        destination address "hit", then the AMA has provided the unique
        transmit port.  If there was a destination address "miss", but the
        system is in positive forwarding mode and the destination address
        is unicast, then the unique transmit port is the backbone port.
        Otherwise, there is no unique transmit port.  */

    if (destination_address_hit)
        transmit_port = destination_address_data_port;
    else if (positive_forwarding && !group_destination_address)
        transmit_port = backbone_port;
    else
        transmit_port = 0x3F;    /* unassigned */

    /*
     *  If the "end of buffer" has been reached, but not the "end of frame",
     *  then this is a multi-buffer frame.  Unless this is a "same segment"
     *  frame (which is to be discarded) , post "not last" buffers to the
     *  Receive FIFO.
     */

    if (!positive_forwarding || receive_port != backbone_port) {

        if (!group_destination_address &&
                destination_address_hit &&
                  !destination_address_data_bit_internal &&
                    source_address_hit &&
                      !source_address_data_bit_internal &&
                        source_port_equal &&
                          port_status[transmit_port].port_type == port_status[receive_port].port_type &&
                            destination_port_equal &&
```

END-OF-BUFFER &
NOT END-OF-FRAME

SAME SEGMENT DISCARDS

```
                        !port_status[receive_port].monitor_enabled) {

        port_received_frame_discards[receive_port]++;

        DISCARD_BUFFER(7);

        return (FALSE);
    }
} else {            /* positive_forwarding && receive_port == backbone_port */

    if ((!group_destination_address &&
            !destination_address_hit &&
              !source_address_hit)    ||
                 group_source_address) {

        port_received_frame_discards[receive_port]++;

        DISCARD_BUFFER(7);

        return (FALSE);
    }
}

/*
 *  Generate End-of-Buffer, Not End-of-Frame code vector.        END-OF-BUFFER &
 *                                                               NOT END-OF-FRAME
 */

multi_buffer_frame = TRUE;

/*  Clear all fields of the two (long) word entry to the Receive FIFO to start.  */

fifo_word1.allfields = 0;
fifo_word2.allfields = 0;

/*  Fill in the multi-buffer flag field.  */

fifo_word1.field.multi_buffer_flag = 1;

/*  Fill in the frame data pointer field.  The frame data pointer is at a constant
    (configurable by software) offset into the buffer.  */

fifo_word1.field.frame_data_ptr = (buffer_number << 9) + CFG_FRAME_DATA_LONGWORD_BUFFER_OFFSET;

/*  Establish the source address status field.  */

if (!source_address_hit)
    fifo_word1.field.src_addr_status = SA_UNKNOWN;
else if (!source_port_equal)
    fifo_word1.field.src_addr_status = SA_KNOWN_WITH_BAD_PORT;
else if (group_source_address)
```

```
        fifo_word1.field.src_addr_status = SA_MULTICAST;
    else
        fifo_word1.field.src_addr_status = SA_KNOWN_WITH_GOOD_PORT;

    /*  Fill in the destination port (as specified by the AMA destination address
        lookup results) and the receive port fields. */

    fifo_word2.field.dest_port = transmit_port;
    fifo_word2.field.src_port  = receive_port;

    /*  Fill in the destination address and source address filter bits
        (as available from the AMA address lookup operations).  */

    fifo_word2.field.da_filter_flag = (destination_address_hit & destination_address_data_bit_filter);
    fifo_word2.field.sa_filter_flag = (source_address_hit & source_address_data_bit_filter);

    /*  Fill in the code vector field.  */

    fifo_word1.field.code_vector = CV_MULTIBUFFER_NOT_LAST_BUFFER;

    *rcv_q_word1 = fifo_word1.allfields;
    *rcv_q_word2 = fifo_word2.allfields;

    return (TRUE);
}

/*
```

```
 */
/*
 ***************************************************************************
 *                                                                         *
 *     BMA FDDI Receive Frame Processing Algorithm for "End-of-Frame"      *
 *     notifications from the Receive State Machines.                      *
 *                                                                         *
 ***************************************************************************
 */

boolean bma_fddi_end_of_frame (int32u *rcv_q_word1, int32u *rcv_q_word2)
{

    int i;
    int32u transmit_port;

    /*
     *  Clear all fields of the two (long) word entry to the Receive FIFO to start.
     */                                                       BEGIN RECEIVE FIFO ENTRY

    fifo_word1.allfields = 0;
    fifo_word2.allfields = 0;

    /*  Identify multi-buffer frames, and reset the current multi-buffer state,
        if it exists, because we are at the end of frame.  */

    if (multi_buffer_frame) {

        fifo_word1.field.multi_buffer_flag = 1;

        multi_buffer_frame = FALSE;
    }

    /*  Fill in the frame data pointer field.  The frame data pointer is at a constant
        (configurable by software) offset into the buffer.  */

    fifo_word1.field.frame_data_ptr = (buffer_number << 9) + CFG_FRAME_DATA_LONGWORD_BUFFER_OFFSET;

    /*  Establish the source address status field.  */

    if (!source_address_hit)
        fifo_word1.field.src_addr_status = SA_UNKNOWN;
    else if (!source_port_equal)
        fifo_word1.field.src_addr_status = SA_KNOWN_WITH_BAD_PORT;
    else if (group_source_address)
        fifo_word1.field.src_addr_status = SA_MULTICAST;
    else
        fifo_word1.field.src_addr_status = SA_KNOWN_WITH_GOOD_PORT;

    /*  Identify the unique transmit port if there is one.  If there was a
```

```
    destination address "hit", then the AMA has provided the unique
    transmit port.  If there was a destination address "miss", but the
    system is in positive forwarding mode and the destination address
    is unicast, then the unique transmit port is the backbone port.
    Otherwise, there is no unique transmit port.  */

if (destination_address_hit)
    transmit_port = destination_address_data_port;
else if (positive_forwarding && !group_destination_address)
    transmit_port = backbone_port;
else
    transmit_port = 0x3F;    /* unassigned */

/*  Fill in the destination port (as specified by the AMA destination address
    lookup results) and the receive port fields. */

fifo_word2.field.dest_port = transmit_port;
fifo_word2.field.src_port  = receive_port;

/*  Fill in the destination address and source address filter bits
    (as available from the AMA address lookup operations).  */

fifo_word2.field.da_filter_flag = (destination_address_hit & destination_address_data_bit_filter);
fifo_word2.field.sa_filter_flag = (source_address_hit & source_address_data_bit_filter);

/*  Fill in the frame length field.  */

fifo_word2.field.frame_length = frame_byte_count - 4;    /* minus FCS bytes */

/*
 *  Identify "aborted" frames which are flushed by the BMA.
 */
```

ABORTED FRAME

```
if (fddi_rfs.frame_format_error ||
      fddi_rfs.frame_strip_error ||
        fddi_rfs.unexpected_token) {

    /*  Typically on aborted frames, the receive state machine will notify
        the BMA of the condition and just re-use the curent receive buffer
        for the next receive operation.  This being the case, the BMA will
        normally NOT pass the aborted frame notification on to the 29K.
        However, if the aborted frame was a multi-buffer frame, then the
        BMA must notify the 29K, so that it can flush all previously passed
        buffers.  */

    if (fifo_word1.field.multi_buffer_flag == 0) {

        goto fddi_quit;

    } else {

        /*  This event is identifiable because the multi-buffer flag is
```

```
            set and NONE of the other Receive Frame Error condition bits
            are set???  */

        fifo_word1.field.code_vector = CV_MULTIBUFFER_DISCARD_FRAME;

        goto fddi_end;
    }
}

/*
 *  Count the received octets at the end-of-frame.  The Receive Octets
 *  statistic is the count of all bytes seen on a port, regardless of
 *  whether or not the frame is in error.
 */

port_received_octets[receive_port] += frame_byte_count;

/*
 *  Identify "errorred" frames.
 */

if (fddi_rfs.bma_receive_fifo_full ||
      fddi_rfs.FCS_error ||
        fddi_rfs.data_length_error ||
          fddi_rfs.big_frame ||
            fddi_rfs.MAC_reset ||
              fddi_rfs.E_indication ||
                fddi_rfs.frame_abort_error ||
                  fddi_rfs.very_big_frame ||
                    fddi_rfs.frame_type_reserved) {

    fifo_word1.field.code_vector = CV_RECEIVE_FRAME_ERROR;

    goto fddi_end;
}

/*
 *  All frames sourced on the segment attached to a "monitored" port
 *  must be passed to the remote monitor "probe" port.  Note that
 *  the backbone port (in positive forwarding mode) cannot be
 *  configured as the monitored port (software inhibited).
 */

if (port_status[receive_port].monitor_enabled) {

    /*  Establish monitor translation code field.  */

    if (!group_destination_address) {

        if (destination_address_hit) {
```

COUNT RECEIVE OCTETS

ERRORRED FRAME

MONITOR SOURCE

MONITOR DESTINATION

```
            if (destination_address_data_bit_internal)
                fifo_word2.field.monitor_code = MC_INTERNAL;

            else if (port_status[transmit_port].port_type == PORT_TYPE_ENET)

                if (frame_byte_count > CFG_FDDI_FRAGMENT_BYTE_SIZE)
                    fifo_word2.field.monitor_code = MC_UNICAST_FDDI_TO_ETHERNET_FRAG;
                else
                    fifo_word2.field.monitor_code = MC_UNICAST_FDDI_TO_ETHERNET;
            else
                fifo_word2.field.monitor_code = MC_UNICAST_NO_TRANSLATION;

        } else {
            fifo_word2.field.monitor_code = MC_UNICAST_DA_UNKNOWN;
        }

    } else {

        if (destination_address_hit && destination_address_data_bit_internal)
            fifo_word2.field.monitor_code = MC_INTERNAL;
        else
            fifo_word2.field.monitor_code = MC_MULTICAST_FROM_FDDI;
    }

    /*  Establish code vector field.  */

    fifo_word1.field.code_vector = CV_MONITOR_SOURCE;

    goto fddi_end;
}

/*
 *  All frames actually bridged to the segment attached to a "monitored"
 *  port must also be passed to the remote monitor "probe" port.
 */

if (!(destination_address_hit && destination_address_data_bit_internal) &&  /* not internal */
        !port_status[receive_port].rcv_path_disabled &&
          !port_status[receive_port].port_blocking &&
            !port_status[receive_port].port_not_forwarding) {

    if (!group_destination_address) {

        if (destination_address_hit) {

            /*  If the specific destination port is being monitored and the frame
                will be bridged onto that segment, then the frame must be passed
                to the probe port.  */

            if (port_status[transmit_port].monitor_enabled &&
                    !port_status[transmit_port].xmt_path_disabled &&
                      !port_status[transmit_port].port_blocking &&
```

```
                !port_status[transmit_port].port_not_forwarding) {

            /*  Establish monitor translation code field.  */

            if (port_status[transmit_port].port_type == PORT_TYPE_ENET)
                if (frame_byte_count > CFG_FDDI_FRAGMENT_BYTE_SIZE)
                    fifo_word2.field.monitor_code = MC_UNICAST_FDDI_TO_ETHERNET_FRAG;
                else
                    fifo_word2.field.monitor_code = MC_UNICAST_FDDI_TO_ETHERNET;
            else
                fifo_word2.field.monitor_code = MC_UNICAST_NO_TRANSLATION;

            /*  Establish code vector field.  */

            fifo_word1.field.code_vector = CV_MONITOR_DESTINATION;

            goto fddi_end;
        }
    } else if (!positive_forwarding) {

        /*  Unknown unicast destination address flooding.  If any one of the
            destination ports is being monitored and the frame will be bridged
            onto that segment, then the frame must be passed to the probe port.
            In positive forwarding mode, there is no unknown DA flooding and
            the backbone port cannot be monitored.  */

        for (i = 0; i < MAX_TOTAL_PORT_COUNT; i++) {
            if (i != receive_port) {

                if (port_status[i].monitor_enabled &&
                        !port_status[i].xmt_path_disabled &&
                          !port_status[i].port_blocking &&
                            !port_status[i].port_not_forwarding) {

                    /*  Establish monitor translation code field.  */

                    fifo_word2.field.monitor_code = MC_UNICAST_DA_UNKNOWN;

                    /*  Establish code vector field.  */

                    fifo_word1.field.code_vector = CV_MONITOR_DESTINATION;

                    goto fddi_end;
                }
            }
        }
    }
} else if (!port_status[receive_port].rcv_multicast_path_disabled) {

    /*  Group destination address.  If any one of the destination ports
```

```
        is being monitored and the frame will be bridged onto that segment,
        then the frame must be passed to the probe port.  */

    for (i = 0; i < MAX_TOTAL_PORT_COUNT; i++) {
        if (i != receive_port) {

            if (port_status[i].monitor_enabled &&
                    !port_status[i].xmt_path_disabled &&
                      !port_status[i].xmt_multicast_path_disabled &&
                        !port_status[i].port_blocking &&
                          !port_status[i].port_not_forwarding) {

                /*  Establish monitor translation code field.  */

                fifo_word2.field.monitor_code = MC_MULTICAST_FROM_FDDI;

                /*  Establish code vector field.  */

                fifo_word1.field.code_vector = CV_MONITOR_DESTINATION;

                goto fddi_end;
            }
        }
    }
}
```

SAME SEGMENT DISCARDS

```
/*
 *  Identify and discard same segment frames (destination port = source port)
 *  right off the bat.  Note that these frames cannot be discarded if the
 *  source address needs to be learned or the source address currently known
 *  on (assigned to) another port.
 */

if (!positive_forwarding || receive_port != backbone_port) {

    if (!group_destination_address &&
            destination_address_hit &&
              !destination_address_data_bit_internal &&
                source_address_hit &&
                  !source_address_data_bit_internal &&
                    source_port_equal &&
                      port_status[transmit_port].port_type == port_status[receive_port].port_type &&
                        destination_port_equal) {

        port_received_frame_discards[receive_port]++;

        DISCARD_BUFFER(8);

        goto fddi_quit;
    }
```

```
} else {            /* positive_forwarding && receive_port == backbone_port */

    if ((!group_destination_address &&
          !destination_address_hit &&
            !source_address_hit)     ||
               group_source_address) {

        port_received_frame_discards[receive_port]++;

        DISCARD_BUFFER(8);

        goto fddi_quit;
    }
}

/*
 *  Identify non-LLC frames.
 */

if (fddi_rfs.frame_type_SMT ||          /* or ~fddi_rfs.frame_type_LLC */
        fddi_rfs.frame_type_Implemeter ||
            fddi_rfs.frame_type_reserved) {

    fifo_word1.field.code_vector = CV_NON_LLC_FRAME;

    goto fddi_end;
}

/*
 *  If the MAC receive path (all traffic) is disabled, then discard the frame.
 */

if (port_status[receive_port].rcv_path_disabled) {

    port_received_frame_discards[receive_port]++;

    DISCARD_BUFFER(9);

    if (fifo_word1.field.multi_buffer_flag == 0) {

        goto fddi_quit;

    } else {

        fifo_word1.field.code_vector = CV_MULTIBUFFER_DISCARD_FRAME;

        goto fddi_end;
    }
}

/*  Split unicast and multicast/broadcast frame processing paths.  */
```

NON-LLC FRAME

MAC RECEIVE PATH DISABLED

```
if (!group_destination_address) {

    /*
     *  THIS IS A GOOD, LLC, UNICAST FRAME.
     */

    /*
     *  Identify good, LLC, unicast frames with unknown destination addresses.
     *  Note that the "Unicast DA Unknown" code vector is NOT generated while
     *  the system is in positive forwarding mode.  The DA might be unknown,
     *  but the transmit port in this case is the backbone port (i.e.,
     *  unknown DA flooding is NOT performed).
     */

    if (!destination_address_hit) {

        /*  If the bridge port is BLOCKING, then discard the frame.  */

        if (port_status[receive_port].port_blocking) {

            port_received_frame_discards[receive_port]++;

            DISCARD_BUFFER(10);

            if (fifo_word1.field.multi_buffer_flag == 0) {

                goto fddi_quit;

            } else {

                fifo_word1.field.code_vector = CV_MULTIBUFFER_DISCARD_FRAME;

                goto fddi_end;
            }

        } else if (!positive_forwarding) {

            fifo_word1.field.code_vector = CV_UNICAST_DA_UNKNOWN;

            goto fddi_end;
        }
    }

    /*
     *  Identify good, LLC, unicast frames addressed to "internal"
     *  (destination) addresses.  These are probably "routable" frames.
     */

    if (destination_address_data_bit_internal) {

        if (port_status[receive_port].port_blocking ||
```

UNICAST FRAME

UNKNOWN UNICAST DA

INTERNAL UNICAST DA

```
        port_status[receive_port].port_not_forwarding ||
          ((!positive_forwarding || receive_port != backbone_port) &&
                   fifo_word1.field.src_addr_status != SA_KNOWN_WITH_GOOD_PORT) ||
          ((positive_forwarding && receive_port == backbone_port) &&
                   fifo_word1.field.src_addr_status != SA_UNKNOWN))

        fifo_word1.field.code_vector = CV_INTERNAL_UNICAST_EXCEPTION;

    else
        fifo_word1.field.code_vector = CV_INTERNAL_UNICAST;

    goto fddi_end;
}

/*
 *  If the bridge port is BLOCKING, then discard the frame.
 */

if (port_status[receive_port].port_blocking) {

    port_received_frame_discards[receive_port]++;

    DISCARD_BUFFER(11);

    if (fifo_word1.field.multi_buffer_flag == 0) {

        goto fddi_quit;

    } else {

        fifo_word1.field.code_vector = CV_MULTIBUFFER_DISCARD_FRAME;

        goto fddi_end;
    }
}

/*
 *  Identify receive port exceptions, source address exceptions and transmit
 *  port exceptions for this good, LLC, unicast, known external destination
 *  address frame.  Note that if the system is in positive forwarding mode
 *  and the receive port is the backbone port, then a source address
 *  exception is other than "SA Unknown".
 */

if (port_status[receive_port].port_not_forwarding ||
        ((!positive_forwarding || receive_port != backbone_port) &&
                fifo_word1.field.src_addr_status != SA_KNOWN_WITH_GOOD_PORT) ||
        ((positive_forwarding && receive_port == backbone_port) &&
                fifo_word1.field.src_addr_status != SA_UNKNOWN) ||
          port_status[transmit_port].xmt_path_disabled ||
            port_status[transmit_port].port_blocking ||
              port_status[transmit_port].port_not_forwarding) {
```

BRIDGE PORT BLOCKING

RECEIVE PORT, SA STATUS &
TRANSMIT PORT EXCEPTIONS

```
        fifo_word1.field.code_vector = CV_UNICAST_EXCEPTION;

        goto fddi_end;
    }

    /*
     *  Identify FDDI-to-Ethernet frames requiring fragmentation.
     */
```

UNICAST FRAGMENTATION

```
    if (port_status[transmit_port].port_type == PORT_TYPE_ENET &&
            frame_byte_count > CFG_FDDI_FRAGMENT_BYTE_SIZE) {

        fifo_word1.field.code_vector = CV_UNICAST_FDDI_TO_ETHERNET_FRAG;

        goto fddi_end;
    }

    /*
     *  Identify receive and transmit port filter enabled for this good, LLC,
     *  unicast, known destination address frame.
     */
```

RECEIVE & TRANSMIT PATH FILTERS ENABLED

```
    if (port_status[receive_port].rcv_path_filter_enabled ||
            port_status[transmit_port].xmt_path_filter_enabled) {

        if (port_status[transmit_port].port_type == PORT_TYPE_ENET)
            fifo_word1.field.code_vector = CV_UNICAST_FDDI_TO_ETHERNET_FILTERS;
        else if (fifo_word1.field.multi_buffer_flag == 0)
            fifo_word1.field.code_vector = CV_UNICAST_NO_TRANSLATION_FILTERS;
        else
            fifo_word1.field.code_vector = CV_MULTIBUFFER_NO_TRANSLATION_FILTERS;

        goto fddi_end;
    }

    /*
     *  Identify the fast path code vector for this good, LLC, unicast, known
     *  destination address frame.
     */
```

FAST-PATH UNICAST FRAME

```
    if (port_status[transmit_port].port_type == PORT_TYPE_ENET)
        fifo_word1.field.code_vector = CV_UNICAST_FDDI_TO_ETHERNET;
    else if (fifo_word1.field.multi_buffer_flag == 0)
        fifo_word1.field.code_vector = CV_UNICAST_NO_TRANSLATION;
    else
        fifo_word1.field.code_vector = CV_MULTIBUFFER_NO_TRANSLATION;

    goto fddi_end;

} else {        /* group_destination_address */
```

MULTICAST FRAME

```
/*
 *  THIS IS A GOOD, LLC, MULTICAST OR BROADCAST FRAME.
 */
```

MAC RECEIVE MULTICAST PATH DISABLED

```
/*
 *  If the MAC receive multicast path is disabled, then discard the frame.
 *
 */

if (port_status[receive_port].rcv_multicast_path_disabled) {

    port_received_frame_discards[receive_port]++;

    DISCARD_BUFFER(12);

    if (fifo_word1.field.multi_buffer_flag == 0) {

        goto fddi_quit;

    } else {

        fifo_word1.field.code_vector = CV_MULTIBUFFER_DISCARD_FRAME;

        goto fddi_end;
    }
}
```

INTERNAL MULTICAST & BROADCAST DA

```
/*
 *  Identify good, LLC, multicast/broadcast frames addressed to "internal"
 *  (destination) addresses.  These are probably management application frames
 *  addressed to predefined group addresses.  Note that the broadcast address
 *  can be configured as an internal address, allowing the system to special
 *  case it for routing considerations.  Also note that a multicast/broadcast
 *  address in the AMA cache must be an "internal" type.
 */

if (destination_address_hit &&
            destination_address_data_bit_internal) {

    if (destination_address_data_bit_broadcast)
        fifo_word1.field.code_vector = CV_INTERNAL_BROADCAST;
    else
        fifo_word1.field.code_vector = CV_INTERNAL_MULTICAST;

    goto fddi_end;
}
```

BRIDGE PORT BLOCKING

```
/*
 *  If the bridge port is BLOCKING, then discard the frame.
 */
```

```
if (port_status[receive_port].port_blocking) {

    port_received_frame_discards[receive_port]++;

    DISCARD_BUFFER(13);

    if (fifo_word1.field.multi_buffer_flag == 0) {

        goto fddi_quit;

    } else {

        fifo_word1.field.code_vector = CV_MULTIBUFFER_DISCARD_FRAME;

        goto fddi_end;
    }
}

/*
 * Identify receive port exceptions and source address exceptions for
 * this good, LLC, multicast destination address frame.  Note that if
 * the system is in positive forwarding mode and the receive port is
 * the backbone port, then a source address exception is other than
 * "SA Unknown".
 */

if (port_status[receive_port].port_not_forwarding ||
      ((!positive_forwarding || receive_port != backbone_port) &&
            fifo_word1.field.src_addr_status != SA_KNOWN_WITH_GOOD_PORT) ||
      ((positive_forwarding && receive_port == backbone_port) &&
            fifo_word1.field.src_addr_status != SA_UNKNOWN)) {

    fifo_word1.field.code_vector = CV_MULTICAST_EXCEPTION;

    goto fddi_end;
}

/*
 * Identify FDDI-to-Ethernet multicast frames requiring fragmentation.
 */

if (frame_byte_count > CFG_FDDI_FRAGMENT_BYTE_SIZE) {

    fifo_word1.field.code_vector = CV_MULTICAST_FROM_FDDI_FRAG;

    goto fddi_end;

}

/*
 * Identify receive (multicast) path filter enabled.
 *
```

RECEIVE PORT & SA STATUS EXCEPTIONS

MULTICAST FRAGMENTATION

RECEIVE (MULTICAST) PATH FILTERS ENABLED

```
         */

        if (port_status[receive_port].rcv_path_filter_enabled ||
              port_status[receive_port].rcv_multicast_path_filter_enabled) {

            fifo_word1.field.code_vector = CV_MULTICAST_FROM_FDDI_EXCEPTION;

            goto fddi_end;
        }

        /*
         *  Identify any transmit port exceptions or any transmit (multicast)
         *  path filter enabled for this good, LLC, multicast destination
         *  address frame.
         */

        for (i = 0; i < MAX_TOTAL_PORT_COUNT; i++) {

            if (i != receive_port) {

                if (port_status[i].xmt_path_disabled ||
                        port_status[i].xmt_multicast_path_disabled ||
                          port_status[i].port_blocking ||
                            port_status[i].port_not_forwarding ||
                              port_status[i].xmt_path_filter_enabled ||
                                port_status[i].xmt_multicast_path_filter_enabled) {

                    fifo_word1.field.code_vector = CV_MULTICAST_FROM_FDDI_EXCEPTION;

                    goto fddi_end;
                }
            }
        }

        /*
         *  Identify the fast path code vector for this good, LLC, multicast
         *  destination address frame.
         */

        fifo_word1.field.code_vector = CV_MULTICAST_FROM_FDDI;

        goto fddi_end;
    }

fddi_end:

    /*
     *  A valid Receive FIFO entry has been created.
     */

    *rcv_q_word1 = fifo_word1.allfields;
```

TRANSMIT PORT EXCEPTIONS & TRANSMIT (MULTICAST) PATH FILTERS ENABLED

FAST-PATH MULTICAST FRAME

```
    *rcv_q_word2 = fifo_word2.allfields;

    return (TRUE);

fddi_quit:

    /*
     *  NO Receive FIFO entry has been created.
     */

    return (FALSE);
}

/*
```

```
/*
 *  "standard.h" - standard declarations and definitions
 *
 *  (c) COPYRIGHT 1990 SYNERNETICS INC. ALL RIGHTS RESERVED
 *  This software is licensed and not sold. The terms of the
 *  license are set forth in a separate written agreement,
 *  which all qualified users have signed.
 *
 *  RESTRICTED RIGHTS LEGEND
 *  Use, duplication, or disclosure by the Government is subject
 *  to restrictions as set forth in subdivision (c)(1)(ii) of the
 *  Rights in Technical Data and Computer Software Clause at
 *  DFARS 252.227-7013.
 *
 *  Change history:
 *    03/07/94  del  Mods for quake.
 *     9/28/93  del  Mods for compiling AS pcm.
 *     8/20/93  ddr  Insert LANplex 6000 support.
 *     8/16/93  svs  Added led_color parameter to led manipulation routines.
 *    11/04/92  dcr  "not_found" status code
 */


#ifndef _LANPLEX_STANDARD_
#define _LANPLEX_STANDARD_
#ifndef __STANDARD_H
#define __STANDARD_H

#define NULL    0


/*
 *  Boolean data type:
 */
typedef unsigned char Boolean, boolean;
#ifndef false
#define false   (Boolean)0
#endif
#ifndef true
#define true    (Boolean)1
#endif
#ifndef FALSE
#define FALSE   0
#endif
#ifndef TRUE
#define TRUE    1
#endif


/*
 *  Processor/compiler-dependent types:
 */
typedef unsigned int            size_t;
typedef char                    int8;
typedef unsigned char           int8u;
typedef short                   int16;
typedef unsigned short          int16u;
```

```
typedef long                    int32;
typedef unsigned long           int32u;
typedef unsigned char           octet;
typedef unsigned char volatile  vint8u;
typedef unsigned short volatile vint16u;
typedef unsigned long volatile  vint32u;
typedef long volatile           vint32;



/*
 *  Status codes:
 */
typedef enum {
    success,                    /* normal, successful completion              */

    /*
     *  Interface package status codes:
     */
    attr_not_sup,               /* attribute not supported by implementation  */
    action_not_sup,             /* action not supported by implementation     */
    event_not_sup,              /* event not supported by implementation      */
    no_room,                    /* insufficient resources                     */
    out_of_range,               /* attribute value is out of range            */
    hw_error,                   /* a hardware-related error occurred          */
    bad_parameter,              /* one of the parameters to the request is bad*/
    in_use,                     /* object is in use                           */
    already_in_table,           /* object already in table                    */
    not_found,                  /* object not found                           */
    resource_error,             /* a system-related resource error occurred   */

    /*
     *  SMT status codes:
     */
    error_smt = 100,            /* base SMT status code                       */
    error_not_implemented,      /* unsupported or unimplemented feature       */

    /*
     *  LANplex and Internet Protocols MIB status codes:
     */
    errorLanSysMib = 300,       /* base LAN System MIB status code            */
    errorNotImplemented,        /* attribute is not implemented               */
    errorInvalidAttribute,      /* invalid attribute specifier or ID          */
    errorInvalidAccess,         /* invalid type of access for attribute       */
    errorTypeLengthMismatch,    /* invalid type or length on set operation    */
    errorEndOfList,             /* end of list-structured attribute reached   */
    errorUnrecognizedType,      /* resource is of an unrecognized type        */

    /*
     *  Miscellaneous:
     */
    request_failed = 1000       /* used instead of a REAL status code (sigh)  */
} status_t;
typedef status_t Status;

#define BIT(x)      (1 << (x))
#define LBIT(x)     (1L << (x))
#define BIT32(x)    (1L << x)
#define BIT16(x)    (1 << x)
```

```
/*
 * The macro MSB_FIRST indicates the natural byte ordering of the
 * processor.  For processors that store integers with their most-
 * significant bytes first (e.g. MC680x0), MSB_FIRST should be set
 * to "TRUE".  For processors that store integers least-significant
 * byte first (e.g. 80x86, VAX), MSB_FIRST should be set to "FALSE".
 */
#define MSB_FIRST   true

#endif
#endif
```

```
/*
 *  "os.h" - OS definitions
 *
 *  (c) COPYRIGHT 1993-1994 SYNERNETICS INC. ALL RIGHTS RESERVED
 *  This software is licensed and not sold. The terms of the
 *  license are set forth in a separate written agreement,
 *  which all qualified users have signed.
 *
 *  RESTRICTED RIGHTS LEGEND
 *  Use, duplication, or disclosure by the Government is subject
 *  to restrictions as set forth in subdivision (c)(1)(ii) of the
 *  Rights in Technical Data and Computer Software Clause at
 *  DFARS 252.227-7013.
 *
 *  Change history:
 *
 *    10/14/94  del  Add test_delay.
 *    06/14/94  del  Make CONVERT_AP_ADDR system-dependent
 *    05/16/94  del  Enhance non-standard beaconing
 *    04/14/94  del  Remove first set of unused panic codes
 *    03/29/94  del  Mods for initial moto set-up
 *    03/07/94  del  Mods for quake
 *    11/05/93  dcr  Added panic code for assertion failures.
 *    10/06/93  del  Original coding (from esm version)
 */


#ifndef _LANPLEX_OS_
#define _LANPLEX_OS_


#include "qkeFpIf.h"
#include "dl.h"


extern ConfigBlk config_blk;


extern void scheduler(void);
extern int32u os_alloc_event(void);
extern void os_init_event(int32u event_id, void (*handler_p)());
extern void init_scheduler(void);

extern void (*(event_handler[32]))();

extern FpApState ap_state;


/*
 *  Queueing
 */
typedef struct {
    void **entry;
    int32u head, tail, size;
} queue_t;


extern void os_initq(queue_t *queue_p, int32u size, void **entry_array);
```

```
extern status_t os_enq(queue_t *queue_p, void *entry_p);
extern void *os_deq(queue_t *queue_p);
extern boolean os_q_mt(queue_t *queue_p);


typedef struct link {
    struct link *next_p;
    struct link *prev_p;
} link_t;

typedef struct {
    link_t *head_p;
    link_t *tail_p;
    int32u count;
} list_t;


extern void os_init_ll(list_t *list_p);
extern void os_init_link(link_t *link_p);
extern void os_enq_ll(list_t *list_p, link_t *entry_p);
extern link_t *os_deq_ll(list_t *list_p);
extern void os_remove_ll(list_t *list_p, link_t *entry_p);
extern boolean os_in_ll(link_t *link_p);
extern boolean os_ll_mt(list_t *list_p);


/*
 *  Very Low Priority Event Scheduling
 */
typedef struct {
    void (*handler)();
} event_t;

extern status_t os_enq_v_lo_pri_event(event_t *event_p);
extern void init_lo_scheduler(void);


/*
 *  Dynamic Memory
 */
extern void *os_malloc(size_t size);
extern void os_free(void *address);
extern void init_mem(void);


/*
 *  Timers
 */
typedef int32u timer_id_t;

#define MAX_TIMERS                300
#define MAX_FAST_TICK_TIMERS      (4+4)    /* 1/phy + 2/fddi mac */

/* return timestamp in 500ms ticks */
extern int32u os_get_timestamp(void);
/* return timestamp in 40ns ticks */
extern int32u os_get_fine_timestamp(void);
```

```
/* return both timestamps */
extern void os_get_full_timestamp(int32u *coarse_timestamp, int32u *fine_timesta

extern timer_id_t os_alloc_timer(void (*handler_p)(), int32u param);
extern void os_free_timer(timer_id_t timer_id);
extern void os_set_timer(timer_id_t timer_id, int32u delay);
extern void init_timers(void);

extern  timer_id_t  os_alloc_fast_tick_timer(void (*handler_p)(), int32u param);
extern  void        os_free_fast_tick_timer(timer_id_t timer_id);
extern  void        os_set_fast_tick_timer(timer_id_t timer_id, int32u delay);
extern  void        os_cancel_fast_tick_timer(timer_id_t timer_id);
extern  void        init_fast_tick_timer(void);
extern  int32u      captureFpTimestamp();

/* Use the following macro on constants so compiler does the work */
#define CONVERT_MSECS_TO_TICKS(msec_delay) (((unsigned int)(msec_delay) + 499) /

#define CONVERT_SECS_TO_TICKS(sec_delay) ((unsigned int)(sec_delay) * 2)
#define CONVERT_TICKS_TO_SECS(tick_delay) ((unsigned int)(tick_delay) / 2)


/*
 *  Inter-Module Communication
 */
extern boolean imc_rcv_occurred;

typedef struct {
    link_t          link;               /* link list header */
    FacilityId      facility_id;        /* Identifies destination facility */
    int32u          facility_index;     /* Index into facility */
    int32u          command_id;         /* Identifies command */
    void            (*xmt_handler)();   /* Called when command issued */
    void            (*abort_handler)(); /* Called if command can not be issued*/
} xmt_cmd_t;

/*
 *  OS database
 *  WARNING: Statistics must come first for pcmConsole "show fp_stats" command.
 */
typedef struct {
    int32u statistics[fpMaxStatisticId];
    boolean events_enabled;
} os_db_t;


extern void os_imc_open(FacilityId facility_id, void (*handler_p)());
extern void os_imc_xmt_cmd(xmt_cmd_t *xmt_cmd_p);
extern void os_imc_rmv_xmt_cmd(xmt_cmd_t *xmt_cmd_p);
extern void os_imc_xmt_panic_cmd(xmt_cmd_t *xmt_cmd_p);
extern void imc_isr(void);
extern void os_imc_xmt_flush(void);
extern void init_imc(void);
extern void init_os_if(void);
extern void init_complete(void);
extern void os_printf();
extern void os_fp_failed(int32u error_code);
extern void init_exception();
extern void mbx_ret_rcv_buff(int32u buff_num);
```

```
extern os_db_t os_dbase;

#ifdef SUNENV
    #define PRINTF  printf
#else
    #define PRINTF  os_printf
#endif


/*
 *  The FP (AMD 29k) is capable of accessing the AP (Motorola 68340) memory
 *  only in 8-bit or 16-bit chunks.  32 bit accesses are NOT possible.  To
 *  overcome this, 32-bit accesses by the 29k to 68k memory are performed as
 *  two 16-bit accesses.
 */
#define write32(value_p, value) *(int16u *)(value_p) = (int16u)((int32u)(value)
                                *((int16u *)(value_p) + 1) = (int16u)(value)
#define read32(value_p)  ((int32u)(*((int16u *)(value_p) + 1)) | \
                         ((int32u)(*((int16u *)(value_p))) << 16))


/*
 *  Panic Codes -   Direct calls to os_panic should be made ONLY if there is a
 *                  need to capture debugging parameters.  Otherwise, ASSERT()
 *                  should be used.
 */

typedef enum {
    panic_unexpected_trap,          /* misc.c, invalid_trap()              */
    panic_data_error,               /* misc.c, invalid_derr_trap()         */
    panic_bma_error,                /* vectors.c                           */
    panic_bma_dma_error,            /* vectors.c                           */
    panic_test,                     /* os_if.c, for testing panics         */
    panic_assertion_failure = 0xff  /* generated using the ASSERT macro    */
} panic_code_t;

extern int32u   test_delay;
extern int8u    test_delay_cmd;

extern void os_panic();
extern void enable_events(void);
extern void disable_events(void);
extern boolean events_enabled;
#define os_events_enabled() os_dbase.events_enabled

extern boolean memfilled(int8u *block, int8u value, int16u count);
extern void memset(int8u *block, int8u value, int32u count);
extern void memcpy(int8u *dest, int8u *sourc, int32u n);
extern boolean memcmp(int8u *block1, int8u *block2, int32u count);

extern int addrcmp(int8u *as, int8u *at);

extern void invalid_trap(int32u trap_num, int32u pc0, int32u pc1, int32u pc2);
extern void invalid_derr_trap(char *bad_address,
                              char *next_instruction_address);

extern int32u byteswap_32(int32u x);

extern void init_test_appl(void);
```

```
extern void init_os_asm(void);

#endif
```

APPENDIX A2

```
Aug 24 11:59 1994  Who: johnf  File: /c2/local_user/bma/bma_rbsm/bma_rbsm_core.vhd Page 1

-- $Id  bma_rbsm_core.vhd,v 1.20 94/06/02 20 29:20 johnf Exp $
--
--  Author       John A. Flanders
--
--
--  Title        bma_rbsm_core :  bma_rbsm_core is the top level component of the BMA Receive Buffer
                                  State Machine. The RBSM is actually made up of five inter-dependent
                                  state machines used to control the reading of AMA and Receive Status,
                                  the reading and writing of code vectors to the 29K in queue, the writing
--                                of AMA status into the buffer frame control area, updating of byte count
--                                and filtered frame count statistics and returning buffer numbers to the
--                                return buffer event queue.
--
--
--
--  Revision History
--
--  5/19/93 :                    original version
--
--

library std;
library synopsys ;
library ieee ;
library bma_rbsm_lib ;
library bma_lib ;
library pie_ram ;

use synopsys.attributes.all;
use ieee.std_logic_1164.all;
use ieee.std_logic_arith.all;
use ieee.std_logic_unsigned.all;
use ieee.std_logic_misc.all;
use bma_rbsm_lib.bma_rbsm_types.all;
use bma_lib.bma_types.all;

-- synopsys_translate_off
use std.textio.all;
use ieee.std_logic_textio.all;
-- synopsys_translate_on


entity bma_rbsm_core is
    port(
          clock25                     : in std_logic          ; -- 25MHz clock input      (from external clock source)
          reset                       : in std_logic          ; -- system reset           (from external source)
          positive_forward_enable     : in std_logic          ; -- from microprocessor interface
          disable_enet_collide        : in std_logic          ; -- from microprocessor interface
          bma_ram_pulse               : in std_logic          ; -- BMA RAM write pulse
          rbsm_proc_sram_test         : in std_logic          ; -- RBSM RAM read port select (from 29K interface)
          rbsm_enable                 : in std_logic          ; -- RBSM master enable     (from external source)

          rcv_status_queue_outdat     : in rx_status          ; -- Receive statue queue output
          fromama_data                : in long_word          ; -- AMA status queue output
          fromama_avail               : in std_logic          ; -- AMA status available
          rcv_status_queue_avail      : in std_logic          ; -- RX status available
          ct_ll_threshold             : in port_vector        ; -- from DMA Controller : Cut Thru Low Latency Threshold
          return_fifo_full            : in std_logic          ; -- from DMA Controller : Return buffer Q full indicator

Aug 24 11:59 1994  Who: johnf  File: /c2/local_user/bma/bma_rbsm/bma_rbsm_core.vhd Page 2

          rbsm_proc_rq                : in std_logic          ; -- from 29K interface  : 29K RBSM request
          rbsm_proc_wena              : in std_logic          ; -- from 29K interface  : 29K write enable
          rbsm_proc_wdata             : in long_word          ; -- from 29K interface  : 29K write data

          rbsm_proc_addr              : in processor_address_bus : -- from 29K interface

          from_bma_fifo_in_full       : in std_logic          : -- from 29K interface
          sadd_channum                : in system_channel_number ; -- from SRAM Arbiter     : SRAM Address Channel Number
          sdat_channum                : in system_channel_number ; -- from SRAM Controller : SRAM Data Channel Number

          receive_header_offset       : in rxoff_data         ; -- from DMA Controller
          receive_body_offset         : in rxoff_data         ; -- from DMA Controller

          rbsm_error                  : buffer std_logic      ; -- RBSM Fatal Error indicater    (to 29K interface)
          rbsm_proc_ack               : buffer std_logic      ; -- to 29K interface : microprocessor acknowlegde
          rbsm_proc_rdata             : buffer long_word      ; -- to 29K interface : microprocessor read data
          status_rd_chan_sel          : buffer ama_port_number ; -- to Receive and AMA status queues : port number
          fromama_read_whichword      : buffer ama_stat_addr  ; -- to AMA status queues : word select

          fromama_read_nxt            : buffer std_logic      ; -- to AMA interface : increment AMA status Q read pnt
          rcv_status_queue_rd_nxt     : buffer std_logic      ; -- to Receive Q interface : increment RX status Q read pnt
          rx_return_buffer_number     : buffer std_logic      ; -- to DMA Controller : Return Buffer Number write enable
          rx_buffer_number_to_return  : buffer buffer_number  ; -- to DMA Controller : Buffer number to be returned
          return_bufferq_full_error   : buffer std_logic      ; -- to 29K interface : Return Buffer Q full error
          inq_full_error              : buffer std_logic      ; -- to 29K interface : Return Buffer Q full error
          from_bma_fifo_wrnxt         : buffer std_logic      ; -- to 29K interface : in Q write enable

          rx_buff_reg       : buffer buffer_number     ; -- EXTRA OUTPUT
          rx_stat_reg       : buffer long_word         ; -- EXTRA OUTPUT
          ama_stat_reg1     : buffer long_word         ; -- EXTRA OUTPUT
          ama_stat_reg2     : buffer long_word         ; -- EXTRA OUTPUT
          ama_stat_reg3     : buffer long_word         ; -- EXTRA OUTPUT

          rx_fifo_reg1             : buffer long_word  ; -- EXTRA OUTPUT
          rx_fifo_reg2             : buffer long_word  ; -- EXTRA OUTPUT
          frame_control_reg1       : buffer long_word  ; -- EXTRA OUTPUT
          frame_control_reg2       : buffer long_word  ; -- EXTRA OUTPUT

          rd_state0                : buffer std_logic  ; -- EXTRA OUTPUT
          rd_state1                : buffer std_logic  ; -- EXTRA OUTPUT

          ama_stat_rd1             : buffer std_logic  ; -- EXTRA OUTPUT
          ama_stat_rd2             : buffer std_logic  ; -- EXTRA OUTPUT
          ama_stat_rd3             : buffer std_logic  ; -- EXTRA OUTPUT

          rx_stat_rd               : buffer std_logic  ; -- EXTRA OUTPUT
          cont_scan                : buffer std_logic  ; -- EXTRA OUTPUT


          rbsm_sram_wreq  : buffer std_logic          ; -- to SRAM Arbiter : RBSM SRAM write request
          rbsm_sram_rdreq : buffer std_logic          ; -- to SRAM Arbiter : RBSM SRAM read  request
          rbsm_sram_addr  : buffer sram_address_bus   ; -- to SRAM Controller : RBSM SRAM address
          rbsm_sram_wdata : buffer long_word    )     ; -- to SRAM Controller : RBSM SRAM write data


end bma_rbsm_core ;

------------------------------------------------------------
```

Aug 24 11:59 1994 Who: johnf File: /c2/local_user/bma/bma_rbsm/bma_rbsm_core.vhd Page 3

```
---------------------------------------------------------------

architecture synthesize of bma_rbsm_core is

------------------------------------------

 signal dest_address_match     : std_logic         ;
 signal dest_group_address     : std_logic         ;
 signal dest_broadcast         : std_logic         ;
 signal dest_internal          : std_logic         ;
 signal dest_port_equal        : std_logic         ;
 signal dest_port_type         : PORT_TYPE         ;
 signal dest_port_num          : ama_port_number   ;
 signal dest_address_tag       : AMA_TAG           ;
 signal dest_address_data      : AMA_DATA          ;
 signal da_port_num            : FC_PORT_NUMBER    ;

 signal src_address_match      : std_logic         ;
 signal src_group_address      : std_logic         ;
 signal src_port_equal         : std_logic         ;
 signal src_internal           : std_logic         ;
 signal src_port_type          : PORT_TYPE         ;
 signal src_address_tag        : AMA_TAG           ;
 signal src_address_data       : AMA_DATA          ;
 signal sa_port_num            : FC_PORT_NUMBER    ;

 signal src_port_not_forwarding               : std_logic    ;
 signal dest_port_not_forwarding              : std_logic    ;
 signal any_enet_dest_tx_filter               : std_logic    ;
 signal any_enet_dest_tx_multicast_filter     : std_logic    ;
 signal any_dest_tx_multicast_filter          : std_logic    ;

 signal rx_end_of_buffer     : std_logic        ;
 signal fddi_abort           : std_logic        ;
 signal enet_abort           : std_logic        ;
 signal dest_port            : ama_port_number  ;
 signal buffer_num_neq       : std_logic        ;
 signal dest_allowed         : std_logic        ;
 signal return_buffer_write_pulse : std_logic   ;
 signal frame_byte_count     : BYTE_CNT         ;
 signal llc_frame_type       : std_logic        ;

 signal ama_stat_rd          : std_logic        ;

 signal load_sram_wregs      : std_logic        ;
 signal rbsm_sram_ready      : std_logic        ;
 signal load_stat_wregs      : std_logic        ;
 signal rbsm_ram_ready       : std_logic        ;
 signal sram_wr_done         : std_logic        ;

 signal rbsm_sdata_sel0      : std_logic        ;
 signal rbsm_sdata_sel1      : std_logic        ;
 signal rbsm_read_wait       : std_logic        ;
 signal src_address_status   : SA_STATUS        ;

 signal rx_buffer_number     : buffer_number    ;
```

Aug 24 11:59 1994 Who: johnf File: /c2/local_user/bma/bma_rbsm/bma_rbsm_core.vhd Page 4

```
 signal ama_buffer_number    : buffer_number    ;

 signal cut_thru_end         : std_logic        ;
 signal cut_thru_begin       : std_logic        ;

 signal wr_cv_only           : std_logic        ;
 signal rbsm_port_addr       : RBSM_RAM_ADDR    ;

 signal reg_read_data        : RBSM_REGISTER_DATA ;
 signal qcb_reg_rdata        : QCB_REG_DATA       ;

 signal rbsm_fifo_full       : std_logic        ;
 signal rbsm_fifo_empty      : std_logic        ;
 signal rbsm_saddr_sel       : std_logic        ;

 signal code_vector_addr     : sram_address_bus ;
 signal frame_control_addr   : sram_address_bus ;

 signal rx_stat_rq           : std_logic        ;
 signal ama_stat_rq          : std_logic        ;
 signal rx_stat_rewind       : std_logic        ;
 signal ama_stat_rewind      : std_logic        ;

 signal scan_vector          : SCAN_VEC         ;
 signal scan                 : std_logic        ;
 signal cont_scan4           : std_logic        ;

 signal ama_set              : port_vector      ;
 signal unload               : port_vector      ;
 signal rd_allowed           : port_vector      ;
 signal ct_active            : EPORT_VEC        ;
 signal port_req             : port_vector      ;
 signal ama_only             : port_vector      ;
 signal rx_ama_req           : port_vector      ;
 signal multi_buffer         : FPORT_VEC        ;
 signal not_first            : FPORT_VEC        ;

 signal src_ct_allowed          : std_logic     ;
 signal src_ct_active           : std_logic     ;
 signal dest_ct_allowed         : std_logic     ;
 signal multicast_ct_allowed    : std_logic     ;
 signal bbone_src_ct            : std_logic     ;
 signal bbone_dest_ct           : std_logic     ;
 signal bbone_multicast_ct      : std_logic     ;

 signal rxport_equals_bbone     : std_logic     ;
 signal transmit_port_num       : port_number   ;
 signal invalid_dest_port       : std_logic     ;

 signal fddi_multi_buffer       : std_logic     ;
 signal ethernet_eof            : std_logic     ;
 signal fddi_eof                : std_logic     ;
 signal ethernet_rx_error       : std_logic     ;
 signal fddi_rx_error           : std_logic     ;

 signal discard_frame                       : std_logic   ;
 signal rx_filter_on                        : std_logic   ;
```

```
Aug 24 11:59 1994  Who: johnf  File: /c2/local_user/bma/bma_rbsm/bma_rbsm_core.vhd Page 5

  signal tx_filter_on                           : std_logic ;
  signal rx_disable_on                          : std_logic ;
  signal tx_disable_on                          : std_logic ;
  signal rx_monitor_on                          : std_logic ;
  signal tx_monitor_on                          : std_logic ;
  signal rx_multicast_disable_on                : std_logic ;
  signal rx_multicast_filter_on                 : std_logic ;
  signal tx_multicast_filter_on                 : std_logic ;
  signal port_blocking_on                       : std_logic ;
  signal dest_port_blocking                     : std_logic ;
  signal any_multicast_cut_thru_disabled        : std_logic ;
  signal any_dest_tx_disabled                   : std_logic ;
  signal any_dest_tx_multicast_disabled         : std_logic ;
  signal any_dest_tx_filter                     : std_logic ;
  signal any_dest_port_not_forwarding           : std_logic ;
  signal any_dest_port_blocking                 : std_logic ;
  signal any_dest_monitor_on                    : std_logic ;
  signal any_dest_multicast_monitor_on          : std_logic ;
  signal any_src_port_not_forwarding            : std_logic ;

  signal rbsm_proc_ram_addr                     : RBSM_RAM_ADDR ;
  signal rbsm_ram_wr_addr                       : RBSM_RAM_ADDR ;
  signal rbsm_ram_wr_data                       : long_word ;
  signal rbsm_alu_rd_data                       : long_word ;
  signal rbsm_micro_rd_data                     : long_word ;
  signal rbsm_ram_wena                          : std_logic ;
  signal rbsm_ram_wrstb                         : std_logic ;

  signal port0_data                             : RBSM_REGISTER_DATA ;
  signal port1_data                             : RBSM_REGISTER_DATA ;
  signal port2_data                             : RBSM_REGISTER_DATA ;
  signal port3_data                             : RBSM_REGISTER_DATA ;
  signal port4_data                             : RBSM_REGISTER_DATA ;
  signal port5_data                             : RBSM_REGISTER_DATA ;
  signal port6_data                             : RBSM_REGISTER_DATA ;
  signal port7_data                             : RBSM_REGISTER_DATA ;
  signal port8_data                             : RBSM_REGISTER_DATA ;
  signal port9_data                             : RBSM_REGISTER_DATA ;
  signal port10_data                            : RBSM_REGISTER_DATA ;
  signal port11_data                            : RBSM_REGISTER_DATA ;
  signal port12_data                            : RBSM_REGISTER_DATA ;
  signal port13_data                            : RBSM_REGISTER_DATA ;
  signal port14_data                            : RBSM_REGISTER_DATA ;
  signal port15_data                            : RBSM_REGISTER_DATA ;
  signal port16_data                            : RBSM_REGISTER_DATA ;
  signal port17_data                            : RBSM_REGISTER_DATA ;

  signal ct_enable                              : port_vector ;
  signal ct_multicast_enable                    : port_vector ;
  signal rx_disable                             : port_vector ;
  signal rx_multicast_disable                   : port_vector ;
  signal tx_disable                             : port_vector ;
  signal tx_multicast_disable                   : port_vector ;
  signal port_blocking                          : port_vector ;
  signal port_not_forwarding                    : port_vector ;
  signal rx_filter                              : port_vector ;
  signal rx_multicast_filter                    : port_vector ;
  signal tx_filter                              : port_vector ;
  signal tx_multicast_filter                    : port_vector ;
  signal monitor_enable                         : port_vector ;

Aug 24 11:59 1994  Who: johnf  File: /c2/local_user/bma/bma_rbsm/bma_rbsm_core.vhd Page 6

  signal port_type_msb                          : port_vector ;
  signal port_type_mid                          : port_vector ;
  signal port_type_lsb                          : port_vector ;

  signal code_vector                            : CV_CODE ;

  signal start_pnt                              : QCB_REG_DATA ;
  signal write_pnt                              : QCB_REG_DATA ;
  signal read_pnt                               : QCB_REG_DATA ;
  signal end_pnt                                : QCB_REG_DATA ;

  signal start_pnt_a                            : QCB_REG_DATA ;
  signal write_pnt_a                            : QCB_REG_DATA ;
  signal read_pnt_a                             : QCB_REG_DATA ;
  signal end_pnt_a                              : QCB_REG_DATA ;

  signal load_return_bufferq_wreg               : std_logic ;
  signal return_bufferq_ready                   : std_logic ;

  signal filter_frame                           : std_logic ;
  signal dest_enabled                           : std_logic ;

  signal ram_output_enable                      : std_logic ;

  signal fragment_frame                         : std_logic ;
  signal dest_filter_flag                       : std_logic ;
  signal src_filter_flag                        : std_logic ;
  signal destination_monitor                    : std_logic ;
  signal translation_code                       : TC_CODE ;

  signal frag_reg_rdata                         : FRAG_REG_DATA ;
  signal frag_reg_wdata                         : FRAG_REG_DATA ;
  signal frag_register                          : FRAG_REG_DATA ;

  signal bbone_register                         : BBONE_REG_DATA ;
  signal bbone_reg_rdata                        : BBONE_REG_DATA ;

  signal rega_read_data               : RBSM_REGISTER_DATA ;
  signal regb_read_data               : RBSM_REGISTER_DATA ;
  signal regc_read_data               : RBSM_REGISTER_DATA ;

  signal ct_enable_a                  : PORT_CONFIG ;
  signal ct_multicast_enable_a        : PORT_CONFIG ;
  signal rx_disable_a                 : PORT_CONFIG ;
  signal rx_multicast_disable_a       : PORT_CONFIG ;
  signal tx_disable_a                 : PORT_CONFIG ;
  signal tx_multicast_disable_a       : PORT_CONFIG ;
  signal port_blocking_a              : PORT_CONFIG ;
  signal port_not_forwarding_a        : PORT_CONFIG ;
  signal rx_filter_a                  : PORT_CONFIG ;
  signal rx_multicast_filter_a        : PORT_CONFIG ;
  signal tx_filter_a                  : PORT_CONFIG ;
  signal tx_multicast_filter_a        : PORT_CONFIG ;
  signal monitor_enable_a             : PORT_CONFIG ;
  signal port_type_msb_a              : PORT_CONFIG ;
  signal port_type_mid_a              : PORT_CONFIG ;
  signal port_type_lsb_a              : PORT_CONFIG ;
```

```
Aug 24 11:59 1994  Who: johnf  File: /c2/local_user/bma/bma_rbsm/bma_rbsm_core.vhd Page 7

signal ct_enable_b                  : PORT_CONFIG   ;
signal ct_multicast_enable_b        : PORT_CONFIG   ;
signal rx_disable_b                 : PORT_CONFIG   ;
signal rx_multicast_disable_b       : PORT_CONFIG   ;
signal tx_disable_b                 : PORT_CONFIG   ;
signal tx_multicast_disable_b       : PORT_CONFIG   ;
signal port_blocking_b              : PORT_CONFIG   ;
signal port_not_forwarding_b        : PORT_CONFIG   ;
signal rx_filter_b                  : PORT_CONFIG   ;
signal rx_multicast_filter_b        : PORT_CONFIG   ;
signal tx_filter_b                  : PORT_CONFIG   ;
signal tx_multicast_filter_b        : PORT_CONFIG   ;
signal monitor_enable_b             : PORT_CONFIG   ;
signal port_type_msb_b              : PORT_CONFIG   ;
signal port_type_mid_b              : PORT_CONFIG   ;
signal port_type_lsb_b              : PORT_CONFIG   ;

signal ct_enable_c                  : PORT_CONFIG   ;
signal ct_multicast_enable_c        : PORT_CONFIG   ;
signal rx_disable_c                 : PORT_CONFIG   ;
signal rx_multicast_disable_c       : PORT_CONFIG   ;
signal tx_disable_c                 : PORT_CONFIG   ;
signal tx_multicast_disable_c       : PORT_CONFIG   ;
signal port_blocking_c              : PORT_CONFIG   ;
signal port_not_forwarding_c        : PORT_CONFIG   ;
signal rx_filter_c                  : PORT_CONFIG   ;
signal rx_multicast_filter_c        : PORT_CONFIG   ;
signal tx_filter_c                  : PORT_CONFIG   ;
signal tx_multicast_filter_c        : PORT_CONFIG   ;
signal monitor_enable_c             : PORT_CONFIG   ;
signal port_type_msb_c              : PORT_CONFIG   ;
signal port_type_mid_c              : PORT_CONFIG   ;
signal port_type_lsb_c              : PORT_CONFIG   ;

signal frame_cntl_addr              : rxoff_data    ;

-- component declarations

component rbsm_code_vectors
port(
clock25                             : in     std_logic    ;
reset                               : in     std_logic    ;
ethernet_eof                        : in     std_logic    ;
fddi_eof                            : in     std_logic    ;
fddi_multi_buffer                   : in     std_logic    ;
dest_group_address                  : in     std_logic    ;
dest_broadcast                      : in     std_logic    ;
dest_address_match                  : in     std_logic    ;
dest_internal                       : in     std_logic    ;
filter_frame                        : in     std_logic    ;
ethernet_rx_error                   : in     std_logic    ;
fddi_abort                          : in     std_logic    ;
enol_abort                          : in     std_logic    ;
llc_frame_type                      : in     std_logic    ;
fddi_rx_error                       : in     std_logic    ;
dest_port_type                      : in     PORT_TYPE    ;
fragment_frame                      : in     std_logic    ;
src_ct_allowed                      : in     std_logic    ;
multicast_cl_allowed                : in     std_logic    ;

Aug 24 11:59 1994  Who: johnf  File: /c2/local_user/bma/bma_rbsm/bma_rbsm_core.vhd Page 8

dest_ct_allowed                     : in     std_logic    ;
rx_disable_on                       : in     std_logic    ;
rx_multicast_disable_on             : in     std_logic    ;
rx_filter_on                        : in     std_logic    ;
rx_monitor_on                       : in     std_logic    ;
rx_multicast_filter_on              : in     std_logic    ;
tx_disable_on                       : in     std_logic    ;
tx_filter_on                        : in     std_logic    ;
tx_monitor_on                       : in     std_logic    ;
port_blocking_on                    : in     std_logic    ;
dest_port_blocking                  : in     std_logic    ;
src_port_not_forwarding             : in     std_logic    ;
dest_port_not_forwarding            : in     std_logic    ;
any_multicast_cut_thru_disabled     : in     std_logic    ;
any_enet_dest_tx_filter             : in     std_logic    ;
any_enet_dest_tx_multicast_filter   : in     std_logic    ;
any_dest_tx_disabled                : in     std_logic    ;
any_dest_tx_multicast_disabled      : in     std_logic    ;
any_dest_tx_filter                  : in     std_logic    ;
any_dest_tx_multicast_filter        : in     std_logic    ;
any_dest_port_not_forwarding        : in     std_logic    ;
any_dest_port_blocking              : in     std_logic    ;
any_dest_monitor_on                 : in     std_logic    ;
any_dest_multicast_monitor_on       : in     std_logic    ;
src_address_status                  : in     SA_STATUS    ;
cut_thru_end                        : in     std_logic    ;
cont_scan                           : in     std_logic    ;
positive_forward_enable             : in     std_logic    ;
rxport_equals_bbone                 : in     std_logic    ;
bbone_src_ct                        : in     std_logic    ;
bbone_dest_ct                       : in     std_logic    ;
bbone_multicast_ct                  : in     std_logic    ;
destination_monitor                 : buffer std_logic    ;
code_vector                         : buffer CV_CODE      );
end component;

component rbsm_unload
port(
clock25          : in     std_logic     ;
reset            : in     std_logic     ;
cont_scan        : in     std_logic     ;
rx_end_ct_buffer : in     std_logic     ;
rd_state0        : in     std_logic     ;
rd_state1        : in     std_logic     ;
ama_sel          : in     port_vector   ;
scan_vector      : in     SCAN_VEC      ;
ethernet_eof     : buffer std_logic     ;
fddi_eof         : buffer std_logic     ;
unload           : buffer port_vector   );
end component;

component rbsm_status_regaiters
port(
clock25                   : in     std_logic    ;
reset                     : in     std_logic    ;
rx_stat_rd                : in     std_logic    ;
ama_stat_rd1              : in     std_logic    ;
```

```
Aug 24 11:59 1994  Who: johnf  File: /c2/local_user/bma/bma_rbsm/bma_rbsm_core.vhd Page 9

ama_stat_rd2              : in     std_logic    ;
ama_stat_rd3              : in     std_logic    ;
ama_status                : in     long_word    ;
rcv_status                : in     rx_status    ;
ethernet_eof              : in     std_logic    ;
fddi_eof                  : in     std_logic    ;
cut_thru_end              : in     std_logic    ;
 _disable_on              : in     std_logic    ;
  _multicast_disable_on   : in     std_logic    ;
 rt_blocking_on           : in     std_logic    ;
rx_monitor_on             : in     std_logic    ;
destination_monitor       : in     std_logic    ;
dest_port_type            : in     PORT_TYPE    ;
src_port_type             : in     PORT_TYPE    ;
positive_forward_enable   : in     std_logic    ;
rxport_equals_bbone       : in     std_logic    ;
invalid_dest_port         : in     std_logic    ;
disable_enet_collide      : in     std_logic    ;
src_ct_active             : in     std_logic    ;
dest_group_address        : buffer std_logic    ;
dest_address_match        : buffer std_logic    ;
dest_address_tag          : buffer AMA_TAG      ;
dest_address_data         : buffer AMA_DATA     ;
dest_port_equal           : buffer std_logic    ;
dest_port_num             : buffer port_number  ;
da_port_num               : buffer FC_PORT_NUMBER ;
dest_broadcast            : buffer std_logic    ;
dest_internal             : buffer std_logic    ;
dest_filter_flag          : buffer std_logic    ;
src_group_address         : buffer std_logic    ;
src_address_match         : buffer std_logic    ;
src_address_tag           : buffer AMA_TAG      ;
src_address_data          : buffer AMA_DATA     ;
src_port_equal            : buffer std_logic    ;
src_internal              : buffer std_logic    ;
src_filter_flag           : buffer std_logic    ;
sa_port_num               : buffer FC_PORT_NUMBER ;
frame_byte_count          : buffer BYTE_CNT     ;
rx_end_of_buffer          : buffer std_logic    ;
fddi_abort                : buffer std_logic    ;
rx_stat_reg               : buffer long_word    ;
rx_buff_reg               : buffer buffer_number ;
rx_buffer_number          : buffer buffer_number ;
ama_buffer_number         : buffer buffer_number ;
filter_frame              : buffer std_logic    ;
discard_frame             : buffer std_logic    ;
ethernet_rx_error         : buffer std_logic    ;
fddi_rx_error             : buffer std_logic    ;
llc_frame_type            : buffer std_logic    ;
enet_abort                : buffer std_logic    ;
ama_stat_reg1             : buffer long_word    ;
ama_stat_reg2             : buffer long_word    ;
ama_stat_reg3             : buffer long_word    );
end component;


component rbsm_stat_control
port(
clock25             : in     std_logic    ;
```

```
Aug 24 11:59 1994  Who: johnf  File: /c2/local_user/bma/bma_rbsm/bma_rbsm_core.vhd Page 10

reset               : in     std_logic    ;
rbsm_enable         : in     std_logic    ;
rx_stat_rq          : in     std_logic    ;
ama_stat_rq         : in     std_logic    ;
rx_end_of_buffer    : in     std_logic    ;
filter_frame        : in     std_logic    ;
discard_frame       : in     std_logic    ;
rx_monitor_on       : in     std_logic    ;
fddi_abort          : in     std_logic    ;
enet_abort          : in     std_logic    ;
sram_rdy            : in     std_logic    ;
stat_rdy            : in     std_logic    ;
bufq_rdy            : in     std_logic    ;
buffer_num_neq      : in     std_logic    ;
cut_thru_begin      : in     std_logic    ;
fddi_rx_error       : in     std_logic    ;
ethernet_rx_error   : in     std_logic    ;
dest_port_type      : in     PORT_TYPE    ;
ama_set             : in     port_vector  ;
port_req            : in     port_vector  ;
not_first           : in     FPORT_VEC    ;
scan_vector         : in     SCAN_VEC     ;
cont_scan           : buffer std_logic    ;
cont_scan4          : buffer std_logic    ;
scan                : buffer std_logic    ;
rd_state0           : buffer std_logic    ;
rd_state1           : buffer std_logic    ;
ama_stat_rd         : buffer std_logic    ;
ama_stat_rd1        : buffer std_logic    ;
ama_stat_rd2        : buffer std_logic    ;
ama_stat_rd3        : buffer std_logic    ;
ama_status_next     : buffer std_logic    ;
rx_status_next      : buffer std_logic    ;
rbsm_error          : buffer std_logic    ;
rx_stat_rd          : buffer std_logic    ;
fromama_read_whichword : buffer ama_stat_addr );
end component;


component rbsm_sram_registers
port(
clock25                   : in     std_logic    ;
reset                     : in     std_logic    ;
load_sram_wregs           : in     std_logic    ;
rbsm_sdata_sel0           : in     std_logic    ;
rbsm_sdata_sel1           : in     std_logic    ;
src_address_status        : in     SA_STATUS    ;
 ode_vector               : in     CV_CODE      ;
 anslation_code           : in     TC_CODE      ;
 ant_scan                 : in     std_logic    ;
cut_thru_end              : in     std_logic    ;
cut_thru_begin            : in     std_logic    ;
fddi_multi_buffer         : in     std_logic    ;
scan_vector               : in     SCAN_VEC     ;
ama_buffer_number         : in     buffer_number ;
rx_buff_reg               : in     buffer_number ;
dest_address_match        : in     std_logic    ;
dest_group_address        : in     std_logic    ;
dest_address_tag          : in     AMA_TAG      ;
```

```
Aug 24 11:59 1994  Who: johnf  File: /c2/local_user/bma/bma_rbsm/bma_rbsm_core.vhd Page 11

dest_address_data          : in     AMA_DATA              ;
da_port_num                : in     FC_PORT_NUMBER        ;
src_address_match          : in     std_logic             ;
src_port_equal             : in     std_logic             ;
src_address_tag            : in     AMA_TAG               ;
src_address_data           : in     AMA_DATA              ;
sa_port_num                : in     FC_PORT_NUMBER        ;
frame_byte_count           : in     BYTE_CNT              ;
receive_body_offset        : in rxoff_data                ;
positive_forward_enable    : in     std_logic             ;
bbone_register             : in     BBONE_REG_DATA        ;
rx_end_of_buffer           : in     std_logic             ;
transmit_port_num          : buffer port_number           ;
rx_fifo_reg1               : buffer long_word             ;
rx_fifo_reg2               : buffer long_word             ;
frame_control_reg1         : buffer long_word             ;
frame_control_reg2         : buffer long_word             ;
rbsm_sram_wdata            : buffer long_word             );
end component;

component rbsm_sram_control
port(
clock25                      : in     std_logic             ;
reset                        : in     std_logic             ;
rbsm_enable                  : in     std_logic             ;
cont_scan                    : in     std_logic             ;
scan_vector16                : in     std_logic             ;
scan_vector17                : in     std_logic             ;
scan_vector18                : in     std_logic             ;
scan_vector19                : in     std_logic             ;
rbsm_fifo_full               : in     std_logic             ;
rbsm_fifo_empty              : in     std_logic             ;
rx_buffer_number             : in     buffer_number         ;
ama_buffer_number            : in     buffer_number         ;
sadd_channum                 : in     system_channel_number ;
sdat_channum                 : in     system_channel_number ;
code_vector_addr             : in     sram_address_bus      ;
filter_frame                 : in     std_logic             ;
discard_frame                : in     std_logic             ;
rx_monitor_on                : in     std_logic             ;
destination_monitor          : in     std_logic             ;
cut_thru_end                 : in     std_logic             ;
cut_thru_begin               : in     std_logic             ;
ethernet_eof                 : in     std_logic             ;
fddi_eof                     : in     std_logic             ;
ethernet_rx_error            : in     std_logic             ;
fddi_rx_error                : in     std_logic             ;
fddi_abort                   : in     std_logic             ;
enet_abort                   : in     std_logic             ;
llc_frame_type               : in     std_logic             ;
rx_end_of_buffer             : in     std_logic             ;
fddi_multi_buffer            : in     std_logic             ;
from_bma_fifo_in_full        : in     std_logic             ;
frame_cntl_addr              : in     rxoff_data            ;
rbsm_sram_ready              : buffer std_logic             ;
load_sram_wregs              : buffer std_logic             ;
wr_cv_only                   : buffer std_logic             ;
frame_control_addr           : buffer sram_address_bus      ;
sram_wr_done                 : buffer std_logic             ;

Aug 24 11:59 1994  Who: johnf  File: /c2/local_user/bma/bma_rbsm/bma_rbsm_core.vhd Page 12

rbsm_read_wait               : buffer std_logic             ;
from_bma_fifo_wrnxt          : buffer std_logic             ;
rbsm_sdata_sel0              : buffer std_logic             ;
rbsm_sdata_sel1              : buffer std_logic             ;
rbsm_saddr_sel               : buffer std_logic             ;
rbsm_sram_rdreq              : buffer std_logic             ;
rbsm_sram_wreq               : buffer std_logic             ;
microprocessor_inq_full_error : buffer std_logic            ;
rbsm_sram_addr               : buffer sram_address_bus      );
end component;

component rbsm_scanner
port(
clock25       : in     std_logic     ;
reset         : in     std_logic     ;
scan          : in     std_logic     ;
scan_vector   : buffer SCAN_VEC      ;
rbsm_port_num : buffer port_number   );
end component;

component rbsm_sa_status
port(
src_address_match    : in     std_logic     ;
src_group_address    : in     std_logic     ;
src_port_equal       : in     std_logic     ;
src_address_status   : buffer SA_STATUS     );
end component;

component rbsm_ret_buf_cnt
port(
clock25                        : in     std_logic     ;
reset                          : in     std_logic     ;
scan_vector16                  : in     std_logic     ;
scan_vector17                  : in     std_logic     ;
scan_vector18                  : in     std_logic     ;
scan_vector19                  : in     std_logic     ;
filter_frame                   : in     std_logic     ;
discard_frame                  : in     std_logic     ;
rx_monitor_on                  : in     std_logic     ;
fddi_abort                     : in     std_logic     ;
enet_abort                     : in     std_logic     ;
rx_end_of_buffer               : in     std_logic     ;
cont_scan                      : in     std_logic     ;
return_bufferq_full            : in     std_logic     ;
rx_buffer_number               : in     buffer_number ;
return_bufferq_ready           : buffer std_logic     ;
return_buffer_write_enable     : buffer std_logic     ;
return_buffer_write_pulse      : buffer std_logic     ;
load_return_bufferq_wreg       : buffer std_logic     ;
return_bufferq_full_error      : buffer std_logic     ;
buffer_number_tobe_returned    : buffer buffer_number );
end component;

component rbsm_request
port(
ama_avail     : in     std_logic     ;
```

```
Aug 24 11:59 1994  Who: johnf  File: /c2/local_user/bma/bma_rbsm/bma_rbsm_core.vhd Page 13

rx_avail          : in      std_logic       ;
ct_enable         : in      port_vector     ;
rd_allowed        : in      port_vector     ;
ct_il_threshold : in        port_vector     ;
ama_sel           : in      port_vector     ;
scan_vector       : in      SCAN_VEC        ;
rx_stat_rq        : buffer  std_logic       ;
 a_stat_rq        : buffer  std_logic       ;
 a_only           : buffer  port_vector     ;
 x_ama_req        : buffer  port_vector     ;
port_req          : buffer  port_vector     );
end component;

component rbsm_rd_allowed
port(
clock25           : in      std_logic       ;
reset             : in      std_logic       ;
cont_scan         : in      std_logic       ;
rd_state0         : in      std_logic       ;
rd_state1         : in      std_logic       ;
scan_vector       : in      SCAN_VEC        ;
ama_set           : in      port_vector     ;
unload            : in      port_vector     ;
rd_allowed        : buffer  port_vector     );
end component;

component rbsm_ram_control
port(
clock25                 : in      std_logic       ;
reset                   : in      std_logic       ;
rbsm_proc_sram_test     : in      std_logic       ;
cont_scan               : in      std_logic       ;
unload                  : in      port_vector     ;
scan_vector             : in      SCAN_VEC        ;
fddi_abort              : in      std_logic       ;
enet_abort              : in      std_logic       ;
rd_state1               : in      std_logic       ;
rbsm_error              : in      std_logic       ;
discard_frame           : in      std_logic       ;
rbsm_port_num           : in      port_number     ;
frame_byte_count        : in      BYTE_CNT        ;
reg_read_data           : in      RBSM_REGISTER_DATA  ;
rbsm_alu_rd_data        : in      long_word       ;
rbsm_micro_rd_data      : in      long_word       ;
qcb_reg_rdata           : in      QCB_REG_DATA    ;
frag_reg_rdata          : in      FRAG_REG_DATA   ;
bbone_reg_rdata         : in      BBONE_REG_DATA  ;
rbsm_proc_rq            : in      std_logic       ;
rbsm_proc_wena          : in      std_logic       ;
rbsm_proc_addr          : in      processor_address_bus   ;
rbsm_proc_wdata         : in      long_word       ;
rbsm_ram_ready          : buffer  std_logic       ;
rbsm_proc_ack           : buffer  std_logic       ;
load_stat_wregs         : buffer  std_logic       ;
rbsm_proc_rdata         : buffer  long_word       ;
rbsm_ram_wena           : buffer  std_logic       ;
rbsm_port_addr          : buffer  RBSM_RAM_ADDR   ;
rbsm_proc_ram_addr      : buffer  RBSM_RAM_ADDR   ;
rbsm_ram_wr_addr        : buffer  RBSM_RAM_ADDR   ;
```

```
Aug 24 11:59 1994  Who: johnf  File: /c2/local_user/bma/bma_rbsm/bma_rbsm_core.vhd Page 14

rbsm_ram_wr_data        : buffer  long_word       );
end component;

component r021rsc
port(
aadr      : in RBSM_RAM_ADDR ;
oea       : in std_logic ;
doa       : buffer long_word ;
badr      : in RBSM_RAM_ADDR ;
oeb       : in std_logic ;
dob       : buffer long_word ;
cadr      : in RBSM_RAM_ADDR ;
we        : in std_logic ;
dic       : in long_word );
end component;


component rbsm_qcb
port(
rbsm_proc_rq        : in      std_logic       ;
rbsm_proc_wena      : in      std_logic       ;
rbsm_proc_ack       : in      std_logic       ;
rbsm_proc_addr      : in      processor_address_bus   ;
qcb_reg_wdata       : in      QCB_REG_DATA    ;
rbsm_saddr_sel      : in      std_logic       ;
sadd_channum        : in      system_channel_number       ;
start_pnt           : in      QCB_REG_DATA    ;
write_pnt           : in      QCB_REG_DATA    ;
read_pnt            : in      QCB_REG_DATA    ;
end_pnt             : in      QCB_REG_DATA    ;
start_pnt_a         : buffer  QCB_REG_DATA    ;
write_pnt_a         : buffer  QCB_REG_DATA    ;
read_pnt_a          : buffer  QCB_REG_DATA    ;
end_pnt_a           : buffer  QCB_REG_DATA    ;
code_vector_addr    : buffer  sram_address_bus        ;
qcb_reg_rdata       : buffer  QCB_REG_DATA    ;
rbsm_fifo_empty     : buffer  std_logic       ;
rbsm_fifo_full      : buffer  std_logic       );
end component;

component rbsm_qcb_sync
port(
clock25       : in      std_logic       ;
reset         : in      std_logic       ;
start_pnt_a   : in      QCB_REG_DATA    ;
 rite_pnt_a   : in      QCB_REG_DATA    ;
  ad_pnt_a    : in      QCB_REG_DATA    ;
 nd_pnt_a     : in      QCB_REG_DATA    ;
start_pnt     : buffer  QCB_REG_DATA    ;
write_pnt     : buffer  QCB_REG_DATA    ;
read_pnt      : buffer  QCB_REG_DATA    ;
end_pnt       : buffer  QCB_REG_DATA );
end component;

component rbsm_not_first
port(
```

```
Aug 24 11:59 1994  Who  johnf  File: /c2/local_user/bma/bma_rbsm/bma_rbsm_core.vhd Page 15

clock25            in      std_logic
reset              in      std_logic     ;
cont_scan          in      std_logic     ;
scan_voctor16      in      std_logic     ;
scan_vector17      in      std_logic     ;
scan_vector18      in      std_logic     ;
scan_vector19      in      std_logic     ;
 *load             in      port_vector   ;
  lti_buffer       in      FPORT_VEC     ;
 .l_first          buffer  FPORT_VEC     );
end component;

component rbsm_multi_buffer
port(
clock25            : in      std_logic
reset              : in      std_logic
cont_scan          : in      std_logic
rx_end_of_buffer   : in      std_logic
rd_state0          : in      std_logic
rd_state1          : in      std_logic
scan_vector16      : in      std_logic     ;
scan_vector17      : in      std_logic     ;
scan_vector18        in      std_logic     ;
scan_vector19        in      std_logic     ;
unload16           : in      std_logic     ;
unload17           : in      std_logic     ;
nol_first          : in      FPORT_VEC     ;
fddi_multi_buffer  : buffer  std_logic     ;
multi_buffer       : buffer  FPORT_VEC     );
end component;


component rbsm_ct_active
port(
clock25                 : in      std_logic     ;
reset                   : in      std_logic     ;
rd_state0               : in      std_logic     ;
rd_state1               : in      std_logic     ;
cont_scan               : in      std_logic     ;
dest_group_address      : in      std_logic     ;
src_ct_allowed          : in      std_logic     ;
dest_ct_allowed         : in      std_logic     ;
multicast_ct_allowed    : in      std_logic     ;
scan_vector             : in      SCAN_VEC      ;
unload                  : in      port_vector   ;
positive_forward_enable : in      std_logic     ;
rxport_equals_bbone     : in      std_logic     ;
bbone_src_ct            : in      std_logic     ;
bbone_dest_ct           : in      std_logic     ;
bbone_multicast_ct      : in      std_logic
cut_thru_begin          : buffer  std_logic     ;
cut_thru_end            : buffer  std_logic     ;
src_ct_active           : buffer  std_logic     ;
ct_active               : buffer  EPORT_VEC     );
end component;

component rbsm_compl1
```

```
Aug 24 11:59 1994  Who: johnf  File: /c2/local_user/bma/bma_rbsm/bma_rbsm_core.vhd Page 16

port(
ama_buffer_number  : in      buffer_number   ;
rx_buffer_number   : in      buffer_number   ;
buffer_num_neq     : buffer  std_logic       );
end component;

component rbsm_ama_set
port(
clock25        : in      std_logic     ;
reset          : in      std_logic     ;
cont_scan        in      std_logic     ;
rd_state0      : in      std_logic     ;
rd_state1        in      std_logic     ;
scan_vector      in      SCAN_VEC      ;
ama_only         in      port_vector   ;
ama_set        : buffer  port_vector   );
end component;

component rbsm_config
port(
scan_vector                 : in      SCAN_VEC      ;
ct_ll_threshold             : in      port_vector   ;
ama_set                     : in      port_vector   ;
dest_port_num               : in      port_number   ;
dest_address_match          : in      std_logic     ;
dest_group_address          : in      std_logic     ;
dest_port_equal             : in      std_logic     ;
dest_internal               : in      std_logic     ;
src_group_address           : in      std_logic     ;
src_address_match           : in      std_logic     ;
src_port_equal              : in      std_logic     ;
src_internal                : in      std_logic     ;
ct_enable                   : in      port_vector   ;
ct_multicast_enable         : in      port_vector   ;
rx_disable                  : in      port_vector   ;
rx_multicast_disable        : in      port_vector   ;
tx_disable                  : in      port_vector   ;
tx_multicast_disable        : in      port_vector   ;
port_blocking               : in      port_vector   ;
port_not_forwarding         : in      port_vector   ;
rx_filter                   : in      port_vector   ;
rx_multicast_filter         : in      port_vector   ;
tx_filter                   : in      port_vector   ;
tx_multicast_filter         : in      port_vector   ;
monitor_enable              : in      port_vector   ;
port_type_msb               : in      port_vector   ;
'ort_type_mid               : in      port_vector   ;
   rt_type_lsb              : in      port_vector   ;
   ansmit_port_num          : in      port_number   ;
,ositive_forward_enable     : in      std_logic     ;
bbone_register              : in      BBONE_REG_DATA  ;
dest_port_type              : buffer  PORT_TYPE     ;
src_port_type               : buffer  PORT_TYPE     ;
src_ct_allowed              : buffer  std_logic     ;
dest_ct_allowed             : buffer  std_logic     ;
multicast_ct_allowed        : buffer  std_logic     ;
invalid_dest_port           : buffer  std_logic     ;
rx_filter_on                : buffer  std_logic     ;
```

```
Aug 24 11:59 1994  Who: johnf  File: /c2/local_user/bma/bma_rbsm/bma_rbsm_core.vhd Page 17

tx_filter_on                          : buffer std_logic ;
rx_disable_on                         : buffer std_logic ;
tx_disable_on                         : buffer std_logic ;
rx_monitor_on                         : buffer std_logic ;
tx_monitor_on                         : buffer std_logic ;
rx_multicast_disable_on               : buffer std_logic ;
rx_multicast_filter_on                : buffer std_logic ;
   multicast_filter_on                : buffer std_logic ;
  rt_blocking_on                      : buffer std_logic ;
 st_port_blocking                     : buffer std_logic ;
any_multicast_cut_thru_disabled       : buffer std_logic ;
any_enet_dest_tx_filter               : buffer std_logic ;
any_enet_dest_tx_multicast_filter     : buffer std_logic ;
any_dest_tx_disabled                  : buffer std_logic ;
any_dest_tx_multicast_disabled        : buffer std_logic ;
any_dest_tx_filter                    : buffer std_logic ;
any_dest_tx_multicast_filter          : buffer std_logic ;
any_dest_port_not_forwarding          : buffer std_logic ;
any_dest_port_blocking                : buffer std_logic ;
any_dest_monitor_on                   : buffer std_logic ;
any_dest_multicast_monitor_on         : buffer std_logic ;
bbone_src_ct                          : buffer std_logic ;
bbone_dest_ct                         : buffer std_logic ;
bbone_multicast_ct                    : buffer std_logic ;
rxport_equals_bbone                   : buffer std_logic ;
dest_port_not_forwarding              : buffer std_logic ;
src_port_not_forwarding               : buffer std_logic     );
end component;

component rbsm_frag
port(
clock25            : in     std_logic          ;
reset              : in     std_logic          ;
rbsm_proc_rq       : in     std_logic          ;
rbsm_proc_wena     : in     std_logic          ;
rbsm_proc_ack      : in     std_logic          ;
rbsm_proc_addr     : in     processor_address_bus  ;
frag_reg_wdata     : in     FRAG_REG_DATA      ;
frame_byte_count   : in     BYTE_CNT           ;
fragment_frame     : buffer std_logic          ;
frag_register      : buffer FRAG_REG_DATA      ;
frag_reg_rdata     : buffer FRAG_REG_DATA      );
end component;

component rbsm_trans_code
port(
dest_address_match                    : in     std_logic      ;
dest_group_address                    : in     std_logic      ;
dest_internal                         : in     std_logic      ;
dest_port_type                        : in     PORT_TYPE      ;
rx_monitor_on                         : in     std_logic      ;
tx_monitor_on                         : in     std_logic      ;
tx_disable_on                         : in     std_logic      ;
ethernet_eof                          : in     std_logic      ;
ethernet_rx_error                     : in     std_logic      ;
fddi_eof                              : in     std_logic      ;
fddi_abort                            : in     std_logic      ;

Aug 24 11:59 1994  Who: johnf  File: /c2/local_user/bma/bma_rbsm/bma_rbsm_core.vhd Page 18

fddi_rx_error                         : in     std_logic      ;
fragment_frame                        : in     std_logic      ;
dest_port_blocking                    : in     std_logic      ;
dest_port_not_forwarding              : in     std_logic      ;
any_dest_monitor_on                   : in     std_logic      ;
any_dest_multicast_monitor_on         : in     std_logic      ;
port_blocking_on                      : in     std_logic      ;
src_port_not_forwarding               : in     std_logic      ;
rx_disable_on                         : in     std_logic      ;
rx_multicast_disable_on               : in     std_logic      ;
enet_abort                            : in     std_logic      ;
positive_forward_enable               : in     std_logic      ;
translation_code                      : buffer TC_CODE        );
end component;

component rbsm_port_regs_a
port(
clock25                               : in     std_logic      ;
reset                                 : in     std_logic      ;
rbsm_proc_rq                          : in     std_logic      ;
rbsm_proc_wena                        : in     std_logic      ;
reg_write_data                        : in     RBSM_REGISTER_DATA  ;
rbsm_proc_addr                        : in     processor_address_bus  ;
rbsm_proc_ack                         : in     std_logic      ;
ct_enable_a                           : buffer PORT_CONFIG    ;
ct_multicast_enable_a                 : buffer PORT_CONFIG    ;
rx_disable_a                          : buffer PORT_CONFIG    ;
rx_multicast_disable_a                : buffer PORT_CONFIG    ;
tx_disable_a                          : buffer PORT_CONFIG    ;
tx_multicast_disable_a                : buffer PORT_CONFIG    ;
port_blocking_a                       : buffer PORT_CONFIG    ;
port_not_forwarding_a                 : buffer PORT_CONFIG    ;
rx_filter_a                           : buffer PORT_CONFIG    ;
rx_multicast_filter_a                 : buffer PORT_CONFIG    ;
tx_filter_a                           : buffer PORT_CONFIG    ;
tx_multicast_filter_a                 : buffer PORT_CONFIG    ;
monitor_enable_a                      : buffer PORT_CONFIG    ;
port_type_msb_a                       : buffer PORT_CONFIG    ;
port_type_mid_a                       : buffer PORT_CONFIG    ;
port_type_lsb_a                       : buffer PORT_CONFIG    ;
rega_read_data                        : buffer RBSM_REGISTER_DATA  ;
port12_data                           : buffer RBSM_REGISTER_DATA  ;
port13_data                           : buffer RBSM_REGISTER_DATA  ;
port14_data                           : buffer RBSM_REGISTER_DATA  ;
port15_data                           : buffer RBSM_REGISTER_DATA  ;
port16_data                           : buffer RBSM_REGISTER_DATA  ;
port17_data                           : buffer RBSM_REGISTER_DATA  );
 nd component;

component rbsm_port_regs_b
port(
clock25                               : in     std_logic      ;
reset                                 : in     std_logic      ;
rbsm_proc_rq                          : in     std_logic      ;
rbsm_proc_wena                        : in     std_logic      ;
reg_write_data                        : in     RBSM_REGISTER_DATA  ;
rbsm_proc_addr                        : in     processor_address_bus  ;
rbsm_proc_ack                         : in     std_logic      ;
```

```
Aug 24 11:59 1994  Who: johnf  File: /c2/local_user/bma/bma_rbsm/bma_rbsm_core.vhd Page 19

ct_enable_b                              buffer PORT_CONFIG ;
ct_multicast_enable_b                    buffer PORT_CONFIG ;
rx_disable_b                             buffer PORT_CONFIG ;
rx_multicast_disable_b                   buffer PORT_CONFIG ;
tx_disable_b                             buffer PORT_CONFIG ;
tx_multicast_disable_b                   buffer PORT_CONFIG ;
port_blocking_b                          buffer PORT_CONFIG ;
port_not_forwarding_b                    buffer PORT_CONFIG ;
rx_filter_b                              buffer PORT_CONFIG ;
rx_multicast_filter_b                    buffer PORT_CONFIG ;
tx_filter_b                              buffer PORT_CONFIG ;
tx_multicast_filter_b                    buffer PORT_CONFIG ;
monitor_enable_b                         buffer PORT_CONFIG ;
port_type_msb_b                          buffer PORT_CONFIG ;
port_type_mid_b                          buffer PORT_CONFIG ;
port_type_lsb_b                          buffer PORT_CONFIG ;
regb_read_data                           buffer RBSM_REGISTER_DATA ;
port6_data                               buffer RBSM_REGISTER_DATA ;
port7_data                               buffer RBSM_REGISTER_DATA ;
port8_data                               buffer RBSM_REGISTER_DATA ;
port9_data                               buffer RBSM_REGISTER_DATA ;
port10_data                              buffer RBSM_REGISTER_DATA ;
port11_data                              buffer RBSM_REGISTER_DATA );
end component;


component rbsm_port_regs_c
port(
clock25                                : in     std_logic ;
reset                                  : in     std_logic ;
rbsm_proc_rq                           : in     std_logic ;
rbsm_proc_wena                         : in     std_logic ;
reg_write_data                         : in     RBSM_REGISTER_DATA ;
rbsm_proc_addr                         : in     processor_address_bus ;
rbsm_proc_ack                          : in     std_logic ;
ct_enable_c                            : buffer PORT_CONFIG ;
ct_multicast_enable_c                  : buffer PORT_CONFIG ;
rx_disable_c                           : buffer PORT_CONFIG ;
rx_multicast_disable_c                 : buffer PORT_CONFIG ;
tx_disable_c                           : buffer PORT_CONFIG ;
tx_multicast_disable_c                 : buffer PORT_CONFIG ;
port_blocking_c                        : buffer PORT_CONFIG ;
port_not_forwarding_c                  : buffer PORT_CONFIG ;
rx_filter_c                            : buffer PORT_CONFIG ;
rx_multicast_filter_c                  : buffer PORT_CONFIG ;
tx_filter_c                            : buffer PORT_CONFIG ;
tx_multicast_filter_c                  : buffer PORT_CONFIG ;
monitor_enable_c                       : buffer PORT_CONFIG ;
port_type_msb_c                        : buffer PORT_CONFIG ;
port_type_mid_c                        : buffer PORT_CONFIG ;
port_type_lsb_c                        : buffer PORT_CONFIG ;
regc_read_data                         : buffer RBSM_REGISTER_DATA ;
port0_data                             : buffer RBSM_REGISTER_DATA ;
port1_data                             : buffer RBSM_REGISTER_DATA ;
port2_data                             : buffer RBSM_REGISTER_DATA ;
port3_data                             : buffer RBSM_REGISTER_DATA ;
port4_data                             : buffer RBSM_REGISTER_DATA ;
port5_data                             : buffer RBSM_REGISTER_DATA );
end component;
```

```
Aug 24 11:59 1994  Who: johnf  File: /c2/local_user/bma/bma_rbsm/bma_rbsm_core.vhd Page 20


component rbsm_port_regs_mux
port(
rbsm_proc_rq                           : in     std_logic ;
rbsm_proc_addr                         : in     processor_address_bus ;
rega_read_data                         : in     RBSM_REGISTER_DATA ;
regb_read_data                         : in     RBSM_REGISTER_DATA ;
regc_read_data                         : in     RBSM_REGISTER_DATA ;
ct_enable_a                            : in     PORT_CONFIG ;
ct_multicast_enable_a                  : in     PORT_CONFIG ;
rx_disable_a                           : in     PORT_CONFIG ;
rx_multicast_disable_a                 : in     PORT_CONFIG ;
tx_disable_a                           : in     PORT_CONFIG ;
tx_multicast_disable_a                 : in     PORT_CONFIG ;
port_blocking_a                        : in     PORT_CONFIG ;
port_not_forwarding_a                  : in     PORT_CONFIG ;
rx_filter_a                            : in     PORT_CONFIG ;
rx_multicast_filter_a                  : in     PORT_CONFIG ;
tx_filter_a                            : in     PORT_CONFIG ;
tx_multicast_filter_a                  : in     PORT_CONFIG ;
monitor_enable_a                       : in     PORT_CONFIG ;
port_type_msb_a                        : in     PORT_CONFIG ;
port_type_mid_a                        : in     PORT_CONFIG ;
port_type_lsb_a                        : in     PORT_CONFIG ;
ct_enable_b                            : in     PORT_CONFIG ;
ct_multicast_enable_b                  : in     PORT_CONFIG ;
rx_disable_b                           : in     PORT_CONFIG ;
rx_multicast_disable_b                 : in     PORT_CONFIG ;
tx_disable_b                           : in     PORT_CONFIG ;
tx_multicast_disable_b                 : in     PORT_CONFIG ;
port_blocking_b                        : in     PORT_CONFIG ;
port_not_forwarding_b                  : in     PORT_CONFIG ;
rx_filter_b                            : in     PORT_CONFIG ;
rx_multicast_filter_b                  : in     PORT_CONFIG ;
tx_filter_b                            : in     PORT_CONFIG ;
tx_multicast_filter_b                  : in     PORT_CONFIG ;
monitor_enable_b                       : in     PORT_CONFIG ;
port_type_msb_b                        : in     PORT_CONFIG ;
port_type_mid_b                        : in     PORT_CONFIG ;
port_type_lsb_b                        : in     PORT_CONFIG ;
ct_enable_c                            : in     PORT_CONFIG ;
ct_multicast_enable_c                  : in     PORT_CONFIG ;
rx_disable_c                           : in     PORT_CONFIG ;
rx_multicast_disable_c                 : in     PORT_CONFIG ;
tx_disable_c                           : in     PORT_CONFIG ;
tx_multicast_disable_c                 : in     PORT_CONFIG ;
port_blocking_c                        : in     PORT_CONFIG ;
port_not_forwarding_c                  : in     PORT_CONFIG ;
rx_filter_c                            : in     PORT_CONFIG ;
rx_multicast_filter_c                  : in     PORT_CONFIG ;
tx_filter_c                            : in     PORT_CONFIG ;
tx_multicast_filter_c                  : in     PORT_CONFIG ;
monitor_enable_c                       : in     PORT_CONFIG ;
port_type_msb_c                        : in     PORT_CONFIG ;
port_type_mid_c                        : in     PORT_CONFIG ;
port_type_lsb_c                        : in     PORT_CONFIG ;
ct_enable                              : buffer port_vector ;
ct_multicast_enable                    : buffer port_vector ;
```

```
Aug 24 11:59 1994  Who: johnf  File: /c2/local_user/bma/bma_rbsm/bma_rbsm_core.vhd Page 21

rx_disable                        : buffer port_vector  ;
rx_multicast_disable              : buffer port_vector  ;
tx_disable                        : buffer port_vector  ;
tx_multicast_disable              : buffer port_vector  ;
port_blocking                     : buffer port_vector  ;
port_not_forwarding               : buffer port_vector  ;
rx_filter                         : buffer port_vector  ;
 _multicast_filter                : buffer port_vector  ;
  _filter                         : buffer port_vector  ;
 _multicast_filter                : buffer port_vector  ;
monitor_enable                    : buffer port_vector  ;
port_type_msb                     : buffer port_vector  ;
port_type_mid                     : buffer port_vector  ;
port_type_lsb                     : buffer port_vector  ;
reg_read_data                     : buffer RBSM_REGISTER_DATA );
end component;


component rbsm_bbone
port(
clock25              : in      std_logic      ;
reset                : in      std_logic      ;
rbsm_proc_rq         : in      std_logic      ;
rbsm_proc_wena       : in      std_logic      ;
rbsm_proc_ack        : in      std_logic      ;
rbsm_proc_addr       : in      processor_address_bus  ;
bbone_reg_wdata      : in      BBONE_REG_DATA  ;
bbone_register       : buffer  BBONE_REG_DATA  ;
bbone_reg_rdata      : buffer  BBONE_REG_DATA );
end component;


component rbsm_and
port(
bma_ram_pulse    : in     std_logic     ;
rbsm_ram_wena    : in     std_logic     ;
rbsm_ram_wrstb   : buffer std_logic     );
end component;


component rbsm_addr_sync
port(
clock25                   : in      std_logic     ;
reset                     : in      std_logic     ;
sadd_channum              : in      system_channel_number  ;
receive_header_offset     : in      rxoff_data    ;
load_sram_wregs           : in      std_logic     ;
sram_wr_done              : in      std_logic     ;
rbsm_sram_ready           : in      std_logic     ;
frame_cntl_addr           : buffer  rxoff_data    );
end component;


-----------------------------------------------------------------------

for stat_control:    rbsm_stat_control       use entity bma_rbsm_lib.rbsm_stat_control(synthesize) ;
```

```
Aug 24 11:59 1994  Who: johnf  File: /c2/local_user/bma/bma_rbsm/bma_rbsm_core.vhd Page 22

for scanner:         rbsm_scanner            use entity bma_rbsm_lib.rbsm_scanner(synthesize) ;
for unld:            rbsm_unload             use entity bma_rbsm_lib.rbsm_unload(synthesize) ;
for allowed:         rbsm_rd_allowed         use entity bma_rbsm_lib.rbsm_rd_allowed(synthesize) ;
for not_frst:        rbsm_not_first          use entity bma_rbsm_lib.rbsm_not_first(synthesize) ;
for multi_buf:       rbsm_multi_buffer       use entity bma_rbsm_lib.rbsm_multi_buffer(synthesize) ;
for return_buffer:   rbsm_ret_buf_cnt        use entity bma_rbsm_lib.rbsm_ret_buf_cnt(synthesize) ;
for stat_regs:       rbsm_status_registers   use entity bma_rbsm_lib.rbsm_status_registers(synthesize) ;
for set:             rbsm_ama_set            use entity bma_rbsm_lib.rbsm_ama_set(synthesize) ;
for compil:          rbsm_compil             use entity bma_rbsm_lib.rbsm_compil(synthesize) ;
for active:          rbsm_ct_active          use entity bma_rbsm_lib.rbsm_ct_active(synthesize) ;
for request:         rbsm_request            use entity bma_rbsm_lib.rbsm_request(synthesize) ;
for ram_cntl:        rbsm_ram_control        use entity bma_rbsm_lib.rbsm_ram_control(synthesize) ;
for ram:             r021rsc                 use entity pie_ram.r021rsc(synthesize) ;
for sram_cntl:       rbsm_sram_control       use entity bma_rbsm_lib.rbsm_sram_control(synthesize) ;
for qcb:             rbsm_qcb                use entity bma_rbsm_lib.rbsm_qcb(synthesize) ;
for qcb_sync:        rbsm_qcb_sync           use entity bma_rbsm_lib.rbsm_qcb_sync(synthesize) ;
for sram_regs:       rbsm_sram_registers     use entity bma_rbsm_lib.rbsm_sram_registers(synthesize) ;
for src_adr_status:  rbsm_sa_status          use entity bma_rbsm_lib.rbsm_sa_status(synthesize) ;
for rbsm_vectors:    rbsm_code_vectors       use entity bma_rbsm_lib.rbsm_code_vectors(synthesize) ;
for config:          rbsm_config             use entity bma_rbsm_lib.rbsm_config(synthesize) ;
for frag:            rbsm_frag               use entity bma_rbsm_lib.rbsm_frag(synthesize) ;
for trans_code:      rbsm_trans_code         use entity bma_rbsm_lib.rbsm_trans_code(synthesize) ;
for port_regs_a:     rbsm_port_regs_a        use entity bma_rbsm_lib.rbsm_port_regs_a(synthesize) ;
for port_regs_b:     rbsm_port_regs_b        use entity bma_rbsm_lib.rbsm_port_regs_b(synthesize) ;
for port_regs_c:     rbsm_port_regs_c        use entity bma_rbsm_lib.rbsm_port_regs_c(synthesize) ;
for port_regs_mux:   rbsm_port_regs_mux      use entity bma_rbsm_lib.rbsm_port_regs_mux(synthesize) ;
for bbone:           rbsm_bbone              use entity bma_rbsm_lib.rbsm_bbone(synthesize) ;
for rand:            rbsm_and                use entity bma_rbsm_lib.rbsm_and(synthesize) ;
for raddr:           rbsm_addr_sync          use entity bma_rbsm_lib.rbsm_addr_sync(synthesize) ;

------------------------------------------


begin

ram_output_enable <= ACT ;  -- Need to tie RAM output enables high


-- ****************************************

rbsm_vectors: rbsm_code_vectors
port map(
            clock25        => clock25,
            reset          => reset,
            ethernet_eof => ethernet_eof,
            fddi_eof       => fddi_eof,
            fddi_multi_buffer => fddi_multi_buffer,
            dest_group_address => dest_group_address,
            dest_broadcast => dest_broadcast,
            dest_address_match => dest_address_match,
            dest_internal => dest_internal,
            filter_frame => filter_frame,
            ethernet_rx_error => ethernet_rx_error,
            fddi_abort     => fddi_abort,
            enet_abort     => enet_abort,
            llc_frame_type => llc_frame_type,
            fddi_rx_error => fddi_rx_error,
            dest_port_type => dest_port_type,
            fragment_frame => fragment_frame,
            src_ct_allowed => src_ct_allowed,
```

```
                multicast_ct_allowed => multicast_ct_allowed,
                dest_ct_allowed => dest_ct_allowed,
                rx_disable_on => rx_disable_on,
                rx_multicast_disable_on => rx_multicast_disable_on,
                rx_filter_on => rx_filter_on,
                rx_monitor_on => rx_monitor_on,
                rx_multicast_filter_on => rx_multicast_filter_on,
                tx_disable_on => tx_disable_on,
                tx_filter_on => tx_filter_on,
                tx_monitor_on => tx_monitor_on,
                port_blocking_on => port_blocking_on,
                dest_port_blocking => dest_port_blocking,
                src_port_not_forwarding => src_port_not_forwarding,
                dest_port_not_forwarding => dest_port_not_forwarding,
                any_multicast_cut_thru_disabled => any_multicast_cut_thru_disabled,
                any_enet_dest_tx_filter => any_enet_dest_tx_filter,
                any_enet_dest_tx_multicast_filter => any_enet_dest_tx_multicast_filter,
                any_dest_tx_disabled => any_dest_tx_disabled,
                any_dest_tx_multicast_disabled => any_dest_tx_multicast_disabled,
                any_dest_tx_filter => any_dest_tx_filter,
                any_dest_tx_multicast_filter => any_dest_tx_multicast_filter,
                any_dest_port_not_forwarding => any_dest_port_not_forwarding,
                any_dest_port_blocking => any_dest_port_blocking,
                any_dest_monitor_on => any_dest_monitor_on,
                any_dest_multicast_monitor_on => any_dest_multicast_monitor_on,
                src_address_status => src_address_status,
                cut_thru_end => cut_thru_end,
                cont_scan     => cont_scan,
                positive_forward_enable => positive_forward_enable,
                rxport_equals_bbone => rxport_equals_bbone,
                bbone_src_ct => bbone_src_ct,
                bbone_dest_ct => bbone_dest_ct,
                bbone_multicast_ct => bbone_multicast_ct,
                destination_monitor => destination_monitor,
                code_vector  => code_vector]


    stat_control: rbsm_stat_control
    port map[
                clock25         => clock25,
                reset           => reset,
                rbsm_enable     => rbsm_enable,
                rx_stat_rq      => rx_stat_rq,
                ama_stat_rq     => ama_stat_rq,
                rx_end_of_buffer => rx_end_of_buffer,
                filter_frame => filter_frame,
                discard_frame => discard_frame,
                rx_monitor_on => rx_monitor_on,
                fddi_abort      => fddi_abort,
                enet_abort      => enet_abort,
                sram_rdy        => rbsm_sram_ready,
                stat_rdy        => rbsm_ram_ready,
                bufq_rdy        => return_bufferq_ready,
                buffer_num_neq => buffer_num_neq,
                cut_thru_begin => cut_thru_begin,
                fddi_rx_error => fddi_rx_error,
                ethernet_rx_error => ethernet_rx_error,
                dest_port_type => dest_port_type,
                ama_sel         => ama_sel,
```

```
                port_req        => port_req,
                not_first       => not_first,
                scan_vector     => scan_vector,
                cont_scan       => cont_scan,
                cont_scan4      => cont_scan4,
                scan            => scan,
                rd_state0       => rd_state0,
                rd_state1       => rd_state1,
                ama_stat_rd     => ama_stat_rd,
                ama_stat_rd1    => ama_stat_rd1,
                ama_stat_rd2    => ama_stat_rd2,
                ama_stat_rd3    => ama_stat_rd3,
                ama_status_next => fromama_read_nxt,
                rx_status_next => rcv_status_queue_rd_nxt,
                rbsm_error      => rbsm_error,
                rx_stat_rd      => rx_stat_rd,
                fromama_read_whichword => fromama_read_whichword);


    -- ****************************************


    request: rbsm_request
    port map(
                ama_avail       => fromama_avail,
                rx_avail        => rcv_status_queue_avail,
                ct_enable       => ct_enable,
                rd_allowed      => rd_allowed,
                ct_11_threshold => ct_11_threshold,
                ama_sel         => ama_sel,
                scan_vector     => scan_vector,
                rx_stat_rq      => rx_stat_rq,
                ama_stat_rq     => ama_stat_rq,
                ama_only        => ama_only,
                rx_ama_req      => rx_ama_req,
                port_req        => port_req);


    -- ****************************************

    scanner: rbsm_scanner
    port map(
                clock25         => clock25,
                reset           => reset,
                scan            => scan,
                scan_vector     => scan_vector,
                rbsm_port_num => status_rd_chan_sel);


    -- ****************************************


    unld: rbsm_unload
    port map(
                clock25         => clock25,
                reset           => reset,
```

Aug 24 11:59 1994 Who: johnf File /c2/local_user/bma/bma_rbsm/bma_rbsm_core.vhd Page 25

```
            cont_scan      => cont_scan
            rx_end_of_buffer => rx_end_of_buffer,
            rd_state0      => rd_state0,
            rd_state1      => rd_state1,
            ama_set        => ama_set,
            scan_vector    => scan_vector,
            ethernet_eof   => ethernet_eof,
            fddi_eof       => fddi_eof,
            unload         => unload);


-- ========================================

allowed: rbsm_rd_allowed
port map(
            clock25        => clock25,
            reset          => reset,
            cont_scan      => cont_scan,
            rd_state0      => rd_state0,
            rd_state1      => rd_state1,
            scan_vector    => scan_vector,
            ama_set        => ama_set,
            unload         => unload,
            rd_allowed     => rd_allowed);

-- ========================================

not_frst: rbsm_not_first
port map(
            clock25          => clock25,
            reset            => reset,
            cont_scan        => cont_scan,
            scan_vector16    => scan_vector(16),
            scan_vector17    => scan_vector(17),
            scan_vector18    => scan_vector(18),
            scan_vector19    => scan_vector(19),
            unload           => unload,
            multi_buffer     => multi_buffer,
            not_first         => not_first);

-- ========================================

multi_buf: rbsm_multi_buffer
port map(
            clock25               => clock25,
            reset                 => reset,
            cont_scan             => cont_scan,
            rx_end_of_buffer      => rx_end_of_buffer,
            rd_state0             => rd_state0,
            rd_state1             => rd_state1,
            scan_vector16         => scan_vector(16),
            scan_vector17         => scan_vector(17),
            scan_vector18         => scan_vector(18),
            scan_vector19         => scan_vector(19),
            unload16              => unload(16),
            unload17              => unload(17),
```

Aug 24 11:59 1994 Who: johnf File: /c2/local_user/bma/bma_rbsm/bma_rbsm_core.vhd Page 26

```
            not_first             => not_first,
            fddi_multi_buffer     => fddi_multi_buffer,
            multi_buffer          => multi_buffer);

-- ========================================

return_buffer: rbsm_ret_buf_cnt
port map(
            clock25        => clock25,
            reset          => reset,
            scan_vector16 => scan_vector(16),
            scan_vector17 => scan_vector(17),
            scan_vector18 => scan_vector(18),
            scan_vector19 => scan_vector(19),
            filter_frame => filter_frame,
            discard_frame => discard_frame,
            rx_monitor_on => rx_monitor_on,
            fddi_abort    => fddi_abort,
            enet_abort    => enet_abort,
            rx_end_of_buffer => rx_end_of_buffer,
            cont_scan      => cont_scan,
            return_bufferq_full => return_fifo_full,
            rx_buffer_number => rx_buffer_number,
            return_bufferq_ready => return_bufferq_ready,
            return_buffer_write_enable => rx_return_buffer_number,
            return_buffer_write_pulse => return_buffer_write_pulse,
            load_return_bufferq_wreg => load_return_bufferq_wreg,
            return_bufferq_full_error => return_bufferq_full_error,
            buffer_number_tobe_returned => rx_buffer_number_to_return);

-- ========================================

stat_regs: rbsm_status_registers
port map(
            clock25        => clock25,
            reset          => reset,
            rx_stat_rd     => rx_stat_rd,
            ama_stat_rd1 => ama_stat_rd1,
            ama_stat_rd2 => ama_stat_rd2,
            ama_stat_rd3 => ama_stat_rd3,
            ama_status     => fromama_data,
            rcv_status     => rcv_status_queue_outdat,
            ethernet_eof => ethernet_eof,
            fddi_eof       => fddi_eof,
            cut_thru_end => cut_thru_end,
            rx_disable_on => rx_disable_on,
            rx_multicast_disable_on => rx_multicast_disable_on,
            port_blocking_on => port_blocking_on,
            rx_monitor_on => rx_monitor_on,
            destination_monitor => destination_monitor,
            dest_port_type => dest_port_type,
            src_port_type => src_port_type,
            positive_forward_enable => positive_forward_enable,
            rxport_equals_bbone => rxport_equals_bbone,
            invalid_dest_port => invalid_dest_port,
            disable_enet_collide => disable_enet_collide,
```

Aug 24 11:59 1994 Who: johnf File /c2/local_user/bma/bma_rbsm/bma_rbsm core vhd Page 27

```
            src_ct_active => src_ct active,
            dest_group address => dest_group_address.
            dest_address_match => dest address_match,
            dest_address_tag => dest address_tag,
            dest_address data => dest_address_data,
            dest_port equal => dest_port_equal,
            dest_port_num => dest_port_num,
            da port_num  => da_port num,
            dest_broadcast => dest broadcast,
            dest internal => dest_internal,
            dest_filter_flag => dest filter_flag,
            src_group_address => src group address,
            src_address_match => src address_match,
            src_address_tag => src address_tag,
            src_address_data => src_address_data,
            src_port_equal => src_port_equal,
            src_internal => src_internal,
            src_filter_flag => src_filter_flag,
            sa_port_num  => sa_port_num,
            frame_byte_count => frame_byte_count,
            rx_end_of_buffer => rx_end_of_buffer,
            fddi_abort    => fddi_abort,
            rx_stat_reg   => rx_stat reg,
            rx_buff_reg   => rx_buff_reg,
            rx_buffer_number => rx_buffer_number,
            ama_buffer_number => ama_buffer_number,
            filter_frame => filter_frame,
            discard_frame => discard_frame,
            ethernet_rx_error => ethernet_rx_error,
            fddi_rx_error => fddi_rx_error,
            llc_frame_type => llc_frame_type,
            enet abort    => enet_abort,
            ama_stat_reg1 => ama_stat_reg1,
            ama_stat_reg2 => ama_stat_reg2,
            ama_stat_reg3 => ama_stat reg3),

-- ****************************************

set: rbsm ama_set
port map(
            clock25       => clock25,
            reset         => reset,
            cont_scan     => cont_scan,
            rd_state0     => rd state0,
            rd_state1     => rd state1,
            scan_vector   => scan_vector,
            ama_only      => ama_only,
            ama set       => ama_set),

-- ****************************************

compl1: rbsm_compl1
port map(
            ama_buffer_number => ama_buffer_number,
            rx_buffer_number => rx_buffer_number,
            buffer_num_neq => buffer_num_neq);
```

Aug 24 11:59 1994 Who: johnf File: /c2/local_user/bma/bma_rbsm/bma_rbsm_core.vhd Page 28

```
-- ****************************************

active: rbsm ct_active
port map(
            clock25       => clock25,
            reset         => reset,
            rd_state0     => rd_state0,
            rd_state1     => rd_state1,
            cont_scan     => cont_scan,
            dest_group_address => dest_group_address,
            src_ct_allowed => src_ct_allowed,
            dest_ct_allowed => dest ct_allowed,
            multicast_ct_allowed => multicast_ct_allowed,
            scan_vector   => scan_vector,
            unload        => unload,
            positive_forward_enable => positive_forward_enable,
            rxport_equals_bbone => rxport_equals_bbone,
            bbone_src_ct => bbone_src_ct,
            bbone_dest_ct => bbone_dest_ct,
            bbone_multicast_ct => bbone_multicast_ct,
            cut_thru_begin => cut_thru_begin,
            cut_thru_end => cut_thru_end,
            src_ct_active => src_ct_active,
            ct_active     => ct_active);

-- ****************************************

ram_cntl: rbsm_ram_control
port map(
            clock25       => clock25,
            reset         => reset,
            rbsm_proc_sram_test => rbsm_proc_sram_test,
            cont_scan     => cont_scan,
            unload        => unload,
            scan_vector   => scan_vector,
            fddi_abort    => fddi_abort,
            enet_abort    => enet_abort,
            rd_state1     => rd_state1,
            rbsm_error    => rbsm_error,
            discard_frame => discard_frame,
            rbsm_port_num => status_rd_chan_sel,
            frame_byte_count => frame_byte_count,
            reg_read_data => reg_read_data,
            rbsm_alu_rd_data => rbsm_alu_rd_data,
            rbsm_micro_rd_data => rbsm_micro_rd_data,
            qcb_reg_rdata => qcb_reg_rdata,
            frag_reg_rdata => frag_reg_rdata,
            bbone_reg_rdata => bbone_reg_rdata,
            rbsm_proc_rq => rbsm_proc_rq,
            rbsm_proc_wena => rbsm_proc_wena,
            rbsm_proc_addr => rbsm_proc_addr,
            rbsm_proc_wdata => rbsm_proc_wdata,
            rbsm_ram_ready => rbsm_ram_ready,
            rbsm_proc_ack => rbsm_proc_ack,
            load_stat_wregs => load_stat_wregs,
            rbsm_proc_rdata => rbsm_proc_rdata,
```

```
Aug 24 11:59 1994  Who  johnf  File  /c2/local_user/bma/bma_rbsm/bma_rbsm_core.vhd Page 29

            rbsm_ram_wena => rbsm_ram_wena,
            rbsm_port_addr => rbsm_port_addr,
            rbsm_proc_ram_addr => rbsm_proc_ram_addr,
            rbsm_ram_wr_addr => rbsm_ram_wr_addr,
            rbsm_ram_wr_data => rbsm_ram_wr_data),

   -- ************************************

ram: r021rsc
port map(
            aadr      => rbsm_ram_wr_addr,
            oea       => ram_output_enable,
            doa       => rbsm_alu_rd_data,
            badr      => rbsm_proc_ram_addr,
            oeb       => ram_output_enable,
            dob       => rbsm_micro_rd_data,
            cadr      => rbsm_ram_wr_addr,
            we        => rbsm_ram_wrstb,
            dic       => rbsm_ram_wr_data),

-- ************************************

sram_cntl: rbsm_sram_control
port map(
            clock25         => clock25,
            reset           => reset,
            rbsm_enable     => rbsm_enable,
            cont_scan       => cont_scan,
            scan_vector16 => scan_vector(16),
            scan_vector17 => scan_vector(17),
            scan_vector18 => scan_vector(18),
            scan_vector19 => scan_vector(19),
            rbsm_fifo_full => rbsm_fifo_full,
            rbsm_fifo_empty => rbsm_fifo_empty,
            rx_buffer_number => rx_buffer_number,
            ama_buffer_number => ama_buffer_number,
            sadd_channum => sadd_channum,
            sdat_channum => sdat_channum,
            code_vector_addr => code_vector_addr,
            filter_frame => filter_frame,
            discard_frame => discard_frame,
            rx_monitor_on => rx_monitor_on,
            destination_monitor => destination_monitor,
            cut_thru_end => cut_thru_end,
            cut_thru_begin => cut_thru_begin,
            ethernet_eof => ethernet_eof,
            fddi_eof        => fddi_eof,
            ethernet_rx_error => ethernet_rx_error,
            fddi_rx_error => fddi_rx_error,
            fddi_abort      => fddi_abort,
            enet_abort      => enet_abort,
            llc_frame_type => llc_frame_type,
            rx_end_of_buffer => rx_end_of_buffer,
            fddi_multi_buffer => fddi_multi_buffer,
            from_bma_fifo_in_full => from_bma_fifo_in_full,
            frame_cntl_addr => frame_cntl_addr,
```

```
Aug 24 11:59 1994  Who: johnf  File: /c2/local_user/bma/bma_rbsm/bma_rbsm_core.vhd Page 30

            rbsm_sram_ready => rbsm_sram_ready,
            load_sram_wregs => load_sram_wregs,
            wr_cv_only      => wr_cv_only,
            frame_control_addr => frame_control_addr,
            sram_wr_done => sram_wr_done,
            rbsm_read_wait => rbsm_read_wait,
            from_bma_fifo_wrnxt => from_bma_fifo_wrnxt,
            rbsm_sdata_sel0 => rbsm_sdata_sel0,
            rbsm_sdata_sel1 => rbsm_sdata_sel1,
            rbsm_saddr_sel => rbsm_saddr_sel,
            rbsm_sram_rdreq => rbsm_sram_rdreq,
            rbsm_sram_wreq => rbsm_sram_wreq,
            microprocessor_inq_full_error => inq_full_error,
            rbsm_sram_addr => rbsm_sram_addr);

-- ************************************

qcb: rbsm_qcb
port map(
            rbsm_proc_rq => rbsm_proc_rq,
            rbsm_proc_wena => rbsm_proc_wena,
            rbsm_proc_ack => rbsm_proc_ack,
            rbsm_proc_addr => rbsm_proc_addr,
            qcb_reg_wdata => rbsm_proc_wdata(16 downto 0),
            rbsm_saddr_sel => rbsm_saddr_sel,
            sadd_channum => sadd_channum,
            start_pnt       => start_pnt,
            write_pnt       => write_pnt,
            read_pnt        => read_pnt,
            end_pnt         => end_pnt,
            start_pnt_a     => start_pnt_a,
            write_pnt_a     => write_pnt_a,
            read_pnt_a      => read_pnt_a,
            end_pnt_a       => end_pnt_a,
            code_vector_addr => code_vector_addr,
            qcb_reg_rdata => qcb_reg_rdata,
            rbsm_fifo_empty => rbsm_fifo_empty,
            rbsm_fifo_full => rbsm_fifo_full);

-- ************************************

qcb_sync: rbsm_qcb_sync
port map(
            clock25         => clock25,
            reset           => reset,
            start_pnt_a     => start_pnt_a,
            write_pnt_a     => write_pnt_a,
            read_pnt_a      => read_pnt_a,
            end_pnt_a       => end_pnt_a,
            start_pnt       => start_pnt,
            write_pnt       => write_pnt,
            read_pnt        => read_pnt,
            end_pnt         => end_pnt);
```

```
Aug 24 11:59 1994  Who: johnf  File: /c2/local_user/bma/bma_rbsm/bma_rbsm_core.vhd Page 31

-- ************************************

sram_regs: rbsm_sram_registers
port map(
            clock25       => clock25,
            reset         => reset,
            load_sram_wregs => load_sram_wregs,
            rbsm_sdata_sel0 => rbsm_sdata_sel0,
            rbsm_sdata_sel1 => rbsm_sdata_sel1,
            src_address_status => src_address_status,
            code_vector   => code_vector,
            translation_code => translation_code,
            cont_scan     => cont_scan,
            cut_thru_end => cut_thru_end,
            cut_thru_begin => cut_thru_begin,
            fddi_multi_buffer => fddi_multi_buffer,
            scan_vector   => scan_vector,
            ama_buffer_number => ama_buffer_number,
            rx_buff_reg   => rx_buff_reg,
            dest_address_match => dest_address_match,
            dest_group_address => dest_group_address,
            dest_address_tag => dest_address_tag,
            dest_address_data => dest_address_data,
            da_port_num   => da_port_num,
            src_address_match => src_address_match,
            src_port_equal => src_port_equal,
            src_address_tag => src_address_tag,
            src_address_data => src_address_data,
            sa_port_num   => sa_port_num,
            frame_byte_count => frame_byte_count,
            receive_body_offset => receive_body_offset,
            positive_forward_enable => positive_forward_enable,
            bbone_register => bbone_register,
            rx_end_of_buffer => rx_end_of_buffer,
            transmit_port_num => transmit_port_num,
            rx_fifo_reg1 => rx_fifo_reg1,
            rx_fifo_reg2 => rx_fifo_reg2,
            frame_control_reg1 => frame_control_reg1,
            frame_control_reg2 => frame_control_reg2,
            rbsm_sram_wdata => rbsm_sram_wdata);

-- ************************************

src_adr_status: rbsm_sa_status
port map(
            src_address_match => src_address_match,
            src_group_address => src_group_address,
            src_port_equal => src_port_equal,
            src_address_status => src_address_status);

-- ************************************

config: rbsm_config
port map(
            scan_vector   => scan_vector,
            ct_11_threshold => ct_11_threshold,

Aug 24 11:59 1994  Who: johnf  File: /c2/local_user/bma/bma_rbsm/bma_rbsm_core.vhd Page 32

            ama_set       => ama_set,
            dest_port_num => dest_port_num,
            dest_address_match => dest_address_match,
            dest_group_address => dest_group_address,
            dest_port_equal => dest_port_equal,
            dest_internal => dest_internal,
            src_group_address => src_group_address,
            src_address_match => src_address_match,
            src_port_equal => src_port_equal,
            src_internal => src_internal,
            ct_enable     => ct_enable,
            ct_multicast_enable => ct_multicast_enable,
            rx_disable    => rx_disable,
            rx_multicast_disable => rx_multicast_disable,
            tx_disable    => tx_disable,
            tx_multicast_disable => tx_multicast_disable,
            port_blocking => port_blocking,
            port_not_forwarding => port_not_forwarding,
            rx_filter     => rx_filter,
            rx_multicast_filter => rx_multicast_filter,
            tx_filter     => tx_filter,
            tx_multicast_filter => tx_multicast_filter,
            monitor_enable => monitor_enable,
            port_type_msb => port_type_msb,
            port_type_mid => port_type_mid,
            port_type_lsb => port_type_lsb,
            transmit_port_num => transmit_port_num,
            positive_forward_enable => positive_forward_enable,
            bbone_register => bbone_register,
            dest_port_type => dest_port_type,
            src_port_type => src_port_type,
            src_ct_allowed => src_ct_allowed,
            dest_ct_allowed => dest_ct_allowed,
            multicast_ct_allowed => multicast_ct_allowed,
            invalid_dest_port => invalid_dest_port,
            rx_filter_on => rx_filter_on,
            tx_filter_on => tx_filter_on,
            rx_disable_on => rx_disable_on,
            tx_disable_on => tx_disable_on,
            rx_monitor_on => rx_monitor_on,
            tx_monitor_on => tx_monitor_on,
            rx_multicast_disable_on => rx_multicast_disable_on,
            rx_multicast_filter_on => rx_multicast_filter_on,
            tx_multicast_filter_on => tx_multicast_filter_on,
            port_blocking_on => port_blocking_on,
            dest_port_blocking => dest_port_blocking,
            any_multicast_cut_thru_disabled => any_multicast_cut_thru_disabled,
            any_enet_dest_tx_filter => any_enet_dest_tx_filter,
            any_enet_dest_tx_multicast_filter => any_enet_dest_tx_multicast_filter,
            any_dest_tx_disabled => any_dest_tx_disabled,
            any_dest_tx_multicast_disabled => any_dest_tx_multicast_disabled,
            any_dest_tx_filter => any_dest_tx_filter,
            any_dest_tx_multicast_filter => any_dest_tx_multicast_filter,
            any_dest_port_not_forwarding => any_dest_port_not_forwarding,
            any_dest_port_blocking => any_dest_port_blocking,
            any_dest_monitor_on => any_dest_monitor_on,
            any_dest_multicast_monitor_on => any_dest_multicast_monitor_on,
            bbone_src_ct => bbone_src_ct,
            bbone_dest_ct => bbone_dest_ct,
            bbone_multicast_ct => bbone_multicast_ct,
```

```
Aug 24 11 59 1994  Who: johnf  File  /c2/local user/bma/bma rbsm/bma_rbsm_core vhd Page 33

            rxport_equals bbone => rxport_equals bbone
            dest port not forwarding => dest port not_forwarding,
            src port_not forwarding => src port not_forwarding);


-- ================================================

  ag  rbsm_frag
  rt map(
            clock25        => clock25,
            reset          => reset,
            rbsm_proc rq => rbsm_proc rq,
            rbsm_proc_wena => rbsm_proc_wena,
            rbsm_proc ack => rbsm_proc_ack,
            rbsm_proc_addr => rbsm_proc_addr,
            frag_reg_wdata => rbsm proc_wdata(10 downto 0),
            frame byte_count => frame_byte_count,
            fragment_frame => fragment_frame,
            frag_register => frag_register,
            frag_reg_rdata => frag_reg_rdata);


-- ================================================

bbone  rbsm_bbone
port map(
            clock25          => clock25,
            reset            => reset,
            rbsm proc_rq     => rbsm proc_rq,
            rbsm_proc_wena   => rbsm_proc_wena,
            rbsm proc_ack    => rbsm proc ack,
            rbsm_proc_addr   => rbsm_proc_addr,
            bbone_reg_wdata  => rbsm_proc_wdata(6 downto 0)
            bbone_register   => bbone_register,
            bbone reg_rdata  => bbone reg_rdata);


-- ================================================


trans code. rbsm_trans code
port map(
            dest address_match => dest_address match,
            dest_group_address => dest_group_address,
            dest_internal => dest internal,
            dest port_type => dest_port_type,
            rx_monitor on => rx_monitor_on,
            tx_monitor_on => tx_monitor_on,
            tx_disable_on => tx_disable_on,
            ethernet_eof => ethernet_eof,
            ethernet rx_error => ethernet rx_error,
            fddi_eof       => fddi_eof,
            fddi_abort     => fddi_abort,
```

```
Aug 24 11:59 1994  Who: johnf  File: /c2/local_user/bma/bma_rbsm/bma_rbsm_core.vhd Page 34

            fddi_rx_error => fddi_rx_error,
            fragment_frame => fragment_frame,
            dest_port_blocking => dest_port_blocking,
            dest_port_not_forwarding => dest_port_not_forwarding,
            any_dest_monitor_on => any_dest_monitor_on,
            any_dest_multicast_monitor_on => any_dest_multicast_monitor_on,
            port_blocking_on => port_blocking_on,
            src_port_not_forwarding => src_port_not_forwarding,
            rx_disable_on => rx_disable_on,
            rx_multicast_disable_on => rx_multicast_disable_on,
            enet_abort => enet_abort,
            positive_forward enable => positive_forward_enable,
            translation code => translation_code);

-- ====================================================

port_regs_a: rbsm_port_regs_a
port map(
            clock25        => clock25,
            reset          => reset,
            rbsm_proc_rq => rbsm_proc_rq,
            rbsm_proc_wena => rbsm_proc_wena,
            reg_write_data => rbsm_proc_wdata(15 downto 0),
            rbsm_proc_addr => rbsm_proc_addr,
            rbsm_proc_ack => rbsm_proc_ack,
            ct_enable_a  => ct_enable_a,
            ct_multicast_enable_a => ct_multicast_enable_a,
            rx_disable_a => rx_disable_a,
            rx_multicast_disable_a => rx_multicast_disable_a,
            tx_disable_a => tx_disable_a,
            tx_multicast_disable_a => tx_multicast_disable_a,
            port_blocking_a => port_blocking_a,
            port_not_forwarding_a => port_not_forwarding_a,
            rx_filter_a  => rx_filter_a,
            rx_multicast_filter_a => rx_multicast_filter_a,
            tx_filter_a  => tx_filter_a,
            tx_multicast_filter_a => tx_multicast_filter_a,
            monitor_enable_a => monitor_enable_a,
            port_type_msb_a => port_type_msb_a,
            port_type_mid_a => port_type_mid_a,
            port_type_lsb_a => port_type_lsb_a,
            rega_read_data => rega_read_data,
            port12_data  => port12_data,
            port13_data  => port13_data,
            port14_data  => port14_data,
            port15_data  => port15_data,
            port16_data  => port16_data,
            port17_data  => port17_data);


-- ====================================================

port regs_b: rbsm_port_regs_b
port map(
            clock25        => clock25,
            reset          => reset,
            rbsm_proc_rq => rbsm_proc_rq,
            rbsm_proc wena => rbsm_proc_wena,
```

Aug 24 11:59 1994 Who: johnf File /c2/local_user/bma/bma_rbsm/bma_rbsm_core.vhd Page 35

```
            reg_write_data => rbsm_proc_wdata(15 downto 0),
            rbsm_proc_addr => rbsm_proc_addr,
            rbsm_proc_ack => rbsm_proc_ack,
            ct_enable_b  => ct_enable_b,
            ct_multicast_enable_b => ct_multicast_enable_b,
            rx_disable_b => rx_disable_b,
            rx_multicast_disable_b => rx_multicast_disable_b,
            tx_disable_b => tx_disable_b,
            tx_multicast_disable_b => tx_multicast_disable_b,
            port_blocking_b => port_blocking_b,
            port_not_forwarding_b => port_not_forwarding_b,
            rx_filter_b  => rx_filter_b,
            rx_multicast_filter_b => rx_multicast_filter_b,
            tx_filter_b  => tx_filter_b,
            tx_multicast_filter_b => tx_multicast_filter_b,
            monitor_enable_b => monitor_enable_b,
            port_type_msb_b => port_type_msb_b,
            port_type_mid_b => port_type_mid_b,
            port_type_lsb_b => port_type_lsb_b,
            regb_read_data => regb_read_data,
            port6_data   => port6_data,
            port7_data   => port7_data,
            port8_data   => port8_data,
            port9_data   => port9_data,
            port10_data  => port10_data,
            port11_data  => port11_data);

-- ************************************************************

port_regs_c: rbsm_port_regs_c
port map(
            clock25        => clock25,
            reset          => reset,
            rbsm_proc_rq => rbsm_proc_rq,
            rbsm_proc_wena => rbsm_proc_wena,
            reg_write_data => rbsm_proc_wdata(15 downto 0),
            rbsm_proc_addr => rbsm_proc_addr,
            rbsm_proc_ack => rbsm_proc_ack,
            ct_enable_c  => ct_enable_c,
            ct_multicast_enable_c => ct_multicast_enable_c,
            rx_disable_c => rx_disable_c,
            rx_multicast_disable_c => rx_multicast_disable_c,
            tx_disable_c => tx_disable_c,
            tx_multicast_disable_c => tx_multicast_disable_c,
            port_blocking_c => port_blocking_c,
            port_not_forwarding_c => port_not_forwarding_c,
            rx_filter_c  => rx_filter_c,
            rx_multicast_filter_c => rx_multicast_filter_c,
            tx_filter_c  => tx_filter_c,
            tx_multicast_filter_c => tx_multicast_filter_c,
            monitor_enable_c => monitor_enable_c,
            port_type_msb_c => port_type_msb_c,
            port_type_mid_c => port_type_mid_c,
            port_type_lsb_c => port_type_lsb_c,
            regc_read_data => regc_read_data,
            port0_data   => port0_data,
            port1_data   => port1_data,
            port2_data   => port2_data,
            port3_data   => port3_data,
```

Aug 24 11:59 1994 Who: johnf File: /c2/local_user/bma/bma_rbsm/bma_rbsm_core.vhd Page 36

```
            port4_data   => port4_data,
            port5_data   => port5_data);

-- ************************************************************

port_regs_mux: rbsm_port_regs_mux
port map(
            rbsm_proc_rq => rbsm_proc_rq,
            rbsm_proc_addr => rbsm_proc_addr,
            rega_read_data => rega_read_data,
            regb_read_data => regb_read_data,
            regc_read_data => regc_read_data,
            ct_enable_a  => ct_enable_a,
            ct_multicast_enable_a => ct_multicast_enable_a,
            rx_disable_a => rx_disable_a,
            rx_multicast_disable_a => rx_multicast_disable_a,
            tx_disable_a => tx_disable_a,
            tx_multicast_disable_a => tx_multicast_disable_a,
            port_blocking_a => port_blocking_a,
            port_not_forwarding_a => port_not_forwarding_a,
            rx_filter_a  => rx_filter_a,
            rx_multicast_filter_a => rx_multicast_filter_a,
            tx_filter_a  => tx_filter_a,
            tx_multicast_filter_a => tx_multicast_filter_a,
            monitor_enable_a => monitor_enable_a,
            port_type_msb_a => port_type_msb_a,
            port_type_mid_a => port_type_mid_a,
            port_type_lsb_a => port_type_lsb_a,
            ct_enable_b  => ct_enable_b,
            ct_multicast_enable_b => ct_multicast_enable_b,
            rx_disable_b => rx_disable_b,
            rx_multicast_disable_b => rx_multicast_disable_b,
            tx_disable_b => tx_disable_b,
            tx_multicast_disable_b => tx_multicast_disable_b,
            port_blocking_b => port_blocking_b,
            port_not_forwarding_b => port_not_forwarding_b,
            rx_filter_b  => rx_filter_b,
            rx_multicast_filter_b => rx_multicast_filter_b,
            tx_filter_b  => tx_filter_b,
            tx_multicast_filter_b => tx_multicast_filter_b,
            monitor_enable_b => monitor_enable_b,
            port_type_msb_b => port_type_msb_b,
            port_type_mid_b => port_type_mid_b,
            port_type_lsb_b => port_type_lsb_b,
            ct_enable_c  => ct_enable_c,
            ct_multicast_enable_c => ct_multicast_enable_c,
            rx_disable_c => rx_disable_c,
            rx_multicast_disable_c => rx_multicast_disable_c,
            tx_disable_c => tx_disable_c,
            tx_multicast_disable_c => tx_multicast_disable_c,
            port_blocking_c => port_blocking_c,
            port_not_forwarding_c => port_not_forwarding_c,
            rx_filter_c  => rx_filter_c,
            rx_multicast_filter_c => rx_multicast_filter_c,
            tx_filter_c  => tx_filter_c,
            tx_multicast_filter_c => tx_multicast_filter_c,
            monitor_enable_c => monitor_enable_c,
            port_type_msb_c => port_type_msb_c,
            port_type_mid_c => port_type_mid_c,
```

```
Aug 24 11:59 1994  Who  johnf  File: /c2/local_user/bma/bma_rbsm/bma_rbsm_core.vhd Page 37

            port_type_lsb_c => port_type_lsb_c
            ct_enable      => ct_enable,
            ct_multicast_enable => ct_multicast_enable,
            rx_disable     => rx_disable,
            rx_multicast_disable => rx_multicast_disable,
            tx_disable     => tx_disable,
            tx_multicast_disable => tx_multicast_disable,
            port_blocking => port_blocking,
            port_not_forwarding => port_not_forwarding,
            rx_filter      => rx_filter,
            rx_multicast_filter => rx_multicast_filter,
            tx_filter      => tx_filter,
            tx_multicast_filter => tx_multicast_filter,
            monitor_enable => monitor_enable,
            port_type_msb => port_type_msb,
            port_type_mid => port_type_mid,
            port_type_lsb => port_type_lsb,
            reg_read_data => reg_read_data);

-- ********************************************************


rand: rbsm_and
port map(
            bma_ram_pulse   => bma_ram_pulse,
            rbsm_ram_wena   => rbsm_ram_wena,
            rbsm_ram_wrstb  => rbsm_ram_wrstb);



-- ********************************************************


raddr: rbsm_addr_sync
port map(
            clock25                => clock25,
            reset                  => reset,
            sadd_channum           => sadd_channum,
            receive_header_offset  => receive_header_offset,
            load_sram_wregs        => load_sram_wregs,
            sram_wr_done           => sram_wr_done,
            rbsm_sram_ready        => rbsm_sram_ready,
            frame_cntl_addr        => frame_cntl_addr);


-- ********************************************************


--
-- Monitor_process is only used as a file writer so as
-- to help facilitate debug of the RBSM in system test.
--

-- synopsys_translate_off

Aug 24 11:59 1994  Who: johnf  File: /c2/local_user/bma/bma_rbsm/bma_rbsm_core.vhd Page 38


monitor_process:
process

   file outfile: text is out "./rbsm_sram_mon" ;

   variable outline          : line;
   variable sram_addr        : std_logic_vector(19 downto 0) ;

begin


    wait until clock25 = '1' and clock25'event;
    wait for 10 ns ;

            sram_addr(19 downto 17) := "000" ;
            sram_addr(16 downto 0) := rbsm_sram_addr ;

    if (sadd_channum = CHAN_36) then

            write(outline,string'("RBSM SRAM Write Address = "));
            hwrite(outline,sram_addr) ;

            write(outline,string'(" : write data = "));
            hwrite(outline,rbsm_sram_wdata) ;
            write(outline,string'(" : "));

            write(outline,NOW);
            writeline(outfile,outline) ;


            write(outline,string'("RBSM SRAM Write data in binary "));
            write(outline,string'(" : write data = "));
            write(outline,rbsm_sram_wdata) ;
            write(outline,string'(" : "));
            write(outline,NOW);
            writeline(outfile,outline) ;

            write(outline,string'("     "));
            writeline(outfile,outline) ;


    elsif (sadd_channum = CHAN_76) then

            write(outline,string'("RBSM SRAM Read  Address = "));
            hwrite(outline,sram_addr) ;

            write(outline,string'("                              : "));
            write(outline,NOW);
            writeline(outfile,outline) ;
```

```
            write(outline,string'("      "));
            writeline(outfile,outline);

    end if;

end process monitor_process;

 -- synopsys translate_on

 end synthesize ;
```

```
Aug 17 10 46 1994  Who: johnf  File: /c2/local user/bma/bma rbsm/bma_rbsm_lib/rbsm_addr_sync vhd Page 1

-- $Id. rbsm_addr_sync.vhd.v 1.1 94/04/29 10 56 24 johnf Exp $
--
--  Author       John A. Flanders
--
--
--  Title    .   rbsm_addr_sync : rbsm_addr_sync  is the receive buffer state machine component used to
--                                fix a synchronous reset problem with the 5 low ordered frame control
--                                address bits
--
--
--
--
--  Revision History
--
--  4/28/94 .                    original version
--
--
--
--
--

library std;
library synopsys ;
library ieee ;
library bma_lib;
library bma_rbsm_lib;

use synopsys.attributes.all.
use ieee.std_logic_1164.all.
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_addr_sync is
    port(
          clock25                  in std_logic              ; -- system clock
          reset                    in std_logic              ; -- system reset
          sadd_channum             in system_channel_number  ; -- from SRAM Arbiter
          receive_header_offset    in rxoff_data             ; -- from DMA Controller
          load_sram_wregs          in std logic              ; -- from rbsm_sram_control
          sram_wr_done             in std_logic              . -- from rbsm_sram_control
          rbsm_sram_ready          in std_logic              . -- from rbsm_sram_control
          frame_cntl_addr          buffer rxoff_data)        ; -- to rbsm_sram_control

end rbsm_addr_sync;


------------------------------------------------------------
------------------------------------------------------------


architecture synthesize of rbsm_addr sync is

Aug 17 10:46 1994  Who: johnf  File: /c2/local_user/bma/bma_rbsm/bma_rbsm_lib/rbsm_addr_sync.vhd Page 2


signal offset       : natural ;
signal offset_plus6 : natural ;
signal offset_plus7 : natural ;

signal control_address : rxoff_data

-- declarations


------------------------------------------------------------
-- body
------------------------------------------------------------

begin

rbsm_saddr_comb:
process(frame_cntl_addr,sadd_channum,load_sram_wregs,offset,receive_header_offset,
        rbsm_sram_ready,offset_plus6,offset_plus7,sram_wr_done,reset)

begin

    offset       <= conv_integer(receive_header_offset) ;
    offset_plus6 <= offset + 6 ;
    offset_plus7 <= offset + 7 ;


--
-- Generate control_address: used as the least significant
-- address bits when status is being written into the frame control
-- area of the receive buffer.
--

        if (reset = ACT) then
            control_address <= "00000"  ;
        elsif (load_sram_wregs = ACT) then
            control_address <= conv_std_logic_vector(offset_plus6,5) ;
        elsif (rbsm_sram_ready = NOT_ACT and
               sadd_channum = CHAN_35 and sram_wr_done = NOT_ACT) then
            control_address <= conv_std_logic_vector(offset_plus7,5)  ;
        else
            control_address <= frame_cntl_addr(4 downto 0) ;
        end if;


 nd process rbsm_saddr_comb;


rbsm_saddr_sync:
process
begin
    wait until clock25 = '1'     ;

--
```

```
Aug 17 10:46 1994  Who: johnf  File  /c2/local user/bma/bma_rbsm/bma_rbsm lib/rbsm_addr_sync.vhd Page 3

-- Generate frame_cntl_addr   used as the least significant
-- address bits when status is being written into the frame control
-- area of the receive buffer
--

        if (reset = ACT) then
            frame_cntl_addr <= "00000"  ;
        else
            frame_cntl_addr <= control_address ;
        end if;

end process rbsm_saddr_sync.

end synthesize.
```

```
Aug 17 10 46 1994  Who: johnf  File: /c2/local user/bma/bma rbsm/bma_rbsm_lib/rbsm ama_set.vhd Page 1

-- $Id  rbsm ama set.vhd v 1.5 93/10/15 12 30 22 johnf Exp $
--
--  Author       John A. Flanders
--
--
--  Title        rbsm_ama_set     rbsm_ama_set is the receive buffer state machine component used
--                                to inhibit any reading of the Receive Status Queue while the
--                                AMA Status Queue is being read. These control bits are used just
--                                in case rx avail goes active while the AMA Status Queue read cycle
--                                is in progress. AMA status can be read without reading any Receive
--                                status for Cut-Thru operation. Cut-Thru is only supported for
--                                Ethernet ports and Not for FDDI ports at this time. The FDDI ports
--                                should not be enabled for Cut-Thru by the processor otherwise the
--                                BMA could get confused and not work properly.
--
--
--
--  Revision History
--
--  6/23/93 :                     original version
--
--
--
--
--

library synopsys ;
library ieee ;
library bma_lib;
library bma_rbsm_lib.

use synopsys.attributes.all;
use ieee.std_logic_1164.all;
use ieee.std_logic_arith.all;
use ieee.std_logic_unsigned.all;
use ieee.std_logic_misc.all;
use bma_lib.bma types.all;
use bma_rbsm_lib.bma_rbsm_types.all;


entity rbsm_ama_set is
    port( clock25         : in std_logic        -- system clock
          reset           in std_logic  .   -- system reset
          cont_scan       in std_logic  .   -- from rbsm_stat_control
          rd_state0       in std_logic  .   -- from rbsm_stat_control
          rd_state1       . in std_logic  .   -- from rbsm_stat_control
          scan_vector     : in SCAN VEC   .   -- from rbsm_scan_vector
          ama_only        : in port_vector  .   -- from rbsm_request
          ama_set         : buffer port vector   )   -- from rbsm_ama_set


end rbsm_ama_set;
```

```
Aug 17 10:46 1994  Who: johnf  File: /c2/local_user/bma/bma_rbsm/bma_rbsm_lib/rbsm_ama_set.vhd Page 2

------------------------------------------------------------
------------------------------------------------------------


architecture synthesize of rbsm_ama_set is

-- declarations

signal enet0         : std_logic ;
signal enet1         : std_logic .
signal enet2         : std_logic ;
signal enet3         : std_logic ;
signal enet4         : std_logic ;
signal enet5         : std_logic ;
signal enet6         : std_logic .
signal enet7         : std_logic ;
signal enet8         : std_logic ;
signal enet9         : std_logic ;
signal enet10        : std_logic ;
signal enet11        : std_logic ;
signal enet12        : std_logic ;
signal enet13        : std_logic ;
signal enet14        : std_logic ;
signal enet15        : std_logic ;
signal fddi1         : std_logic ;
signal fddi2         : std_logic ;


------------------------------------------------------------
-- body
------------------------------------------------------------

begin


--
--  process rbsm_ama_set_sync is used to generate the registered outputs
--  which will be used to inhibit any reading of Receive Status while an
--  AMA Status read only cycle is in progress.
--

rbsm_ama_set_sync:
process
begin
    wait until clock25 = '1'   .

        ama_set(17) <= fddi2    .
        ama_set(16) <= fddi1    .
        ama_set(15) <= enet15   ;
        ama_set(14) <= enet14   ;
        ama_set(13) <= enet13   ;
        ama_set(12) <= enet12   ;
        ama_set(11) <= enet11   .
        ama_set(10) <= enet10   ;
        ama_set(9)  <= enet9    ;
        ama_set(8)  <= enet8    ;
        ama_set(7)  <= enet7    ;
```

```
Aug 17 10:46 1994  Who: johnf  File: /c2/local_user/bma/bma_rbsm/bma_rbsm_lib/rbsm_ama_set.vhd Page 3

        ama_set(6)   <= enet6   ;
        ama_set(5)   <= enet5   ;
        ama_set(4)   <= enet4   ;
        ama_set(3)   <= enet3   ;
        ama_set(2)   <= enet2   ;
        ama_set(1)   <= enet1   ;
        ama_set(0)   <= enet0   ;

end process rbsm_ama_set_sync ;

--
-- process rbsm_ama_set_comb is used to generate the combinatorial logic
-- required for all 18 flops generated by this model.
--

rbsm_ama_set_comb:
process(reset,scan_vector,ama_only,ama_set,cont_scan,rd_state0,rd_state1)
begin

-- ***********************************************************
-- Generate enet0
-- ***********************************************************

        if (reset = ACT) then
            enet0  <= NOT_ACT ;
        elsif (scan_vector(0) = ACT and ama_only(0) = ACT and
               rd_state0 = NOT_ACT and rd_state1 = NOT_ACT) then
            enet0  <= ACT ;
        elsif (ama_set(0) = ACT and cont_scan = NOT_ACT) then
            enet0  <= ACT ;
        else
            enet0 <= NOT_ACT ;
        end if;

-- ***********************************************************
-- Generate enet1
-- ***********************************************************

        if (reset = ACT) then
            enet1  <= NOT_ACT ;
        elsif (scan_vector(1) = ACT and ama_only(1) = ACT and
               rd_state0 = NOT_ACT and rd_state1 = NOT_ACT) then
            enet1  <= ACT ;
        elsif (ama_set(1) = ACT and cont_scan = NOT_ACT) then
            enet1  <= ACT ;
        else
            enet1 <= NOT_ACT ;
        end if;

-- ***********************************************************
-- Generate enet2
-- ***********************************************************

        if (reset = ACT) then
            enet2  <= NOT_ACT ;
        elsif (scan_vector(2) = ACT and ama_only(2) = ACT and

Aug 17 10:46 1994  Who: johnf  File: /c2/local_user/bma/bma_rbsm/bma_rbsm_lib/rbsm_ama_set.vhd Page 4

               rd_state0 = NOT_ACT and rd_state1 = NOT_ACT) then
            enet2  <= ACT ;
        elsif (ama_set(2) = ACT and cont_scan = NOT_ACT) then
            enet2  <= ACT ;
        else
            enet2 <= NOT_ACT ;
        end if;

-- ***********************************************************
-- Generate enet3
-- ***********************************************************

        if (reset = ACT) then
            enet3  <= NOT_ACT ;
        elsif (scan_vector(3) = ACT and ama_only(3) = ACT and
               rd_state0 = NOT_ACT and rd_state1 = NOT_ACT) then
            enet3  <= ACT ;
        elsif (ama_set(3) = ACT and cont_scan = NOT_ACT) then
            enet3  <= ACT ;
        else
            enet3 <= NOT_ACT ;
        end if;

-- ***********************************************************
-- Generate enet4
-- ***********************************************************

        if (reset = ACT) then
            enet4  <= NOT_ACT ;
        elsif (scan_vector(4) = ACT and ama_only(4) = ACT and
               rd_state0 = NOT_ACT and rd_state1 = NOT_ACT) then
            enet4  <= ACT ;
        elsif (ama_set(4) = ACT and cont_scan = NOT_ACT) then
            enet4  <= ACT ;
        else
            enet4 <= NOT_ACT ;
        end if;

-- ***********************************************************
-- Generate enet5
-- ***********************************************************

        if (reset = ACT) then
            enet5  <= NOT_ACT ;
        elsif (scan_vector(5) = ACT and ama_only(5) = ACT and
               rd_state0 = NOT_ACT and rd_state1 = NOT_ACT) then
            enet5  <= ACT ;
        elsif (ama_set(5) = ACT and cont_scan = NOT_ACT) then
            enet5  <= ACT ;
        else
            enet5 <= NOT_ACT ;
        end if;

-- ***********************************************************
-- Generate enet6
-- ***********************************************************
```

```
        if (reset = ACT) then
            enet6  <= NOT_ACT ;
        elsif (scan_vector(6) = ACT and ama_only(6) = ACT and
                rd_state0 = NOT_ACT and rd_state1 = NOT_ACT) then
            enet6  <= ACT ;
        elsif (ama_set(6) = ACT and cont_scan = NOT_ACT) then
            enet6  <= ACT ;
        else
            enet6 <= NOT_ACT ;
        end if;

-- ============================================================
-- Generate enet7
-- ============================================================

        if (reset = ACT) then
            enet7  <= NOT_ACT ;
        elsif (scan_vector(7) = ACT and ama_only(7) = ACT and
                rd_state0 = NOT_ACT and rd_state1 = NOT_ACT) then
            enet7  <= ACT ;
        elsif (ama_set(7) = ACT and cont_scan = NOT_ACT) then
            enet7  <= ACT ;
        else
            enet7 <= NOT_ACT ;
        end if;

-- ============================================================
-- Generate enet8
-- ============================================================

        if (reset = ACT) then
            enet8  <= NOT_ACT ;
        elsif (scan_vector(8) = ACT and ama_only(8) = ACT and
                rd_state0 = NOT_ACT and rd_state1 = NOT_ACT) then
            enet8  <= ACT ;
        elsif (ama_set(8) = ACT and cont_scan = NOT_ACT) then
            enet8  <= ACT ;
        else
            enet8 <= NOT_ACT ;
        end if;

-- ============================================================
-- Generate enet9
-- ============================================================

        if (reset = ACT) then
            enet9  <= NOT_ACT ;
        elsif (scan_vector(9) = ACT and ama_only(9) = ACT and
                rd_state0 = NOT_ACT and rd_state1 = NOT_ACT) then
            enet9  <= ACT ;
        elsif (ama_set(9) = ACT and cont_scan = NOT_ACT) then
            enet9  <= ACT ;
        else
            enet9 <= NOT_ACT ;
        end if;
```

```
-- ============================================================
-- Generate enet10
-- ============================================================

        if (reset = ACT) then
            enet10  <= NOT_ACT ;
        elsif (scan_vector(10) = ACT and ama_only(10) = ACT and
                rd_state0 = NOT_ACT and rd_state1 = NOT_ACT) then
            enet10  <= ACT ;
        elsif (ama_set(10) = ACT and cont_scan = NOT_ACT) then
            enet10  <= ACT ;
        else
            enet10 <= NOT_ACT ;
        end if;

-- ============================================================
-- Generate enet11
-- ============================================================

        if (reset = ACT) then
            enet11  <= NOT_ACT ;
        elsif (scan_vector(11) = ACT and ama_only(11) = ACT and
                rd_state0 = NOT_ACT and rd_state1 = NOT_ACT) then
            enet11  <= ACT ;
        elsif (ama_set(11) = ACT and cont_scan = NOT_ACT) then
            enet11  <= ACT ;
        else
            enet11 <= NOT_ACT ;
        end if;

-- ============================================================
-- Generate enet12
-- ============================================================

        if (reset = ACT) then
            enet12  <= NOT_ACT ;
        elsif (scan_vector(12) = ACT and ama_only(12) = ACT and
                rd_state0 = NOT_ACT and rd_state1 = NOT_ACT) then
            enet12  <= ACT ;
        elsif (ama_set(12) = ACT and cont_scan = NOT_ACT) then
            enet12  <= ACT ;
        else
            enet12 <= NOT_ACT ;
        end if;

-- ============================================================
-- Generate enet13
-- ============================================================

        if (reset = ACT) then
            enet13  <= NOT_ACT ;
        elsif (scan_vector(13) = ACT and ama_only(13) = ACT and
                rd_state0 = NOT_ACT and rd_state1 = NOT_ACT) then
            enet13  <= ACT ;
        elsif (ama_set(13) = ACT and cont_scan = NOT_ACT) then
            enet13  <= ACT ;
```

```
Aug 17 10:46 1994  Who: johnf  File: /c2/local_user/bma/bma_rbsm/bma_rbsm_lib/rbsm_ama_set.vhd Page 7

        else
            enet13 <= NOT_ACT ;
        end if;

-- ==============================================================
-- Generate enet14
-- ==============================================================

        if (reset = ACT) then
            enet14  <= NOT_ACT ;
        elsif (scan_vector(14) = ACT and ama_only(14) = ACT and
                rd_state0 = NOT_ACT and rd_state1 = NOT_ACT) then
            enet14  <= ACT ;
        elsif (ama_set(14) = ACT and cont_scan = NOT_ACT) then
            enet14  <= ACT ;
        else
            enet14 <= NOT_ACT ;
        end if;

-- ==============================================================
-- Generate enet15
-- ==============================================================

        if (reset = ACT) then
            enet15  <= NOT_ACT ;
        elsif (scan_vector(15) = ACT and ama_only(15) = ACT and
                rd_state0 = NOT_ACT and rd_state1 = NOT_ACT) then
            enet15  <= ACT ;
        elsif (ama_set(15) = ACT and cont_scan = NOT_ACT) then
            enet15  <= ACT ;
        else
            enet15 <= NOT_ACT ;
        end if;

-- ==============================================================
-- Generate fddi1
-- ==============================================================

        if (reset = ACT) then
            fddi1  <= NOT_ACT ;
        elsif (scan_vector(16) = ACT and ama_only(16) = ACT and
                rd_state0 = NOT_ACT and rd_state1 = NOT_ACT) then
            fddi1  <= ACT ;
        elsif (scan_vector(17) = ACT and ama_only(16) = ACT and
                rd_state0 = NOT_ACT and rd_state1 = NOT_ACT) then
            fddi1  <= ACT ;
        elsif (ama_set(16) = ACT and cont_scan = NOT_ACT) then
            fddi1  <= ACT ;
        else
            fddi1 <= NOT_ACT ;
        end if;

-- ==============================================================
-- Generate fddi2
-- ==============================================================

Aug 17 10:46 1994  Who: johnf  File: /c2/local_user/bma/bma_rbsm/bma_rbsm_lib/rbsm_ama_set.vhd Page 8

        if (reset = ACT) then
            fddi2  <= NOT_ACT ;
        elsif (scan_vector(18) = ACT and ama_only(17) = ACT and
                rd_state0 = NOT_ACT and rd_state1 = NOT_ACT) then
            fddi2  <= ACT ;
        elsif (scan_vector(19) = ACT and ama_only(17) = ACT and
                rd_state0 = NOT_ACT and rd_state1 = NOT_ACT) then
            fddi2  <= ACT ;
        elsif (ama_set(17) = ACT and cont_scan = NOT_ACT) then
            fddi2  <= ACT ;
        else
            fddi2 <= NOT_ACT ;
        end if;


end process rbsm_ama_set_comb;

end synthesize;
```

```
Aug 17 10 46 1994  Who: johnf  File: /c2/local_user/bma/bma_rbsm/bma_rbsm_lib/rbsm_and.vhd Page 1

-- $Id: rbsm_and.vhd,v 1.1 94/03/25 13:54:36 johnf Exp $
--
--  Author       John A. Flanders
--
--
--  Title        rbsm_and          rbsm_and is the component used to create a two input and gate
--                                 used to generate the write pulse to the RBSM RAM
--
--
--
--
--  Revision History
--
--  3/25/94 :                      original version
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all


entity rbsm_and is
    port(
          bma_ram_pulse     : in std_logic ;   -- system ram pulse
          rbsm_ram_wena     : in std_logic ;   -- rbsm ram write enable (from rbsm_ram_control)
          rbsm_ram_wrstb    : buffer std_logic ) ; -- to rbsm ram

end rbsm_and ;


--------------------------------------------------------------
--------------------------------------------------------------

architecture synthesize of rbsm_and is

begin

rbsm_ram_wrstb <= bma_ram_pulse and rbsm_ram_wena ;

end synthesize;
```

```
Aug 17 10:46 1994  Who: johnf  File: /c2/local_user/bma/bma_rbsm/bma_rbsm_lib/rbsm_bbone.vhd Page 1

-- $Id: rbsm_bbone.vhd,v 1.1 94/02/22 11:02:46 johnf Exp $
--
--  Author        John A. Flanders
--
--
--  Title         rbsm_bbone      : rbsm_bbone is the component used to create the 7 bit backbone
--                                  register which can be programmed by the microprocessor and used
--                                  to set the port which is to be defined as the backbone port.
--                                  When the RBSM is placed into positive forwarding mode all received
--                                  packets with unknown DAs will be forwarded to the backbone port.
--
--
--
--
--
--  Revision History
--
--  2/7/94                          original version
--
--

library synopsys ;
library ieee ;
library bma_lib ;
library bma_rbsm_lib ;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_bbone is
    port(
        clock25             : in std_logic ;   -- system clock
        reset               : in std_logic ;   -- system reset

        rbsm_proc_rq        : in std_logic ;            -- uP request      (from microprocessor interface)
        rbsm_proc_wena      : in std_logic ;            -- uP write enable (from microprocessor interface)
        rbsm_proc_ack       : in std_logic ;            -- uP acknowledge  (from rbsm_ram_control)
        rbsm_proc_addr      : in processor_address_bus ; -- uP read/write address
        bbone_reg_wdata     : in BBONE_REG_DATA ;       -- uP write data (from microprocessor interface)

        bbone_register      : buffer BBONE_REG_DATA   ; -- extra output
        bbone_reg_rdata     : buffer BBONE_REG_DATA ) ; -- to microprocessor interface

end rbsm_bbone ;

-------------------------------------------------------------
-------------------------------------------------------------


architecture synthesize of rbsm_bbone is
```

```
Aug 17 10:46 1994  Who: johnf  File: /c2/local_user/bma/bma_rbsm/bma_rbsm_lib/rbsm_bbone.vhd Page 2

begin

bbone_reg_rdata <= bbone_register ;

rbsm_bbone_sync:
process
begin

    wait until clock25 = '1';

--
-- Process used to generate the 7 bit wide backbone
-- register.
--

    if (reset = ACT) then
        bbone_register <= (others => '0') ;
    elsif (rbsm_proc_addr = BBONE_ADDR and rbsm_proc_wena = ACT and
            rbsm_proc_ack = ACT and rbsm_proc_rq = ACT) then
        bbone_register <= bbone_reg_wdata ;
    else
        bbone_register <= bbone_register ;
    end if;

end process rbsm_bbone_sync ;

end synthesize;
```

```
Aug 17 10 50 1994  Who: johnf  File  /c2/local user/bma/bma_rbsm/bma_rbsm_lib/rbsm code_vectors vhd Page 1

--  $Id: rbsm_code_vectors.vhd.v L 12 94/06/02 18:11.38 johnf Exp $
--  Author       John A  Flanders
--
--
--  Title        rbsm code_vectors    rbsm_code_vectors is the receive buffer state machine component used to
--                                    generate the code vectors which are placed in the 29K receive FIFO. There
--                                    are a total of 29 defined code vectors described below.
--
--
-- cv_unicast_no_translation                        0
-- cv_unicast_no_translation_filters                1
-- cv_unicast_no_translation_cutthru                2
-- cv_unicast_no_translation_cutthru_end            3
-- cv_unicast_ethernet_to_fddi                      4
-- cv_unicast_ethernet_to_fddi_filters              5
-- cv_unicast_fddi_to_ethernet                      6
-- cv_unicast_fddi_to_ethernet_filters              7
-- cv_unicast_fddi_to_ethernet_frag                 8
-- cv_unicast_da_unknown                            9
-- cv_unicast_exception                             10
--
-- cv_multicast_from_ethernet                       11
-- cv_multicast_from_ethernet_exception             12
-- cv_multicast_from_ethernet_cutthru end           13
-- cv_multicast_from_fddi                           14
-- cv_multicast_from_fddi_exception                 15
-- cv_multicast_from_fddi_frag                      16
-- cv_multicast_exception                           17
--
-- cv_receive frame_error                           18
-- cv_non_llc frame                                 19
--
-- cv_internal_unicast                              20
-- cv_internal_unicast_exception                    21
-- cv_internal_multicast                            22
-- cv_internal_broadcast                            23
--
-- cv_multibuffer_not_last_buffer                   24
-- cv_multibuffer_no_translation                    25
-- cv_multibuffer_no_translation_filters            26
-- cv_multibuffer_discard_frame                     27
--
-- cv_not defined                                   28
-- cv_monitor source                                29
-- cv monitor destination                           30
-- cv_fifo_empty                                    31
--
--
--
--
--
--  Revision History
--
--  7/9/93 :                    original version
--
--
--
--
--
```

```
Aug 17 10:50 1994  Who: johnf  File: /c2/local_user/bma/bma_rbsm/bma_rbsm_lib/rbsm_code_vectors.vhd Page 2

library synopsys ;
library ieee ;
library bma_lib.
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma rbsm lib.bma_rbsm_types.all.



entity rbsm_code_vectors is
    port(
          clock25                          : in std_logic      ; -- system clock
          reset                            : in std_logic      ; -- system reset

          ethernet_eof                     : in std_logic      ; -- from rbsm_unload
          fddi_eof                         : in std_logic      ; -- from rbsm_unload
          fddi_multi_buffer                : in std_logic      ; -- from rbsm_multi_buffer

          dest_group_address               : in std_logic      ; -- from rbsm_status_registers
          dest_broadcast                   : in std_logic      ; -- from rbsm_status_registers
          dest_address_match               : in std_logic      ; -- from rbsm_status_registers
          dest_internal                    : in std_logic      ; -- from rbsm_status_registers
          filter_frame                     : in std_logic      ; -- from rbsm_status_registers
          ethernet_rx_error                : in std_logic      ; -- from rbsm_status_registers
          fddi_abort                       : in std_logic      ; -- from rbsm_status_registers
          enet_abort                       : in std_logic      ; -- from rbsm_status_registers   ADDED 5/2/94
          llc_frame_type                   : in std_logic      ; -- from rbsm_status_registers
          fddi_rx_error                    : in std_logic      ; -- from rbsm_status_registers

          dest_port_type                   : in PORT_TYPE      ; -- from rbsm_config

          fragment_frame                   : in std_logic      ; -- from rbsm_frag

          src_ct_allowed                   : in std_logic      , -- from rbsm_config
          multicast_ct_allowed             : in std_logic      ; -- from rbsm_config
          dest_ct_allowed                  : in std_logic      ; -- from rbsm_config
          rx_disable_on                    : in std_logic      ; -- from rbsm_config
          rx_multicast_disable_on          : in std_logic      ; -- from rbsm_config
          rx_filter_on                     : in std_logic      ; -- from rbsm_config
          rx_monitor_on                    : in std_logic      ; -- from rbsm_config
          rx_multicast_filter_on           : in std_logic      ; -- from rbsm_config
          tx_disable_on                    : in std_logic      ; -- from rbsm_config
          tx_filter_on                     : in std_logic      ; -- from rbsm_config
          tx_monitor_on                    : in std_logic      ; -- from rbsm_config
          port_blocking_on                 : in std_logic      ; -- from rbsm_config
          dest_port_blocking               : in std_logic      ; -- from rbsm_config
          src_port_not_forwarding          : in std_logic      ; -- from rbsm_config
          dest port not_forwarding         : in std_logic      . -- from rbsm_config

          any_multicast_cut_thru_disabled  : in std_logic      . -- from rbsm_config
          any_enet_dest_tx_filter          : in std_logic      ; -- from rbsm_config
```

```
Aug 17 10:50 1994  Who  johnf  File  /c2/local user/bma/bma_rbsm/bma_rbsm_lib/rbsm_code vectors.vhd Page 3

        any_enet_dest_tx_multicast_filter : in std logic        ; -- from rbsm_config

        any_dest_tx_disabled              : in std_logic        ; -- from rbsm_config
        any_dest_tx_multicast_disabled    : in std_logic        ; -- from rbsm_config
        any_dest_tx_filter                : in std_logic        ; -- from rbsm_config
        any_dest_tx_multicast_filter      : in std_logic        ; -- from rbsm_config
        any_dest_port_not_forwarding      : in std_logic        ; -- from rbsm_config
        any_dest_port_blocking            : in std_logic        ; -- from rbsm_config
        any_dest_monitor_on               : in std_logic        ; -- from rbsm_config
        any_dest_multicast_monitor_on     : in std_logic        ; -- from rbsm_config

        src_address_status                : in SA_STATUS        ; -- from rbsm_sa_status

        cut thru_end                      : in std_logic        ; -- from rbsm_ct_active
        cont_scan                         : in std_logic        ; -- from rbsm_stat_control

        positive_forward_enable           : in std_logic        ; -- from microprocessor interface   Added 2/9/94
        rxport_equals_bbone               : in std_logic        ; -- from rbsm_config                Added 2/9/94
        bbone_src_ct                      : in std_logic        ; -- from rbsm_config                Added 2/9/94
        bbone_dest_ct                     : in std_logic        ; -- from rbsm_config                Added 2/9/94
        bbone_multicast_ct                : in std_logic        ; -- from rbsm_config                Added 2/9/94

        destination_monitor               : buffer std_logic    ; --
        code_vector                       : buffer CV_CODE    ) ; -- to rbsm_sram_registers

end rbsm_code_vectors;



-------------------------------------------------------------
-------------------------------------------------------------



architecture synthesize of rbsm_code_vectors is

-- declarations

signal cv_unicast_no_translation                    : std_logic ;
signal cv_unicast_no_translation_filters            : std_logic ;
signal cv_unicast_no_translation_cutthru            : std_logic ;
signal cv_unicast_no_translation_cutthru_end        : std_logic ;
signal cv_unicast_ethernet_to_fddi                  : std_logic ;
signal cv_unicast_ethernet_to_fddi_filters          : std_logic ;
signal cv_unicast_fddi_to_ethernet                  : std_logic ;
signal cv_unicast_fddi_to_ethernet_filters          : std_logic ;
signal cv_unicast_fddi_to_ethernet_frag             : std_logic ;
signal cv_unicast_da_unknown                        : std_logic ;
signal cv_unicast_exception                         : std_logic ;

signal cv_multicast_from_ethernet                   : std_logic ;
signal cv_multicast_from_ethernet_exception         : std_logic ;
signal cv_multicast_from_ethernet_cutthru_end       : std_logic ;
signal cv_multicast_from_fddi                       : std_logic ;
signal cv_multicast_from_fddi_exception             : std_logic ;
signal cv_multicast_from_fddi_frag                  : std_logic ;
```

```
Aug 17 10:50 1994  Who: johnf  File: /c2/local_user/bma/bma_rbsm/bma_rbsm_lib/rbsm_code_vectors.vhd Page 4

signal cv_multicast_exception                       : std_logic ;

signal cv_receive_frame_error                       : std_logic ;
signal cv_non_llc_frame                             : std_logic ;
signal cv_internal_unicast                          : std_logic ;
signal cv_internal_unicast_exception                : std_logic ;
signal cv_internal_multicast                        : std_logic ;
signal cv_internal_broadcast                        : std_logic ;
signal cv_multibuffer_not_last_buffer               : std_logic ;
signal cv_multibuffer_no_translation                : std_logic ;
signal cv_multibuffer_no_translation_filters        : std_logic ;
signal cv_multibuffer_discard_frame                 : std_logic ;
signal cv_monitor_source                            : std_logic ;
signal cv_monitor_destination                       : std_logic ;



-------------------------------------------------------------
-- body
-------------------------------------------------------------

begin


--
--   process rbsm_cv_code_sync is used to generate 30 flip flops.
--   one per code vector  No more than one of the 30 flops should
--   be set at any given time. Any flop that gets set should only
--   be set for one clock cycle which follows the clock cycle that
--   cont_scan is active.
--
--
--

rbsm_cv_code_sync:
process
begin

     wait until clock25 = '1' and clock25'event ;



-- ******************************************************************
-- cv_unicast_no_translation : code_vector "00000" : 0
-- ******************************************************************

     if (reset = ACT) then
          cv_unicast_no_translation <= NOT_ACT ;

     elsif (cont_scan = ACT                                              and -- End of Ethernet Frame
               ethernet_eof = ACT                                        and -- Non Cutthru
               enet_abort = NOT_ACT                                      and -- ADDED 5/2/94
                ethernet_rx_error = NOT_ACT                              and
                 rx_monitor_on = NOT_ACT                                 and
                  destination_monitor = NOT_ACT                          and
                   filter_frame = NOT_ACT                                and
                    cut_thru_end = NOT_ACT                               and
```

```
Aug 17 10:50 1994  Who: johnf  File: /c2/local_user/bma/bma_rbsm/bma_rbsm_lib/rbsm_code_vectors.vhd Page 5

                 rx_disable_on = NOT_ACT                                     and
                  dest_group_address = NOT_ACT                               and
                   (dest_address_match = ACT                                 or
                   (dest_address_match = NOT_ACT                             and
                    positive_forward_enable = ACT))                          and
                    dest_internal = NOT_ACT                                  and
                     port_blocking_on = NOT_ACT                              and
                      src_port_not_forwarding = NOT_ACT                      and
                      ((positive_forward_enable = NOT_ACT                    and
                        src_address_status = SA_KNOWN_WITH_GOOD_PORT)        or
                       (positive_forward_enable = ACT                        and
                        rxport_equals_bbone = NOT_ACT                        and
                        src_address_status = SA_KNOWN_WITH_GOOD_PORT)        or
                       (positive_forward_enable = ACT                        and
                        rxport_equals_bbone = ACT                            and
                        src_address_status = SA_UNKNOWN))                    and
                         tx_disable_on = NOT_ACT                             and
                          dest_port_blocking = NOT_ACT                       and
                           dest_port_not_forwarding = NOT_ACT                and
                            rx_filter_on = NOT_ACT                           and
                             tx_filter_on = NOT_ACT                          and
                              dest_port_type = ETHERNET) then
       cv_unicast_no_translation <= ACT ;

    elsif (cont_scan = ACT                                                   and -- End of FDDI Frame
            fddi_eof = ACT                                                   and -- Unibuffered
             fddi_abort = NOT_ACT                                            and
              fddi_rx_error = NOT_ACT                                        and
               rx_monitor_on = NOT_ACT                                       and
                destination_monitor = NOT_ACT                                and
                 filter_frame = NOT_ACT                                      and
                  llc_frame_type = ACT                                       and
                   rx_disable_on = NOT_ACT                                   and
                    dest_group_address = NOT_ACT                             and
                    (dest_address_match = ACT                                or
                    (dest_address_match = NOT_ACT                            and
                     positive_forward_enable = ACT))                         and
                      dest_internal = NOT_ACT                                and
                       port_blocking_on = NOT_ACT                            and
                        src_port_not_forwarding = NOT_ACT                    and
                        ((positive_forward_enable = NOT_ACT                  and
                          src_address_status = SA_KNOWN_WITH_GOOD_PORT)      or
                        (positive_forward_enable = ACT                       and
                          rxport_equals_bbone = NOT_ACT                      and
                          src_address_status = SA_KNOWN_WITH_GOOD_PORT)      or
                        (positive_forward_enable = ACT                       and
                          rxport_equals_bbone = ACT                          and
                          src_address_status = SA_UNKNOWN))                  and
                           tx_disable_on = NOT_ACT                           and
                            dest_port_blocking = NOT_ACT                     and
                             dest_port_not_forwarding = NOT_ACT              and
                              rx_filter_on = NOT_ACT                         and
                               tx_filter_on = NOT_ACT                        and
                                fddi_multi_buffer = NOT_ACT                  and
                                 dest_port_type = FDDI) then
       cv_unicast_no_translation <= ACT ;

    else
       cv_unicast_no_translation <= NOT_ACT ;
```

```
Aug 17 10:50 1994  Who: johnf  File: /c2/local_user/bma/bma_rbsm/bma_rbsm_lib/rbsm_code_vectors.vhd Page 6

    end if ;

-- **************************************************************************
-- cv_unicast_no_translation_filters : code_vector "00001" : 1
-- **************************************************************************


    if (reset = ACT) then
       cv_unicast_no_translation_filters <= NOT_ACT ;

    elsif (cont_scan = ACT                                        and -- Beginning of Ethernet
            src_ct_allowed = ACT                                  and -- Cut Thru Frame
             dest_ct_allowed = ACT                                and -- Receive port /= Backbone port
              dest_group_address = NOT_ACT                        and
            (positive_forward_enable = NOT_ACT                    or
            (positive_forward_enable = ACT                        and
             rxport_equals_bbone = NOT_ACT))                      and
            (rx_filter_on = ACT                                   or
             tx_filter_on = ACT)) then
       cv_unicast_no_translation_filters <= ACT ;

    elsif (cont_scan = ACT                                        and -- Beginning of Ethernet
            bbone_src_ct = ACT                                    and -- Cut Thru Frame
             dest_ct_allowed = ACT                                and -- Receive port = Backbone port
              dest_group_address = NOT_ACT                        and
               positive_forward_enable = ACT                      and
                rxport_equals_bbone = ACT                         and
            (rx_filter_on = ACT                                   or
             tx_filter_on = ACT)) then
       cv_unicast_no_translation_filters <= ACT ;

    elsif (cont_scan = ACT                                        and -- Beginning of Ethernet
            bbone_dest_ct = ACT                                   and -- Cut Thru Frame
             src_ct_allowed = ACT                                 and -- Destination port = Backbone port
              dest_group_address = NOT_ACT                        and
               positive_forward_enable = ACT                      and
                rxport_equals_bbone = NOT_ACT                     and
            (rx_filter_on = ACT                                   or
             tx_filter_on = ACT)) then
       cv_unicast_no_translation_filters <= ACT ;

    elsif (cont_scan = ACT                                        and -- End of Ethernet Frame
            ethernet_eof = ACT                                    and -- Non Cutthru
            enet_abort = NOT_ACT                                  and -- ADDED 5/2/94
             ethernet_rx_error = NOT_ACT                          and
               rx_monitor_on = NOT_ACT                            and
                destination_monitor = NOT_ACT                     and
                 filter_frame = NOT_ACT                           and
                  cut_thru_end = NOT_ACT                          and
                   rx_disable_on = NOT_ACT                        and
                    dest_group_address = NOT_ACT                  and
                    (dest_address_match = ACT                     or
                    (dest_address_match = NOT_ACT                 and
                     positive_forward_enable = ACT))              and
```

```
Aug 17 10:50 1994  Who: johnf  File: /c2/local_user/bma/bma_rbsm/bma_rbsm_lib/rbsm_code_vectors.vhd Page 7

                    dest_internal = NOT_ACT                                 and
                     port_blocking_on = NOT_ACT                             and
                      src_port_not_forwarding = NOT_ACT                     and
                      ((positive_forward_enable = NOT_ACT                   and
                       src_address_status = SA_KNOWN_WITH_GOOD_PORT)        or
                      (positive_forward_enable = ACT                        and
                       rxport_equals_bbone = NOT_ACT                        and
                       src_address_status = SA_KNOWN_WITH_GOOD_PORT)        or
                      (positive_forward_enable = ACT                        and
                       rxport_equals_bbone = ACT                            and
                       src_address_status = SA_UNKNOWN))                    and
                        tx_disable_on = NOT_ACT                             and
                         dest_port_blocking = NOT_ACT                       and
                          dest_port_not_forwarding = NOT_ACT                and
                           dest_port_type = ETHERNET                        and
           (rx_filter_on = ACT                                              or
            tx_filter_on = ACT)) then
        cv_unicast_no_translation_filters <= ACT ;

    elsif (cont_scan = ACT                                                  and -- End of FDDI Frame
            fddi_eof = ACT                                                  and -- Unibuffered
             fddi_abort = NOT_ACT                                           and
              fddi_rx_error = NOT_ACT                                       and
               rx_monitor_on = NOT_ACT                                      and
                destination_monitor = NOT_ACT                               and
                 filter_frame = NOT_ACT                                     and
                  llc_frame_type = ACT                                      and
                   rx_disable_on = NOT_ACT                                  and
                    dest_group_address = NOT_ACT                            and
                    (dest_address_match = ACT                               or
                    (dest_address_match = NOT_ACT                           and
                     positive_forward_enable = ACT))                        and
                      dest_internal = NOT_ACT                               and
                       port_blocking_on = NOT_ACT                           and
                        src_port_not_forwarding = NOT_ACT                   and
                        ((positive_forward_enable = NOT_ACT                 and
                         src_address_status = SA_KNOWN_WITH_GOOD_PORT)      or
                        (positive_forward_enable = ACT                      and
                         rxport_equals_bbone = NOT_ACT                      and
                         src_address_status = SA_KNOWN_WITH_GOOD_PORT)      or
                        (positive_forward_enable = ACT                      and
                         rxport_equals_bbone = ACT                          and
                         src_address_status = SA_UNKNOWN))                  and
                          tx_disable_on = NOT_ACT                           and
                           dest_port_blocking = NOT_ACT                     and
                            dest_port_not_forwarding = NOT_ACT              and
                             fddi_multi_buffer = NOT_ACT                    and
                              dest_port_type = FDDI                         and
           (rx_filter_on = ACT                                              or
            tx_filter_on = ACT)) then
        cv_unicast_no_translation_filters <= ACT ;

    else
        cv_unicast_no_translation_filters <= NOT_ACT ;
    end if ;

-- ******************************************************************

Aug 17 10:50 1994  Who: johnf  File: /c2/local_user/bma/bma_rbsm/bma_rbsm_lib/rbsm_code_vectors.vhd Page 8

-- cv_unicast_no_translation_cutthru : code_vector "00010" : 2
-- ******************************************************************

    if (reset = ACT) then
        cv_unicast_no_translation_cutthru <= NOT_ACT ;

    elsif (cont_scan = ACT                                                  and -- Beginning of Ethernet
            src_ct_allowed = ACT                                            and -- Cut Thru Frame
             dest_ct_allowed = ACT                                          and -- Receive port /= Backbone port
              dest_group_address = NOT_ACT                                  and
            (positive_forward_enable = NOT_ACT                              or
            (positive_forward_enable = ACT                                  and
             rxport_equals_bbone = NOT_ACT))                                and
               rx_filter_on = NOT_ACT                                       and
                tx_filter_on = NOT_ACT) then
        cv_unicast_no_translation_cutthru <= ACT ;

    elsif (cont_scan = ACT                                                  and -- Beginning of Ethernet
            bbone_src_ct = ACT                                              and -- Cut Thru Frame
             dest_ct_allowed = ACT                                          and -- Receive port = Backbone port
              dest_group_address = NOT_ACT                                  and
               positive_forward_enable = ACT                                and
                rxport_equals_bbone = ACT                                   and
                 rx_filter_on = NOT_ACT                                     and
                  tx_filter_on = NOT_ACT) then
        cv_unicast_no_translation_cutthru <= ACT ;

    elsif (cont_scan = ACT                                                  and -- Beginning of Ethernet
            bbone_dest_ct = ACT                                             and -- Cut Thru Frame
             src_ct_allowed = ACT                                           and -- Destination port = Backbone port
              dest_group_address = NOT_ACT                                  and
               positive_forward_enable = ACT                                and
                rxport_equals_bbone = NOT_ACT                               and
                 rx_filter_on = NOT_ACT                                     and
                  tx_filter_on = NOT_ACT) then
        cv_unicast_no_translation_cutthru <= ACT ;

    else
        cv_unicast_no_translation_cutthru <= NOT_ACT ;
    end if ;


-- ******************************************************************
-- cv_unicast_no_translation_cutthru_end : code_vector "00011" : 3
-- ******************************************************************

    if (reset = ACT) then
        cv_unicast_no_translation_cutthru_end <= NOT_ACT ;

    elsif (cont_scan = ACT                                                  and
            dest_group_address = NOT_ACT                                    and
```

Aug 17 10:50 1994 Who: johnf File: /c2/local_user/bma/bma_rbsm/bma_rbsm_lib/rbsm_code_vectors.vhd Page 9

```
           enet_abort = NOT_ACT                                    and -- ADDED 5/2/94
            cut_thru_end = ACT                                     and
             ethernet_rx_error = NOT_ACT                           and
              rx_monitor_on = NOT_ACT                              and
               destination_monitor = NOT_ACT                       and
                filter_frame = NOT_ACT) then
        cv_unicast_no_translation_cutthru_end <= ACT ;

    else
        cv_unicast_no_translation_cutthru_end <= NOT_ACT ;
    end if ;


-- *******************************************************************
-- cv_unicast_ethernet_to_fddi : code_vector "00100" : 4
-- *******************************************************************


    if (reset = ACT) then
        cv_unicast_ethernet_to_fddi <= NOT_ACT ;

    elsif (cont_scan = ACT                                         and -- End of Ethernet Frame
            ethernet_eof = ACT                                     and -- Non Cutthru
            enet_abort = NOT_ACT                                   and -- ADDED 5/2/94
             ethernet_rx_error = NOT_ACT                           and
              rx_monitor_on = NOT_ACT                              and
               destination_monitor = NOT_ACT                       and
                filter_frame = NOT_ACT                             and
                 cut_thru_end = NOT_ACT                            and
                  rx_disable_on = NOT_ACT                          and
                   dest_group_address = NOT_ACT                    and
                    (dest_address_match = ACT                      or
                    (dest_address_match = NOT_ACT                  and
                     positive_forward_enable = ACT))               and
                     dest_internal = NOT_ACT                       and
                      port_blocking_on = NOT_ACT                   and
                       src_port_not_forwarding = NOT_ACT           and
                        ((positive_forward_enable = NOT_ACT        and
                         src_address_status = SA_KNOWN_WITH_GOOD_PORT) or
                        (positive_forward_enable = ACT             and
                         rxport_equals_bbone = NOT_ACT             and
                         src_address_status = SA_KNOWN_WITH_GOOD_PORT) or
                        (positive_forward_enable = ACT             and
                         rxport_equals_bbone = ACT                 and
                         src_address_status = SA_UNKNOWN))         and
                         tx_disable_on = NOT_ACT                   and
                          dest_port_blocking = NOT_ACT             and
                           dest_port_not_forwarding = NOT_ACT      and
                            rx_filter_on = NOT_ACT                 and
                             tx_filter_on = NOT_ACT                and
                              dest_port_type = FDDI) then
        cv_unicast_ethernet_to_fddi <= ACT ;

    else
        cv_unicast_ethernet_to_fddi <= NOT_ACT ;
    end if ;
```

Aug 17 10:50 1994 Who: johnf File: /c2/local_user/bma/bma_rbsm/bma_rbsm_lib/rbsm_code_vectors.vhd Page 10

```
-- *******************************************************************
-- cv_unicast_ethernet_to_fddi_filters : code_vector "00101" : 5
-- *******************************************************************


    if (reset = ACT) then
        cv_unicast_ethernet_to_fddi_filters <= NOT_ACT ;

    elsif (cont_scan = ACT                                         and -- End of Ethernet Frame
            ethernet_eof = ACT                                     and -- Non Cutthru
            enet_abort = NOT_ACT                                   and -- ADDED 5/2/94
             ethernet_rx_error = NOT_ACT                           and
              rx_monitor_on = NOT_ACT                              and
               destination_monitor = NOT_ACT                       and
                filter_frame = NOT_ACT                             and
                 cut_thru_end = NOT_ACT                            and
                  rx_disable_on = NOT_ACT                          and
                   dest_group_address = NOT_ACT                    and
                    (dest_address_match = ACT                      or
                    (dest_address_match = NOT_ACT                  and
                     positive_forward_enable = ACT))               and
                     dest_internal = NOT_ACT                       and
                      port_blocking_on = NOT_ACT                   and
                       src_port_not_forwarding = NOT_ACT           and
                        ((positive_forward_enable = NOT_ACT        and
                          src_address_status = SA_KNOWN_WITH_GOOD_PORT) or
                         (positive_forward_enable = ACT            and
                          rxport_equals_bbone = NOT_ACT            and
                          src_address_status = SA_KNOWN_WITH_GOOD_PORT) or
                         (positive_forward_enable = ACT            and
                          rxport_equals_bbone = ACT                and
                          src_address_status = SA_UNKNOWN))        and
                          tx_disable_on = NOT_ACT                  and
                           dest_port_blocking = NOT_ACT            and
                            dest_port_not_forwarding = NOT_ACT     and
                             dest_port_type = FDDI                 and
           (rx_filter_on = ACT                                     or
            tx_filter_on = ACT)) then
        cv_unicast_ethernet_to_fddi_filters <= ACT ;

    else
        cv_unicast_ethernet_to_fddi_filters <= NOT_ACT ;
    end if ;


-- *******************************************************************
- cv_unicast_fddi_to_ethernet : code_vector "00110" : 6
-- *******************************************************************


    if (reset = ACT) then
        cv_unicast_fddi_to_ethernet <= NOT_ACT ;

    elsif (cont_scan = ACT                                         and -- End of FDDI Frame
```

```
Aug 17 10:50 1994  Who  johnf  File  /c2/local_user/bma/bma_rbsm/bma_rbsm_lib/rbsm_code_vectors.vhd Page 11

        fddi_eof = ACT                                                           and
         fddi_abort = NOT_ACT                                                    and
          fddi_rx_error = NOT_ACT                                                and
           rx_monitor_on = NOT_ACT                                               and
            destination_monitor = NOT_ACT                                        and
             filter_frame = NOT_ACT                                              and
              llc_frame_type = ACT                                               and
               rx_disable_on = NOT_ACT                                           and
                dest_group_address = NOT_ACT                                     and
                (dest_address_match = ACT                                        or
                (dest_address_match = NOT_ACT                                    and
                 positive_forward_enable = ACT))                                 and
                  dest_internal = NOT_ACT                                        and
                   port_blocking_on = NOT_ACT                                    and
                    src_port_not_forwarding = NOT_ACT                            and
                    ((positive_forward_enable = NOT_ACT                          and
                     src_address_status = SA_KNOWN_WITH_GOOD_PORT)               or
                    (positive_forward_enable = ACT                               and
                     rxport_equals_bbone = NOT_ACT                               and
                     src_address_status = SA_KNOWN_WITH_GOOD_PORT)               or
                    (positive_forward_enable = ACT                               and
                     rxport_equals_bbone = ACT                                   and
                     src_address_status = SA_UNKNOWN))                           and
                      tx_disable_on = NOT_ACT                                    and
                       dest_port_blocking = NOT_ACT                              and
                        dest_port_not_forwarding = NOT_ACT                       and
                         dest_port_type = ETHERNET                               and
                          fragment_frame = NOT_ACT                               and
                           rx_filter_on = NOT_ACT                                and
                            tx_filter_on = NOT_ACT) then
      cv_unicast_fddi_to_ethernet <= ACT ;

    else
      cv_unicast_fddi_to_ethernet <= NOT_ACT ;
    end if ;


-- ******************************************************************
-- cv_unicast_fddi_to_ethernet_filters : code_vector "00111" : 7
-- ******************************************************************


    if (reset = ACT) then
      cv_unicast_fddi_to_ethernet_filters <= NOT_ACT ;

    elsif (cont_scan = ACT                                                       and -- End of FDDI Frame
           fddi_eof = ACT                                                        and
            fddi_abort = NOT_ACT                                                 and
             fddi_rx_error = NOT_ACT                                             and
              rx_monitor_on = NOT_ACT                                            and
               destination_monitor = NOT_ACT                                     and
                filter_frame = NOT_ACT                                           and
                 llc_frame_type = ACT                                            and
                  rx_disable_on = NOT_ACT                                        and
                   dest_group_address = NOT_ACT                                  and
                   (dest_address_match = ACT                                     or
                   (dest_address_match = NOT_ACT                                 and
                    positive_forward_enable = ACT))                              and

Aug 17 10:50 1994  Who: johnf  File: /c2/local_user/bma/bma_rbsm/bma_rbsm_lib/rbsm_code_vectors.vhd Page 12

                     dest_internal = NOT_ACT                                     and
                      port_blocking_on = NOT_ACT                                 and
                       src_port_not_forwarding = NOT_ACT                         and
                       ((positive_forward_enable = NOT_ACT                       and
                        src_address_status = SA_KNOWN_WITH_GOOD_PORT)            or
                       (positive_forward_enable = ACT                            and
                        rxport_equals_bbone = NOT_ACT                            and
                        src_address_status = SA_KNOWN_WITH_GOOD_PORT)            or
                       (positive_forward_enable = ACT                            and
                        rxport_equals_bbone = ACT                                and
                        src_address_status = SA_UNKNOWN))                        and
                         tx_disable_on = NOT_ACT                                 and
                          dest_port_blocking = NOT_ACT                           and
                           dest_port_not_forwarding = NOT_ACT                    and
                            dest_port_type = ETHERNET                            and
                             fragment_frame = NOT_ACT                            and
      (rx_filter_on = ACT                                                        or
       tx_filter_on = ACT)) then
      cv_unicast_fddi_to_ethernet_filters <= ACT ;

    else
      cv_unicast_fddi_to_ethernet_filters <= NOT_ACT ;
    end if ;


-- ******************************************************************
-- cv_unicast_fddi_to_ethernet_frag : code_vector "01000" : 8
-- ******************************************************************


    if (reset = ACT) then
      cv_unicast_fddi_to_ethernet_frag <= NOT_ACT ;

    elsif (cont_scan = ACT                                                       and -- End of FDDI Frame
           fddi_eof = ACT                                                        and
            fddi_abort = NOT_ACT                                                 and
             fddi_rx_error = NOT_ACT                                             and
              rx_monitor_on = NOT_ACT                                            and
               destination_monitor = NOT_ACT                                     and
                filter_frame = NOT_ACT                                           and
                 llc_frame_type = ACT                                            and
                  rx_disable_on = NOT_ACT                                        and
                   dest_group_address = NOT_ACT                                  and
                   (dest_address_match = ACT                                     or
                   (dest_address_match = NOT_ACT                                 and
                    positive_forward_enable = ACT))                              and
                     dest_internal = NOT_ACT                                     and
                      port_blocking_on = NOT_ACT                                 and
                       src_port_not_forwarding = NOT_ACT                         and
                       ((positive_forward_enable = NOT_ACT                       and
                        src_address_status = SA_KNOWN_WITH_GOOD_PORT)            or
                       (positive_forward_enable = ACT                            and
                        rxport_equals_bbone = NOT_ACT                            and
                        src_address_status = SA_KNOWN_WITH_GOOD_PORT)            or
                       (positive_forward_enable = ACT                            and
                        rxport_equals_bbone = ACT                                and
                        src_address_status = SA_UNKNOWN))                        and
                         tx_disable_on = NOT_ACT                                 and
```

```
Aug 17 10:50 1994  Who: johnf  File: /c2/local_user/bma/bma_rbsm/bma_rbsm_lib/rbsm_code_vectors.vhd Page 13

                         dest_port_blocking = NOT_ACT                    and
                          dest_port_not_forwarding = NOT_ACT             and
                           dest_port_type = ETHERNET                     and
                            fragment_frame = ACT) then
          cv_unicast_fddi_to_ethernet_frag <= ACT ;

     else
          cv_unicast_fddi_to_ethernet_frag <= NOT_ACT ;
     end if ;

-- ****************************************************************
-- cv_unicast_da_unknown : code_vector "01001" : 9
-- ****************************************************************


     if (reset = ACT) then
          cv_unicast_da_unknown <= NOT_ACT ;

     elsif (cont_scan = ACT                                      and -- End of Ethernet Frame
               ethernet_eof = ACT                                and -- Non Cutthru
               enet_abort = NOT_ACT                              and -- ADDED 5/2/94
                ethernet_rx_error = NOT_ACT                      and
                  rx_monitor_on = NOT_ACT                        and
                   destination_monitor = NOT_ACT                 and
                    filter_frame = NOT_ACT                       and
                     cut_thru_end = NOT_ACT                      and
                      rx_disable_on = NOT_ACT                    and
                       dest_group_address = NOT_ACT              and
                        port_blocking_on = NOT_ACT               and
                         positive_forward_enable = NOT_ACT       and
                          dest_address_match = NOT_ACT) then
          cv_unicast_da_unknown <= ACT ;

     elsif (cont_scan = ACT                                      and -- End of FDDI Frame
               fddi_eof = ACT                                    and -- Unibuffered
                fddi_abort = NOT_ACT                             and
                 fddi_rx_error = NOT_ACT                         and
                  rx_monitor_on = NOT_ACT                        and
                   destination_monitor = NOT_ACT                 and
                    filter_frame = NOT_ACT                       and
                     llc_frame_type = ACT                        and
                      rx_disable_on = NOT_ACT                    and
                       dest_group_address = NOT_ACT              and
                        port_blocking_on = NOT_ACT               and
                         positive_forward_enable = NOT_ACT       and
                          dest_address_match = NOT_ACT) then
          cv_unicast_da_unknown <= ACT ;

     else
          cv_unicast_da_unknown <= NOT_ACT ;
     end if ;


-- ****************************************************************
-- cv_unicast_exception : code_vector "01010" : 10
-- ****************************************************************

Aug 17 10:50 1994  Who: johnf  File: /c2/local_user/bma/bma_rbsm/bma_rbsm_lib/rbsm_code_vectors.vhd Page 14

     if (reset = ACT) then
          cv_unicast_exception <= NOT_ACT ;

     elsif (cont_scan = ACT                                      and -- End of Ethernet Frame
               ethernet_eof = ACT                                and -- Non Cutthru
               enet_abort = NOT_ACT                              and -- ADDED 5/2/94
                ethernet_rx_error = NOT_ACT                      and
                  rx_monitor_on = NOT_ACT                        and
                   destination_monitor = NOT_ACT                 and
                    filter_frame = NOT_ACT                       and
                     cut_thru_end = NOT_ACT                      and
                      rx_disable_on = NOT_ACT                    and
                       dest_group_address = NOT_ACT              and
                       (dest_address_match = ACT                 or
                       (dest_address_match = NOT_ACT             and
                        positive_forward_enable = ACT))          and
                         dest_internal = NOT_ACT                 and
                          port_blocking_on = NOT_ACT             and
               (src_port_not_forwarding = ACT                    or
               (positive_forward_enable = NOT_ACT                and
                src_address_status /= SA_KNOWN_WITH_GOOD_PORT)   or
               (rxport_equals_bbone = NOT_ACT                    and
                src_address_status /= SA_KNOWN_WITH_GOOD_PORT)   or
               (positive_forward_enable = ACT                    and
                rxport_equals_bbone = ACT                        and
                src_address_status /= SA_UNKNOWN)                or
                tx_disable_on = ACT                              or
                dest_port_blocking = ACT                         or
                dest_port_not_forwarding = ACT)) then
          cv_unicast_exception <= ACT ;

     elsif (cont_scan = ACT                                      and -- End of FDDI Frame
               fddi_eof = ACT                                    and
                fddi_abort = NOT_ACT                             and
                 fddi_rx_error = NOT_ACT                         and
                  rx_monitor_on = NOT_ACT                        and
                   destination_monitor = NOT_ACT                 and
                    filter_frame = NOT_ACT                       and
                     llc_frame_type = ACT                        and
                      rx_disable_on = NOT_ACT                    and
                       dest_group_address = NOT_ACT              and
                       (dest_address_match = ACT                 or
                       (dest_address_match = NOT_ACT             and
                        positive_forward_enable = ACT))          and
                         dest_internal = NOT_ACT                 and
                          port_blocking_on = NOT_ACT             and
               (src_port_not_forwarding = ACT                    or
               (positive_forward_enable = NOT_ACT                and
                src_address_status /= SA_KNOWN_WITH_GOOD_PORT)   or
               (rxport_equals_bbone = NOT_ACT                    and
                src_address_status /= SA_KNOWN_WITH_GOOD_PORT)   or
               (positive_forward_enable = ACT                    and
                rxport_equals_bbone = ACT                        and
                src_address_status /= SA_UNKNOWN)                or
                tx_disable_on = ACT                              or
                dest_port_blocking = ACT                         or
                dest_port_not_forwarding = ACT)) then
```

```
Aug 17 10:50 1994  Who: johnt  File: /c2/local_user/bma/bma_rbsm/bma_rbsm_lib/rbsm_code_vectors.vhd Page 15

        cv_unicast_exception <= ACT ;

    else
        cv_unicast_exception <= NOT_ACT ;
    end if ;



-- ***********************************************************************
-- cv_multicast_from_ethernet : code_vector "01011" : 11
-- ***********************************************************************

    if (reset = ACT) then
        cv_multicast_from_ethernet <= NOT_ACT ;

    elsif (cont_scan = ACT                                          and -- Beginning of Ethernet
            src_ct_allowed = ACT                                    and -- Cut Thru Frame
            multicast_ct_allowed = ACT                              and -- Receive port /= Backbone port
             dest_group_address = ACT                               and
              rx_filter_on = NOT_ACT                                and
               rx_multicast_filter_on = NOT_ACT                     and
                any_multicast_cut_thru_disabled = NOT_ACT           and
                 any_enet_dest_tx_filter = NOT_ACT                  and
                  any_enet_dest_tx_multicast_filter = NOT_ACT) then
        cv_multicast_from_ethernet <= ACT ;

    elsif (cont_scan = ACT                                          and -- Beginning of Ethernet
            bbone_multicast_ct = ACT                                and -- Cut Thru Frame
             dest_group_address = ACT                               and -- Receive port = Backbone port
              rx_filter_on = NOT_ACT                                and
               rx_multicast_filter_on = NOT_ACT                     and
                any_multicast_cut_thru_disabled = NOT_ACT           and
                 any_enet_dest_tx_filter = NOT_ACT                  and
                  any_enet_dest_tx_multicast_filter = NOT_ACT) then
        cv_multicast_from_ethernet <= ACT ;

    elsif (cont_scan = ACT                                          and -- End of Ethernet Frame
            ethernet_eof = ACT                                      and -- Non Cutthru
            enet_abort = NOT_ACT                                    and -- ADDED 5/2/94
             ethernet_rx_error = NOT_ACT                            and
              rx_monitor_on = NOT_ACT                               and
               destination_monitor = NOT_ACT                        and
                cut_thru_end = NOT_ACT                              and
                 rx_disable_on = NOT_ACT                            and
                  dest_group_address = ACT                          and
           (dest_address_match = NOT_ACT                            or
            dest_internal = NOT_ACT)                                and
                  rx_multicast_disable_on = NOT_ACT                 and
                   port_blocking_on = NOT_ACT                       and
                    src_port_not_forwarding = NOT_ACT               and
                     ((positive_forward_enable = NOT_ACT            and
                       src_address_status = SA_KNOWN_WITH_GOOD_PORT) or
                      (positive_forward_enable = ACT                and
                       rxport_equals_bbone = NOT_ACT                and

Aug 17 10:50 1994  Who: johnt  File: /c2/local_user/bma/bma_rbsm/bma_rbsm_lib/rbsm_code_vectors.vhd Page 16

                       src_address_status = SA_KNOWN_WITH_GOOD_PORT) or
                      (positive_forward_enable = ACT                and
                       rxport_equals_bbone = ACT                    and
                       src_address_status = SA_UNKNOWN))            and
                     rx_filter_on = NOT_ACT                         and
                     rx_multicast_filter_on = NOT_ACT               and
                      any_dest_tx_disabled = NOT_ACT                and
                       any_dest_tx_multicast_disabled = NOT_ACT     and
                        any_dest_port_blocking = NOT_ACT            and
                         any_dest_tx_filter = NOT_ACT               and
                          any_dest_tx_multicast_filter = NOT_ACT    and
                           any_dest_port_not_forwarding = NOT_ACT) then
        cv_multicast_from_ethernet <= ACT ;

    else
        cv_multicast_from_ethernet <= NOT_ACT ;
    end if;



-- ***********************************************************************
-- cv_multicast_from_ethernet_exception : code_vector "01100" : 12
-- ***********************************************************************

    if (reset = ACT) then
        cv_multicast_from_ethernet_exception <= NOT_ACT ;

    elsif (cont_scan = ACT                                          and -- Beginning of Ethernet
            src_ct_allowed = ACT                                    and -- Cut Thru Frame
             multicast_ct_allowed = ACT                             and -- Receive port /= Backbone port
              dest_group_address = ACT                              and
           (rx_filter_on = ACT                                      or
            rx_multicast_filter_on = ACT                            or
            any_multicast_cut_thru_disabled = ACT                   or
            any_enet_dest_tx_filter = ACT                           or
            any_enet_dest_tx_multicast_filter = ACT)) then
        cv_multicast_from_ethernet_exception <= ACT ;

    elsif (cont_scan = ACT                                          and -- Beginning of Ethernet
            bbone_multicast_ct = ACT                                and -- Cut Thru Frame
             dest_group_address = ACT                               and -- Receive port = Backbone port
           (rx_filter_on = ACT                                      or
            rx_multicast_filter_on = ACT                            or
            any_multicast_cut_thru_disabled = ACT                   or
            any_enet_dest_tx_filter = ACT                           or
            any_enet_dest_tx_multicast_filter = ACT)) then
        cv_multicast_from_ethernet_exception <= ACT ;

    elsif (cont_scan = ACT                                          and -- End of Ethernet Frame
            ethernet_eof = ACT                                      and -- Non Cutthru
            enet_abort = NOT_ACT                                    and -- ADDED 5/2/94
             ethernet_rx_error = NOT_ACT                            and
              rx_monitor_on = NOT_ACT                               and
```

Aug 17 10 50 1994 Who. johnf File /c2/local user/bma/bma_rbsm/bma_rbsm_lib/rbsm_code_vectors.vhd Page 17

```
                destination monitor = NOT ACT                              and
                 cut thru_end = NOT_ACT                                    and
                  rx_disable on = NOT ACT                                  and
                   dest_group_address = ACT                                and
             (dest_address_match = NOT_ACT                                 or
              dest_internal = NOT_ACT)                                     and
                     rx_multicast_disable on = NOT_ACT                     and
                      port_blocking_on = NOT_ACT                           and
                       src_port_not_forwarding = NOT_ACT                   and
                          ((positive_forward_enable = NOT_ACT              and
                           src_address_status = SA_KNOWN_WITH_GOOD_PORT)   or
                          (positive_forward_enable = ACT                   and
                           rxport_equals_bbone = NOT_ACT                   and
                           src_address_status = SA_KNOWN_WITH_GOOD_PORT)   or
                          (positive_forward_enable = ACT                   and
                           rxport_equals_bbone = ACT                       and
                           src_address_status = SA_UNKNOWN))               and
              (rx_filter_on = ACT                                          or
               rx_multicast_filter_on = ACT                                or
               any_dest_tx_disabled = ACT                                  or
               any_dest_tx_multicast_disabled = ACT                        or
               any_dest_port_blocking = ACT                                or
               any_dest_tx_filter = ACT                                    or
               any_dest_tx_multicast_filter = ACT                          or
               any_dest_port_not_forwarding = ACT)) then
        cv_multicast_from_ethernet_exception <= ACT ;

    else
        cv_multicast_from_ethernet exception <= NOT_ACT ;
    end if ;


-- ===================================================================
-- cv_multicast_from_ethernet_cutthru_end   code_vector "01101" : 13
-- ===================================================================


    if (reset = ACT) then
        cv_multicast_from_ethernet_cutthru_end <= NOT_ACT ;

    elsif (cont_scan = ACT                                               and
            cut thru_end = ACT                                           and
            enet_abort = NOT_ACT                                         and -- ADDED 5/2/94
             ethernet_rx_error = NOT_ACT                                 and
              rx_monitor_on = NOT_ACT                                    and
               destination_monitor = NOT ACT                             and
                dest_group_address = ACT) then
        cv_multicast_from_ethernet_cutthru_end <= ACT ;

    else
        cv_multicast_from_ethernet_cutthru_end <= NOT_ACT ;
    end if ;


-- ===================================================================
-- cv_multicast_from_fddi : code_vector "01110" : 14
-- ===================================================================
```

Aug 17 10:50 1994 Who: johnf File: /c2/local_user/bma/bma_rbsm/bma_rbsm_lib/rbsm_code_vectors.vhd Page 18

```
    if (reset = ACT) then
        cv_multicast_from_fddi <= NOT_ACT ;

    elsif (cont_scan = ACT                                               and -- End of FDDI Frame
            fddi_eof = ACT                                               and
             fddi_abort = NOT_ACT                                        and
              fddi_rx_error = NOT_ACT                                    and
               rx_monitor_on = NOT_ACT                                   and
                destination_monitor = NOT_ACT                            and
                 llc_frame_type = ACT                                    and
                  rx_disable_on = NOT_ACT                                and
                   dest_group_address = ACT                              and
          (dest_address_match = NOT_ACT                                  or
           dest_internal = NOT_ACT)                                      and
                   rx_multicast_disable_on = NOT_ACT                     and
                    port_blocking_on = NOT_ACT                           and
                     fragment_frame = NOT_ACT                            and
                      src_port_not_forwarding = NOT_ACT                  and
                      ((positive_forward_enable = NOT_ACT                and
                        src_address_status = SA_KNOWN_WITH_GOOD_PORT)    or
                      (positive_forward_enable = ACT                     and
                        rxport_equals_bbone = NOT_ACT                    and
                        src_address_status = SA_KNOWN_WITH_GOOD_PORT)    or
                      (positive_forward_enable = ACT                     and
                        rxport_equals_bbone = ACT                        and
                        src_address_status = SA_UNKNOWN))                and
                         rx_filter_on = NOT_ACT                          and
                          rx_multicast_filter_on = NOT_ACT               and
                           any_dest_tx_disabled = NOT_ACT                and
                            any_dest_tx_multicast_disabled = NOT_ACT     and
                             any_dest_port_blocking = NOT_ACT            and
                              any_dest_port_not_forwarding = NOT_ACT     and
                               any_dest_tx_filter = NOT_ACT               and
                                any_dest_tx_multicast_filter = NOT_ACT)   then
        cv_multicast_from_fddi <= ACT ;

    else
        cv_multicast_from_fddi <= NOT_ACT ;
    end if ;


-- ===================================================================
-- cv_multicast_from_fddi_exception : code_vector "01111" : 15
-- ===================================================================


    if (reset = ACT) then
        cv_multicast_from_fddi_exception <= NOT_ACT ;

    elsif (cont_scan = ACT                                               and -- End of FDDI Frame
            fddi_eof = ACT                                               and
             fddi_abort = NOT_ACT                                        and
              fddi_rx_error = NOT_ACT                                    and
               rx_monitor_on = NOT_ACT                                   and
                destination_monitor = NOT_ACT                            and
```

```
Aug 17 10 50 1994  Who: johnf  File: /c2/local user/bma/bma_rbsm/bma_rbsm_lib/rbsm code_vectors vhd Page 19

              llc_frame_type = ACT                                       and
               rx_disable_on = NOT_ACT                                   and
                dest_group_address = ACT                                 and
         (dest_address_match = NOT_ACT                                   or
          dest_internal = NOT_ACT)                                       and
                   rx_multicast_disable_on = NOT_ACT                     and
                    port_blocking_on = NOT_ACT                           and
                     fragment_frame = NOT_ACT                            and
                      src_port_not_forwarding = NOT_ACT                  and
                      ((positive_forward_enable = NOT_ACT                and
                        src_address_status = SA_KNOWN_WITH_GOOD_PORT)    or
                       (positive_forward_enable = ACT                    and
                        rxport_equals_bbone = NOT_ACT                    and
                        src_address_status = SA_KNOWN_WITH_GOOD_PORT)    or
                       (positive_forward_enable = ACT                    and
                        rxport_equals_bbone = ACT                        and
                        src_address_status = SA_UNKNOWN))                and
         (rx_filter_on = ACT                                             or
          rx_multicast_filter_on = ACT                                   or
          any_dest_tx_disabled = ACT                                     or
          any_dest_tx_multicast_disabled = ACT                           or
          any_dest_port_not_forwarding = ACT                             or
          any_dest_port_blocking = ACT                                   or
          any_dest_tx_filter = ACT                                       or
          any_dest_tx_multicast_filter = ACT))    then
      cv_multicast_from_fddi_exception <= ACT ;

   else
      cv_multicast_from_fddi_exception <= NOT_ACT ;
   end if ;


-- ****************************************************************
-- cv_multicast_from_fddi_frag : code_vector "10000" : 16
-- ****************************************************************

   if (reset = ACT) then
      cv_multicast_from_fddi_frag <= NOT_ACT ;

   elsif (cont_scan = ACT                                                and -- End of FDDI Frame
          fddi_eof = ACT                                                 and
           fddi_abort = NOT_ACT                                          and
            fddi_rx_error = NOT_ACT                                      and
             rx_monitor_on = NOT_ACT                                     and
              destination_monitor = NOT_ACT                              and
               llc_frame_type = ACT                                      and
                rx_disable_on = NOT_ACT                                  and
                 dest_group_address = ACT                                and
         (dest_address_match = NOT_ACT                                   or
          dest_internal = NOT_ACT)                                       and
                  rx_multicast_disable_on = NOT_ACT                      and
                   port_blocking_on = NOT_ACT                            and
                    src_port_not_forwarding = NOT_ACT                    and
                      ((positive_forward_enable = NOT_ACT                and
                        src_address_status = SA_KNOWN_WITH_GOOD_PORT)    or
                       (positive_forward_enable = ACT                    and

Aug 17 10:50 1994  Who: johnf  File: /c2/local_user/bma/bma_rbsm/bma_rbsm_lib/rbsm_code_vectors.vhd Page 20

                        rxport_equals_bbone = NOT_ACT                    and
                        src_address_status = SA_KNOWN_WITH_GOOD_PORT)    or
                       (positive_forward_enable = ACT                    and
                        rxport_equals_bbone = ACT                        and
                        src_address_status = SA_UNKNOWN))                and
                       fragment_frame = ACT) then
      cv_multicast_from_fddi_frag <= ACT ;

   else
      cv_multicast_from_fddi_frag <= NOT_ACT ;
   end if ;

-- ****************************************************************
-- cv_multicast_exception : code_vector "10001" : 17
-- ****************************************************************


   if (reset = ACT) then
      cv_multicast_exception <= NOT_ACT ;

   elsif (cont_scan = ACT                                                and -- End of Ethernet Frame
          ethernet_eof = ACT                                             and -- Non Cutthru
          enet_abort = NOT_ACT                                           and -- ADDED 5/2/94
           ethernet_rx_error = NOT_ACT                                   and
            rx_monitor_on = NOT_ACT                                      and
             destination_monitor = NOT_ACT                               and
              cut_thru_end = NOT_ACT                                     and
               rx_disable_on = NOT_ACT                                   and
                dest_group_address = ACT                                 and
         (dest_address_match = NOT_ACT                                   or
          dest_internal = NOT_ACT)                                       and
                  rx_multicast_disable_on = NOT_ACT                      and
                   port_blocking_on = NOT_ACT                            and
          (src_port_not_forwarding = ACT                                 or
          (positive_forward_enable = NOT_ACT                             and
           src_address_status /= SA_KNOWN_WITH_GOOD_PORT)                or
          (rxport_equals_bbone = NOT_ACT                                 and
           src_address_status /= SA_KNOWN_WITH_GOOD_PORT)                or
          (positive_forward_enable = ACT                                 and
           rxport_equals_bbone = ACT                                     and
           src_address_status /= SA_UNKNOWN))) then
      cv_multicast_exception <= ACT ;

   elsif (cont_scan = ACT                                                and -- End of FDDI Frame
          fddi_eof = ACT                                                 and -- Unbuffered
           fddi_abort = NOT_ACT                                          and
            fddi_rx_error = NOT_ACT                                      and
             rx_monitor_on = NOT_ACT                                     and
              destination_monitor = NOT_ACT                              and
               llc_frame_type = ACT                                      and
                rx_disable_on = NOT_ACT                                  and
                 dest_group_address = ACT                                and
         (dest_address_match = NOT_ACT                                   or
          dest_internal = NOT_ACT)                                       and
                  rx_multicast_disable_on = NOT_ACT                      and
                   port_blocking_on = NOT_ACT                            and
          (src_port_not_forwarding = ACT                                 or
```

```
Aug 17 10:50 1994  Who: johnf  File: /c2/local_user/bma/bma_rbsm/bma_rbsm_lib/rbsm_code_vectors.vhd Page 21

            (positive_forward_enable = NOT ACT                            and
             src_address_status /= SA_KNOWN_WITH_GOOD_PORT)                or
            (rxport_equals_bbone = NOT_ACT                                and
             src_address_status /= SA_KNOWN_WITH_GOOD_PORT)                or
            (positive_forward_enable = ACT                                and
             rxport_equals_bbone = ACT                                    and
             src_address_status /= SA_UNKNOWN))) then
        cv_multicast_exception <= ACT ;

    else
        cv_multicast_exception <= NOT_ACT ;
    end if ;


-- ********************************************************************
-- cv_receive_frame_error : code_vector "10010" : 18
-- ********************************************************************

    if (reset = ACT) then
        cv_receive_frame_error <= NOT_ACT ;

    elsif (cont_scan = ACT                                                and -- Ethernet Receive Frame error
            ethernet_eof = ACT                                            and
            enet_abort = NOT_ACT                                          and -- ADDED 5/2/94
             ethernet_rx_error = ACT) then
        cv_receive_frame_error <= ACT ;

    elsif (cont_scan = ACT                                                and -- FDDI Receive Frame error
            fddi_eof = ACT                                                and
             fddi_abort = NOT_ACT                                         and
              fddi_rx_error = ACT) then
        cv_receive_frame_error <= ACT ;

    else
        cv_receive_frame_error <= NOT_ACT ;
    end if ;


-- ********************************************************************
-- cv_non_llc_frame : code_vector "10011" : 19
-- ********************************************************************

    if (reset = ACT) then
        cv_non_llc_frame <= NOT_ACT ;

    elsif (cont_scan = ACT                                                and -- End of FDDI Frame
            fddi_eof = ACT                                                and
             fddi_abort = NOT_ACT                                         and
              fddi_rx_error = NOT_ACT                                     and
               rx_monitor_on = NOT_ACT                                    and
                destination_monitor = NOT_ACT                             and
                 filter_frame = NOT_ACT                                   and
                  llc_frame_type = NOT_ACT) then
        cv_non_llc_frame <= ACT ;

Aug 17 10:50 1994  Who: johnf  File: /c2/local_user/bma/bma_rbsm/bma_rbsm_lib/rbsm_code_vectors.vhd Page 22


    else
        cv_non_llc_frame <= NOT_ACT ;
    end if ;


-- ********************************************************************
-- cv_internal_unicast : code_vector "10100" : 20
-- ********************************************************************

    if (reset = ACT) then
        cv_internal_unicast <= NOT_ACT ;

    elsif (cont_scan = ACT                                                and -- End of Ethernet Frame
            ethernet_eof = ACT                                            and -- Non Cutthru
            enet_abort = NOT_ACT                                          and -- ADDED 5/2/94
             ethernet_rx_error = NOT_ACT                                  and
              rx_monitor_on = NOT_ACT                                     and
               destination_monitor = NOT_ACT                              and
                filter_frame = NOT_ACT                                    and
                 cut_thru_end = NOT_ACT                                   and
                  rx_disable_on = NOT_ACT                                 and
                   dest_group_address = NOT_ACT                           and
                     dest_address_match = ACT                             and
                      dest_internal = ACT                                 and
                       port_blocking_on = NOT_ACT                         and
                        src_port_not_forwarding = NOT_ACT                 and
                        ((positive_forward_enable = NOT_ACT               and
                          src_address_status = SA_KNOWN_WITH_GOOD_PORT)   or
                        (positive_forward_enable = ACT                    and
                          rxport_equals_bbone = NOT_ACT                   and
                          src_address_status = SA_KNOWN_WITH_GOOD_PORT)   or
                        (positive_forward_enable = ACT                    and
                          rxport_equals_bbone = ACT                       and
                          src_address_status = SA_UNKNOWN)))             then
        cv_internal_unicast <= ACT ;

    elsif (cont_scan = ACT                                                and -- End of FDDI Frame
            fddi_eof = ACT                                                and
             fddi_abort = NOT_ACT                                         and
              fddi_rx_error = NOT_ACT                                     and
               rx_monitor_on = NOT_ACT                                    and
                destination_monitor = NOT_ACT                             and
                 filter_frame = NOT_ACT                                   and
                  llc_frame_type = ACT                                    and
                   rx_disable_on = NOT_ACT                                and
                    dest_group_address = NOT_ACT                          and
                     dest_address_match = ACT                             and
                      dest_internal = ACT                                 and
                       port_blocking_on = NOT_ACT                         and
                        src_port_not_forwarding = NOT_ACT                 and
                        ((positive_forward_enable = NOT_ACT               and
                          src_address_status = SA_KNOWN_WITH_GOOD_PORT)   or
                        (positive_forward_enable = ACT                    and
                          rxport_equals_bbone = NOT_ACT                   and
```

```
Aug 17 10:50 1994  Who: johnf  File: /c2/local_user/bma/bma_rbsm/bma_rbsm_lib/rbsm_code_vectors.vhd Page 23

                          src_address_status = SA_KNOWN_WITH_GOOD_PORT)   or
                         (positive_forward_enable = ACT                   and
                          rxport_equals_bbone = ACT                       and
                          src_address_status = SA_UNKNOWN)))              then
        cv_internal_unicast <= ACT ;

    else
        cv_internal_unicast <= NOT_ACT ;
    end if ;

-- ==================================================================
-- cv_internal_unicast_exception : code_vector "10101" : 21
-- ==================================================================

    if (reset = ACT) then
        cv_internal_unicast_exception <= NOT_ACT ;

    elsif (cont_scan = ACT                                  and -- End of Ethernet Frame
           ethernet_eof = ACT                               and -- Non Cutthru
           enet_abort = NOT_ACT                             and -- ADDED 5/2/94
            ethernet_rx_error = NOT_ACT                     and
             rx_monitor_on = NOT_ACT                        and
              destination_monitor = NOT_ACT                 and
               filter_frame = NOT_ACT                       and
                cut_thru_end = NOT_ACT                      and
                 rx_disable_on = NOT_ACT                    and
                  dest_group_address = NOT_ACT              and
                    dest_address_match = ACT                and
                     dest_internal = ACT                    and
          (port_blocking_on = ACT                           or
           src_port_not_forwarding = ACT                    or
          (positive_forward_enable = NOT_ACT                and
           src_address_status /= SA_KNOWN_WITH_GOOD_PORT)   or
          (rxport_equals_bbone = NOT_ACT                    and
           src_address_status /= SA_KNOWN_WITH_GOOD_PORT)   or
          (positive_forward_enable = ACT                    and
           rxport_equals_bbone = ACT                        and
           src_address_status /= SA_UNKNOWN))) then
        cv_internal_unicast_exception <= ACT ;

    elsif (cont_scan = ACT                                  and -- End of FDDI Frame
           fddi_eof = ACT                                   and
            fddi_abort = NOT_ACT                            and
             fddi_rx_error = NOT_ACT                        and
              rx_monitor_on = NOT_ACT                       and
               destination_monitor = NOT_ACT                and
                filter_frame = NOT_ACT                      and
                 llc_frame_type = ACT                       and
                  rx_disable_on = NOT_ACT                   and
                   dest_group_address = NOT_ACT             and
                    dest_address_match = ACT                and
                     dest_internal = ACT                    and
          (port_blocking_on = ACT                           or
           src_port_not_forwarding = ACT                    or

Aug 17 10:50 1994  Who: johnf  File: /c2/local_user/bma/bma_rbsm/bma_rbsm_lib/rbsm_code_vectors.vhd Page 24

          (positive_forward_enable = NOT_ACT                and
           src_address_status /= SA_KNOWN_WITH_GOOD_PORT)   or
          (rxport_equals_bbone = NOT_ACT                    and
           src_address_status /= SA_KNOWN_WITH_GOOD_PORT)   or
          (positive_forward_enable = ACT                    and
           rxport_equals_bbone = ACT                        and
           src_address_status /= SA_UNKNOWN))) then
        cv_internal_unicast_exception <= ACT ;

    else
        cv_internal_unicast_exception <= NOT_ACT ;
    end if ;

-- ==================================================================
-- cv_internal_multicast : code_vector "10110" : 22
-- ==================================================================

    if (reset = ACT) then
        cv_internal_multicast <= NOT_ACT ;

    elsif (cont_scan = ACT                                  and -- End of Ethernet Frame
           ethernet_eof = ACT                               and -- Non Cutthru
           enet_abort = NOT_ACT                             and -- ADDED 5/2/94
            ethernet_rx_error = NOT_ACT                     and
             rx_monitor_on = NOT_ACT                        and
              destination_monitor = NOT_ACT                 and
               cut_thru_end = NOT_ACT                       and
                rx_disable_on = NOT_ACT                     and
                 dest_group_address = ACT                   and
                  dest_address_match = ACT                  and
                   dest_internal = ACT                      and
                    rx_multicast_disable_on = NOT_ACT       and
                     dest_broadcast= NOT_ACT) then
        cv_internal_multicast <= ACT ;

    elsif (cont_scan = ACT                                  and -- End of FDDI Frame
           fddi_eof = ACT                                   and
            fddi_abort = NOT_ACT                            and
             fddi_rx_error = NOT_ACT                        and
              rx_monitor_on = NOT_ACT                       and
               destination_monitor = NOT_ACT                and
                llc_frame_type = ACT                        and
                 rx_disable_on = NOT_ACT                    and
                  dest_group_address = ACT                  and
                   dest_address_match = ACT                 and
                    dest_internal = ACT                     and
                     rx_multicast_disable_on = NOT_ACT      and
                      dest_broadcast = NOT_ACT) then
        cv_internal_multicast <= ACT ;

    else
        cv_internal_multicast <= NOT_ACT ;
```

```
Aug 17 10:50 1994  Who: johnf  File  /c2/local_user/bma/bma_rbsm/bma_rbsm_lib/rbsm_code_vectors.vhd Page 25

    end if ;


-- ****************************************************************
-- cv_internal_broadcast : code_vector "10111"    23
-- ****************************************************************

    if (reset = ACT) then
        cv_internal_broadcast <= NOT_ACT ;

    elsif (cont_scan = ACT                                          and -- End of Ethernet Frame
            ethernet_eof = ACT                                      and -- Non Cutthru
            enet_abort = NOT_ACT                                    and -- ADDED 5/2/94
             ethernet_rx_error = NOT_ACT                            and
              rx_monitor_on = NOT_ACT                               and
               destination_monitor = NOT_ACT                        and
                cut_thru_end = NOT_ACT                              and
                 rx_disable_on = NOT_ACT                            and
                  dest_group_address = ACT                          and
                   dest_address_match = ACT                         and
                    dest_internal = ACT                             and
                     rx_multicast_disable_on = NOT_ACT              and
                      dest_broadcast = ACT) then
        cv_internal_broadcast <= ACT ;

    elsif (cont_scan = ACT                                          and -- End of FDDI Frame
            fddi_eof = ACT                                          and
             fddi_abort = NOT_ACT                                   and
              fddi_rx_error = NOT_ACT                               and
               rx_monitor_on = NOT_ACT                              and
                destination_monitor = NOT_ACT                       and
                 llc_frame_type = ACT                               and
                  rx_disable_on = NOT_ACT                           and
                   dest_group_address = ACT                         and
                    dest_address_match = ACT                        and
                     dest_internal = ACT                            and
                      rx_multicast_disable_on = NOT_ACT             and
                       dest_broadcast = ACT) then
        cv_internal_broadcast <= ACT ;

    else
        cv_internal_broadcast <= NOT_ACT ;
    end if ;


-- ****************************************************************
-- cv_multibuffer_not_last_buffer : code_vector "11000" : 24
-- ****************************************************************

    if (reset = ACT) then
        cv_multibuffer_not_last_buffer <= NOT_ACT ;

Aug 17 10:50 1994  Who: johnf  File: /c2/local_user/bma/bma_rbsm/bma_rbsm_lib/rbsm_code_vectors.vhd Page 26

    elsif (cont_scan = ACT                                          and -- FDDI Multi buffered
            fddi_eof = NOT_ACT                                      and -- frame, not last buffer
          (filter_frame = NOT_ACT                                   or
          (filter_frame = ACT                                       and
           rx_monitor_on = ACT))                                    and
             fddi_multi_buffer = ACT) then
        cv_multibuffer_not_last_buffer <= ACT ;

    else
        cv_multibuffer_not_last_buffer <= NOT_ACT ;
    end if ;


-- ****************************************************************
-- cv_multibuffer_no_translation : code_vector "11001" . 25
-- ****************************************************************


    if (reset = ACT) then
        cv_multibuffer_no_translation <= NOT_ACT ;

    elsif (cont_scan = ACT                                          and -- End of FDDI Frame
            fddi_eof = ACT                                          and -- Multi-Buffered
             fddi_abort = NOT_ACT                                   and
              fddi_rx_error = NOT_ACT                               and
               rx_monitor_on = NOT_ACT                              and
                destination_monitor = NOT_ACT                       and
                 filter_frame = NOT_ACT                             and
                  llc_frame_type = ACT                              and
                   rx_disable_on = NOT_ACT                          and
                    dest_group_address = NOT_ACT                    and
                    (dest_address_match = ACT                       or
                    (dest_address_match = NOT_ACT                   and
                     positive_forward_enable = ACT))                and
                      dest_internal = NOT_ACT                       and
                       port_blocking_on = NOT_ACT                   and
                        src_port_not_forwarding = NOT_ACT           and
                        ((positive_forward_enable = NOT_ACT         and
                         src_address_status = SA_KNOWN_WITH_GOOD_PORT) or
                        (positive_forward_enable = ACT              and
                         rxport_equals_bbone = NOT_ACT              and
                         src_address_status = SA_KNOWN_WITH_GOOD_PORT) or
                        (positive_forward_enable = ACT              and
                         rxport_equals_bbone = ACT                  and
                         src_address_status = SA_UNKNOWN))          and
                          tx_disable_on = NOT_ACT                   and
                           dest_port_blocking = NOT_ACT             and
                            dest_port_not_forwarding = NOT_ACT      and
                             fddi_multi_buffer = ACT                and
                              dest_port_type = FDDI                 and
                               rx_filter_on = NOT_ACT               and
                                tx_filter_on = NOT_ACT) then
        cv_multibuffer_no_translation <= ACT ;

    else
```

```
Aug 17 10 50 1994  Who: johnf  File  /c2/local user/bma/bma rbsm/bma_rbsm_lib/rbsm_code_vectors vhd Page 27

        cv multibuffer_no_translation <= NOT ACT ;
    end if


-- ****************************************************************
-- cv_multibuffer_no translation_filters : code_vector "11010" : 26
-- ****************************************************************


    if (reset = ACT) then
        cv_multibuffer_no_translation_filters <= NOT_ACT ;

    elsif (cont scan = ACT                                              and -- End of FDDI Frame
            fddi_eof = ACT                                              and -- Multi-Buffered
             fddi abort = NOT_ACT                                       and
              fddi_rx_error = NOT_ACT                                   and
               rx_monitor_on = NOT_ACT                                  and
                destination_monitor = NOT_ACT                           and
                 filter_frame = NOT_ACT                                 and
                  llc_frame_type = ACT                                  and
                   rx_disable_on = NOT_ACT                              and
                    dest_group_address = NOT_ACT                        and
                    (dest_address_match = ACT                           or
                    (dest_address_match = NOT_ACT                       and
                     positive_forward_enable = ACT))                    and
                      dest_internal = NOT_ACT                           and
                       port_blocking_on = NOT_ACT                       and
                        src_port_not_forwarding = NOT_ACT               and
                        ((positive_forward_enable = NOT_ACT             and
                         src_address_status = SA_KNOWN_WITH_GOOD_PORT)  or
                        (positive_forward_enable = ACT                  and
                         rxport_equals_bbone = NOT_ACT                  and
                         src_address_status = SA_KNOWN_WITH_GOOD_PORT)  or
                        (positive_forward_enable = ACT                  and
                         rxport_equals_bbone = ACT                      and
                         src_address_status = SA_UNKNOWN))              and
                          tx_disable_on = NOT_ACT                       and
                           dest_port_blocking = NOT_ACT                 and
                            dest_port_not_forwarding = NOT_ACT          and
                             fddi_multi_buffer = ACT                    and
                              dest_port_type = FDDI                     and
           (rx_filter_on = ACT                                          or
            tx_filter_on = ACT)) then
        cv_multibuffer_no_translation_filters <= ACT ;

    else
        cv_multibuffer_no_translation_filters <= NOT_ACT ;
    end if ;


-- ****************************************************************
-- cv_multibuffer_discard_frame : code_vector "11011" : 27
-- ****************************************************************



Aug 17 10:50 1994  Who: johnf  File: /c2/local_user/bma/bma_rbsm/bma_rbsm_lib/rbsm_code_vectors.vhd Page 28

    if (reset = ACT) then
        cv_multibuffer_discard_frame <= NOT_ACT ;

    elsif (cont_scan = ACT                                              and -- FDDI aborted frame
            fddi_eof = ACT                                              and
             fddi_abort = ACT                                           and
              fddi_multi_buffer = ACT) then
        cv_multibuffer_discard_frame <= ACT ;

    elsif (cont_scan = ACT                                              and -- FDDI Receive Port Disabled
            fddi_eof = ACT                                              and
             fddi_abort = NOT_ACT                                       and
              fddi_rx_error = NOT_ACT                                   and
               rx_monitor_on = NOT_ACT                                  and
                destination_monitor = NOT_ACT                           and
                 filter_frame = NOT_ACT                                 and
                  llc_frame_type = ACT                                  and
                   rx_disable_on = ACT                                  and
                    fddi_multi_buffer = ACT) then
        cv_multibuffer_discard_frame <= ACT ;

    elsif (cont_scan = ACT                                              and -- FDDI Unicast Frame
            fddi_eof = ACT                                              and -- destination address miss
             fddi_abort = NOT_ACT                                       and
              fddi_rx_error = NOT_ACT                                   and -- Receive Port Blocking
               rx_monitor_on = NOT_ACT                                  and
                destination_monitor = NOT_ACT                           and
                 filter_frame = NOT_ACT                                 and
                  llc_frame_type = ACT                                  and
                   rx_disable_on = NOT_ACT                              and
                    dest_group_address = NOT_ACT                        and
                     dest_address_match = NOT_ACT                       and
                      port_blocking_on = ACT                            and
                       fddi_multi_buffer = ACT) then
        cv_multibuffer_discard_frame <= ACT ;

    elsif (cont_scan = ACT                                              and -- FDDI Unicast Frame
            fddi_eof = ACT                                              and -- destination address hit
             fddi_abort = NOT_ACT                                       and
              fddi_rx_error = NOT_ACT                                   and -- not internal address
               rx_monitor_on = NOT_ACT                                  and
                destination_monitor = NOT_ACT                           and
                 filter_frame = NOT_ACT                                 and -- Receive Port Blocking
                  llc_frame_type = ACT                                  and
                   rx_disable_on = NOT_ACT                              and
                    dest_group_address = NOT_ACT                        and
                     dest_address_match = ACT                           and
                      dest_internal = NOT_ACT                           and
                       port_blocking_on = ACT                           and
                        fddi_multi_buffer = ACT) then
        cv_multibuffer_discard_frame <= ACT ;

    elsif (cont scan = ACT                                              and -- FDDI Multicast Frame
            fddi_eof = ACT                                              and -- destination address miss
             fddi_abort = NOT_ACT                                       and
```

Aug 17 10:50 1994 Who johnf File /c2/local_user/bma/bma rbsm/bma_rbsm_lib/rbsm_code vectors vhd Page 29

```
              fddi_rx_error = NOT ACT                               and -- Receive Multicast path disabled or
               rx_monitor_on = NOT_ACT                              and
                destination monitor = NOT ACT                       and
                 filter_frame = NOT_ACT                             and -- Receive Port Blocking
                  llc_frame_type = ACT                              and
                   rx_disable_on = NOT_ACT                          and
                    dest_group_address = ACT                        and
                     fddi_multi_buffer = ACT                        and
        (rx_multicast_disable_on = ACT                              or
        ((dest_address match = NOT_ACT                              or
          dest_internal = NOT_ACT)                                  and
          port_blocking_on = ACT))) then
        cv_multibuffer_discard_frame <= ACT ;

    else
        cv_multibuffer_discard_frame <= NOT_ACT ;
    end if ;


-- ===================================================================
-- cv_monitor_source : code_vector "11101" : 29
-- ===================================================================

    if (reset = ACT) then
        cv_monitor_source <= NOT_ACT ;

    elsif (cont_scan = ACT                                          and -- End of Ethernet Frame
            ethernet_eof = ACT                                      and
            enet_abort = NOT_ACT                                    and -- ADDED 5/2/94
             ethernet_rx_error = NOT_ACT                            and
              rx_monitor_on = ACT) then
        cv_monitor_source <= ACT ;

    elsif (cont_scan = ACT                                          and -- End of FDDI Frame
            fddi_eof = ACT                                          and
             fddi_abort = NOT_ACT                                   and
              fddi_rx_error = NOT_ACT                               and
               rx_monitor_on = ACT) then
        cv_monitor_source <= ACT ;

    else
        cv monitor_source <= NOT_ACT ;
    end if ;


-- ===================================================================
-- cv_monitor_destination : code_vector "11110" : 30
-- ===================================================================

    if (reset = ACT) then
        cv_monitor_destination <= NOT_ACT ;
```

Aug 17 10:50 1994 Who: johnf File: /c2/local_user/bma/bma_rbsm/bma_rbsm_lib/rbsm_code_vectors.vhd Page 30

```
    elsif (cont_scan = ACT                                          and -- End of Ethernet Frame
            ethernet_eof = ACT                                      and
            enet_abort = NOT_ACT                                    and -- ADDED 5/2/94
             ethernet_rx_error = NOT_ACT                            and
              rx_monitor_on = NOT_ACT                               and
               destination_monitor = ACT) then
        cv_monitor_destination <= ACT ;

    elsif (cont_scan = ACT                                          and -- End of FDDI Frame
            fddi_eof = ACT                                          and
             fddi_abort = NOT_ACT                                   and
              fddi_rx_error = NOT_ACT                               and
               rx_monitor_on = NOT_ACT                              and
                destination_monitor = ACT) then
        cv_monitor_destination <= ACT ;

    else
        cv_monitor_destination <= NOT_ACT ;
    end if ;


end process rbsm_cv_code_sync ;


--
-- Process rbsm_cv_code_comb  is used to generate the
-- the correct std_logic_vector used to represent the
-- code vector that will be sent to the 28K receive
-- FIFO.
--

rbsm_cv_code_comb:
process(cv_unicast_no_translation,
         cv_unicast_no_translation_filters,
          cv_unicast_no_translation_cutthru,
           cv_unicast_no_translation_cutthru_end,
            cv_unicast_ethernet_to_fddi,
             cv_unicast_ethernet_to_fddi_filters,
              cv_unicast_fddi_to_ethernet,
               cv_unicast_fddi_to_ethernet_filters,
                cv_unicast_fddi_to_ethernet_frag,
                 cv_unicast_da_unknown,
                  cv_unicast_exception,
                   cv_multicast_from_ethernet,
                    cv_multicast_from_ethernet_exception,
                     cv_multicast_from_ethernet_cutthru_end,
                      cv_multicast_from_fddi,
                       cv_multicast_from_fddi_exception,
                        cv_multicast_from_fddi_frag,
                         cv_multicast_exception,
                          cv_receive_frame_error,
                           cv_non_llc_frame,
                            cv_internal_unicast,
                             cv_internal_unicast_exception,
                              cv_internal_multicast,
                               cv_internal_broadcast,
```

Aug 17 10:50 1994 Who: johnf File: /c2/local_user/bma/bma_rbsm/bma_rbsm_lib/rbsm_code_vectors.vhd Page 31

```
                                cv_multibuffer_not_last_buffer,
                                 cv_multibuffer_no_translation,
                                  cv_multibuffer_no_translation_filters,
                                   cv_multibuffer_discard_frame,
                                    cv_monitor_source,
                                     cv_monitor_destination)

begin

    if (cv_unicast_no_translation = ACT) then
        code_vector <= CV_CODE0 ;
    elsif (cv_unicast_no_translation_filters = ACT) then
        code_vector <= CV_CODE1 ;
    elsif (cv_unicast_no_translation_cutthru = ACT) then
        code_vector <= CV_CODE2 ;
    elsif (cv_unicast_no_translation_cutthru_end = ACT) then
        code_vector <= CV_CODE3 ;
    elsif (cv_unicast_ethernet_to_fddi = ACT) then
        code_vector <= CV_CODE4 ;
    elsif (cv_unicast_ethernet_to_fddi_filters = ACT) then
        code_vector <= CV_CODE5 ;
    elsif (cv_unicast_fddi_to_ethernet = ACT) then
        code_vector <= CV_CODE6 ;
    elsif (cv_unicast_fddi_to_ethernet_filters = ACT) then
        code_vector <= CV_CODE7 ;
    elsif (cv_unicast_fddi_to_ethernet_frag = ACT) then
        code_vector <= CV_CODE8 ;
    elsif (cv_unicast_da_unknown = ACT) then
        code_vector <= CV_CODE9 ;
    elsif (cv_unicast_exception = ACT) then
        code_vector <= CV_CODE10 ;

    elsif (cv_multicast_from_ethernet = ACT) then
        code_vector <= CV_CODE11 ;
    elsif (cv_multicast_from_ethernet_exception = ACT) then
        code_vector <= CV_CODE12 ;
    elsif (cv_multicast_from_ethernet_cutthru_end = ACT) then
        code_vector <= CV_CODE13 ;
    elsif (cv_multicast_from_fddi = ACT) then
        code_vector <= CV_CODE14 ;
    elsif (cv_multicast_from_fddi_exception = ACT) then
        code_vector <= CV_CODE15 ;
    elsif (cv_multicast_from_fddi_frag = ACT) then
        code_vector <= CV_CODE16 ;
    elsif (cv_multicast_exception = ACT) then
        code_vector <= CV_CODE17 ;

    elsif (cv_receive_frame_error = ACT) then
        code_vector <= CV_CODE18 ;
    elsif (cv_non_llc_frame = ACT) then
        code_vector <= CV_CODE19 ;

    elsif (cv_internal_unicast = ACT) then
        code_vector <= CV_CODE20 ;
    elsif (cv_internal_unicast_exception = ACT) then
        code_vector <= CV_CODE21 ;
    elsif (cv_internal_multicast = ACT) then
        code_vector <= CV_CODE22 ;
```

Aug 17 10:50 1994 Who: johnf File: /c2/local_user/bma/bma_rbsm/bma_rbsm_lib/rbsm_code_vectors.vhd Page 32

```
    elsif (cv_internal_broadcast = ACT) then
        code_vector <= CV_CODE23 ;

    elsif (cv_multibuffer_not_last_buffer = ACT) then
        code_vector <= CV_CODE24 ;
    elsif (cv_multibuffer_no_translation = ACT) then
        code_vector <= CV_CODE25 ;
    elsif (cv_multibuffer_no_translation_filters = ACT) then
        code_vector <= CV_CODE26 ;
    elsif (cv_multibuffer_discard_frame = ACT) then
        code_vector <= CV_CODE27 ;

    elsif (cv_monitor_source = ACT) then
        code_vector <= CV_CODE29 ;
    elsif (cv_monitor_destination = ACT) then
        code_vector <= CV_CODE30 ;

    else
        code_vector <= CV_CODE31 ;
    end if;

end process rbsm_cv_code_comb;

dest_mon:
process(tx_monitor_on,
          dest_address_match,
           dest_internal,
            dest_group_address,
             tx_disable_on,
              dest_port_blocking,
               dest_port_not_forwarding,
                any_dest_monitor_on,
                 positive_forward_enable,
                  rx_disable_on,
                   port_blocking_on,
                    src_port_not_forwarding,
                     rx_multicast_disable_on,
                      any_dest_multicast_monitor_on)

begin

    if (dest_group_address = NOT_ACT                    and     -- Unicast with DA Known
          dest_address_match = ACT                      and     -- DA is being monitored
           rx_disable_on = NOT_ACT                      and     -- ADDED 5/1/94
            port_blocking_on = NOT_ACT                  and     -- ADDED 5/1/94
             src_port_not_forwarding = NOT_ACT          and     -- ADDED 5/1/94
              dest_internal = NOT_ACT                   and
               tx_monitor_on = ACT                      and
                tx_disable_on = NOT_ACT                 and
                 dest_port_blocking = NOT_ACT           and
                  dest_port_not_forwarding = NOT_ACT) then

        destination_monitor <= ACT ;

    elsif (dest_group_address = NOT_ACT                 and     -- Unicast DA is Unknown
             dest_address_match = NOT_ACT               and     -- There is at least one
              rx_disable_on = NOT_ACT                   and     -- ADDED 5/1/94
               port_blocking_on = NOT_ACT               and     -- ADDED 5/1/94
```

```
              src_port_not_forwarding = NOT_ACT       and     -- ADDED 5/1/94
               positive_forward_enable = NOT_ACT      and
                any_dest_monitor_on = ACT) then               -- destination port being monitored

        destination_monitor <= ACT ;

    elsif (dest_group_address = ACT                  and     -- Multicast Frame, Not Internal
            rx_disable_on = NOT_ACT                  and     -- ADDED 5/1/94
             port_blocking_on = NOT_ACT              and     -- ADDED 5/1/94
              src_port_not_forwarding = NOT_ACT      and     -- ADDED 5/1/94
               rx_multicast_disable_on = NOT_ACT     and     -- ADDED 5/1/94
          ((dest_address_match = ACT                 and     -- There is at least one
            dest_internal = NOT_ACT)                 or      -- destination port being monitored
           dest_address_match = NOT_ACT)             and
            any_dest_multicast_monitor_on = ACT) then

        destination_monitor <= ACT ;

    else
        destination_monitor <= NOT_ACT ;
    end if;

end process dest_mon;

end synthesize;
```

```
-- $Id: rbsm_compll.vhd,v 1.1 93/10/15 12:31:13 johnf Exp $
--
--  Author       John A. Flanders
--
--
--  Title        rbsm_compll      rbsm_compll is the component used to compare AMA status
--                                buffer numbers with the Receive status buffer numbers
--
--
--
--
--  Revision History
--
--  6/29/93                       original version
--
--

library synopsys ;
library ieee ;
library bma_rbsm_lib;
library bma_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_compll is
    port( ama_buffer_number        : in buffer_number;     -- from rbsm_status_registers
          rx_buffer_number         : in buffer_number;     -- from rbsm_status_registers
          buffer_num_neq           : buffer std_logic );
end rbsm_compll ;


----------------------------------------------------------------
----------------------------------------------------------------

architecture synthesize of rbsm_compll is

begin

--
-- Process used to generate a 11 bit comparator
--

rbsm_compll_proc:
process(ama_buffer_number,rx_buffer_number)
begin
    if (ama_buffer_number /= rx_buffer_number) then
```

```
        buffer_num_neq <= ACT;
    else
        buffer_num_neq <= NOT_ACT;
    end if;

end process rbsm_compll_proc ;

end synthesize;
```

```
Aug 17 10:50 1994  Who: johnf  File  /c2/local_user/bma/bma_rbsm/bma_rbsm_lib/rbsm_config.vhd Page 1

-- $Id  rbsm_config.vhd,v 1.5 94/06/02 18:27:37 johnf Exp $
--
--  Author    :  John A. Flanders
--
--
--  Title        rbsm config            rbsm_config is the component used to generate various
--                                      configuration conditions based on the port configuration
--                                      register settings and the source and destination port
--                                      numbers and types
--
--
--
--
--
--
--
--  Revision History
--
--  8/30/93 :                original version
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_config is
    port(
        scan_vector              : in SCAN_VEC      ; -- from rbsm_scanner
        ct_11_threshold          : in port_vector   ; -- from DMA Controller
        ama_set                  : in port_vector   ; -- from rbsm_ama_set

        dest_port_num            : in port_number   ; -- from rbsm_status_registers
        dest_address_match       : in std_logic   ; -- from rbsm_status_registers
        dest_group_address       : in std_logic   ; -- from rbsm_status_registers
        dest_port_equal          : in std_logic   ; -- from rbsm_status_registers
        dest_internal            : in std_logic   ; -- from rbsm_status_registers

        src_group_address        : in std_logic   ; -- from rbsm_status_registers
        src_address_match        : in std_logic   ; -- from rbsm_status_registers
        src_port_equal           : in std_logic   ; -- from rbsm_status_registers
        src_internal             : in std_logic   ; -- from rbsm_status_registers

        ct_enable                : in port_vector  ; -- cut thru enable bits
        ct_multicast_enable      : in port_vector  ; -- multicast cut thru enable bits
        rx_disable               : in port_vector  ; -- receive port disable bits
        rx_multicast_disable     : in port_vector  ; -- receive port multicast disable bits
        tx_disable               : in port_vector  ; -- transmit port disable bits
        tx_multicast_disable     : in port_vector  ; -- transmit port multicast disable bits

Aug 17 10:50 1994  Who: johnf  File  /c2/local_user/bma/bma_rbsm/bma_rbsm_lib/rbsm_config.vhd Page 2

        port_blocking            : in port_vector  ; -- port blocking bits
        port_not_forwarding      : in port_vector  ; -- port not forwarding bits
        rx_filter                : in port_vector  ; -- receive port filter bits
        rx_multicast_filter      : in port_vector  ; -- receive port multicast filter bits
        tx_filter                : in port_vector  ; -- transmit port filter bits
        tx_multicast_filter      : in port_vector  ; -- transmit port multicast filter bits
        monitor_enable           : in port_vector  ; -- monitor enable bits
        port_type_msb            : in port_vector  ; -- most significant port type bits
        port_type_mid            : in port_vector  ; -- middle  port type bits
        port_type_lsb            : in port_vector  ; -- least significant port type bits

        transmit_port_num           : in port_number    ; -- from rbsm_sram_registers
        positive_forward_enable     : in std_logic      ; -- from microprocessor interface
        bbone_register              : in BBONE_REG_DATA ; -- from rbsm_bbone

        dest_port_type                     : buffer PORT_TYPE          ; --
        src_port_type                      : buffer PORT_TYPE          ; --

        src_ct_allowed                     : buffer std_logic          ; --
        dest_ct_allowed                    : buffer std_logic          ; --
        multicast_ct_allowed               : buffer std_logic          ; --
        invalid_dest_port                  : buffer std_logic          ; --

        rx_filter_on                       : buffer std_logic          ; -- to rbsm_code_vectors
        tx_filter_on                       : buffer std_logic          ; -- to rbsm_code_vectors
        rx_disable_on                      : buffer std_logic          ; -- to rbsm_code_vectors
        tx_disable_on                      : buffer std_logic          ; -- to rbsm_code_vectors
        rx_monitor_on                      : buffer std_logic          ; -- to rbsm_code_vectors
        tx_monitor_on                      : buffer std_logic          ; -- to rbsm_code_vectors
        rx_multicast_disable_on            : buffer std_logic          ; -- to rbsm_code_vectors
        rx_multicast_filter_on             : buffer std_logic          ; -- to rbsm_code_vectors
        tx_multicast_filter_on             : buffer std_logic          ; -- to rbsm_code_vectors
        port_blocking_on                   : buffer std_logic          ; -- to rbsm_code_vectors
        dest_port_blocking                 : buffer std_logic          ; -- to rbsm_code_vectors
        any_multicast_cut_thru_disabled    : buffer std_logic          ; -- to rbsm_code_vectors
        any_enet_dest_tx_filter            : buffer std_logic          ; -- to rbsm_code_vectors
        any_enet_dest_tx_multicast_filter  : buffer std_logic          ; -- to rbsm_code_vectors
        any_dest_tx_disabled               : buffer std_logic          ; -- to rbsm_code_vectors
        any_dest_tx_multicast_disabled     : buffer std_logic          ; -- to rbsm_code_vectors
        any_dest_tx_filter                 : buffer std_logic          ; -- to rbsm_code_vectors
        any_dest_tx_multicast_filter       : buffer std_logic          ; -- to rbsm_code_vectors
        any_dest_port_not_forwarding       : buffer std_logic          ; -- to rbsm_code_vectors
        any_dest_port_blocking             : buffer std_logic          ; -- to rbsm_code_vectors
        any_dest_monitor_on                : buffer std_logic          ; -- to rbsm_code_vectors
        any_dest_multicast_monitor_on      : buffer std_logic          ; -- to rbsm_code_vectors

        bbone_src_ct                       : buffer std_logic          ; -- to rbsm_ct_active
        bbone_dest_ct                      : buffer std_logic          ; -- to rbsm_ct_active
        bbone_multicast_ct                 : buffer std_logic          ; -- to rbsm_ct_active
        rxport_equals_bbone                : buffer std_logic          ; --

        dest_port_not_forwarding           : buffer std_logic          ;
        src_port_not_forwarding            : buffer std_logic        ) ;

end rbsm_config ;
```

```
Aug 17 10:50 1994  Who: johnf  File: /c2/local_user/bma/bma_rbsm/bma_rbsm_lib/rbsm_config.vhd Page 3

---------------------------------------------------------------
---------------------------------------------------------------

architecture synthesize of rbsm_config is


begin


rbsm_port_config:
process(scan_vector,dest_port_num,rx_filter,tx_filter,port_not_forwarding,rx_disable,
        tx_disable,rx_multicast_disable,rx_multicast_filter,tx_multicast_filter,
        port_blocking,ct_enable,dest_address_match,dest_port_equal,dest_port_type,
        ct_multicast_enable,ama_set,ct_ll_threshold,src_group_address,src_port_equal,
        src_address_match,tx_multicast_disable,src_internal,dest_internal,monitor_enable
        port_type_msb,port_type_mid,port_type_lsb,transmit_port_num,dest_group_address,
        bbone_register,positive_forward_enable,rxport_equals_bbone)

begin
-- ====================================================================
-- src_ct_allowed : Source Cut Thru Allowed is used to indicate that cut thru
--                  for the source port, the port being scanned, is enabled,
--                  the low latency threshold level has been reached, the
--                  source address was found in the address look up table,
--                  the source multicast bit is not active, the source address
--                  is not an internal address and the active
--                  souce port is equal to the store source port number.
--
-- ====================================================================

   if (scan_vector(0) = ACT and ct_enable(0) = ACT and
       ama_set(0) = ACT and ct_ll_threshold(0) = ACT and
       src_group_address = NOT_ACT and src_address_match = ACT and
       src_internal = NOT_ACT and src_port_equal = ACT) then
       src_ct_allowed <= ACT ;
   elsif (scan_vector(1) = ACT and ct_enable(1) = ACT and
          ama_set(1) = ACT and ct_ll_threshold(1) = ACT and
          src_group_address = NOT_ACT and src_address_match = ACT and
          src_internal = NOT_ACT and src_port_equal = ACT) then
       src_ct_allowed <= ACT ;
   elsif (scan_vector(2) = ACT and ct_enable(2) = ACT and
          ama_set(2) = ACT and ct_ll_threshold(2) = ACT and
          src_group_address = NOT_ACT and src_address_match = ACT and
          src_internal = NOT_ACT and src_port_equal = ACT) then
       src_ct_allowed <= ACT ;
   elsif (scan_vector(3) = ACT and ct_enable(3) = ACT and
          ama_set(3) = ACT and ct_ll_threshold(3) = ACT and
          src_group_address = NOT_ACT and src_address_match = ACT and
          src_internal = NOT_ACT and src_port_equal = ACT) then
       src_ct_allowed <= ACT ;
   elsif (scan_vector(4) = ACT and ct_enable(4) = ACT and
          ama_set(4) = ACT and ct_ll_threshold(4) = ACT and
          src_group_address = NOT_ACT and src_address_match = ACT and
          src_internal = NOT_ACT and src_port_equal = ACT) then
       src_ct_allowed <= ACT ;

Aug 17 10:50 1994  Who: johnf  File: /c2/local_user/bma/bma_rbsm/bma_rbsm_lib/rbsm_config.vhd Page 4

   elsif (scan_vector(5) = ACT and ct_enable(5) = ACT and
          ama_set(5) = ACT and ct_ll_threshold(5) = ACT and
          src_group_address = NOT_ACT and src_address_match = ACT and
          src_internal = NOT_ACT and src_port_equal = ACT) then
       src_ct_allowed <= ACT ;
   elsif (scan_vector(6) = ACT and ct_enable(6) = ACT and
          ama_set(6) = ACT and ct_ll_threshold(6) = ACT and
          src_group_address = NOT_ACT and src_address_match = ACT and
          src_internal = NOT_ACT and src_port_equal = ACT) then
       src_ct_allowed <= ACT ;
   elsif (scan_vector(7) = ACT and ct_enable(7) = ACT and
          ama_set(7) = ACT and ct_ll_threshold(7) = ACT and
          src_group_address = NOT_ACT and src_address_match = ACT and
          src_internal = NOT_ACT and src_port_equal = ACT) then
       src_ct_allowed <= ACT ;
   elsif (scan_vector(8) = ACT and ct_enable(8) = ACT and
          ama_set(8) = ACT and ct_ll_threshold(8) = ACT and
          src_group_address = NOT_ACT and src_address_match = ACT and
          src_internal = NOT_ACT and src_port_equal = ACT) then
       src_ct_allowed <= ACT ;
   elsif (scan_vector(9) = ACT and ct_enable(9) = ACT and
          ama_set(9) = ACT and ct_ll_threshold(9) = ACT and
          src_group_address = NOT_ACT and src_address_match = ACT and
          src_internal = NOT_ACT and src_port_equal = ACT) then
       src_ct_allowed <= ACT ;
   elsif (scan_vector(10) = ACT and ct_enable(10) = ACT and
          ama_set(10) = ACT and ct_ll_threshold(10) = ACT and
          src_group_address = NOT_ACT and src_address_match = ACT and
          src_internal = NOT_ACT and src_port_equal = ACT) then
       src_ct_allowed <= ACT ;
   elsif (scan_vector(11) = ACT and ct_enable(11) = ACT and
          ama_set(11) = ACT and ct_ll_threshold(11) = ACT and
          src_group_address = NOT_ACT and src_address_match = ACT and
          src_internal = NOT_ACT and src_port_equal = ACT) then
       src_ct_allowed <= ACT ;
   elsif (scan_vector(12) = ACT and ct_enable(12) = ACT and
          ama_set(12) = ACT and ct_ll_threshold(12) = ACT and
          src_group_address = NOT_ACT and src_address_match = ACT and
          src_internal = NOT_ACT and src_port_equal = ACT) then
       src_ct_allowed <= ACT ;
   elsif (scan_vector(13) = ACT and ct_enable(13) = ACT and
          ama_set(13) = ACT and ct_ll_threshold(13) = ACT and
          src_group_address = NOT_ACT and src_address_match = ACT and
          src_internal = NOT_ACT and src_port_equal = ACT) then
       src_ct_allowed <= ACT ;
   elsif (scan_vector(14) = ACT and ct_enable(14) = ACT and
          ama_set(14) = ACT and ct_ll_threshold(14) = ACT and
          src_group_address = NOT_ACT and src_address_match = ACT and
          src_internal = NOT_ACT and src_port_equal = ACT) then
       src_ct_allowed <= ACT ;
   elsif (scan_vector(15) = ACT and ct_enable(15) = ACT and
          ama_set(15) = ACT and ct_ll_threshold(15) = ACT and
          src_group_address = NOT_ACT and src_address_match = ACT and
          src_internal = NOT_ACT and src_port_equal = ACT) then
       src_ct_allowed <= ACT ;
   else
       src_ct_allowed <= NOT_ACT ;
   end if;
```

Aug 17 10:50 1994 Who: johnf File: /c2/local_user/bma/bma_rbsm/bma_rbsm_lib/rbsm_config.vhd Page 5

```
-- ======================================================================
-- bbone_src_ct       Backbone Source Cut Thru Allowed is used to indicate that cut
--                    thru for the source port, the port being scanned, is enabled,
--                    the low latency threshold level has been reached, the
--                    source address was not found in the address look up table
--                    and the source multicast bit is not active.
--
-- ======================================================================

    if (scan_vector(0) = ACT and ct_enable(0) = ACT and
        ama_set(0) = ACT and ct_ll_threshold(0) = ACT and
        src_group_address = NOT_ACT and src_address_match = NOT_ACT) then
        bbone_src_ct <= ACT ;
    elsif (scan_vector(1) = ACT and ct_enable(1) = ACT and
            ama_set(1) = ACT and ct_ll_threshold(1) = ACT and
            src_group_address = NOT_ACT and src_address_match = NOT_ACT) then
        bbone_src_ct <= ACT ;
    elsif (scan_vector(2) = ACT and ct_enable(2) = ACT and
            ama_set(2) = ACT and ct_ll_threshold(2) = ACT and
            src_group_address = NOT_ACT and src_address_match = NOT_ACT) then
        bbone_src_ct <= ACT ;
    elsif (scan_vector(3) = ACT and ct_enable(3) = ACT and
            ama_set(3) = ACT and ct_ll_threshold(3) = ACT and
            src_group_address = NOT_ACT and src_address_match = NOT_ACT) then
        bbone_src_ct <= ACT ;
    elsif (scan_vector(4) = ACT and ct_enable(4) = ACT and
            ama_set(4) = ACT and ct_ll_threshold(4) = ACT and
            src_group_address = NOT_ACT and src_address_match = NOT_ACT) then
        bbone_src_ct <= ACT ;
    elsif (scan_vector(5) = ACT and ct_enable(5) = ACT and
            ama_set(5) = ACT and ct_ll_threshold(5) = ACT and
            src_group_address = NOT_ACT and src_address_match = NOT_ACT) then
        bbone_src_ct <= ACT ;
    elsif (scan_vector(6) = ACT and ct_enable(6) = ACT and
            ama_set(6) = ACT and ct_ll_threshold(6) = ACT and
            src_group_address = NOT_ACT and src_address_match = NOT_ACT) then
        bbone_src_ct <= ACT ;
    elsif (scan_vector(7) = ACT and ct_enable(7) = ACT and
            ama_set(7) = ACT and ct_ll_threshold(7) = ACT and
            src_group_address = NOT_ACT and src_address_match = NOT_ACT) then
        bbone_src_ct <= ACT ;
    elsif (scan_vector(8) = ACT and ct_enable(8) = ACT and
            ama_set(8) = ACT and ct_ll_threshold(8) = ACT and
            src_group_address = NOT_ACT and src_address_match = NOT_ACT) then
        bbone_src_ct <= ACT ;
    elsif (scan_vector(9) = ACT and ct_enable(9) = ACT and
            ama_set(9) = ACT and ct_ll_threshold(9) = ACT and
            src_group_address = NOT_ACT and src_address_match = NOT_ACT) then
        bbone_src_ct <= ACT ;
    elsif (scan_vector(10) = ACT and ct_enable(10) = ACT and
            ama_set(10) = ACT and ct_ll_threshold(10) = ACT and
            src_group_address = NOT_ACT and src_address_match = NOT_ACT) then
        bbone_src_ct <= ACT ;
    elsif (scan_vector(11) = ACT and ct_enable(11) = ACT and
            ama_set(11) = ACT and ct_ll_threshold(11) = ACT and
            src_group_address = NOT_ACT and src_address_match = NOT_ACT) then
        bbone_src_ct <= ACT ;
    elsif (scan_vector(12) = ACT and ct_enable(12) = ACT and
```

Aug 17 10:50 1994 Who: johnf File: /c2/local_user/bma/bma_rbsm/bma_rbsm_lib/rbsm_config.vhd Page 6

```
            ama_set(12) = ACT and ct_ll_threshold(12) = ACT and
            src_group_address = NOT_ACT and src_address_match = NOT_ACT) then
        bbone_src_ct <= ACT ;
    elsif (scan_vector(13) = ACT and ct_enable(13) = ACT and
            ama_set(13) = ACT and ct_ll_threshold(13) = ACT and
            src_group_address = NOT_ACT and src_address_match = NOT_ACT) then
        bbone_src_ct <= ACT ;
    elsif (scan_vector(14) = ACT and ct_enable(14) = ACT and
            ama_set(14) = ACT and ct_ll_threshold(14) = ACT and
            src_group_address = NOT_ACT and src_address_match = NOT_ACT) then
        bbone_src_ct <= ACT ;
    elsif (scan_vector(15) = ACT and ct_enable(15) = ACT and
            ama_set(15) = ACT and ct_ll_threshold(15) = ACT and
            src_group_address = NOT_ACT and src_address_match = NOT_ACT) then
        bbone_src_ct <= ACT ;
    else
        bbone_src_ct <= NOT_ACT ;
    end if;




-- ======================================================================
-- multicast_ct_allowed : Multicast Cut Thru Allowed is used to indicate
--                        that the source port multicast cut thru bit is
--                        set and that the destination address was not
--                        found in the address look up table.
--
-- ======================================================================

    if (scan_vector(0) = ACT and ct_multicast_enable(0) = ACT and
        dest_address_match = NOT_ACT and
        (positive_forward_enable = NOT_ACT or rxport_equals_bbone = NOT_ACT)) then
        multicast_ct_allowed <= ACT ;
    elsif (scan_vector(1) = ACT and ct_multicast_enable(1) = ACT and
            dest_address_match = NOT_ACT and
           (positive_forward_enable = NOT_ACT or rxport_equals_bbone = NOT_ACT)) then
            multicast_ct_allowed <= ACT ;
    elsif (scan_vector(2) = ACT and ct_multicast_enable(2) = ACT and
            dest_address_match = NOT_ACT and
           (positive_forward_enable = NOT_ACT or rxport_equals_bbone = NOT_ACT)) then
            multicast_ct_allowed <= ACT ;
    elsif (scan_vector(3) = ACT and ct_multicast_enable(3) = ACT and
            dest_address_match = NOT_ACT and
           (positive_forward_enable = NOT_ACT or rxport_equals_bbone = NOT_ACT)) then
            multicast_ct_allowed <= ACT ;
    elsif (scan_vector(4) = ACT and ct_multicast_enable(4) = ACT and
            dest_address_match = NOT_ACT and
           (positive_forward_enable = NOT_ACT or rxport_equals_bbone = NOT_ACT)) then
            multicast_ct_allowed <= ACT ;
    elsif (scan_vector(5) = ACT and ct_multicast_enable(5) = ACT and
            dest_address_match = NOT_ACT and
           (positive_forward_enable = NOT_ACT or rxport_equals_bbone = NOT_ACT)) then
            multicast_ct_allowed <= ACT ;
    elsif (scan_vector(6) = ACT and ct_multicast_enable(6) = ACT and
            dest_address_match = NOT_ACT and
           (positive_forward_enable = NOT_ACT or rxport_equals_bbone = NOT_ACT)) then
```

```
Aug 17 10:50 1994  Who: johnf  File: /c2/local_user/bma/bma_rbsm/bma_rbsm_lib/rbsm_config.vhd Page 7

          multicast_ct_allowed <= ACT
     elsif (scan_vector(7) = ACT and ct_multicast_enable(7) = ACT and
          dest_address_match = NOT_ACT and
         (positive_forward_enable = NOT_ACT or rxport_equals_bbone = NOT_ACT)) then
          multicast_ct_allowed <= ACT ;
     elsif (scan_vector(8) = ACT and ct_multicast_enable(8) = ACT and
          dest_address_match = NOT_ACT and
         (positive_forward_enable = NOT_ACT or rxport_equals_bbone = NOT_ACT)) then
          multicast_ct_allowed <= ACT ;
     elsif (scan_vector(9) = ACT and ct_multicast_enable(9) = ACT and
          dest_address_match = NOT_ACT and
         (positive_forward_enable = NOT_ACT or rxport_equals_bbone = NOT_ACT)) then
          multicast_ct_allowed <= ACT ;
     elsif (scan_vector(10) = ACT and ct_multicast_enable(10) = ACT and
          dest_address_match = NOT_ACT and
         (positive_forward_enable = NOT_ACT or rxport_equals_bbone = NOT_ACT)) then
          multicast_ct_allowed <= ACT ;
     elsif (scan_vector(11) = ACT and ct_multicast_enable(11) = ACT and
          dest_address_match = NOT_ACT and
         (positive_forward_enable = NOT_ACT or rxport_equals_bbone = NOT_ACT)) then
          multicast_ct_allowed <= ACT ;
     elsif (scan_vector(12) = ACT and ct_multicast_enable(12) = ACT and
          dest_address_match = NOT_ACT and
         (positive_forward_enable = NOT_ACT or rxport_equals_bbone = NOT_ACT)) then
          multicast_ct_allowed <= ACT ;
     elsif (scan_vector(13) = ACT and ct_multicast_enable(13) = ACT and
          dest_address_match = NOT_ACT and
         (positive_forward_enable = NOT_ACT or rxport_equals_bbone = NOT_ACT)) then
          multicast_ct_allowed <= ACT
     elsif (scan_vector(14) = ACT and ct_multicast_enable(14) = ACT and
          dest_address_match = NOT_ACT and
         (positive_forward_enable = NOT_ACT or rxport_equals_bbone = NOT_ACT)) then
          multicast_ct_allowed <= ACT ;
     elsif (scan_vector(15) = ACT and ct_multicast_enable(15) = ACT and
          dest_address_match = NOT_ACT and
         (positive_forward_enable = NOT_ACT or rxport_equals_bbone = NOT_ACT)) then
          multicast_ct_allowed <= ACT
     else
          multicast_ct_allowed <= NOT_ACT ;
     end if;


  -- ======================================================================
  -- bbone_multicast_ct        Backbone Multicast Cut Thru Allowed is used to indicate
  --                           that the source port multicast cut thru bit is
  --                           set, the destination address was not found in the
  --                           address look up table, the source cut thru bit is set,
  --                           the source address was not found in the address look
  --                           up table, the source group address bit is not active,
  --                           the cut thru low latency threshold level has been
  --                           reached for the receive port and the receive port is
  --                           the backbone port.
  --
  -- ======================================================================

     if (scan_vector(0) = ACT and ct_multicast_enable(0) = ACT and

Aug 17 10:50 1994  Who: johnf  File: /c2/local_user/bma/bma_rbsm/bma_rbsm_lib/rbsm_config.vhd Page 8

          dest_address_match = NOT_ACT and ct_enable(0) = ACT and
          src_address_match = NOT_ACT and src_group_address = NOT_ACT and
          ct_ll_threshold(0) = ACT and positive_forward_enable = ACT and
          rxport_equals_bbone = ACT) then
          bbone_multicast_ct <= ACT ;
     elsif (scan_vector(1) = ACT and ct_multicast_enable(1) = ACT and
          dest_address_match = NOT_ACT and ct_enable(1) = ACT and
          src_address_match = NOT_ACT and src_group_address = NOT_ACT and
          ct_ll_threshold(1) = ACT and positive_forward_enable = ACT and
          rxport_equals_bbone = ACT) then
          bbone_multicast_ct <= ACT ;
     elsif (scan_vector(2) = ACT and ct_multicast_enable(2) = ACT and
          dest_address_match = NOT_ACT and ct_enable(2) = ACT and
          src_address_match = NOT_ACT and src_group_address = NOT_ACT and
          ct_ll_threshold(2) = ACT and positive_forward_enable = ACT and
          rxport_equals_bbone = ACT) then
          bbone_multicast_ct <= ACT ;
     elsif (scan_vector(3) = ACT and ct_multicast_enable(3) = ACT and
          dest_address_match = NOT_ACT and ct_enable(3) = ACT and
          src_address_match = NOT_ACT and src_group_address = NOT_ACT and
          ct_ll_threshold(3) = ACT and positive_forward_enable = ACT and
          rxport_equals_bbone = ACT) then
          bbone_multicast_ct <= ACT ;
     elsif (scan_vector(4) = ACT and ct_multicast_enable(4) = ACT and
          dest_address_match = NOT_ACT and ct_enable(4) = ACT and
          src_address_match = NOT_ACT and src_group_address = NOT_ACT and
          ct_ll_threshold(4) = ACT and positive_forward_enable = ACT and
          rxport_equals_bbone = ACT) then
          bbone_multicast_ct <= ACT ;
     elsif (scan_vector(5) = ACT and ct_multicast_enable(5) = ACT and
          dest_address_match = NOT_ACT and ct_enable(5) = ACT and
          src_address_match = NOT_ACT and src_group_address = NOT_ACT and
          ct_ll_threshold(5) = ACT and positive_forward_enable = ACT and
          rxport_equals_bbone = ACT) then
          bbone_multicast_ct <= ACT ;
     elsif (scan_vector(6) = ACT and ct_multicast_enable(6) = ACT and
          dest_address_match = NOT_ACT and ct_enable(6) = ACT and
          src_address_match = NOT_ACT and src_group_address = NOT_ACT and
          ct_ll_threshold(6) = ACT and positive_forward_enable = ACT and
          rxport_equals_bbone = ACT) then
          bbone_multicast_ct <= ACT ;
     elsif (scan_vector(7) = ACT and ct_multicast_enable(7) = ACT and
          dest_address_match = NOT_ACT and ct_enable(7) = ACT and
          src_address_match = NOT_ACT and src_group_address = NOT_ACT and
          ct_ll_threshold(7) = ACT and positive_forward_enable = ACT and
          rxport_equals_bbone = ACT) then
          bbone_multicast_ct <= ACT ;
     elsif (scan_vector(8) = ACT and ct_multicast_enable(8) = ACT and
          dest_address_match = NOT_ACT and ct_enable(8) = ACT and
          src_address_match = NOT_ACT and src_group_address = NOT_ACT and
          ct_ll_threshold(8) = ACT and positive_forward_enable = ACT and
          rxport_equals_bbone = ACT) then
          bbone_multicast_ct <= ACT ;
     elsif (scan_vector(9) = ACT and ct_multicast_enable(9) = ACT and
          dest_address_match = NOT_ACT and ct_enable(9) = ACT and
          src_address_match = NOT_ACT and src_group_address = NOT_ACT and
          ct_ll_threshold(9) = ACT and positive_forward_enable = ACT and
          rxport_equals_bbone = ACT) then
          bbone_multicast_ct <= ACT ;
     elsif (scan_vector(10) = ACT and ct_multicast_enable(10) = ACT and
```

Aug 17 10:50 1994 Who: johnf File: /c2/local_user/bma/bma_rbsm/bma_rbsm_lib/rbsm_config.vhd Page 9

```
            dest_address_match = NOT_ACT and ct_enable(10) = ACT and
            src_address_match = NOT_ACT and src_group_address = NOT_ACT and
            ct_ll_threshold(10) = ACT and positive_forward_enable = ACT and
            rxport_equals_bbone = ACT) then
            bbone_multicast_ct <= ACT ;
      elsif (scan_vector(11) = ACT and ct_multicast_enable(11) = ACT and
            dest_address_match = NOT_ACT and ct_enable(11) = ACT and
            src_address_match = NOT_ACT and src_group_address = NOT_ACT and
            ct_ll_threshold(11) = ACT and positive_forward_enable = ACT and
            rxport_equals_bbone = ACT) then
            bbone_multicast_ct <= ACT ;
      elsif (scan_vector(12) = ACT and ct_multicast_enable(12) = ACT and
            dest_address_match = NOT_ACT and ct_enable(12) = ACT and
            src_address_match = NOT_ACT and src_group_address = NOT_ACT and
            ct_ll_threshold(12) = ACT and positive_forward_enable = ACT and
            rxport_equals_bbone = ACT) then
            bbone_multicast_ct <= ACT ;
      elsif (scan_vector(13) = ACT and ct_multicast_enable(13) = ACT and
            dest_address_match = NOT_ACT and ct_enable(13) = ACT and
            src_address_match = NOT_ACT and src_group_address = NOT_ACT and
            ct_ll_threshold(13) = ACT and positive_forward_enable = ACT and
            rxport_equals_bbone = ACT) then
            bbone_multicast_ct <= ACT ;
      elsif (scan_vector(14) = ACT and ct_multicast_enable(14) = ACT and
            dest_address_match = NOT_ACT and ct_enable(14) = ACT and
            src_address_match = NOT_ACT and src_group_address = NOT_ACT and
            ct_ll_threshold(14) = ACT and positive_forward_enable = ACT and
            rxport_equals_bbone = ACT) then
            bbone_multicast_ct <= ACT ;
      elsif (scan_vector(15) = ACT and ct_multicast_enable(15) = ACT and
            dest_address_match = NOT_ACT and ct_enable(15) = ACT and
            src_address_match = NOT_ACT and src_group_address = NOT_ACT and
            ct_ll_threshold(15) = ACT and positive_forward_enable = ACT and
            rxport_equals_bbone = ACT) then
            bbone_multicast_ct <= ACT ;
      else
            bbone_multicast_ct <= NOT_ACT ;
      end if;


-- ==================================================================
-- dest_ct_allowed : Destination Cut Thru Allowed is used to indicate
--                   that cut thru is enabled for the destination port,
--                   the destination address was found in the address
--                   look up table, the destination port is an Ethernet
--                   port, the destination address is not an internal address
--                   and the destination port is not equal to the
--                   source port. If all of the above conditions are met
--                   then dest_ct_allowed will go ACTive.
--
-- ==================================================================

      if (dest_port_num = PORT0 and ct_enable(0) = ACT and dest_address_match = ACT and
          dest_port_equal = NOT_ACT and dest_port_type = ETHERNET and
          dest_internal = NOT_ACT) then
          dest_ct_allowed <= ACT ;
      elsif (dest_port_num = PORT1 and ct_enable(1) = ACT and dest_address_match = ACT and
            dest_port_equal = NOT_ACT and dest_port_type = ETHERNET and
```

Aug 17 10:50 1994 Who: johnf File: /c2/local_user/bma/bma_rbsm/bma_rbsm_lib/rbsm_config.vhd Page 10

```
            dest_internal = NOT_ACT) then
            dest_ct_allowed <= ACT ;
      elsif (dest_port_num = PORT2 and ct_enable(2) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT3 and ct_enable(3) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT4 and ct_enable(4) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT5 and ct_enable(5) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT6 and ct_enable(6) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT7 and ct_enable(7) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT8 and ct_enable(8) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT9 and ct_enable(9) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT10 and ct_enable(10) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT11 and ct_enable(11) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT12 and ct_enable(12) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT13 and ct_enable(13) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT14 and ct_enable(14) = ACT and dest_address_match = ACT and
            dest_port_equal = NOT_ACT and dest_port_type = ETHERNET and
            dest_internal = NOT_ACT) then
            dest_ct_allowed <= ACT ;
      elsif (dest_port_num = PORT15 and ct_enable(15) = ACT and dest_address_match = ACT and
            dest_port_equal = NOT_ACT and dest_port_type = ETHERNET and
            dest_internal = NOT_ACT) then
            dest_ct_allowed <= ACT ;
      else
            dest_ct_allowed <= NOT_ACT ;
```

Aug 17 10:50 1994 Who: johnf File: /c2/local_user/bma/bma_rbsm/bma_rbsm_lib/rbsm_config.vhd Page 11

```
    end if ;


-- ==========================================================================
-- bbone_dest_ct    : Backbone destination Cut Thru Allowed is used to indicate
--                    that cut thru is enabled for the backbone port,
--                    the destination address was not found in the address
--                    look up table and the backbone port is an Ethernet
--                    port
--
-- ==========================================================================


    if (transmit_port_num = PORT0 and ct_enable(0) = ACT and dest_address_match = NOT_ACT and
        dest_port_type = ETHERNET) then
        bbone_dest_ct <= ACT ;
    elsif (transmit_port_num = PORT1 and ct_enable(1) = ACT and dest_address_match = NOT_ACT and
            dest_port_type = ETHERNET) then
        bbone_dest_ct <= ACT ;
    elsif (transmit_port_num = PORT2 and ct_enable(2) = ACT and dest_address_match = NOT_ACT and
            dest_port_type = ETHERNET) then
        bbone_dest_ct <= ACT ;
    elsif (transmit_port_num = PORT3 and ct_enable(3) = ACT and dest_address_match = NOT_ACT and
            dest_port_type = ETHERNET) then
        bbone_dest_ct <= ACT ;
    elsif (transmit_port_num = PORT4 and ct_enable(4) = ACT and dest_address_match = NOT_ACT and
            dest_port_type = ETHERNET) then
        bbone_dest_ct <= ACT ;
    elsif (transmit_port_num = PORT5 and ct_enable(5) = ACT and dest_address_match = NOT_ACT and
            dest_port_type = ETHERNET) then
        bbone_dest_ct <= ACT ;
    elsif (transmit_port_num = PORT6 and ct_enable(6) = ACT and dest_address_match = NOT_ACT and
            dest_port_type = ETHERNET) then
        bbone_dest_ct <= ACT ;
    elsif (transmit_port_num = PORT7 and ct_enable(7) = ACT and dest_address_match = NOT_ACT and
            dest_port_type = ETHERNET) then
        bbone_dest_ct <= ACT ;
    elsif (transmit_port_num = PORT8 and ct_enable(8) = ACT and dest_address_match = NOT_ACT and
            dest_port_type = ETHERNET) then
        bbone_dest_ct <= ACT ;
    elsif (transmit_port_num = PORT9 and ct_enable(9) = ACT and dest_address_match = NOT_ACT and
            dest_port_type = ETHERNET) then
        bbone_dest_ct <= ACT ;
    elsif (transmit_port_num = PORT10 and ct_enable(10) = ACT and dest_address_match = NOT_ACT and
            dest_port_type = ETHERNET) then
        bbone_dest_ct <= ACT ;
    elsif (transmit_port_num = PORT11 and ct_enable(11) = ACT and dest_address_match = NOT_ACT and
            dest_port_type = ETHERNET) then
        bbone_dest_ct <= ACT ;
    elsif (transmit_port_num = PORT12 and ct_enable(12) = ACT and dest_address_match = NOT_ACT and
            dest_port_type = ETHERNET) then
        bbone_dest_ct <= ACT ;
    elsif (transmit_port_num = PORT13 and ct_enable(13) = ACT and dest_address_match = NOT_ACT and
            dest_port_type = ETHERNET) then
        bbone_dest_ct <= ACT ;
    elsif (transmit_port_num = PORT14 and ct_enable(14) = ACT and dest_address_match = NOT_ACT and
            dest_port_type = ETHERNET) then
        bbone_dest_ct <= ACT ;
```

Aug 17 10:50 1994 Who: johnf File: /c2/local_user/bma/bma_rbsm/bma_rbsm_lib/rbsm_config.vhd Page 12

```
    elsif (transmit_port_num = PORT15 and ct_enable(15) = ACT and dest_address_match = NOT_ACT and
            dest_port_type = ETHERNET) then
        bbone_dest_ct <= ACT ;
    else
        bbone_dest_ct <= NOT_ACT ;
    end if ;


-- ==========================================================================
-- rx_filter_on : Receive filter on is used to indicate that the receive
--                filter bit for the port being scanned is set when
--                ACTive.
-- ==========================================================================

    if (scan_vector(0) = ACT and rx_filter(0) = ACT) then
        rx_filter_on <= ACT ;
    elsif (scan_vector(1) = ACT and rx_filter(1) = ACT) then
            rx_filter_on <= ACT ;
    elsif (scan_vector(2) = ACT and rx_filter(2) = ACT) then
            rx_filter_on <= ACT ;
    elsif (scan_vector(3) = ACT and rx_filter(3) = ACT) then
            rx_filter_on <= ACT ;
    elsif (scan_vector(4) = ACT and rx_filter(4) = ACT) then
            rx_filter_on <= ACT ;
    elsif (scan_vector(5) = ACT and rx_filter(5) = ACT) then
            rx_filter_on <= ACT ;
    elsif (scan_vector(6) = ACT and rx_filter(6) = ACT) then
            rx_filter_on <= ACT ;
    elsif (scan_vector(7) = ACT and rx_filter(7) = ACT) then
            rx_filter_on <= ACT ;
    elsif (scan_vector(8) = ACT and rx_filter(8) = ACT) then
            rx_filter_on <= ACT ;
    elsif (scan_vector(9) = ACT and rx_filter(9) = ACT) then
            rx_filter_on <= ACT ;
    elsif (scan_vector(10) = ACT and rx_filter(10) = ACT) then
            rx_filter_on <= ACT ;
    elsif (scan_vector(11) = ACT and rx_filter(11) = ACT) then
            rx_filter_on <= ACT ;
    elsif (scan_vector(12) = ACT and rx_filter(12) = ACT) then
            rx_filter_on <= ACT ;
    elsif (scan_vector(13) = ACT and rx_filter(13) = ACT) then
            rx_filter_on <= ACT ;
    elsif (scan_vector(14) = ACT and rx_filter(14) = ACT) then
            rx_filter_on <= ACT ;
    elsif (scan_vector(15) = ACT and rx_filter(15) = ACT) then
            rx_filter_on <= ACT ;
    elsif (scan_vector(16) = ACT and rx_filter(16) = ACT) then
            rx_filter_on <= ACT ;
    elsif (scan_vector(17) = ACT and rx_filter(16) = ACT) then
            rx_filter_on <= ACT ;
    elsif (scan_vector(18) = ACT and rx_filter(17) = ACT) then
            rx_filter_on <= ACT ;
    elsif (scan_vector(19) = ACT and rx_filter(17) = ACT) then
            rx_filter_on <= ACT ;
    else
            rx_filter_on <= NOT_ACT ;
    end if;
```

Aug 17 10:50 1994 Who: johnf File: /c2/local_user/bma/bma_rbsm/bma_rbsm_lib/rbsm_config.vhd Page 13

```
-- ************************************************************************
-- rx_disable_on : Receive disable on is used to indicate that the receive
--                 path disable bit for the port being scanned is set when
--                 ACTive.
-- ************************************************************************

    if (scan_vector(0) = ACT and rx_disable(0) = ACT) then
        rx_disable_on <= ACT ;
    elsif (scan_vector(1) = ACT and rx_disable(1) = ACT) then
        rx_disable_on <= ACT ;
    elsif (scan_vector(2) = ACT and rx_disable(2) = ACT) then
        rx_disable_on <= ACT ;
    elsif (scan_vector(3) = ACT and rx_disable(3) = ACT) then
        rx_disable_on <= ACT ;
    elsif (scan_vector(4) = ACT and rx_disable(4) = ACT) then
        rx_disable_on <= ACT ;
    elsif (scan_vector(5) = ACT and rx_disable(5) = ACT) then
        rx_disable_on <= ACT ;
    elsif (scan_vector(6) = ACT and rx_disable(6) = ACT) then
        rx_disable_on <= ACT ;
    elsif (scan_vector(7) = ACT and rx_disable(7) = ACT) then
        rx_disable_on <= ACT ;
    elsif (scan_vector(8) = ACT and rx_disable(8) = ACT) then
        rx_disable_on <= ACT ;
    elsif (scan_vector(9) = ACT and rx_disable(9) = ACT) then
        rx_disable_on <= ACT ;
    elsif (scan_vector(10) = ACT and rx_disable(10) = ACT) then
        rx_disable_on <= ACT ;
    elsif (scan_vector(11) = ACT and rx_disable(11) = ACT) then
        rx_disable_on <= ACT ;
    elsif (scan_vector(12) = ACT and rx_disable(12) = ACT) then
        rx_disable_on <= ACT ;
    elsif (scan_vector(13) = ACT and rx_disable(13) = ACT) then
        rx_disable_on <= ACT ;
    elsif (scan_vector(14) = ACT and rx_disable(14) = ACT) then
        rx_disable_on <= ACT ;
    elsif (scan_vector(15) = ACT and rx_disable(15) = ACT) then
        rx_disable_on <= ACT ;
    elsif (scan_vector(16) = ACT and rx_disable(16) = ACT) then
        rx_disable_on <= ACT ;
    elsif (scan_vector(17) = ACT and rx_disable(16) = ACT) then
        rx_disable_on <= ACT ;
    elsif (scan_vector(18) = ACT and rx_disable(17) = ACT) then
        rx_disable_on <= ACT ;
    elsif (scan_vector(19) = ACT and rx_disable(17) = ACT) then
        rx_disable_on <= ACT ;
    else
        rx_disable_on <= NOT_ACT ;
    end if;


-- ************************************************************************
-- rx_multicast_filter_on : Receive multicast filter on is used to indicate that the
--                          receive multicast filter on bit for the port being scanned
--                          is set when ACTive.
```

Aug 17 10:50 1994 Who: johnf File: /c2/local_user/bma/bma_rbsm/bma_rbsm_lib/rbsm_config.vhd Page 14

```
-- ************************************************************************

    if (scan_vector(0) = ACT and rx_multicast_filter(0) = ACT) then
        rx_multicast_filter_on <= ACT ;
    elsif (scan_vector(1) = ACT and rx_multicast_filter(1) = ACT) then
        rx_multicast_filter_on <= ACT ;
    elsif (scan_vector(2) = ACT and rx_multicast_filter(2) = ACT) then
        rx_multicast_filter_on <= ACT ;
    elsif (scan_vector(3) = ACT and rx_multicast_filter(3) = ACT) then
        rx_multicast_filter_on <= ACT ;
    elsif (scan_vector(4) = ACT and rx_multicast_filter(4) = ACT) then
        rx_multicast_filter_on <= ACT ;
    elsif (scan_vector(5) = ACT and rx_multicast_filter(5) = ACT) then
        rx_multicast_filter_on <= ACT ;
    elsif (scan_vector(6) = ACT and rx_multicast_filter(6) = ACT) then
        rx_multicast_filter_on <= ACT ;
    elsif (scan_vector(7) = ACT and rx_multicast_filter(7) = ACT) then
        rx_multicast_filter_on <= ACT ;
    elsif (scan_vector(8) = ACT and rx_multicast_filter(8) = ACT) then
        rx_multicast_filter_on <= ACT ;
    elsif (scan_vector(9) = ACT and rx_multicast_filter(9) = ACT) then
        rx_multicast_filter_on <= ACT ;
    elsif (scan_vector(10) = ACT and rx_multicast_filter(10) = ACT) then
        rx_multicast_filter_on <= ACT ;
    elsif (scan_vector(11) = ACT and rx_multicast_filter(11) = ACT) then
        rx_multicast_filter_on <= ACT ;
    elsif (scan_vector(12) = ACT and rx_multicast_filter(12) = ACT) then
        rx_multicast_filter_on <= ACT ;
    elsif (scan_vector(13) = ACT and rx_multicast_filter(13) = ACT) then
        rx_multicast_filter_on <= ACT ;
    elsif (scan_vector(14) = ACT and rx_multicast_filter(14) = ACT) then
        rx_multicast_filter_on <= ACT ;
    elsif (scan_vector(15) = ACT and rx_multicast_filter(15) = ACT) then
        rx_multicast_filter_on <= ACT ;
    elsif (scan_vector(16) = ACT and rx_multicast_filter(16) = ACT) then
        rx_multicast_filter_on <= ACT ;
    elsif (scan_vector(17) = ACT and rx_multicast_filter(15) = ACT) then
        rx_multicast_filter_on <= ACT ;
    elsif (scan_vector(18) = ACT and rx_multicast_filter(17) = ACT) then
        rx_multicast_filter_on <= ACT ;
    elsif (scan_vector(19) = ACT and rx_multicast_filter(17) = ACT) then
        rx_multicast_filter_on <= ACT ;
    else
        rx_multicast_filter_on <= NOT_ACT ;
    end if;


-- ************************************************************************
-- rx_multicast_disable_on : Receive multicast disable on is used to indicate that the
--                           receive multicast disable on bit for the port being scanned
--                           is set when ACTive.
-- ************************************************************************

    if (scan_vector(0) = ACT and rx_multicast_disable(0) = ACT) then
        rx_multicast_disable_on <= ACT ;
    elsif (scan_vector(1) = ACT and rx_multicast_disable(1) = ACT) then
```

```
Aug 17 10:50 1994  Who: johnf  File: /c2/local_user/bma/bma_rbsm/bma_rbsm_lib/rbsm_config.vhd Page 15

            rx_multicast_disable_on <= ACT ;
    elsif (scan_vector(2) = ACT and rx_multicast_disable(2) = ACT) then
            rx_multicast_disable_on <= ACT ;
    elsif (scan_vector(3) = ACT and rx_multicast_disable(3) = ACT) then
            rx_multicast_disable_on <= ACT ;
    elsif (scan_vector(4) = ACT and rx_multicast_disable(4) = ACT) then
            rx_multicast_disable_on <= ACT ;
    elsif (scan_vector(5) = ACT and rx_multicast_disable(5) = ACT) then
            rx_multicast_disable_on <= ACT ;
    elsif (scan_vector(6) = ACT and rx_multicast_disable(6) = ACT) then
            rx_multicast_disable_on <= ACT ;
    elsif (scan_vector(7) = ACT and rx_multicast_disable(7) = ACT) then
            rx_multicast_disable_on <= ACT ;
    elsif (scan_vector(8) = ACT and rx_multicast_disable(8) = ACT) then
            rx_multicast_disable_on <= ACT ;
    elsif (scan_vector(9) = ACT and rx_multicast_disable(9) = ACT) then
            rx_multicast_disable_on <= ACT ;
    elsif (scan_vector(10) = ACT and rx_multicast_disable(10) = ACT) then
            rx_multicast_disable_on <= ACT ;
    elsif (scan_vector(11) = ACT and rx_multicast_disable(11) = ACT) then
            rx_multicast_disable_on <= ACT ;
    elsif (scan_vector(12) = ACT and rx_multicast_disable(12) = ACT) then
            rx_multicast_disable_on <= ACT ;
    elsif (scan_vector(13) = ACT and rx_multicast_disable(13) = ACT) then
            rx_multicast_disable_on <= ACT ;
    elsif (scan_vector(14) = ACT and rx_multicast_disable(14) = ACT) then
            rx_multicast_disable_on <= ACT ;
    elsif (scan_vector(15) = ACT and rx_multicast_disable(15) = ACT) then
            rx_multicast_disable_on <= ACT ;
    elsif (scan_vector(16) = ACT and rx_multicast_disable(16) = ACT) then
            rx_multicast_disable_on <= ACT ;
    elsif (scan_vector(17) = ACT and rx_multicast_disable(16) = ACT) then
            rx_multicast_disable_on <= ACT ;
    elsif (scan_vector(18) = ACT and rx_multicast_disable(17) = ACT) then
            rx_multicast_disable_on <= ACT ;
    elsif (scan_vector(19) = ACT and rx_multicast_disable(17) = ACT) then
            rx_multicast_disable_on <= ACT ;
    else
            rx_multicast_disable_on <= NOT_ACT ;
    end if;


-- ************************************************************************
-- port_blocking_on : Port blocking on is used to indicate that the port blocking bit
--                    for the port being scanned is set when ACTive.
--
-- ************************************************************************

    if (scan_vector(0) = ACT and port_blocking(0) = ACT) then
        port_blocking_on <= ACT ;
    elsif (scan_vector(1) = ACT and port_blocking(1) = ACT) then
            port_blocking_on <= ACT ;
    elsif (scan_vector(2) = ACT and port_blocking(2) = ACT) then
            port_blocking_on <= ACT ;
    elsif (scan_vector(3) = ACT and port_blocking(3) = ACT) then
            port_blocking_on <= ACT ;
    elsif (scan_vector(4) = ACT and port_blocking(4) = ACT) then

Aug 17 10:50 1994  Who: johnf  File: /c2/local_user/bma/bma_rbsm/bma_rbsm_lib/rbsm_config.vhd Page 16

            port_blocking_on <= ACT ;
    elsif (scan_vector(5) = ACT and port_blocking(5) = ACT) then
            port_blocking_on <= ACT ;
    elsif (scan_vector(6) = ACT and port_blocking(6) = ACT) then
            port_blocking_on <= ACT ;
    elsif (scan_vector(7) = ACT and port_blocking(7) = ACT) then
            port_blocking_on <= ACT ;
    elsif (scan_vector(8) = ACT and port_blocking(8) = ACT) then
            port_blocking_on <= ACT ;
    elsif (scan_vector(9) = ACT and port_blocking(9) = ACT) then
            port_blocking_on <= ACT ;
    elsif (scan_vector(10) = ACT and port_blocking(10) = ACT) then
            port_blocking_on <= ACT ;
    elsif (scan_vector(11) = ACT and port_blocking(11) = ACT) then
            port_blocking_on <= ACT ;
    elsif (scan_vector(12) = ACT and port_blocking(12) = ACT) then
            port_blocking_on <= ACT ;
    elsif (scan_vector(13) = ACT and port_blocking(13) = ACT) then
            port_blocking_on <= ACT ;
    elsif (scan_vector(14) = ACT and port_blocking(14) = ACT) then
            port_blocking_on <= ACT ;
    elsif (scan_vector(15) = ACT and port_blocking(15) = ACT) then
            port_blocking_on <= ACT ;
    elsif (scan_vector(16) = ACT and port_blocking(16) = ACT) then
            port_blocking_on <= ACT ;
    elsif (scan_vector(17) = ACT and port_blocking(16) = ACT) then
            port_blocking_on <= ACT ;
    elsif (scan_vector(18) = ACT and port_blocking(17) = ACT) then
            port_blocking_on <= ACT ;
    elsif (scan_vector(19) = ACT and port_blocking(17) = ACT) then
            port_blocking_on <= ACT ;
    else
            port_blocking_on <= NOT_ACT ;
    end if;


-- ************************************************************************
-- src_port_not_forwarding : Source port not forwarding on is used to indicate
--                           that the port not forwarding bit for the port being
--                           scanned is set when ACTive.
--
-- ************************************************************************

    if (scan_vector(0) = ACT and port_not_forwarding(0) = ACT) then
        src_port_not_forwarding <= ACT ;
    elsif (scan_vector(1) = ACT and port_not_forwarding(1) = ACT) then
            src_port_not_forwarding <= ACT ;
    elsif (scan_vector(2) = ACT and port_not_forwarding(2) = ACT) then
            src_port_not_forwarding <= ACT ;
    elsif (scan_vector(3) = ACT and port_not_forwarding(3) = ACT) then
            src_port_not_forwarding <= ACT ;
    elsif (scan_vector(4) = ACT and port_not_forwarding(4) = ACT) then
            src_port_not_forwarding <= ACT ;
    elsif (scan_vector(5) = ACT and port_not_forwarding(5) = ACT) then
            src_port_not_forwarding <= ACT ;
    elsif (scan_vector(6) = ACT and port_not_forwarding(6) = ACT) then
            src_port_not_forwarding <= ACT ;
    elsif (scan_vector(7) = ACT and port_not_forwarding(7) = ACT) then
```

Aug 17 10:50 1994 Who: johnf File /c2/local_user/bma/bma_rbsm/bma_rbsm_lib/rbsm_config.vhd Page 17

```
            src_port_not_forwarding <= ACT ;
    elsif (scan_vector(8) = ACT and port_not_forwarding(8) = ACT) then
            src_port_not_forwarding <= ACT ;
    elsif (scan_vector(9) = ACT and port_not_forwarding(9) = ACT) then
            src_port_not_forwarding <= ACT ;
    elsif (scan_vector(10) = ACT and port_not_forwarding(10) = ACT) then
            src_port_not_forwarding <= ACT ;
    elsif (scan_vector(11) = ACT and port_not_forwarding(11) = ACT) then
            src_port_not_forwarding <= ACT ;
    elsif (scan_vector(12) = ACT and port_not_forwarding(12) = ACT) then
            src_port_not_forwarding <= ACT ;
    elsif (scan_vector(13) = ACT and port_not_forwarding(13) = ACT) then
            src_port_not_forwarding <= ACT ;
    elsif (scan_vector(14) = ACT and port_not_forwarding(14) = ACT) then
            src_port_not_forwarding <= ACT ;
    elsif (scan_vector(15) = ACT and port_not_forwarding(15) = ACT) then
            src_port_not_forwarding <= ACT ;
    elsif (scan_vector(16) = ACT and port_not_forwarding(16) = ACT) then
            src_port_not_forwarding <= ACT ;
    elsif (scan_vector(17) = ACT and port_not_forwarding(18) = ACT) then
            src_port_not_forwarding <= ACT ;
    elsif (scan_vector(18) = ACT and port_not_forwarding(17) = ACT) then
            src_port_not_forwarding <= ACT ;
    elsif (scan_vector(18) = ACT and port_not_forwarding(17) = ACT) then
            src_port_not_forwarding <= ACT ;
    else
            src_port_not_forwarding <= NOT_ACT ;
    end if;


-- ************************************************************************
-- tx_disable_on : Transmit path disable on is used to indicate that the transmit
--                 path disable bit for the destination port is set when ACTive.
--
-- ************************************************************************

    if (transmit_port_num = PORT0  and tx_disable(0) = ACT) then
        tx_disable_on <= ACT ;
    elsif (transmit_port_num = PORT1 and tx_disable(1) = ACT) then
            tx_disable_on <= ACT ;
    elsif (transmit_port_num = PORT2 and tx_disable(2) = ACT) then
            tx_disable_on <= ACT ;
    elsif (transmit_port_num = PORT3 and tx_disable(3) = ACT) then
            tx_disable_on <= ACT ;
    elsif (transmit_port_num = PORT4 and tx_disable(4) = ACT) then
            tx_disable_on <= ACT ;
    elsif (transmit_port_num = PORT5 and tx_disable(5) = ACT) then
            tx_disable_on <= ACT ;
    elsif (transmit_port_num = PORT6 and tx_disable(6) = ACT) then
            tx_disable_on <= ACT ;
    elsif (transmit_port_num = PORT7 and tx_disable(7) = ACT) then
            tx_disable_on <= ACT ;
    elsif (transmit_port_num = PORT8 and tx_disable(8) = ACT) then
            tx_disable_on <= ACT ;
    elsif (transmit_port_num = PORT9 and tx_disable(9) = ACT) then
            tx_disable_on <= ACT ;
    elsif (transmit_port_num = PORT10 and tx_disable(10) = ACT) then
            tx_disable_on <= ACT ;
```

Aug 17 10:50 1994 Who: johnf File: /c2/local_user/bma/bma_rbsm/bma_rbsm_lib/rbsm_config.vhd Page 18

```
    elsif (transmit_port_num = PORT11 and tx_disable(11) = ACT) then
            tx_disable_on <= ACT ;
    elsif (transmit_port_num = PORT12 and tx_disable(12) = ACT) then
            tx_disable_on <= ACT ;
    elsif (transmit_port_num = PORT13 and tx_disable(13) = ACT) then
            tx_disable_on <= ACT ;
    elsif (transmit_port_num = PORT14 and tx_disable(14) = ACT) then
            tx_disable_on <= ACT ;
    elsif (transmit_port_num = PORT15 and tx_disable(15) = ACT) then
            tx_disable_on <= ACT ;
    elsif (transmit_port_num = PORT16 and tx_disable(16) = ACT) then
            tx_disable_on <= ACT ;
    elsif (transmit_port_num = PORT17 and tx_disable(17) = ACT) then
            tx_disable_on <= ACT ;
    else
            tx_disable_on <= NOT_ACT ;
    end if;


-- ************************************************************************
-- tx_filter_on : Transmit filter on is used to indicate that the transmit
--                filter bit for the destination port is set when ACTive.
--
-- ************************************************************************

    if (transmit_port_num = PORT0  and tx_filter(0) = ACT) then
        tx_filter_on <= ACT ;
    elsif (transmit_port_num = PORT1 and tx_filter(1) = ACT) then
            tx_filter_on <= ACT ;
    elsif (transmit_port_num = PORT2 and tx_filter(2) = ACT) then
            tx_filter_on <= ACT ;
    elsif (transmit_port_num = PORT3 and tx_filter(3) = ACT) then
            tx_filter_on <= ACT ;
    elsif (transmit_port_num = PORT4 and tx_filter(4) = ACT) then
            tx_filter_on <= ACT ;
    elsif (transmit_port_num = PORT5 and tx_filter(5) = ACT) then
            tx_filter_on <= ACT ;
    elsif (transmit_port_num = PORT6 and tx_filter(6) = ACT) then
            tx_filter_on <= ACT ;
    elsif (transmit_port_num = PORT7 and tx_filter(7) = ACT) then
            tx_filter_on <= ACT ;
    elsif (transmit_port_num = PORT8 and tx_filter(8) = ACT) then
            tx_filter_on <= ACT ;
    elsif (transmit_port_num = PORT9 and tx_filter(9) = ACT) then
            tx_filter_on <= ACT ;
    elsif (transmit_port_num = PORT10 and tx_filter(10) = ACT) then
            tx_filter_on <= ACT ;
    elsif (transmit_port_num = PORT11 and tx_filter(11) = ACT) then
            tx_filter_on <= ACT ;
    elsif (transmit_port_num = PORT12 and tx_filter(12) = ACT) then
            tx_filter_on <= ACT ;
    elsif (transmit_port_num = PORT13 and tx_filter(13) = ACT) then
            tx_filter_on <= ACT ;
    elsif (transmit_port_num = PORT14 and tx_filter(14) = ACT) then
            tx_filter_on <= ACT ;
    elsif (transmit_port_num = PORT15 and tx_filter(15) = ACT) then
            tx_filter_on <= ACT ;
    elsif (transmit_port_num = PORT16 and tx_filter(16) = ACT) then
```

Aug 17 10:50 1994 Who: johnf File: /c2/local_user/bma/bma_rbsm/bma_rbsm_lib/rbsm_config.vhd Page 19

```
            tx_filter_on <= ACT ;
    elsif (transmit_port_num = PORT17 and tx_filter(17) = ACT) then
            tx_filter_on <= ACT ;
    else
            tx_filter_on <= NOT_ACT ;
    end if;


-- ===========================================================================
-- tx_multicast_filter_on : Transmit multicast filter on is used to indicate that the
--                          transmit multicast filter bit for the destination port is
--                          set when ACTive.
--
-- ===========================================================================

    if (transmit_port_num = PORT0  and tx_multicast_filter(0) = ACT) then
        tx_multicast_filter_on <= ACT ;
    elsif (transmit_port_num = PORT1 and tx_multicast_filter(1) = ACT) then
            tx_multicast_filter_on <= ACT ;
    elsif (transmit_port_num = PORT2 and tx_multicast_filter(2) = ACT) then
            tx_multicast_filter_on <= ACT ;
    elsif (transmit_port_num = PORT3 and tx_multicast_filter(3) = ACT) then
            tx_multicast_filter_on <= ACT ;
    elsif (transmit_port_num = PORT4 and tx_multicast_filter(4) = ACT) then
            tx_multicast_filter_on <= ACT ;
    elsif (transmit_port_num = PORT5 and tx_multicast_filter(5) = ACT) then
            tx_multicast_filter_on <= ACT ;
    elsif (transmit_port_num = PORT6 and tx_multicast_filter(6) = ACT) then
            tx_multicast_filter_on <= ACT ;
    elsif (transmit_port_num = PORT7 and tx_multicast_filter(7) = ACT) then
            tx_multicast_filter_on <= ACT ;
    elsif (transmit_port_num = PORT8 and tx_multicast_filter(8) = ACT) then
            tx_multicast_filter_on <= ACT ;
    elsif (transmit_port_num = PORT9 and tx_multicast_filter(9) = ACT) then
            tx_multicast_filter_on <= ACT ;
    elsif (transmit_port_num = PORT10 and tx_multicast_filter(10) = ACT) then
            tx_multicast_filter_on <= ACT ;
    elsif (transmit_port_num = PORT11 and tx_multicast_filter(11) = ACT) then
            tx_multicast_filter_on <= ACT ;
    elsif (transmit_port_num = PORT12 and tx_multicast_filter(12) = ACT) then
            tx_multicast_filter_on <= ACT ;
    elsif (transmit_port_num = PORT13 and tx_multicast_filter(13) = ACT) then
            tx_multicast_filter_on <= ACT ;
    elsif (transmit_port_num = PORT14 and tx_multicast_filter(14) = ACT) then
            tx_multicast_filter_on <= ACT ;
    elsif (transmit_port_num = PORT15 and tx_multicast_filter(15) = ACT) then
            tx_multicast_filter_on <= ACT ;
    elsif (transmit_port_num = PORT16 and tx_multicast_filter(16) = ACT) then
            tx_multicast_filter_on <= ACT ;
    elsif (transmit_port_num = PORT17 and tx_multicast_filter(17) = ACT) then
            tx_multicast_filter_on <= ACT ;
    else
            tx_multicast_filter_on <= NOT_ACT ;
    end if;
```

Aug 17 10:50 1994 Who: johnf File: /c2/local_user/bma/bma_rbsm/bma_rbsm_lib/rbsm_config.vhd Page 20

```
-- ===========================================================================
-- tx_monitor_on : Transmit monitor on is used to indicate that the
--                 monitor bit for the destination port is set when ACTive.
--
-- ===========================================================================

    if (transmit_port_num = PORT0  and monitor_enable(0) = ACT) then
        tx_monitor_on <= ACT ;
    elsif (transmit_port_num = PORT1 and monitor_enable(1) = ACT) then
            tx_monitor_on <= ACT ;
    elsif (transmit_port_num = PORT2 and monitor_enable(2) = ACT) then
            tx_monitor_on <= ACT ;
    elsif (transmit_port_num = PORT3 and monitor_enable(3) = ACT) then
            tx_monitor_on <= ACT ;
    elsif (transmit_port_num = PORT4 and monitor_enable(4) = ACT) then
            tx_monitor_on <= ACT ;
    elsif (transmit_port_num = PORT5 and monitor_enable(5) = ACT) then
            tx_monitor_on <= ACT ;
    elsif (transmit_port_num = PORT6 and monitor_enable(6) = ACT) then
            tx_monitor_on <= ACT ;
    elsif (transmit_port_num = PORT7 and monitor_enable(7) = ACT) then
            tx_monitor_on <= ACT ;
    elsif (transmit_port_num = PORT8 and monitor_enable(8) = ACT) then
            tx_monitor_on <= ACT ;
    elsif (transmit_port_num = PORT9 and monitor_enable(9) = ACT) then
            tx_monitor_on <= ACT ;
    elsif (transmit_port_num = PORT10 and monitor_enable(10) = ACT) then
            tx_monitor_on <= ACT ;
    elsif (transmit_port_num = PORT11 and monitor_enable(11) = ACT) then
            tx_monitor_on <= ACT ;
    elsif (transmit_port_num = PORT12 and monitor_enable(12) = ACT) then
            tx_monitor_on <= ACT ;
    elsif (transmit_port_num = PORT13 and monitor_enable(13) = ACT) then
            tx_monitor_on <= ACT ;
    elsif (transmit_port_num = PORT14 and monitor_enable(14) = ACT) then
            tx_monitor_on <= ACT ;
    elsif (transmit_port_num = PORT15 and monitor_enable(15) = ACT) then
            tx_monitor_on <= ACT ;
    elsif (transmit_port_num = PORT16 and monitor_enable(16) = ACT) then
            tx_monitor_on <= ACT ;
    elsif (transmit_port_num = PORT17 and monitor_enable(17) = ACT) then
            tx_monitor_on <= ACT ;
    else
            tx_monitor_on <= NOT_ACT ;
    end if;

-- ===========================================================================
-- dest_port_blocking : Destination port blocking is used to indicate
--                      that the blocking bit for the destination port
--                      bit is set when ACTive.
--
-- ===========================================================================

    if (transmit_port_num = PORT0  and port_blocking(0) = ACT) then
        dest_port_blocking <= ACT ;
    elsif (transmit_port_num = PORT1 and port_blocking(1) = ACT) then
```

```
Aug 17 10:50 1994  Who  johnf  File  /c2/local_user/bma/bma_rbsm/bma_rbsm_lib/rbsm_config.vhd Page 21

            dest_port_blocking <= ACT
      elsif (transmit_port_num = PORT2 and port_blocking(2) = ACT) then
            dest_port_blocking <= ACT
      elsif (transmit_port_num = PORT3 and port_blocking(3) = ACT) then
            dest_port_blocking <= ACT ;
      elsif (transmit_port_num = PORT4 and port_blocking(4) = ACT) then
            dest_port_blocking <= ACT ;
      elsif (transmit_port_num = PORT5 and port_blocking(5) = ACT) then
            dest_port_blocking <= ACT ;
      elsif (transmit_port_num = PORT6 and port_blocking(6) = ACT) then
            dest_port_blocking <= ACT ;
      elsif (transmit_port_num = PORT7 and port_blocking(7) = ACT) then
            dest_port_blocking <= ACT ;
      elsif (transmit_port_num = PORT8 and port_blocking(8) = ACT) then
            dest_port_blocking <= ACT ;
      elsif (transmit_port_num = PORT9 and port_blocking(9) = ACT) then
            dest_port_blocking <= ACT ;
      elsif (transmit_port_num = PORT10 and port_blocking(10) = ACT) then
            dest_port_blocking <= ACT ;
      elsif (transmit_port_num = PORT11 and port_blocking(11) = ACT) then
            dest_port_blocking <= ACT ;
      elsif (transmit_port_num = PORT12 and port_blocking(12) = ACT) then
            dest_port_blocking <= ACT ;
      elsif (transmit_port_num = PORT13 and port_blocking(13) = ACT) then
            dest_port_blocking <= ACT
      elsif (transmit_port_num = PORT14 and port_blocking(14) = ACT) then
            dest_port_blocking <= ACT
      elsif (transmit_port_num = PORT15 and port_blocking(15) = ACT) then
            dest_port_blocking <= ACT ;
      elsif (transmit_port_num = PORT16 and port_blocking(16) = ACT) then
            dest_port_blocking <= ACT ;
      elsif (transmit_port_num = PORT17 and port_blocking(17) = ACT) then
            dest_port_blocking <= ACT ;
      else
            dest_port_blocking <= NOT_ACT ;
      end if;


-- ==========================================================================
-- dest_port_not_forwarding : Destination port not forwarding on is used to indicate
--                            that the not forwarding bit for the destination port
--                            bit is set when ACTive.
--
-- ==========================================================================

      if (transmit_port_num = PORT0  and port_not_forwarding(0) = ACT) then
          dest_port_not_forwarding <= ACT ;
      elsif (transmit_port_num = PORT1 and port_not_forwarding(1) = ACT) then
            dest_port_not_forwarding <= ACT ;
      elsif (transmit_port_num = PORT2 and port_not_forwarding(2) = ACT) then
            dest_port_not_forwarding <= ACT ;
      elsif (transmit_port_num = PORT3 and port_not_forwarding(3) = ACT) then
            dest_port_not_forwarding <= ACT ;
      elsif (transmit_port_num = PORT4 and port_not_forwarding(4) = ACT) then
            dest_port_not_forwarding <= ACT ;
      elsif (transmit_port_num = PORT5 and port_not_forwarding(5) = ACT) then
            dest_port_not_forwarding <= ACT ;
      elsif (transmit_port_num = PORT6 and port_not_forwarding(6) = ACT) then

Aug 17 10:50 1994  Who: johnf  File. /c2/local_user/bma/bma_rbsm/bma_rbsm_lib/rbsm_config.vhd Page 22

            dest_port_not_forwarding <= ACT ;
      elsif (transmit_port_num = PORT7 and port_not_forwarding(7) = ACT) then
            dest_port_not_forwarding <= ACT ;
      elsif (transmit_port_num = PORT8 and port_not_forwarding(8) = ACT) then
            dest_port_not_forwarding <= ACT ;
      elsif (transmit_port_num = PORT9 and port_not_forwarding(9) = ACT) then
            dest_port_not_forwarding <= ACT ;
      elsif (transmit_port_num = PORT10 and port_not_forwarding(10) = ACT) then
            dest_port_not_forwarding <= ACT ;
      elsif (transmit_port_num = PORT11 and port_not_forwarding(11) = ACT) then
            dest_port_not_forwarding <= ACT ;
      elsif (transmit_port_num = PORT12 and port_not_forwarding(12) = ACT) then
            dest_port_not_forwarding <= ACT ;
      elsif (transmit_port_num = PORT13 and port_not_forwarding(13) = ACT) then
            dest_port_not_forwarding <= ACT ;
      elsif (transmit_port_num = PORT14 and port_not_forwarding(14) = ACT) then
            dest_port_not_forwarding <= ACT ;
      elsif (transmit_port_num = PORT15 and port_not_forwarding(15) = ACT) then
            dest_port_not_forwarding <= ACT ;
      elsif (transmit_port_num = PORT16 and port_not_forwarding(16) = ACT) then
            dest_port_not_forwarding <= ACT ;
      elsif (transmit_port_num = PORT17 and port_not_forwarding(17) = ACT) then
            dest_port_not_forwarding <= ACT ;
      else
            dest_port_not_forwarding <= NOT_ACT ;
      end if;

-- ==========================================================================
-- any_multicast_cut_thru_disabled : Any multicast cut thru disable is used to indicate
--                                   that any one of the sixteen Ethernet cut thru enable
--                                   bits is reset.
-- ==========================================================================

      if (ct_multicast_enable(0) = NOT_ACT                  or
           ct_multicast_enable(1) = NOT_ACT                 or
            ct_multicast_enable(2) = NOT_ACT                or
             ct_multicast_enable(3) = NOT_ACT               or
              ct_multicast_enable(4) = NOT_ACT              or
               ct_multicast_enable(5) = NOT_ACT             or
                ct_multicast_enable(6) = NOT_ACT            or
                 ct_multicast_enable(7) = NOT_ACT           or
                  ct_multicast_enable(8) = NOT_ACT          or
                   ct_multicast_enable(9) = NOT_ACT         or
                    ct_multicast_enable(10) = NOT_ACT       or
                     ct_multicast_enable(11) = NOT_ACT      or
                      ct_multicast_enable(12) = NOT_ACT     or
                       ct_multicast_enable(13) = NOT_ACT    or
                        ct_multicast_enable(14) = NOT_ACT   or
                         ct_multicast_enable(15) = NOT_ACT) then

          any_multicast_cut_thru_disabled <= ACT;

      else

          any_multicast_cut_thru_disabled <= NOT_ACT;

      end if;
```

Aug 17 10:50 1994 Who: johnf File: /c2/local_user/bma/bma_rbsm/bma_rbsm_lib/rbsm_config.vhd Page 23

```
-- ***************************************************************************
-- invalid_dest_port : Invalid_dest_port is used to indicate that the destination
--                     port number is set to an invalid port number when there was
--                     a destination address match but not a destination group address
--                     match.
--
-- ***************************************************************************

   if (dest_address_match = ACT                        and
       dest_group_address = NOT_ACT                    and
       dest_internal = NOT_ACT                         and
      (transmit_port_num(4) = ACT                      and
      (transmit_port_num(1) = ACT                      or
       transmit_port_num(2) = ACT                      or
       transmit_port_num(3) = ACT))) then

       invalid_dest_port <= ACT;

   else

       invalid_dest_port <= NOT_ACT;

   end if;


-- ***************************************************************************
-- any_enet_dest_tx_filter : Any Ethernet destination transmit filter is used to indicate
--                           that any one of the fifteen transmit filters is set
--
-- ***************************************************************************

   if (scan_vector(0) = NOT_ACT and tx_filter(0) = ACT) then
       any_enet_dest_tx_filter <= ACT ;
   elsif (scan_vector(1) = NOT_ACT and tx_filter(1) = ACT) then
       any_enet_dest_tx_filter <= ACT ;
   elsif (scan_vector(2) = NOT_ACT and tx_filter(2) = ACT) then
       any_enet_dest_tx_filter <= ACT ;
   elsif (scan_vector(3) = NOT_ACT and tx_filter(3) = ACT) then
       any_enet_dest_tx_filter <= ACT ;
   elsif (scan_vector(4) = NOT_ACT and tx_filter(4) = ACT) then
       any_enet_dest_tx_filter <= ACT ;
   elsif (scan_vector(5) = NOT_ACT and tx_filter(5) = ACT) then
       any_enet_dest_tx_filter <= ACT ;
   elsif (scan_vector(6) = NOT_ACT and tx_filter(6) = ACT) then
       any_enet_dest_tx_filter <= ACT ;
   elsif (scan_vector(7) = NOT_ACT and tx_filter(7) = ACT) then
       any_enet_dest_tx_filter <= ACT ;
   elsif (scan_vector(8) = NOT_ACT and tx_filter(8) = ACT) then
       any_enet_dest_tx_filter <= ACT ;
   elsif (scan_vector(9) = NOT_ACT and tx_filter(9) = ACT) then
       any_enet_dest_tx_filter <= ACT ;
   elsif (scan_vector(10) = NOT_ACT and tx_filter(10) = ACT) then
       any_enet_dest_tx_filter <= ACT ;
```

Aug 17 10:50 1994 Who: johnf File: /c2/local_user/bma/bma_rbsm/bma_rbsm_lib/rbsm_config.vhd Page 24

```
   elsif (scan_vector(11) = NOT_ACT and tx_filter(11) = ACT) then
       any_enet_dest_tx_filter <= ACT ;
   elsif (scan_vector(12) = NOT_ACT and tx_filter(12) = ACT) then
       any_enet_dest_tx_filter <= ACT ;
   elsif (scan_vector(13) = NOT_ACT and tx_filter(13) = ACT) then
       any_enet_dest_tx_filter <= ACT ;
   elsif (scan_vector(14) = NOT_ACT and tx_filter(14) = ACT) then
       any_enet_dest_tx_filter <= ACT ;
   elsif (scan_vector(15) = NOT_ACT and tx_filter(15) = ACT) then
       any_enet_dest_tx_filter <= ACT ;

   else
       any_enet_dest_tx_filter <= NOT_ACT ;
   end if;


-- ***************************************************************************
-- any_enet_dest_tx_multicast_filter : Any Ethernet destination multicast transmit filter
--                                     is used to indicate that any one of the fifteen
--                                     transmit multicast filters is set.
-- ***************************************************************************

   if (scan_vector(0) = NOT_ACT and tx_multicast_filter(0) = ACT) then
       any_enet_dest_tx_multicast_filter <= ACT ;
   elsif (scan_vector(1) = NOT_ACT and tx_multicast_filter(1) = ACT) then
       any_enet_dest_tx_multicast_filter <= ACT ;
   elsif (scan_vector(2) = NOT_ACT and tx_multicast_filter(2) = ACT) then
       any_enet_dest_tx_multicast_filter <= ACT ;
   elsif (scan_vector(3) = NOT_ACT and tx_multicast_filter(3) = ACT) then
       any_enet_dest_tx_multicast_filter <= ACT ;
   elsif (scan_vector(4) = NOT_ACT and tx_multicast_filter(4) = ACT) then
       any_enet_dest_tx_multicast_filter <= ACT ;
   elsif (scan_vector(5) = NOT_ACT and tx_multicast_filter(5) = ACT) then
       any_enet_dest_tx_multicast_filter <= ACT ;
   elsif (scan_vector(6) = NOT_ACT and tx_multicast_filter(6) = ACT) then
       any_enet_dest_tx_multicast_filter <= ACT ;
   elsif (scan_vector(7) = NOT_ACT and tx_multicast_filter(7) = ACT) then
       any_enet_dest_tx_multicast_filter <= ACT ;
   elsif (scan_vector(8) = NOT_ACT and tx_multicast_filter(8) = ACT) then
       any_enet_dest_tx_multicast_filter <= ACT ;
   elsif (scan_vector(9) = NOT_ACT and tx_multicast_filter(9) = ACT) then
       any_enet_dest_tx_multicast_filter <= ACT ;
   elsif (scan_vector(10) = NOT_ACT and tx_multicast_filter(10) = ACT) then
       any_enet_dest_tx_multicast_filter <= ACT ;
   elsif (scan_vector(11) = NOT_ACT and tx_multicast_filter(11) = ACT) then
       any_enet_dest_tx_multicast_filter <= ACT ;
   elsif (scan_vector(12) = NOT_ACT and tx_multicast_filter(12) = ACT) then
       any_enet_dest_tx_multicast_filter <= ACT ;
   elsif (scan_vector(13) = NOT_ACT and tx_multicast_filter(13) = ACT) then
       any_enet_dest_tx_multicast_filter <= ACT ;
   elsif (scan_vector(14) = NOT_ACT and tx_multicast_filter(14) = ACT) then
       any_enet_dest_tx_multicast_filter <= ACT ;
   elsif (scan_vector(15) = NOT_ACT and tx_multicast_filter(15) = ACT) then
       any_enet_dest_tx_multicast_filter <= ACT ;

   else
       any_enet_dest_tx_multicast_filter <= NOT_ACT ;
```

```
    end if

-- ****************************************************************************
-- any_dest_tx_filter : Any destination transmit filter is used to indicate that any
--                      one of the possible 17 destination ports has its transmit
--                      filter bit set or turned on.
--
-- ****************************************************************************

    if (scan_vector(0) = NOT_ACT and tx_filter(0) = ACT) then
        any_dest_tx_filter <= ACT ;
    elsif (scan_vector(1) = NOT_ACT and tx_filter(1) = ACT) then
        any_dest_tx_filter <= ACT ;
    elsif (scan_vector(2) = NOT_ACT and tx_filter(2) = ACT) then
        any_dest_tx_filter <= ACT ;
    elsif (scan_vector(3) = NOT_ACT and tx_filter(3) = ACT) then
        any_dest_tx_filter <= ACT ;
    elsif (scan_vector(4) = NOT_ACT and tx_filter(4) = ACT) then
        any_dest_tx_filter <= ACT ;
    elsif (scan_vector(5) = NOT_ACT and tx_filter(5) = ACT) then
        any_dest_tx_filter <= ACT ;
    elsif (scan_vector(6) = NOT_ACT and tx_filter(6) = ACT) then
        any_dest_tx_filter <= ACT ;
    elsif (scan_vector(7) = NOT_ACT and tx_filter(7) = ACT) then
        any_dest_tx_filter <= ACT ;
    elsif (scan_vector(8) = NOT_ACT and tx_filter(8) = ACT) then
        any_dest_tx_filter <= ACT ;
    elsif (scan_vector(9) = NOT_ACT and tx_filter(9) = ACT) then
        any_dest_tx_filter <= ACT ;
    elsif (scan_vector(10) = NOT_ACT and tx_filter(10) = ACT) then
        any_dest_tx_filter <= ACT ;
    elsif (scan_vector(11) = NOT_ACT and tx_filter(11) = ACT) then
        any_dest_tx_filter <= ACT ;
    elsif (scan_vector(12) = NOT_ACT and tx_filter(12) = ACT) then
        any_dest_tx_filter <= ACT ;
    elsif (scan_vector(13) = NOT_ACT and tx_filter(13) = ACT) then
        any_dest_tx_filter <= ACT ;
    elsif (scan_vector(14) = NOT_ACT and tx_filter(14) = ACT) then
        any_dest_tx_filter <= ACT ;
    elsif (scan_vector(15) = NOT_ACT and tx_filter(15) = ACT) then
        any_dest_tx_filter <= ACT ;
    elsif (scan_vector(16) = NOT_ACT and scan_vector(17) = NOT_ACT and
           tx_filter(16) = ACT) then
        any_dest_tx_filter <= ACT ;
    elsif (scan_vector(18) = NOT_ACT and scan_vector(19) = NOT_ACT and
           tx_filter(17) = ACT) then
        any_dest_tx_filter <= ACT ;
    else
        any_dest_tx_filter <= NOT_ACT ;
    end if;

-- ****************************************************************************
-- any_dest_tx_multicast_filter : Any destination transmit multicast filter is used
--                                to indicate that any one of the possible 17 destination
--                                ports has its transmit multicast filter bit set or
```

```
--                                turned on.
--
-- ****************************************************************************

    if (scan_vector(0) = NOT_ACT and tx_multicast_filter(0) = ACT) then
        any_dest_tx_multicast_filter <= ACT ;
    elsif (scan_vector(1) = NOT_ACT and tx_multicast_filter(1) = ACT) then
        any_dest_tx_multicast_filter <= ACT ;
    elsif (scan_vector(2) = NOT_ACT and tx_multicast_filter(2) = ACT) then
        any_dest_tx_multicast_filter <= ACT ;
    elsif (scan_vector(3) = NOT_ACT and tx_multicast_filter(3) = ACT) then
        any_dest_tx_multicast_filter <= ACT ;
    elsif (scan_vector(4) = NOT_ACT and tx_multicast_filter(4) = ACT) then
        any_dest_tx_multicast_filter <= ACT ;
    elsif (scan_vector(5) = NOT_ACT and tx_multicast_filter(5) = ACT) then
        any_dest_tx_multicast_filter <= ACT ;
    elsif (scan_vector(6) = NOT_ACT and tx_multicast_filter(6) = ACT) then
        any_dest_tx_multicast_filter <= ACT ;
    elsif (scan_vector(7) = NOT_ACT and tx_multicast_filter(7) = ACT) then
        any_dest_tx_multicast_filter <= ACT ;
    elsif (scan_vector(8) = NOT_ACT and tx_multicast_filter(8) = ACT) then
        any_dest_tx_multicast_filter <= ACT ;
    elsif (scan_vector(9) = NOT_ACT and tx_multicast_filter(9) = ACT) then
        any_dest_tx_multicast_filter <= ACT ;
    elsif (scan_vector(10) = NOT_ACT and tx_multicast_filter(10) = ACT) then
        any_dest_tx_multicast_filter <= ACT ;
    elsif (scan_vector(11) = NOT_ACT and tx_multicast_filter(11) = ACT) then
        any_dest_tx_multicast_filter <= ACT ;
    elsif (scan_vector(12) = NOT_ACT and tx_multicast_filter(12) = ACT) then
        any_dest_tx_multicast_filter <= ACT ;
    elsif (scan_vector(13) = NOT_ACT and tx_multicast_filter(13) = ACT) then
        any_dest_tx_multicast_filter <= ACT ;
    elsif (scan_vector(14) = NOT_ACT and tx_multicast_filter(14) = ACT) then
        any_dest_tx_multicast_filter <= ACT ;
    elsif (scan_vector(15) = NOT_ACT and tx_multicast_filter(15) = ACT) then
        any_dest_tx_multicast_filter <= ACT ;
    elsif (scan_vector(16) = NOT_ACT and scan_vector(17) = NOT_ACT and
           tx_multicast_filter(16) = ACT) then
        any_dest_tx_multicast_filter <= ACT ;
    elsif (scan_vector(18) = NOT_ACT and scan_vector(19) = NOT_ACT and
           tx_multicast_filter(17) = ACT) then
        any_dest_tx_multicast_filter <= ACT ;
    else
        any_dest_tx_multicast_filter <= NOT_ACT ;
    end if;

-- ****************************************************************************
-- any_dest_tx_disabled : Any destination transmit path disable is used to indicate that
--                        any one of the possible 17 destination ports has its transmit
--                        path disable bit set or turned on.
--
-- ****************************************************************************

    if (scan_vector(0) = NOT_ACT and tx_disable(0) = ACT) then
        any_dest_tx_disabled <= ACT ;
    elsif (scan_vector(1) = NOT_ACT and tx_disable(1) = ACT) then
```

Aug 17 10:50 1994 Who: johnf File: /c2/local_user/bma/bma_rbsm/bma_rbsm_lib/rbsm_config.vhd Page 27

```
        any_dest_tx_disabled <= ACT ;
    elsif (scan_vector(2) = NOT_ACT and tx_disable(2) = ACT) then
        any_dest_tx_disabled <= ACT ;
    elsif (scan_vector(3) = NOT_ACT and tx_disable(3) = ACT) then
        any_dest_tx_disabled <= ACT ;
    elsif (scan_vector(4) = NOT_ACT and tx_disable(4) = ACT) then
        any_dest_tx_disabled <= ACT ;
    elsif (scan_vector(5) = NOT_ACT and tx_disable(5) = ACT) then
        any_dest_tx_disabled <= ACT ;
    elsif (scan_vector(6) = NOT_ACT and tx_disable(6) = ACT) then
        any_dest_tx_disabled <= ACT ;
    elsif (scan_vector(7) = NOT_ACT and tx_disable(7) = ACT) then
        any_dest_tx_disabled <= ACT ;
    elsif (scan_vector(8) = NOT_ACT and tx_disable(8) = ACT) then
        any_dest_tx_disabled <= ACT ;
    elsif (scan_vector(9) = NOT_ACT and tx_disable(9) = ACT) then
        any_dest_tx_disabled <= ACT ;
    elsif (scan_vector(10) = NOT_ACT and tx_disable(10) = ACT) then
        any_dest_tx_disabled <= ACT ;
    elsif (scan_vector(11) = NOT_ACT and tx_disable(11) = ACT) then
        any_dest_tx_disabled <= ACT ;
    elsif (scan_vector(12) = NOT_ACT and tx_disable(12) = ACT) then
        any_dest_tx_disabled <= ACT ;
    elsif (scan_vector(13) = NOT_ACT and tx_disable(13) = ACT) then
        any_dest_tx_disabled <= ACT ;
    elsif (scan_vector(14) = NOT_ACT and tx_disable(14) = ACT) then
        any_dest_tx_disabled <= ACT ;
    elsif (scan_vector(15) = NOT_ACT and tx_disable(15) = ACT) then
        any_dest_tx_disabled <= ACT ;
    elsif (scan_vector(16) = NOT_ACT and scan_vector(17) = NOT_ACT and
           tx_disable(16) = ACT) then
        any_dest_tx_disabled <= ACT ;
    elsif (scan_vector(18) = NOT_ACT and scan_vector(19) = NOT_ACT and
           tx_disable(17) = ACT) then
        any_dest_tx_disabled <= ACT ;
    else
        any_dest_tx_disabled <= NOT_ACT ;
    end if;

-- ****************************************************************************
-- any_dest_tx_multicast_disabled : Any destination transmit multicast path disable is used
--                                  to indicate that any one of the possible 17 destination
--                                  ports has its transmit multicast path disable bit set or
--                                  turned on
--
-- ****************************************************************************

    if (scan_vector(0) = NOT_ACT and tx_multicast_disable(0) = ACT) then
        any_dest_tx_multicast_disabled <= ACT ;
    elsif (scan_vector(1) = NOT_ACT and tx_multicast_disable(1) = ACT) then
        any_dest_tx_multicast_disabled <= ACT ;
    elsif (scan_vector(2) = NOT_ACT and tx_multicast_disable(2) = ACT) then
        any_dest_tx_multicast_disabled <= ACT ;
    elsif (scan_vector(3) = NOT_ACT and tx_multicast_disable(3) = ACT) then
        any_dest_tx_multicast_disabled <= ACT ;
    elsif (scan_vector(4) = NOT_ACT and tx_multicast_disable(4) = ACT) then
        any_dest_tx_multicast_disabled <= ACT ;
    elsif (scan_vector(5) = NOT_ACT and tx_multicast_disable(5) = ACT) then
```

Aug 17 10:50 1994 Who: johnf File: /c2/local_user/bma/bma_rbsm/bma_rbsm_lib/rbsm_config.vhd Page 28

```
        any_dest_tx_multicast_disabled <= ACT ;
    elsif (scan_vector(6) = NOT_ACT and tx_multicast_disable(6) = ACT) then
        any_dest_tx_multicast_disabled <= ACT ;
    elsif (scan_vector(7) = NOT_ACT and tx_multicast_disable(7) = ACT) then
        any_dest_tx_multicast_disabled <= ACT ;
    elsif (scan_vector(8) = NOT_ACT and tx_multicast_disable(8) = ACT) then
        any_dest_tx_multicast_disabled <= ACT ;
    elsif (scan_vector(9) = NOT_ACT and tx_multicast_disable(9) = ACT) then
        any_dest_tx_multicast_disabled <= ACT ;
    elsif (scan_vector(10) = NOT_ACT and tx_multicast_disable(10) = ACT) then
        any_dest_tx_multicast_disabled <= ACT ;
    elsif (scan_vector(11) = NOT_ACT and tx_multicast_disable(11) = ACT) then
        any_dest_tx_multicast_disabled <= ACT ;
    elsif (scan_vector(12) = NOT_ACT and tx_multicast_disable(12) = ACT) then
        any_dest_tx_multicast_disabled <= ACT ;
    elsif (scan_vector(13) = NOT_ACT and tx_multicast_disable(13) = ACT) then
        any_dest_tx_multicast_disabled <= ACT ;
    elsif (scan_vector(14) = NOT_ACT and tx_multicast_disable(14) = ACT) then
        any_dest_tx_multicast_disabled <= ACT ;
    elsif (scan_vector(15) = NOT_ACT and tx_multicast_disable(15) = ACT) then
        any_dest_tx_multicast_disabled <= ACT ;
    elsif (scan_vector(16) = NOT_ACT and scan_vector(17) = NOT_ACT and
           tx_multicast_disable(16) = ACT) then
        any_dest_tx_multicast_disabled <= ACT ;
    elsif (scan_vector(18) = NOT_ACT and scan_vector(19) = NOT_ACT and
           tx_multicast_disable(17) = ACT) then
        any_dest_tx_multicast_disabled <= ACT ;
    else
        any_dest_tx_multicast_disabled <= NOT_ACT ;
    end if;

-- ****************************************************************************
-- any_dest_port_not_forwarding : Any destination port not forwarding is used to indicate
--                                that any one of the possible 17 destination ports has
--                                its port not forwarding bit set or turned on.
--
-- ****************************************************************************

    if (scan_vector(0) = NOT_ACT and port_not_forwarding(0) = ACT) then
        any_dest_port_not_forwarding <= ACT ;
    elsif (scan_vector(1) = NOT_ACT and port_not_forwarding(1) = ACT) then
        any_dest_port_not_forwarding <= ACT ;
    elsif (scan_vector(2) = NOT_ACT and port_not_forwarding(2) = ACT) then
        any_dest_port_not_forwarding <= ACT ;
    elsif (scan_vector(3) = NOT_ACT and port_not_forwarding(3) = ACT) then
        any_dest_port_not_forwarding <= ACT ;
    elsif (scan_vector(4) = NOT_ACT and port_not_forwarding(4) = ACT) then
        any_dest_port_not_forwarding <= ACT ;
    elsif (scan_vector(5) = NOT_ACT and port_not_forwarding(5) = ACT) then
        any_dest_port_not_forwarding <= ACT ;
    elsif (scan_vector(6) = NOT_ACT and port_not_forwarding(6) = ACT) then
        any_dest_port_not_forwarding <= ACT ;
    elsif (scan_vector(7) = NOT_ACT and port_not_forwarding(7) = ACT) then
        any_dest_port_not_forwarding <= ACT ;
    elsif (scan_vector(8) = NOT_ACT and port_not_forwarding(8) = ACT) then
        any_dest_port_not_forwarding <= ACT ;
```

Aug 17 10:50 1994 Who: johnf File: /c2/local_user/bma/bma_rbsm/bma_rbsm_lib/rbsm_config.vhd Page 29

```
    elsif (scan_vector(9) = NOT_ACT and port_not_forwarding(9) = ACT) then
        any_dest_port_not_forwarding <= ACT ;
    elsif (scan_vector(10) = NOT_ACT and port_not_forwarding(10) = ACT) then
        any_dest_port_not_forwarding <= ACT ;
    elsif (scan_vector(11) = NOT_ACT and port_not_forwarding(11) = ACT) then
        any_dest_port_not_forwarding <= ACT ;
    elsif (scan_vector(12) = NOT_ACT and port_not_forwarding(12) = ACT) then
        any_dest_port_not_forwarding <= ACT ;
    elsif (scan_vector(13) = NOT_ACT and port_not_forwarding(13) = ACT) then
        any_dest_port_not_forwarding <= ACT ;
    elsif (scan_vector(14) = NOT_ACT and port_not_forwarding(14) = ACT) then
        any_dest_port_not_forwarding <= ACT ;
    elsif (scan_vector(15) = NOT_ACT and port_not_forwarding(15) = ACT) then
        any_dest_port_not_forwarding <= ACT ;
    elsif (scan_vector(16) = NOT_ACT and scan_vector(17) = NOT_ACT and
            port_not_forwarding(16) = ACT) then
        any_dest_port_not_forwarding <= ACT ;
    elsif (scan_vector(18) = NOT_ACT and scan_vector(19) = NOT_ACT and
            port_not_forwarding(17) = ACT) then
        any_dest_port_not_forwarding <= ACT ;
    else
        any_dest_port_not_forwarding <= NOT_ACT ;
    end if;

-- ==========================================================================
-- any_dest_port_blocking : Any destination port blocking is used to indicate that any
--                          one of the possible 17 destination ports has its port
--                          blocking bit set or turned on.
--
-- ==========================================================================

    if (scan_vector(0) = NOT_ACT and port_blocking(0) = ACT) then
        any_dest_port_blocking <= ACT ;
    elsif (scan_vector(1) = NOT_ACT and port_blocking(1) = ACT) then
        any_dest_port_blocking <= ACT ;
    elsif (scan_vector(2) = NOT_ACT and port_blocking(2) = ACT) then
        any_dest_port_blocking <= ACT ;
    elsif (scan_vector(3) = NOT_ACT and port_blocking(3) = ACT) then
        any_dest_port_blocking <= ACT ;
    elsif (scan_vector(4) = NOT_ACT and port_blocking(4) = ACT) then
        any_dest_port_blocking <= ACT ;
    elsif (scan_vector(5) = NOT_ACT and port_blocking(5) = ACT) then
        any_dest_port_blocking <= ACT ;
    elsif (scan_vector(6) = NOT_ACT and port_blocking(6) = ACT) then
        any_dest_port_blocking <= ACT ;
    elsif (scan_vector(7) = NOT_ACT and port_blocking(7) = ACT) then
        any_dest_port_blocking <= ACT ;
    elsif (scan_vector(8) = NOT_ACT and port_blocking(8) = ACT) then
        any_dest_port_blocking <= ACT ;
    elsif (scan_vector(9) = NOT_ACT and port_blocking(9) = ACT) then
        any_dest_port_blocking <= ACT ;
    elsif (scan_vector(10) = NOT_ACT and port_blocking(10) = ACT) then
        any_dest_port_blocking <= ACT ;
    elsif (scan_vector(11) = NOT_ACT and port_blocking(11) = ACT) then
        any_dest_port_blocking <= ACT ;
    elsif (scan_vector(12) = NOT_ACT and port_blocking(12) = ACT) then
        any_dest_port_blocking <= ACT ;
    elsif (scan_vector(13) = NOT_ACT and port_blocking(13) = ACT) then
```

Aug 17 10:50 1994 Who: johnf File: /c2/local_user/bma/bma_rbsm/bma_rbsm_lib/rbsm_config.vhd Page 30

```
        any_dest_port_blocking <= ACT ;
    elsif (scan_vector(14) = NOT_ACT and port_blocking(14) = ACT) then
        any_dest_port_blocking <= ACT ;
    elsif (scan_vector(15) = NOT_ACT and port_blocking(15) = ACT) then
        any_dest_port_blocking <= ACT ;
    elsif (scan_vector(16) = NOT_ACT and scan_vector(17) = NOT_ACT and
            port_blocking(16) = ACT) then
        any_dest_port_blocking <= ACT ;
    elsif (scan_vector(18) = NOT_ACT and scan_vector(19) = NOT_ACT and
            port_blocking(17) = ACT) then
        any_dest_port_blocking <= ACT ;
    else
        any_dest_port_blocking <= NOT_ACT ;
    end if;



-- ==========================================================================
-- any_dest_monitor_on : Any destination monitor is used to indicate that any
--                       one of the possible 17 destination ports has its monitor
--                       bit set or turned on, and its transmit disable bit,
--                       port blocking bit and its
--                       port not forwarding bit all not active.
--
-- ==========================================================================

    if (scan_vector(0) = NOT_ACT and monitor_enable(0) = ACT and
        tx_disable(0) = NOT_ACT and
        port_blocking(0) = NOT_ACT and port_not_forwarding(0) = NOT_ACT) then
        any_dest_monitor_on <= ACT ;
    elsif (scan_vector(1) = NOT_ACT and monitor_enable(1) = ACT and
            tx_disable(1) = NOT_ACT and
            port_blocking(1) = NOT_ACT and port_not_forwarding(1) = NOT_ACT) then
            any_dest_monitor_on <= ACT ;
    elsif (scan_vector(2) = NOT_ACT and monitor_enable(2) = ACT and
            tx_disable(2) = NOT_ACT and
            port_blocking(2) = NOT_ACT and port_not_forwarding(2) = NOT_ACT) then
            any_dest_monitor_on <= ACT ;
    elsif (scan_vector(3) = NOT_ACT and monitor_enable(3) = ACT and
            tx_disable(3) = NOT_ACT and
            port_blocking(3) = NOT_ACT and port_not_forwarding(3) = NOT_ACT) then
            any_dest_monitor_on <= ACT ;
    elsif (scan_vector(4) = NOT_ACT and monitor_enable(4) = ACT and
            tx_disable(4) = NOT_ACT and
            port_blocking(4) = NOT_ACT and port_not_forwarding(4) = NOT_ACT) then
            any_dest_monitor_on <= ACT ;
    elsif (scan_vector(5) = NOT_ACT and monitor_enable(5) = ACT and
            tx_disable(5) = NOT_ACT and
            port_blocking(5) = NOT_ACT and port_not_forwarding(5) = NOT_ACT) then
            any_dest_monitor_on <= ACT ;
    elsif (scan_vector(6) = NOT_ACT and monitor_enable(6) = ACT and
            tx_disable(6) = NOT_ACT and
            port_blocking(6) = NOT_ACT and port_not_forwarding(6) = NOT_ACT) then
            any_dest_monitor_on <= ACT ;
    elsif (scan_vector(7) = NOT_ACT and monitor_enable(7) = ACT and
            tx_disable(7) = NOT_ACT and
```

Aug 17 10:50 1994 Who: johnf File: /c2/local_user/bma/bma_rbsm/bma_rbsm_lib/rbsm_config.vhd Page 31

```
            port_blocking(7) = NOT_ACT and port_not_forwarding(7) = NOT_ACT) then
            any_dest_monitor_on <= ACT ;
    elsif (scan_vector(8) = NOT_ACT and monitor_enable(8) = ACT and
            tx_disable(8) = NOT_ACT and
            port_blocking(8) = NOT_ACT and port_not_forwarding(8) = NOT_ACT) then
            any_dest_monitor_on <= ACT ;
    elsif (scan_vector(9) = NOT_ACT and monitor_enable(9) = ACT and
            tx_disable(9) = NOT_ACT and
            port_blocking(9) = NOT_ACT and port_not_forwarding(9) = NOT_ACT) then
            any_dest_monitor_on <= ACT ;
    elsif (scan_vector(10) = NOT_ACT and monitor_enable(10) = ACT and
            tx_disable(10) = NOT_ACT and
            port_blocking(10) = NOT_ACT and port_not_forwarding(10) = NOT_ACT) then
            any_dest_monitor_on <= ACT ;
    elsif (scan_vector(11) = NOT_ACT and monitor_enable(11) = ACT and
            tx_disable(11) = NOT_ACT and
            port_blocking(11) = NOT_ACT and port_not_forwarding(11) = NOT_ACT) then
            any_dest_monitor_on <= ACT ;
    elsif (scan_vector(12) = NOT_ACT and monitor_enable(12) = ACT and
            tx_disable(12) = NOT_ACT and
            port_blocking(12) = NOT_ACT and port_not_forwarding(12) = NOT_ACT) then
            any_dest_monitor_on <= ACT ;
    elsif (scan_vector(13) = NOT_ACT and monitor_enable(13) = ACT and
            tx_disable(13) = NOT_ACT and
            port_blocking(13) = NOT_ACT and port_not_forwarding(13) = NOT_ACT) then
            any_dest_monitor_on <= ACT ;
    elsif (scan_vector(14) = NOT_ACT and monitor_enable(14) = ACT and
            tx_disable(14) = NOT_ACT and
            port_blocking(14) = NOT_ACT and port_not_forwarding(14) = NOT_ACT) then
            any_dest_monitor_on <= ACT ;
    elsif (scan_vector(15) = NOT_ACT and monitor_enable(15) = ACT and
            tx_disable(15) = NOT_ACT and
            port_blocking(15) = NOT_ACT and port_not_forwarding(15) = NOT_ACT) then
            any_dest_monitor_on <= ACT ;
    elsif (scan_vector(16) = NOT_ACT and monitor_enable(16) = ACT and
            scan_vector(17) = NOT_ACT and tx_disable(16) = NOT_ACT and
            port_blocking(16) = NOT_ACT and port_not_forwarding(16) = NOT_ACT) then
            any_dest_monitor_on <= ACT ;
    elsif (scan_vector(18) = NOT_ACT and monitor_enable(17) = ACT and
            scan_vector(19) = NOT_ACT and tx_disable(17) = NOT_ACT and
            port_blocking(17) = NOT_ACT and port_not_forwarding(17) = NOT_ACT) then
            any_dest_monitor_on <= ACT ;
    else
            any_dest_monitor_on <= NOT_ACT ;
    end if;


-- ==========================================================================================
-- any_dest_multicast_monitor_on   Any destination multicast monitor is used to indicate that any
--                                 one of the possible 17 destination ports has its multicast monitor
--                                 bit set or turned on, and its transmit disable bit,
--                                 transmit multicast disable bit, port blocking bit and its
--                                 port not forwarding bit all not active.
--
-- ==========================================================================================

    if (scan_vector(0) = NOT_ACT and monitor_enable(0) = ACT and
        tx_disable(0) = NOT_ACT and tx_multicast_disable(0) = NOT_ACT and
```

Aug 17 10:50 1994 Who: johnf File: /c2/local_user/bma/bma_rbsm/bma_rbsm_lib/rbsm_config.vhd Page 32

```
        port_blocking(0) = NOT_ACT and port_not_forwarding(0) = NOT_ACT) then
        any_dest_multicast_monitor_on <= ACT ;
    elsif (scan_vector(1) = NOT_ACT and monitor_enable(1) = ACT and
            tx_disable(1) = NOT_ACT and tx_multicast_disable(1) = NOT_ACT and
            port_blocking(1) = NOT_ACT and port_not_forwarding(1) = NOT_ACT) then
            any_dest_multicast_monitor_on <= ACT ;
    elsif (scan_vector(2) = NOT_ACT and monitor_enable(2) = ACT and
            tx_disable(2) = NOT_ACT and tx_multicast_disable(2) = NOT_ACT and
            port_blocking(2) = NOT_ACT and port_not_forwarding(2) = NOT_ACT) then
            any_dest_multicast_monitor_on <= ACT ;
    elsif (scan_vector(3) = NOT_ACT and monitor_enable(3) = ACT and
            tx_disable(3) = NOT_ACT and tx_multicast_disable(3) = NOT_ACT and
            port_blocking(3) = NOT_ACT and port_not_forwarding(3) = NOT_ACT) then
            any_dest_multicast_monitor_on <= ACT ;
    elsif (scan_vector(4) = NOT_ACT and monitor_enable(4) = ACT and
            tx_disable(4) = NOT_ACT and tx_multicast_disable(4) = NOT_ACT and
            port_blocking(4) = NOT_ACT and port_not_forwarding(4) = NOT_ACT) then
            any_dest_multicast_monitor_on <= ACT ;
    elsif (scan_vector(5) = NOT_ACT and monitor_enable(5) = ACT and
            tx_disable(5) = NOT_ACT and tx_multicast_disable(5) = NOT_ACT and
            port_blocking(5) = NOT_ACT and port_not_forwarding(5) = NOT_ACT) then
            any_dest_multicast_monitor_on <= ACT ;
    elsif (scan_vector(6) = NOT_ACT and monitor_enable(6) = ACT and
            tx_disable(6) = NOT_ACT and tx_multicast_disable(6) = NOT_ACT and
            port_blocking(6) = NOT_ACT and port_not_forwarding(6) = NOT_ACT) then
            any_dest_multicast_monitor_on <= ACT ;
    elsif (scan_vector(7) = NOT_ACT and monitor_enable(7) = ACT and
            tx_disable(7) = NOT_ACT and tx_multicast_disable(7) = NOT_ACT and
            port_blocking(7) = NOT_ACT and port_not_forwarding(7) = NOT_ACT) then
            any_dest_multicast_monitor_on <= ACT ;
    elsif (scan_vector(8) = NOT_ACT and monitor_enable(8) = ACT and
            tx_disable(8) = NOT_ACT and tx_multicast_disable(8) = NOT_ACT and
            port_blocking(8) = NOT_ACT and port_not_forwarding(8) = NOT_ACT) then
            any_dest_multicast_monitor_on <= ACT ;
    elsif (scan_vector(9) = NOT_ACT and monitor_enable(9) = ACT and
            tx_disable(9) = NOT_ACT and tx_multicast_disable(9) = NOT_ACT and
            port_blocking(9) = NOT_ACT and port_not_forwarding(9) = NOT_ACT) then
            any_dest_multicast_monitor_on <= ACT ;
    elsif (scan_vector(10) = NOT_ACT and monitor_enable(10) = ACT and
            tx_disable(10) = NOT_ACT and tx_multicast_disable(10) = NOT_ACT and
            port_blocking(10) = NOT_ACT and port_not_forwarding(10) = NOT_ACT) then
            any_dest_multicast_monitor_on <= ACT ;
    elsif (scan_vector(11) = NOT_ACT and monitor_enable(11) = ACT and
            tx_disable(11) = NOT_ACT and tx_multicast_disable(11) = NOT_ACT and
            port_blocking(11) = NOT_ACT and port_not_forwarding(11) = NOT_ACT) then
            any_dest_multicast_monitor_on <= ACT ;
    elsif (scan_vector(12) = NOT_ACT and monitor_enable(12) = ACT and
            tx_disable(12) = NOT_ACT and tx_multicast_disable(12) = NOT_ACT and
            port_blocking(12) = NOT_ACT and port_not_forwarding(12) = NOT_ACT) then
            any_dest_multicast_monitor_on <= ACT ;
    elsif (scan_vector(13) = NOT_ACT and monitor_enable(13) = ACT and
            tx_disable(13) = NOT_ACT and tx_multicast_disable(13) = NOT_ACT and
            port_blocking(13) = NOT_ACT and port_not_forwarding(13) = NOT_ACT) then
            any_dest_multicast_monitor_on <= ACT ;
    elsif (scan_vector(14) = NOT_ACT and monitor_enable(14) = ACT and
            tx_disable(14) = NOT_ACT and tx_multicast_disable(14) = NOT_ACT and
            port_blocking(14) = NOT_ACT and port_not_forwarding(14) = NOT_ACT) then
            any_dest_multicast_monitor_on <= ACT ;
    elsif (scan_vector(15) = NOT_ACT and monitor_enable(15) = ACT and
            tx_disable(15) = NOT_ACT and tx_multicast_disable(15) = NOT_ACT and
```

```
Aug 17 10:50 1994  Who: johnf  File: /c2/local_user/bma/bma_rbsm/bma_rbsm_lib/rbsm_config.vhd Page 33

        port_blocking(15) = NOT_ACT and port_not_forwarding(15) = NOT_ACT) then
        any_dest_multicast_monitor_on <= ACT ;
    elsif (scan_vector(16) = NOT_ACT and scan_vector(17) = NOT_ACT and monitor_enable(16) = ACT and
        tx_disable(16) = NOT_ACT and tx_multicast_disable(16) = NOT_ACT and
        port_blocking(16) = NOT_ACT and port_not_forwarding(16) = NOT_ACT) then
        any_dest_multicast_monitor_on <= ACT ;
    elsif (scan_vector(18) = NOT_ACT and scan_vector(19) = NOT_ACT and monitor_enable(17) = ACT and
        tx_disable(17) = NOT_ACT and tx_multicast_disable(17) = NOT_ACT and
        port_blocking(17) = NOT_ACT and port_not_forwarding(17) = NOT_ACT) then
        any_dest_multicast_monitor_on <= ACT ;
    else
        any_dest_multicast_monitor_on <= NOT_ACT ;
    end if;



-- ***********************************************************************
-- rx_monitor_on : Receive monitor on is used to indicate that the receive
--                 monitor bit for the port being scanned is set when
--                 ACTive.
-- ***********************************************************************

    if (scan_vector(0) = ACT and monitor_enable(0) = ACT) then
       rx_monitor_on <= ACT ;
    elsif (scan_vector(1) = ACT and monitor_enable(1) = ACT) then
        rx_monitor_on <= ACT ;
    elsif (scan_vector(2) = ACT and monitor_enable(2) = ACT) then
        rx_monitor_on <= ACT ;
    elsif (scan_vector(3) = ACT and monitor_enable(3) = ACT) then
        rx_monitor_on <= ACT ;
    elsif (scan_vector(4) = ACT and monitor_enable(4) = ACT) then
        rx_monitor_on <= ACT ;
    elsif (scan_vector(5) = ACT and monitor_enable(5) = ACT) then
        rx_monitor_on <= ACT ;
    elsif (scan_vector(6) = ACT and monitor_enable(6) = ACT) then
        rx_monitor_on <= ACT ;
    elsif (scan_vector(7) = ACT and monitor_enable(7) = ACT) then
        rx_monitor_on <= ACT ;
    elsif (scan_vector(8) = ACT and monitor_enable(8) = ACT) then
        rx_monitor_on <= ACT ;
    elsif (scan_vector(9) = ACT and monitor_enable(9) = ACT) then
        rx_monitor_on <= ACT ;
    elsif (scan_vector(10) = ACT and monitor_enable(10) = ACT) then
        rx_monitor_on <= ACT ;
    elsif (scan_vector(11) = ACT and monitor_enable(11) = ACT) then
        rx_monitor_on <= ACT ;
    elsif (scan_vector(12) = ACT and monitor_enable(12) = ACT) then
        rx_monitor_on <= ACT ;
    elsif (scan_vector(13) = ACT and monitor_enable(13) = ACT) then
        rx_monitor_on <= ACT ;
    elsif (scan_vector(14) = ACT and monitor_enable(14) = ACT) then
        rx_monitor_on <= ACT ;
    elsif (scan_vector(15) = ACT and monitor_enable(15) = ACT) then
        rx_monitor_on <= ACT ;
    elsif (scan_vector(16) = ACT and monitor_enable(16) = ACT) then
        rx_monitor_on <= ACT ;

Aug 17 10:50 1994  Who: johnf  File: /c2/local_user/bma/bma_rbsm/bma_rbsm_lib/rbsm_config.vhd Page 34

    elsif (scan_vector(17) = ACT and monitor_enable(16) = ACT) then
        rx_monitor_on <= ACT ;
    elsif (scan_vector(18) = ACT and monitor_enable(17) = ACT) then
        rx_monitor_on <= ACT ;
    elsif (scan_vector(19) = ACT and monitor_enable(17) = ACT) then
        rx_monitor_on <= ACT ;
    else
        rx_monitor_on <= NOT_ACT ;
    end if;



-- ***********************************************************************
-- rxport_equals_bbone : Receive port equals the backbone port bit is set
--                       when the port number of the port being scanned
--                       is equal to the backbone port number programmed
--                       into the bbone port register.
--
-- NOTE: only the 5 least significant bits of the backbone register are
--       used to determine if the receive port is equal to the backbone
--       port.
--
-- ***********************************************************************

    if (scan_vector(0) = ACT and bbone_register(4 downto 0) = PORT0) then
       rxport_equals_bbone <= ACT ;
    elsif (scan_vector(1) = ACT and bbone_register(4 downto 0) = PORT1) then
        rxport_equals_bbone <= ACT ;
    elsif (scan_vector(2) = ACT and bbone_register(4 downto 0) = PORT2) then
        rxport_equals_bbone <= ACT ;
    elsif (scan_vector(3) = ACT and bbone_register(4 downto 0) = PORT3) then
        rxport_equals_bbone <= ACT ;
    elsif (scan_vector(4) = ACT and bbone_register(4 downto 0) = PORT4) then
        rxport_equals_bbone <= ACT ;
    elsif (scan_vector(5) = ACT and bbone_register(4 downto 0) = PORT5) then
        rxport_equals_bbone <= ACT ;
    elsif (scan_vector(6) = ACT and bbone_register(4 downto 0) = PORT6) then
        rxport_equals_bbone <= ACT ;
    elsif (scan_vector(7) = ACT and bbone_register(4 downto 0) = PORT7) then
        rxport_equals_bbone <= ACT ;
    elsif (scan_vector(8) = ACT and bbone_register(4 downto 0) = PORT8) then
        rxport_equals_bbone <= ACT ;
    elsif (scan_vector(9) = ACT and bbone_register(4 downto 0) = PORT9) then
        rxport_equals_bbone <= ACT ;
    elsif (scan_vector(10) = ACT and bbone_register(4 downto 0) = PORT10) then
        rxport_equals_bbone <= ACT ;
    elsif (scan_vector(11) = ACT and bbone_register(4 downto 0) = PORT11) then
        rxport_equals_bbone <= ACT ;
    elsif (scan_vector(12) = ACT and bbone_register(4 downto 0) = PORT12) then
        rxport_equals_bbone <= ACT ;
    elsif (scan_vector(13) = ACT and bbone_register(4 downto 0) = PORT13) then
        rxport_equals_bbone <= ACT ;
    elsif (scan_vector(14) = ACT and bbone_register(4 downto 0) = PORT14) then
        rxport_equals_bbone <= ACT ;
    elsif (scan_vector(15) = ACT and bbone_register(4 downto 0) = PORT15) then
        rxport_equals_bbone <= ACT ;
    elsif (scan_vector(16) = ACT and bbone_register(4 downto 0) = PORT16) then
        rxport_equals_bbone <= ACT ;
```

Aug 17 10:50 1994 Who: johnf File: /c2/local_user/bma/bma_rbsm/bma_rbsm_lib/rbsm_config.vhd Page 35

```
    elsif (scan_vector(17) = ACT and bbone_register(4 downto 0) = PORT16) then
            rxport_equals_bbone <= ACT ;
    elsif (scan_vector(18) = ACT and bbone_register(4 downto 0) = PORT17) then
            rxport_equals_bbone <= ACT ;
    elsif (scan_vector(19) = ACT and bbone_register(4 downto 0) = PORT17) then
            rxport_equals_bbone <= ACT ;
    else
            rxport_equals_bbone <= NOT_ACT ;
    end if;



-- ==========================================================================
-- dest port type : Destination port type is used to indicate if the destination port
--                  is either and FDDI, ETHERNET or UNKNOWN port type.
--
--
-- ==========================================================================


    if (transmit_port_num = PORT0  and port_type_msb(0) = NOT_ACT and
        port_type_mid(0) = NOT_ACT and port_type_lsb(0) = NOT_ACT) then
        dest_port_type <= FDDI ;
    elsif (transmit_port_num = PORT0  and port_type_msb(0) = NOT_ACT and
            port_type_mid(0) = NOT_ACT and port_type_lsb(0) = ACT) then
            dest_port_type <= ETHERNET ;
    elsif (transmit_port_num = PORT1  and port_type_msb(1) = NOT_ACT and
            port_type_mid(1) = NOT_ACT and port_type_lsb(1) = NOT_ACT) then
            dest_port_type <= FDDI ;
    elsif (transmit_port_num = PORT1  and port_type_msb(1) = NOT_ACT and
            port_type_mid(1) = NOT_ACT and port_type_lsb(1) = ACT) then
            dest_port_type <= ETHERNET ;
    elsif (transmit_port_num = PORT2  and port_type_msb(2) = NOT_ACT and
            port_type_mid(2) = NOT_ACT and port_type_lsb(2) = NOT_ACT) then
            dest_port_type <= FDDI ;
    elsif (transmit_port_num = PORT2  and port_type_msb(2) = NOT_ACT and
            port_type_mid(2) = NOT_ACT and port_type_lsb(2) = ACT) then
            dest_port_type <= ETHERNET ;
    elsif (transmit_port_num = PORT3  and port_type_msb(3) = NOT_ACT and
            port_type_mid(3) = NOT_ACT and port_type_lsb(3) = NOT_ACT) then
            dest_port_type <= FDDI ;
    elsif (transmit_port_num = PORT3  and port_type_msb(3) = NOT_ACT and
            port_type_mid(3) = NOT_ACT and port_type_lsb(3) = ACT) then
            dest_port_type <= ETHERNET ;
    elsif (transmit_port_num = PORT4  and port_type_msb(4) = NOT_ACT and
            port_type_mid(4) = NOT_ACT and port_type_lsb(4) = NOT_ACT) then
            dest_port_type <= FDDI ;
    elsif (transmit_port_num = PORT4  and port_type_msb(4) = NOT_ACT and
            port_type_mid(4) = NOT_ACT and port_type_lsb(4) = ACT) then
            dest_port_type <= ETHERNET ;
    elsif (transmit_port_num = PORT5  and port_type_msb(5) = NOT_ACT and
            port_type_mid(5) = NOT_ACT and port_type_lsb(5) = NOT_ACT) then
            dest_port_type <= FDDI ;
    elsif (transmit_port_num = PORT5  and port_type_msb(5) = NOT_ACT and
            port_type_mid(5) = NOT_ACT and port_type_lsb(5) = ACT) then
            dest_port_type <= ETHERNET ;
    elsif (transmit_port_num = PORT6  and port_type_msb(6) = NOT_ACT and
            port_type_mid(6) = NOT_ACT and port_type_lsb(6) = NOT_ACT) then
```

Aug 17 10:50 1994 Who: johnf File: /c2/local_user/bma/bma_rbsm/bma_rbsm_lib/rbsm_config.vhd Page 36

```
            dest_port_type <= FDDI ;
    elsif (transmit_port_num = PORT6  and port_type_msb(6) = NOT_ACT and
            port_type_mid(6) = NOT_ACT and port_type_lsb(6) = ACT) then
            dest_port_type <= ETHERNET ;
    elsif (transmit_port_num = PORT7  and port_type_msb(7) = NOT_ACT and
            port_type_mid(7) = NOT_ACT and port_type_lsb(7) = NOT_ACT) then
            dest_port_type <= FDDI ;
    elsif (transmit_port_num = PORT7  and port_type_msb(7) = NOT_ACT and
            port_type_mid(7) = NOT_ACT and port_type_lsb(7) = ACT) then
            dest_port_type <= ETHERNET ;
    elsif (transmit_port_num = PORT8  and port_type_msb(8) = NOT_ACT and
            port_type_mid(8) = NOT_ACT and port_type_lsb(8) = NOT_ACT) then
            dest_port_type <= FDDI ;
    elsif (transmit_port_num = PORT8  and port_type_msb(8) = NOT_ACT and
            port_type_mid(8) = NOT_ACT and port_type_lsb(8) = ACT) then
            dest_port_type <= ETHERNET ;
    elsif (transmit_port_num = PORT9  and port_type_msb(9) = NOT_ACT and
            port_type_mid(9) = NOT_ACT and port_type_lsb(9) = NOT_ACT) then
            dest_port_type <= FDDI ;
    elsif (transmit_port_num = PORT9  and port_type_msb(9) = NOT_ACT and
            port_type_mid(9) = NOT_ACT and port_type_lsb(9) = ACT) then
            dest_port_type <= ETHERNET ;
    elsif (transmit_port_num = PORT10  and port_type_msb(10) = NOT_ACT and
            port_type_mid(10) = NOT_ACT and port_type_lsb(10) = NOT_ACT) then
            dest_port_type <= FDDI ;
    elsif (transmit_port_num = PORT10  and port_type_msb(10) = NOT_ACT and
            port_type_mid(10) = NOT_ACT and port_type_lsb(10) = ACT) then
            dest_port_type <= ETHERNET ;
    elsif (transmit_port_num = PORT11  and port_type_msb(11) = NOT_ACT and
            port_type_mid(11) = NOT_ACT and port_type_lsb(11) = NOT_ACT) then
            dest_port_type <= FDDI ;
    elsif (transmit_port_num = PORT11  and port_type_msb(11) = NOT_ACT and
            port_type_mid(11) = NOT_ACT and port_type_lsb(11) = ACT) then
            dest_port_type <= ETHERNET ;
    elsif (transmit_port_num = PORT12  and port_type_msb(12) = NOT_ACT and
            port_type_mid(12) = NOT_ACT and port_type_lsb(12) = NOT_ACT) then
            dest_port_type <= FDDI ;
    elsif (transmit_port_num = PORT12  and port_type_msb(12) = NOT_ACT and
            port_type_mid(12) = NOT_ACT and port_type_lsb(12) = ACT) then
            dest_port_type <= ETHERNET ;
    elsif (transmit_port_num = PORT13  and port_type_msb(13) = NOT_ACT and
            port_type_mid(13) = NOT_ACT and port_type_lsb(13) = NOT_ACT) then
            dest_port_type <= FDDI ;
    elsif (transmit_port_num = PORT13  and port_type_msb(13) = NOT_ACT and
            port_type_mid(13) = NOT_ACT and port_type_lsb(13) = ACT) then
            dest_port_type <= ETHERNET ;
    elsif (transmit_port_num = PORT14  and port_type_msb(14) = NOT_ACT and
            port_type_mid(14) = NOT_ACT and port_type_lsb(14) = NOT_ACT) then
            dest_port_type <= FDDI ;
    elsif (transmit_port_num = PORT14  and port_type_msb(14) = NOT_ACT and
            port_type_mid(14) = NOT_ACT and port_type_lsb(14) = ACT) then
            dest_port_type <= ETHERNET ;
    elsif (transmit_port_num = PORT15  and port_type_msb(15) = NOT_ACT and
            port_type_mid(15) = NOT_ACT and port_type_lsb(15) = NOT_ACT) then
            dest_port_type <= FDDI ;
    elsif (transmit_port_num = PORT15  and port_type_msb(15) = NOT_ACT and
            port_type_mid(15) = NOT_ACT and port_type_lsb(15) = ACT) then
            dest_port_type <= ETHERNET ;
    elsif (transmit_port_num = PORT16  and port_type_msb(16) = NOT_ACT and
            port_type_mid(16) = NOT_ACT and port_type_lsb(16) = NOT_ACT) then
```

```
Aug 17 10:50 1994  Who: johnf  File: /c2/local_user/bma/bma_rbsm/bma_rbsm_lib/rbsm_config.vhd Page 37

        dest_port_type <= FDDI ;
    elsif (transmit_port_num = PORT16  and port_type_msb(16) = NOT_ACT and
        port_type_mid(16) = NOT_ACT and port_type_lsb(16) = ACT) then
        dest_port_type <= ETHERNET ;
    elsif (transmit_port_num = PORT17  and port_type_msb(17) = NOT_ACT and
        port_type_mid(17) = NOT_ACT and port_type_lsb(17) = NOT_ACT) then
        dest_port_type <= FDDI ;
    elsif (transmit_port_num = PORT17  and port_type_msb(17) = NOT_ACT and
        port_type_mid(17) = NOT_ACT and port_type_lsb(17) = ACT) then
        dest_port_type <= ETHERNET ;
    else
        dest_port_type <= UNKNOWN ;
    end if;


-- ***************************************************************************
-- src_port_type : Source port type is used to indicate if the source port
--                 is either and FDDI, ETHERNET or UNKNOWN port type.
--
--
-- ***************************************************************************


    if (scan_vector(0) = ACT  and port_type_msb(0) = NOT_ACT and
       port_type_mid(0) = NOT_ACT and port_type_lsb(0) = NOT_ACT) then
       src_port_type <= FDDI ;
    elsif (scan_vector(0) = ACT  and port_type_msb(0) = NOT_ACT and
        port_type_mid(0) = NOT_ACT and port_type_lsb(0) = ACT) then
        src_port_type <= ETHERNET ;
    elsif (scan_vector(1) = ACT and port_type_msb(1) = NOT_ACT and
        port_type_mid(1) = NOT_ACT and port_type_lsb(1) = NOT_ACT) then
        src_port_type <= FDDI ;
    elsif (scan_vector(1) = ACT and port_type_msb(1) = NOT_ACT and
        port_type_mid(1) = NOT_ACT and port_type_lsb(1) = ACT) then
        src_port_type <= ETHERNET ;
    elsif (scan_vector(2) = ACT  and port_type_msb(2) = NOT_ACT and
        port_type_mid(2) = NOT_ACT and port_type_lsb(2) = NOT_ACT) then
        src_port_type <= FDDI ;
    elsif (scan_vector(2) = ACT  and port_type_msb(2) = NOT_ACT and
        port_type_mid(2) = NOT_ACT and port_type_lsb(2) = ACT) then
        src_port_type <= ETHERNET ;
    elsif (scan_vector(3) = ACT  and port_type_msb(3) = NOT_ACT and
        port_type_mid(3) = NOT_ACT and port_type_lsb(3) = NOT_ACT) then
        src_port_type <= FDDI ;
    elsif (scan_vector(3) = ACT  and port_type_msb(3) = NOT_ACT and
        port_type_mid(3) = NOT_ACT and port_type_lsb(3) = ACT) then
        src_port_type <= ETHERNET ;
    elsif (scan_vector(4) = ACT  and port_type_msb(4) = NOT_ACT and
        port_type_mid(4) = NOT_ACT and port_type_lsb(4) = NOT_ACT) then
        src_port_type <= FDDI ;
    elsif (scan_vector(4) = ACT and port_type_msb(4) = NOT_ACT and
        port_type_mid(4) = NOT_ACT and port_type_lsb(4) = ACT) then
        src_port_type <= ETHERNET ;
    elsif (scan_vector(5) = ACT  and port_type_msb(5) = NOT_ACT and
        port_type_mid(5) = NOT_ACT and port_type_lsb(5) = NOT_ACT) then
        src_port_type <= FDDI ;
    elsif (scan_vector(5) = ACT and port_type_msb(5) = NOT_ACT and
        port_type_mid(5) = NOT_ACT and port_type_lsb(5) = ACT) then
        src_port_type <= ETHERNET ;
```

```
Aug 17 10:50 1994  Who: johnf  File: /c2/local_user/bma/bma_rbsm/bma_rbsm_lib/rbsm_config.vhd Page 38

    elsif (scan_vector(6) = ACT  and port_type_msb(6) = NOT_ACT and
        port_type_mid(6) = NOT_ACT and port_type_lsb(6) = NOT_ACT) then
        src_port_type <= FDDI ;
    elsif (scan_vector(6) = ACT  and port_type_msb(6) = NOT_ACT and
        port_type_mid(6) = NOT_ACT and port_type_lsb(6) = ACT) then
        src_port_type <= ETHERNET ;
    elsif (scan_vector(7) = ACT  and port_type_msb(7) = NOT_ACT and
        port_type_mid(7) = NOT_ACT and port_type_lsb(7) = NOT_ACT) then
        src_port_type <= FDDI ;
    elsif (scan_vector(7) = ACT  and port_type_msb(7) = NOT_ACT and
        port_type_mid(7) = NOT_ACT and port_type_lsb(7) = ACT) then
        src_port_type <= ETHERNET ;
    elsif (scan_vector(8) = ACT  and port_type_msb(8) = NOT_ACT and
        port_type_mid(8) = NOT_ACT and port_type_lsb(8) = NOT_ACT) then
        src_port_type <= FDDI ;
    elsif (scan_vector(8) = ACT  and port_type_msb(8) = NOT_ACT and
        port_type_mid(8) = NOT_ACT and port_type_lsb(8) = ACT) then
        src_port_type <= ETHERNET ;
    elsif (scan_vector(9) = ACT  and port_type_msb(9) = NOT_ACT and
        port_type_mid(9) = NOT_ACT and port_type_lsb(9) = NOT_ACT) then
        src_port_type <= FDDI ;
    elsif (scan_vector(9) = ACT and port_type_msb(9) = NOT_ACT and
        port_type_mid(9) = NOT_ACT and port_type_lsb(9) = ACT) then
        src_port_type <= ETHERNET ;
    elsif (scan_vector(10) = ACT  and port_type_msb(10) = NOT_ACT and
        port_type_mid(10) = NOT_ACT and port_type_lsb(10) = NOT_ACT) then
        src_port_type <= FDDI ;
    elsif (scan_vector(10) = ACT and port_type_msb(10) = NOT_ACT and
        port_type_mid(10) = NOT_ACT and port_type_lsb(10) = ACT) then
        src_port_type <= ETHERNET ;
    elsif (scan_vector(11) = ACT and port_type_msb(11) = NOT_ACT and
        port_type_mid(11) = NOT_ACT and port_type_lsb(11) = NOT_ACT) then
        src_port_type <= FDDI ;
    elsif (scan_vector(11) = ACT and port_type_msb(11) = NOT_ACT and
        port_type_mid(11) = NOT_ACT and port_type_lsb(11) = ACT) then
        src_port_type <= ETHERNET ;
    elsif (scan_vector(12) = ACT and port_type_msb(12) = NOT_ACT and
        port_type_mid(12) = NOT_ACT and port_type_lsb(12) = NOT_ACT) then
        src_port_type <= FDDI ;
    elsif (scan_vector(12) = ACT and port_type_msb(12) = NOT_ACT and
        port_type_mid(12) = NOT_ACT and port_type_lsb(12) = ACT) then
        src_port_type <= ETHERNET ;
    elsif (scan_vector(13) = ACT and port_type_msb(13) = NOT_ACT and
        port_type_mid(13) = NOT_ACT and port_type_lsb(13) = NOT_ACT) then
        src_port_type <= FDDI ;
    elsif (scan_vector(13) = ACT and port_type_msb(13) = NOT_ACT and
        port_type_mid(13) = NOT_ACT and port_type_lsb(13) = ACT) then
        src_port_type <= ETHERNET ;
    elsif (scan_vector(14) = ACT and port_type_msb(14) = NOT_ACT and
        port_type_mid(14) = NOT_ACT and port_type_lsb(14) = NOT_ACT) then
        src_port_type <= FDDI ;
    elsif (scan_vector(14) = ACT and port_type_msb(14) = NOT_ACT and
        port_type_mid(14) = NOT_ACT and port_type_lsb(14) = ACT) then
        src_port_type <= ETHERNET ;
    elsif (scan_vector(15) = ACT and port_type_msb(15) = NOT_ACT and
        port_type_mid(15) = NOT_ACT and port_type_lsb(15) = NOT_ACT) then
        src_port_type <= FDDI ;
    elsif (scan_vector(15) = ACT and port_type_msb(15) = NOT_ACT and
        port_type_mid(15) = NOT_ACT and port_type_lsb(15) = ACT) then
        src_port_type <= ETHERNET ;
```

```
    elsif (scan_vector(15) = ACT and port_type_msb(16) = NOT_ACT and
          port_type_mid(16) = NOT_ACT and port_type_lsb(16) = NOT_ACT) then
          src_port_type <= FDDI ;
    elsif (scan_vector(16) = ACT  and port_type_msb(16) = NOT_ACT and
          port_type_mid(16) = NOT_ACT and port_type_lsb(16) = ACT) then
          src_port_type <= ETHERNET ;
    elsif (scan_vector(17) = ACT  and port_type_msb(16) = NOT_ACT and
          port_type_mid(16) = NOT_ACT and port_type_lsb(16) = NOT_ACT) then
          src_port_type <= FDDI ;
    elsif (scan_vector(17) = ACT  and port_type_msb(16) = NOT_ACT and
          port_type_mid(16) = NOT_ACT and port_type_lsb(16) = ACT) then
          src_port_type <= ETHERNET ;
    elsif (scan_vector(18) = ACT  and port_type_msb(17) = NOT_ACT and
          port_type_mid(17) = NOT_ACT and port_type_lsb(17) = NOT_ACT) then
          src_port_type <= FDDI ;
    elsif (scan_vector(15) = ACT  and port_type_msb(17) = NOT_ACT and
          port_type_mid(17) = NOT_ACT and port_type_lsb(17) = ACT) then
          src_port_type <= ETHERNET ;
    elsif (scan_vector(19) = ACT  and port_type_msb(17) = NOT_ACT and
          port_type_mid(17) = NOT_ACT and port_type_lsb(17) = NOT_ACT) then
          src_port_type <= FDDI ;
    elsif (scan_vector(19) = ACT  and port_type_msb(17) = NOT_ACT and
          port_type_mid(17) = NOT_ACT and port_type_lsb(17) = ACT) then
          src_port_type <= ETHERNET ;
    else
          src_port_type <= UNKNOWN ;
    end if;


end process rbsm_port_config;

end synthesize;
```

```
Aug 17 10 50 1994  Who. johnf  File: /c2/local_user/bma/bma_rbsm/bma_rbsm_lib/rbsm_ct_active vhd Page 1

-- $Id  rbsm ct active vhd,v 1 11 94/06/02 18 19 35 johnf Exp $
--
--  Author       John A  Flanders
--
--
--  Title        rbsm_ct_active     rbsm_ct_active is the receive buffer state machine component used to
--                                  inform other RBSM control blocks that this frame is a cut thru frame
--                                  and that the AMA Status has already been read from the AMA Status
--                                  Queue and written into the Frame Control area of SRAM if the packet
--                                  is not going to be filtered by the RBSM. Once the AMA Status has
--                                  been read it should not be read again until the Receive Status is
--                                  available. Cut-Thru is only supported for the Ethernet ports and
--                                  is not supported for the FDDI ports. It is the microprocessors
--                                  responsibility to disable Cut-Thru for the FDDI ports.
--
--
--
--  Revision History
--
--  6/24/93 :                      original version
--
--
--
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_ct_active is
    port(
        clock25                 : in std_logic  ; -- system clock
        reset                   : in std_logic  ; -- system reset
        rd_state0               : in std_logic  ; -- from rbsm_stat_control
        rd_state1               : in std_logic  ; -- from rbsm_stat_control
        cont_scan               : in std_logic  ; -- from rbsm_stat_control
        dest_group_address      : in std_logic  ; -- from rbsm_status_registers
        src_ct_allowed          : in std_logic  ; -- from rbsm_port_registers
        dest_ct_allowed         : in std_logic  ; -- from rbsm_port_registers
        multicast_ct_allowed    : in std_logic  ; -- from rbsm_port_registers
        scan_vector             : in SCAN_VEC   ; -- from rbsm_scanner
        unload                  : in port_vector     ; -- from rbsm_unload
        positive_forward_enable : in std_logic ; -- from microprocessor interface    Added 2/9/94
        rxport_equals_bbone     : in std_logic ; -- from rbsm_config                 Added 2/9/94
        bbone_src_ct            : in std_logic ; -- from rbsm_config                 Added 2/9/94
        bbone_dest_ct           : in std_logic ; -- from rbsm_config                 Added 2/9/94
        bbone_multicast_ct      : in std_logic ; -- from rbsm_config                 Added 2/9/94
        cut_thru_begin          : buffer std_logic     ; -- to rbsm_sram_registers

Aug 17 10:50 1994  Who: johnf  File: /c2/local_user/bma/bma_rbsm/bma_rbsm_lib/rbsm_ct_active.vhd Page 2

        cut_thru_end            : buffer std_logic     ;
        src_ct_active           : buffer std_logic     ; -- ADDED 5/2/94
        ct_active               : buffer EPORT_VEC   ) ;

end rbsm_ct_active;


------------------------------------------------------------
------------------------------------------------------------


architecture synthesize of rbsm_ct_active is

-- declarations

signal enet0          : std_logic ;
signal enet1          : std_logic ;
signal enet2          : std_logic ;
signal enet3          : std_logic ;
signal enet4          : std_logic ;
signal enet5          : std_logic ;
signal enet6          : std_logic ;
signal enet7          : std_logic ;
signal enet8          : std_logic ;
signal enet9          : std_logic ;
signal enet10         : std_logic ;
signal enet11         : std_logic ;
signal enet12         : std_logic ;
signal enet13         : std_logic ;
signal enet14         : std_logic ;
signal enet15         : std_logic ;


------------------------------------------------------------
-- body
------------------------------------------------------------

begin

--
--  process rbsm_ct_active_sync is used to generate the registered outputs
--  which will be used to inhibit any further reading of AMA Status until
--  the Receive status becomes available.
--

 bsm_ct_active_sync:
process
begin
    wait until clock25 = '1'     ;

        ct_active(15) <= enet15   ;
        ct_active(14) <= enet14   ;
        ct_active(13) <= enet13   ;
```

Aug 17 10 50 1994 Who johnf File: /c2/local_user/bma/bma_rbsm/bma rbsm_lib/rbsm_ct_active.vhd Page 3

```
        ct_active(12)  <= enet12  ;
        ct_active(11)  <= enet11  ;
        ct_active(10)  <= enet10  ;
        ct_active(9)   <= enet9   ;
        ct_active(8)   <= enet8   ;
        ct_active(7)   <= enet7   ;
        ct_active(6)   <= enet6   ;
        ct_active(5)   <= enet5   ;
        ct_active(4)   <= enet4   ;
        ct_active(3)   <= enet3   ;
        ct_active(2)   <= enet2   ;
        ct_active(1)   <= enet1   ;
        ct_activu(0)   <= enet0   ;

--
-- Generate cut thru begin   cut_thru_begin is used to
-- generate the per port ct_active bits if all the conditions
-- for cut_thru have been met after reading the AMA Status
--

    if (reset = ACT) then
        cut_thru_begin <= NOT_ACT ;

    elsif (src_ct_allowed = ACT                          and -- Begin Cut-thru
            dest_ct_allowed = ACT                        and -- Receive port /= Backbone port
             dest_group_address = NOT_ACT                and
              rd_state0 = ACT                            and -- UNICAST
               rd_state1 = ACT                           and
             (positive_forward_enable = NOT_ACT          or
             (positive_forward_enable = ACT              and
              rxport_equals_bbone = NOT_ACT))            and
               cut_thru_begin = NOT_ACT) then
        cut_thru_begin <= ACT ;

    elsif (bbone_src_ct = ACT                            and -- Begin Cut-thru
            dest_ct_allowed = ACT                        and -- Receive port = Backbone port
             dest_group_address = NOT_ACT                and
              rd_state0 = ACT                            and -- UNICAST
               rd_state1 = ACT                           and
                positive_forward_enable = ACT            and
                 cut_thru_begin = NOT_ACT) then
        cut_thru_begin <= ACT ;

    elsif (bbone_dest_ct = ACT                           and -- Begin Cut-thru
            src_ct_allowed = ACT                         and -- Destination port = Backbone port
             dest_group_address = NOT ACT                and -- by Default
              rd_state0 = ACT                            and
               rd_state1 = ACT                           and -- UNICAST
                positive_forward_enable = ACT            and
                 rxport_equals_bbone = NOT_ACT           and
                  cut_thru_begin = NOT_ACT) then
        cut_thru_begin <= ACT ;

    elsif (multicast_ct_allowed = ACT                    and -- Begin Cut-thru
```

Aug 17 10:50 1994 Who: johnf File: /c2/local_user/bma/bma_rbsm/bma_rbsm_lib/rbsm_ct_active.vhd Page 4

```
            src_ct_allowed = ACT                         and -- Receive port /= Backbone port
             dest_group_address = ACT                    and
              rd_state0 = ACT                            and -- MULTICAST
               rd_state1 = ACT                           and
                cut_thru_begin = NOT_ACT) then
        cut_thru_begin <= ACT ;

    elsif (bbone_multicast_ct = ACT                      and -- Begin Cut-thru
            dest_group_address = ACT                     and -- Receive port = Backbone port
             rd_state0 = ACT                             and
              rd_state1 = ACT                            and -- MULTICAST
               cut_thru_begin = NOT_ACT) then
        cut_thru_begin <= ACT ;

    elsif (cut_thru_begin = ACT and cont_scan = NOT_ACT) then
        cut_thru_begin <= ACT ;

    else
        cut_thru_begin <= NOT_ACT ;
    end if ;

--
-- Generate cut_thru_end : cut_thru_end is used to
-- differentiate between the start of a cut thru frame
-- and the end of a cut thru frame so that the proper
-- code vector will be generated by the RBSM
--

    if (reset = ACT) then
        cut_thru_end <= NOT_ACT ;
    elsif (scan_vector(0) = ACT and ct_active(0) = ACT and
            unload(0) = ACT) then
        cut_thru_end <= ACT ;
    elsif (scan_vector(1) = ACT and ct_active(1) = ACT and
            unload(1) = ACT) then
        cut_thru_end <= ACT ;
    elsif (scan_vector(2) = ACT and ct_active(2) = ACT and
            unload(2) = ACT) then
        cut_thru_end <= ACT ;
    elsif (scan_vector(3) = ACT and ct_active(3) = ACT and
            unload(3) = ACT) then
        cut_thru_end <= ACT ;
    elsif (scan_vector(4) = ACT and ct_active(4) = ACT and
            unload(4) = ACT) then
        cut_thru_end <= ACT ;
    elsif (scan_vector(5) = ACT and ct_active(5) = ACT and
            unload(5) = ACT) then
        cut_thru_end <= ACT ;
    elsif (scan_vector(6) = ACT and ct_active(6) = ACT and
            unload(6) = ACT) then
        cut_thru_end <= ACT ;
    elsif (scan_vector(7) = ACT and ct_active(7) = ACT and
            unload(7) = ACT) then
        cut_thru_end <= ACT ;
    elsif (scan_vector(8) = ACT and ct_active(8) = ACT and
            unload(8) = ACT) then
        cut_thru_end <= ACT ;
```

Aug 17 10:50 1994 Who: johnf File: /c2/local_user/bma/bma_rbsm/bma_rbsm_lib/rbsm_ct_active.vhd Page 5

```
    elsif (scan_vector(9) = ACT and ct_active(9) = ACT and
        unload(9) = ACT) then
        cut_thru_end <= ACT ;
    elsif (scan_vector(10) = ACT and ct_active(10) = ACT and
        unload(10) = ACT) then
        cut_thru_end <= ACT ;
    elsif (scan_vector(11) = ACT and ct_active(11) = ACT and
        unload(11) = ACT) then
        cut_thru_end <= ACT ;
    elsif (scan_vector(12) = ACT and ct_active(12) = ACT and
        unload(12) = ACT) then
        cut_thru_end <= ACT ;
    elsif (scan_vector(13) = ACT and ct_active(13) = ACT and
        unload(13) = ACT) then
        cut_thru_end <= ACT ;
    elsif (scan_vector(14) = ACT and ct_active(14) = ACT and
        unload(14) = ACT) then
        cut_thru_end <= ACT ;
    elsif (scan_vector(15) = ACT and ct_active(15) = ACT and
        unload(15) = ACT) then
        cut_thru_end <= ACT ;
    else
        cut_thru_end <= NOT_ACT ;
    end if

end process rbsm_ct_active_sync ;

--
-- process rbsm_ct_active_comb is used to generate the combinatorial logic
-- required for all 16 flops generated by this model.
--

rbsm_ct_active_comb:
process(reset,scan_vector,cont_scan,unload,cut_thru_begin,ct_active)
begin

-- ************************************************************
-- Generate enet0
-- ************************************************************

        if (reset = ACT) then
            enet0  <= NOT_ACT ;
        elsif (scan_vector(0) = ACT and cut_thru_begin = ACT) then
            enet0  <= ACT ;
        elsif (ct_active(0) = ACT and unload(0) = NOT_ACT) then
            enet0  <= ACT ;
        elsif (ct_active(0) = ACT and cont_scan = NOT_ACT) then
            enet0  <= ACT ;
        else
            enet0 <= NOT_ACT ;
        end if;

-- ************************************************************
-- Generate enet1
-- ************************************************************
```

Aug 17 10:50 1994 Who: johnf File: /c2/local_user/bma/bma_rbsm/bma_rbsm_lib/rbsm_ct_active.vhd Page 6

```
        if (reset = ACT) then
            enet1  <= NOT_ACT ;
        elsif (scan_vector(1) = ACT and cut_thru_begin = ACT) then
            enet1  <= ACT ;
        elsif (ct_active(1) = ACT and unload(1) = NOT_ACT) then
            enet1  <= ACT ;
        elsif (ct_active(1) = ACT and cont_scan = NOT_ACT) then
            enet1  <= ACT ;
        else
            enet1 <= NOT_ACT ;
        end if;

-- ************************************************************
-- Generate enet2
-- ************************************************************

        if (reset = ACT) then
            enet2  <= NOT_ACT ;
        elsif (scan_vector(2) = ACT and cut_thru_begin = ACT) then
            enet2  <= ACT ;
        elsif (ct_active(2) = ACT and unload(2) = NOT_ACT) then
            enet2  <= ACT ;
        elsif (ct_active(2) = ACT and cont_scan = NOT_ACT) then
            enet2  <= ACT ;
        else
            enet2 <= NOT_ACT ;
        end if;

-- ************************************************************
-- Generate enet3
-- ************************************************************

        if (reset = ACT) then
            enet3  <= NOT_ACT ;
        elsif (scan_vector(3) = ACT and cut_thru_begin = ACT) then
            enet3  <= ACT ;
        elsif (ct_active(3) = ACT and unload(3) = NOT_ACT) then
            enet3  <= ACT ;
        elsif (ct_active(3) = ACT and cont_scan = NOT_ACT) then
            enet3  <= ACT ;
        else
            enet3 <= NOT_ACT ;
        end if;

-- ************************************************************
-- Generate enet4
-- ************************************************************

        if (reset = ACT) then
            enet4  <= NOT_ACT ;
        elsif (scan_vector(4) = ACT and cut_thru_begin = ACT) then
            enet4  <= ACT ;
        elsif (ct_active(4) = ACT and unload(4) = NOT_ACT) then
            enet4  <= ACT ;
        elsif (ct_active(4) = ACT and cont_scan = NOT_ACT) then
            enet4  <= ACT ;
        else
```

```
Aug 17 10:50 1994  Who: johnf  File: /c2/local_user/bma/bma_rbsm/bma_rbsm_lib/rbsm_ct_active.vhd Page 7

         enet4 <= NOT_ACT ;
      end if;

-- ***********************************************************
-- Generate enet5
-- ***********************************************************

      if (reset = ACT) then
         enet5  <= NOT_ACT ;
      elsif (scan_vector(5) = ACT and cut_thru_begin = ACT) then
         enet5  <= ACT ;
      elsif (ct_active(5) = ACT and unload(5) = NOT_ACT) then
         enet5  <= ACT ;
      elsif (ct_active(5) = ACT and cont_scan = NOT_ACT) then
         enet5  <= ACT ;
      else
         enet5 <= NOT_ACT ;
      end if;

-- ***********************************************************
-- Generate enet6
-- ***********************************************************

      if (reset = ACT) then
         enet6  <= NOT_ACT ;
      elsif (scan_vector(6) = ACT and cut_thru_begin = ACT) then
         enet6  <= ACT ;
      elsif (ct_active(6) = ACT and unload(6) = NOT_ACT) then
         enet6  <= ACT ;
      elsif (ct_active(6) = ACT and cont_scan = NOT_ACT) then
         enet6  <= ACT ;
      else
         enet6 <= NOT_ACT
      end if;

-- ***********************************************************
-- Generate enet7
-- ***********************************************************

      if (reset = ACT) then
         enet7  <= NOT_ACT ;
      elsif (scan_vector(7) = ACT and cut_thru_begin = ACT) then
         enet7  <= ACT ;
      elsif (ct_active(7) = ACT and unload(7) = NOT_ACT) then
         enet7  <= ACT ;
      elsif (ct_active(7) = ACT and cont scan = NOT_ACT) then
         enet7  <= ACT ;
      else
         enet7 <= NOT_ACT ;
      end if;

-- ***********************************************************
-- Generate enet8
-- ***********************************************************

      if (reset = ACT) then

Aug 17 10:50 1994  Who: johnf  File: /c2/local_user/bma/bma_rbsm/bma_rbsm_lib/rbsm_ct_active.vhd Page 8

         enet8  <= NOT_ACT ;
      elsif (scan_vector(8) = ACT and cut_thru_begin = ACT) then
         enet8  <= ACT ;
      elsif (ct_active(8) = ACT and unload(8) = NOT_ACT) then
         enet8  <= ACT ;
      elsif (ct_active(8) = ACT and cont scan = NOT_ACT) then
         enet8  <= ACT ;
      else
         enet8 <= NOT_ACT ;
      end if;

-- ***********************************************************
-- Generate enet9
-- ***********************************************************

      if (reset = ACT) then
         enet9  <= NOT_ACT ;
      elsif (scan_vector(9) = ACT and cut_thru_begin = ACT) then
         enet9  <= ACT ;
      elsif (ct_active(9) = ACT and unload(9) = NOT_ACT) then
         enet9  <= ACT ;
      elsif (ct_active(9) = ACT and cont_scan = NOT_ACT) then
         enet9  <= ACT ;
      else
         enet9 <= NOT_ACT ;
      end if;

-- ***********************************************************
-- Generate enet10
-- ***********************************************************

      if (reset = ACT) then
         enet10  <= NOT_ACT ;
      elsif (scan_vector(10) = ACT and cut_thru_begin = ACT) then
         enet10  <= ACT ;
      elsif (ct_active(10) = ACT and unload(10) = NOT_ACT) then
         enet10  <= ACT ;
      elsif (ct_active(10) = ACT and cont_scan = NOT_ACT) then
         enet10  <= ACT ;
      else
         enet10 <= NOT_ACT ;
      end if;

-- ***********************************************************
-- Generate enet11
-- ***********************************************************

      if (reset = ACT) then
         enet11  <= NOT_ACT ;
      elsif (scan_vector(11) = ACT and cut_thru_begin = ACT) then
         enet11  <= ACT ;
      elsif (ct_active(11) = ACT and unload(11) = NOT_ACT) then
         enet11  <= ACT ;
      elsif (ct_active(11) = ACT and cont scan = NOT_ACT) then
         enet11  <= ACT ;
      else
         enet11 <= NOT_ACT ;
```

Aug 17 10:50 1994 Who: johnf File: /c2/local_user/bma/bma_rbsm/bma_rbsm_lib/rbsm_ct_active.vhd Page 9

```
	end if;

-- ============================================================
-- Generate enet12
-- ============================================================

	if (reset = ACT) then
	    enet12  <= NOT_ACT ;
	elsif (scan_vector(12) = ACT and cut_thru_begin = ACT) then
	    enet12  <= ACT ;
	elsif (ct_active(12) = ACT and unload(12) = NOT_ACT) then
	    enet12  <= ACT ;
	elsif (ct_active(12) = ACT and cont_scan = NOT_ACT) then
	    enet12  <= ACT ;
	else
	    enet12 <= NOT_ACT ;
	end if;

-- ============================================================
-- Generate enet13
-- ============================================================

	if (reset = ACT) then
	    enet13  <= NOT_ACT ;
	elsif (scan_vector(13) = ACT and cut_thru_begin = ACT) then
	    enet13  <= ACT ;
	elsif (ct_active(13) = ACT and unload(13) = NOT_ACT) then
	    enet13  <= ACT ;
	elsif (ct_active(13) = ACT and cont_scan = NOT_ACT) then
	    enet13  <= ACT ;
	else
	    enet13 <= NOT_ACT ;
	end if;

-- ============================================================
-- Generate enet14
-- ============================================================

	if (reset = ACT) then
	    enet14  <= NOT_ACT ;
	elsif (scan_vector(14) = ACT and cut_thru_begin = ACT) then
	    enet14  <= ACT ;
	elsif (ct_active(14) = ACT and unload(14) = NOT_ACT) then
	    enet14  <= ACT ;
	elsif (ct_active(14) = ACT and cont_scan = NOT_ACT) then
	    enet14  <= ACT ;
	else
	    enet14 <= NOT_ACT ;
	end if;

-- ============================================================
-- Generate enet15
-- ============================================================

	if (reset = ACT) then
	    enet15  <= NOT_ACT ;
```

Aug 17 10:50 1994 Who: johnf File: /c2/local_user/bma/bma_rbsm/bma_rbsm_lib/rbsm_ct_active.vhd Page 10

```
	elsif (scan_vector(15) = ACT and cut_thru_begin = ACT) then
	    enet15  <= ACT ;
	elsif (ct_active(15) = ACT and unload(15) = NOT_ACT) then
	    enet15  <= ACT ;
	elsif (ct_active(15) = ACT and cont_scan = NOT_ACT) then
	    enet15  <= ACT ;
	else
	    enet15 <= NOT_ACT ;
	end if;


end process rbsm_ct_active_comb;


--
-- process rbsm_src_ct is used to generate the combinatorial logic
-- used to indicate that the source port being scanned is in cut
-- thru mode and the cut thru begin code vector has already been
-- passed to the uP.
--

rbsm_src_ct:
process(scan_vector,ct_active)
begin

    if (scan_vector(0) = ACT and ct_active(0) = ACT) then
	src_ct_active <= ACT ;
    elsif (scan_vector(1) = ACT and ct_active(1) = ACT) then
	src_ct_active <= ACT ;
    elsif (scan_vector(2) = ACT and ct_active(2) = ACT) then
	src_ct_active <= ACT ;
    elsif (scan_vector(3) = ACT and ct_active(3) = ACT) then
	src_ct_active <= ACT ;
    elsif (scan_vector(4) = ACT and ct_active(4) = ACT) then
	src_ct_active <= ACT ;
    elsif (scan_vector(5) = ACT and ct_active(5) = ACT) then
	src_ct_active <= ACT ;
    elsif (scan_vector(6) = ACT and ct_active(6) = ACT) then
	src_ct_active <= ACT ;
    elsif (scan_vector(7) = ACT and ct_active(7) = ACT) then
	src_ct_active <= ACT ;
    elsif (scan_vector(8) = ACT and ct_active(8) = ACT) then
	src_ct_active <= ACT ;
    elsif (scan_vector(9) = ACT and ct_active(9) = ACT) then
	src_ct_active <= ACT ;
    elsif (scan_vector(10) = ACT and ct_active(10) = ACT) then
	src_ct_active <= ACT ;
    elsif (scan_vector(11) = ACT and ct_active(11) = ACT) then
	src_ct_active <= ACT ;
    elsif (scan_vector(12) = ACT and ct_active(12) = ACT) then
	src_ct_active <= ACT ;
    elsif (scan_vector(13) = ACT and ct_active(13) = ACT) then
	src_ct_active <= ACT ;
    elsif (scan_vector(14) = ACT and ct_active(14) = ACT) then
	src_ct_active <= ACT ;
    elsif (scan_vector(15) = ACT and ct_active(15) = ACT) then
	src_ct_active <= ACT ;
    else
```

```
        src_ct_active <= NOT_ACT ;
    end if;

end process rbsm_src_ct;

end synthesize;
```

```
Aug 17 11:01 1994  Who: johnf  File: /c2/local_user/bma/bma_rbsm/bma_rbsm_lib/rbsm_frag.vhd Page 1

-- $Id: rbsm_frag.vhd,v 1.4 93/10/15 12:32:16 johnf Rlsl $
--
--  Author        John A. Flanders
--
--
--  Title         rbsm_frag     :  rbsm_frag is the component used to create the 11 bit fragment
--                                 register which can be programmed by the microprocessor and used
--                                 to set the level at which a received FDDI frame must be fragmented
--                                 before being transmitted out an ETHERNET port.
--
--
--
--
--  Revision History
--
--  7/19/93                        original version
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_frag is
    port(
            clock25           : in std_logic ;   -- system clock
            reset             : in std_logic ;   -- system reset

            rbsm_proc_rq      : in std_logic ;            -- uP request       (from microprocessor interface)
            rbsm_proc_wena    : in std_logic ;            -- uP write enable  (from microprocessor interface)
            rbsm_proc_ack     : in std_logic ;            -- uP acknowledge   (from rbsm_ram_control)
            rbsm_proc_addr    : in processor_address_bus ; -- uP read/write address
            frag_reg_wdata    : in FRAG_REG_DATA ;          -- uP write data (from microprocessor interface)
            frame_byte_count  : in BYTE_CNT   ;           -- from rbsm_status_registers

            fragment_frame    : buffer std_logic      ; -- to rbsm_trans_code and rbsm_code_vectors
            frag_register     : buffer FRAG_REG_DATA ; -- extra output
            frag_reg_rdata    : buffer FRAG_REG_DATA ) ; -- to microprocessor interface

end rbsm_frag ;


------------------------------------------------------------
------------------------------------------------------------
```

```
Aug 17 11:01 1994  Who: johnf  File: /c2/local_user/bma/bma_rbsm/bma_rbsm_lib/rbsm_frag.vhd Page 2

architecture synthesize of rbsm_frag is

begin

frag_reg_rdata <= frag_register ;

rbsm_frag_sync:
process
begin

    wait until clock25 = '1';

--
-- Process used to generate the 11 bit wide fragment
-- register.
--

    if (reset = ACT) then
        frag_register <= (others => '0') ;
    elsif (rbsm_proc_addr = FRAG_ADDR and rbsm_proc_wena = ACT and
           rbsm_proc_ack = ACT and rbsm_proc_rq = ACT) then
        frag_register <= frag_reg_wdata ;
    else
        frag_register <= frag_register ;
    end if;

end process rbsm_frag_sync ;

rbsm_frag_comb:
process(frag_register,frame_byte_count)

    variable operand : BYTE_CNT ;

begin

--
-- Process used to generate the fragment frame signal
-- which indicates that the FDDI received frame byte
-- count is greater than the programmed fragment threshold.
--

    operand(12 downto 11) := "00" ;
    operand(10 downto 0)  := frag_register ;

    if (frame_byte_count > operand) then
        fragment_frame <= ACT ;
    else
        fragment_frame <= NOT_ACT ;
    end if;

end process rbsm_frag_comb ;

end synthesize;
```

Aug 17 11 01 1994 Who johnf File /c2/local user/bma/bma_rbsm/bma_rbsm_lib/rbsm_frag.vhd Page 3

```
Aug 17 11.04 1994  Who: johnf  File  /c2/local_user/bma/bma_rbsm/bma_rbsm_lib/rbsm_multi_buffer vhd Page 1

-- $Id: rbsm_multi_buffer vhd,v 1.6 93/10/15 12 32:28 johnf Exp $
--
--  Author  :   John A. Flanders
--
--
--  Title       rbsm multi_buffer  : rbsm_multi_buffer is the receive buffer state machine component used to
--                                   determine if the receive frame consumed more than one buffer.
--                                   If more than one buffer is consumed by the frame the Receive Status
--                                   will be unloaded once for each buffer used but the AMA Status will
--                                   only be unloaded when the End Of Frame is reached. Only FDDI frames
--                                   are allowed by the DMA Controller to consume more than one buffer.
--                                   Ethernet frames are not allowed to consume more than one buffer.
--
--
--
--  Revision History
--
--  6/24/93 .                   original version
--
--
--
--
--

library synopsys ;
library ieee ;
library bma lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all,


entity rbsm_multi_buffer is
    port(
          clock25            : in std_logic  : -- system clock
          reset              . in std_logic    -- system reset
          cont_scan          : in std_logic    -- from rbsm_stat_control
          rx_end_of_buffer   : in std logic    -- rx_stat_reg(16)
          rd_state0          : in std_logic    -- from rbsm_stat_control
          rd_state1          : in std_logic  . -- from rbsm_stat_control
          scan_vector16        in std_logic    -- from rbsm_scanner
          scan_vector17        in std_logic  . -- from rbsm_scanner
          scan_vector18        in std_logic  . -- from rbsm_scanner
          scan_vector19      : in std_logic  . -- from rbsm_scanner
          unload16           : in std_logic  : -- from rbsm_unload
          unload17           . in std_logic  : -- from rbsm_unload
          not_first          . in FPORT_VEC  : -- from rbsm_not_first
          fddi_multi_buffer  : buffer std_logic : -- to rbsm_code_vectors
          multi_buffer       : buffer FPORT_VEC   ) ;

end rbsm_multi_buffer:
```

```
Aug 17 11:04 1994  Who: johnf  File: /c2/local_user/bma/bma_rbsm/bma_rbsm_lib/rbsm_multi_buffer.vhd Page 2



------------------------------------------------------------
------------------------------------------------------------


architecture synthesize of rbsm_multi_buffer is

-- declarations


signal fddi1          : std_logic :
signal fddi2          : std_logic :



------------------------------------------------------------
-- body
------------------------------------------------------------

begin


--
--  process rbsm_multi_sync is used to generate the registered outputs
--  which will be used to inhibit unloading of the AMA Status Queue until
--  the NIU Receive Status is available.
--

rbsm_multi_sync:
process
begin
    wait until clock25 = '1'      ;

        multi_buffer(1) <= fddi2   ;
        multi_buffer(0) <= fddi1   ;


end process rbsm_multi_sync :

--
-- process rbsm_multi_comb is used to generate the combinatorial logic
-- required for the 2 flops generated by this model.
--

 bsm_multi_comb:
 rocess(reset,cont_scan,scan_vector16,scan_vector17,scan_vector18,scan_vector19,
        rx_end_of_buffer,unload16,unload17,multi_buffer,rd_state0,rd_state1,not_first)
begin


-- ***********************************************************
-- Generate fddi1
-- ***********************************************************
```

Aug 17 11:04 1994 Who: johnf File: /c2/local_user/bma/bma_rbsm/bma_rbsm_lib/rbsm_multi_buffer.vhd Page 3

```
        if (reset = ACT) then
            fddi1  <= NOT_ACT
        elsif (scan_vector16 = ACT and rx_end_of_buffer = ACT and
                rd_state0 = ACT and rd_state1 = NOT_ACT) then
            fddi1  <= ACT ;
        elsif (scan_vector17 = ACT and rx_end_of_buffer = ACT and
                rd_state0 = ACT and rd_state1 = NOT_ACT) then
            fddi1  <= ACT ;
        elsif (multi_buffer(0) = ACT and unload16 = NOT_ACT) then
            fddi1  <= ACT ;
        elsif (multi_buffer(0) = ACT and cont_scan = NOT_ACT) then
            fddi1  <= ACT ;
        else
            fddi1 <= NOT_ACT ;
        end if

-- ************************************************************
-- Generate fddi2
-- ************************************************************

        if (reset = ACT) then
            fddi2  <= NOT_ACT ;
        elsif (scan_vector18 = ACT and rx_end_of_buffer = ACT and
                rd_state0 = ACT and rd_state1 = NOT_ACT) then
            fddi2  <= ACT ;
        elsif (scan_vector19 = ACT and rx_end_of_buffer = ACT and
                rd_state0 = ACT and rd_state1 = NOT_ACT) then
            fddi2  <= ACT ;
        elsif (multi_buffer(1) = ACT and unload17 = NOT_ACT) then
            fddi2  <= ACT ;
        elsif (multi_buffer(1) = ACT and cont_scan = NOT_ACT) then
            fddi2  <= ACT ;
        else
            fddi2 <= NOT_ACT ;
        end if

-- ************************************************************
-- Generate fddi_multi_buffer : combinational only
-- ************************************************************

        if ((scan_vector16 = ACT or scan_vector17 = ACT) and
             (multi_buffer(0) = ACT or not first(0) = ACT)) then
            fddi_multi_buffer <= ACT ;
        elsif ((scan_vector18 = ACT or scan_vector19 = ACT) and
                (multi_buffer(1) = ACT or not_first(1) = ACT)) then
            fddi_multi_buffer <= ACT ;
        else
            fddi_multi_buffer <= NOT ACT ;
        end if;

end process rbsm_multi_comb;

end synthesize;
```

Aug 17 11:04 1994 Who: johnf File: /c2/local_user/bma/bma_rbsm/bma_rbsm_lib/rbsm_multi_buffer.vhd Page 4

Aug 17 11 04 1994 Who: johnf File: /c2/local user/bma/bma_rbsm/bma_rbsm_lib/rbsm_not_first vhd Page 1

```
-- $Id: rbsm_not_first.vhd,v 1.7 93/10/15 12.32 43 johnf Exp $
--
--  Author      John A  Flanders
--
--
--  Title       rbsm not first     rbsm_not_first is the receive buffer state machine component used to
--                                 inform other RBSM control blocks that this frame is consuming more
--                                 than one buffer. More than one buffer should only be used by FDDI
--                                 frames. Ethernet frames should never consume more than one 2Kbyte
--                                 buffer even if the frame is in error and greater than 2Kbytes long
--                                 The DMA Controller will ensure that no more than one buffer will
--                                 be used by the Ethernet Frame.
--
--
--
--  Revision History
--
--  6/29/93                        original version
--
--
--
--
--

library synopsys ;
library ieee ;
library bma_lib;
library bma_rbsm_lib;

use synopsys attributes.all,
use ieee.std_logic_1164.all,
use ieee.std logic_arith.all;
use ieee.std_logic_unsigned.all;
use ieee.std_logic_misc.all;
use bma lib.bma_types.all;
use bma_rbsm lib bma_rbsm_types.all;



entity rbsm_not_first is
    port(
        clock25          in std_logic   . -- system clock
        reset            in std_logic   : -- system reset
        cont_scan        in std_logic   : -- from rbsm_stat control
        scan_vector16  : in std_logic   . -- from rbsm_scanner
        scan_vector17  : in std_logic   : -- from rbsm_scanner
        scan_vector18  : in std_logic   : -- from rbsm_scanner
        scan_vector19  : in std_logic   . -- from rbsm_scanner
        unload           in port_vector    . -- from rbsm_unload
        multi_buffer     in FPORT_VEC   ; -- from rbsm_multi_buffer
        not_first        buffer FPORT_VEC   ) ;

end rbsm_not_first;


-------------------------------------------------------------
-------------------------------------------------------------
```

Aug 17 11:04 1994 Who: johnf File: /c2/local_user/bma/bma_rbsm/bma_rbsm_lib/rbsm_not_first.vhd Page 2

```
architecture synthesize of rbsm_not_first is

-- declarations

signal fddi1            std_logic .
signal fddi2            std_logic :



-------------------------------------------------------------
-- body
-------------------------------------------------------------

begin

--
--  process rbsm_not_first_sync is used to generate the registered outputs
--  which will be used to determine if more than one buffer for a frame is
--  being used
--

rbsm_not_first_sync:
process
begin
    wait until clock25 = '1'       :

        not_first[1] <= fddi2    :
        not_first(0) <= fddi1    :

end process rbsm_not_first_sync ;

--
-- process rbsm_not first_comb is used to generate the combinatorial logic
-- required for all 2 flops generated by this model.
--

rbsm_not_first_comb:
process(reset,cont_scan,scan_vector16,scan_vector17,scan_vector18,scan_vector19,
        unload,multi_buffer,not_first)
begin

-- ==========================================================
-- Generate fddi1
-- ==========================================================

        if (reset = ACT) then
            fddi1  <= NOT_ACT :
        elsif (scan_vector18 = ACT and multi_buffer(0) = ACT and
               cont_scan = ACT and not_first[0] = NOT_ACT) then
            fddi1  <= ACT :
```

```
        elsif (scan_vector17 = ACT and multi_buffer(0) = ACT and
                cont_scan = ACT and not_first(0) = NOT_ACT) then
            fddi1  <= ACT ;
        elsif (not_first(0) = ACT and unload(16) = NOT_ACT) then
            fddi1  <= ACT ;
        elsif (not_first(0) = ACT and cont_scan = NOT_ACT) then
            fddi1  <= ACT ;
        else
            fddi1 <= NOT_ACT ;
        end if;


-- ==========================================================
-- Generate fddi2
-- ==========================================================

        if (reset = ACT) then
            fddi2  <= NOT_ACT ;
        elsif (scan_vector18 = ACT and multi_buffer(1) = ACT and
                cont_scan = ACT and not_first(1) = NOT_ACT) then
            fddi2  <= ACT ;
        elsif (scan_vector19 = ACT and multi_buffer(1) = ACT and
                cont_scan = ACT and not_first(1) = NOT_ACT) then
            fddi2  <= ACT ;
        elsif (not_first(1) = ACT and unload(17) = NOT_ACT) then
            fddi2  <= ACT ;
        elsif (not_first(1) = ACT and cont_scan = NOT_ACT) then
            fddi2  <= ACT ;
        else
            fddi2 <= NOT_ACT ;
        end if;


end process rbsm_not_first_comb;

end synthesize;
```

```
Aug 17 11.04 1994  Who: johnf  File. /c2/local_user/bma/bma rbsm/bma rbsm lib/rbsm_port regs a vhd Page 1

-- $Id. rbsm_port_regs_a vhd.v 1 3 93/10/15 12:32:57 johnf Exp $
--
--  Author       John A. Flanders
--
--
--  Title   :   rbsm_port_regs a        rbsm_port_regs_a is the component used to generate 6 sixteen
--                                      bit wide registers  used to store configuration
--                                      information which is used by the RBSM to generate code
--                                      vectors  There is exactly one register per port which can be
--                                      written to or read by the microprocessor. Whenever the uP
--                                      reads one of these registers the 16 most significant bits
--                                      will always be driven to zero
--                                      This module is used to create the port configuration
--                                      registers for Ethernet ports 12 thru 15 and FDDI ports 0 and 1.
--
--
--
--
--
--
--  Revision History
--
--  9/2/93 .                        original version
--
--

library synopsys ;
library ieee ;
library bma_lib;
library bma_rbsm_lib;

use synopsys.attributes.all.
use ieee.std_logic_1164.all;
use ieee.std_logic_arith.all;
use ieee.std_logic_unsigned.all;
use ieee.std_logic_misc.all;
use bma lib.bma_types.all;
use bma_rbsm_lib.bma_rbsm_types.all;


entity rbsm_port_regs_a is
     port(
          clock25                in std_logic   . -- system clock
          reset                  in std_logic   ; -- system reset

          rbsm_proc rq           in std_logic   : -- microprocessor rbsm request
          rbsm_proc_wena       : in std_logic   . -- microprocessor write enable
          reg_write_data       : in RBSM_REGISTER_DATA : -- uP write data
          rbsm_proc_addr       · in processor_address_bus ; -- uP address
          rbsm_proc_ack        : in std_logic   : -- microprocessor acknowledge


          ct_enable_a              : buffer PORT_CONFIG   : -- cut thru enable bits
          ct_multicast_enable_a      buffer PORT_CONFIG   : -- multicast cut thru enable bits
          rx_disable_a             · buffer PORT_CONFIG   : -- receive port disable bits
          rx_multicast_disable_a   : buffer PORT_CONFIG   : -- receive port multicast disable bits
          tx_disable_a             : buffer PORT_CONFIG   : -- transmit port disable bits
          tx_multicast_disable_a   : buffer PORT_CONFIG   : -- transmit port multicast disable bits
          port_blocking_a          : buffer PORT_CONFIG   ; -- port blocking bits

Aug 17 11:04 1994  Who: johnf  File: /c2/local_user/bma/bma_rbsm/bma_rbsm_lib/rbsm_port_regs_a.vhd Page 2

          port_not_forwarding_a    : buffer PORT_CONFIG   : -- port not forwarding bits
          rx_filter_a              : buffer PORT_CONFIG   : -- receive port filter bits
          rx_multicast_filter_a    : buffer PORT_CONFIG   : -- receive port multicast filter bits
          tx_filter_a              : buffer PORT_CONFIG   ; -- transmit port filter bits
          tx_multicast_filter_a    : buffer PORT_CONFIG   : -- transmit port multicast filter bits
          monitor_enable_a         : buffer PORT_CONFIG   : -- monitor enable bits
          port_type_msb_a          : buffer PORT_CONFIG   : -- most significant port type bits
          port_type_mid_a          : buffer PORT_CONFIG   : -- middle  port type bits
          port_type_lsb_a          · buffer PORT_CONFIG   ; -- least significant port type bits

          rega_read_data           buffer RBSM_REGISTER_DATA : -- microprocessor read data

          port12_data            . buffer RBSM_REGISTER_DATA ; -- extra outputs
          port13_data            : buffer RBSM_REGISTER_DATA ; -- extra outputs
          port14_data            : buffer RBSM_REGISTER_DATA ; -- extra outputs
          port15_data            : buffer RBSM_REGISTER_DATA : -- extra outputs
          port16_data            : buffer RBSM_REGISTER_DATA ; -- extra outputs
          port17_data              buffer RBSM_REGISTER_DATA ) ; -- extra outputs ·

end rbsm_port_regs_a ;


--------------------------------------------------------------
--------------------------------------------------------------


architecture synthesize of rbsm_port_regs_a is

signal reg12_wr_enable   : std_logic;
signal reg13_wr_enable   : std_logic;
signal reg14_wr_enable   : std_logic;
signal reg15_wr_enable   : std_logic;
signal reg16_wr_enable   : std_logic;
signal reg17_wr_enable   : std_logic;


begin


--
-- Process register_generator is used to generate the 6 sixteen
-- bit registers.
--

 register_generator:
 process
 begin

    wait until clock25 = '1' and clock25'event ;


-- ******************************************
-- Generate port 12 register
-- ******************************************
```

Aug 17 11:04 1994 Who: johnf File: /c2/local_user/bma/bma_rbsm/bma_rbsm_lib/rbsm_port_regs_a.vhd Page 3

```
        if (reset = ACT) then
            port12_data <= (others => '0') ;
        elsif (reg12_wr_enable = ACT) then
            port12_data <= reg_write_data ;
        else
            port12_data <= port12_data ;
        end if;

-- ==========================================
-- Generate port 13 register
-- ==========================================

        if (reset = ACT) then
            port13_data <= (others => '0') ;
        elsif (reg13_wr_enable = ACT) then
            port13_data <= reg_write_data ;
        else
            port13_data <= port13_data ;
        end if;

-- ==========================================
-- Generate port 14 register
-- ==========================================

        if (reset = ACT) then
            port14_data <= (others => '0') ;
        elsif (reg14_wr_enable = ACT) then
            port14_data <= reg_write_data ;
        else
            port14_data <= port14_data ;
        end if;

-- ==========================================
-- Generate port 15 register
-- ==========================================

        if (reset = ACT) then
            port15_data <= (others => '0') ;
        elsif (reg15_wr_enable = ACT) then
            port15_data <= reg_write_data ;
        else
            port15_data <= port15_data ;
        end if;

-- ==========================================
-- Generate port 16 register
-- ==========================================

        if (reset = ACT) then
            port16_data <= (others => '0') ;
        elsif (reg16_wr_enable = ACT) then
            port16_data <= reg_write_data ;
        else
            port16_data <= port16_data ;
        end if;
```

Aug 17 11:04 1994 Who: johnf File: /c2/local_user/bma/bma_rbsm/bma_rbsm_lib/rbsm_port_regs_a.vhd Page 4

```
-- ==========================================
-- Generate port 17 register
-- ==========================================

        if (reset = ACT) then
            port17_data <= (others => '0') ;
        elsif (reg17_wr_enable = ACT) then
            port17_data <= reg_write_data ;
        else
            port17_data <= port17_data ;
        end if;


end process register_generator;

--
-- Process reg_wr_enable is used to create 18 individual write
-- enable signals, one for each register.
--

reg_wr_enable:
process(rbsm_proc_addr,rbsm_proc_rq,rbsm_proc_wena,rbsm_proc_ack)
begin

-- ==========================================
-- Generate port 12 register write enable
-- ==========================================

        if (rbsm_proc_addr = PORT12_ADDR and rbsm_proc_rq = ACT and
            rbsm_proc_wena = ACT and rbsm_proc_ack = ACT) then
            reg12_wr_enable <= ACT ;
        else
            reg12_wr_enable <= NOT_ACT ;
        end if;

-- ==========================================
-- Generate port 13 register write enable
-- ==========================================

        if (rbsm_proc_addr = PORT13_ADDR and rbsm_proc_rq = ACT and
            rbsm_proc_wena = ACT and rbsm_proc_ack = ACT) then
            reg13_wr_enable <= ACT ;
        else
            reg13_wr_enable <= NOT_ACT ;
        end if;

-- ==========================================
-- Generate port 14 register write enable
-- ==========================================

        if (rbsm_proc_addr = PORT14_ADDR and rbsm_proc_rq = ACT and
            rbsm_proc_wena = ACT and rbsm_proc_ack = ACT) then
            reg14_wr_enable <= ACT ;
```

```
Aug 17 11:04 1994  Who: johnf  File: /c2/local_user/bma/bma_rbsm/bma_rbsm_lib/rbsm_port_regs_a.vhd Page 5

        else
            reg14_wr_enable <= NOT_ACT ;
        end if;

-- ==========================================
-- Generate port 15 register write enable
-- ==========================================

        if (rbsm_proc_addr = PORT15_ADDR and rbsm_proc_rq = ACT and
            rbsm_proc_wena = ACT and rbsm_proc_ack = ACT) then
            reg15_wr_enable <= ACT ;
        else
            reg15_wr_enable <= NOT_ACT ;
        end if;

-- ==========================================
-- Generate port 16 register write enable
-- ==========================================

        if (rbsm_proc_addr = PORT16_ADDR and rbsm_proc_rq = ACT and
            rbsm_proc_wena = ACT and rbsm_proc_ack = ACT) then
            reg16_wr_enable <= ACT ;
        else
            reg16_wr_enable <= NOT_ACT ;
        end if;

-- ==========================================
-- Generate port 17 register write enable
-- ==========================================

        if (rbsm_proc_addr = PORT17_ADDR and rbsm_proc_rq = ACT and
            rbsm_proc_wena = ACT and rbsm_proc_ack = ACT) then
            reg17_wr_enable <= ACT ;
        else
            reg17_wr_enable <= NOT_ACT ;
        end if;


end process reg_wr_enable ;


--
-- Process reg_read_mux is used to create a 6 to 1 mux for
-- microprocessor register reads.
--
--

reg_read_mux:
process(rbsm_proc_addr,rbsm_proc_rq,rbsm_proc_wena,port12_data,port13_data,port14_data,
        port15_data,port16_data,port17_data)

begin

    if (rbsm_proc_addr = PORT13_ADDR and rbsm_proc_rq = ACT and

Aug 17 11:04 1994  Who: johnf  File: /c2/local_user/bma/bma_rbsm/bma_rbsm_lib/rbsm_port_regs_a.vhd Page 6

           rbsm_proc_wena = NOT_ACT) then

        rega_read_data <= port13_data ;

    elsif (rbsm_proc_addr = PORT14_ADDR and rbsm_proc_rq = ACT and
           rbsm_proc_wena = NOT_ACT) then

        rega_read_data <= port14_data ;

    elsif (rbsm_proc_addr = PORT15_ADDR and rbsm_proc_rq = ACT and
           rbsm_proc_wena = NOT_ACT) then

        rega_read_data <= port15_data ;

    elsif (rbsm_proc_addr = PORT16_ADDR and rbsm_proc_rq = ACT and
           rbsm_proc_wena = NOT_ACT) then

        rega_read_data <= port16_data ;

    elsif (rbsm_proc_addr = PORT17_ADDR and rbsm_proc_rq = ACT and
           rbsm_proc_wena = NOT_ACT) then

        rega_read_data <= port17_data ;

    else

        rega_read_data <= port12_data ;

    end if;

end process reg_read_mux ;


--
-- Organize the output of the port configuration registers into appropriate vectors
-- so as to create some order out of all 288 outputs
--

port_type_msb_a          <= port17_data(15)  & port16_data(15)  & port15_data(15)  &
                            port14_data(15)  & port13_data(15)  & port12_data(15)  ;

port_type_mid_a          <= port17_data(14)  & port16_data(14)  & port15_data(14)  &
                            port14_data(14)  & port13_data(14)  & port12_data(14)  ;

port_type_lsb_a          <= port17_data(13)  & port16_data(13)  & port15_data(13)  &
                            port14_data(13)  & port13_data(13)  & port12_data(13)  ;

monitor_enable_a         <= port17_data(12)  & port16_data(12)  & port15_data(12)  &
                            port14_data(12)  & port13_data(12)  & port12_data(12)  ;

 t_multicast_enable_a    <= port17_data(11)  & port16_data(11)  & port15_data(11)  &
                            port14_data(11)  & port13_data(11)  & port12_data(11)  ;

ct_enable_a              <= port17_data(10)  & port16_data(10)  & port15_data(10)  &
                            port14_data(10)  & port13_data(10)  & port12_data(10)  ;


tx_multicast_filter_a    <= port17_data(9)   & port16_data(9)   & port15_data(9)   &
                            port14_data(9)   & port13_data(9)   & port12_data(9)   ;
```

Aug 17 11:04 1994 Who johnf File /c2/local_user/bma/bma_rbsm/bma_rbsm_lib/rbsm_port_regs_a.vhd Page 7

```
rx_multicast_filter_a      <= port17_data(8)   & port16_data(8)   & port15_data(8)   &
                              port14_data(8)   & port13_data(8)   & port12_data(8)   ;

tx_multicast_disable_a     <= port17_data(7)   & port16_data(7)   & port15_data(7)   &
                              port14_data(7)   & port13_data(7)   & port12_data(7)   ;

rx_multicast_disable_a     <= port17_data(6)   & port16_data(6)   & port15_data(6)   &
                              port14_data(6)   & port13_data(6)   & port12_data(6)   ;

tx_filter_a                <= port17_data(5)   & port16_data(5)   & port15_data(5)   &
                              port14_data(5)   & port13_data(5)   & port12_data(5)   ;

rx_filter_a                <= port17_data(4)   & port16_data(4)   & port15_data(4)   &
                              port14_data(4)   & port13_data(4)   & port12_data(4)   ;

port_not_forwarding_a      <= port17_data(3)   & port16_data(3)   & port15_data(3)   &
                              port14_data(3)   & port13_data(3)   & port12_data(3)   ;

port_blocking_a            <= port17_data(2)   & port16_data(2)   & port15_data(2)   &
                              port14_data(2)   & port13_data(2)   & port12_data(2)   ;

tx_disable_a               <= port17_data(1)   & port16_data(1)   & port15_data(1)   &
                              port14_data(1)   & port13_data(1)   & port12_data(1)   ;

rx_disable_a               <= port17_data(0)   & port16_data(0)   & port15_data(0)   &
                              port14_data(0)   & port13_data(0)   & port12_data(0)   ;

end synthesize;
```

```
Aug 17 11:04 1994  Who: johnf  File: /c2/local_user/bma/bma_rbsm/bma_rbsm_lib/rbsm_port_regs_b.vhd Page 1

-- $Id: rbsm_port_regs_b.vhd,v 1.3 93/10/15 12:33:12 johnf Exp $
--
--  Author :      John A. Flanders
--
--
--  Title        rbsm_port_regs_b         rbsm_port_regs_b is the component used to generate 6 sixteen
--                                        bit wide registers  used to store configuration
--                                        information which is used by the RBSM to generate code
--                                        vectors. There is exactly one register per port which can be
--                                        written to or read by the microprocessor. Whenever the uP
--                                        reads one of these registers the 16 most significant bits
--                                        will always be driven to zero.
--                                        This module is used to create the port configuration
--                                        registers for Ethernet ports 6 thru 11.
--
--
--
--
--
--
--  Revision History
--
--  9/2/93 :                     original version
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_port_regs_b is
    port(
        clock25                in std_logic      -- system clock
        reset                  in std_logic  . -- system reset

        rbsm_proc_rq           in std_logic  . -- microprocessor rbsm request
        rbsm_proc_wena         in std_logic  ; -- microprocessor write enable
        reg_write_data         in RBSM_REGISTER_DATA ; -- uP write data
        rbsm_proc_addr         in processor_address_bus : -- uP address
        rbsm_proc_ack          in std_logic  ; -- microprocessor acknowledge


        ct_enable_b             . buffer PORT_CONFIG  : -- cut thru enable bits
        ct_multicast_enable_b   · buffer PORT_CONFIG  : -- multicast cut thru enable bits
        rx_disable_b            · buffer PORT_CONFIG  : -- receive port disable bits
        rx_multicast_disable_b  : buffer PORT_CONFIG  : -- receive port multicast disable bits
        tx_disable_b            : buffer PORT_CONFIG  ; -- transmit port disable bits
        tx_multicast_disable_b  : buffer PORT_CONFIG  ; -- transmit port multicast disable bits
        port_blocking_b         : buffer PORT_CONFIG  : -- port blocking bits

Aug 17 11:04 1994  Who: johnf  File: /c2/local_user/bma/bma_rbsm/bma_rbsm_lib/rbsm_port_regs_b.vhd Page 2

        port_not_forwarding_b   - buffer PORT_CONFIG  ; -- port not forwarding bits
        rx_filter_b             : buffer PORT_CONFIG  ; -- receive port filter bits
        rx_multicast_filter_b   : buffer PORT_CONFIG  ; -- receive port multicast filter bits
        tx_filter_b             : buffer PORT_CONFIG  ; -- transmit port filter bits
        tx_multicast_filter_b   : buffer PORT_CONFIG  ; -- transmit port multicast filter bits
        monitor_enable_b        : buffer PORT_CONFIG  ; -- monitor enable bits
        port_type_msb_b         : buffer PORT_CONFIG  ; -- most significant port type bits
        port_type_mid_b         : buffer PORT_CONFIG  ; -- middle port type bits
        port_type_lsb_b         : buffer PORT_CONFIG  ; -- least significant port type bits

        regb_read_data         : buffer RBSM_REGISTER_DATA ; -- microprocessor read data

        port6_data             : buffer RBSM_REGISTER_DATA ; -- extra outputs
        port7_data             : buffer RBSM_REGISTER_DATA ; -- extra outputs
        port8_data             : buffer RBSM_REGISTER_DATA ; -- extra outputs
        port9_data             · buffer RBSM_REGISTER_DATA ; -- extra outputs
        port10_data            : buffer RBSM_REGISTER_DATA ; -- extra outputs
        port11_data              buffer RBSM_REGISTER_DATA ) ; -- extra outputs

end rbsm_port_regs_b ;



-----------------------------------------------------------
-----------------------------------------------------------


architecture synthesize of rbsm_port_regs_b is

signal reg6_wr_enable    : std_logic;
signal reg7_wr_enable    : std_logic;
signal reg8_wr_enable    : std_logic;
signal reg9_wr_enable    : std_logic;
signal reg10_wr_enable   : std_logic;
signal reg11_wr_enable   : std_logic;


begin


--
-- Process register_generator is used to generate the 6 sixteen
-- bit registers.
--

 egister_generator:
 'ocess
 egin

    wait until clock25 = '1' and clock25'event ;


-- ****************************************
-- Generate port 6 register
-- ****************************************
```

```
Aug 17 11:04 1994  Who: johnf  File: /c2/local_user/bma/bma_rbsm/bma_rbsm_lib/rbsm_port_regs_b.vhd Page 3

        if (reset = ACT) then
            port6_data <= (others => '0') ;
        elsif (reg6_wr_enable = ACT) then
            port6_data <= reg_write_data   ;
        else
            port6_data <= port6_data       ;
        end if;

-- ******************************************
-- Generate port 7 register
-- ******************************************

        if (reset = ACT) then
            port7_data <= (others => '0') ;
        elsif (reg7_wr_enable = ACT) then
            port7_data <= reg_write_data   ;
        else
            port7_data <= port7_data       ;
        end if;

-- ******************************************
-- Generate port 8 register
-- ******************************************

        if (reset = ACT) then
            port8_data <= (others => '0') ;
        elsif (reg8_wr_enable = ACT) then
            port8_data <= reg_write_data   ;
        else
            port8_data <= port8_data       ;
        end if;

-- ******************************************
-- Generate port 9 register
-- ******************************************

        if (reset = ACT) then
            port9_data <= (others => '0') ;
        elsif (reg9_wr_enable = ACT) then
            port9_data <= reg_write_data   ;
        else
            port9_data <= port9_data       ;
        end if;

-- ******************************************
-- Generate port 10 register
-- ******************************************

        if (reset = ACT) then
            port10_data <= (others => '0') ;
        elsif (reg10_wr_enable = ACT) then
            port10_data <= reg_write_data   ;
        else
            port10_data <= port10_data
        end if;
```

```
Aug 17 11:04 1994  Who: johnf  File: /c2/local_user/bma/bma_rbsm/bma_rbsm_lib/rbsm_port_regs_b.vhd Page 4

-- ******************************************
-- Generate port 11 register
-- ******************************************

        if (reset = ACT) then
            port11_data <= (others => '0') ;
        elsif (reg11_wr_enable = ACT) then
            port11_data <= reg_write_data   ;
        else
            port11_data <= port11_data
        end if;


end process register_generator;

--
-- Process reg_wr_enable is used to create 18 individual write
-- enable signals, one for each register.
--

reg_wr_enable:
process(rbsm_proc_addr,rbsm_proc_rq,rbsm_proc_wena,rbsm_proc_ack)
begin

-- ******************************************
-- Generate port 6 register write enable
-- ******************************************

        if (rbsm_proc_addr = PORT6_ADDR and rbsm_proc_rq = ACT and
            rbsm_proc_wena = ACT and rbsm_proc_ack = ACT) then
            reg6_wr_enable <= ACT ;
        else
            reg6_wr_enable <= NOT_ACT ;
        end if;

-- ******************************************
-- Generate port 7 register write enable
-- ******************************************

        if (rbsm_proc_addr = PORT7_ADDR and rbsm_proc_rq = ACT and
            rbsm_proc_wena = ACT and rbsm_proc_ack = ACT) then
            reg7_wr_enable <= ACT ;
        else
            reg7_wr_enable <= NOT_ACT ;
        end if;

-- ******************************************
-- Generate port 8 register write enable
-- ******************************************

        if (rbsm_proc_addr = PORT8_ADDR and rbsm_proc_rq = ACT and
            rbsm_proc_wena = ACT and rbsm_proc_ack = ACT) then
            reg8_wr_enable <= ACT ;
```

```
Aug 17 11:04 1994  Who  johnf  File  /c2/local user/bma/bma rbsm/bma_rbsm_lib/rbsm_port_regs_b vhd Page 5

        else
            reg8_wr_enable <= NOT_ACT
        end if;

-- ****************************************************
-- Generate port 9 register write enable
-- ****************************************************

        if (rbsm_proc_addr = PORT9 ADDR and rbsm_proc_rq = ACT and
            rbsm_proc_wena = ACT and rbsm_proc_ack = ACT) then
            reg9_wr_enable <= ACT ;
        else
            reg9_wr_enable <= NOT_ACT .
        end if

-- ****************************************************
-- Generate port 10 register write enable
-- ****************************************************

        if (rbsm_proc_addr = PORT10_ADDR and rbsm proc rq = ACT and
            rbsm_proc_wena = ACT and rbsm_proc_ack = ACT) then
            reg10_wr_enable <= ACT ;
        else
            reg10_wr_enable <= NOT_ACT ;
        end if;

-- ****************************************************
-- Generate port 11 register write enable
-- ****************************************************

        if (rbsm_proc_addr = PORT11_ADDR and rbsm proc_rq = ACT and
            rbsm_proc_wena = ACT and rbsm proc ack = ACT) then
            reg11_wr_enable <= ACT ;
        else
            reg11_wr_enable <= NOT_ACT .
        end if;



end process reg_wr_enable;


--
-- Process reg read_mux is used to create a 6 to 1 mux for
-- microprocessor register reads.
--
--

reg_read_mux:
process(rbsm_proc_addr,rbsm_proc_rq,rbsm_proc_wena,port6 data,port7_data,port8_data,
        port9_data,port10_data,port11_data)

begin

    if (rbsm_proc_addr = PORT7_ADDR and rbsm_proc_rq = ACT and

Aug 17 11:04 1994  Who: johnf  File: /c2/local_user/bma/bma_rbsm/bma_rbsm_lib/rbsm_port_regs_b.vhd Page 6

           rbsm_proc_wena = NOT_ACT) then

        regb_read_data <= port7_data ;

    elsif (rbsm_proc_addr = PORT8_ADDR and rbsm_proc_rq = ACT and
           rbsm_proc_wena = NOT_ACT) then

        regb_read_data <= port8_data ;

    elsif (rbsm_proc_addr = PORT9_ADDR and rbsm_proc_rq = ACT and
           rbsm_proc_wena = NOT_ACT) then

        regb_read_data <= port9_data ,

    elsif (rbsm_proc_addr = PORT10_ADDR and rbsm_proc_rq = ACT and
           rbsm_proc_wena = NOT_ACT) then

        regb_read_data <= port10_data ,

    elsif (rbsm_proc_addr = PORT11_ADDR and rbsm_proc_rq = ACT and
           rbsm_proc_wena = NOT_ACT) then

        regb_read_data <= port11_data


    else

        regb_read_data <= port6_data ;

    end if;

end process reg_read_mux ;


--
-- Organize the output of the port configuration registers into appropriate vectors
-- so as to create some order out of all 288 outputs
--


port_type_msb_b           <= port11_data(15)  & port10_data(15)  & port9_data(15)  &
                             port8_data(15)   & port7_data(15)   & port6_data(15)  ;

port_type_mid_b           <= port11_data(14)  & port10_data(14)  & port9_data(14)  &
                             port8_data(14)   & port7_data(14)   & port6_data(14)  ;

port_type_lsb_b           <= port11_data(13)  & port10_data(13)  & port9_data(13)  &
                             port8_data(13)   & port7_data(13)   & port6_data(13)  ;

 onitor_enable_b          <= port11_data(12)  & port10_data(12)  & port9_data(12)  &
                             port8_data(12)   & port7_data(12)   & port6_data(12)  ;

ct_multicast_enable_b     <= port11_data(11)  & port10_data(11)  & port9_data(11)  &
                             port8_data(11)   & port7_data(11)   & port6_data(11)  ;

ct_enable_b               <= port11_data(10)  & port10_data(10)  & port9_data(10)  &
                             port8_data(10)   & port7_data(10)   & port6_data(10)  ;


tx_multicast_filter_b     <= port11_data(9)   & port10_data(9)   & port9_data(9)   &
```

```
Aug 17 11:04 1994  Who: johnf  File  /c2/local_user/bma/bma_rbsm/bma rbsm_lib/rbsm_port_regs_b.vhd Page 7

                             port8_data(9)     & port7_data(9)     & port6_data(9)     ;

rx_multicast_filter_b     <= port11_data(8)    & port10_data(8)    & port9_data(8)     &
                             port8_data(8)     & port7_data(8)     & port6_data(8)     ;

tx_multicast_disable_b    <= port11_data(7)    & port10_data(7)    & port9_data(7)     &
                             port8_data(7)     & port7_data(7)     & port6_data(7)     ;

rx_multicast_disable_b    <= port11_data(6)    & port10_data(6)    & port9_data(6)     &
                             port8_data(6)     & port7_data(6)     & port6_data(6)     ;

tx_filter_b               <= port11_data(5)    & port10_data(5)    & port9_data(5)     &
                             port8_data(5)     & port7_data(5)     & port6_data(5)     ;

rx_filter_b               <= port11_data(4)    & port10_data(4)    & port9_data(4)     &
                             port8_data(4)     & port7_data(4)     & port6_data(4)     ;

port_not_forwarding_b     <= port11_data(3)    & port10_data(3)    & port9_data(3)     &
                             port8_data(3)     & port7_data(3)     & port6_data(3)     ;

port_blocking_b           <= port11_data(2)    & port10_data(2)    & port9_data(2)     &
                             port8_data(2)     & port7_data(2)     & port6_data(2)     ;

tx_disable_b              <= port11_data(1)    & port10_data(1)    & port9_data(1)     &
                             port8_data(1)     & port7_data(1)     & port6_data(1)     ;

rx_disable_b              <= port11_data(0)    & port10_data(0)    & port9_data(0)     &
                             port8_data(0)     & port7_data(0)     & port6_data(0)     ;

end synthesize;
```

```
Aug 17 11:04 1994  Who: johnf  File: /c2/local_user/bma/bma_rbsm/bma_rbsm_lib/rbsm_port_regs_c.vhd Page 1

-- $Id: rbsm_port_regs_c.vhd,v 1.3 93/10/15 12:33:37 johnf Exp $
--
--  Author  :    John A  Flanders
--
--
--  Title     rbsm_port_regs_c  :     rbsm_port_regs_c is the component used to generate 6 sixteen
--                                    bit wide registers  used to store configuration
--                                    information which is used by the RBSM to generate code
--                                    vectors. There is exactly one register per port which can be
--                                    written to or read by the microprocessor. Whenever the uP
--                                    reads one of these registers the 16 most significant bits
--                                    will always be driven to zero.
--                                    This module is used to create the port configuration
--                                    registers for Ethernet ports 0 thru 5.
--
--
--
--
--
--
--  Revision History
--
--  9/2/93                     original version
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_port_regs_c is
    port(
        clock25                 : in std_logic  ; -- system clock
        reset                   : in std_logic  ; -- system reset

        rbsm_proc_rq            : in std_logic  ; -- microprocessor rbsm request
        rbsm_proc_wena          : in std_logic  ; -- microprocessor write enable
        reg_write_data          : in RBSM_REGISTER_DATA ; -- uP write data
        rbsm_proc_addr          : in processor_address_bus ; -- uP address
        rbsm_proc_ack           : in std_logic  ; -- microprocessor acknowledge

        ct_enable_c             : buffer PORT_CONFIG  ; -- cut thru enable bits
        ct_multicast_enable_c   : buffer PORT_CONFIG  ; -- multicast cut thru enable bits
        rx_disable_c            : buffer PORT_CONFIG  ; -- receive port disable bits
        rx_multicast_disable_c  : buffer PORT_CONFIG  ; -- receive port multicast disable bits
        tx_disable_c            : buffer PORT_CONFIG  ; -- transmit port disable bits
        tx_multicast_disable_c  : buffer PORT_CONFIG  ; -- transmit port multicast disable bits
        port_blocking_c         : buffer PORT_CONFIG  ; -- port blocking bits

Aug 17 11:04 1994  Who: johnf  File: /c2/local_user/bma/bma_rbsm/bma_rbsm_lib/rbsm_port_regs_c.vhd Page 2

        port_not_forwarding_c   : buffer PORT_CONFIG  ; -- port not forwarding bits
        rx_filter_c             : buffer PORT_CONFIG  ; -- receive port filter bits
        rx_multicast_filter_c   : buffer PORT_CONFIG  ; -- receive port multicast filter bits
        tx_filter_c             : buffer PORT_CONFIG  ; -- transmit port filter bits
        tx_multicast_filter_c   : buffer PORT_CONFIG  ; -- transmit port multicast filter bits
        monitor_enable_c        : buffer PORT_CONFIG  ; -- monitor enable bits
        port_type_msb_c         : buffer PORT_CONFIG  ; -- most significant port type bits
        port_type_mid_c         : buffer PORT_CONFIG  ; -- middle  port type bits
        port_type_lsb_c         : buffer PORT_CONFIG  ; -- least significant port type bits

        regc_read_data          : buffer RBSM_REGISTER_DATA ; -- microprocessor read data

        port0_data              : buffer RBSM_REGISTER_DATA ; -- extra outputs
        port1_data              : buffer RBSM_REGISTER_DATA ; -- extra outputs
        port2_data              : buffer RBSM_REGISTER_DATA ; -- extra outputs
        port3_data              : buffer RBSM_REGISTER_DATA ; -- extra outputs
        port4_data              : buffer RBSM_REGISTER_DATA ; -- extra outputs
        port5_data              : buffer RBSM_REGISTER_DATA ) ; -- extra outputs

end rbsm_port_regs_c ;



--------------------------------------------------------------
--------------------------------------------------------------


architecture synthesize of rbsm_port_regs_c is

signal reg0_wr_enable    : std_logic;
signal reg1_wr_enable    : std_logic;
signal reg2_wr_enable    : std_logic;
signal reg3_wr_enable    : std_logic;
signal reg4_wr_enable    : std_logic;
signal reg5_wr_enable    : std_logic;


begin


--
-- Process register_generator is used to generate the 6 sixteen
-- bit registers.
--

 egister_generator:
 rocess
 egin

    wait until clock25 = '1' and clock25'event ;

-- ******************************************
-- Generate port 0 register
-- ******************************************

        if (reset = ACT) then
```

```
Aug 17 11:04 1994  Who: johnf  File: /c2/local_user/bma/bma_rbsm/bma_rbsm_lib/rbsm_port_regs_c.vhd Page 3

            port0_data <= (others => '0') ;
        elsif (reg0_wr_enable = ACT) then
            port0_data <= reg_write_data ;
        else
            port0_data <= port0_data     ;
        end if;

-- ******************************************
-- Generate port 1 register
-- ******************************************

        if (reset = ACT) then
            port1_data <= (others => '0') ;
        elsif (reg1_wr_enable = ACT) then
            port1_data <= reg_write_data ;
        else
            port1_data <= port1_data     ;
        end if;

-- ******************************************
-- Generate port 2 register
-- ******************************************

        if (reset = ACT) then
            port2_data <= (others => '0') ;
        elsif (reg2_wr_enable = ACT) then
            port2_data <= reg_write_data ;
        else
            port2_data <= port2_data     ;
        end if;

-- ******************************************
-- Generate port 3 register
-- ******************************************

        if (reset = ACT) then
            port3_data <= (others => '0') ;
        elsif (reg3_wr_enable = ACT) then
            port3_data <= reg_write_data ;
        else
            port3_data <= port3_data     ;
        end if;

-- ******************************************
-- Generate port 4 register
-- ******************************************

        if (reset = ACT) then
            port4_data <= (others => '0') ;
        elsif (reg4_wr_enable = ACT) then
            port4_data <= reg_write_data ;
        else
            port4_data <= port4_data     ;
        end if;
```

```
Aug 17 11:04 1994  Who: johnf  File: /c2/local_user/bma/bma_rbsm/bma_rbsm_lib/rbsm_port_regs_c.vhd Page 4

-- ******************************************
-- Generate port 5 register
-- ******************************************

        if (reset = ACT) then
            port5_data <= (others => '0') ;
        elsif (reg5_wr_enable = ACT) then
            port5_data <= reg_write_data ;
        else
            port5_data <= port5_data     ;
        end if;


end process register_generator;


--
-- Process reg_wr_enable is used to create 18 individual write
-- enable signals, one for each register.
--

reg_wr_enable:
process(rbsm_proc_addr,rbsm_proc_rq,rbsm_proc_wena,rbsm_proc_ack)
begin

-- ******************************************
-- Generate port 0 register write enable
-- ******************************************

        if (rbsm_proc_addr = PORT0_ADDR and rbsm_proc_rq = ACT and
            rbsm_proc_wena = ACT and rbsm_proc_ack = ACT) then
            reg0_wr_enable <= ACT ;
        else
            reg0_wr_enable <= NOT_ACT ;
        end if;

-- ******************************************
-- Generate port 1 register write enable
-- ******************************************

        if (rbsm_proc_addr = PORT1_ADDR and rbsm_proc_rq = ACT and
            rbsm_proc_wena = ACT and rbsm_proc_ack = ACT) then
            reg1_wr_enable <= ACT ;
        else
            reg1_wr_enable <= NOT_ACT ;
        end if;

-- ******************************************
-- Generate port 2 register write enable
-- ******************************************

        if (rbsm_proc_addr = PORT2_ADDR and rbsm_proc_rq = ACT and
            rbsm_proc_wena = ACT and rbsm_proc_ack = ACT) then
            reg2_wr_enable <= ACT ;
        else
            reg2_wr_enable <= NOT_ACT ;
        end if;
```

```
Aug 17 11:04 1994  Who  johnf  File: /c2/local_user/bma/bma_rbsm/bma_rbsm_lib/rbsm_port_regs_c.vhd Page 5


-- ==========================================
-- Generate port 3 register write enable
-- ==========================================

        if (rbsm_proc_addr = PORT3_ADDR and rbsm_proc_rq = ACT and
            rbsm_proc_wena = ACT and rbsm_proc_ack = ACT) then
            reg3_wr_enable <= ACT ;
        else
            reg3_wr_enable <= NOT_ACT ;
        end if;

-- ==========================================
-- Generate port 4 register write enable
-- ==========================================

        if (rbsm_proc_addr = PORT4_ADDR and rbsm_proc_rq = ACT and
            rbsm_proc_wena = ACT and rbsm_proc_ack = ACT) then
            reg4_wr_enable <= ACT ;
        else
            reg4_wr_enable <= NOT_ACT ;
        end if;

-- ==========================================
-- Generate port 5 register write enable
-- ==========================================

        if (rbsm_proc_addr = PORT5_ADDR and rbsm_proc_rq = ACT and
            rbsm_proc_wena = ACT and rbsm_proc_ack = ACT) then
            reg5_wr_enable <= ACT ;
        else
            reg5_wr_enable <= NOT_ACT ;
        end if;


end process reg_wr_enable;

--
-- Process reg_read_mux is used to create a 6 to 1 mux for
-- microprocessor register reads.
--
--

reg_read_mux:
process(rbsm_proc_addr,rbsm_proc_rq,rbsm_proc_wena,port0_data,port1_data,port2_data,
        port3_data,port4_data,port5_data)

begin

    if (rbsm_proc_addr = PORT1_ADDR and rbsm_proc_rq = ACT and
        rbsm_proc_wena = NOT_ACT) then

        regc_read_data <= port1_data ;

    elsif (rbsm_proc_addr = PORT2_ADDR and rbsm_proc_rq = ACT and

Aug 17 11:04 1994  Who  johnf  File: /c2/local_user/bma/bma_rbsm/bma_rbsm_lib/rbsm_port_regs_c.vhd Page 6

           rbsm_proc_wena = NOT_ACT) then

        regc_read_data <= port2_data ;

    elsif (rbsm_proc_addr = PORT3_ADDR and rbsm_proc_rq = ACT and
           rbsm_proc_wena = NOT_ACT) then

        regc_read_data <= port3_data ;

    elsif (rbsm_proc_addr = PORT4_ADDR and rbsm_proc_rq = ACT and
           rbsm_proc_wena = NOT_ACT) then

        regc_read_data <= port4_data ;

    elsif (rbsm_proc_addr = PORT5_ADDR and rbsm_proc_rq = ACT and
           rbsm_proc_wena = NOT_ACT) then

        regc_read_data <= port5_data ;

    else

        regc_read_data <= port0_data ;

    end if;

end process reg_read_mux ;


--
-- Organize the output of the port configuration registers into appropriate vectors
-- so as to create some order out of all 288 outputs
--

port_type_msb_c          <= port5_data(15)  & port4_data(15)  & port3_data(15)  &
                            port2_data(15)  & port1_data(15)  & port0_data(15)  ;

port_type_mid_c          <= port5_data(14)  & port4_data(14)  & port3_data(14)  &
                            port2_data(14)  & port1_data(14)  & port0_data(14)  ;

port_type_lsb_c          <= port5_data(13)  & port4_data(13)  & port3_data(13)  &
                            port2_data(13)  & port1_data(13)  & port0_data(13)  ;

monitor_enable_c         <= port5_data(12)  & port4_data(12)  & port3_data(12)  &
                            port2_data(12)  & port1_data(12)  & port0_data(12)  ;

ct_multicast_enable_c    <= port5_data(11)  & port4_data(11)  & port3_data(11)  &
                            port2_data(11)  & port1_data(11)  & port0_data(11)  ;

 t_enable_c              <= port5_data(10)  & port4_data(10)  & port3_data(10)  &
                            port2_data(10)  & port1_data(10)  & port0_data(10)  ;


tx_multicast_filter_c    <= port5_data(9)   & port4_data(9)   & port3_data(9)   &
                            port2_data(9)   & port1_data(9)   & port0_data(9)   ;


rx_multicast_filter_c    <= port5_data(8)   & port4_data(8)   & port3_data(8)   &
                            port2_data(8)   & port1_data(8)   & port0_data(8)   ;
```

Aug 17 11 04 1994 Who johnf File /c2/local_user/bma/bma rbsm/bma rbsm_lib/rbsm_port_regs_c.vhd Page 7

```
tx_multicast_disable_c    <= port5_data(7)   & port4_data(7)   & port3_data(7)   &
                             port2_data(7)   & port1_data(7)   & port0_data(7)   ;

rx_multicast_disable_c    <= port5_data(6)   & port4_data(6)   & port3_data(6)   &
                             port2_data(6)   & port1_data(6)   & port0_data(6)   ;

tx_filter_c               <= port5_data(5)   & port4_data(5)   & port3_data(5)   &
                             port2_data(5)   & port1_data(5)   & port0_data(5)   ;

rx_filter_c               <= port5_data(4)   & port4_data(4)   & port3_data(4)   &
                             port2_data(4)   & port1_data(4)   & port0_data(4)   ;

port_not_forwarding_c     <= port5_data(3)   & port4_data(3)   & port3_data(3)   &
                             port2_data(3)   & port1_data(3)   & port0_data(3)   ;

port_blocking_c           <= port5_data(2)   & port4_data(2)   & port3_data(2)   &
                             port2_data(2)   & port1_data(2)   & port0_data(2)   ;

tx_disable_c              <= port5_data(1)   & port4_data(1)   & port3_data(1)   &
                             port2_data(1)   & port1_data(1)   & port0_data(1)   ;

rx_disable_c              <= port5_data(0)   & port4_data(0)   & port3_data(0)   &
                             port2_data(0)   & port1_data(0)   & port0_data(0)   ;

end synthesize.
```

```
Aug 17 11:04 1994  Who: johnf  File: /c2/local_user/bma/bma_rbsm/bma_rbsm_lib/rbsm_port_regs_mux.vhd Page 1

-- $Id: rbsm_port_regs_mux.vhd,v 1.3 93/10/15 12:33:51 johnf Exp $
--
--  Author      John A. Flanders
--
--
--  Title       rbsm_port_regs_mux  :   rbsm_port_regs_mux is the component used to generate a
--                                      3to1 mux by 16 used to select the correct port register
--                                      output data
--
--
--
--
--
--
--  Revision History
--
--  9/2/93                  original version
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_port_regs_mux is
    port(

        rbsm_proc_rq              : in std_logic  ; -- microprocessor rbsm request
        rbsm_proc_addr            : in processor_address_bus ; -- uP address

        rega_read_data            : in RBSM_REGISTER_DATA ;
        regb_read_data            : in RBSM_REGISTER_DATA ;
        regc_read_data            : in RBSM_REGISTER_DATA ;

        ct_enable_a               : in PORT_CONFIG  ; -- cut thru enable bits
        ct_multicast_enable_a     : in PORT_CONFIG  ; -- multicast cut thru enable bits
        rx_disable_a              : in PORT_CONFIG  ; -- receive port disable bits
        rx_multicast_disable_a    : in PORT_CONFIG  ; -- receive port multicast disable bits
        tx_disable_a              : in PORT_CONFIG  ; -- transmit port disable bits
        tx_multicast_disable_a    : in PORT_CONFIG  ; -- transmit port multicast disable bits
        port_blocking_a           : in PORT_CONFIG  ; -- port blocking bits
        port_not_forwarding_a     : in PORT_CONFIG  ; -- port not forwarding bits
        rx_filter_a               : in PORT_CONFIG  ; -- receive port filter bits
        rx_multicast_filter_a     : in PORT_CONFIG  ; -- receive port multicast filter bits
        tx_filter_a               : in PORT_CONFIG  ; -- transmit port filter bits
        tx_multicast_filter_a     : in PORT_CONFIG  ; -- transmit port multicast filter bits
        monitor_enable_a          : in PORT_CONFIG  ; -- monitor enable bits
        port_type_msb_a           : in PORT_CONFIG  ; -- most significant port type bits
        port_type_mid_a           : in PORT_CONFIG  ; -- middle  port type bits

Aug 17 11:04 1994  Who: johnf  File: /c2/local_user/bma/bma_rbsm/bma_rbsm_lib/rbsm_port_regs_mux.vhd Page 2

        port_type_lsb_a           : in PORT_CONFIG  ; -- least significant port type bits

        ct_enable_b               : in PORT_CONFIG  ; -- cut thru enable bits
        ct_multicast_enable_b     : in PORT_CONFIG  ; -- multicast cut thru enable bits
        rx_disable_b              : in PORT_CONFIG  ; -- receive port disable bits
        rx_multicast_disable_b    : in PORT_CONFIG  ; -- receive port multicast disable bits
        tx_disable_b              : in PORT_CONFIG  ; -- transmit port disable bits
        tx_multicast_disable_b    : in PORT_CONFIG  ; -- transmit port multicast disable bits
        port_blocking_b           : in PORT_CONFIG  ; -- port blocking bits
        port_not_forwarding_b     : in PORT_CONFIG  ; -- port not forwarding bits
        rx_filter_b               : in PORT_CONFIG  ; -- receive port filter bits
        rx_multicast_filter_b     : in PORT_CONFIG  ; -- receive port multicast filter bits
        tx_filter_b               : in PORT_CONFIG  ; -- transmit port filter bits
        tx_multicast_filter_b     : in PORT_CONFIG  ; -- transmit port multicast filter bits
        monitor_enable_b          : in PORT_CONFIG  ; -- monitor enable bits
        port_type_msb_b           : in PORT_CONFIG  ; -- most significant port type bits
        port_type_mid_b           : in PORT_CONFIG  ; -- middle  port type bits
        port_type_lsb_b           : in PORT_CONFIG  ; -- least significant port type bits

        ct_enable_c               : in PORT_CONFIG  ; -- cut thru enable bits
        ct_multicast_enable_c     : in PORT_CONFIG  ; -- multicast cut thru enable bits
        rx_disable_c              : in PORT_CONFIG  ; -- receive port disable bits
        rx_multicast_disable_c    : in PORT_CONFIG  ; -- receive port multicast disable bits
        tx_disable_c              : in PORT_CONFIG  ; -- transmit port disable bits
        tx_multicast_disable_c    : in PORT_CONFIG  ; -- transmit port multicast disable bits
        port_blocking_c           : in PORT_CONFIG  ; -- port blocking bits
        port_not_forwarding_c     : in PORT_CONFIG  ; -- port not forwarding bits
        rx_filter_c               : in PORT_CONFIG  ; -- receive port filter bits
        rx_multicast_filter_c     : in PORT_CONFIG  ; -- receive port multicast filter bits
        tx_filter_c               : in PORT_CONFIG  ; -- transmit port filter bits
        tx_multicast_filter_c     : in PORT_CONFIG  ; -- transmit port multicast filter bits
        monitor_enable_c          : in PORT_CONFIG  ; -- monitor enable bits
        port_type_msb_c           : in PORT_CONFIG  ; -- most significant port type bits
        port_type_mid_c           : in PORT_CONFIG  ; -- middle  port type bits
        port_type_lsb_c           : in PORT_CONFIG  ; -- least significant port type bits

        ct_enable               : buffer port_vector  ; -- cut thru enable bits
        ct_multicast_enable     : buffer port_vector  ; -- multicast cut thru enable bits
        rx_disable              : buffer port_vector  ; -- receive port disable bits
        rx_multicast_disable    : buffer port_vector  ; -- receive port multicast disable bits
        tx_disable              : buffer port_vector  ; -- transmit port disable bits
        tx_multicast_disable    : buffer port_vector  ; -- transmit port multicast disable bits
        port_blocking           : buffer port_vector  ; -- port blocking bits
        port_not_forwarding     : buffer port_vector  ; -- port not forwarding bits
        rx_filter               : buffer port_vector  ; -- receive port filter bits
        rx_multicast_filter     : buffer port_vector  ; -- receive port multicast filter bits
        tx_filter               : buffer port_vector  ; -- transmit port filter bits
        tx_multicast_filter     : buffer port_vector  ; -- transmit port multicast filter bits
        monitor_enable          : buffer port_vector  ; -- monitor enable bits
        port_type_msb           : buffer port_vector  ; -- most significant port type bits
        port_type_mid           : buffer port_vector  ; -- middle  port type bits
        port_type_lsb           : buffer port_vector  ; -- least significant port type bits

        reg_read_data           : buffer RBSM_REGISTER_DATA ) ; -- microprocessor read data

end rbsm_port_regs_mux ;
```

```
Aug 17 11:04 1994  Who: johnf  File: /c2/local_user/bma/bma_rbsm/bma_rbsm_lib/rbsm_port_regs_mux.vhd Page 3

---------------------------------------------------------------
---------------------------------------------------------------

architecture synthesize of rbsm_port_regs_mux is

signal select_regs_a      std_logic ;
signal select_regs_b      std_logic ;

begin

-- CT_ENABLE

ct_enable(17)          <= ct_enable_a(5)     ;
ct_enable(16)          <= ct_enable_a(4)     ;
ct_enable(15)          <= ct_enable_a(3)     ;
ct_enable(14)          <= ct_enable_a(2)     ;
ct_enable(13)          <= ct_enable_a(1)     ;
ct_enable(12)          <= ct_enable_a(0)     ;

ct_enable(11)          <= ct_enable_b(5)     ;
ct_enable(10)          <= ct_enable_b(4)     ;
ct_enable(9)           <= ct_enable_b(3)     ;
ct_enable(8)           <= ct_enable_b(2)     ;
ct_enable(7)           <= ct_enable_b(1)     ;
ct_enable(6)           <= ct_enable_b(0)     ;

ct_enable(5)           <= ct_enable_c(5)     ;
ct_enable(4)           <= ct_enable_c(4)     ;
ct_enable(3)           <= ct_enable_c(3)     ;
ct_enable(2)           <= ct_enable_c(2)     ;
ct_enable(1)           <= ct_enable_c(1)     ;
ct_enable(0)           <= ct_enable_c(0)     ;

-- CT_MULTICAST_ENABLE

ct_multicast_enable(17)          <= ct_multicast_enable_a(5)     ;
ct_multicast_enable(16)          <= ct_multicast_enable_a(4)     ;
ct_multicast_enable(15)          <= ct_multicast_enable_a(3)     ;
ct_multicast_enable(14)          <= ct_multicast_enable_a(2)     ;
ct_multicast_enable(13)          <= ct_multicast_enable_a(1)     ;
ct_multicast_enable(12)          <= ct_multicast_enable_a(0)     ;

ct_multicast_enable(11)          <= ct_multicast_enable_b(5)     ;
ct_multicast_enable(10)          <= ct_multicast_enable_b(4)     ;
ct_multicast_enable(9)           <= ct_multicast_enable_b(3)     ;
ct_multicast_enable(8)           <= ct_multicast_enable_b(2)     ;
ct_multicast_enable(7)           <= ct_multicast_enable_b(1)     ;
ct_multicast_enable(6)           <= ct_multicast_enable_b(0)     ;

ct_multicast_enable(5)           <= ct_multicast_enable_c(5)     ;
ct_multicast_enable(4)           <= ct_multicast_enable_c(4)     ;
```

```
Aug 17 11:04 1994  Who: johnf  File: /c2/local_user/bma/bma_rbsm/bma_rbsm_lib/rbsm_port_regs_mux.vhd Page 4

ct_multicast_enable(3)           <= ct_multicast_enable_c(3)     ;
ct_multicast_enable(2)           <= ct_multicast_enable_c(2)     ;
ct_multicast_enable(1)           <= ct_multicast_enable_c(1)     ;
ct_multicast_enable(0)           <= ct_multicast_enable_c(0)     ;

-- RX_DISABLE

rx_disable(17)         <= rx_disable_a(5)     ;
rx_disable(16)         <= rx_disable_a(4)     ;
rx_disable(15)         <= rx_disable_a(3)     ;
rx_disable(14)         <= rx_disable_a(2)     ;
rx_disable(13)         <= rx_disable_a(1)     ;
rx_disable(12)         <= rx_disable_a(0)     ;

rx_disable(11)         <= rx_disable_b(5)     ;
rx_disable(10)         <= rx_disable_b(4)     ;
rx_disable(9)          <= rx_disable_b(3)     ;
rx_disable(8)          <= rx_disable_b(2)     ;
rx_disable(7)          <= rx_disable_b(1)     ;
rx_disable(6)          <= rx_disable_b(0)     ;

rx_disable(5)          <= rx_disable_c(5)     ;
rx_disable(4)          <= rx_disable_c(4)     ;
rx_disable(3)          <= rx_disable_c(3)     ;
rx_disable(2)          <= rx_disable_c(2)     ;
rx_disable(1)          <= rx_disable_c(1)     ;
rx_disable(0)          <= rx_disable_c(0)     ;

-- RX_MULTICAST_DISABLE

rx_multicast_disable(17)         <= rx_multicast_disable_a(5)     ;
rx_multicast_disable(16)         <= rx_multicast_disable_a(4)     ;
rx_multicast_disable(15)         <= rx_multicast_disable_a(3)     ;
rx_multicast_disable(14)         <= rx_multicast_disable_a(2)     ;
rx_multicast_disable(13)         <= rx_multicast_disable_a(1)     ;
rx_multicast_disable(12)         <= rx_multicast_disable_a(0)     ;

rx_multicast_disable(11)         <= rx_multicast_disable_b(5)     ;
rx_multicast_disable(10)         <= rx_multicast_disable_b(4)     ;
rx_multicast_disable(9)          <= rx_multicast_disable_b(3)     ;
rx_multicast_disable(8)          <= rx_multicast_disable_b(2)     ;
rx_multicast_disable(7)          <= rx_multicast_disable_b(1)     ;
rx_multicast_disable(6)          <= rx_multicast_disable_b(0)     ;

rx_multicast_disable(5)          <= rx_multicast_disable_c(5)     ;
rx_multicast_disable(4)          <= rx_multicast_disable_c(4)     ;
rx_multicast_disable(3)          <= rx_multicast_disable_c(3)     ;
 _multicast_disable(2)           <= rx_multicast_disable_c(2)     ;
  multicast_disable(1)           <= rx_multicast_disable_c(1)     ;
x_multicast_disable(0)           <= rx_multicast_disable_c(0)     ;

-- TX_DISABLE

tx_disable(17)         <= tx_disable_a(5)     ;
tx_disable(16)         <= tx_disable_a(4)     ;
tx_disable(15)         <= tx_disable_a(3)     ;
tx_disable(14)         <= tx_disable_a(2)     ;
```

```
tx_disable(13)          <= tx_disable_a(1)
tx_disable(12)          <= tx_disable_a(0)

tx_disable(11)          <= tx_disable_b(5)
tx_disable(10)          <= tx_disable_b(4)
tx_disable(9)           <= tx_disable_b(3)
tx_disable(8)           <= tx_disable_b(2)
tx_disable(7)           <= tx_disable_b(1)
tx_disable(6)           <= tx_disable_b(0)

tx_disable(5)           <= tx_disable_c(5)
tx_disable(4)           <= tx_disable_c(4)     ;
tx_disable(3)           <= tx_disable_c(3)     ;
tx_disable(2)           <= tx_disable_c(2)     ;
tx_disable(1)           <= tx_disable_c(1)     ;
tx_disable(0)           <= tx_disable_c(0)     ;

-- TX_MULTICAST_DISABLE

tx_multicast_disable(17)      <= tx_multicast_disable_a(5)     ;
tx_multicast_disable(16)      <= tx_multicast_disable_a(4)     ;
tx_multicast_disable(15)      <= tx_multicast_disable_a(3)     ;
tx_multicast_disable(14)      <= tx_multicast_disable_a(2)     ;
tx_multicast_disable(13)      <= tx_multicast_disable_a(1)     ;
tx_multicast_disable(12)      <= tx_multicast_disable_a(0)     ;

tx_multicast_disable(11)      <= tx_multicast_disable_b(5)     ;
tx_multicast_disable(10)      <= tx_multicast_disable_b(4)     ;
tx_multicast_disable(9)       <= tx_multicast_disable_b(3)     ;
tx_multicast_disable(8)       <= tx_multicast_disable_b(2)     ;
tx_multicast_disable(7)       <= tx_multicast_disable_b(1)     ;
tx_multicast_disable(6)       <= tx_multicast_disable_b(0)     ;

tx_multicast_disable(5)       <= tx_multicast_disable_c(5)     ;
tx_multicast_disable(4)       <= tx_multicast_disable_c(4)     ;
tx_multicast_disable(3)       <= tx_multicast_disable_c(3)     ;
tx_multicast_disable(2)       <= tx_multicast_disable_c(2)     ;
tx_multicast_disable(1)       <= tx_multicast_disable_c(1)     ;
tx_multicast_disable(0)       <= tx_multicast_disable_c(0)     ;

-- RX_FILTER

rx_filter(17)           <= rx_filter_a(5)      ;
rx_filter(16)           <= rx_filter_a(4)      ;
rx_filter(15)           <= rx_filter_a(3)      ;
rx_filter(14)           <= rx_filter_a(2)      ;
rx_filter(13)           <= rx_filter_a(1)      ;
rx_filter(12)           <= rx_filter_a(0)      ;

rx_filter(11)           <= rx_filter_b(5)      ;
rx_filter(10)           <= rx_filter_b(4)      ;
rx_filter(9)            <= rx_filter_b(3)      ;
rx_filter(8)            <= rx_filter_b(2)      ;
rx_filter(7)            <= rx_filter_b(1)      ;
rx_filter(6)            <= rx_filter_b(0)      ;

rx_filter(5)            <= rx_filter_c(5)      ;
```

```
rx_filter(4)            <= rx_filter_c(4)      ;
rx_filter(3)            <= rx_filter_c(3)      ;
rx_filter(2)            <= rx_filter_c(2)      ;
rx_filter(1)            <= rx_filter_c(1)      ;
rx_filter(0)            <= rx_filter_c(0)      ;

-- RX_MULTICAST_FILTER

rx_multicast_filter(17)       <= rx_multicast_filter_a(5)      ;
rx_multicast_filter(16)       <= rx_multicast_filter_a(4)      ;
rx_multicast_filter(15)       <= rx_multicast_filter_a(3)      ;
rx_multicast_filter(14)       <= rx_multicast_filter_a(2)      ;
rx_multicast_filter(13)       <= rx_multicast_filter_a(1)      ;
rx_multicast_filter(12)       <= rx_multicast_filter_a(0)      ;

rx_multicast_filter(11)       <= rx_multicast_filter_b(5)      ;
rx_multicast_filter(10)       <= rx_multicast_filter_b(4)      ;
rx_multicast_filter(9)        <= rx_multicast_filter_b(3)      ;
rx_multicast_filter(8)        <= rx_multicast_filter_b(2)      ;
rx_multicast_filter(7)        <= rx_multicast_filter_b(1)      ;
rx_multicast_filter(6)        <= rx_multicast_filter_b(0)      ;

rx_multicast_filter(5)        <= rx_multicast_filter_c(5)      ;
rx_multicast_filter(4)        <= rx_multicast_filter_c(4)      ;
rx_multicast_filter(3)        <= rx_multicast_filter_c(3)      ;
rx_multicast_filter(2)        <= rx_multicast_filter_c(2)      ;
rx_multicast_filter(1)        <= rx_multicast_filter_c(1)      ;
rx_multicast_filter(0)        <= rx_multicast_filter_c(0)      ;

-- TX_FILTER

tx_filter(17)           <= tx_filter_a(5)      ;
tx_filter(16)           <= tx_filter_a(4)      ;
tx_filter(15)           <= tx_filter_a(3)      ;
tx_filter(14)           <= tx_filter_a(2)      ;
tx_filter(13)           <= tx_filter_a(1)      ;
tx_filter(12)           <= tx_filter_a(0)      ;

tx_filter(11)           <= tx_filter_b(5)      ;
tx_filter(10)           <= tx_filter_b(4)      ;
tx_filter(9)            <= tx_filter_b(3)      ;
tx_filter(8)            <= tx_filter_b(2)      ;
tx_filter(7)            <= tx_filter_b(1)      ;
tx_filter(6)            <= tx_filter_b(0)      ;

tx_filter(5)            <= tx_filter_c(5)      ;
tx_filter(4)            <= tx_filter_c(4)      ;
tx_filter(3)            <= tx_filter_c(3)      ;
tx_filter(2)            <= tx_filter_c(2)      ;
tx_filter(1)            <= tx_filter_c(1)      ;
tx_filter(0)            <= tx_filter_c(0)      ;

-- TX_MULTICAST_FILTER
```

Aug 17 11:04 1994 Who: johnf File /c2/local_user/bma/bma_rbsm/bma_rbsm_lib/rbsm_port_regs_mux.vhd Page 7

```
tx_multicast_filter(17)          <= tx_multicast_filter_a(5)   ;
tx_multicast_filter(16)          <= tx_multicast_filter_a(4)   ;
tx_multicast_filter(15)          <= tx_multicast_filter_a(3)   ;
tx_multicast_filter(14)          <= tx_multicast_filter_a(2)   ;
tx_multicast_filter(13)          <= tx_multicast_filter_a(1)   ;
tx_multicast_filter(12)          <= tx_multicast_filter_a(0)   ;

tx_multicast_filter(11)          <= tx_multicast_filter_b(5)   ;
tx_multicast_filter(10)          <= tx_multicast_filter_b(4)   ;
tx_multicast_filter(9)           <= tx_multicast_filter_b(3)   ;
tx_multicast_filter(8)           <= tx_multicast_filter_b(2)   ;
tx_multicast_filter(7)           <= tx_multicast_filter_b(1)   ;
tx_multicast_filter(6)           <= tx_multicast_filter_b(0)   ;

tx_multicast_filter(5)           <= tx_multicast_filter_c(5)   ;
tx_multicast_filter(4)           <= tx_multicast_filter_c(4)   ;
tx_multicast_filter(3)           <= tx_multicast_filter_c(3)   ;
tx_multicast_filter(2)           <= tx_multicast_filter_c(2)   ;
tx_multicast_filter(1)           <= tx_multicast_filter_c(1)   ;
tx_multicast_filter(0)           <= tx_multicast_filter_c(0)   ;


-- PORT_BLOCKING

port_blocking(17)        <= port_blocking_a(5)    ;
port_blocking(16)        <= port_blocking_a(4)    ;
port_blocking(15)        <= port_blocking_a(3)    ;
port_blocking(14)        <= port_blocking_a(2)    ;
port_blocking(13)        <= port_blocking_a(1)    ;
port_blocking(12)        <= port_blocking_a(0)    ;

port_blocking(11)        <= port_blocking_b(5)    ;
port_blocking(10)        <= port_blocking_b(4)    ;
port_blocking(9)         <= port_blocking_b(3)    ;
port_blocking(8)         <= port_blocking_b(2)    ;
port_blocking(7)         <= port_blocking_b(1)    ;
port_blocking(6)         <= port_blocking_b(0)    ;

port_blocking(5)         <= port_blocking_c(5)    ;
port_blocking(4)         <= port_blocking_c(4)    ;
port_blocking(3)         <= port_blocking_c(3)    ;
port_blocking(2)         <= port_blocking_c(2)    ;
port_blocking(1)         <= port_blocking_c(1)    ;
port_blocking(0)         <= port_blocking_c(0)    ;


-- PORT_NOT_FORWARDING

port_not_forwarding(17)          <= port_not_forwarding_a(5)    ;
port_not_forwarding(16)          <= port_not_forwarding_a(4)    ;
port_not_forwarding(15)          <= port_not_forwarding_a(3)    ;
port_not_forwarding(14)          <= port_not_forwarding_a(2)    ;
port_not_forwarding(13)          <= port_not_forwarding_a(1)    ;
port_not_forwarding(12)          <= port_not_forwarding_a(0)    ;

port_not_forwarding(11)          <= port_not_forwarding_b(5)    ;
port_not_forwarding(10)          <= port_not_forwarding_b(4)    ;
```

Aug 17 11:04 1994 Who: johnf File: /c2/local_user/bma/bma_rbsm/bma_rbsm_lib/rbsm_port_regs_mux.vhd Page 8

```
port_not_forwarding(9)           <= port_not_forwarding_b(3)    ;
port_not_forwarding(8)           <= port_not_forwarding_b(2)    ;
port_not_forwarding(7)           <= port_not_forwarding_b(1)    ;
port_not_forwarding(6)           <= port_not_forwarding_b(0)    ;

port_not_forwarding(5)           <= port_not_forwarding_c(5)    ;
port_not_forwarding(4)           <= port_not_forwarding_c(4)    ;
port_not_forwarding(3)           <= port_not_forwarding_c(3)    ;
port_not_forwarding(2)           <= port_not_forwarding_c(2)    ;
port_not_forwarding(1)           <= port_not_forwarding_c(1)    ;
port_not_forwarding(0)           <= port_not_forwarding_c(0)    ;


-- MONITOR_ENABLE

monitor_enable(17)          <= monitor_enable_a(5)     ;
monitor_enable(16)          <= monitor_enable_a(4)     ;
monitor_enable(15)          <= monitor_enable_a(3)     ;
monitor_enable(14)          <= monitor_enable_a(2)     ;
monitor_enable(13)          <= monitor_enable_a(1)     ;
monitor_enable(12)          <= monitor_enable_a(0)     ;

monitor_enable(11)          <= monitor_enable_b(5)     ;
monitor_enable(10)          <= monitor_enable_b(4)     ;
monitor_enable(9)           <= monitor_enable_b(3)     ;
monitor_enable(8)           <= monitor_enable_b(2)     ;
monitor_enable(7)           <= monitor_enable_b(1)     ;
monitor_enable(6)           <= monitor_enable_b(0)     ;

monitor_enable(5)           <= monitor_enable_c(5)     ;
monitor_enable(4)           <= monitor_enable_c(4)     ;
monitor_enable(3)           <= monitor_enable_c(3)     ;
monitor_enable(2)           <= monitor_enable_c(2)     ;
monitor_enable(1)           <= monitor_enable_c(1)     ;
monitor_enable(0)           <= monitor_enable_c(0)     ;


-- PORT_TYPE_MSB

port_type_msb(17)          <= port_type_msb_a(5)     ;
port_type_msb(16)          <= port_type_msb_a(4)     ;
port_type_msb(15)          <= port_type_msb_a(3)     ;
port_type_msb(14)          <= port_type_msb_a(2)     ;
port_type_msb(13)          <= port_type_msb_a(1)     ;
port_type_msb(12)          <= port_type_msb_a(0)     ;

port_type_msb(11)          <= port_type_msb_b(5)     ;
port_type_msb(10)          <= port_type_msb_b(4)     ;
port_type_msb(9)           <= port_type_msb_b(3)     ;
port_type_msb(8)           <= port_type_msb_b(2)     ;
port_type_msb(7)           <= port_type_msb_b(1)     ;
port_type_msb(6)           <= port_type_msb_b(0)     ;

port_type_msb(5)           <= port_type_msb_c(5)     ;
port_type_msb(4)           <= port_type_msb_c(4)     ;
port_type_msb(3)           <= port_type_msb_c(3)     ;
port_type_msb(2)           <= port_type_msb_c(2)     ;
port_type_msb(1)           <= port_type_msb_c(1)     ;
```

Aug 17 11:04 1994 Who: johnf File: /c2/local_user/bma/bma_rbsm/bma_rbsm_lib/rbsm_port_regs_mux.vhd Page 9

```
port_type_msb(0)            <= port_type_msb_c(0)      ;

-- PORT_TYPE_MID

port_type_mid(17)           <= port_type_mid_a(5)      ;
port_type_mid(16)           <= port_type_mid_a(4)      ;
port_type_mid(15)           <= port_type_mid_a(3)      ;
port_type_mid(14)           <= port_type_mid_a(2)      ;
port_type_mid(13)           <= port_type_mid_a(1)      ;
port_type_mid(12)           <= port_type_mid_a(0)      ;

port_type_mid(11)           <= port_type_mid_b(5)      ;
port_type_mid(10)           <= port_type_mid_b(4)      ;
port_type_mid(9)            <= port_type_mid_b(3)      ;
port_type_mid(8)            <= port_type_mid_b(2)      ;
port_type_mid(7)            <= port_type_mid_b(1)      ;
port_type_mid(6)            <= port_type_mid_b(0)      ;

port_type_mid(5)            <= port_type_mid_c(5)      ;
port_type_mid(4)            <= port_type_mid_c(4)      ;
port_type_mid(3)            <= port_type_mid_c(3)      ;
port_type_mid(2)            <= port_type_mid_c(2)      ;
port_type_mid(1)            <= port_type_mid_c(1)      ;
port_type_mid(0)            <= port_type_mid_c(0)      ;


-- PORT_TYPE_LSB

port_type_lsb(17)           <= port_type_lsb_a(5)      ;
port_type_lsb(16)           <= port_type_lsb_a(4)      ;
port_type_lsb(15)           <= port_type_lsb_a(3)      ;
port_type_lsb(14)           <= port_type_lsb_a(2)      ;
port_type_lsb(13)           <= port_type_lsb_a(1)      ;
port_type_lsb(12)           <= port_type_lsb_a(0)      ;

port_type_lsb(11)           <= port_type_lsb_b(5)      ;
port_type_lsb(10)           <= port_type_lsb_b(4)      ;
port_type_lsb(9)            <= port_type_lsb_b(3)      ;
port_type_lsb(8)            <= port_type_lsb_b(2)      ;
port_type_lsb(7)            <= port_type_lsb_b(1)      ;
port_type_lsb(6)            <= port_type_lsb_b(0)      ;

port_type_lsb(5)            <= port_type_lsb_c(5)      ;
port_type_lsb(4)            <= port_type_lsb_c(4)      ;
port_type_lsb(3)            <= port_type_lsb_c(3)      ;
port_type_lsb(2)            <= port_type_lsb_c(2)      ;
port_type_lsb(1)            <= port_type_lsb_c(1)      ;
port_type_lsb(0)            <= port_type_lsb_c(0)      ;



--
-- Process register_mux is used to generate a 3 to 1 mux by 16
--
--

register_mux:
```

Aug 17 11:04 1994 Who: johnf File: /c2/local_user/bma/bma_rbsm/bma_rbsm_lib/rbsm_port_regs_mux.vhd Page 10

```
process(rbsm_proc_rq,select_regs_a,select_regs_b,rega_read_data,regb_read_data,
        regc_read_data)
begin
    if (rbsm_proc_rq = ACT and select_regs_a = ACT) then

        reg_read_data <= rega_read_data ;

    elsif (rbsm_proc_rq = ACT and select_regs_b = ACT) then

        reg_read_data <= regb_read_data ;

    else

        reg_read_data <= regc_read_data ;

    end if;

end process register_mux ;

select_a:
process(rbsm_proc_addr)
begin

    case rbsm_proc_addr is

        when PORT12_ADDR => select_regs_a <= ACT ;
        when PORT13_ADDR => select_regs_a <= ACT ;
        when PORT14_ADDR => select_regs_a <= ACT ;
        when PORT15_ADDR => select_regs_a <= ACT ;
        when PORT16_ADDR => select_regs_a <= ACT ;
        when PORT17_ADDR => select_regs_a <= ACT ;

        when others      => select_regs_a <= NOT_ACT ;

    end case;

end process select_a;

select_b:
process(rbsm_proc_addr)
begin

    case rbsm_proc_addr is

        when PORT6_ADDR  => select_regs_b <= ACT ;
        when PORT7_ADDR  => select_regs_b <= ACT ;
        when PORT8_ADDR  => select_regs_b <= ACT ;
        when PORT9_ADDR  => select_regs_b <= ACT ;
        when PORT10_ADDR => select_regs_b <= ACT ;
        when PORT11_ADDR => select_regs_b <= ACT ;

        when others      => select_regs_b <= NOT_ACT ;

    end case;

end process select_b;
```

Aug 17 11 04 1994 Who: johnf File /t2/local user/bma/bma_rbsm/bma_rbsm_lib/rbsm_port_regs_mux.vhd Page 11

```
end synthesize
```

```
Aug 17 11:10 1994  Who: johnf  File: /c2/local_user/bma/bma_rbsm/bma_rbsm_lib/rbsm_qcb.vhd Page 1

-- $Id: rbsm_qcb.vhd,v 1.11 93/11/17 16:34:28 johnf Exp $
--
--  Author   :   John A. Flanders
--
--
--  Title        rbsm_qcb          rbsm_qcb is the RBSM Queue Control Block used to control
--                                 the pointers to the DMA to microprocessor In Queue which
--                                 is used to temporarily store code vectors generated by the
--                                 RBSM
--
--
--
--
--  Revision History
--
--  7/19/93 :                      original version
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_qcb is
    port(
          rbsm_proc_rq       : in std_logic ;           -- uP request       (from microprocessor interface)
          rbsm_proc_wena     : in std_logic ;           -- uP write enable  (from microprocessor interface)
          rbsm_proc_ack      : in std_logic ;           -- uP acknowledge   (from rbsm_ram_control)
          rbsm_proc_addr     : in processor_address_bus ; -- uP read/write address
          qcb_reg_wdata      : in QCB_REG_DATA ;        -- uP write data (from microprocessor interface)

          rbsm_saddr_sel     : in std_logic               ; -- qcb address select (from rbsm_sram_control)
          sadd_channum       : in system_channel_number   ; -- SRAM address channel number (from SRAM Arbiter)

          start_pnt          : in QCB_REG_DATA ; -- extra output
          write_pnt          : in QCB_REG_DATA ; -- extra output
          read_pnt           : in QCB_REG_DATA ; -- extra output
          end_pnt            : in QCB_REG_DATA ; -- extra output

          start_pnt_a        : buffer QCB_REG_DATA ; -- extra output
          write_pnt_a        : buffer QCB_REG_DATA ; -- extra output
          read_pnt_a         : buffer QCB_REG_DATA ; -- extra output
          end_pnt_a          : buffer QCB_REG_DATA ; -- extra output

          code_vector_addr   : buffer sram_address_bus     ; -- to rbsm_sram_control
          qcb_reg_rdata      : buffer QCB_REG_DATA ; -- to microprocessor interface
          rbsm_fifo_empty    : buffer std_logic      ; -- to rbsm_sram_control
          rbsm_fifo_full     : buffer std_logic   ) ; -- to rbsm_sram_control
```

```
Aug 17 11:10 1994  Who: johnf  File: /c2/local_user/bma/bma_rbsm/bma_rbsm_lib/rbsm_qcb.vhd Page 2


end rbsm_qcb ;



------------------------------------------------------------
------------------------------------------------------------


architecture synthesize of rbsm_qcb is

signal wrap_write_pnt                : std_logic ;
signal write_pntp1_equals_end_pnt    : std_logic ;
signal write_pntp2_equals_end_pnt    : std_logic ;

signal wrap_read_pnt                 : std_logic ;
signal read_pnt_equals_start_pnt     : std_logic ;
signal read_pnt_equals_start_pnt_plus_one   : std_logic ;

signal write_pnt_plus_one            : QCB_REG_DATA ;
signal write_pnt_plus_two            : QCB_REG_DATA ;

signal read_pnt_plus_one             : QCB_REG_DATA ;

begin


write_pnt_plus_one <= write_pnt + 1 ;
write_pnt_plus_two <= write_pnt + 2 ;
read_pnt_plus_one  <= read_pnt  + 1 ;



rbsm_qcb_eqns:
process(rbsm_proc_addr,rbsm_proc_wena,rbsm_proc_ack,qcb_reg_wdata,start_pnt,write_pnt,
        read_pnt,end_pnt,sadd_channum,wrap_write_pnt,rbsm_saddr_sel,wrap_read_pnt)
begin

--
-- Process used to generate the 17 bit wide start address
-- register.
--

    if (rbsm_proc_addr = QCB0_ADDR and rbsm_proc_wena = ACT and
            rbsm_proc_ack = ACT) then
        start_pnt_a <= qcb_reg_wdata ;
    else
        start_pnt_a <= start_pnt ;
    end if;


--
-- Process used to generate the 17 bit wide write address
-- register.
--
```

```
Aug 17 11 10 1994  Who: johnf  File  /c2/local user/bma/bma rbsm/bma_rbsm_lib/rbsm_qcb vhd Page 3

    if (rbsm_proc_addr = QCB1 ADDR and rbsm_proc_wena = ACT and
            rbsm_proc_ack = ACT) then
        write_pnt_a <= qcb_reg_wdata ;
    elsif (sadd_channum = CHAN_36 and wrap_write_pnt = ACT and rbsm_saddr_sel = ACT) then
        write_pnt_a <= start pnt ;
    elsif (sadd_channum = CHAN 36 and wrap_write_pnt = NOT_ACT and rbsm_saddr_sel = ACT) then
        write_pnt_a <= write_pnt + 1 ;
    else
        write_pnt_a <= write_pnt ;
    end if;


--
-- Process used to generate the 17 bit wide read address
-- register.
--

    if (rbsm proc addr = QCB2_ADDR and rbsm_proc_wena = ACT and
            rbsm_proc_ack = ACT) then
        read_pnt_a <= qcb_reg_wdata ;
    elsif (sadd_channum = CHAN_75 and wrap_read_pnt = ACT) then
        read pnt a <= start_pnt
    elsif (sadd_channum = CHAN_75) then
        read_pnt_a <= read_pnt + 1 ;
    else
        read_pnt_a <= read pnt ;
    end if;


--
-- Process used to generate the 17 bit wide end address
-- register.
--

    if (rbsm proc addr = QCB3 ADDR and rbsm proc wena = ACT and
            rbsm_proc_ack = ACT) then
        end_pnt_a <= qcb reg_wdata ;
    else
        end_pnt_a <= end_pnt ;
    end if;

end process rbsm_qcb_eqns ;

rbsm_qcb_comb:
process(start_pnt,write_pnt,read_pnt,end_pnt,write_pnt_plus_one,write_pnt_plus_two
        write_pntp2_equals_end_pnt,read_pnt_equals_start_pnt,read_pnt_plus_one,
        rbsm_proc_rq,rbsm_proc_wena,rbsm_proc_addr,sadd_channum,read_pnt_equals_start_pnt_plus_one,
        write_pntp1_equals_end_pnt,wrap_write_pnt)
begin

--
-- Generate a 4to1 MUX by 17 : used to select one of the four
-- registers to be read by the microprocessor
--

    if (rbsm_proc_addr = QCB0_ADDR and rbsm_proc_rq = ACT and
            rbsm_proc_wena = NOT_ACT) then

Aug 17 11:10 1994  Who: johnf  File: /c2/local_user/bma/bma_rbsm/bma_rbsm_lib/rbsm_qcb.vhd Page 4

        qcb_reg_rdata <= start_pnt ;
    elsif (rbsm_proc_addr = QCB1_ADDR and rbsm_proc_rq = ACT and
            rbsm_proc_wena = NOT_ACT) then
        qcb_reg_rdata <= write_pnt ;
    elsif (rbsm_proc_addr = QCB2_ADDR and rbsm_proc_rq = ACT and
            rbsm_proc_wena = NOT_ACT) then
        qcb_reg_rdata <= read_pnt ;
    else
        qcb_reg_rdata <= end_pnt ;
    end if;


--
-- Generate a 2to1 MUX by 17 : used to select the read or write
-- address which is to be use to access the SRAM
--

    if (sadd_channum = CHAN_76) then
        code_vector_addr <= read_pnt ;
    else
        code_vector_addr <= write_pnt ;
    end if;


--
-- Generate write_pntp1_equals_end_pnt
--

    if (write_pnt_plus_one = end_pnt) then
        write_pntp1_equals_end_pnt <= ACT ;
    else
        write_pntp1_equals_end_pnt <= NOT_ACT ;
    end if ;


--
-- Generate write_pntp2_equals_end_pnt
--

    if (write_pnt_plus_two = end_pnt) then
        write_pntp2_equals_end_pnt <= ACT ;
    else
        write_pntp2_equals_end_pnt <= NOT_ACT ;
    end if ;


--
-- Generate read_pnt_equals_start_pnt
--

    if (read_pnt = start_pnt) then
        read_pnt_equals_start_pnt <= ACT ;
    else
        read_pnt_equals_start_pnt <= NOT_ACT ;
    end if;
```

```
Aug 17 11:10 1994  Who  johnf  File: /c2/local_user/bma/bma_rbsm/bma_rbsm_lib/rbsm_qcb.vhd Page 5

--
-- Generate read_pnt_equals_start_pnt_plus_one
--

    if (read_pnt = (start_pnt + 1)) then
        read_pnt_equals_start_pnt_plus_one <= ACT ;
    else
        read_pnt_equals_start_pnt_plus_one <= NOT_ACT ;
    end if;


--
-- Generate wrap_write_pnt : used to indicate that the write
-- pointer must be loaded with the start pointer since the
-- top of the circular FIFO has been reached.
--

    if (write_pnt = end_pnt) then
        wrap_write_pnt <= ACT;
    else
        wrap_write_pnt <= NOT_ACT;
    end if;


--
-- Generate wrap_read_pnt : used to indicate that the read
-- pointer must be loaded with the start pointer since the
-- top of the circular FIFO has been reached
--

    if (read_pnt = end_pnt) then
        wrap_read_pnt <= ACT;
    else
        wrap_read_pnt <= NOT_ACT;
    end if;


--
-- Generate rbsm_fifo_empty : used to inform the rbsm_sram_control
-- module that any further SRAM read requests must be held off
-- until the FIFO becomes not empty.
--

    if (write_pnt = read_pnt) then
        rbsm_fifo_empty <= ACT;
    else
        rbsm_fifo_empty <= NOT_ACT;
    end if ;


--
-- Generate rbsm_fifo_full : used to inform the rbsm_sram_control
-- module that any further SRAM write requests must be held off
-- until the FIFO becomes not full.
--
```

```
Aug 17 11:10 1994  Who: johnf  File: /c2/local_user/bma/bma_rbsm/bma_rbsm_lib/rbsm_qcb.vhd Page 6

    if (read_pnt = write_pnt_plus_one) then
        rbsm_fifo_full <= ACT ;
    elsif(read_pnt = write_pnt_plus_two) then
        rbsm_fifo_full <= ACT ;
    elsif(read_pnt_equals_start_pnt = ACT and wrap_write_pnt = ACT) then
        rbsm_fifo_full <= ACT ;
    elsif(read_pnt_equals_start_pnt = ACT and write_pntp2_equals_end_pnt = ACT) then
        rbsm_fifo_full <= ACT ;
    elsif(read_pnt_equals_start_pnt = ACT and write_pntp1_equals_end_pnt = ACT) then
        rbsm_fifo_full <= ACT ;
    elsif(read_pnt_equals_start_pnt_plus_one = ACT and wrap_write_pnt = ACT) then
        rbsm_fifo_full <= ACT ;
    elsif(read_pnt_equals_start_pnt_plus_one = ACT and write_pntp2_equals_end_pnt = ACT) then
        rbsm_fifo_full <= ACT ;
    elsif(read_pnt_equals_start_pnt_plus_one = ACT and write_pntp1_equals_end_pnt = ACT) then
        rbsm_fifo_full <= ACT ;
    else
        rbsm_fifo_full <= NOT_ACT ;
    end if;


end process rbsm_qcb_comb ;

end synthesize;
```

```
Aug 17 11:11 1994  Who: johnf  File: /c2/local_user/bma/bma_rbsm/bma_rbsm_lib/rbsm_ram_control.vhd Page 1

-- $Id: rbsm_ram_control.vhd,v 1.15 94/06/02 18:15:07 johnf Exp $
--
--  Author   :   John A. Flanders
--
--
--  Title    :   rbsm_ram_control :  rbsm_ram_control  is the receive buffer state machine component used to
--                                   update the counters stored in the byte count and filtered frame count
--                                   memory. If the received frame is to be discarded then both the byte
--                                   count and filtered frame count will be updated. If the received frame
--                                   is not to be discarded then only the byte count will get updated
--
--
--
--  Revision History
--
--  7/12/93                      original version
--
--
--
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;



entity rbsm_ram_control is
    port(
        clock25                  : in std_logic          ; -- system clock
        reset                    : in std_logic          ; -- system reset
        rbsm_proc_sram_test      : in std_logic          ; -- BMA RAM write pulse

        cont_scan                : in std_logic          ; -- from rbsm_stat_control

        unload                   : in port_vector        ; -- from rbsm_unload
        scan_vector              : in SCAN_VEC           ; -- from rbsm_scanner

        fddi_abort               : in std_logic          ; -- rx_stat_reg(15)
        enet_abort               : in std_logic          ; -- from rbsm_status_registers
        rd_state1                : in std_logic          ; -- from rbsm_stat_control
        rbsm_error               : in std_logic          ; -- from rbsm_stat_control

        discard_frame            : in std_logic          ; -- from rbsm_stat_control

        rbsm_port_num            : in port_number        ; -- from rbsm_scanner
        frame_byte_count         : in BYTE_CNT           ; -- rx_stat_reg(12 downto 0)

Aug 17 11:11 1994  Who: johnf  File: /c2/local_user/bma/bma_rbsm/bma_rbsm_lib/rbsm_ram_control.vhd Page 2

        reg_read_data            : in RBSM_REGISTER_DATA ; -- from rbsm_port_regs_mux
        rbsm_alu_rd_data         : in long_word          ; -- from rbsm_ram (read port A)
        rbsm_micro_rd_data       : in long_word          ; -- from rbsm_ram (read port B)

        qcb_reg_rdata            : in QCB_REG_DATA       ; -- from rbsm_qcb
        frag_reg_rdata           : in FRAG_REG_DATA      ; -- from rbsm_frag
        bbone_reg_rdata          : in BBONE_REG_DATA     ; -- from rbsm_bbone

        rbsm_proc_rq             : in std_logic          ; -- from microprocessor interface
        rbsm_proc_wena           : in std_logic          ; -- from microprocessor interface
        rbsm_proc_addr           : in processor_address_bus ; -- from microprocessor interface
        rbsm_proc_wdata          : in long_word          ; -- from microprocessor interface

        rbsm_ram_ready           : buffer std_logic      ; -- to rbsm_stat_control
        rbsm_proc_ack            : buffer std_logic      ; -- to microprocessor interface
        load_stat_wregs          : buffer std_logic      ; -- extra output
        rbsm_proc_rdata          : buffer long_word      ; -- to microprocessor interface
        rbsm_ram_wena            : buffer std_logic      ; -- extra
        rbsm_port_addr           : buffer RBSM_RAM_ADDR  ; -- extra
        rbsm_proc_ram_addr       : buffer RBSM_RAM_ADDR  ; -- to rbsm_ram
        rbsm_ram_wr_addr         : buffer RBSM_RAM_ADDR  ; -- to rbsm_ram
        rbsm_ram_wr_data         : buffer long_word      ) ; -- to rbsm_ram

end rbsm_ram_control;


------------------------------------------------------------
------------------------------------------------------------


architecture synthesize of rbsm_ram_control is

-- declarations

signal byte_count_only         : std_logic   ;
signal packet_byte_count       : BYTE_CNT    ;
signal rbsm_ram_read_data      : long_word   ;
signal rbsm_port_data          : long_word   ;
signal rbsm_alu_wr_data        : long_word   ;
signal rbsm_alu_rdata          : long_word   ; -- added 1/17/94
signal rbsm_ram_wdata          : long_word   ; -- added 1/17/94
signal ram_read_select_a       : std_logic   ; -- added 1/17/94
signal ram_read_select_b       : std_logic   ; -- added 1/17/94
signal increment_by_one        : std_logic   ;
signal ram_cycle_complete      : std_logic   ;
signal proc_ram_addr           : std_logic   ;
signal proc_reg_addr           : std_logic   ;
signal proc_qcb_addr           : std_logic   ;
signal proc_frag_addr          : std_logic   ;
signal proc_bbone_addr         : std_logic   ;
signal port_numbers            : port_number  ;
```

```
------------------------------------------------------------
-- body
------------------------------------------------------------

begin

--
-- Generate a 32 BIT ADDER with the inputs being the
-- port data and RAM read data
--

rbsm_alu_wr_data    <= rbsm_port_data + rbsm_alu_rdata ; -- changed 1/17/94

--
--  process rbsm_ram_sync is used to generate the registered outputs
--  which will be used to control the Address, Data and control path
--  used to control reading and writing of the RBSM internal RAM used
--  to store frame byte counts and discarded frame counts.
--

rbsm_ram_sync:
process
begin

    wait until clock25 = '1'

--
-- Generate load_stat_wregs which is used to load the packet byte count register
-- the port number register and the byte count only flip flop with new values.
-- This signal is also the main stimulus used to initiate a read-modify-write
-- cycle to the RBSM stat RAM
--

        if (reset = ACT) then
            load_stat_wregs <= NOT_ACT ;
        elsif (scan_vector(0) = ACT and unload(0) = ACT and cont_scan = ACT and
                enet_abort = NOT_ACT) then
            load_stat_wregs <= ACT;
        elsif (scan_vector(1) = ACT and unload(1) = ACT and cont_scan = ACT and
                enet_abort = NOT_ACT) then
            load_stat_wregs <= ACT;
        elsif (scan_vector(2) = ACT and unload(2) = ACT and cont_scan = ACT and
                enet_abort = NOT_ACT) then
            load_stat_wregs <= ACT;
        elsif (scan_vector(3) = ACT and unload(3) = ACT and cont_scan = ACT and
                enet_abort = NOT_ACT) then
            load_stat_wregs <= ACT;
        elsif (scan_vector(4) = ACT and unload(4) = ACT and cont_scan = ACT and
                enet_abort = NOT_ACT) then
            load_stat_wregs <= ACT;
        elsif (scan_vector(5) = ACT and unload(5) = ACT and cont_scan = ACT and
                enet_abort = NOT_ACT) then
            load_stat_wregs <= ACT;
        elsif (scan_vector(6) = ACT and unload(6) = ACT and cont_scan = ACT and
                enet_abort = NOT_ACT) then
            load_stat_wregs <= ACT;
        elsif (scan_vector(7) = ACT and unload(7) = ACT and cont_scan = ACT and
```

```
                enet_abort = NOT_ACT) then
            load_stat_wregs <= ACT;
        elsif (scan_vector(8) = ACT and unload(8) = ACT and cont_scan = ACT and
                enet_abort = NOT_ACT) then
            load_stat_wregs <= ACT;
        elsif (scan_vector(9) = ACT and unload(9) = ACT and cont_scan = ACT and
                enet_abort = NOT_ACT) then
            load_stat_wregs <= ACT;
        elsif (scan_vector(10) = ACT and unload(10) = ACT and cont_scan = ACT and
                enet_abort = NOT_ACT) then
            load_stat_wregs <= ACT;
        elsif (scan_vector(11) = ACT and unload(11) = ACT and cont_scan = ACT and
                enet_abort = NOT_ACT) then
            load_stat_wregs <= ACT;
        elsif (scan_vector(12) = ACT and unload(12) = ACT and cont_scan = ACT and
                enet_abort = NOT_ACT) then
            load_stat_wregs <= ACT;
        elsif (scan_vector(13) = ACT and unload(13) = ACT and cont_scan = ACT and
                enet_abort = NOT_ACT) then
            load_stat_wregs <= ACT;
        elsif (scan_vector(14) = ACT and unload(14) = ACT and cont_scan = ACT and
                enet_abort = NOT_ACT) then
            load_stat_wregs <= ACT;
        elsif (scan_vector(15) = ACT and unload(15) = ACT and cont_scan = ACT and
                enet_abort = NOT_ACT) then
            load_stat_wregs <= ACT;
        elsif((scan_vector(16) = ACT or scan_vector(17) = ACT) and
                unload(16) = ACT and cont_scan = ACT and fddi_abort = NOT_ACT) then
            load_stat_wregs <= ACT;
        elsif((scan_vector(18) = ACT or scan_vector(19) = ACT) and
                unload(17) = ACT and cont_scan = ACT and fddi_abort = NOT_ACT) then
            load_stat_wregs <= ACT;
        else
            load_stat_wregs <= NOT_ACT ;
        end if;

--
-- Generate byte_count_only flip flop which is used to inform the stat ram
-- control logic that only one read-modify-write cycle must be performed.
--

        if (reset = ACT) then
            byte_count_only <= NOT_ACT   ;
        elsif (scan_vector(0) = ACT and unload(0) = ACT and cont_scan = ACT and
                discard_frame = NOT_ACT) then
            byte_count_only <= ACT;
        elsif (scan_vector(1) = ACT and unload(1) = ACT and cont_scan = ACT and
                discard_frame = NOT_ACT) then
            byte_count_only <= ACT;
        elsif (scan_vector(2) = ACT and unload(2) = ACT and cont_scan = ACT and
                discard_frame = NOT_ACT) then
            byte_count_only <= ACT;
        elsif (scan_vector(3) = ACT and unload(3) = ACT and cont_scan = ACT and
                discard_frame = NOT_ACT) then
            byte_count_only <= ACT;
        elsif (scan_vector(4) = ACT and unload(4) = ACT and cont_scan = ACT and
                discard_frame = NOT_ACT) then
            byte_count_only <= ACT;
```

Aug 17 11:11 1994 Who: johnf File: /c2/local_user/bma/bma_rbsm/bma_rbsm_lib/rbsm_ram_control.vhd Page 5

```
        elsif (scan_vector(5) = ACT and unload(5) = ACT and cont_scan = ACT and
               discard_frame = NOT_ACT) then
            byte_count_only <= ACT;
        elsif (scan_vector(6) = ACT and unload(6) = ACT and cont_scan = ACT and
               discard_frame = NOT_ACT) then
            byte_count_only <= ACT;
        elsif (scan_vector(7) = ACT and unload(7) = ACT and cont_scan = ACT and
               discard_frame = NOT_ACT) then
            byte_count_only <= ACT;
        elsif (scan_vector(8) = ACT and unload(8) = ACT and cont_scan = ACT and
               discard_frame = NOT_ACT) then
            byte_count_only <= ACT;
        elsif (scan_vector(9) = ACT and unload(9) = ACT and cont_scan = ACT and
               discard_frame = NOT_ACT) then
            byte_count_only <= ACT;
        elsif (scan_vector(10) = ACT and unload(10) = ACT and cont_scan = ACT and
               discard_frame = NOT_ACT) then
            byte_count_only <= ACT;
        elsif (scan_vector(11) = ACT and unload(11) = ACT and cont_scan = ACT and
               discard_frame = NOT_ACT) then
            byte_count_only <= ACT;
        elsif (scan_vector(12) = ACT and unload(12) = ACT and cont_scan = ACT and
               discard_frame = NOT_ACT) then
            byte_count_only <= ACT;
        elsif (scan_vector(13) = ACT and unload(13) = ACT and cont_scan = ACT and
               discard_frame = NOT_ACT) then
            byte_count_only <= ACT;
        elsif (scan_vector(14) = ACT and unload(14) = ACT and cont_scan = ACT and
               discard_frame = NOT_ACT) then
            byte_count_only <= ACT;
        elsif (scan_vector(15) = ACT and unload(15) = ACT and cont_scan = ACT and
               discard_frame = NOT_ACT) then
            byte_count_only <= ACT;
        elsif((scan_vector(16) = ACT or scan_vector(17) = ACT) and
               unload(16) = ACT and cont_scan = ACT and
               discard_frame = NOT_ACT) then
            byte_count_only <= ACT;
        elsif((scan_vector(18) = ACT or scan_vector(19) = ACT) and
               unload(17) = ACT and cont_scan = ACT and
               discard_frame = NOT_ACT) then
            byte_count_only <= ACT;
        elsif (byte_count_only = ACT and load_stat_wregs = ACT) then
            byte_count_only <= ACT;
        elsif (byte_count_only = ACT and rbsm_ram_ready = NOT_ACT) then
            byte_count_only <= ACT;
        else
            byte_count_only <= NOT_ACT ;
        end if;

--
-- Generate the microprocessor acknowledge signal for the RBSM
-- register, QCB and RAM read and write cycles
--

        if (reset = ACT) then
            rbsm_proc_ack <= NOT_ACT ;
        elsif (rbsm_proc_rq = ACT and proc_reg_addr = ACT and              -- Port Register read
               rbsm_proc_wena = NOT_ACT and rbsm_proc_ack = NOT_ACT) then
```

Aug 17 11:11 1994 Who: johnf File: /c2/local_user/bma/bma_rbsm/bma_rbsm_lib/rbsm_ram_control.vhd Page 6

```
            rbsm_proc_ack <= ACT ;
        elsif (rbsm_proc_rq = ACT and proc_reg_addr = ACT and              -- Port Register write
               rbsm_proc_wena = ACT and rbsm_proc_ack = NOT_ACT and
               rd_state1 = NOT_ACT) then
            rbsm_proc_ack <= ACT ;
        elsif (rbsm_proc_rq = ACT and proc_reg_addr = ACT and              -- Port Register write
               rbsm_proc_wena = ACT and rbsm_proc_ack = NOT_ACT and
               rbsm_error = ACT) then
            rbsm_proc_ack <= ACT ;
        elsif (rbsm_proc_rq = ACT and proc_frag_addr = ACT and              -- Fragment Register read
               rbsm_proc_wena = NOT_ACT and rbsm_proc_ack = NOT_ACT) then
            rbsm_proc_ack <= ACT ;
        elsif (rbsm_proc_rq = ACT and proc_frag_addr = ACT and              -- Fragment Register write
               rbsm_proc_wena = ACT and rbsm_proc_ack = NOT_ACT and
               rd_state1 = NOT_ACT) then
            rbsm_proc_ack <= ACT ;
        elsif (rbsm_proc_rq = ACT and proc_frag_addr = ACT and              -- Fragment Register write
               rbsm_proc_wena = ACT and rbsm_proc_ack = NOT_ACT and
               rbsm_error = ACT) then
            rbsm_proc_ack <= ACT ;
        elsif (rbsm_proc_rq = ACT and proc_bbone_addr = ACT and             -- Backbone Register read
               rbsm_proc_wena = NOT_ACT and rbsm_proc_ack = NOT_ACT) then
            rbsm_proc_ack <= ACT ;
        elsif (rbsm_proc_rq = ACT and proc_bbone_addr = ACT and             -- Backbone Register write
               rbsm_proc_wena = ACT and rbsm_proc_ack = NOT_ACT and
               rd_state1 = NOT_ACT) then
            rbsm_proc_ack <= ACT ;
        elsif (rbsm_proc_rq = ACT and proc_bbone_addr = ACT and             -- Backbone Register write
               rbsm_proc_wena = ACT and rbsm_proc_ack = NOT_ACT and
               rbsm_error = ACT) then
            rbsm_proc_ack <= ACT ;
        elsif (rbsm_proc_rq = ACT and proc_qcb_addr = ACT and              -- QCB read or write
               rbsm_proc_ack = NOT_ACT) then
            rbsm_proc_ack <= ACT ;
        elsif (rbsm_proc_rq = ACT and proc_ram_addr = ACT and              -- Normal Stat RAM read
               rbsm_proc_wena = NOT_ACT and rbsm_proc_ack = NOT_ACT and    -- port A
               rbsm_proc_sram_test = NOT_ACT and rbsm_ram_ready = ACT) then
            rbsm_proc_ack <= ACT ;
        elsif (rbsm_proc_rq = ACT and proc_ram_addr = ACT and              -- Diag Stat RAM read
               rbsm_proc_wena = NOT_ACT and rbsm_proc_ack = NOT_ACT and    -- port B
               rbsm_proc_sram_test = ACT and rbsm_ram_ready = ACT and
               cont_scan = NOT_ACT and load_stat_wregs = NOT_ACT) then
            rbsm_proc_ack <= ACT ;
        elsif (rbsm_proc_rq = ACT and proc_ram_addr = ACT and              -- Stat RAM write
               rbsm_proc_wena = ACT and rbsm_proc_ack = NOT_ACT and
               rbsm_ram_wena = ACT and rbsm_ram_ready = ACT) then
            rbsm_proc_ack <= ACT ;
        else
            rbsm_proc_ack <= NOT_ACT ;
        end if;

--
-- Generate a 2to1 mux by 13 followed by a 13 bit register used
-- to store the received frame byte count which was provided by
-- the NIU Receive Status and read off the Receive Status Event
-- Queue.
--
```

Aug 17 11:11 1994 Who: johnf File: /c2/local_user/bma/bma_rbsm/bma_rbsm_lib/rbsm_ram_control.vhd Page 7

```
        if (reset = ACT) then
            packet_byte_count <= (others => '0') ;
        elsif (load_stat_wregs = ACT) then
            packet_byte_count <= frame_byte_count ;
        else
            packet_byte_count <= packet_byte_count ;
        end if;


--
-- Generate a 2to1 mux by 5 followed by a 5 bit register used
-- to store the receive port number of the receive port from
-- which status had just been read.
--

        if (reset = ACT) then
            port_numbers <= (others => '0')     ;
        elsif (cont_scan = ACT) then
            port_numbers <= rbsm_port_num   ;
        else
            port_numbers <= port_numbers ;
        end if;


--
-- Generate a 2to1 mux by 5 followed by a 5 bit register used
-- to store the actual port number for the received frame. These
-- five stored bits will be used as the five most significant
-- address bits used to access the RAM. The second (else-if)
-- construct is used to generate the least significant address
-- bit used to access the RAM.
--

-- Generate 5 most significant address bits

        if (reset = ACT) then
            rbsm_port_addr(5 downto 1) <= "00000" ;
        elsif (load_stat_wregs = ACT) then
            rbsm_port_addr(5 downto 1) <= port_numbers ;
        else
            rbsm_port_addr(5 downto 1) <= rbsm_port_addr(5 downto 1) ;
        end if;

-- Generate least significant address bit

        if (reset = ACT) then
            rbsm_port_addr(0) <= NOT_ACT ;
        elsif (increment_by_one = ACT and rbsm_ram_ready = NOT_ACT) then
            rbsm_port_addr(0) <= ACT ;
        else
            rbsm_port_addr(0) <= NOT_ACT ;
        end if;


--
```

Aug 17 11:11 1994 Who: johnf File: /c2/local_user/bma/bma_rbsm/bma_rbsm_lib/rbsm_ram_control.vhd Page 8

```
-- Generate a signal called rbsm_ram_ready which will be used
-- to inform the main RBSM state machine (rbsm_scanner) if a
-- RAM update is in progress or not. If an update is in progress
-- the scanner may have to wait until the update is complete if any
-- new information needs to be posted so that another update may
-- occur.
--

        if (reset = ACT) then
            rbsm_ram_ready <= ACT;
        elsif(load_stat_wregs = ACT) then
            rbsm_ram_ready <= NOT_ACT;
        elsif(rbsm_ram_ready = NOT_ACT and ram_cycle_complete = NOT_ACT) then
            rbsm_ram_ready <= NOT_ACT;
        else
            rbsm_ram_ready <= ACT;
        end if;

--
-- Generate a signal called ram_cycle_complete which will be used
-- to terminate the RAM read/modify/write cycle or cycles.
--

        if (reset = ACT) then
            ram_cycle_complete <= NOT_ACT;
        elsif(rbsm_ram_ready = NOT_ACT and byte_count_only = ACT and
                rbsm_ram_wena = ACT) then
            ram_cycle_complete <= ACT;
        elsif(rbsm_ram_ready = NOT_ACT and increment_by_one = ACT and
                rbsm_ram_wena = ACT) then
            ram_cycle_complete <= ACT;
        else
            ram_cycle_complete <= NOT_ACT;
        end if;


--
-- Generate a signal called rbsm_ram_wena which will be used
-- as the write strobe to the RBSM RAM
--

        if (reset = ACT) then
            rbsm_ram_wena <= NOT_ACT;
        elsif(rbsm_ram_ready = NOT_ACT and ram_read_select_b = ACT) then            -- added 1/17/94
            rbsm_ram_wena <= ACT;
        elsif (rbsm_ram_ready = ACT and load_stat_wregs = NOT_ACT and
                 cont_scan = NOT_ACT and rbsm_proc_rq = ACT and
                 rbsm_proc_wena = ACT and rbsm_ram_wena = NOT_ACT and
                 rbsm_proc_ack = NOT_ACT and proc_ram_addr = ACT) then
            rbsm_ram_wena <= ACT;
        else
            rbsm_ram_wena <= NOT_ACT;
        end if;


--
-- Generate a signal called increment_by_one which will be used
-- to inform the state machine that the filtered frame count must
-- also be updated along with the receive byte count.
```

```
Aug 17 11 11 1994  Who  johnf  File. /c2/local user/bma/bma rbsm/bma_rbsm lib/rbsm_ram_control vhd Page 9

--

        if (reset = ACT) then
            increment_by one <= NOT_ACT ;
        elsif (rbsm_ram_ready = NOT_ACT and byte_count_only = NOT ACT and
                rbsm_ram_wena = ACT) then
            increment_by_one <= ACT ;
        elsif (rbsm_ram_ready = NOT_ACT and increment_by_one = ACT) then
            increment_by_one <= ACT ;
        else
            increment_by_one <= NOT ACT ;
        end if;


--
-- Generate a signal called ram read select_a which will be used        !!! Added 1/17/94
-- to select new RAM read data from port A of the RAM.
--

        if (reset = ACT) then
            ram_read_select_a <= NOT_ACT ;
        elsif (load_stat_wregs = ACT and ram_read_select_a = NOT_ACT) then
            ram_read_select_a <= ACT ;
        elsif (rbsm_ram_ready = NOT_ACT and increment_by_one = ACT and
            rbsm_port_addr(0) = NOT_ACT and ram_read_select_a = NOT_ACT) then
            ram_read_select_a <= ACT ;
        else
            ram_read select a <= NOT_ACT ;
        end if;


--
-- Generate a signal called ram_read_select_b which will be used        !!! Added 1/17/94
-- to select new RAM write data generated from the RBSM port data.
--

        if (reset = ACT) then
            ram_read select_b <= NOT_ACT ;
        elsif (ram_read_select a = ACT and ram_read_select_b = NOT_ACT) then
            ram_read select_b <= ACT ;
        else
            ram_read select_b <= NOT_ACT ;
        end if;


--
-- Generate a 2to1 mux by 32 followed by a 32 bit register used         !!! Added 1/17/94
-- to store the ram read data that is to be updated.
--

        if (reset = ACT) then
            rbsm_alu_rdata <= (others => '0') ;
        elsif (rbsm_ram_ready = NOT_ACT and ram_read_select_a = ACT) then
            rbsm_alu_rdata <= rbsm_alu_rd_data ;
        else
            rbsm_alu_rdata <= rbsm_alu_rdata ;
        end if;
```

```
Aug 17 11 11 1994  Who: johnf  File: /c2/local_user/bma/bma_rbsm/bma_rbsm_lib/rbsm_ram_control.vhd Page 10


--
-- Generate a 2to1 mux by 32 followed by a 32 bit register used         !!! Added 1/17/94
-- to store the ram read data that is to be updated.
--

        if (reset = ACT) then
            rbsm_ram_wdata <= (others => '0') ;
        elsif (rbsm_ram_ready = NOT_ACT and ram_read_select_b = ACT) then
            rbsm_ram_wdata <= rbsm_alu_wr_data ;
        else
            rbsm_ram_wdata <= rbsm_ram_wdata ;
        end if;


end process rbsm_ram_sync ;


--
-- process rbsm_ram_comb is used to generate the combinatorial logic
-- required by this model.
--

rbsm_ram_comb:
process(rbsm_port_addr,rbsm_proc_ram_addr,rbsm_ram_ready,rbsm_alu_wr_data,rbsm_ram_wdata,
        rbsm_proc_wdata,packet_byte_count,reg_read_data,rbsm_micro_rd_data,
        proc_reg_addr,proc_qcb_addr,qcb_reg_rdata,rbsm_proc_rq,proc_ram_addr,
        frag_reg_rdata,proc_frag_addr,rbsm_proc_addr,rbsm_proc_sram_test,rbsm_alu_rd_data,
        proc_bbone_addr,bbone_reg_rdata)


begin

-- ****************************************************************
-- Generate microprocessor read data MUX 5to1 x 32
-- ****************************************************************

        if (proc_reg_addr = ACT) then
            rbsm_proc_rdata(31 downto 16) <= "0000000000000000" ;
            rbsm_proc_rdata(15 downto 0)  <= reg_read_data ;
        elsif (proc_qcb_addr = ACT) then
            rbsm_proc_rdata(31 downto 17) <= "000000000000000" ;
            rbsm_proc_rdata(16 downto 0)  <= qcb_reg_rdata ;
        elsif (proc_frag_addr = ACT) then
            rbsm_proc_rdata(31 downto 11) <= "000000000000000000000" ;
            rbsm_proc_rdata(10 downto 0)  <= frag_reg_rdata ;
        elsif (proc_bbone_addr = ACT) then
            rbsm_proc_rdata(31 downto 7) <= "0000000000000000000000000" ;
            rbsm_proc_rdata(8 downto 0)  <= bbone_reg_rdata ;
        elsif (rbsm_proc_sram_test = ACT) then
            rbsm_proc_rdata <= rbsm_alu_rd_data ;
        else
            rbsm_proc_rdata <= rbsm_micro_rd_data ;
        end if;

-- ****************************************************************
```

```
Aug 17 11:11 1994  Who: johnf  File: /c2/local_user/bma/bma_rbsm/bma_rbsm_lib/rbsm_ram_control.vhd Page 11

-- Generate rbsm_proc_ram_addr MUX : 2to1 x 6
-- ************************************************************

        if (rbsm_proc_rq = ACT and proc_ram_addr = ACT) then
            rbsm_proc_ram_addr <= rbsm_proc_addr(5 downto 0) ;
        else
            rbsm_proc_ram_addr <= (others => '0') ;
        end if;

-- ************************************************************
-- Generate rbsm_ram_wr_addr MUX : 2to1 x 6
-- ************************************************************

        if (rbsm_ram_ready = ACT) then
            rbsm_ram_wr_addr <= rbsm_proc_ram_addr ;
        else
            rbsm_ram_wr_addr <= rbsm_port_addr
        end if;



-- ************************************************************
-- Generate rbsm_ram_wr_data MUX : 2to1 x 32
-- ************************************************************

        if (rbsm_ram_ready = ACT) then
            rbsm_ram_wr_data <= rbsm_proc_wdata ;
        else
            rbsm_ram_wr_data <= rbsm_ram_wdata ;
        end if;

-- ****************************************************************************
-- Generate rbsm_port data :
--
-- rbsm_port_addr(5) = 1 : FDDI frame
-- rbsm_port_addr(5) = 0 : Ethernet frame
--
-- rbsm_port_data equals 19 zero bits concatenated with the 13
-- bit packet_byte_count field when it is an FDDI frame and
-- the rbsm_port_addr(0) bit equals zero.
--
-- rbsm_port_data equals 20 zero bits concatenated with the 12
-- least significant bits of the packet_byte_count field when
-- it is an Ethernet frame and the rbsm_port_addr(0) bit equals zero.
--
-- rbsm_port data equals integer one when the rbsm_port_addr(0) bit equals one
-- The data is set to one so that the 32 bit adder can also be used
-- as an incrementer when the filtered frame count needs to be updated.
-- ****************************************************************************

        if (rbsm_port_addr(5) = ACT and rbsm_port_addr(0) = NOT_ACT) then          -- FDDI byte count info
            rbsm_port_data(31 downto 13) <= "0000000000000000000" ;
            rbsm_port_data(12 downto 0)  <= packet_byte_count;
        elsif (rbsm_port_addr(5) = NOT_ACT and rbsm_port_addr(0) = NOT_ACT) then  -- Ethernet byte count info
            rbsm_port_data(31 downto 12) <= "00000000000000000000" ;

Aug 17 11:11 1994  Who: johnf  File: /c2/local_user/bma/bma_rbsm/bma_rbsm_lib/rbsm_ram_control.vhd Page 12

            rbsm_port_data(11 downto 0)  <= packet_byte_count(11 downto 0);
        else
            rbsm_port_data(31 downto 1) <=  "0000000000000000000000000000000" ;
            rbsm_port_data(0)           <= '1' ;
        end if;

end process rbsm_ram_comb;

--
-- Process ram_address_decode is used to determine if the microprocessor
-- is driving a valid RBSM RAM address on the rbsm_proc_addr bus.
--

ram_address_decode:
process(rbsm_proc_addr)
begin

    case rbsm_proc_addr is

        when RAM0_ADDR    => proc_ram_addr <= ACT;
        when RAM1_ADDR    => proc_ram_addr <= ACT;
        when RAM2_ADDR    => proc_ram_addr <= ACT;
        when RAM3_ADDR    => proc_ram_addr <= ACT;
        when RAM4_ADDR    => proc_ram_addr <= ACT;
        when RAM5_ADDR    => proc_ram_addr <= ACT;
        when RAM6_ADDR    => proc_ram_addr <= ACT;
        when RAM7_ADDR    => proc_ram_addr <= ACT;
        when RAM8_ADDR    => proc_ram_addr <= ACT;
        when RAM9_ADDR    => proc_ram_addr <= ACT,
        when RAM10_ADDR   => proc_ram_addr <= ACT;
        when RAM11_ADDR   => proc_ram_addr <= ACT;
        when RAM12_ADDR   => proc_ram_addr <= ACT;
        when RAM13_ADDR   => proc_ram_addr <= ACT;
        when RAM14_ADDR   => proc_ram_addr <= ACT;
        when RAM15_ADDR   => proc_ram_addr <= ACT;
        when RAM16_ADDR   => proc_ram_addr <= ACT;
        when RAM17_ADDR   => proc_ram_addr <= ACT;
        when RAM18_ADDR   => proc_ram_addr <= ACT;
        when RAM19_ADDR   => proc_ram_addr <= ACT;
        when RAM20_ADDR   => proc_ram_addr <= ACT;
        when RAM21_ADDR   => proc_ram_addr <= ACT;
        when RAM22_ADDR   => proc_ram_addr <= ACT;
        when RAM23_ADDR   => proc_ram_addr <= ACT;
        when RAM24_ADDR   => proc_ram_addr <= ACT;
        when RAM25_ADDR   => proc_ram_addr <= ACT;
        when RAM26_ADDR   => proc_ram_addr <= ACT;
        when RAM27_ADDR   => proc_ram_addr <= ACT;
        when RAM28_ADDR   => proc_ram_addr <= ACT;
        when RAM29_ADDR   => proc_ram_addr <= ACT;
        when RAM30_ADDR   => proc_ram_addr <= ACT;
        when RAM31_ADDR   => proc_ram_addr <= ACT;
        when RAM32_ADDR   => proc_ram_addr <= ACT;
        when RAM33_ADDR   => proc_ram_addr <= ACT;
        when RAM34_ADDR   => proc_ram_addr <= ACT;
        when RAM35_ADDR   => proc_ram_addr <= ACT;


        when others       => proc_ram_addr <= NOT_ACT;
```

```
    end case

end process ram_address_decode;


--
-- Process reg_address_decode is used to determine if the microprocessor
-- is driving a valid RBSM register address on the rbsm_proc_addr bus
--

reg_address_decode:
process(rbsm_proc_addr)
begin

    case rbsm_proc_addr is

        when PORT0_ADDR  => proc_reg_addr <= ACT;  -- port0  configuration register
        when PORT1_ADDR  => proc_reg_addr <= ACT;  -- port1  configuration register
        when PORT2_ADDR  => proc_reg_addr <= ACT;  -- port2  configuration register
        when PORT3_ADDR  => proc_reg_addr <= ACT;  -- port3  configuration register
        when PORT4_ADDR  => proc_reg_addr <= ACT;  -- port4  configuration register
        when PORT5_ADDR  => proc_reg_addr <= ACT;  -- port5  configuration register
        when PORT6_ADDR  => proc_reg_addr <= ACT;  -- port6  configuration register
        when PORT7_ADDR  => proc_reg_addr <= ACT;  -- port7  configuration register
        when PORT8_ADDR  => proc_reg_addr <= ACT;  -- port8  configuration register
        when PORT9_ADDR  => proc_reg_addr <= ACT;  -- port9  configuration register
        when PORT10_ADDR => proc_reg_addr <= ACT;  -- port10 configuration register
        when PORT11_ADDR => proc_reg_addr <= ACT;  -- port11 configuration register
        when PORT12_ADDR => proc_reg_addr <= ACT;  -- port12 configuration register
        when PORT13_ADDR => proc_reg_addr <= ACT;  -- port13 configuration register
        when PORT14_ADDR => proc_reg_addr <= ACT;  -- port14 configuration register
        when PORT15_ADDR => proc_reg_addr <= ACT;  -- port15 configuration register
        when PORT16_ADDR => proc_reg_addr <= ACT;  -- port16 configuration register
        when PORT17_ADDR => proc_reg_addr <= ACT;  -- port17 configuration register

        when others      => proc_reg_addr <= NOT_ACT;

    end case;

end process reg_address_decode;


--
-- Process qcb_address_decode is used to determine if the microprocessor
-- is driving a valid RBSM QCB register address on the rbsm_proc_addr bus.
--

qcb_address_decode:
process(rbsm_proc_addr)
begin

    case rbsm_proc_addr is

        when QCB0_ADDR   => proc_qcb_addr <= ACT;  -- rbsm qcb start register
        when QCB1_ADDR   => proc_qcb_addr <= ACT;  -- rbsm qcb write register
        when QCB2_ADDR   => proc_qcb_addr <= ACT;  -- rbsm qcb read  register
        when QCB3_ADDR   => proc_qcb_addr <= ACT;  -- rbsm qcb end   register
```

```
        when others      => proc_qcb_addr <= NOT_ACT;

    end case;


end process qcb_address_decode;


--
-- Process frag_address_decode is used to determine if the microprocessor
-- is driving a valid RBSM FRAG register address on the rbsm_proc_addr bus.
--

frag_address_decode:
process(rbsm_proc_addr)
begin

    case rbsm_proc_addr is

        when FRAG_ADDR   => proc_frag_addr <= ACT;  -- rbsm frag register

        when others      => proc_frag_addr <= NOT_ACT;

    end case;


end process frag_address_decode;


--
-- Process bbone_address_decode is used to determine if the microprocessor
-- is driving a valid RBSM backbone register address on the rbsm_proc_addr bus.
--

bbone_address_decode:
process(rbsm_proc_addr)
begin

    case rbsm_proc_addr is

        when BBONE_ADDR  => proc_bbone_addr <= ACT;  -- rbsm backbone register

        when others      => proc_bbone_addr <= NOT_ACT;

    end case;


end process bbone_address_decode;

end synthesize;
```

Aug 17 11:11 1994 Who johnf File: /c2/local_user/bma/bma_rbsm/bma_rbsm_lib/rbsm_ram_control.vhd Page 15

```
Aug 17 11 11 1994  Who: johnf  File  /c2/local user/bma/bma rbsm/bma rbsm lib/rbsm_rd_allowed.vhd Page 1

-- $Id  rbsm_rd_allowed.vnd v 1 6 93/10/15 12 35.23 johnf Exp $
--
--  Author      John A. Flanders
--
--
--  Title       rbsm_rd allowed    rbsm_rd_allowed is the receive buffer state machine component used to
--                                 inform other control blocks that the AMA Status Queue has not already
--                                 been read. This state is needed so that the RBSM bandwidth will not be
--                                 wasted when Cut-Thru is enabled for the source ports. If the AMA status
--                                 Queue has already been read then it will not be read again until Receive
--                                 Status is available. Once the AMA status has been read without Receive
--                                 Status these bits will go inactive so as to prevent any more reading of
--                                 the AMA Status until the Receive Status becomes available.
--
--
--
--  Revission History
--
--  6/23/93                        original version
--
--
--
--
--

library synopsys .
library ieee ;
library bma_lib;
library bma_rbsm_lib;

use synoosys.attributes.all;
use ieee.std_logic_1164.all;
use ieee.std_logic_arith all;
use ieee.std_logic_unsigned.all.
use ieee.std_logic_misc.all;
use bma_lib.bma_types.all;
use bma rbsm_lib.bma_rbsm_types.all;



entity rosm rd_allowed is
    port(
        clock25       : in std_logic        -- system clock
        reset         : in std_logic        -- system reset
        cont_scan     : in std_logic        -- from rbsm stat_control
        rd_state0     : in std_logic        -- from rbsm_stat_control
        rd_state1     : in std_logic        -- from rbsm_stat_control
        scan_vector   : in SCAN_VEC         -- from rbsm_scanner
        ama_set       : in port_vector      -- from rbsm_ama_set
        unload        : in port_vector      -- from rbsm_unload
        rd_allowed      buffer port_vector    ) ;



end rbsm_rd_allowed;
```

```
Aug 17 11:11 1994  Who: johnf  File: /c2/local_user/bma/bma_rbsm/bma_rbsm_lib/rbsm_rd_allowed.vhd Page 2

------------------------------------------------------------
------------------------------------------------------------


architecture synthesize of rbsm_rd_allowed is

-- declarations

signal enet0          : std_logic ;
signal enet1          : std_logic ;
signal enet2          : std_logic ;
signal enet3          : std_logic ;
signal enet4          : std_logic ;
signal enet5          : std_logic ;
signal enet6          : std_logic ;
signal enet7          : std_logic ;
signal enet8          : std_logic ;
signal enet9          : std_logic ;
signal enet10         : std_logic ;
signal enet11         : std_logic ;
signal enet12         : std_logic ;
signal enet13         : std_logic ;
signal enet14         : std_logic ;
signal enet15         : std_logic ;
signal fddi1          : std_logic ;
signal fddi2          : std_logic ;



------------------------------------------------------------
-- body
------------------------------------------------------------

begin


--
--  process rbsm_rd_allowed_sync is used to generate the registered outputs
--  which will be used to allow AMA Status Queue reads when there is no
--  corresponding Receive Status available.
--

rbsm_rd_allowed_sync:
process
 egin
    wait until clock25 = '1'      ;

        rd_allowed(17) <= fddi2    ;
        rd_allowed(16) <= fddi1    ;
        rd_allowed(15) <= enet15   ;
        rd_allowed(14) <= enet14   ;
        rd_allowed(13) <= enet13   ;
        rd_allowed(12) <= enet12   ;
        rd_allowed(11) <= enet11   ;
        rd_allowed(10) <= enet10   ;
        rd_allowed(9)  <= enet9    ;
```

```
Aug 17 11 11 1994  Who: johnf  File. /c2/local_user/bma/bma rbsm/bma rbsm_lib/rbsm rd_allowed vhd Page 3

        rd_allowed(8)   <= enet8
        rd_allowed(7)   <= enet7
        rd_allowed(6)   <= enet6
        rd_allowed(5)   <= enet5   .
        rd_allowed(4)   <= enet4   .
        rd_allowed(3)   <= enet3   ;
        rd_allowed(2)   <= enet2   ;
        rd_allowed(1)   <= enet1   .
        rd_allowed(0)   <= enet0   .

end process rbsm_rd_allowed sync .

--
-- process rbsm_rd_allowed comb is used to generate the combinatorial logic
-- required for all 18 flops generated by this model.
--

rbsm_rd_allowed_comb:
process(reset,cont_scan,scan_vector,ama_set unload,rd_allowed,rd_state0,rd_state1)
begin

-- ========================================================
-- Generate enet0
-- ========================================================

        if (reset = ACT) then
            enet0  <= ACT ,
        elsif (scan_vector(0) = ACT and ama_set(0) = ACT and
                rd_state0 = ACT and rd_state1 = ACT) then
            enet0  <= NOT_ACT ;
        elsif (rd_allowed(0) = NOT ACT and unload(0) = NOT_ACT) then
            enet0  <= NOT_ACT ;
        elsif (rd_allowed(0) = NOT ACT and cont_scan = NOT_ACT) then
            enet0  <= NOT_ACT ;
        else
            enet0 <= ACT ;
        end if;

-- ========================================================
-- Generate enet1
-- ========================================================

        if (reset = ACT) then
            enet1  <= ACT .
        elsif (scan_vector(1) = ACT and ama_set(1) = ACT and
                rd_state0 = ACT and rd_state1 = ACT) then
            enet1  <= NOT_ACT :
        elsif (rd_allowed(1) = NOT ACT and unload(1) = NOT_ACT) then
            enet1  <= NOT_ACT ;
        elsif (rd_allowed(1) = NOT_ACT and cont_scan = NOT_ACT) then
            enet1  <= NOT_ACT ;
        else
            enet1 <= ACT ;
        end if;

-- ========================================================
-- Generate enet2

Aug 17 11:11 1994  Who: johnf  File: /c2/local_user/bma/bma_rbsm/bma_rbsm_lib/rbsm_rd_allowed.vhd Page 4

-- ========================================================

        if (reset = ACT) then
            enet2  <= ACT ;
        elsif (scan_vector(2) = ACT and ama_set(2) = ACT and
                rd_state0 = ACT and rd_state1 = ACT) then
            enet2  <= NOT_ACT ;
        elsif (rd_allowed(2) = NOT_ACT and unload(2) = NOT_ACT) then
            enet2  <= NOT_ACT ;
        elsif (rd_allowed(2) = NOT_ACT and cont_scan = NOT_ACT) then
            enet2  <= NOT_ACT ;
        else
            enet2 <= ACT ;
        end if;

-- ========================================================
-- Generate enet3
-- ========================================================

        if (reset = ACT) then
            enet3  <= ACT ;
        elsif (scan_vector(3) = ACT and ama_set(3) = ACT and
                rd_state0 = ACT and rd_state1 = ACT) then
            enet3  <= NOT_ACT ;
        elsif (rd_allowed(3) = NOT_ACT and unload(3) = NOT_ACT) then
            enet3  <= NOT_ACT ;
        elsif (rd_allowed(3) = NOT_ACT and cont_scan = NOT_ACT) then
            enet3  <= NOT_ACT ;
        else
            enet3 <= ACT ;
        end if;

-- ========================================================
-- Generate enet4
-- ========================================================

        if (reset = ACT) then
            enet4  <= ACT ;
        elsif (scan_vector(4) = ACT and ama_set(4) = ACT and
                rd_state0 = ACT and rd_state1 = ACT) then
            enet4  <= NOT_ACT ;
        elsif (rd_allowed(4) = NOT_ACT and unload(4) = NOT_ACT) then
            enet4  <= NOT_ACT ;
        elsif (rd_allowed(4) = NOT_ACT and cont_scan = NOT_ACT) then
            enet4  <= NOT_ACT ;
        else
            enet4 <= ACT ;
        end if;

-- ========================================================
-- Generate enet5
-- ========================================================

        if (reset = ACT) then
            enet5  <= ACT ;
        elsif (scan_vector(5) = ACT and ama_set(5) = ACT and
                rd_state0 = ACT and rd_state1 = ACT) then
```

```
Aug 17 11:11 1994  Who: johnf  File: /c2/local_user/bma/bma_rbsm/bma_rbsm_lib/rbsm_rd_allowed.vhd Page 5

            enet5   <= NOT_ACT ;
        elsif (rd_allowed(5) = NOT_ACT and unload(5) = NOT_ACT) then
            enet5   <= NOT_ACT ;
        elsif (rd_allowed(5) = NOT_ACT and cont_scan = NOT_ACT) then
            enet5   <= NOT_ACT ;
        else
            enet5 <= ACT ;
        end if;

-- ************************************************************
-- Generate enet6
-- ************************************************************

        if (reset = ACT) then
            enet6   <= ACT ;
        elsif (scan_vector(6) = ACT and ama_set(6) = ACT and
                rd_state0 = ACT and rd_state1 = ACT) then
            enet6   <= NOT_ACT ;
        elsif (rd_allowed(6) = NOT_ACT and unload(6) = NOT_ACT) then
            enet6   <= NOT_ACT ;
        elsif (rd_allowed(6) = NOT_ACT and cont_scan = NOT_ACT) then
            enet6   <= NOT_ACT ;
        else
            enet6 <= ACT ;
        end if;

-- ************************************************************
-- Generate enet7
-- ************************************************************

        if (reset = ACT) then
            enet7   <= ACT ;
        elsif (scan_vector(7) = ACT and ama_set(7) = ACT and
                rd_state0 = ACT and rd_state1 = ACT) then
            enet7   <= NOT_ACT ;
        elsif (rd_allowed(7) = NOT_ACT and unload(7) = NOT_ACT) then
            enet7   <= NOT_ACT ;
        elsif (rd_allowed(7) = NOT_ACT and cont_scan = NOT_ACT) then
            enet7   <= NOT_ACT ;
        else
            enet7 <= ACT ;
        end if;

-- ************************************************************
-- Generate enet8
-- ************************************************************

        if (reset = ACT) then
            enet8   <= ACT ;
        elsif (scan_vector(8) = ACT and ama_set(8) = ACT and
                rd_state0 = ACT and rd_state1 = ACT) then
            enet8   <= NOT_ACT ;
        elsif (rd_allowed(8) = NOT_ACT and unload(8) = NOT_ACT) then
            enet8   <= NOT_ACT ;
        elsif (rd_allowed(8) = NOT_ACT and cont_scan = NOT_ACT) then
            enet8   <= NOT_ACT ;
        else

Aug 17 11:11 1994  Who: johnf  File: /c2/local_user/bma/bma_rbsm/bma_rbsm_lib/rbsm_rd_allowed.vhd Page 6

            enet8 <= ACT ;
        end if;

-- ************************************************************
-- Generate enet9
-- ************************************************************

        if (reset = ACT) then
            enet9   <= ACT ;
        elsif (scan_vector(9) = ACT and ama_set(9) = ACT and
                rd_state0 = ACT and rd_state1 = ACT) then
            enet9   <= NOT_ACT ;
        elsif (rd_allowed(9) = NOT_ACT and unload(9) = NOT_ACT) then
            enet9   <= NOT_ACT ;
        elsif (rd_allowed(9) = NOT_ACT and cont_scan = NOT_ACT) then
            enet9   <= NOT_ACT ;
        else
            enet9 <= ACT ;
        end if;

-- ************************************************************
-- Generate enet10
-- ************************************************************

        if (reset = ACT) then
            enet10   <= ACT ;
        elsif (scan_vector(10) = ACT and ama_set(10) = ACT and
                rd_state0 = ACT and rd_state1 = ACT) then
            enet10   <= NOT_ACT ;
        elsif (rd_allowed(10) = NOT_ACT and unload(10) = NOT_ACT) then
            enet10   <= NOT_ACT ;
        elsif (rd_allowed(10) = NOT_ACT and cont_scan = NOT_ACT) then
            enet10   <= NOT_ACT ;
        else
            enet10 <= ACT ;
        end if;

-- ************************************************************
-- Generate enet11
-- ************************************************************

        if (reset = ACT) then
            enet11   <= ACT ;
        elsif (scan_vector(11) = ACT and ama_set(11) = ACT and
                rd_state0 = ACT and rd_state1 = ACT) then
            enet11   <= NOT_ACT ;
        elsif (rd_allowed(11) = NOT_ACT and unload(11) = NOT_ACT) then
            enet11   <= NOT_ACT ;
        elsif (rd_allowed(11) = NOT_ACT and cont_scan = NOT_ACT) then
            enet11   <= NOT_ACT ;
        else
            enet11 <= ACT ;
        end if;

-- ************************************************************
-- Generate enet12
```

```
Aug 17 11:11 1994  Who  johnf  File  /c2/local_user/bma/bma_rbsm/bma_rbsm_lib/rbsm_rd_allowed.vhd Page 7

-- ==========================================================

        if (reset = ACT) then
            enet12  <= ACT ;
        elsif (scan_vector(12) = ACT and ama_set(12) = ACT and
                rd_state0 = ACT and rd_state1 = ACT) then
            enet12  <= NOT_ACT ;
        elsif (rd_allowed(12) = NOT_ACT and unload(12) = NOT_ACT) then
            enet12  <= NOT_ACT ;
        elsif (rd_allowed(12) = NOT_ACT and cont_scan = NOT_ACT) then
            enet12  <= NOT_ACT ;
        else
            enet12 <= ACT ;
        end if;

-- ==========================================================
-- Generate enet13
-- ==========================================================

        if (reset = ACT) then
            enet13  <= ACT ;
        elsif (scan_vector(13) = ACT and ama_set(13) = ACT and
                rd_state0 = ACT and rd_state1 = ACT) then
            enet13  <= NOT_ACT ;
        elsif (rd_allowed(13) = NOT_ACT and unload(13) = NOT_ACT) then
            enet13  <= NOT_ACT ;
        elsif (rd_allowed(13) = NOT_ACT and cont_scan = NOT_ACT) then
            enet13  <= NOT_ACT ;
        else
            enet13 <= ACT ;
        end if;

-- ==========================================================
-- Generate enet14
-- ==========================================================

        if (reset = ACT) then
            enet14  <= ACT ;
        elsif (scan_vector(14) = ACT and ama_set(14) = ACT and
                rd_state0 = ACT and rd_state1 = ACT) then
            enet14  <= NOT_ACT ;
        elsif (rd_allowed(14) = NOT_ACT and unload(14) = NOT_ACT) then
            enet14  <= NOT_ACT ;
        elsif (rd_allowed(14) = NOT_ACT and cont_scan = NOT_ACT) then
            enet14  <= NOT_ACT ;
        else
            enet14 <= ACT ;
        end if;

-- ==========================================================
-- Generate enet15
-- ==========================================================

        if (reset = ACT) then
            enet15  <= ACT ;
        elsif (scan_vector(15) = ACT and ama_set(15) = ACT and
                rd_state0 = ACT and rd_state1 = ACT) then

Aug 17 11:11 1994  Who: johnf  File: /c2/local_user/bma/bma_rbsm/bma_rbsm_lib/rbsm_rd_allowed.vhd Page 8

            enet15  <= NOT_ACT ;
        elsif (rd_allowed(15) = NOT_ACT and unload(15) = NOT_ACT) then
            enet15  <= NOT_ACT ;
        elsif (rd_allowed(15) = NOT_ACT and cont_scan = NOT_ACT) then
            enet15  <= NOT_ACT ;
        else
            enet15 <= ACT ;
        end if;

-- ==========================================================
-- Generate fddi1
-- ==========================================================

        if (reset = ACT) then
            fddi1  <= ACT ;
        elsif (scan_vector(18) = ACT and ama_set(16) = ACT and
                rd_state0 = ACT and rd_state1 = ACT) then
            fddi1  <= NOT_ACT ;
        elsif (scan_vector(17) = ACT and ama_set(16) = ACT and
                rd_state0 = ACT and rd_state1 = ACT) then
            fddi1  <= NOT_ACT ;
        elsif (rd_allowed(16) = NOT_ACT and unload(16) = NOT_ACT) then
            fddi1  <= NOT_ACT ;
        elsif (rd_allowed(16) = NOT_ACT and cont_scan = NOT_ACT) then
            fddi1  <= NOT_ACT ;
        else
            fddi1 <= ACT ;
        end if;

-- ==========================================================
-- Generate fddi2
-- ==========================================================

        if (reset = ACT) then
            fddi2  <= ACT ;
        elsif (scan_vector(18) = ACT and ama_set(17) = ACT and
                rd_state0 = ACT and rd_state1 = ACT) then
            fddi2  <= NOT_ACT ;
        elsif (scan_vector(19) = ACT and ama_set(17) = ACT and
                rd_state0 = ACT and rd_state1 = ACT) then
            fddi2  <= NOT_ACT ;
        elsif (rd_allowed(17) = NOT_ACT and unload(17) = NOT_ACT) then
            fddi2  <= NOT_ACT ;
        elsif (rd_allowed(17) = NOT_ACT and cont_scan = NOT_ACT) then
            fddi2  <= NOT_ACT ;
        else
            fddi2 <= ACT ;
        end if;


end process rbsm_rd_allowed_comb;

end synthesize;
```

Aug 17 11:11 1994 Who johnf File: /c2/local_user/bma/bma_rbsm/bma_rbsm_lib/rbsm_rd_allowed.vhd Page 9

```
Aug 17 11:11 1994  Who  johnf  File  /c2/local_user/bma/bma_rbsm/bma_rbsm_lib/rbsm_request.vhd Page 1

-- $Id: rbsm_request.vhd,v 1.4 93/10/15 12:35:33 johnf Exp $
--
--  Author        John A  Flanders
--
--
--  Title         rbsm_request    rbsm_request is the receive buffer state machine component used to
--                                generate active requests during a slot time if either AMA status
--                                and Receive status for a port is available. The requests generated
--                                by this module are used by other modules.
--
--
--
--  Revision History
--
--  7/8/93 :                      original version
--
--
--
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_request is
    port(
          ama_avail        : in std_logic          ;  -- AMA status available indicator
          rx_avail         : in std_logic          ;  -- RX status available indicator
          ct_enable        : in port_vector        ;  -- Cut-Thru allowed (29K write register)
          rd_allowed       : in port_vector        ;  -- AMA status read allowed
          ct_ll_threshold  : in port_vector        ;  -- Cut-Thru low latency threshold indicator
          ama_set          : in port_vector        ;  -- Reading AMA status only indicator
          scan_vector      : in SCAN_VEC           ;  -- Port scan indicator
          rx_stat_rq       : buffer std_logic      ;  -- read RX status request
          ama_stat_rq      : buffer std_logic      ;  -- read AMA status request
          ama_only         : buffer port_vector    ;  -- Only AMA status is available
          rx_ama_req       : buffer port_vector    ;  -- Receive status and AMA status is available
          port_req         : buffer port_vector  ) ;  -- Either AMA only or both AMA and RX status avail

end rbsm_request;


-------------------------------------------------------------
-------------------------------------------------------------
```

```
Aug 17 11:11 1994  Who: johnf  File: /c2/local_user/bma/bma_rbsm/bma_rbsm_lib/rbsm_request.vhd Page 2



architecture synthesize of rbsm_request is

-- declarations


-------------------------------------------------------------
-- body
-------------------------------------------------------------

begin


--
--  process rbsm_ama_only is used to generate the combinatorial outputs
--  which will indicate that only AMA status is available and that the
--  AMA status should be read by the RBSM so Cut-Thru can take place.
--  These signals will only go active when there is no Receive status
--  and all the Cut_thru conditions for the source port, that can be determined
--  without reading the AMA status are met. The
--  AMA status must be read to determine if the Cut-thru conditions for
--  the destination port are met.
--

rbsm_ama_only:
process(scan_vector,ama_avail,rx_avail,ct_enable,rd_allowed,ct_ll_threshold)
begin

-- ***************************************************************
-- Generate enet0
-- ***************************************************************

        if (scan_vector(0) = ACT and ama_avail = ACT and
            rx_avail = NOT_ACT and ct_ll_threshold(0) = ACT and
            ct_enable(0) = ACT and rd_allowed(0) = ACT) then
            ama_only(0) <= ACT ;
        else
            ama_only(0) <= NOT_ACT ;
        end if;

-- ***************************************************************
-- Generate enet1
-- ***************************************************************

        if (scan_vector(1) = ACT and ama_avail = ACT and
            rx_avail = NOT_ACT and ct_ll_threshold(1) = ACT and
            ct_enable(1) = ACT and rd_allowed(1) = ACT) then
            ama_only(1) <= ACT ;
        else
            ama_only(1) <= NOT_ACT ;
        end if;

-- ***************************************************************
-- Generate enet2
-- ***************************************************************

        if (scan_vector(2) = ACT and ama_avail = ACT and
```

```
Aug 17 11:11 1994  Who: johnf  File: /c2/local_user/bma/bma_rbsm/bma_rbsm_lib/rbsm_request.vhd Page 3

            rx_avail = NOT_ACT and ct_ll_threshold(2) = ACT and
            ct_enable(2) = ACT and rd_allowed(2) = ACT) then
            ama_only(2) <= ACT ;
        else
            ama_only(2) <= NOT_ACT ;
        end if;

-- **********************************************************
-- Generate enet3
-- **********************************************************

        if (scan_vector(3) = ACT and ama_avail = ACT and
            rx_avail = NOT_ACT and ct_ll_threshold(3) = ACT and
            ct_enable(3) = ACT and rd_allowed(3) = ACT) then
            ama_only(3) <= ACT ;
        else
            ama_only(3) <= NOT_ACT ;
        end if;

-- **********************************************************
-- Generate enet4
-- **********************************************************

        if (scan_vector(4) = ACT and ama_avail = ACT and
            rx_avail = NOT_ACT and ct_ll_threshold(4) = ACT and
            ct_enable(4) = ACT and rd_allowed(4) = ACT) then
            ama_only(4) <= ACT ;
        else
            ama_only(4) <= NOT_ACT ;
        end if;

-- **********************************************************
-- Generate enet5
-- **********************************************************

        if (scan_vector(5) = ACT and ama_avail = ACT and
            rx_avail = NOT_ACT and ct_ll_threshold(5) = ACT and
            ct_enable(5) = ACT and rd_allowed(5) = ACT) then
            ama_only(5) <= ACT ;
        else
            ama_only(5) <= NOT_ACT ;
        end if;

-- **********************************************************
-- Generate enet6
-- **********************************************************

        if (scan_vector(6) = ACT and ama_avail = ACT and
            rx_avail = NOT_ACT and ct_ll_threshold(6) = ACT and
            ct_enable(6) = ACT and rd_allowed(6) = ACT) then
            ama_only(6) <= ACT ;
        else
            ama_only(6) <= NOT_ACT ;
        end if;

-- **********************************************************
-- Generate enet7
-- **********************************************************

        if (scan_vector(7) = ACT and ama_avail = ACT and

Aug 17 11:11 1994  Who: johnf  File: /c2/local_user/bma/bma_rbsm/bma_rbsm_lib/rbsm_request.vhd Page 4

            rx_avail = NOT_ACT and ct_ll_threshold(7) = ACT and
            ct_enable(7) = ACT and rd_allowed(7) = ACT) then
            ama_only(7) <= ACT ;
        else
            ama_only(7) <= NOT_ACT ;
        end if;

-- **********************************************************
-- Generate enet8
-- **********************************************************

        if (scan_vector(8) = ACT and ama_avail = ACT and
            rx_avail = NOT_ACT and ct_ll_threshold(8) = ACT and
            ct_enable(8) = ACT and rd_allowed(8) = ACT) then
            ama_only(8) <= ACT ;
        else
            ama_only(8) <= NOT_ACT ;
        end if;

-- **********************************************************
-- Generate enet9
-- **********************************************************

        if (scan_vector(9) = ACT and ama_avail = ACT and
            rx_avail = NOT_ACT and ct_ll_threshold(9) = ACT and
            ct_enable(9) = ACT and rd_allowed(9) = ACT) then
            ama_only(9) <= ACT ;
        else
            ama_only(9) <= NOT_ACT ;
        end if;

-- **********************************************************
-- Generate enet10
-- **********************************************************

        if (scan_vector(10) = ACT and ama_avail = ACT and
            rx_avail = NOT_ACT and ct_ll_threshold(10) = ACT and
            ct_enable(10) = ACT and rd_allowed(10) = ACT) then
            ama_only(10) <= ACT ;
        else
            ama_only(10) <= NOT_ACT ;
        end if;

-- **********************************************************
-- Generate enet11
-- **********************************************************

        if (scan_vector(11) = ACT and ama_avail = ACT and
            rx_avail = NOT_ACT and ct_ll_threshold(11) = ACT and
            ct_enable(11) = ACT and rd_allowed(11) = ACT) then
            ama_only(11) <= ACT ;
        else
            ama_only(11) <= NOT_ACT ;
        end if;

-- **********************************************************
-- Generate enet12
-- **********************************************************

        if (scan_vector(12) = ACT and ama_avail = ACT and
```

Aug 17 11:11 1994 Who: johnf File: /c2/local_user/bma/bma_rbsm/bma_rbsm_lib/rbsm_request.vhd Page 5

```
            rx_avail = NOT_ACT and ct_ll_threshold(12) = ACT and
            ct_enable(12) = ACT and rd_allowed(12) = ACT) then
            ama_only(12) <= ACT ;
        else
            ama_only(12) <= NOT_ACT ;
        end if;

-- ========================================================
-- Generate enet13
-- ========================================================

        if (scan_vector(13) = ACT and ama_avail = ACT and
            rx_avail = NOT_ACT and ct_ll_threshold(13) = ACT and
            ct_enable(13) = ACT and rd_allowed(13) = ACT) then
            ama_only(13) <= ACT ;
        else
            ama_only(13) <= NOT_ACT ;
        end if;

-- ========================================================
-- Generate enet14
-- ========================================================

        if (scan_vector(14) = ACT and ama_avail = ACT and
            rx_avail = NOT_ACT and ct_ll_threshold(14) = ACT and
            ct_enable(14) = ACT and rd_allowed(14) = ACT) then
            ama_only(14) <= ACT ;
        else
            ama_only(14) <= NOT_ACT ;
        end if;

-- ========================================================
-- Generate enet15
-- ========================================================

        if (scan_vector(15) = ACT and ama_avail = ACT and
            rx_avail = NOT_ACT and ct_ll_threshold(15) = ACT and
            ct_enable(15) = ACT and rd_allowed(15) = ACT) then
            ama_only(15) <= ACT ;
        else
            ama_only(15) <= NOT_ACT ;
        end if;

-- ========================================================
-- Generate fddi1
-- ========================================================

        if (scan_vector(16) = ACT and ama_avail = ACT and
            rx_avail = NOT_ACT and ct_ll_threshold(16) = ACT and
            ct_enable(16) = ACT and rd_allowed(16) = ACT) then
            ama_only(16) <= ACT ;
        elsif (scan_vector(17) = ACT and ama_avail = ACT and
            rx_avail = NOT_ACT and ct_ll_threshold(16) = ACT and
            ct_enable(16) = ACT and rd_allowed(16) = ACT) then
            ama_only(16) <= ACT ;
        else
            ama_only(16) <= NOT_ACT ;
        end if;
```

Aug 17 11:11 1994 Who: johnf File: /c2/local_user/bma/bma_rbsm/bma_rbsm_lib/rbsm_request.vhd Page 6

```
-- ========================================================
-- Generate fddi2
-- ========================================================

        if (scan_vector(18) = ACT and ama_avail = ACT and
            rx_avail = NOT_ACT and ct_ll_threshold(17) = ACT and
            ct_enable(17) = ACT and rd_allowed(17) = ACT) then
            ama_only(17) <= ACT ;
        elsif (scan_vector(19) = ACT and ama_avail = ACT and
            rx_avail = NOT_ACT and ct_ll_threshold(17) = ACT and
            ct_enable(17) = ACT and rd_allowed(17) = ACT) then
            ama_only(17) <= ACT ;
        else
            ama_only(17) <= NOT_ACT ;
        end if;


end process rbsm_ama_only ;

--
-- process rbsm_rx_ama is used to generate the requests used to inform
-- other modules that both the AMA and Receive status is available and
-- should be read from the two queues.
--

rbsm_rx_ama:
process(scan_vector,ama_avail,rx_avail,ama_set)
begin

-- ========================================================
-- Generate enet0
-- ========================================================

        if (scan_vector(0) = ACT and ama_avail = ACT and
            rx_avail = ACT and ama_set(0) = NOT_ACT) then
            rx_ama_req(0) <= ACT ;
        else
            rx_ama_req(0) <= NOT_ACT ;
        end if;

-- ========================================================
-- Generate enet1
-- ========================================================

        if (scan_vector(1) = ACT and ama_avail = ACT and
            rx_avail = ACT and ama_set(1) = NOT_ACT) then
            rx_ama_req(1) <= ACT ;
        else
            rx_ama_req(1) <= NOT_ACT ;
        end if;

-- ========================================================
-- Generate enet2
-- ========================================================

        if (scan_vector(2) = ACT and ama_avail = ACT and
            rx_avail = ACT and ama_set(2) = NOT_ACT) then
```

Aug 17 11:11 1994 Who: johnf File: /c2/local_user/bma/bma_rbsm/bma_rbsm_lib/rbsm_request.vhd Page 7

```
            rx_ama_req(2) <= ACT ;
        else
            rx_ama_req(2) <= NOT_ACT ;
        end if;

-- ==========================================================
-- Generate enet3
-- ==========================================================

        if (scan_vector(3) = ACT and ama_avail = ACT and
            rx_avail = ACT and ama_set(3) = NOT_ACT) then
            rx_ama_req(3) <= ACT ;
        else
            rx_ama_req(3) <= NOT_ACT ;
        end if;

-- ==========================================================
-- Generate enet4
-- ==========================================================

        if (scan_vector(4) = ACT and ama_avail = ACT and
            rx_avail = ACT and ama_set(4) = NOT_ACT) then
            rx_ama_req(4) <= ACT ;
        else
            rx_ama_req(4) <= NOT_ACT ;
        end if;

-- ==========================================================
-- Generate enet5
-- ==========================================================

        if (scan_vector(5) = ACT and ama_avail = ACT and
            rx_avail = ACT and ama_set(5) = NOT_ACT) then
            rx_ama_req(5) <= ACT ;
        else
            rx_ama_req(5) <= NOT_ACT ;
        end if;

-- ==========================================================
-- Generate enet6
-- ==========================================================

        if (scan_vector(6) = ACT and ama_avail = ACT and
            rx_avail = ACT and ama_set(6) = NOT_ACT) then
            rx_ama_req(6) <= ACT ;
        else
            rx_ama_req(6) <= NOT_ACT ;
        end if;

-- ==========================================================
-- Generate enet7
-- ==========================================================

        if (scan_vector(7) = ACT and ama_avail = ACT and
            rx_avail = ACT and ama_set(7) = NOT_ACT) then
            rx_ama_req(7) <= ACT ;
        else
            rx_ama_req(7) <= NOT_ACT ;
        end if;
```

Aug 17 11:11 1994 Who: johnf File: /c2/local_user/bma/bma_rbsm/bma_rbsm_lib/rbsm_request.vhd Page 8

```
-- ==========================================================
-- Generate enet8
-- ==========================================================

        if (scan_vector(8) = ACT and ama_avail = ACT and
            rx_avail = ACT and ama_set(8) = NOT_ACT) then
            rx_ama_req(8) <= ACT ;
        else
            rx_ama_req(8) <= NOT_ACT ;
        end if;

-- ==========================================================
-- Generate enet9
-- ==========================================================

        if (scan_vector(9) = ACT and ama_avail = ACT and
            rx_avail = ACT and ama_set(9) = NOT_ACT) then
            rx_ama_req(9) <= ACT ;
        else
            rx_ama_req(9) <= NOT_ACT ;
        end if;

-- ==========================================================
-- Generate enet10
-- ==========================================================

        if (scan_vector(10) = ACT and ama_avail = ACT and
            rx_avail = ACT and ama_set(10) = NOT_ACT) then
            rx_ama_req(10) <= ACT ;
        else
            rx_ama_req(10) <= NOT_ACT ;
        end if;

-- ==========================================================
-- Generate enet11
-- ==========================================================

        if (scan_vector(11) = ACT and ama_avail = ACT and
            rx_avail = ACT and ama_set(11) = NOT_ACT) then
            rx_ama_req(11) <= ACT ;
        else
            rx_ama_req(11) <= NOT_ACT ;
        end if;

-- ==========================================================
-- Generate enet12
-- ==========================================================

        if (scan_vector(12) = ACT and ama_avail = ACT and
            rx_avail = ACT and ama_set(12) = NOT_ACT) then
            rx_ama_req(12) <= ACT ;
        else
            rx_ama_req(12) <= NOT_ACT ;
        end if;

-- ==========================================================
-- Generate enet13
-- ==========================================================

        if (scan_vector(13) = ACT and ama_avail = ACT and
```

```
Aug 17 11 11 1994  Who: johnf  File  /c2/local_user/bma/bma_rbsm/bma_rbsm_lib/rbsm_request.vhd Page 9

            rx_avail = ACT and ama_set(13) = NOT_ACT) then
            rx_ama_req(13) <= ACT
        else
            rx_ama_req(13) <= NOT_ACT
        end if;

-- ************************************************************
-- Generate enet14
-- ************************************************************

        if (scan_vector(14) = ACT and ama_avail = ACT and
            rx_avail = ACT and ama_set(14) = NOT_ACT) then
            rx_ama_req(14) <= ACT ;
        else
            rx_ama_req(14) <= NOT_ACT ;
        end if;

-- ************************************************************
-- Generate enet15
-- ************************************************************

        if (scan_vector(15) = ACT and ama_avail = ACT and
            rx_avail = ACT and ama_set(15) = NOT_ACT) then
            rx_ama_req(15) <= ACT ;
        else
            rx_ama_req(15) <= NOT_ACT ,
        end if;

-- ************************************************************
-- Generate fddi1
-- ************************************************************

        if (scan_vector(16) = ACT and ama_avail = ACT and
            rx_avail = ACT and ama_set(16) = NOT_ACT) then
            rx_ama_req(16) <= ACT ;
        elsif (scan_vector(17) = ACT and ama_avail = ACT and
            rx_avail = ACT and ama_set(16) = NOT_ACT) then
            rx_ama_req(16) <= ACT ;
        else
            rx_ama_req(16) <= NOT_ACT ;
        end if;

-- ************************************************************
-- Generate fddi2
-- ************************************************************

        if (scan_vector(18) = ACT and ama_avail = ACT and
            rx_avail = ACT and ama_set(17) = NOT_ACT) then
            rx_ama_req(17) <= ACT ;
        elsif (scan_vector(19) = ACT and ama_avail = ACT and
            rx_avail = ACT and ama_set(17) = NOT_ACT) then
            rx_ama_req(17) <= ACT ;
        else
            rx_ama_req(17) <= NOT_ACT ;
        end if;

end process rbsm_rx_ama;
```

```
Aug 17 11:11 1994  Who: johnf  File: /c2/local_user/bma/bma_rbsm/bma_rbsm_lib/rbsm_request.vhd Page 10

--
-- process rbsm_port_req is used to generate the requests used to inform
-- other modules that either AMA or AMA and  Receive status is available and
-- should be read from the queue or queues.
--

rbsm_port_req:
process(ama_only,rx_ama_req)
begin

-- ************************************************************
-- Generate enet0
-- ************************************************************

        if (ama_only(0) = ACT or rx_ama_req(0) = ACT) then
            port_req(0) <= ACT;
        else
            port_req(0) <= NOT_ACT;
        end if;

-- ************************************************************
-- Generate enet1
-- ************************************************************

        if (ama_only(1) = ACT or rx_ama_req(1) = ACT) then
            port_req(1) <= ACT;
        else
            port_req(1) <= NOT_ACT;
        end if;

-- ************************************************************
-- Generate enet2
-- ************************************************************

        if (ama_only(2) = ACT or rx_ama_req(2) = ACT) then
            port_req(2) <= ACT;
        else
            port_req(2) <= NOT_ACT.
        end if;

-- ************************************************************
-- Generate enet3
-- ************************************************************

        if (ama_only(3) = ACT or rx_ama_req(3) = ACT) then
            port_req(3) <= ACT;
        else
            port_req(3) <= NOT_ACT;
        end if;

-- ************************************************************
-- Generate enet4
-- ************************************************************

        if (ama_only(4) = ACT or rx_ama_req(4) = ACT) then
            port_req(4) <= ACT;
        else
```

```
Aug 17 11:11 1994  Who: johnf  File: /c2/local_user/bma/bma_rbsm/bma_rbsm_lib/rbsm_request.vhd Page 11

            port_req(4) <= NOT_ACT;
        end if;

-- ************************************************************
-- Generate enet5
-- ************************************************************

        if (ama_only(5) = ACT or rx_ama_req(5) = ACT) then
            port_req(5) <= ACT;
        else
            port_req(5) <= NOT_ACT;
        end if;

-- ************************************************************
-- Generate enet6
-- ************************************************************

        if (ama_only(6) = ACT or rx_ama_req(6) = ACT) then
            port_req(6) <= ACT;
        else
            port_req(6) <= NOT_ACT;
        end if;

-- ************************************************************
-- Generate enet7
-- ************************************************************

        if (ama_only(7) = ACT or rx_ama_req(7) = ACT) then
            port_req(7) <= ACT;
        else
            port_req(7) <= NOT_ACT;
        end if;

-- ************************************************************
-- Generate enet8
-- ************************************************************

        if (ama_only(8) = ACT or rx_ama_req(8) = ACT) then
            port_req(8) <= ACT;
        else
            port_req(8) <= NOT_ACT;
        end if;

-- ************************************************************
-- Generate enet9
-- ************************************************************

        if (ama_only(9) = ACT or rx_ama_req(9) = ACT) then
            port_req(9) <= ACT;
        else
            port_req(9) <= NOT_ACT;
        end if;

-- ************************************************************
-- Generate enet10
-- ************************************************************

        if (ama_only(10) = ACT or rx_ama_req(10) = ACT) then
            port_req(10) <= ACT;
        else
```

```
Aug 17 11:11 1994  Who: johnf  File: /c2/local_user/bma/bma_rbsm/bma_rbsm_lib/rbsm_request.vhd Page 12

            port_req(10) <= NOT_ACT;
        end if;

-- ************************************************************
-- Generate enet11
-- ************************************************************

        if (ama_only(11) = ACT or rx_ama_req(11) = ACT) then
            port_req(11) <= ACT;
        else
            port_req(11) <= NOT_ACT;
        end if;

-- ************************************************************
-- Generate enet12
-- ************************************************************

        if (ama_only(12) = ACT or rx_ama_req(12) = ACT) then
            port_req(12) <= ACT;
        else
            port_req(12) <= NOT_ACT;
        end if;

-- ************************************************************
-- Generate enet13
-- ************************************************************

        if (ama_only(13) = ACT or rx_ama_req(13) = ACT) then
            port_req(13) <= ACT;
        else
            port_req(13) <= NOT_ACT;
        end if;

-- ************************************************************
-- Generate enet14
-- ************************************************************

        if (ama_only(14) = ACT or rx_ama_req(14) = ACT) then
            port_req(14) <= ACT;
        else
            port_req(14) <= NOT_ACT;
        end if;

-- ************************************************************
-- Generate enet15
-- ************************************************************

        if (ama_only(15) = ACT or rx_ama_req(15) = ACT) then
            port_req(15) <= ACT;
        else
            port_req(15) <= NOT_ACT;
        end if;

-- ************************************************************
-- Generate fddi1
-- ************************************************************

        if (ama_only(16) = ACT or rx_ama_req(16) = ACT) then
            port_req(16) <= ACT;
        else
```

```
Aug 17 11:11 1994  Who  johnf  File: /c2/local_user/bma/bma_rbsm/bma_rbsm_lib/rbsm_request.vhd Page 13

            port_req(16) <= NOT_ACT;
        end if;

-- ==============================================================
-- Generate fddi2
-- ==============================================================

        if (ama_only(17) = ACT or rx_ama_req(17) = ACT) then
            port_req(17) <= ACT;
        else
            port_req(17) <= NOT_ACT;
        end if;


end process rbsm_port_req;


--
-- process rbsm_rx_stat is used to generate the requests used to inform
-- other modules that both AMA and  Receive status is available and
-- should be read from the queues.
--

rbsm_rx_stat:
process(rx_ama_req)
begin

        if (rx_ama_req(0)  = ACT or rx_ama_req(1)  = ACT or
            rx_ama_req(2)  = ACT or rx_ama_req(3)  = ACT or
            rx_ama_req(4)  = ACT or rx_ama_req(5)  = ACT or
            rx_ama_req(6)  = ACT or rx_ama_req(7)  = ACT or
            rx_ama_req(8)  = ACT or rx_ama_req(9)  = ACT or
            rx_ama_req(10) = ACT or rx_ama_req(11) = ACT or
            rx_ama_req(12) = ACT or rx_ama_req(13) = ACT or
            rx_ama_req(14) = ACT or rx_ama_req(15) = ACT or
            rx_ama_req(16) = ACT or rx_ama_req(17) = ACT) then
            rx_stat_rq <= ACT;
        else
            rx_stat_rq <= NOT_ACT;
        end if;

end process rbsm_rx_stat;


--
-- process rbsm_ama_stat is used to generate the requests used to inform
-- other modules that only AMA status is available
--

rbsm_ama_stat:
process(ama_only,rx_stat_rq)
begin

        if (ama_only(0)  = ACT or ama_only(1)  = ACT or
            ama_only(2)  = ACT or ama_only(3)  = ACT or
            ama_only(4)  = ACT or ama_only(5)  = ACT or
            ama_only(6)  = ACT or ama_only(7)  = ACT or
            ama_only(8)  = ACT or ama_only(9)  = ACT or
            ama_only(10) = ACT or ama_only(11) = ACT or

Aug 17 11:11 1994  Who: johnf  File: /c2/local_user/bma/bma_rbsm/bma_rbsm_lib/rbsm_request.vhd Page 14

            ama_only(12) = ACT or ama_only(13) = ACT or
            ama_only(14) = ACT or ama_only(15) = ACT or
            ama_only(16) = ACT or ama_only(17) = ACT or
            rx_stat_rq = ACT) then
            ama_stat_rq <= ACT;
        else
            ama_stat_rq <= NOT_ACT;
        end if;

end process rbsm_ama_stat;


end synthesize;
```

Aug 17 11:11 1994 Who johnf File: /c2/local user/bma/bma_rbsm/bma_rbsm_lib/rbsm_ret_buf_cnt.vhd Page 1

```
-- $Id rbsm ret buf_cnt vhd,v 1 15 94/06/02 18:18:27 johnf Exp $
--
-- Author        John A  Flanders
--
--
-- Title         rbsm_ret_buf_cnt   : rbsm_ret_buf_cnt  is the receive buffer state machine component used to
--                                    control returning buffer numbers to the Return Buffer Event Queue when
--                                    it is determined that a frame is to be filtered and not aborted if it is
--                                    an FDDI frame. If it is a filtered and aborted FDDI frame the DMA controller will
--                                    automatically reuse the buffer that was being consumed by the aborted
--                                    frame. If it is a multi-buffer filtered and aborted FDDI frame, all buffers except
--                                    for the last buffer used will be returned by the RBSM. The last buffer
--                                    will automatically be re-used by the DMA controller. The RBSM will return the
--                                    buffer to the return buffer queue for filtered ETHERNET frames.
--
--
--
-- Revision History
--
-- 7/11/93 :                      original version
--
--
--
--
--

library std;
library synopsys ;
library ieee ;
library bma_lib;
library bma_rbsm_lib;


use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;

-- synopsys_translate_off
use std textio.all;
use ieee.std_logic_textio.all;
-- synopsys_translate_on

entity rbsm_ret_buf_cnt is
    port(
        clock25                   : in std_logic        ; -- system clock
        reset                     : in std_logic        ; -- system reset
        scan_vector16             : in std_logic        ; -- from rbsm_scanner
        scan_vector17             : in std_logic        ; -- from rbsm_scanner
        scan_vector18             : in std_logic        ; -- from rbsm_scanner
        scan_vector19             : in std_logic        ; -- from rbsm_scanner
        filter_frame              : in std_logic        ; -- from rbsm_stat_control
        discard_frame             : in std_logic        ; -- from rbsm_stat_control
        rx_monitor_on             : in std_logic        ; -- from rbsm_config
        fddi_abort                : in std_logic        ; -- rx_stat_reg(15)
        enet_abort                : in std_logic        ; -- from rbsm_status_registers    ADDED 5/2/94
        rx_end_of_buffer          : in std_logic        ; -- rx_stat_reg(18)
```

Aug 17 11:11 1994 Who: johnf File: /c2/local_user/bma/bma_rbsm/bma_rbsm_lib/rbsm_ret_buf_cnt.vhd Page 2

```
        cont_scan                 : in std_logic        ; -- from rbsm_stat_control
        return_bufferq_full       : in std_logic        ; -- from RETURN BUFFER EVENT Q INTERFACE
        rx_buffer_number          : in buffer_number    ; -- rx_stat_reg(42 downto 32) from rbsm_status_registers
        return_bufferq_ready      : buffer std_logic    ; -- to rbsm_stat_control
        return_buffer_write_enable : buffer std_logic   ; -- to RETURN BUFFER EVENT Q INTERFACE
        return_buffer_write_pulse : buffer std_logic    ; -- extra output
        load_return_bufferq_wreg  : buffer std_logic    ; -- extra output
        return_bufferq_full_error : buffer std_logic    ; -- Return Buffer Queue FIFO full error
        buffer_number_tobe_returned : buffer buffer_number ) ; -- to RETURN BUFFER EVENT Q INTERFACE


end rbsm_ret_buf_cnt;



------------------------------------------------------------
------------------------------------------------------------



architecture synthesize of rbsm_ret_buf_cnt is

-- declarations


signal write_pulse           : std_logic  ;
signal load_wreg             : std_logic  ;
signal return_ready          : std_logic  ;


------------------------------------------------------------
-- body
------------------------------------------------------------

begin



--
--  process rbsm_ret_buf_sync is used to generate the registered outputs
--  which will be used to control writing to the Return Buffer Event Queue.
--

rbsm_ret_buf_sync:
process
begin
    wait until clock25 = '1'      ;

        load_return_bufferq_wreg    <= load_wreg             ;
        return_bufferq_ready        <= return_ready          ;
        return_buffer_write_pulse   <= write_pulse           ;

-- Generate a 2to1 mux by 11 followed by an 11 bit register

        if (reset = ACT) then
            buffer_number_tobe_returned <= (others => '0') ;
        elsif (load_return_bufferq_wreg = ACT) then
            buffer_number_tobe_returned <= rx_buffer_number ;
```

```
Aug 17 11:11 1994  Who: johnf  File: /c2/local_user/bma/bma_rbsm/bma_rbsm_lib/rbsm_ret_buf_cnt.vhd Page 3

        else
            buffer_number_tobe_returned <= buffer_number_tobe_returned
        end if;

--


end process rbsm_ret_buf_sync ;

--
-- process rbsm_ret_buf_comb is used to generate the combinatorial logic
-- required by this model.
--

rbsm_ret_buf_comb:
process(reset,scan_vector16,scan_vector17,scan_vector18,scan_vector19,
        fddi_abort,filter_frame,rx_end_of_buffer,cont_scan,
        return_bufferq_full,return_buffer_write_pulse,return_bufferq_ready,
        return_buffer_write_pulse,return_buffer_write_enable,
        load_return_bufferq_wreg,enet_abort,
        discard_frame,rx_monitor_on)


begin

-- ************************************************************
-- Generate return_buffer_write_enable : combinatorial only
-- ************************************************************

        if (reset = NOT_ACT and return_bufferq_full = NOT_ACT and
            return_buffer_write_pulse = ACT) then
            return_buffer_write_enable <= ACT;
        else
            return_buffer_write_enable <= NOT_ACT;
        end if;


-- ************************************************************
-- Generate write_pulse (return_buffer_write_pulse)
-- ************************************************************

        if (reset = ACT) then
            write_pulse <= NOT_ACT;
        elsif (return_bufferq_ready = NOT_ACT and
                return_buffer_write_enable = NOT_ACT) then
            write_pulse <= ACT;
        else
            write_pulse <= NOT_ACT;
        end if;


-- ************************************************************
-- Generate return_ready (return_bufferq_ready)
-- ************************************************************


Aug 17 11:11 1994  Who: johnf  File: /c2/local_user/bma/bma_rbsm/bma_rbsm_lib/rbsm_ret_buf_cnt.vhd Page 4

        if (reset = ACT) then
            return_ready <= ACT;
        elsif(load_return_bufferq_wreg = ACT) then
            return_ready <= NOT_ACT;
        elsif(return_bufferq_ready = NOT_ACT and
                return_buffer_write_enable = NOT_ACT) then
            return_ready <= NOT_ACT;
        else
            return_ready <= ACT;
        end if;


-- ************************************************************
-- Generate load_wreg (load_return_bufferq_wreg)
-- ************************************************************

        if (reset = ACT) then
            load_wreg  <= NOT_ACT ;
        elsif ((scan_vector16 = ACT or scan_vector17 = ACT or            -- FDDI Aborted Frame
                scan_vector18 = ACT or scan_vector19 = ACT) and
                fddi_abort = ACT and cont_scan = ACT) then
            load_wreg  <= ACT ;
        elsif ((scan_vector16 = ACT or scan_vector17 = ACT or            -- FDDI End Of Frame
                scan_vector18 = ACT or scan_vector19 = ACT) and          -- Discard frame
                discard_frame = ACT and cont_scan = ACT and
                rx_end_of_buffer = NOT_ACT and fddi_abort = NOT_ACT) then
            load_wreg  <= ACT ;
        elsif ((scan_vector16 = ACT or scan_vector17 = ACT               -- FDDI Filtered Frame
                or scan_vector18 = ACT or scan_vector19 = ACT) and       -- End Of Buffer
                filter_frame = ACT and rx_end_of_buffer = ACT and
                cont_scan = ACT and rx_monitor_on = NOT_ACT) then
            load_wreg  <= ACT ;
        elsif (discard_frame = ACT and cont_scan = ACT and               -- Ethernet End Of Frame
               scan_vector16 = NOT_ACT and scan_vector17 = NOT_ACT and   -- Discard Frame
               scan_vector18 = NOT_ACT and scan_vector19 = NOT_ACT) then
            load_wreg  <= ACT ;
        elsif (enet_abort = ACT and cont_scan = ACT and                  -- Ethernet Aborted Frame
               scan_vector16 = NOT_ACT and scan_vector17 = NOT_ACT and
               scan_vector18 = NOT_ACT and scan_vector19 = NOT_ACT) then
            load_wreg  <= ACT ;
        else
            load_wreg <= NOT_ACT ;
        end if;


-- ************************************************************
-- Generate return_bufferq_full_error
-- ************************************************************

        if (return_buffer_write_pulse = ACT and return_bufferq_full = ACT) then
            return_bufferq_full_error  <= ACT ;
        else
            return_bufferq_full_error  <= NOT_ACT ;
        end if;

end process rbsm_ret_buf_comb;
```

Aug 17 11:11 1994 Who: johnf File: /c2/local user/bma/bma_rbsm/bma_rbsm lib/rbsm ret buf_cnt.vhd Page 5

```
--
-- Monitor_process is only used as a file writer so as
-- to help facilitate debug of the RBSM in system test
--

-- synopsys translate_off

monitor process:
process

   file outfile: text is out "./rbsm return_buffer.mon" ;

   variable outline          : line;
   variable buffer num         std_logic_vector(11 downto 0);

begin

    wait until clock25 = '1' and clock25'event;

        if (return_buffer_write_pulse = ACT) then

            buffer_num(11) := '0' ;
            buffer_num(10 downto 0)  = buffer_number tobe returned ;
            write(outline,string'("The BUFFER NUMBER returned by the RBSM is : "));
            hwrite(outline,buffer num) ;
            write(outline,string'(" : "));
            write(outline,NOW);
            writeline(outfile,outline) ;

        end if;

end process monitor_process ;

-- synopsys translate_on

end synthesize;
```

```
Aug 17 11:20 1994  Who: johnf  File: /c2/local_user/bma/bma_rbsm/bma_rbsm_lib/rbsm_unload.vhd Page 1

-- $Id: rbsm_unload.vhd,v 1.7 93/10/15 12:39:03 johnf Exp $
--
--  Author  :   John A. Flanders
--
--
--  Title       rbsm_unload          rbsm_unload is the receive buffer state machine component used to
--                                   inform other control blocks that the AMA Status Queue is being
--                                   unloaded. There is one control bit per port.
--
--
--
--  Revision History
--
--  6/23/93 :                       original version
--
--
--
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;



entity rbsm_unload is
    port(
          clock25           : in std_logic  ; -- system clock
          reset             : in std_logic  ; -- system reset
          cont_scan         : in std_logic  ; -- from rbsm_stat_control
          rx_end_of_buffer  : in std_logic  ; -- rx_stat_reg[16]
          rd_state0         : in std_logic  ; -- from rbsm_stat_control
          rd_state1         : in std_logic  ; -- from rbsm_stat_control
          ama_set           : in port_vector  ; -- from rbsm_ama_set
          scan_vector       : in SCAN_VEC     ; -- from rbsm_scanner
          ethernet_eof      : buffer std_logic ; -- to rbsm_code_vectors
          fddi_eof          : buffer std_logic ; -- to rbsm_code_vectors
          unload            : buffer port_vector  ) ; -- to [ct_active,multi_buffer,not_first,rc_allowed]

end rbsm_unload;


-----------------------------------------------------------
-----------------------------------------------------------
```

```
Aug 17 11:20 1994  Who: johnf  File: /c2/local_user/bma/bma_rbsm/bma_rbsm_lib/rbsm_unload.vhd Page 2


architecture synthesize of rbsm_unload is

-- declarations

signal enet0          : std_logic ;
signal enet1          : std_logic ;
signal enet2          : std_logic ;
signal enet3          : std_logic ;
signal enet4          : std_logic ;
signal enet5          : std_logic ;
signal enet6          : std_logic ;
signal enet7          : std_logic ;
signal enet8          : std_logic ;
signal enet9          : std_logic ;
signal enet10         : std_logic ;
signal enet11         : std_logic ;
signal enet12         : std_logic ;
signal enet13         : std_logic ;
signal enet14         : std_logic ;
signal enet15         : std_logic ;
signal fddi1          : std_logic ;
signal fddi2          : std_logic ;



-----------------------------------------------------------
-- body
-----------------------------------------------------------

begin


--
--  process rbsm_unload_sync is used to generate the registered outputs
--  which will be used to clear the "cut thru active bits" and set the
--  "AMA status read allowed bits."
--

rbsm_unload_sync:
process
begin
    wait until clock25 = '1'     ;

         unload(17) <= fddi2    ;
         unload(16) <= fddi1    ;
         unload(15) <= enet15   ;
         unload(14) <= enet14   ;
         unload(13) <= enet13   ;
         unload(12) <= enet12   ;
         unload(11) <= enet11   ;
         unload(10) <= enet10   ;
         unload(9)  <= enet9    ;
         unload(8)  <= enet8    ;
         unload(7)  <= enet7    ;
         unload(6)  <= enet6    ;
         unload(5)  <= enet5    ;
```

Aug 17 11:20 1994 Who: johnf File: /c2/local_user/bma/bma_rbsm/bma_rbsm_lib/rbsm_unload.vhd Page 3

```
        unload(4)  <= enet4
        unload(3)  <= enet3
        unload(2)  <= enet2
        unload(1)  <= enet1
        unload(0)  <= enet0

end process rbsm_unload_sync ;

--
-- process rbsm_unload_comb is used to generate the combinatorial logic
-- required for all 18 unload flops generated by this model.
--

rbsm_unload_comb:
process(reset,cont_scan,scan_vector,ama_set,unload,rx_end_of_buffer,rd_state0,rd_state1)
begin
-- ***********************************************************
-- Generate enet0
-- ***********************************************************

        if (reset = ACT) then
           enet0  <= NOT_ACT ;
        elsif (scan_vector(0) = ACT and rx_end_of_buffer = NOT_ACT and
              rd_state0 = ACT and rd_state1 = NOT_ACT and
              ama_set(0) = NOT_ACT) then
           enet0  <= ACT ;
        elsif (unload(0) = ACT and cont_scan = NOT_ACT) then
           enet0  <= ACT ;
        else
           enet0 <= NOT_ACT ;
        end if;

-- ***********************************************************
-- Generate enet1
-- ***********************************************************

        if (reset = ACT) then
           enet1  <= NOT_ACT ;
        elsif (scan_vector(1) = ACT and rx_end_of_buffer = NOT_ACT and
              rd_state0 = ACT and rd_state1 = NOT_ACT and
              ama_set(1) = NOT_ACT) then
           enet1  <= ACT ;
        elsif (unload(1) = ACT and cont_scan = NOT_ACT) then
           enet1  <= ACT ;
        else
           enet1 <= NOT_ACT ;
        end if;

-- ***********************************************************
-- Generate enet2
-- ***********************************************************

        if (reset = ACT) then
           enet2  <= NOT_ACT ;
        elsif (scan_vector(2) = ACT and rx_end_of_buffer = NOT_ACT and
              rd_state0 = ACT and rd_state1 = NOT_ACT and
```

Aug 17 11:20 1994 Who: johnf File: /c2/local_user/bma/bma_rbsm/bma_rbsm_lib/rbsm_unload.vhd Page 4

```
              ama_set(2) = NOT_ACT) then
           enet2  <= ACT ;
        elsif (unload(2) = ACT and cont_scan = NOT_ACT) then
           enet2  <= ACT ;
        else
           enet2 <= NOT_ACT ;
        end if;

-- ***********************************************************
-- Generate enet3
-- ***********************************************************

        if (reset = ACT) then
           enet3  <= NOT_ACT ;
        elsif (scan_vector(3) = ACT and rx_end_of_buffer = NOT_ACT and
              rd_state0 = ACT and rd_state1 = NOT_ACT and
              ama_set(3) = NOT_ACT) then
           enet3  <= ACT ;
        elsif (unload(3) = ACT and cont_scan = NOT_ACT) then
           enet3  <= ACT ;
        else
           enet3 <= NOT_ACT ;
        end if;

-- ***********************************************************
-- Generate enet4
-- ***********************************************************

        if (reset = ACT) then
           enet4  <= NOT_ACT ;
        elsif (scan_vector(4) = ACT and rx_end_of_buffer = NOT_ACT and
              rd_state0 = ACT and rd_state1 = NOT_ACT and
              ama_set(4) = NOT_ACT) then
           enet4  <= ACT ;
        elsif (unload(4) = ACT and cont_scan = NOT_ACT) then
           enet4  <= ACT ;
        else
           enet4 <= NOT_ACT ;
        end if;

-- ***********************************************************
-- Generate enet5
-- ***********************************************************

        if (reset = ACT) then
           enet5  <= NOT_ACT ;
        elsif (scan_vector(5) = ACT and rx_end_of_buffer = NOT_ACT and
              rd_state0 = ACT and rd_state1 = NOT_ACT and
              ama_set(5) = NOT_ACT) then
           enet5  <= ACT ;
        elsif (unload(5) = ACT and cont_scan = NOT_ACT) then
           enet5  <= ACT ;
        else
           enet5 <= NOT_ACT ;
        end if;
```

Aug 17 11:20 1994 Who: johnf File: /c2/local_user/bma/bma_rbsm/bma_rbsm_lib/rbsm_unload.vhd Page 5

```
-- ==========================================================
-- Generate enet6
-- ==========================================================

        if (reset = ACT) then
            enet6  <= NOT_ACT ;
        elsif (scan_vector(6) = ACT and rx_end_of_buffer = NOT_ACT and
               rd_state0 = ACT and rd_state1 = NOT_ACT and
               ama_set(6) = NOT_ACT) then
            enet6  <= ACT ;
        elsif (unload(6) = ACT and cont_scan = NOT_ACT) then
            enet6  <= ACT ;
        else
            enet6 <= NOT_ACT ;
        end if;

-- ==========================================================
-- Generate enet7
-- ==========================================================

        if (reset = ACT) then
            enet7  <= NOT_ACT ;
        elsif (scan_vector(7) = ACT and rx_end_of_buffer = NOT_ACT and
               rd_state0 = ACT and rd_state1 = NOT_ACT and
               ama_set(7) = NOT_ACT) then
            enet7  <= ACT ;
        elsif (unload(7) = ACT and cont_scan = NOT_ACT) then
            enet7  <= ACT ;
        else
            enet7 <= NOT_ACT ;
        end if;

-- ==========================================================
-- Generate enet8
-- ==========================================================

        if (reset = ACT) then
            enet8  <= NOT_ACT ;
        elsif (scan_vector(8) = ACT and rx_end_of_buffer = NOT_ACT and
               rd_state0 = ACT and rd_state1 = NOT_ACT and
               ama_set(8) = NOT_ACT) then
            enet8  <= ACT ;
        elsif (unload(8) = ACT and cont_scan = NOT_ACT) then
            enet8  <= ACT ;
        else
            enet8 <= NOT_ACT ;
        end if;

-- ==========================================================
-- Generate enet9
-- ==========================================================

        if (reset = ACT) then
            enet9  <= NOT_ACT ;
        elsif (scan_vector(9) = ACT and rx_end_of_buffer = NOT_ACT and
               rd_state0 = ACT and rd_state1 = NOT_ACT and
               ama_set(9) = NOT_ACT) then
```

Aug 17 11:20 1994 Who: johnf File: /c2/local_user/bma/bma_rbsm/bma_rbsm_lib/rbsm_unload.vhd Page 6

```
            enet9  <= ACT ;
        elsif (unload(9) = ACT and cont_scan = NOT_ACT) then
            enet9  <= ACT ;
        else
            enet9 <= NOT_ACT ;
        end if;

-- ==========================================================
-- Generate enet10
-- ==========================================================

        if (reset = ACT) then
            enet10  <= NOT_ACT ;
        elsif (scan_vector(10) = ACT and rx_end_of_buffer = NOT_ACT and
               rd_state0 = ACT and rd_state1 = NOT_ACT and
               ama_set(10) = NOT_ACT) then
            enet10  <= ACT ;
        elsif (unload(10) = ACT and cont_scan = NOT_ACT) then
            enet10  <= ACT ;
        else
            enet10 <= NOT_ACT ;
        end if;

-- ==========================================================
-- Generate enet11
-- ==========================================================

        if (reset = ACT) then
            enet11  <= NOT_ACT ;
        elsif (scan_vector(11) = ACT and rx_end_of_buffer = NOT_ACT and
               rd_state0 = ACT and rd_state1 = NOT_ACT and
               ama_set(11) = NOT_ACT) then
            enet11  <= ACT ;
        elsif (unload(11) = ACT and cont_scan = NOT_ACT) then
            enet11  <= ACT ;
        else
            enet11 <= NOT_ACT ;
        end if;

-- ==========================================================
-- Generate enet12
-- ==========================================================

        if (reset = ACT) then
            enet12  <= NOT_ACT ;
        elsif (scan_vector(12) = ACT and rx_end_of_buffer = NOT_ACT and
               rd_state0 = ACT and rd_state1 = NOT_ACT and
               ama_set(12) = NOT_ACT) then
            enet12  <= ACT ;
        elsif (unload(12) = ACT and cont_scan = NOT_ACT) then
            enet12  <= ACT ;
        else
            enet12 <= NOT_ACT ;
        end if;

-- ==========================================================
```

```
-- Generate enet13
-- ************************************************************

        if (reset = ACT) then
            enet13  <= NOT_ACT ;
        elsif (scan_vector(13) = ACT and rx_end_of_buffer = NOT_ACT and
               rd_state0 = ACT and rd_state1 = NOT_ACT and
               ama_set(13) = NOT_ACT) then
            enet13  <= ACT ;
        elsif (unload(13) = ACT and cont_scan = NOT_ACT) then
            enet13  <= ACT ;
        else
            enet13 <= NOT_ACT ;
        end if;

-- ************************************************************
-- Generate enet14
-- ************************************************************

        if (reset = ACT) then
            enet14  <= NOT_ACT ;
        elsif (scan_vector(14) = ACT and rx_end_of_buffer = NOT_ACT and
               rd_state0 = ACT and rd_state1 = NOT_ACT and
               ama_set(14) = NOT_ACT) then
            enet14  <= ACT ;
        elsif (unload(14) = ACT and cont_scan = NOT_ACT) then
            enet14  <= ACT ;
        else
            enet14 <= NOT_ACT ;
        end if;

-- ************************************************************
-- Generate enet15
-- ************************************************************

        if (reset = ACT) then
            enet15  <= NOT_ACT ;
        elsif (scan_vector(15) = ACT and rx_end_of_buffer = NOT_ACT and
               rd_state0 = ACT and rd_state1 = NOT_ACT and
               ama_set(15) = NOT_ACT) then
            enet15  <= ACT ;
        elsif (unload(15) = ACT and cont_scan = NOT_ACT) then
            enet15  <= ACT ;
        else
            enet15 <= NOT_ACT ;
        end if;

-- ************************************************************
-- Generate fddi1
-- ************************************************************

        if (reset = ACT) then
            fddi1  <= NOT_ACT ;
        elsif (scan_vector(16) = ACT and rx_end_of_buffer = NOT_ACT and
               rd_state0 = ACT and rd_state1 = NOT_ACT and
               ama_set(16) = NOT_ACT) then
            fddi1  <= ACT ;
```

```
        elsif (scan_vector(17) = ACT and rx_end_of_buffer = NOT_ACT and
               rd_state0 = ACT and rd_state1 = NOT_ACT and
               ama_set(16) = NOT_ACT) then
            fddi1  <= ACT ;
        elsif (unload(16) = ACT and cont_scan = NOT_ACT) then
            fddi1  <= ACT ;
        else
            fddi1 <= NOT_ACT ;
        end if;

-- ************************************************************
-- Generate fddi2
-- ************************************************************

        if (reset = ACT) then
            fddi2  <= NOT_ACT ;
        elsif (scan_vector(18) = ACT and rx_end_of_buffer = NOT_ACT and
               rd_state0 = ACT and rd_state1 = NOT_ACT and
               ama_set(17) = NOT_ACT) then
            fddi2  <= ACT ;
        elsif (scan_vector(19) = ACT and rx_end_of_buffer = NOT_ACT and
               rd_state0 = ACT and rd_state1 = NOT_ACT and
               ama_set(17) = NOT_ACT) then
            fddi2  <= ACT ;
        elsif (unload(17) = ACT and cont_scan = NOT_ACT) then
            fddi2  <= ACT ;
        else
            fddi2 <= NOT_ACT ;
        end if;

-- ************************************************************
-- Generate ethernet_eof : combinational only
-- ************************************************************

        if (unload(0) = ACT     or
            unload(1) = ACT     or
            unload(2) = ACT     or
            unload(3) = ACT     or
            unload(4) = ACT     or
            unload(5) = ACT     or
            unload(6) = ACT     or
            unload(7) = ACT     or
            unload(8) = ACT     or
            unload(9) = ACT     or
            unload(10) = ACT    or
            unload(11) = ACT    or
            unload(12) = ACT    or
            unload(13) = ACT    or
            unload(14) = ACT    or
            unload(15) = ACT) then

            ethernet_eof <= ACT;

        else

            ethernet_eof <= NOT_ACT;
```

```
Aug 17 11.20 1994  Who  johnf  File  /c2/local_user/bma/bma rbsm/bma_rbsm_lib/rbsm unload vhd Page 9

        end if;

-- ****************************************************************
-- Generate fddi_eof : combinational only
-- ****************************************************************

        if (unload(16) = ACT    or
            unload(17) = ACT) then

            fddi_eof <= ACT;

        else

            fddi_eof <= NOT_ACT;

        end if;




end process rbsm_unload_comb;

end synthesize;
```

```
Aug 17 11:20 1994  Who  johnf  File: /c2/local_user/bma/bma rbsm/bma rbsm_lib/rbsm_trans_code vhd Page 1

-- $Id: rbsm_trans_code vhd v 1 7 94/06/02 18:04:27 johnf Exp $
--
--  Author       John A  Flanders
--
--
--  Title        rbsm_trans_code   rbsm_trans_code is the receive buffer state machine component used to
--                                 generate the translation code field of word2 of the receive FIFO
--                                 which is place in the 29K in queue. The translation code is a three bit
--                                 code which will occupy bits 15 thru 17 of rx_fifo_word2.
--
--
--
--  Revision History
--
--  7/9/93                       original version
--
--
--
--
--

library synopsys ;
library ieee ;
library bma_rbsm_lib;
library bma_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_trans_code is
    port(
        dest_address_match              : in std_logic      ; -- from rbsm_status_registers
        dest_group_address              : in std_logic      ; -- from rbsm_status_registers
        dest_internal                   : in std_logic      ; -- from rbsm_status_registers
        dest_port_type                  : in PORT_TYPE      ; -- from rbsm_config
        rx_monitor_on                   : in std_logic      ; -- from rbsm_config
        tx_monitor_on                   : in std_logic      ; -- from rbsm_config
        tx_disable_on                   : in std_logic      ; -- from rbsm_config
        ethernet_eof                    : in std_logic      ; -- from rbsm_unload
        ethernet_rx_error               : in std_logic      ; -- from rbsm_status_registers
        fddi_eof                        : in std_logic      ; -- from rbsm_unload
        fddi_abort                      : in std_logic      ; -- from rbsm_status_registers
        fddi_rx_error                   : in std_logic      ; -- from rbsm_status_registers
        fragment_frame                  : in std_logic      ; -- from rbsm_frag
        dest_port_blocking              : in std_logic      ; -- from rbsm_config
        dest_port_not_forwarding        : in std_logic      ; -- from rbsm_config
        any_dest_monitor_on             : in std_logic      ; -- from rbsm_config
        any_dest_multicast_monitor_on   : in std_logic      ; -- from rbsm_config
        port_blocking_on                : in std_logic      ; -- from rbsm_config   Added 5/1/94
        src_port_not_forwarding         : in std_logic      ; -- from rbsm_config   Added 5/1/94
        rx_disable_on                   : in std_logic      ; -- from rbsm_config   Added 5/1/94
        rx_multicast_disable_on         : in std_logic      ; -- from rbsm_config   Added 5/1/94

Aug 17 11:20 1994  Who: johnf  File: /c2/local_user/bma/bma_rbsm/bma_rbsm_lib/rbsm_trans_code.vhd Page 2

        enet_abort                      : in std_logic      ; -- from rbsm_status_registers Added 5/2/94
        positive_forward_enable         : in std_logic      ; -- from microprocessor interface
        translation_code                : buffer TC_CODE ) ;

end rbsm_trans_code;



------------------------------------------------------------
------------------------------------------------------------


architecture synthesize of rbsm_trans_code is

-- declarations


------------------------------------------------------------
-- body
------------------------------------------------------------

begin

--
--  process tc_code is used to generate the translation code
--  which will be place in the 29K in queue. Translation codes
--  are derived from both the AMA status and NIU Receive
--  status.
--
--

tc_code:
process(dest_address_match,dest_group_address,dest_internal,dest_port_type,
        rx_monitor_on,ethernet_eof,ethernet_rx_error,fddi_eof,fddi_rx_error,fddi_abort,
        fragment_frame,tx_monitor_on,dest_port_blocking,dest_port_not_forwarding,
        any_dest_monitor_on,any_dest_multicast_monitor_on,tx_disable_on,enet_abort,
        positive_forward_enable,port_blocking_on,rx_disable_on,rx_multicast_disable_on,
        src_port_not_forwarding)

begin

    if (rx_monitor_on = ACT                                and -- ETHERNET Internal
       ethernet_eof = ACT                                  and -- unicast or multicast
        enet_abort = NOT_ACT                               and
         ethernet_rx_error = NOT_ACT                       and
          dest_address_match = ACT                         and
           dest_internal = ACT) then

          translation_code <= MC_INTERNAL ;


    elsif (rx_monitor_on = ACT                             and -- ETHERNET unicast
           ethernet_eof = ACT                              and -- to FDDI
            enet_abort = NOT_ACT                           and
             ethernet_rx_error = NOT_ACT                   and -- Receive port
```

Aug 17 11 20 1994 Who: johnf File: /c2/local_user/bma/bma_rbsm/bma_rbsm_lib/rbsm_trans_code vhc Page 3

```
              dest_address_match = ACT                                   and -- is being monitored
               dest internal = NOT_ACT                                   and
                dest_group address = NOT ACT                             and
                 dest_port_type = FDDI) then

           translation_code <= MC UNICAST_ETHERNET_TO_FDDI ;

    elsif (rx_monitor_on = ACT                                           and -- ETHERNET unicast
           ethernet_eof = ACT                                            and -- DA Unknown
            enet_abort = NOT_ACT                                         and
             ethernet_rx_error = NOT_ACT                                 and
              dest_address_match = NOT_ACT                               and
               dest_group_address = NOT_ACT) then

           translation_code <= MC_UNICAST_DA_UNKNOWN ;

    elsif (rx_monitor_on = ACT                                           and -- ETHERNET multicast
           ethernet_eof = ACT                                            and
            enet_abort = NOT_ACT                                         and
             ethernet_rx_error = NOT ACT                                 and
              dest_group_address = ACT                                   and
         (dest_address_match = NOT ACT                                   or
          dest_internal = NOT_ACT)) then

           translation_code <= MC_MULTICAST_FROM_ETHERNET ;

    elsif (tx_monitor_on = ACT                                           and -- ETHERNET unicast
           ethernet_eof = ACT                                            and -- to FDDI : destination port
            enet_abort = NOT_ACT                                         and
             ethernet_rx_error = NOT_ACT                                 and -- is being monitored
              rx_disable_on = NOT_ACT                                    and --                 Added 5/1/94
               port_blocking_on = NOT_ACT                                and --                 Added 5/1/94
                src_port_not_forwarding = NOT_ACT                        and --                 Added 5/1/94
                 dest_address_match = ACT                                and
                  dest_internal = NOT_ACT                                and
                   dest_group_address = NOT_ACT                          and
                    tx_disable_on = NOT_ACT                              and
                     dest_port_blocking = NOT_ACT                        and
                      dest_port_not_forwarding = NOT_ACT                 and
                       dest_port_type = FDDI) then

           translation_code <= MC_UNICAST_ETHERNET_TO_FDDI ;

    elsif (ethernet_eof = ACT                                            and -- ETHERNET Unicast
           enet_abort = NOT_ACT                                          and
            ethernet_rx_error = NOT_ACT                                  and -- DA Unknown
             rx_disable_on = NOT_ACT                                     and --                 Added 5/1/94
              port_blocking_on = NOT_ACT                                 and --                 Added 5/1/94
               src_port_not_forwarding = NOT_ACT                         and --                 Added 5/1/94
                dest_address_match = NOT_ACT                             and
                 dest_group_address = NOT_ACT                            and
                  positive_forward_enable = NOT_ACT                      and
                   any_dest_monitor_on = ACT) then

           translation_code <= MC_UNICAST_DA_UNKNOWN ;
```

Aug 17 11:20 1994 Who: johnf File: /c2/local_user/bma/bma_rbsm/bma_rbsm_lib/rbsm_trans_code.vhd Page 4

```
    elsif (ethernet_eof = ACT                                            and -- ETHERNET Multicast
           enet_abort = NOT_ACT                                          and
            ethernet_rx_error = NOT_ACT                                  and -- DA Known : Not Internal
             rx_disable_on = NOT_ACT                                     and --                 Added 5/1/94
              rx_multicast_disable_on = NOT_ACT                          and --                 Added 5/1/94
               port_blocking_on = NOT_ACT                                and --                 Added 5/1/94
                src_port_not_forwarding = NOT_ACT                        and --                 Added 5/1/94
                 dest_address_match = ACT                                and
                  dest_internal = NOT_ACT                                and
                   dest_group_address = ACT                              and
                    any_dest_multicast_monitor_on = ACT) then

           translation_code <= MC_MULTICAST_FROM_ETHERNET ;

    elsif (ethernet_eof = ACT                                            and -- ETHERNET Multicast
           enet_abort = NOT_ACT                                          and
            ethernet_rx_error = NOT_ACT                                  and -- DA Unknown
             rx_disable_on = NOT_ACT                                     and --                 Added 5/1/94
              rx_multicast_disable_on = NOT_ACT                          and --                 Added 5/1/94
               port_blocking_on = NOT_ACT                                and --                 Added 5/1/94
                src_port_not_forwarding = NOT_ACT                        and --                 Added 5/1/94
                 dest_address_match = NOT_ACT                            and
                  dest_group_address = ACT                               and
                   any_dest_multicast_monitor_on = ACT) then

           translation_code <= MC_MULTICAST_FROM_ETHERNET ;



-- ****************************************************************

    elsif (rx_monitor_on = ACT                                           and -- FDDI Internal
           fddi_eof = ACT                                                and -- unicast or multicast
            fddi_abort = NOT_ACT                                         and
             fddi_rx_error = NOT_ACT                                     and
              dest_address_match = ACT                                   and
               dest_internal = ACT) then

           translation_code <= MC_INTERNAL ;

    elsif (rx_monitor_on = ACT                                           and -- FDDI unicast
           fddi_eof = ACT                                                and -- to ETHERNET frag
            fddi_abort = NOT_ACT                                         and
             fddi_rx_error = NOT_ACT                                     and
              dest_address_match = ACT                                   and
               dest_internal = NOT_ACT                                   and
                dest_group_address = NOT_ACT                             and
                 dest_port_type = ETHERNET                               and
                  fragment_frame = ACT) then

           translation_code <= MC_UNICAST_FDDI_TO_ETHERNET_FRAG ;
```

Aug 17 11:20 1994 Who: johnf File: /c2/local_user/bma/bma_rbsm/bma_rbsm_lib/rbsm_trans_code.vhd Page 5

```
elsif (rx_monitor_on = ACT                                and -- FDDI unicast
        fddi_eof = ACT                                    and -- to ETHERNET
         fddi_abort = NOT_ACT                             and
          fddi_rx_error = NOT_ACT                         and
           dest_address_match = ACT                       and
            dest_internal = NOT_ACT                       and
             dest_group_address = NOT_ACT                 and
              dest_port_type = ETHERNET                   and
               fragment_frame = NOT_ACT) then

        translation_code <= MC_UNICAST_FDDI_TO_ETHERNET ;

elsif (rx_monitor_on = ACT                                and -- FDDI unicast
        fddi_eof = ACT                                    and -- DA Unknown
         fddi_abort = NOT_ACT                             and
          fddi_rx_error = NOT_ACT                         and
           dest_address_match = NOT_ACT                   and
             dest_group_address = NOT_ACT) then

        translation_code <= MC_UNICAST_DA_UNKNOWN ;

elsif (rx_monitor_on = ACT                                and -- FDDI multicast
        fddi_eof = ACT                                    and
         fddi_abort = NOT_ACT                             and
          fddi_rx_error = NOT_ACT                         and
           dest_group_address = ACT                       and
      (dest_address_match = NOT_ACT                       or
       dest_internal = NOT_ACT)) then

        translation_code <= MC_MULTICAST_FROM_FDDI ;

elsif (tx_monitor_on = ACT                                and -- FDDI unicast
        fddi_eof = ACT                                    and -- to ETHERNET
         fddi_abort = NOT_ACT                             and
          fddi_rx_error = NOT_ACT                         and -- destination port
           rx_disable_on = NOT_ACT                        and --              Added 5/1/94
            port_blocking_on = NOT_ACT                    and --              Added 5/1/94
             src_port_not_forwarding = NOT_ACT            and --              Added 5/1/94
              dest_address_match = ACT                    and -- is being monitored
               dest_internal = NOT_ACT                    and
                dest_group_address = NOT_ACT              and
                 tx_disable_on = NOT_ACT                  and
                  dest_port_blocking = NOT_ACT            and
                   dest_port_not_forwarding = NOT_ACT     and
                    dest_port_type = ETHERNET             and
                     fragment_frame = NOT_ACT) then

        translation_code <= MC_UNICAST_FDDI_TO_ETHERNET ;

elsif (tx_monitor_on = ACT                                and -- FDDI unicast
        fddi_eof = ACT                                    and -- to ETHERNET Frag
         fddi_abort = NOT_ACT                             and
          fddi_rx_error = NOT_ACT                         and
           rx_disable_on = NOT_ACT                        and --              Added 5/1/94
            port_blocking_on = NOT_ACT                    and --              Added 5/1/94
```

Aug 17 11:20 1994 Who: johnf File: /c2/local_user/bma/bma_rbsm/bma_rbsm_lib/rbsm_trans_code.vhd Page 6

```
             src_port_not_forwarding = NOT_ACT            and --              Added 5/1/94
              dest_address_match = ACT                    and
               dest_internal = NOT_ACT                    and
                dest_group_address = NOT_ACT              and
                 tx_disable_on = NOT_ACT                  and
                  dest_port_blocking = NOT_ACT            and
                   dest_port_not_forwarding = NOT_ACT     and
                    dest_port_type = ETHERNET             and
                     fragment_frame = ACT) then

        translation_code <= MC_UNICAST_FDDI_TO_ETHERNET_FRAG ;

elsif (fddi_eof = ACT                                     and -- FDDI Unicast
        fddi_rx_error = NOT_ACT                           and -- DA Unknown
         fddi_abort = NOT_ACT                             and
          rx_disable_on = NOT_ACT                         and --              Added 5/1/94
           port_blocking_on = NOT_ACT                     and --              Added 5/1/94
            src_port_not_forwarding = NOT_ACT             and --              Added 5/1/94
             dest_address_match = NOT_ACT                 and
              dest_group_address = NOT_ACT                and
               positive_forward_enable = NOT_ACT          and
                any_dest_monitor_on = ACT) then

        translation_code <= MC_UNICAST_DA_UNKNOWN ;

elsif (fddi_eof = ACT                                     and -- FDDI Multicast
        fddi_rx_error = NOT_ACT                           and -- DA Known
         fddi_abort = NOT_ACT                             and -- Not Internal
          rx_disable_on = NOT_ACT                         and --              Added 5/1/94
           rx_multicast_disable_on = NOT_ACT              and --              Added 5/1/94
            port_blocking_on = NOT_ACT                    and --              Added 5/1/94
             src_port_not_forwarding = NOT_ACT            and --              Added 5/1/94
              dest_address_match = ACT                    and
               dest_internal = NOT_ACT                    and
                dest_group_address = ACT                  and
                 any_dest_multicast_monitor_on = ACT) then

        translation_code <= MC_MULTICAST_FROM_FDDI ;

elsif (fddi_eof = ACT                                     and -- FDDI Multicast
        fddi_rx_error = NOT_ACT                           and -- DA Unknown
         fddi_abort = NOT_ACT                             and
          rx_disable_on = NOT_ACT                         and --              Added 5/1/94
           rx_multicast_disable_on = NOT_ACT              and --              Added 5/1/94
            port_blocking_on = NOT_ACT                    and --              Added 5/1/94
             src_port_not_forwarding = NOT_ACT            and --              Added 5/1/94
              dest_address_match = NOT_ACT                and
               dest_group_address = ACT                   and
                any_dest_multicast_monitor_on = ACT) then

        translation_code <= MC_MULTICAST_FROM_FDDI ;

else

        translation_code <= MC_UNICAST_NO_TRANSLATION ; -- DEFAULT TRANSLATION CODE = 000
```

```
    end if
end process tc code ;
end synthesize;
```

```
Aug 17 11:11 1994  Who  johnf  File  /c2/local_user/bma/bma_rbsm/bma_rbsm_lib/rbsm_sa_status.vhd Page 1

-- $Id: rbsm_sa_status vhd,v 1.6 94/02/22 10.56:45 johnf Exp $
--
--  Author   :    John A. Flanders
--
--
--  Title        rbsm_sa_status    rbsm_sa_status' is the receive buffer state machine component used to
--                                 generate the source address status field of word1 of the receive FIFO
--                                 which is placed in the 29K in queue. The source address status will
--                                 occupy bits 0 and 1 of rx_fifo_word1.
--
--
--
--  Revision History
--
--  7/8/93                       original version
--
--
--
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;



entity rbsm_sa_status is
    port(
          src_address_match   : in std_logic       ; -- from rbsm_status_registers ama_stat_reg1(21)
          src_group_address   : in std_logic       ; -- from rbsm_status_registers ama_stat_reg3(31)
          src_port_equal      : in std_logic       ; -- from rbsm_status_registers ama_stat_reg3(30)
          src_address_status  : buffer SA_STATUS ) ;

end rbsm_sa_status;


------------------------------------------------------------
------------------------------------------------------------


architecture synthesize of rbsm_sa_status is

-- declarations

Aug 17 11:11 1994  Who: johnf  File: /c2/local_user/bma/bma_rbsm/bma_rbsm_lib/rbsm_sa_status.vhd Page 2


------------------------------------------------------------
-- body
------------------------------------------------------------

begin

--
--  process sa_status is used to generate the source address
--  status which will be place in the 29K in queue. All source
--  address status is derived from AMA status only. NIU receive
--  status is not needed.
--

src_status:
process(src_group_address,src_port_equal,src_address_match)
begin

    if (src_address_match = NOT_ACT) then

          src_address_status <= SA_UNKNOWN ;

    elsif (src_port_equal = NOT_ACT) then

          src_address_status <= SA_KNOWN_WITH_BAD_PORT ;

    elsif (src_group_address = ACT) then

          src_address_status <= SA_MULTICAST ;

    else

          src_address_status <= SA_KNOWN_WITH_GOOD_PORT ;

    end if;

 end process src_status ;

 end synthesize;
```

```
Aug 17 11:11 1994  Who: johnf  File: /c2/local_user/bma/bma_rbsm/bma_rbsm_lib/rbsm_scanner.vhd Page 1

-- $Id  rbsm_scanner.vhd,v 1.6 93/10/15 12:36:10 johnf Exp $
--
--  Author       John A. Flanders
--
--
--  Title     .  rbsm_scanner      rbsm_scanner is the receive buffer state machine component used to
--                                 scan the ama status and receive status queues to determine if status
--                                 is available.
--
--
--
--  Revision History
--
--  6/16/93 :                      original version
--
--
--
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;



entity rbsm_scanner is
    port( clock25        : in std_logic  ;  -- system clock
          reset          : in std_logic  ;  -- system reset
          scan           : in std_logic  ;  -- from rbsm_stat_control
          scan_vector    : buffer SCAN_VEC ;
          rbsm_port_num  : buffer port_number   ) ;


end rbsm_scanner;


------------------------------------------------------------
------------------------------------------------------------


architecture synthesize of rbsm_scanner is

-- translate off
```

```
Aug 17 11:11 1994  Who: johnf  File: /c2/local_user/bma/bma_rbsm/bma_rbsm_lib/rbsm_scanner.vhd Page 2


type RBSM_STATE is (NOP,FDDI1,FDDI2,ENET1,ENET2,ENET3,ENET4,ENET5,ENET6,
                    ENET7,ENET8,ENET9,ENET10,ENET11,ENET12,ENET13,ENET14,
                    ENET15,ENET0) ;

-- translate on

-- declarations

signal nxt_fddi1_a     : std_logic ;
signal nxt_fddi2_a     : std_logic ;
signal nxt_fddi1_b     : std_logic ;
signal nxt_fddi2_b     : std_logic ;
signal nxt_enet0       : std_logic ;
signal nxt_enet1       : std_logic ;
signal nxt_enet2       : std_logic ;
signal nxt_enet3       : std_logic ;
signal nxt_enet4       : std_logic ;
signal nxt_enet5       : std_logic ;
signal nxt_enet6       : std_logic ;
signal nxt_enet7       : std_logic ;
signal nxt_enet8       : std_logic ;
signal nxt_enet9       : std_logic ;
signal nxt_enet10      : std_logic ;
signal nxt_enet11      : std_logic ;
signal nxt_enet12      : std_logic ;
signal nxt_enet13      : std_logic ;
signal nxt_enet14      : std_logic ;
signal nxt_enet15      : std_logic ;
signal nxt_port        : port_number   ;

-- translate off

signal rbsm_state_machine : RBSM_STATE ;

-- translate on

------------------------------------------------------------
-- body
------------------------------------------------------------

begin


--
--  process rbsm_fsm_sync is used to generate the sequential logic
--  required for the Receive Buffer state machine use to scan the
--  AMA status available bits provided by the AMA Interface Module.
--

rbsm_fsm_sync:
process
begin
    wait until clock25 = '1'      ;
         scan_vector(19) <= nxt_fddi2_b ;
         scan_vector(18) <= nxt_fddi2_a ;
         scan_vector(17) <= nxt_fddi1_b ;
         scan_vector(16) <= nxt_fddi1_a ;
```

```
        scan_vector(15)  <= nxt_enet15  ;
        scan_vector(14)  <= nxt_enet14  ;
        scan_vector(13)  <= nxt_enet13  ;
        scan_vector(12)  <= nxt_enet12  ;
        scan_vector(11)  <= nxt_enet11  ;
        scan_vector(10)  <= nxt_enet10  ;
        scan_vector(9)   <= nxt_enet9   ;
        scan_vector(8)   <= nxt_enet8   ;
        scan_vector(7)   <= nxt_enet7   ;
        scan_vector(6)   <= nxt_enet6   ;
        scan_vector(5)   <= nxt_enet5   ;
        scan_vector(4)   <= nxt_enet4   ;
        scan_vector(3)   <= nxt_enet3   ;
        scan_vector(2)   <= nxt_enet2   ;
        scan_vector(1)   <= nxt_enet1   ;
        scan_vector(0)   <= nxt_enet0   ;
        rbsm_port_num    <= nxt_port    ;


-- translate off

    if (reset = ACT) then
        rbsm_state_machine <= FDDI1 ;
    elsif (nxt_fddi1_a = ACT or nxt_fddi1_b = ACT) then
        rbsm_state_machine <= FDDI1 ;
    elsif (nxt_fddi2_a = ACT or nxt_fddi2_b = ACT) then
        rbsm_state_machine <= FDDI2 ;
    elsif (nxt_enet0 = ACT) then
        rbsm_state_machine <= ENET0 ;
    elsif (nxt_enet1 = ACT) then
        rbsm_state_machine <= ENET1 ;
    elsif (nxt_enet2 = ACT) then
        rbsm_state_machine <= ENET2 ;
    elsif (nxt_enet3 = ACT) then
        rbsm_state_machine <= ENET3 ;
    elsif (nxt_enet4 = ACT) then
        rbsm_state_machine <= ENET4 ;
    elsif (nxt_enet5 = ACT) then
        rbsm_state_machine <= ENET5 ;
    elsif (nxt_enet6 = ACT) then
        rbsm_state_machine <= ENET6 ;
    elsif (nxt_enet7 = ACT) then
        rbsm_state_machine <= ENET7 ;
    elsif (nxt_enet8 = ACT) then
        rbsm_state_machine <= ENET8 ;
    elsif (nxt_enet9 = ACT) then
        rbsm_state_machine <= ENET9 ;
    elsif (nxt_enet10 = ACT) then
        rbsm_state_machine <= ENET10 ;
    elsif (nxt_enet11 = ACT) then
        rbsm_state_machine <= ENET11 ;
    elsif (nxt_enet12 = ACT) then
        rbsm_state_machine <= ENET12 ;
    elsif (nxt_enet13 = ACT) then
        rbsm_state_machine <= ENET13 ;
    elsif (nxt_enet14 = ACT) then
        rbsm_state_machine <= ENET14 ;
    elsif (nxt_enet15 = ACT) then
        rbsm_state_machine <= ENET15 ;
```

```
    else
        rbsm_state_machine <= NOP ;
    end if;

-- translate on

end process rbsm_fsm_sync ;

--
-- process rbsm_fsm_comb is used to generate the combinatorial logic
-- required for the Receive Buffer state machine used to scan for AMA
-- and Receive status available.
--

rbsm_fsm_comb:
process(scan,reset,scan_vector,rbsm_port_num)
begin

-- ***********************************************************
-- Generate nxt_fddi1_a
-- ***********************************************************

        if (reset = ACT) then
            nxt_fddi1_a <= ACT ;
        elsif (scan_vector(16) = ACT and scan = NOT_ACT) then
            nxt_fddi1_a <= ACT ;
        elsif (scan_vector(15) = ACT and scan = ACT) then
            nxt_fddi1_a <= ACT ;
        else
            nxt_fddi1_a <= NOT_ACT ;
        end if;


-- ***********************************************************
-- Generate nxt_enet0
-- ***********************************************************

        if (reset = ACT) then
            nxt_enet0 <= NOT_ACT ;
        elsif (scan_vector(0) = ACT and scan = NOT_ACT) then
            nxt_enet0 <= ACT ;
        elsif (scan_vector(16) = ACT and scan = ACT) then
            nxt_enet0 <= ACT ;
        else
            nxt_enet0 <= NOT_ACT ;
        end if;


-- ***********************************************************
-- Generate nxt_enet1
-- ***********************************************************

        if (reset = ACT) then
            nxt_enet1 <= NOT_ACT ;
        elsif (scan_vector(1) = ACT and scan = NOT_ACT) then
            nxt_enet1 <= ACT ;
        elsif (scan_vector(0) = ACT and scan = ACT) then
            nxt_enet1 <= ACT ;
        else
```

```
Aug 17 11:11 1994  Who: johnf  File: /c2/local_user/bma/bma_rbsm/bma_rbsm_lib/rbsm_scanner.vhd Page 5

            nxt_enet1 <= NOT_ACT ;
        end if;

-- ========================================================
-- Generate nxt_enet2
-- ========================================================

        if (reset = ACT) then
            nxt_enet2 <= NOT_ACT ;
        elsif (scan_vector(2) = ACT and scan = NOT_ACT) then
            nxt_enet2 <= ACT ;
        elsif (scan_vector(1) = ACT and scan = ACT) then
            nxt_enet2 <= ACT ;
        else
            nxt_enet2 <= NOT_ACT ;
        end if;

-- ========================================================
-- Generate nxt_enet3
-- ========================================================

        if (reset = ACT) then
            nxt_enet3 <= NOT_ACT ;
        elsif (scan_vector(3) = ACT and scan = NOT_ACT) then
            nxt_enet3 <= ACT ;
        elsif (scan_vector(2) = ACT and scan = ACT) then
            nxt_enet3 <= ACT ;
        else
            nxt_enet3 <= NOT_ACT ;
        end if;

-- ========================================================
-- Generate nxt_fddi2_a
-- ========================================================

        if (reset = ACT) then
            nxt_fddi2_a <= NOT_ACT ;
        elsif (scan_vector(18) = ACT and scan = NOT_ACT) then
            nxt_fddi2_a <= ACT ;
        elsif (scan_vector(3) = ACT and scan = ACT) then
            nxt_fddi2_a <= ACT ;
        else
            nxt_fddi2_a <= NOT_ACT ;
        end if;

-- ========================================================
-- Generate nxt_enet4
-- ========================================================

        if (reset = ACT) then
            nxt_enet4 <= NOT_ACT ;
        elsif (scan_vector(4) = ACT and scan = NOT_ACT) then
            nxt_enet4 <= ACT ;
        elsif (scan_vector(18) = ACT and scan = ACT) then
            nxt_enet4 <= ACT ;
        else
```

```
Aug 17 11:11 1994  Who: johnf  File: /c2/local_user/bma/bma_rbsm/bma_rbsm_lib/rbsm_scanner.vhd Page 6

            nxt_enet4 <= NOT_ACT ;
        end if;

-- ========================================================
-- Generate nxt_enet5
-- ========================================================

        if (reset = ACT) then
            nxt_enet5 <= NOT_ACT ;
        elsif (scan_vector(5) = ACT and scan = NOT_ACT) then
            nxt_enet5 <= ACT ;
        elsif (scan_vector(4) = ACT and scan = ACT) then
            nxt_enet5 <= ACT ;
        else
            nxt_enet5 <= NOT_ACT ;
        end if;

-- ========================================================
-- Generate nxt_enet6
-- ========================================================

        if (reset = ACT) then
            nxt_enet6 <= NOT_ACT ;
        elsif (scan_vector(6) = ACT and scan = NOT_ACT) then
            nxt_enet6 <= ACT ;
        elsif (scan_vector(5) = ACT and scan = ACT) then
            nxt_enet6 <= ACT ;
        else
            nxt_enet6 <= NOT_ACT ;
        end if;

-- ========================================================
-- Generate nxt_enet7
-- ========================================================

        if (reset = ACT) then
            nxt_enet7 <= NOT_ACT ;
        elsif (scan_vector(7) = ACT and scan = NOT_ACT) then
            nxt_enet7 <= ACT ;
        elsif (scan_vector(6) = ACT and scan = ACT) then
            nxt_enet7 <= ACT ;
        else
            nxt_enet7 <= NOT_ACT ;
        end if;

-- ========================================================
-- Generate nxt_fddi1_b
-- ========================================================

        if (reset = ACT) then
            nxt_fddi1_b <= NOT_ACT ;
        elsif (scan_vector(17) = ACT and scan = NOT_ACT) then
            nxt_fddi1_b <= ACT ;
        elsif (scan_vector(7) = ACT and scan = ACT) then
            nxt_fddi1_b <= ACT ;
        else
```

```
        nxt_fddi1_b <= NOT_ACT ;
    end if;

-- ************************************************************
-- Generate nxt_enet8
-- ************************************************************

    if (reset = ACT) then
        nxt_enet8 <= NOT_ACT ;
    elsif (scan_vector(8) = ACT and scan = NOT_ACT) then
        nxt_enet8 <= ACT ;
    elsif (scan_vector(17) = ACT and scan = ACT) then
        nxt_enet8 <= ACT ;
    else
        nxt_enet8 <= NOT_ACT ;
    end if;

-- ************************************************************
-- Generate nxt_enet9
-- ************************************************************

    if (reset = ACT) then
        nxt_enet9 <= NOT_ACT ;
    elsif (scan_vector(9) = ACT and scan = NOT_ACT) then
        nxt_enet9 <= ACT ;
    elsif (scan_vector(8) = ACT and scan = ACT) then
        nxt_enet9 <= ACT ;
    else
        nxt_enet9 <= NOT_ACT ;
    end if;

-- ************************************************************
-- Generate nxt_enet10
-- ************************************************************

    if (reset = ACT) then
        nxt_enet10 <= NOT_ACT ;
    elsif (scan_vector(10) = ACT and scan = NOT_ACT) then
        nxt_enet10 <= ACT ;
    elsif (scan_vector(9) = ACT and scan = ACT) then
        nxt_enet10 <= ACT ;
    else
        nxt_enet10 <= NOT_ACT ;
    end if;

-- ************************************************************
-- Generate nxt_enet11
-- ************************************************************

    if (reset = ACT) then
        nxt_enet11 <= NOT_ACT ;
    elsif (scan_vector(11) = ACT and scan = NOT_ACT) then
        nxt_enet11 <= ACT ;
    elsif (scan_vector(10) = ACT and scan = ACT) then
        nxt_enet11 <= ACT ;
    else
```

```
        nxt_enet11 <= NOT_ACT ;
    end if;

-- ************************************************************
-- Generate nxt_fddi2_b
-- ************************************************************

    if (reset = ACT) then
        nxt_fddi2_b <= NOT_ACT ;
    elsif (scan_vector(19) = ACT and scan = NOT_ACT) then
        nxt_fddi2_b <= ACT ;
    elsif (scan_vector(11) = ACT and scan = ACT) then
        nxt_fddi2_b <= ACT ;
    else
        nxt_fddi2_b <= NOT_ACT ;
    end if;

-- ************************************************************
-- Generate nxt_enet12
-- ************************************************************

    if (reset = ACT) then
        nxt_enet12 <= NOT_ACT ;
    elsif (scan_vector(12) = ACT and scan = NOT_ACT) then
        nxt_enet12 <= ACT ;
    elsif (scan_vector(19) = ACT and scan = ACT) then
        nxt_enet12 <= ACT ;
    else
        nxt_enet12 <= NOT_ACT ;
    end if;

-- ************************************************************
-- Generate nxt_enet13
-- ************************************************************

    if (reset = ACT) then
        nxt_enet13 <= NOT_ACT ;
    elsif (scan_vector(13) = ACT and scan = NOT_ACT) then
        nxt_enet13 <= ACT ;
    elsif (scan_vector(12) = ACT and scan = ACT) then
        nxt_enet13 <= ACT ;
    else
        nxt_enet13 <= NOT_ACT ;
    end if;

-- ************************************************************
-- Generate nxt_enet14
-- ************************************************************

    if (reset = ACT) then
        nxt_enet14 <= NOT_ACT ;
    elsif (scan_vector(14) = ACT and scan = NOT_ACT) then
        nxt_enet14 <= ACT ;
    elsif (scan_vector(13) = ACT and scan = ACT) then
        nxt_enet14 <= ACT ;
    else
```

Aug 17 11:11 1994 Who: johnf File: /c2/local_user/bma/bma_rbsm/bma_rbsm_lib/rbsm_scanner.vhd Page 9

```
        nxt_enet14 <= NOT_ACT ;
    end if;

-- ************************************************************
-- Generate nxt_enet15
-- ************************************************************

    if (reset = ACT) then
        nxt_enet15 <= NOT_ACT ;
    elsif (scan_vector(15) = ACT and scan = NOT_ACT) then
        nxt_enet15 <= ACT ;
    elsif (scan_vector(14) = ACT and scan = ACT) then
        nxt_enet15 <= ACT ;
    else
        nxt_enet15 <= NOT_ACT ;
    end if;

-- ************************************************************
-- Generate nxt_port
-- ************************************************************

    if (reset = ACT) then
        nxt_port <= "10000" ;
    elsif (scan_vector(16) = ACT and scan = ACT) then
        nxt_port <= "00000" ;
    elsif (scan_vector(0) = ACT and scan = ACT) then
        nxt_port <= "00001" ;
    elsif (scan_vector(1) = ACT and scan = ACT) then
        nxt_port <= "00010" ;
    elsif (scan_vector(2) = ACT and scan = ACT) then
        nxt_port <= "00011" ;
    elsif (scan_vector(3) = ACT and scan = ACT) then
        nxt_port <= "10001" ;
    elsif (scan_vector(18) = ACT and scan = ACT) then
        nxt_port <= "00100" ;
    elsif (scan_vector(4) = ACT and scan = ACT) then
        nxt_port <= "00101" ;
    elsif (scan_vector(5) = ACT and scan = ACT) then
        nxt_port <= "00110" ;
    elsif (scan_vector(6) = ACT and scan = ACT) then
        nxt_port <= "00111" ;
    elsif (scan_vector(7) = ACT and scan = ACT) then
        nxt_port <= "10000" ;
    elsif (scan_vector(17) = ACT and scan = ACT) then
        nxt_port <= "01000" ;
    elsif (scan_vector(8) = ACT and scan = ACT) then
        nxt_port <= "01001" ;
    elsif (scan_vector(9) = ACT and scan = ACT) then
        nxt_port <= "01010" ;
    elsif (scan_vector(10) = ACT and scan = ACT) then
        nxt_port <= "01011";
    elsif (scan_vector(11) = ACT and scan = ACT) then
        nxt_port <= "10001" ;
    elsif (scan_vector(19) = ACT and scan = ACT) then
        nxt_port <= "01100" ;
    elsif (scan_vector(12) = ACT and scan = ACT) then
        nxt_port <= "01101" ;
    elsif (scan_vector(13) = ACT and scan = ACT) then
```

Aug 17 11:11 1994 Who: johnf File: /c2/local_user/bma/bma_rbsm/bma_rbsm_lib/rbsm_scanner.vhd Page 10

```
        nxt_port <= "01110" ;
    elsif (scan_vector(14) = ACT and scan = ACT) then
        nxt_port <= "01111" ;
    elsif (scan_vector(15) = ACT and scan = ACT) then
        nxt_port <= "10000" ;
    else
        nxt_port <= rbsm_port_num ;
    end if;

end process rbsm_fsm_comb;

end synthesize;
```

```
Aug 17 11:19 1994  Who: johnf  File  /c2/local_user/bma/bma_rbsm/bma_rbsm_lib/rbsm_sram_control.vhd Page 1

-- $Id  rbsm_sram_control.vhd,v 1.15 94/06/02 20:00:30 johnf Exp $
--
--  Author       John A  Flanders
--
--
--  Title        rbsm_sram_control : rbsm_sram_control  is the receive buffer state machine component used to
--                                   control reading and writing code vectors and status information into the
--                                   BMA to Microprocessor queue and the buffer frame control area of SRAM.
--
--
--
--
--  Revision History
--
--  7/18/93                    original version
--
--
--
--
--

library std;
library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;


entity rbsm_sram_control is
    port(
        clock25                    : in std_logic                ; -- system clock
        reset                      : in std_logic                ; -- system reset
        rbsm_enable                : in std_logic                ; -- from 29K interface

        cont_scan                  : in std_logic                ; -- from rbsm_stat_control

        scan_vector16              : in std_logic                ; -- from rbsm_scanner
        scan_vector17              : in std_logic                ; -- from rbsm_scanner
        scan_vector18              : in std_logic                ; -- from rbsm_scanner
        scan_vector19              : in std_logic                ; -- from rbsm_scanner

        rbsm_fifo_full             : in std_logic                ; -- from rbsm_qcb
        rbsm_fifo_empty            : in std_logic                ; -- from rbsm_qcb
        rx_buffer_number           : in buffer_number            ; -- from rbsm_status_registers rx_buff_reg
        ama_buffer_number          : in buffer_number            ; -- from rbsm_status_registers ama_stat_reg1(18 downto 8)
        sadd_channum               : in system_channel_number    ; -- from SRAM Arbiter
        sdat_channum               : in system_channel_number    ; -- from SRAM Controller

        code_vector_addr           : in sram_address_bus         ; -- from rbsm_qcb
        filter_frame               : in std_logic                ; -- from rbsm_status_registers

Aug 17 11:19 1994  Who: johnf  File. /c2/local_user/bma/bma_rbsm/bma_rbsm_lib/rbsm_sram_control.vhd Page 2

        discard_frame              : in std_logic                ; -- from rbsm_status_registers
        rx_monitor_on              : in std_logic                ; -- from rbsm_config
        destination_monitor        : in std_logic                ; -- from rbsm_code_vectors
        cut_thru_end               : in std_logic                ; -- from rbsm_ct_active
        cut_thru_begin             : in std_logic                ; -- from rbsm_ct_active
        ethernet_eof               : in std_logic                ; -- from rbsm_unload
        fddi_eof                   : in std_logic                ; -- from rbsm_unload

        ethernet_rx_error          : in std_logic                ; -- from rbsm_status_registers
        fddi_rx_error              : in std_logic                ; -- from rbsm_status_registers
        fddi_abort                 : in std_logic                ; -- from rbsm_status_registers
        enet_abort                 : in std_logic                ; -- from rbsm_status_registers
        llc_frame_type             : in std_logic                ; -- from rbsm_status_registers
        rx_end_of_buffer           : in std_logic                ; -- from rbsm_status_registers
        fddi_multi_buffer          : in std_logic                ; -- from rbsm_multi_buffer


        from_bma_fifo_in_full      : in std_logic                ; -- from microprocessor interface
        frame_cntl_addr            : in rxoff_data               ; -- from rbsm_addr_sync

        rbsm_sram_ready            : buffer std_logic            ; -- to rbsm_stat_control


        load_sram_wregs            : buffer std_logic            ; -- extra output
        wr_cv_only                 : buffer std_logic            ; -- extra output
        frame_control_addr         : buffer sram_address_bus ; -- extra outputs
        sram_wr_done               : buffer std_logic            ; -- extra output
        rbsm_read_wait             : buffer std_logic            ; -- extra output

        from_bma_fifo_wrnxt        :   buffer std_logic          ; -- to microprocessor interface


        rbsm_sdata_sel0            : buffer std_logic            ; -- to rbsm_sram_registers
        rbsm_sdata_sel1            : buffer std_logic            ; -- to rbsm_sram_registers
        rbsm_saddr_sel             : buffer std_logic            ; -- to rbsm_qcb
        rbsm_sram_rdreq            : buffer std_logic            ; -- to SRAM Arbiter
        rbsm_sram_wreq             : buffer std_logic            ; -- to SRAM Arbiter
        microprocessor_inq_full_error : buffer std_logic         ; -- to microprocessor interface
        rbsm_sram_addr             : buffer sram_address_bus  ) ; -- to SRAM Controller

end rbsm_sram_control;


------------------------------------------------------------
------------------------------------------------------------


architecture synthesize of rbsm_sram_control is


-- declarations


------------------------------------------------------------
```

```
Aug 17 11:19 1994 Who johnf File /c2/local_user/bma/bma rbsm/bma rbsm_lib/rbsm_sram_control.vhd Page 3

-- body
----------------------------------------------------------

begin


frame_control addr(4 downto 0) <= frame cntl addr ;


--
--  process rbsm sram sync is used to generate the registered outputs
--  which will be used to control loading the code vectors and status
--  first into a set of registers and then into the external SRAM.
--
--

rbsm_sram_sync:
process
begin
    wait until clock25 = '1' ;


--
-- Generate frame control addr(16 downto 5)
--

        if (reset = ACT) then
            frame_control_addr(16 downto 5) <= "000000000000" ;

        elsif (cont_scan = ACT             and                -- FDDI Received Frame
               rbsm_sram_ready = ACT       and                -- Must use buffer number
              (scan_vector16 = ACT         or                 -- given in Receive Status
               scan_vector17 = ACT         or                 -- do to multibuffering of large frames
               scan_vector18 = ACT         or
               scan_vector19 = ACT))  then
            frame_control_addr(16) <= '0';
            frame control_addr(15 downto 5) <= rx_buffer_number ;


        elsif (cont_scan = ACT                  and           -- Ethernet Received Frame
               rbsm sram_ready = ACT            and           -- Must use buffer number
               scan_vector16 = NOT_ACT          and           -- given in AMA Status do
               scan_vector17 = NOT_ACT          and           -- to Cut Thru Frames
               scan_vector18 = NOT ACT          and
               scan_vector19 = NOT ACT)  then
            frame_control_addr(16) <= '0';
            frame control_addr(15 downto 5) <= ama_buffer_number ;

        else
            frame_control_addr(16) <= '0';
            frame_control_addr(15 downto 5) <= frame_control_addr(15 downto 5) ;
        end if;




--
```

```
Aug 17 11:19 1994 Who: johnf File: /c2/local_user/bma/bma_rbsm/bma_rbsm_lib/rbsm_sram_control.vhd Page 4

-- Generate load_sram_wregs which is used to load a set of registers with
-- code vector and status information
--

        if (reset = ACT) then
            load_sram_wregs <= NOT_ACT   ;

        elsif (cont_scan = ACT                     and      -- Start of Ethernet CUT THRU Frame
               cut_thru_begin = ACT) then
            load_sram_wregs <= ACT   ;

        elsif (cont_scan = ACT                     and      -- End of Ethernet ERRORED Frame
               ethernet_eof = ACT                  and      -- or Monitored port
               enet_abort = NOT_ACT                and
              (ethernet_rx_error = ACT             or
               rx_monitor_on = ACT                 or
               destination_monitor = ACT)) then
            load_sram_wregs <= ACT   .

        elsif (cont_scan = ACT                     and      -- End of Ethernet CUT THRU Frame
               ethernet_eof = ACT                  and
               enet_abort = NOT_ACT                and
               cut_thru_end = ACT                  and
               filter_frame = NOT_ACT) then
            load_sram_wregs <= ACT   ;

        elsif (cont_scan = ACT                     and      -- GOOD Ethernet Frame
               ethernet_eof = ACT                  and      -- Non CUT THRU Frame
               enet abort = NOT_ACT                and
               cut_thru_end = NOT_ACT              and      --
               discard_frame = NOT_ACT) then
            load_sram_wregs <= ACT   ;

        elsif (cont_scan = ACT                     and      -- MULTIBUFFER FDDI Frame
               rx_end_of_buffer = ACT              and      -- Not End Of Frame
              (filter_frame = NOT_ACT              or
              (filter_frame = ACT                  and
               rx_monitor_on = ACT))               and
              (scan_vector16 = ACT                 or
               scan_vector17 = ACT                 or
               scan_vector18 = ACT                 or
               scan_vector19 = ACT)) then
            load_sram_wregs <= ACT   ;

        elsif (cont_scan = ACT                     and      -- MULTIBUFFER ABORTED FDDI Frame
               fddi_eof = ACT                      and      -- Not first buffer
               fddi_abort = ACT                    and      -- Not Filtered
               filter_frame = NOT_ACT              and
               fddi_multi_buffer = ACT) then
            load_sram_wregs <= ACT   ;

        elsif (cont_scan = ACT                     and      -- End of FDCI ERRORED Frame
               fddi_eof = ACT                      and      -- Not aborted or Monitored
               fddi_abort = NOT_ACT                and      -- port
              (fddi_rx_error = ACT                 or
               rx_monitor_on = ACT                 or
               destination_monitor = ACT)) then
            load_sram_wregs <= ACT   ;
```

Aug 17 11:19 1994 Who: johnt File: /c2/local_user/bma/bma_rbsm/bma_rbsm_lib/rbsm_sram_control.vhd Page 5

```
        elsif (cont_scan = ACT                     and     -- NON LLC FDDI Frame
               fddi_eof = ACT                      and     --
               fddi_abort = NOT_ACT                and
               fddi_rx_error = NOT_ACT             and
               filter_frame = NOT_ACT              and
               llc_frame_type = NOT_ACT) then
            load_sram_wregs <= ACT ;

        elsif (cont_scan = ACT                     and     -- Multibuffer Discarded FDDI Frame
               fddi_eof = ACT                      and
               fddi_abort = NOT_ACT                and
               discard_frame = ACT                 and
               fddi_multi_buffer = ACT             and
               filter_frame = NOT_ACT) then
            load_sram_wregs <= ACT ;

        elsif (cont_scan = ACT                     and     -- GOOD FDDI Frame
               fddi_eof = ACT                      and
               fddi_abort = NOT_ACT                and
               discard_frame = NOT_ACT) then
            load_sram_wregs <= ACT ;

        else
            load_sram_wregs <= NOT_ACT ;
        end if;

--
-- Generate rbsm_sram_wreq which is used to make SRAM write requests.
-- Once rbsm_sram_wreq goes active it will stay active until both
-- rbsm_sdata_sel0 and rbsm_sdata_sel1 are active and then SRAM address channel
-- number equals 36h.
--

        if (reset = ACT) then
            rbsm_sram_wreq <= NOT_ACT ;
        elsif (load_sram_wregs = ACT and rbsm_fifo_full = NOT_ACT) then
            rbsm_sram_wreq <= ACT ;
        elsif (rbsm_sram_ready = NOT_ACT and rbsm_fifo_full = NOT_ACT and
               rbsm_sdata_sel0 = NOT_ACT) then
            rbsm_sram_wreq <= ACT ;
        elsif (rbsm_sram_wreq = ACT and rbsm_sdata_sel1 = NOT_ACT) then
            rbsm_sram_wreq <= ACT ;
        elsif (rbsm_sram_wreq = ACT and sadd_channum /= CHAN_36) then
            rbsm_sram_wreq <= ACT ;
        else
            rbsm_sram_wreq <= NOT_ACT ;
        end if;

--
-- Generate rbsm_sram_rdreq which is used to make SRAM read requests.
-- Once rbsm_sram_rdreq goes active it will stay active until the SRAM
-- address channel number equals 76h.
--

        if (reset = ACT or rbsm_enable = NOT_ACT) then
            rbsm_sram_rdreq <= NOT_ACT ;
```

Aug 17 11:19 1994 Who: johnt File: /c2/local_user/bma/bma_rbsm/bma_rbsm_lib/rbsm_sram_control.vhd Page 6

```
        elsif (rbsm_fifo_empty = NOT_ACT and from_bma_fifo_in_full = NOT_ACT and
               rbsm_read_wait = NOT_ACT and sadd_channum /= CHAN_76) then
            rbsm_sram_rdreq <= ACT ;
        else
            rbsm_sram_rdreq <= NOT_ACT ;
        end if;

--
-- Generate rbsm_read_wait which is used to hold off any further SRAM
-- read cycle requests until things have a chance to settle out from the
-- last RBSM SRAM read cycle.
--

        if (reset = ACT) then
            rbsm_read_wait <= NOT_ACT ;
        elsif (sadd_channum = CHAN_76) then
            rbsm_read_wait <= ACT;
        elsif (sdat_channum = CHAN_76) then
            rbsm_read_wait <= ACT;
        elsif (from_bma_fifo_wrnxt = ACT) then
            rbsm_read_wait <= ACT;
        else
            rbsm_read_wait <= NOT_ACT ;
        end if;

--
-- Generate from_bma_fifo_wrnxt which is used as the write enable to the
-- internal 29K In Q which really only consists of two longword registers.
--

        if (reset = ACT) then
            from_bma_fifo_wrnxt <= NOT_ACT ;
        elsif (sdat_channum = CHAN_76) then
            from_bma_fifo_wrnxt <= ACT;
        else
            from_bma_fifo_wrnxt <= NOT_ACT ;
        end if;

--
-- Generate sram_wr_done : used to signal that the SRAM write cycles
-- have completed.
--

        if (reset = ACT) then
            sram_wr_done <= NOT_ACT ;
        elsif (rbsm_sram_ready = NOT_ACT and rbsm_sdata_sel0 = ACT and
               rbsm_sdata_sel1 = ACT and sadd_channum = CHAN_36 and
               sram_wr_done = NOT_ACT) then
            sram_wr_done <= ACT ;
        else
            sram_wr_done <= NOT_ACT ;
        end if;
```

```
Aug 17 11:19 1994  Who  johnf  File  /c2/local_user/bma/bma_rbsm/bma_rbsm_lib/rbsm_sram_control.vhd Page 7

--
-- Generate rbsm_sdata_sel0 which is used along with rbsm_sdata_sel1
-- to select the correct register to output onto the SRAM write data
-- bus.
--

        if (reset = ACT) then
            rbsm_sdata_sel0 <= NOT_ACT   ;
        elsif (rbsm_sdata_sel0 = NOT_ACT and rbsm_sram_ready = NOT_ACT and
                sadd_channum = CHAN_36 and sram_wr_done = NOT_ACT) then
            rbsm_sdata_sel0 <= ACT ;
        elsif (rbsm_sdata_sel0 = ACT and rbsm_sram_ready = NOT_ACT and
                sadd_channum /= CHAN_36 and sram_wr_done = NOT_ACT) then
            rbsm_sdata_sel0 <= ACT ;
        elsif (rbsm_sdata_sel0 = ACT and rbsm_sdata_sel1 = ACT and
                rbsm_sram_ready = NOT_ACT and sram_wr_done = NOT_ACT) then
            rbsm_sdata_sel0 <= ACT ;
        else
            rbsm_sdata_sel0 <= NOT_ACT ;
        end if;


--
-- Generate rbsm_sdata_sel1 which is used along with rbsm_sdata_sel0
-- to select the correct register to output onto the SRAM write data
-- bus.
--

        if (reset = ACT) then
            rbsm_sdata_sel1 <= NOT_ACT   ;
        elsif (wr_cv_only = ACT and sram_wr_done = NOT_ACT) then
            rbsm_sdata_sel1 <= ACT ;
        elsif (rbsm_sram_ready = NOT_ACT and
                sadd_channum = CHAN_36 and sram_wr_done = NOT_ACT and
                rbsm_sdata_sel0 = ACT) then
            rbsm_sdata_sel1 <= ACT ;
        elsif (rbsm_sdata_sel1 = ACT and
                rbsm_sram_ready = NOT_ACT and sram_wr_done = NOT_ACT) then
            rbsm_sdata_sel1 <= ACT ;
        else
            rbsm_sdata_sel1 <= NOT_ACT
        end if;


--
-- Generate rbsm_saddr_sel . used to select SRAM address from either
-- the frame control area address generator or from the rbsm_qcb
--

        if (reset = ACT) then
            rbsm_saddr_sel <= NOT_ACT   ;
        elsif (wr_cv_only = ACT and sram_wr_done = NOT_ACT) then
            rbsm_saddr_sel <= ACT ;
        elsif (rbsm_sdata_sel0 = ACT and sadd_channum = CHAN_36 and
                sram_wr_done = NOT_ACT) then

Aug 17 11:19 1994  Who: johnf  File  /c2/local_user/bma/bma_rbsm/bma_rbsm_lib/rbsm_sram_control.vhd Page 8

            rbsm_saddr_sel <= ACT ;
        elsif (rbsm_sdata_sel1 = ACT and
                sram_wr_done = NOT_ACT) then
            rbsm_saddr_sel <= ACT ;
        else
            rbsm_saddr_sel <= NOT_ACT ;
        end if;


--
-- Generate rbsm_sram_ready : used to inform the rbsm_stat_control
-- module that SRAM access has completed.
--

        if (reset = ACT) then
            rbsm_sram_ready <= ACT   ;
        elsif (load_sram_wregs = ACT) then
            rbsm_sram_ready <= NOT_ACT ;
        elsif (rbsm_sram_ready = NOT_ACT and sram_wr_done = NOT_ACT) then
            rbsm_sram_ready <= NOT_ACT ;
        else
            rbsm_sram_ready <= ACT ;
        end if;


--
-- Generate wr_cv_only : used to control writing the two longword
-- code vector information to SRAM only
--

        if (reset = ACT) then
            wr_cv_only <= NOT_ACT   .

        elsif (cont_scan = ACT                      and
                cut_thru_end = ACT                  and
                rbsm_sram_ready = ACT               and
                filter_frame = NOT_ACT) then
            wr_cv_only <= ACT   ;

        elsif (wr_cv_only = ACT and sram_wr_done = NOT_ACT) then
            wr_cv_only <= ACT   ;

        else
            wr_cv_only <= NOT_ACT ;
        end if;


end process rbsm_sram_sync ;


rbsm_sram_comb:
process(code_vector_addr,frame_control_addr,rbsm_saddr_sel,sadd_channum,
        rbsm_fifo_full,rbsm_sram_ready)
```

```
begin

--
--  process rbsm_sram_comb is used to generate the RBSM SRAM address
--  multiplexor used to select either the frame control address or
--  the BMA to 29K in queue address
--
--

    if (sadd_channum = CHAN_76) then              -- RBSM SRAM read (fifo)
        rbsm_sram_addr <= code_vector_addr   ;
    elsif (rbsm_saddr_sel = ACT) then              -- RBSM SRAM write (fifo)
        rbsm_sram_addr <= code_vector_addr   ;
    else                                           -- RBSM SRAM write (frame control)
        rbsm_sram_addr <= frame_control_addr ;
    end if;


--
-- Activate microprocessor in queue FIFO full error indicator
-- when the RBSM wants to write to the FIFO and the FIFO is
-- full.
--

    if (rbsm_fifo_full = ACT and rbsm_sram_ready = NOT_ACT) then
        microprocessor_inq_full_error <= ACT ;
    else
        microprocessor_inq_full_error <= NOT_ACT ;
    end if ;

end process rbsm_sram_comb;

end synthesize;
```

```
Aug 17 11.19 1994  Who: johnf  File. /c2/local_user/bma/bma rbsm/bma_rbsm_lib/rbsm_sram_registers vhd Page 1

-- $Id: rbsm sram registers.vhd.v 1.16 94/06/02 18 24 01 johnf Exp $
--
--  Author  :   John A. Flanders
--
--
--  Title   :   rbsm_sram_registers    rbsm_sram_registers is the component used to generate four
--                                     32 wide registers used to temporarily store code vectors and
--                                     AMA Status which is to be written into the external SRAM memory.
--                                     This module also generates a 4to1 MUX by 32 used to mux the
--                                     appropriate register output onto the SRAM write data bus.
--
--
--
--  Revision History
--
--  7/20/93 :                  original version
--
--


library std;
library synopsys ;
library ieee ;
library bma_lib;
library bma_rbsm_lib;


use synopsys.attributes.all;
use ieee.std_logic_1164.all;
use ieee.std_logic_arith.all;
use ieee.std_logic_unsigned.all;
use ieee.std_logic_misc.all
use bma_lib.bma_types.all;
use bma_rbsm_lib.bma_rbsm_types.all;

-- synopsys_translate_off
use std.textio.all;
use ieee.std_logic_textio.all;
-- synopsys_translate_on

entity rbsm sram_registers is
    port(
        clock25              : in std_logic     ; -- system clock
        reset                : in std_logic     ; -- system clock
        load_sram_wregs      : in std_logic     ; -- SRAM register write strobe  (from rbsm_sram_control)
        rbsm_sdata_sel0      : in std_logic     ; -- SRAM write data MUX select  (from rbsm_sram_control)
        rbsm_sdata_sel1      : in std_logic     ; -- SRAM write data MUX select  (from rbsm_sram_control)
        src_address_status   : in SA_STATUS     ; -- Source Address Status field (from rbsm_sa_status)
        code_vector          : in CV_CODE       ; -- Code Vector field           (from rbsm_code_vectors)

        translation_code     : in TC_CODE       ; -- Translation code field      (from rbsm_trans_code)

        cont_scan               : in std_logic   ; -- from rbsm_stat_control
        cut_thru_end            : in std_logic   ; -- from rbsm_ct_active
        cut_thru_begin          : in std_logic   ; -- from rbsm_ct_active
        fddi_multi_buffer       : in std_logic   ; -- from rbsm_multi_buffer

        scan_vector          : in SCAN_VEC      ; -- Scan vector                 (from rbsm_scanner)

Aug 17 11:19 1994  Who: johnf  File: /c2/local_user/bma/bma_rbsm/bma_rbsm_lib/rbsm_sram_registers.vhd Page 2


        ama_buffer_number       : in buffer_number   ; -- from rbsm_status_registers
        rx_buff_reg             : in buffer_number   ; -- from rbsm_status_registers

        dest_address_match      : in std_logic    ; -- from rbsm_status_registers
        dest_group_address      : in std_logic    ; -- from rbsm_status_registers
        dest_address_tag        : in AMA_TAG      ; -- from rbsm_status_registers
        dest_address_data       : in AMA_DATA     ; -- from rbsm_status_registers
        da_port_num             : in FC_PORT_NUMBER ; -- from rbsm_status_registers

        src_address_match       : in std_logic    ; -- from rbsm_status_registers
        src_port_equal          : in std_logic    ; -- from rbsm_status_registers
        src_address_tag         : in AMA_TAG      ; -- from rbsm_status_registers
        src_address_data        : in AMA_DATA     ; -- from rbsm_status_registers
        sa_port_num             : in FC_PORT_NUMBER ; -- from rbsm_status_registers

        frame_byte_count     : in BYTE_CNT     ; -- rx_stat_reg(12 downto 0)      (from rbsm_status_registers)

-- Use to generate i-field offset

        receive_body_offset   : in rxoff_data      ; -- (from DMA Controller)

        positive_forward_enable : in std_logic      ; -- from microprocessor interface     Added 2/9/94
        bbone_register          : in BBONE_REG_DATA ; -- from rbsm_bbone                   Added 2/9/94

        rx_end_of_buffer        : in std_logic      ; -- from rbsm_status_registers        Added 4/6/94

--

        transmit_port_num  : buffer port_number ; -- to rbsm_config  Added 2/9/94

        rx_fifo_reg1        : buffer long_word ;  -- extra
        rx_fifo_reg2        : buffer long_word ;  -- extra
        frame_control_reg1  : buffer long_word ;  -- extra
        frame_control_reg2  : buffer long_word ;  -- extra
        rbsm_sram_wdata     : buffer long_word ) ; -- RBSM SRAM write data (to SRAM)

end rbsm_sram_registers ;



-------------------------------------------------------------
-------------------------------------------------------------


 rchitecture synthesize of rbsm_sram_registers is

 signal cut_thru                    : std_logic ;
 signal start_cut_thru              : std_logic ;
signal multi_buffered               : std_logic ;
signal monitor_translation_code     : TC_CODE   ;


signal fddi_port                    : std_logic ;

signal transmit_port                : FC_PORT_NUMBER ;
```

```
Aug 17 11 19 1994  Who: johnf  File  /c2/local user/bma/bma_rbsm/bma_rbsm_lib/rbsm_sram_registers.vhd Page 3

begin

rbsm sram_reg_sync:
process
begin
    wait until clock25 = '1';

--
--
--
--

    if (reset = ACT) then

        rx_fifo_reg1         <= (others => '0') ;
        rx_fifo_reg2         <= (others => '0') ;
        frame_control_reg1 <= (others => '0') ;
        frame_control_reg2 <= (others => '0') ;

    elsif (load_sram_wregs = ACT) then

-- Receive FIFO lword 1

        rx_fifo_reg1(31 downto 27) <= code_vector                 ; -- code vector field
        rx_fifo_reg1(26 downto 24) <= "000"                       ;

        if(multi_buffered = ACT) then
            rx_fifo_reg1(23) <= '1'                               ;
        else
            rx_fifo_reg1(23) <= '0'                               ;
        end if;

        if(cut_thru = ACT) then
            rx_fifo_reg1(22) <= '1'                               ;
        else
            rx_fifo_reg1(22) <= '0'                               ;
        end if;

        if(multi_buffered = ACT) then
            rx_fifo_reg1(21 downto 11) <= rx buff_reg             ; -- data start address field
        else
            rx_fifo_reg1(21 downto 11) <= ama_buffer number       ; -- data start address field
        end if;

        rx_fifo_reg1(10 downto 7)  <= "0000"                      ; --
        rx_fifo_reg1(6  downto 2)  <= receive_body_offset         ; -- data start configurable offset
        rx_fifo_reg1(1 downto 0)   <= src_address_status          ; -- source address status field


-- Receive FIFO lword 2

        rx_fifo_reg2(31 downto 26) <= transmit_port               ; -- destination port       Changed 2/9/94
        rx_fifo_reg2(25 downto 20) <= sa_port_num                 ; -- source port (active)
        rx_fifo_reg2(19 downto 18) <= "00"                        ;
        rx_fifo_reg2(17 downto 15) <= monitor_translation_code    ; -- monitor translation code

Aug 17 11:18 1994  Who: johnf  File  /c2/local_user/bma/bma_rbsm/bma_rbsm_lib/rbsm_sram_registers.vhd Page 4

        if (dest_address_match = ACT and dest_address_data(12) = ACT) then
            rx_fifo_reg2(14) <= '1'     ;
        else
            rx_fifo_reg2(14) <= '0'     ;
        end if ;

        if (src_address_match = ACT and src_address_data(12) = ACT) then
            rx_fifo_reg2(13) <= '1'
        else
            rx_fifo_reg2(13) <= '0'
        end if ;

        if(start_cut_thru = ACT) then
            rx_fifo_reg2(12 downto 0) <= "0000000000000"          ;  -- Start of Ethernet Cut Thru Frame
        elsif(frame_byte_count < 5) then
            rx_fifo_reg2(12 downto 0) <= "0000000000000"          ;  -- Byte count is less than 5
        elsif(fddi_port = ACT and multi_buffered = NOT_ACT) then
            rx_fifo_reg2(12 downto 0) <= frame_byte_count - 4     ;  -- Uni_buffered FDDI FRAME
        elsif(fddi_port = ACT and multi_buffered = ACT and
                rx_end_of_buffer = ACT) then
            rx_fifo_reg2(12 downto 0) <= "0000000000000"          ;  -- Multi_buffered FDDI FRAME, not last buffer
        elsif(fddi_port = ACT and multi_buffered = ACT and
                rx_end_of_buffer = NOT_ACT) then
            rx_fifo_reg2(12 downto 0) <= frame_byte_count - 4     ;  -- Multi_buffered FDDI FRAME, last buffer
        else
            rx_fifo_reg2(12)              <= '0'                              ;
            rx_fifo_reg2(11 downto 0) <= frame_byte_count(11 downto 0) - 4 ; -- End of Ethernet Frame
        end if;

-- destination port ama status

        frame_control_reg1(31)           <= dest_address_match    ; -- destination HIT bit    (ama_stat_reg1(22))
        frame_control_reg1(30)           <= dest_group_address    ; -- destination GROUP bit  (ama_stat_reg2(31))
        frame_control_reg1(29 downto 16) <= dest_address_tag      ; -- destination TAG field  (ama_stat_reg2(29:16))
        frame_control_reg1(15)           <= src_address_match     ; -- source HIT bit         (ama_stat_reg1(21))
        frame_control_reg1(14)           <= src_port_equal        ; -- source port equal bit  (ama_stat_reg3(30))
        frame_control_reg1(13 downto 0)  <= src_address_tag       ; -- source TAG field       (ama_stat_reg3(29:16))

-- source port ama status

        frame_control_reg2(31 downto 16) <= dest_address_data     ; -- destination AMA data   (ama_stat_reg2(15:0))
        frame_control_reg2(15 downto 0)  <= src_address_data      ; -- source AMA data        (ama_stat_reg3(15:0))


    else

        rx_fifo_reg1         <= rx_fifo_reg1 ;
        rx_fifo_reg2         <= rx_fifo_reg2 ;
        frame_control_reg1   <= frame_control_reg1    ;
        frame_control_reg2   <= frame_control_reg2    ;

    end if;



-- Cut-thru Flip Flop
```

```
Aug 17 11:19 1994  Who: johnf  File: /c2/local_user/bma/bma_rbsm/bma_rbsm_lib/rbsm_sram_registers.vhd Page 5

    if (reset = ACT) then
        cut_thru <= NOT_ACT ;
    elsif (cut_thru_begin = ACT and cont_scan = ACT) then
        cut_thru <= ACT ;
    elsif (cut_thru_end = ACT and cont_scan = ACT) then
        cut_thru <= ACT ;
    else
        cut_thru <= NOT_ACT ;
    end if;


-- Start Cut-thru Flip Flop

    if (reset = ACT) then
        start_cut_thru <= NOT_ACT ;
    elsif (cut_thru_begin = ACT and cont_scan = ACT) then
        start_cut_thru <= ACT ;
    else
        start_cut_thru <= NOT_ACT ;
    end if;


-- Multi Buffer Flip Flop

    if (reset = ACT) then
        multi_buffered <= NOT_ACT ;
    elsif (fddi_multi_buffer = ACT and cont_scan = ACT) then
        multi_buffered <= ACT ;
    else
        multi_buffered <= NOT_ACT ;
    end if;



-- FDDI Port Flip Flop

    if (reset = ACT) then
        fddi_port <= NOT_ACT ;
    elsif ((scan_vector(16) = ACT or scan_vector(17) = ACT or
            scan_vector(18) = ACT or scan_vector(19) = ACT) and
            cont_scan = ACT) then
        fddi_port <= ACT ;
    else
        fddi_port <= NOT_ACT ;
    end if;



-- Monitor translation code register

    if (reset = ACT) then
        monitor_translation_code <= "000" ;
    elsif (cont_scan = ACT) then
        monitor_translation_code <= translation_code ;
    else
```

```
Aug 17 11:19 1994  Who: johnf  File: /c2/local_user/bma/bma_rbsm/bma_rbsm_lib/rbsm_sram_registers.vhd Page 6

        monitor_translation_code <= monitor_translation_code ;
    end if;

end process rbsm_sram_reg_sync ;


--
--
--
--

rbsm_sram_reg_comb:
process(rbsm_sdata_sel0,rbsm_sdata_sel1,rx_fifo_reg1,rx_fifo_reg2,frame_control_reg1,frame_control_reg2)

begin


--
-- Generate a 4to1 MUX by 32 used to select one of the four register
-- outputs which will be written to SRAM.
--

    if (rbsm_sdata_sel0 = ACT and rbsm_sdata_sel1 = NOT_ACT) then
        rbsm_sram_wdata <= frame_control_reg2 ;
    elsif (rbsm_sdata_sel0 = NOT_ACT and rbsm_sdata_sel1 = ACT) then
        rbsm_sram_wdata <= rx_fifo_reg1 ;
    elsif (rbsm_sdata_sel0 = ACT and rbsm_sdata_sel1 = ACT) then
        rbsm_sram_wdata <= rx_fifo_reg2 ;
    else
        rbsm_sram_wdata <= frame_control_reg1 ;
    end if;


end process rbsm_sram_reg_comb;

--
--
--
--


rbsm_tx_port_comb:
process(dest_address_match,da_port_num,positive_forward_enable,bbone_register,dest_group_address)

begin


--
-- Generate a 2to1 MUX by 6 used to select either the destination port
-- number provided from the AMA status or the Backbone port number provided
-- from the Backbone register. The Backbone register is a 7 bit register
-- but only the 6 least significant bits are sent to the 29K.
--

    if (dest_address_match = ACT) then
        transmit_port <= da_port_num ;
    elsif (positive_forward_enable = ACT and dest_group_address = NOT_ACT) then
        transmit_port <= bbone_register(5 downto 0) ;
```

```
Aug 17 11:19 1994  Who: johnf  File: /c2/local_user/bma/bma_rosm/bma_rbsm_lib/rbsm_sram registers.vhd Page 7

     else
          transmit_port <= "111111"
     end if;


end process rbsm_tx_port_comb;

--
--
--
--

rbsm_tx num_comb:
process(dest_address match,da_port_num,positive_forward_enable,bbone_register,dest_group_address)

begin

--
-- Generate a 2to1 MUX by 5 used to select either the destination port
-- number provided from the AMA status or the Backbone port number provided
-- from the Backbone register. The Backbone register is a 7 bit register
-- but only the 5 least significant bits are used to determine what
-- the destination port is.
--

     if (dest_address_match = ACT) then
          transmit_port_num <= da_port_num(4 downto 0) ;
     elsif (positive_forward enable = ACT and dest_group_address = NOT_ACT) then
          transmit_port_num <= bbone_register(4 downto 0) ;
     else
          transmit port_num <= "11111" .
     end if;


end process rbsm_tx_num_comb;



--
-- Monitor_process is only used as a file writer so as
-- to help facilitate debug of the RBSM in system test.
--

-- synopsys_translate_off

monitor_process:
process

    file outfile: text is out "./rbsm_sram_register.mon" ;

    variable outline          : line;
    variable code_vector      : std_logic_vector(7 downto 0) ;
    variable ama_buffer_num   : std_logic_vector(11 downto 0) .
    variable rcv_port_num     : std_logic_vector(7 downto 0) ;
```

```
Aug 17 11:19 1994  Who: johnf  File: /c2/local_user/bma/bma_rbsm/bma_rbsm_lib/rbsm_sram_registers.vhd Page 8


begin

    wait until load_sram_wregs = '0' and Load_sram_wregs'event and reset = NOT_ACT;
    wait for 10 ns ;

            code_vector(7 downto 5) := "000" ;
            code_vector(4 downto 0)  := rx_fifo_reg1(31 downto 27) ;

            write(outline,string'("FRAME CONTROL WORD 1                                    : "));
            hwrite(outline,frame_control_reg1), ;
            write(outline,string'(" : "));
            write(outline,NOW);
            writeline(outfile,outline) ;


            write(outline,string'("FRAME CONTROL WORD 2                                    : "));
            hwrite(outline,frame_control_reg2) ;
            write(outline,string'(" : "));
            write(outline,NOW);
            writeline(outfile,outline) ;


            write(outline,string'("RECEIVE FIFO WORD 1                                     : "));
            hwrite(outline,rx_fifo_reg1) ;
            write(outline,string'(" : "));
            write(outline,NOW);
            writeline(outfile,outline) ;


            write(outline,string'("RECEIVE FIFO WORD 2                                     : "));
            hwrite(outline,rx_fifo_reg2) ;
            write(outline,string'(" : "));
            write(outline,NOW);
            writeline(outfile,outline) ;

            if (code_vector = "00000000" ) then

                write(outline,string'("code vector = CV_UNICAST_NO_TRANSLATION                       : "));
                write(outline,NOW);
                writeline(outfile,outline) ;

            elsif (code_vector = "00000001") then

                write(outline,string'("code vector = CV_UNICAST_NO_TRANSLATION_FILTERS               : "));
                write(outline,NOW);
                writeline(outfile,outline) ;

            elsif (code_vector = "00000010") then

                write(outline,string'("code vector = CV_UNICAST_NO_TRANSLATION_CUTTHRU               : "));
                write(outline,NOW);
                writeline(outfile,outline) ;

            elsif (code_vector = "00000011") then

                write(outline,string'("code vector = CV_UNICAST_NO_TRANSLATION_CUTTHRU_END           : "));
                write(outline,NOW);
```

Aug 17 11:19 1994 Who: johnf File: /c2/local_user/bma/bma_rbsm/bma_rbsm_lib/rbsm_sram_registers.vhd Page 9

```
        writeline(outfile,outline) ;
    elsif (code_vector = "00000100") then
        write(outline,string'("code vector = CV_UNICAST_ETHERNET_TO_FDDI                    "));
        write(outline,NOW);
        writeline(outfile,outline) ;
    elsif (code_vector = "00000101") then
        write(outline,string'("code vector = CV_UNICAST_ETHERNET_TO_FDDI__FILTERS           "));
        write(outline,NOW);
        writeline(outfile,outline) ;
    elsif (code_vector = "00000110") then
        write(outline,string'("code vector = CV_UNICAST_FDDI_TO_ETHERNET                    "));
        write(outline,NOW);
        writeline(outfile,outline) ;
    elsif (code_vector = "00000111") then
        write(outline,string'("code vector = CV_UNICAST_FDDI_TO_ETHERNET_FILTERS            "));
        write(outline,NOW);
        writeline(outfile,outline) ;
    elsif (code_vector = "00001000") then
        write(outline,string'("code vector = CV_UNICAST_FDDI_TO_ETHERNET_FRAG               "));
        write(outline,NOW);
        writeline(outfile,outline) ;
    elsif (code_vector = "00001001") then
        write(outline,string'("code vector = CV_UNICAST_DA_UNKNOWN                          "));
        write(outline,NOW);
        writeline(outfile,outline) ;
    elsif (code_vector = "00001010") then
        write(outline,string'("code vector = CV_UNICAST_EXCEPTION                           "));
        write(outline,NOW);
        writeline(outfile,outline) ;
    elsif (code_vector = "00001011") then
        write(outline,string'("code vector = CV_MULTICAST_FROM_ETHERNET                     "));
        write(outline,NOW);
        writeline(outfile,outline) ;

    elsif (code_vector = "00001100") then
        write(outline,string'("code vector = CV_MULTICAST_FROM_ETHERNET_EXCEPTION           "));
        write(outline,NOW);
        writeline(outfile,outline) ;

    elsif (code_vector = "00001101") then
```

Aug 17 11:19 1994 Who: johnf File: /c2/local_user/bma/bma_rbsm/bma_rbsm_lib/rbsm_sram_registers.vhd Page 10

```
        write(outline,string'("code vector = CV_MULTICAST_FROM_ETHERNET_CUTTHRU_END         "));
        write(outline,NOW);
        writeline(outfile,outline) ;

    elsif (code_vector = "00001110") then
        write(outline,string'("code vector = CV_MULTICAST_FROM_FDDI                         "));
        write(outline,NOW);
        writeline(outfile,outline) ;

    elsif (code_vector = "00001111") then
        write(outline,string'("code vector = CV_MULTICAST_FROM_FDDI_EXCEPTION               "));
        write(outline,NOW);
        writeline(outfile,outline) ;

    elsif (code_vector = "00010000") then
        write(outline,string'("code vector = CV_MULTICAST_FROM_FDDI_FRAG                    "));
        write(outline,NOW);
        writeline(outfile,outline) ;

    elsif (code_vector = "00010001") then
        write(outline,string'("code vector = CV_MULTICAST_EXCEPTION                         "));
        write(outline,NOW);
        writeline(outfile,outline) ;

    elsif (code_vector = "00010010") then
        write(outline,string'("code vector = CV_RECEIVE_FRAME_ERROR                         "));
        write(outline,NOW);
        writeline(outfile,outline) ;

    elsif (code_vector = "00010011") then
        write(outline,string'("code vector = CV_NON_LLC_FRAME                               "));
        write(outline,NOW);
        writeline(outfile,outline) ;
    elsif (code_vector = "00010100") then
        write(outline,string'("code vector = CV_INTERNAL_UNICAST                            "));
        write(outline,NOW);
        writeline(outfile,outline) ;
    elsif (code_vector = "00010101") then
        write(outline,string'("code vector = CV_INTERNAL_UNICAST_EXCEPTION                  "));
        write(outline,NOW);
        writeline(outfile,outline) ;
    elsif (code_vector = "00010110") then
```

Aug 17 11 19 1994 Who: johnf File: /c2/local_user/bma/bma_rbsm/bma_rbsm lib/rbsm_sram_registers.vhd Page 11

```
                write(outline,string'("code vector = CV INTERNAL MULTICAST                        "));
                write(outline,NOW);
                writeline(outfile,outline) ;

            elsif (code_vector = "00010111") then

                write(outline,string'("code vector = CV_INTERNAL_BROADCAST                        "));
                write(outline,NOW);
                writeline(outfile,outline)

            elsif (code_vector = "00011000") then

                write(outline,string'("code vector = CV_MULTIBUFFER_NOT_LAST_BUFFER               "));
                write(outline,NOW);
                writeline(outfile,outline) ;

            elsif (code_vector = "00011001") then

                write(outline,string'("code vector = CV_MULTIBUFFER_NO_TRANSLATION                "));
                write(outline,NOW);
                writeline(outfile,outline) ;

            elsif (code_vector = "00011010") then

                write(outline,string'("code vector = CV_MULTIBUFFER_NO_TRANSLATION_FILTERS        "));
                write(outline,NOW);
                writeline(outfile,outline) ;

            elsif (code_vector = "00011011") then

                write(outline,string'("code vector = CV_MULTIBUFFER_DISCARD_FRAME                 "));
                write(outline,NOW);
                writeline(outfile,outline) ;

            elsif (code_vector = "00011100") then

                write(outline,string'("code vector = 11100 = NOT DEFINED                          "));
                write(outline,NOW);
                writeline(outfile,outline) ;

            elsif (code_vector = "00011101") then

                write(outline,string'("code vector = CV_MONITOR_SOURCE                            "));
                write(outline,NOW);
                writeline(outfile,outline) ;

            elsif (code_vector = "00011110") then

                write(outline,string'("code vector = CV_MONITOR_DESTINATION                       "));
```

Aug 17 11:19 1994 Who: johnf File: /c2/local_user/bma/bma_rbsm/bma_rbsm_lib/rbsm_sram_registers.vhd Page 12

```
                write(outline,NOW);
                writeline(outfile,outline) ;

            elsif (code_vector = "00011111") then

                write(outline,string'("code vector = CV_FIFO_EMPTY                                "));
                write(outline,NOW);
                writeline(outfile,outline) ;

            end if;

            write(outline,string'("  "));
            writeline(outfile,outline) ;

end process monitor_process ;

-- synopsys_translate_on

end synthesize;
```

Aug 17 11:19 1994 Who: johnf File: /c2/local_user/bma/bma_rbsm/bma_rbsm_lib/rbsm_stat_control.vhd Page 1

```
-- $Id: rbsm_stat_control.vhd,v 1.7 94/06/02 18:22:33 johnf Exp $
--
-- Author : John A. Flanders
--
-- Title    rbsm_stat_control       rbsm_stat_control is the receive buffer state machine component used to
--                                  control reading of the AMA Status Queue and the Receive Event Queue.
--
--
--
-- Revision History
--
-- 6/24/93                    original version
--
--
--
--
--

library synopsys ;
library ieee ;
library bma_lib;
library bma_rbsm_lib;

use synopsys.attributes.all;
use ieee.std_logic_1164.all;
use ieee.std_logic_arith.all;
use ieee.std_logic_unsigned.all;
use ieee.std_logic_misc.all;
use bma_lib.bma_types.all;
use bma_rbsm_lib.bma_rbsm_types.all;

-- synopsys_translate_off
use std.textio.all;
use ieee.std_logic_textio.all;
-- synopsys_translate_on

entity rbsm_stat_control is
    port(
        clock25          : in std_logic ;    -- system clock
        reset            : in std_logic ;    -- system reset
        rbsm_enable      : in std_logic ;    -- RBSM master enable
        rx_stat_rq       : in std_logic ;    -- from rbsm_request
        ama_stat_rq      : in std_logic ;    -- from rbsm_request
        rx_end_of_buffer : in std_logic ;    -- rx_stat(16)  : End of Buffer/End of Frame
        filter_frame     : in std_logic ;    -- from rbsm_status_registers
        discard_frame    : in std_logic ;    -- from rbsm_status_registers
        rx_monitor_on    : in std_logic ;    -- from rbsm_config
        fddi_abort       : in std_logic ;    -- FDDI Punt Frame
        enet_abort       : in std_logic ;    -- ENET Punt Frame                ADDED 5/2/94
        sram_rdy         : in std_logic ;    -- from rbsm_sram_control
        stat_rdy         : in std_logic ;    -- from rbsm_ram_control
        bufq_rdy         : in std_logic ;    -- from rbsm_ret_buf_cnt
        buffer_num_neq   : in std_logic ;    -- from rbsm_compl1

        cut_thru_begin   : in std_logic ;    -- from rbsm_ct_active

        fddi_rx_error          : in std_logic ;  -- from rbsm_status_registers
        ethernet_rx_error      : in std_logic ;  -- from rbsm_status_registers
```

Aug 17 11:19 1994 Who: johnf File: /c2/local_user/bma/bma_rbsm/bma_rbsm_lib/rbsm_stat_control.vhd Page 2

```
        dest_port_type         : in PORT_TYPE ;  -- from rbsm_status_registers

        ama_sel          : in port_vector    ;  -- from rbsm_ama_sel
        port_req         : in port_vector    ;  -- from rbsm_request
        not_first        : in FPORT_VEC      ;  -- from rbsm_not_first
        scan_vector      : in SCAN_VEC       ;  -- from rbsm_scanner
        cont_scan        : buffer std_logic  ;
        cont_scan4       : buffer std_logic  ;
        scan             : buffer std_logic  ;
        rd_state0        : buffer std_logic  ;
        rd_state1        : buffer std_logic  ;
        ama_stat_rd      : buffer std_logic  ;
        ama_stat_rd1     : buffer std_logic  ;
        ama_stat_rd2     : buffer std_logic  ;
        ama_stat_rd3     : buffer std_logic  ;
        ama_status_next  : buffer std_logic  ;
        rx_status_next   : buffer std_logic  ;
        rbsm_error       : buffer std_logic  ;
        rx_stat_rd       : buffer std_logic  ;
        fromama_read_whichword : buffer ama_stat_addr ) ;

end rbsm_stat_control;


----------------------------------------------------------
----------------------------------------------------------


architecture synthesize of rbsm_stat_control is

-- translate off

type CNTL_STATE is (IDLE,AMA_WORD1,AMA_WORD2,AMA_WORD3,CODE_VECTOR) ;

-- translate on

-- declarations

signal rbsm_rdy          : std_logic ;


signal state0            : std_logic ;
signal state1            : std_logic ;
signal ama_rd            : std_logic ;
 ignal ama_rd1           : std_logic ;
 ignal ama_rd2           : std_logic ;
signal ama_rd3           : std_logic ;
signal rx_rd             : std_logic ;
signal rdy               : std_logic ;
signal cnt_scan1         : std_logic ;
signal cnt_scan2         : std_logic ;
signal cnt_scan3         : std_logic ;
signal cnt_scan4         : std_logic ;
signal cnt_scan5         : std_logic ;
signal cnt_scan6         : std_logic ;
```

Aug 17 11:19 1994 Who: johnf File: /c2/local_user/bma/bma_rbsm/bma_rbsm_lib/rbsm_stat_control.vhd Page 3

```
signal cnt_scan7            : std_logic ;
signal cont_scan1           : std_logic ;
signal cont_scan2           : std_logic ;
signal cont_scan3           : std_logic ;
signal cont_scan5           : std_logic ;
signal cont_scan6           : std_logic ;
signal cont_scan7           : std_logic ;
signal ama_next             : std_logic ;
signal rx_next              : std_logic ;
signal error                : std_logic ;

signal delay_one_clock      : std_logic ;

-- translate off

signal control_state        CNTL_STATE ;

-- translate on

---------------------------------------------------------------
-- body
---------------------------------------------------------------

begin


cont_scan         <= (cont_scan1 or cont_scan2 or cont_scan3 or cont_scan4 or cont_scan5 or cont_scan6 or cont_scan7) and
                     (not rbsm_error);

fromama_read_whichword <= rd_state1 & rd_state0 ;

--
--   process rbsm_stat_sync is used to generate the registered outputs
--   which will be used to control reading of the AMA Status Queue and
--   Receive Event Queue.
--

rbsm_stat_sync:
process
begin
    wait until clock25 = '1'     ;

        rd_state0          <= state0       ;
        rd_state1          <= state1       ;
        ama_stat_rd        <= ama_rd       ;
        ama_stat_rd1       <= ama_rd1      ;
        ama_stat_rd2       <= ama_rd2      ;
        ama_stat_rd3       <= ama_rd3      ;
        rx_stat_rd         <= rx_rd        ;
        rbsm_rdy           <= rdy          ;
        cont_scan1         <= cnt_scan1    ;
        cont_scan2         <= cnt_scan2    ;
        cont_scan3         <= cnt_scan3    ;
        cont_scan4         <= cnt_scan4    ;
        cont_scan5         <= cnt_scan5    ;
        cont_scan6         <= cnt_scan6    ;
        cont_scan7         <= cnt_scan7    ;
        ama_status_next    <= ama_next     ;
        rx_status_next     <= rx_next      ;
```

Aug 17 11:19 1994 Who: johnf File: /c2/local_user/bma/bma_rbsm/bma_rbsm_lib/rbsm_stat_control.vhd Page 4

```
        rbsm_error         <= error        ;

    if (reset = ACT) then
        delay_one_clock <= NOT_ACT ;
    elsif (rd_state0 = ACT and rd_state1 = ACT) then
        delay_one_clock <= ACT ;
    else
        delay_one_clock <= NOT_ACT ;
    end if;



-- translate off

    if (reset = ACT) then
        control_state <= IDLE ;
    elsif (ama_rd1 = ACT) then
        control_state <= AMA_WORD1 ;
    elsif (ama_rd2 = ACT) then
        control_state <= AMA_WORD2 ;
    elsif (ama_rd3 = ACT) then
        control_state <= AMA_WORD3 ;
    elsif (cont_scan = ACT) then
        control_state <= IDLE ;
    elsif (rd_state1 = ACT) then
        control_state <= CODE_VECTOR ;
    else
        control_state <= IDLE ;
    end if;

-- translate on

end process rbsm_stat_sync ;

--
-- process rbsm_stat_comb is used to generate the combinatorial logic
-- required for all flops generated by this model.
--

rbsm_stat_comb:
process(reset,        port_req,      ama_set,           rx_end_of_buffer,rd_state0,   rd_state1,
        rx_stat_rq,   ama_stat_rq,     cont_scan,         ama_stat_rd,  ama_stat_rd1,
        ama_stat_rd2, rx_stat_rd,    bufq_rdy,          fddi_rx_error,  discard_frame,
        scan_vector,  filter_frame,  sram_rdy,          ethernet_rx_error,
        stat_rdy,     fddi_abort,    cont_scan1,        cont_scan2,     cont_scan3,   cont_scan4,
        cont_scan5,   not_first,     buffer_num_neq,    rbsm_error,     rbsm_rdy,
        dest_port_type,              cut_thru_begin,    delay_one_clock,
        cont_scan6,      rbsm_enable,     rx_monitor_on, enet_abort,   cont_scan7)

begin

-- ***************************************************************
-- Generate scan : combinatorial only
-- ***************************************************************

        if (scan_vector(0) = ACT and ama_stat_rd = NOT_ACT and
```

Aug 17 11:19 1994 Who: johnf File: /c2/local_user/bma/bma_rbsm/bma_rbsm_lib/rbsm_stat_control.vhd Page 5

```
          port_req(0) = NOT_ACT and rd_state1 = NOT_ACT and
          rbsm_enable = ACT) then
          scan <= ACT;
      elsif (scan_vector(1) = ACT and ama_stat_rd = NOT_ACT and
          port_req(1) = NOT_ACT and rd_state1 = NOT_ACT and
          rbsm_enable = ACT) then
          scan <= ACT;
      elsif (scan_vector(2) = ACT and ama_stat_rd = NOT_ACT and
          port_req(2) = NOT_ACT and rd_state1 = NOT_ACT and
          rbsm_enable = ACT) then
          scan <= ACT;
      elsif (scan_vector(3) = ACT and ama_stat_rd = NOT_ACT and
          port_req(3) = NOT_ACT and rd_state1 = NOT_ACT and
          rbsm_enable = ACT) then
          scan <= ACT;
      elsif (scan_vector(4) = ACT and ama_stat_rd = NOT_ACT and
          port_req(4) = NOT_ACT and rd_state1 = NOT_ACT and
          rbsm_enable = ACT) then
          scan <= ACT;
      elsif (scan_vector(5) = ACT and ama_stat_rd = NOT_ACT and
          port_req(5) = NOT_ACT and rd_state1 = NOT_ACT and
          rbsm_enable = ACT) then
          scan <= ACT;
      elsif (scan_vector(6) = ACT and ama_stat_rd = NOT_ACT and
          port_req(6) = NOT_ACT and rd_state1 = NOT_ACT and
          rbsm_enable = ACT) then
          scan <= ACT;
      elsif (scan_vector(7) = ACT and ama_stat_rd = NOT_ACT and
          port_req(7) = NOT_ACT and rd_state1 = NOT_ACT and
          rbsm_enable = ACT) then
          scan <= ACT;
      elsif (scan_vector(8) = ACT and ama_stat_rd = NOT_ACT and
          port_req(8) = NOT_ACT and rd_state1 = NOT_ACT and
          rbsm_enable = ACT) then
          scan <= ACT;
      elsif (scan_vector(9) = ACT and ama_stat_rd = NOT_ACT and
          port_req(9) = NOT_ACT and rd_state1 = NOT_ACT and
          rbsm_enable = ACT) then
          scan <= ACT;
      elsif (scan_vector(10) = ACT and ama_stat_rd = NOT_ACT and
          port_req(10) = NOT_ACT and rd_state1 = NOT_ACT and
          rbsm_enable = ACT) then
          scan <= ACT;
      elsif (scan_vector(11) = ACT and ama_stat_rd = NOT_ACT and
          port_req(11) = NOT_ACT and rd_state1 = NOT_ACT and
          rbsm_enable = ACT) then
          scan <= ACT;
      elsif (scan_vector(12) = ACT and ama_stat_rd = NOT_ACT and
          port_req(12) = NOT_ACT and rd_state1 = NOT_ACT and
          rbsm_enable = ACT) then
          scan <= ACT;
      elsif (scan_vector(13) = ACT and ama_stat_rd = NOT_ACT and
          port_req(13) = NOT_ACT and rd_state1 = NOT_ACT and
          rbsm_enable = ACT) then
          scan <= ACT;
      elsif (scan_vector(14) = ACT and ama_stat_rd = NOT_ACT and
          port_req(14) = NOT_ACT and rd_state1 = NOT_ACT and
          rbsm_enable = ACT) then
          scan <= ACT;
      elsif (scan_vector(15) = ACT and ama_stat_rd = NOT_ACT and
```

Aug 17 11:19 1994 Who: johnf File: /c2/local_user/bma/bma_rbsm/bma_rbsm_lib/rbsm_stat_control.vhd Page 6

```
          port_req(15) = NOT_ACT and rd_state1 = NOT_ACT and
          rbsm_enable = ACT) then
          scan <= ACT;
      elsif (scan_vector(16) = ACT and ama_stat_rd = NOT_ACT and
          port_req(16) = NOT_ACT and rd_state1 = NOT_ACT and
          rbsm_enable = ACT) then
          scan <= ACT;
      elsif (scan_vector(17) = ACT and ama_stat_rd = NOT_ACT and
          port_req(16) = NOT_ACT and rd_state1 = NOT_ACT and
          rbsm_enable = ACT) then
          scan <= ACT;
      elsif (scan_vector(18) = ACT and ama_stat_rd = NOT_ACT and
          port_req(17) = NOT_ACT and rd_state1 = NOT_ACT and
          rbsm_enable = ACT) then
          scan <= ACT;
      elsif (scan_vector(19) = ACT and ama_stat_rd = NOT_ACT and
          port_req(17) = NOT_ACT and rd_state1 = NOT_ACT and
          rbsm_enable = ACT) then
          scan <= ACT;
      elsif (cont_scan = ACT and rbsm_enable = ACT) then
          scan <= ACT;
      else
          scan <= NOT_ACT;
      end if;


-- **************************************************************
-- Generate error : rbsm_error
-- **************************************************************

      if (reset = ACT) then
          error <= NOT_ACT;
      elsif (scan_vector(0) = ACT and ama_set(0) = NOT_ACT and
              rd_state1 = ACT and buffer_num_neq = ACT and
              rd_state0 = NOT_ACT) then
          error <= ACT;
      elsif (scan_vector(1) = ACT and ama_set(1) = NOT_ACT and
              rd_state1 = ACT and buffer_num_neq = ACT and
              rd_state0 = NOT_ACT) then
          error <= ACT;
      elsif (scan_vector(2) = ACT and ama_set(2) = NOT_ACT and
              rd_state1 = ACT and buffer_num_neq = ACT and
              rd_state0 = NOT_ACT) then
          error <= ACT;
      elsif (scan_vector(3) = ACT and ama_set(3) = NOT_ACT and
              rd_state1 = ACT and buffer_num_neq = ACT and
              rd_state0 = NOT_ACT) then
          error <= ACT;
      elsif (scan_vector(4) = ACT and ama_set(4) = NOT_ACT and
              rd_state1 = ACT and buffer_num_neq = ACT and
              rd_state0 = NOT_ACT) then
          error <= ACT;
      elsif (scan_vector(5) = ACT and ama_set(5) = NOT_ACT and
              rd_state1 = ACT and buffer_num_neq = ACT and
              rd_state0 = NOT_ACT) then
          error <= ACT;
      elsif (scan_vector(6) = ACT and ama_set(6) = NOT_ACT and
              rd_state1 = ACT and buffer_num_neq = ACT and
              rd_state0 = NOT_ACT) then
```

Aug 17 11:19 1994 Who: johnf File: /c2/local_user/bma/bma_rbsm/bma_rbsm_lib/rbsm_stat_control.vhd Page 7

```
            error <= ACT;
        elsif (scan_vector(7) = ACT and ama_set(7) = NOT_ACT and
                rd_state1 = ACT and buffer_num_neq = ACT and
                rd_state0 = NOT_ACT) then
            error <= ACT;
        elsif (scan_vector(8) = ACT and ama_set(8) = NOT_ACT and
                rd_state1 = ACT and buffer_num_neq = ACT and
                rd_state0 = NOT_ACT) then
            error <= ACT;
        elsif (scan_vector(9) = ACT and ama_set(9) = NOT_ACT and
                rd_state1 = ACT and buffer_num_neq = ACT and
                rd_state0 = NOT_ACT) then
            error <= ACT;
        elsif (scan_vector(10) = ACT and ama_set(10) = NOT_ACT and
                rd_state1 = ACT and buffer_num_neq = ACT and
                rd_state0 = NOT_ACT) then
            error <= ACT;
        elsif (scan_vector(11) = ACT and ama_set(11) = NOT_ACT and
                rd_state1 = ACT and buffer_num_neq = ACT and
                rd_state0 = NOT_ACT) then
            error <= ACT;
        elsif (scan_vector(12) = ACT and ama_set(12) = NOT_ACT and
                rd_state1 = ACT and buffer_num_neq = ACT and
                rd_state0 = NOT_ACT) then
            error <= ACT;
        elsif (scan_vector(13) = ACT and ama_set(13) = NOT_ACT and
                rd_state1 = ACT and buffer_num_neq = ACT and
                rd_state0 = NOT_ACT) then
            error <= ACT;
        elsif (scan_vector(14) = ACT and ama_set(14) = NOT_ACT and
                rd_state1 = ACT and buffer_num_neq = ACT and
                rd_state0 = NOT_ACT) then
            error <= ACT;
        elsif (scan_vector(15) = ACT and ama_set(15) = NOT_ACT and
                rd_state1 = ACT and buffer_num_neq = ACT and
                rd_state0 = NOT_ACT) then
            error <= ACT;
        elsif (scan_vector(16) = ACT and ama_set(16) = NOT_ACT and
                rd_state1 = ACT and buffer_num_neq = ACT and
                rd_state0 = NOT_ACT and not_first(0) = NOT_ACT) then
            error <= ACT;
        elsif (scan_vector(17) = ACT and ama_set(16) = NOT_ACT and
                rd_state1 = ACT and buffer_num_neq = ACT and
                rd_state0 = NOT_ACT and not_first(0) = NOT_ACT) then
            error <= ACT;
        elsif (scan_vector(18) = ACT and ama_set(17) = NOT_ACT and
                rd_state1 = ACT and buffer_num_neq = ACT and
                rd_state0 = NOT_ACT and not_first(1) = NOT_ACT) then
            error <= ACT;
        elsif (scan_vector(19) = ACT and ama_set(17) = NOT_ACT and
                rd_state1 = ACT and buffer_num_neq = ACT and
                rd_state0 = NOT_ACT and not_first(1) = NOT_ACT) then
            error <= ACT;
        elsif (rbsm_error = ACT and reset = NOT_ACT) then
            error <= ACT;
        else
            error <= NOT_ACT;
        end if;
```

Aug 17 11:19 1994 Who: johnf File: /c2/local_user/bma/bma_rbsm/bma_rbsm_lib/rbsm_stat_control.vhd Page 8

```
-- ************************************************************
-- Generate rx_rd : rx_stat_rd
-- ************************************************************

        if (reset = ACT) then
            rx_rd  <= NOT_ACT ;
        elsif (rx_stat_rq = ACT and rx_stat_rd = NOT_ACT and
                rd_state0 = NOT_ACT and rd_state1 = NOT_ACT) then
            rx_rd  <= ACT ;
        elsif (rx_stat_rq = ACT and rd_state0 = ACT and
                rd_state1 = NOT_ACT and rx_stat_rd = NOT_ACT) then
            rx_rd  <= ACT ;
        else
            rx_rd <= NOT_ACT ;
        end if;



-- ************************************************************
-- Generate cnt_scan1 : cont_scan1
--
-- Ethernet Non-filtered frames : Cut Thru frame : AMA status
-- only portion.
--
-- Write AMA status and code vector to SRAM.
-- ************************************************************

        if (reset = ACT) then
            cnt_scan1  <= NOT_ACT ;
        elsif (ama_set(0) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(1) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(2) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(3) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(4) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(5) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(6) = ACT and filter_frame = NOT_ACT and
                sram_rdy = ACT and cut_thru_begin = ACT and
                cont_scan1 = NOT_ACT) then
```

```
Aug 17 11:19 1994  Who  johnf  File  /c2/local_user/bma/bma_rbsm/bma_rbsm_lib/rbsm_stat_control.vhd Page 9

            cnt_scan1  <= ACT ;
        elsif (ama_set(7) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(8) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(9) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(10) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(11) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(12) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(13) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(14) = ACT and filter_frame = NOT_ACT and
                sram_rdy = ACT and cut_thru_begin = ACT and
                cont_scan1 = NOT_ACT) then
            cnt_scan1  <= ACT ;
        elsif (ama_set(15) = ACT and filter_frame = NOT_ACT and
                sram_rdy = ACT and cut_thru_begin = ACT and
                cont_scan1 = NOT_ACT) then
            cnt_scan1  <= ACT ;
        else
            cnt_scan1 <= NOT_ACT ;
        end if;

-- ************************************************************
-- Generate cnt_scan2 : cont_scan2
--
-- Ethernet Non-filtered frames : Cut Thru frame or Normal
-- AMA and Receive status available.
--
-- Write code vector to SRAM and update byte count
-- ************************************************************

        if (reset = ACT) then
            cnt_scan2  <= NOT_ACT ;
        elsif (ama_sel(0) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(0) = ACT and cont_scan2 = NOT_ACT and
                ethernet_rx_error = NOT_ACT and discard_frame = NOT_ACT) then
            cnt_scan2  <= ACT ;
        elsif (ama_set(1) = NOT_ACT and filter_frame = NOT_ACT and
                sram_rdy = ACT and rd_state0 = ACT and rd_state1 = ACT and enet_abort = NOT_ACT and

Aug 17 11:19 1994  Who: johnf  File: /c2/local_user/bma/bma_rbsm/bma_rbsm_lib/rbsm_stat_control.vhd Page 10

                stat_rdy = ACT and scan_vector(1) = ACT and cont_scan2 = NOT_ACT and
                ethernet_rx_error = NOT_ACT and discard_frame = NOT_ACT) then
            cnt_scan2  <= ACT ;
        elsif (ama_sel(2) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(2) = ACT and cont_scan2 = NOT_ACT and
                ethernet_rx_error = NOT_ACT and discard_frame = NOT_ACT) then
            cnt_scan2  <= ACT ;
        elsif (ama_set(3) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(3) = ACT and cont_scan2 = NOT_ACT and
                ethernet_rx_error = NOT_ACT and discard_frame = NOT_ACT) then
            cnt_scan2  <= ACT ;
        elsif (ama_set(4) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(4) = ACT and cont_scan2 = NOT_ACT and
                ethernet_rx_error = NOT_ACT and discard_frame = NOT_ACT) then
            cnt_scan2  <= ACT ;
        elsif (ama_set(5) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(5) = ACT and cont_scan2 = NOT_ACT and
                ethernet_rx_error = NOT_ACT and discard_frame = NOT_ACT) then
            cnt_scan2  <= ACT ;
        elsif (ama_sel(6) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(6) = ACT and cont_scan2 = NOT_ACT and
                ethernet_rx_error = NOT_ACT and discard_frame = NOT_ACT) then
            cnt_scan2  <= ACT ;
        elsif (ama_sel(7) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(7) = ACT and cont_scan2 = NOT_ACT and
                ethernet_rx_error = NOT_ACT and discard_frame = NOT_ACT) then
            cnt_scan2  <= ACT ;
        elsif (ama_set(8) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(8) = ACT and cont_scan2 = NOT_ACT and
                ethernet_rx_error = NOT_ACT and discard_frame = NOT_ACT) then
            cnt_scan2  <= ACT ;
        elsif (ama_set(9) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(9) = ACT and cont_scan2 = NOT_ACT and
                ethernet_rx_error = NOT_ACT and discard_frame = NOT_ACT) then
            cnt_scan2  <= ACT ;
        elsif (ama_set(10) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(10) = ACT and cont_scan2 = NOT_ACT and
                ethernet_rx_error = NOT_ACT and discard_frame = NOT_ACT) then
            cnt_scan2  <= ACT ;
        elsif (ama_set(11) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(11) = ACT and cont_scan2 = NOT_ACT and
                ethernet_rx_error = NOT_ACT and discard_frame = NOT_ACT) then
            cnt_scan2  <= ACT ;
        elsif (ama_set(12) = NOT_ACT and filter_frame = NOT_ACT and
                sram_rdy = ACT and rd_state0 = ACT and rd_state1 = ACT and enet_abort = NOT_ACT and
                stat_rdy = ACT and scan_vector(12) = ACT and cont_scan2 = NOT_ACT and
                ethernet_rx_error = NOT_ACT and discard_frame = NOT_ACT) then
            cnt_scan2  <= ACT ;
        elsif (ama_set(13) = NOT_ACT and filter_frame = NOT_ACT and
                sram_rdy = ACT and rd_state0 = ACT and rd_state1 = ACT and enet_abort = NOT_ACT and
```

Aug 17 11:19 1994 Who: johnf File: /c2/local_user/bma/bma_rbsm/bma_rbsm_lib/rbsm_stat_control.vhd Page 11

```
            stat_rdy = ACT and scan_vector(13) = ACT and cont_scan2 = NOT_ACT and
            ethernet_rx_error = NOT_ACT and discard_frame = NOT_ACT) then
        cnt_scan2  <= ACT ;
    elsif (ama_set(14) = NOT_ACT and filter_frame = NOT_ACT and
            sram_rdy = ACT and rd_state0 = ACT and rd_state1 = ACT and enet_abort = NOT_ACT and
            stat_rdy = ACT and scan_vector(14) = ACT and cont_scan2 = NOT_ACT and
            ethernet_rx_error = NOT_ACT and discard_frame = NOT_ACT) then
        cnt_scan2  <= ACT ;
    elsif (ama_set(15) = NOT_ACT and filter_frame = NOT_ACT and
            sram_rdy = ACT and rd_state0 = ACT and rd_state1 = ACT and enet_abort = NOT_ACT and
            stat_rdy = ACT and scan_vector(15) = ACT and cont_scan2 = NOT_ACT and
            ethernet_rx_error = NOT_ACT and discard_frame = NOT_ACT) then
        cnt_scan2  <= ACT ;
    else
        cnt_scan2 <= NOT_ACT
    end if;

-- **************************************************************
-- Generate cnt_scan3 : cont_scan3
--
-- Ethernet Filtered frames : Cut Thru frame : AMA status
-- only portion
--
-- Do nothing until Receive status arrives
-- **************************************************************

    if (reset = ACT) then
        cnt_scan3  <= NOT_ACT ;
    elsif (ama_set(0) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(1) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(2) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(3) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(4) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(5) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(6) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(7) = ACT and (filter_frame = ACT or
            cut_thru_begin = NOT_ACT) and delay_one_clock = ACT and
```

Aug 17 11:19 1994 Who: johnf File: /c2/local_user/bma/bma_rbsm/bma_rbsm_lib/rbsm_stat_control.vhd Page 12

```
            cont_scan3 = NOT_ACT) then
        cnt_scan3  <= ACT ;
    elsif (ama_set(8) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(9) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(10) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(11) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(12) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(13) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(14) = ACT and (filter_frame = ACT or
            cut_thru_begin = NOT_ACT) and delay_one_clock = ACT and
            cont_scan3 = NOT_ACT) then
        cnt_scan3  <= ACT ;
    elsif (ama_set(15) = ACT and (filter_frame = ACT or
            cut_thru_begin = NOT_ACT) and delay_one_clock = ACT and
            cont_scan3 = NOT_ACT) then
        cnt_scan3  <= ACT ;
    else
        cnt_scan3 <= NOT_ACT ;
    end if;

-- **************************************************************
-- Generate cnt_scan4 : cont_scan4
--
-- Ethernet Filtered frames or receive path disabled frames:
-- AMA and Receive status available.
--
-- Return buffer number and update byte count and filtered
-- frame count.
-- **************************************************************

    if (reset = ACT) then
        cnt_scan4  <= NOT_ACT ;
    elsif (scan_vector(0) = ACT and ama_set(0) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(1) = ACT and ama_set(1) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
```

```
Aug 17 11:19 1994  Who: johnf  File  /c2/local user/bma/bma_rbsm/bma_rbsm lib/rbsm_stat control.vhd Page 13

        cnt scan4  <= ACT
    elsif (scan vector(2) = ACT and ama set(2) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(3) = ACT and ama_set(3) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(4) = ACT and ama_set(4) = NOT_ACT and
            bufq_rdy = ACT and rd_state0 = ACT and rd_state1 = ACT and enet_abort = NOT_ACT and
            stat_rdy = ACT and cont scan4 = NOT_ACT and ethernet_rx_error = NOT_ACT and
            discard_frame = ACT) then
        cnt_scan4  <= ACT ;
    elsif (scan_vector(5) = ACT and ama_set(5) = NOT_ACT and
            bufq_rdy = ACT and rd state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(6) = ACT and ama_set(6) = NOT_ACT and
            bufq_rdy = ACT and rd_state0 = ACT and rd_state1 = ACT and enet_abort = NOT ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(7) = ACT and ama_set(7) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(8) = ACT and ama_set(8) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(9) = ACT and ama_set(9) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(10) = ACT and ama_set(10) = NOT_ACT and
            bufq_rdy = ACT and rd_state0 = ACT and rd_state1 = ACT and enet_abort = NOT_ACT and
            stat_rdy = ACT and cont scan4 = NOT_ACT and ethernet_rx_error = NOT_ACT and
            discard_frame = ACT) then
        cnt_scan4  <= ACT ;
    elsif (scan_vector(11) = ACT and ama_set(11) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(12) = ACT and ama_set(12) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(13) = ACT and ama_set(13) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
```

```
Aug 17 11:19 1994  Who: johnf  File: /c2/local_user/bma/bma_rbsm/bma_rbsm_lib/rbsm_stat_control.vhd Page 14

        cnt_scan4  <= ACT ;
    elsif (scan_vector(14) = ACT and ama_set(14) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    elsif (scan_vector(15) = ACT and ama_set(15) = NOT_ACT and
            bufq_rdy = ACT and rd_state0 = ACT and rd_state1 = ACT and enet_abort = NOT_ACT and
            stat_rdy = ACT and cont_scan4 = NOT_ACT and ethernet_rx_error = NOT_ACT and
            discard_frame = ACT) then
        cnt_scan4  <= ACT ;
    else
        cnt_scan4 <= NOT_ACT ;
    end if;

-- ***********************************************************
-- Generate cnt_scan6 : cont_scan6
--
-- Ethernet Errored Frames:
-- AMA and Receive status available.
--
-- Write code vector to SRAM and update frame
-- byte count stat.
--
-- ***********************************************************

    if (reset = ACT) then
        cnt_scan6 <= NOT_ACT ;
    elsif (scan_vector(0) = ACT and ama_set(0) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(1) = ACT and ama_set(1) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(2) = ACT and ama_set(2) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(3) = ACT and ama_set(3) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(4) = ACT and ama_set(4) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(5) = ACT and ama_set(5) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(6) = ACT and ama_set(6) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(7) = ACT and ama_set(7) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
```

Aug 17 11:19 1994 Who: johnf File: /c2/local_user/bma/bma_rbsm/bma_rbsm_lib/rbsm_stat_control.vhd Page 15

```
        cnt_scan6 <= ACT ;
    elsif (scan_vector(8) = ACT and ama_set(8) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(9) = ACT and ama_set(9) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(10) = ACT and ama_set(10) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(11) = ACT and ama_set(11) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(12) = ACT and ama_set(12) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(13) = ACT and ama_set(13) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(14) = ACT and ama_set(14) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    elsif (scan_vector(15) = ACT and ama_set(15) = NOT_ACT and ethernet_rx_error = ACT and
            sram_rdy = ACT and rd_state0 = ACT and rd_state1 = ACT and enet_abort = NOT_ACT and
            stat_rdy = ACT and cont_scan6 = NOT_ACT) then
        cnt_scan6 <= ACT ;
    else
        cnt_scan6 <= NOT_ACT ;
    end if ;



-- ************************************************************
-- Generate cnt_scan7 : cont_scan7
--
-- Ethernet PUNTED Frames:
-- AMA and Receive status available
--
-- Return the buffer
--
-- ************************************************************

    if (reset = ACT) then
        cnt_scan7 <= NOT_ACT ;
    elsif (scan_vector(0) = ACT and ama_set(0) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(1) = ACT and ama_set(1) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
```

Aug 17 11:19 1994 Who: johnf File: /c2/local_user/bma/bma_rbsm/bma_rbsm_lib/rbsm_stat_control.vhd Page 16

```
    elsif (scan_vector(2) = ACT and ama_set(2) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(3) = ACT and ama_set(3) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(4) = ACT and ama_set(4) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(5) = ACT and ama_set(5) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(6) = ACT and ama_set(6) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(7) = ACT and ama_set(7) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(8) = ACT and ama_set(8) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(9) = ACT and ama_set(9) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(10) = ACT and ama_set(10) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(11) = ACT and ama_set(11) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(12) = ACT and ama_set(12) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(13) = ACT and ama_set(13) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(14) = ACT and ama_set(14) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    elsif (scan_vector(15) = ACT and ama_set(15) = NOT_ACT and
            bufq_rdy = ACT and rd_state0 = ACT and rd_state1 = ACT and
            enet_abort = ACT and cont_scan7 = NOT_ACT) then
        cnt_scan7 <= ACT ;
    else
        cnt_scan7 <= NOT_ACT ;
    end if ;
```

```
-- ************************************************************
-- Generate cnt_scan5 : cont_scan5
--
-- FDDI frames : All cases :
-- ************************************************************

    if (reset = ACT) then
        cnt_scan5  <= NOT_ACT ;
    elsif (fddi_abort = NOT_ACT and discard_frame = NOT_ACT and       -- Uni-buffer or Multi buffer
           scan_vector(16) = ACT and rx_end_of_buffer = NOT_ACT and   -- Normal Frame EOF
           sram_rdy = ACT and stat_rdy = ACT and rd_state0 = ACT and  -- Write code vector and
           rd_state1 = ACT and cont_scan5 = NOT_ACT and               -- update byte count
           fddi_rx_error = NOT_ACT) then
        cnt_scan5  <= ACT ;
    elsif (fddi_abort = NOT_ACT and discard_frame = NOT_ACT and
           scan_vector(17) = ACT and rx_end_of_buffer = NOT_ACT and
           sram_rdy = ACT and stat_rdy = ACT and rd_state0 = ACT and
           rd_state1 = ACT and cont_scan5 = NOT_ACT and
           fddi_rx_error = NOT_ACT) then
        cnt_scan5  <= ACT ;
    elsif (fddi_abort = NOT_ACT and discard_frame = NOT_ACT and
           scan_vector(18) = ACT and rx_end_of_buffer = NOT_ACT and
           sram_rdy = ACT and stat_rdy = ACT and rd_state0 = ACT and
           rd_state1 = ACT and cont_scan5 = NOT_ACT and
           fddi_rx_error = NOT_ACT) then
        cnt_scan5  <= ACT ;
    elsif (fddi_abort = NOT_ACT and discard_frame = NOT_ACT and
           scan_vector(19) = ACT and rx_end_of_buffer = NOT_ACT and
           sram_rdy = ACT and stat_rdy = ACT and rd_state0 = ACT and
           rd_state1 = ACT and cont_scan5 = NOT_ACT and
           fddi_rx_error = NOT_ACT) then
        cnt_scan5  <= ACT ;

--

    elsif ((filter_frame = NOT_ACT or                                 -- Multi buffer EOB
          (filter_frame = ACT and rx_monitor_on = ACT)) and           -- Write code vector only
           scan_vector(16) = ACT and rx_end_of_buffer = ACT and       -- Normal Frame
           sram_rdy = ACT and rd_state0 = ACT and
           rd_state1 = ACT and cont_scan5 = NOT_ACT) then
        cnt_scan5  <= ACT ;
    elsif ((filter_frame = NOT_ACT or                                 --
          (filter_frame = ACT and rx_monitor_on = ACT)) and
           scan_vector(17) = ACT and rx_end_of_buffer = ACT and
           sram_rdy = ACT and rd_state0 = ACT and
           rd_state1 = ACT and cont_scan5 = NOT_ACT)  then
        cnt_scan5  <= ACT ;
    elsif ((filter_frame = NOT_ACT or                                 --
          (filter_frame = ACT and rx_monitor_on = ACT)) and
           scan_vector(18) = ACT and rx_end_of_buffer = ACT and
           sram_rdy = ACT and rd_state0 = ACT and
           rd_state1 = ACT and cont_scan5 = NOT_ACT) then
        cnt_scan5  <= ACT ;
    elsif ((filter_frame = NOT_ACT or                                 --
          (filter_frame = ACT and rx_monitor_on = ACT)) and
           scan_vector(18) = ACT and rx_end_of_buffer = ACT and
           sram_rdy = ACT and rd_state0 = ACT and
```

```
           rd_state1 = ACT and cont_scan5 = NOT_ACT) then
        cnt_scan5  <= ACT ;

--

    elsif (fddi_abort = NOT_ACT and discard_frame = ACT and           -- Uni-buffered
           scan_vector(16) = ACT and rx_end_of_buffer = NOT_ACT and   -- Filtered Frame EOF
           bufq_rdy = ACT and stat_rdy = ACT and rd_state0 = ACT and  -- Return buffer number
           rd_state1 = ACT and cont_scan5 = NOT_ACT and               -- update byte count and
           fddi_rx_error = NOT_ACT and not_first(0) = NOT_ACT) then   -- filtered frame count
        cnt_scan5  <= ACT ;
    elsif (fddi_abort = NOT_ACT and discard_frame = ACT and
           scan_vector(17) = ACT and rx_end_of_buffer = NOT_ACT and
           bufq_rdy = ACT and stat_rdy = ACT and rd_state0 = ACT and
           rd_state1 = ACT and cont_scan5 = NOT_ACT and
           fddi_rx_error = NOT_ACT and not_first(0) = NOT_ACT) then
        cnt_scan5  <= ACT ;
    elsif (fddi_abort = NOT_ACT and discard_frame = ACT and
           scan_vector(18) = ACT and rx_end_of_buffer = NOT_ACT and
           bufq_rdy = ACT and stat_rdy = ACT and rd_state0 = ACT and
           rd_state1 = ACT and cont_scan5 = NOT_ACT and
           fddi_rx_error = NOT_ACT and not_first(1) = NOT_ACT) then
        cnt_scan5  <= ACT ;
    elsif (fddi_abort = NOT_ACT and discard_frame = ACT and
           scan_vector(19) = ACT and rx_end_of_buffer = NOT_ACT and
           bufq_rdy = ACT and stat_rdy = ACT and rd_state0 = ACT and
           rd_state1 = ACT and cont_scan5 = NOT_ACT and
           fddi_rx_error = NOT_ACT and not_first(1) = NOT_ACT) then
        cnt_scan5  <= ACT ;

--

    elsif (filter_frame = ACT and rx_monitor_on = NOT_ACT and         -- Multi buffer
           scan_vector(16) = ACT and rx_end_of_buffer = ACT and       -- Filtered Frame (EOB)
           bufq_rdy = ACT and rd_state0 = ACT and                     -- Return buffer number
           rd_state1 = ACT and cont_scan5 = NOT_ACT) then
        cnt_scan5  <= ACT ;
    elsif (filter_frame = ACT and rx_monitor_on = NOT_ACT and
           scan_vector(17) = ACT and rx_end_of_buffer = ACT and
           bufq_rdy = ACT and rd_state0 = ACT and
           rd_state1 = ACT and cont_scan5 = NOT_ACT)  then
        cnt_scan5  <= ACT ;
    elsif (filter_frame = ACT and rx_monitor_on = NOT_ACT and
           scan_vector(18) = ACT and rx_end_of_buffer = ACT and
           bufq_rdy = ACT and rd_state0 = ACT and
           rd_state1 = ACT and cont_scan5 = NOT_ACT) then
        cnt_scan5  <= ACT ;
    elsif (filter_frame = ACT and rx_monitor_on = NOT_ACT and
           scan_vector(18) = ACT and rx_end_of_buffer = ACT and
           bufq_rdy = ACT and rd_state0 = ACT and
           rd_state1 = ACT and cont_scan5 = NOT_ACT) then
        cnt_scan5  <= ACT ;

--

    elsif (fddi_abort = ACT and filter_frame = NOT_ACT and            -- Multi buffer
           scan_vector(18) = ACT and rx_end_of_buffer = NOT_ACT and   -- Non Filtered Frame (EOF)
           sram_rdy = ACT and rd_state0 = ACT and                     -- Aborted Frame
           rd_state1 = ACT and cont_scan5 = NOT_ACT and               -- Write code vector and
           not_first(0) = ACT and bufq_rdy = ACT) then                -- AMA status
```

Aug 17 11:19 1994 Who: johnf File: /c2/local_user/bma/bma_rbsm/bma_rbsm_lib/rbsm_stat_control.vhd Page 19

```
        cnt_scan5  <= ACT ;                                              -- Return Buffer number
    elsif (fddi_abort = ACT and filter_frame = NOT_ACT and
            scan_vector(17) = ACT and rx_end_of_buffer = NOT_ACT and
            sram_rdy = ACT and rd_state0 = ACT and
            rd_state1 = ACT and cont_scan5 = NOT_ACT and
            not_first(0) = ACT and bufq_rdy = ACT) then
        cnt_scan5  <= ACT ;
    elsif (fddi_abort = ACT and filter_frame = NOT_ACT and
            scan_vector(18) = ACT and rx_end_of_buffer = NOT_ACT and
            sram_rdy = ACT and rd_state0 = ACT and
            rd_state1 = ACT and cont_scan5 = NOT_ACT and
            not_first(1) = ACT and bufq_rdy = ACT) then
        cnt_scan5  <= ACT ;
    elsif (fddi_abort = ACT and filter_frame = NOT_ACT and
            scan_vector(19) = ACT and rx_end_of_buffer = NOT_ACT and
            sram_rdy = ACT and rd_state0 = ACT and
            rd_state1 = ACT and cont_scan5 = NOT_ACT and
            not_first(1) = ACT and bufq_rdy = ACT) then
        cnt_scan5  <= ACT ;

--

    elsif (fddi_abort = NOT_ACT and fddi_rx_error = NOT_ACT and       -- Multi buffer
            scan_vector(16) = ACT and rx_end_of_buffer = NOT_ACT and  -- Filtered Frame (EOF)
            bufq_rdy = ACT and rd_state0 = ACT and                    -- Return Buffer
            rd_state1 = ACT and cont_scan5 = NOT_ACT and              -- Update stats
            filter_frame = ACT and rx_monitor_on = NOT_ACT and
            stat_rdy = ACT and not_first(0) = ACT) then
        cnt_scan5  <= ACT ;
    elsif (fddi_abort = NOT_ACT and fddi_rx_error = NOT_ACT and
            scan_vector(17) = ACT and rx_end_of_buffer = NOT_ACT and
            bufq_rdy = ACT and rd_state0 = ACT and
            rd_state1 = ACT and cont_scan5 = NOT_ACT and
            filter_frame = ACT and rx_monitor_on = NOT_ACT and
            stat_rdy = ACT and not_first(0) = ACT) then
        cnt_scan5  <= ACT ;
    elsif (fddi_abort = NOT_ACT and fddi_rx_error = NOT_ACT and
            scan_vector(18) = ACT and rx_end_of_buffer = NOT_ACT and
            bufq_rdy = ACT and rd_state0 = ACT and
            rd_state1 = ACT and cont_scan5 = NOT_ACT and
            filter_frame = ACT and rx_monitor_on = NOT_ACT and
            stat_rdy = ACT and not_first(1) = ACT) then
        cnt_scan5  <= ACT ;
    elsif (fddi_abort = NOT_ACT and fddi_rx_error = NOT_ACT and
            scan_vector(19) = ACT and rx_end_of_buffer = NOT_ACT and
            bufq_rdy = ACT and rd_state0 = ACT and
            rd_state1 = ACT and cont_scan5 = NOT_ACT and
            filter_frame = ACT and rx_monitor_on = NOT_ACT and
            stat_rdy = ACT and not_first(1) = ACT) then
        cnt_scan5  <= ACT ;

--

    elsif (scan_vector(16) = ACT and cont_scan5 = NOT_ACT and                -- Multi buffer
            fddi_abort = NOT_ACT and fddi_rx_error = NOT_ACT and             -- Discarded Frame
            rd_state0 = ACT and sram_rdy = ACT and bufq_rdy = ACT and        -- NOT FILTERED
            rd_state1 = ACT and stat_rdy = ACT and                           -- Return Buffer
            filter_frame = NOT_ACT and
            discard_frame = ACT and not_first(0) = ACT) then                 -- Update byte count
        cnt_scan5  <= ACT ;                                                  -- write code vector
```

Aug 17 11:19 1994 Who: johnf File: /c2/local_user/bma/bma_rbsm/bma_rbsm_lib/rbsm_stat_control.vhd Page 20

```
    elsif (scan_vector(17) = ACT and cont_scan5 = NOT_ACT and
            fddi_abort = NOT_ACT and fddi_rx_error = NOT_ACT and
            rd_state0 = ACT and sram_rdy = ACT and bufq_rdy = ACT and
            rd_state1 = ACT and stat_rdy = ACT and
            filter_frame = NOT_ACT and
            discard_frame = ACT and not_first(0) = ACT) then
        cnt_scan5  <= ACT ;
    elsif (scan_vector(18) = ACT and cont_scan5 = NOT_ACT and
            fddi_abort = NOT_ACT and fddi_rx_error = NOT_ACT and
            rd_state0 = ACT and sram_rdy = ACT and bufq_rdy = ACT and
            rd_state1 = ACT and stat_rdy = ACT and
            filter_frame = NOT_ACT and
            discard_frame = ACT and not_first(1) = ACT) then
        cnt_scan5  <= ACT ;
    elsif (scan_vector(19) = ACT and cont_scan5 = NOT_ACT and
            fddi_abort = NOT_ACT and fddi_rx_error = NOT_ACT and
            rd_state0 = ACT and sram_rdy = ACT and bufq_rdy = ACT and
            rd_state1 = ACT and stat_rdy = ACT and
            filter_frame = NOT_ACT and
            discard_frame = ACT and not_first(1) = ACT) then
        cnt_scan5  <= ACT ;

--

    elsif (fddi_abort = ACT and                                          -- Uni buffer
            scan_vector(16) = ACT and rx_end_of_buffer = NOT_ACT and     -- Aborted Frame
            rd_state0 = ACT and bufq_rdy = ACT and                       -- Return Buffer Number
            rd_state1 = ACT and cont_scan5 = NOT_ACT and
            not_first(0) = NOT_ACT) then
        cnt_scan5  <= ACT ;
    elsif (fddi_abort = ACT and
            scan_vector(17) = ACT and rx_end_of_buffer = NOT_ACT and
            rd_state0 = ACT and bufq_rdy = ACT and
            rd_state1 = ACT and cont_scan5 = NOT_ACT and
            not_first(0) = NOT_ACT) then
        cnt_scan5  <= ACT ;
    elsif (fddi_abort = ACT and
            scan_vector(18) = ACT and rx_end_of_buffer = NOT_ACT and
            rd_state0 = ACT and bufq_rdy = ACT and
            rd_state1 = ACT and cont_scan5 = NOT_ACT and
            not_first(1) = NOT_ACT) then
        cnt_scan5  <= ACT ;
    elsif (fddi_abort = ACT and
            scan_vector(19) = ACT and rx_end_of_buffer = NOT_ACT and
            rd_state0 = ACT and bufq_rdy = ACT and
            rd_state1 = ACT and cont_scan5 = NOT_ACT and
            not_first(1) = NOT_ACT) then
        cnt_scan5  <= ACT ;


    elsif (fddi_abort = ACT and filter_frame = ACT and                   -- Multi buffered (EOF)
            scan_vector(16) = ACT and rx_end_of_buffer = NOT_ACT and     -- Aborted and Filtered
            rd_state0 = ACT and rx_monitor_on = NOT_ACT and              -- Frame
            rd_state1 = ACT and cont_scan5 = NOT_ACT and                 -- Return Buffer Number
            not_first(0) = ACT and bufq_rdy = ACT) then
        cnt_scan5  <= ACT ;
    elsif (fddi_abort = ACT and filter_frame = ACT and
```

Aug 17 11:19 1994 Who: johnf File: /c2/local_user/bma/bma_rbsm/bma_rbsm_lib/rbsm_stat_control.vhd Page 21

```
              scan_vector(17) = ACT and rx_end_of_buffer = NOT_ACT and
              rd_state0 = ACT and rx_monitor_on = NOT_ACT and
              rd_state1 = ACT and cont_scan5 = NOT_ACT and
              not_first(0) = ACT and bufq_rdy = ACT) then
          cnt_scan5  <= ACT ;
      elsif (fddi_abort = ACT and filter_frame = ACT and
              scan_vector(18) = ACT and rx_end_of_buffer = NOT_ACT and
              rd_state0 = ACT and rx_monitor_on = NOT_ACT and
              rd_state1 = ACT and cont_scan5 = NOT_ACT and
              not_first(1) = ACT and bufq_rdy = ACT) then
          cnt_scan5  <= ACT ;
      elsif (fddi_abort = ACT and filter_frame = ACT and
              scan_vector(19) = ACT and rx_end_of_buffer = NOT_ACT and
              rd_state0 = ACT and rx_monitor_on = NOT_ACT and
              rd_state1 = ACT and cont_scan5 = NOT_ACT and
              not_first(1) = ACT and bufq_rdy = ACT) then
          cnt_scan5  <= ACT ;

--

      elsif (fddi_abort = NOT_ACT and fddi_rx_error = ACT and          -- Uni buffered or multi-buffered
              scan_vector(16) = ACT and                                  -- Errored Frame
              rd_state0 = ACT and sram_rdy = ACT and                     -- Write code vector
              rx_end_of_buffer = NOT_ACT and stat_rdy = ACT and          -- update byte count
              rd_state1 = ACT and cont_scan5 = NOT_ACT) then
          cnt_scan5  <= ACT ;
      elsif (fddi_abort = NOT_ACT and fddi_rx_error = ACT and
              scan_vector(17) = ACT and
              rd_state0 = ACT and sram_rdy = ACT and
              rx_end_of_buffer = NOT_ACT and stat_rdy = ACT and
              rd_state1 = ACT and cont_scan5 = NOT_ACT) then
          cnt_scan5  <= ACT ;
      elsif (fddi_abort = NOT_ACT and fddi_rx_error = ACT and
              scan_vector(18) = ACT and
              rd_state0 = ACT and sram_rdy = ACT and
              rx_end_of_buffer = NOT_ACT and stat_rdy = ACT and
              rd_state1 = ACT and cont_scan5 = NOT_ACT) then
          cnt_scan5  <= ACT ;
      elsif (fddi_abort = NOT_ACT and fddi_rx_error = ACT and
              scan_vector(19) = ACT and
              rd_state0 = ACT and sram_rdy = ACT and
              rx_end_of_buffer = NOT_ACT and stat_rdy = ACT and
              rd_state1 = ACT and cont_scan5 = NOT_ACT) then
          cnt_scan5  <= ACT ;

--

      else
          cnt_scan5 <= NOT_ACT ;
      end if;


-- ************************************************************
-- Generate ama_rd3 : ama_stat_rd3
-- ************************************************************

      if (reset = ACT) then
          ama_rd3  <= NOT_ACT ;
      elsif (ama_stat_rd2 = ACT) then
          ama_rd3  <= ACT ;
```

Aug 17 11:19 1994 Who: johnf File: /c2/local_user/bma/bma_rbsm/bma_rbsm_lib/rbsm_stat_control.vhd Page 22

```
      else
          ama_rd3 <= NOT_ACT ;
      end if;


-- ************************************************************
-- Generate ama_rd2 : ama_stat_rd2
-- ************************************************************

      if (reset = ACT) then
          ama_rd2  <= NOT_ACT ;
      elsif (ama_stat_rd1 = ACT) then
          ama_rd2  <= ACT ;
      else
          ama_rd2 <= NOT_ACT ;
      end if;


-- ************************************************************
-- Generate ama_rd1 : ama_stat_rd1
-- ************************************************************

      if (reset = ACT) then
          ama_rd1  <= NOT_ACT ;
      elsif (ama_stat_rq = ACT and rd_state0 = NOT_ACT and
              rd_state1 = NOT_ACT and ama_stat_rd1 = NOT_ACT) then
          ama_rd1  <= ACT ;
      else
          ama_rd1 <= NOT_ACT ;
      end if;


-- ************************************************************
-- Generate ama_rd : ama_stat_rd
-- ************************************************************

      if (reset = ACT) then
          ama_rd  <= NOT_ACT ;
      elsif (ama_stat_rq = ACT and rd_state0 = NOT_ACT and
              rd_state1 = NOT_ACT) then
          ama_rd  <= ACT ;
      elsif (ama_stat_rd = ACT and rd_state0 = ACT and
              rd_state1 = NOT_ACT) then
          ama_rd  <= ACT ;
      else
          ama_rd <= NOT_ACT ;
      end if;

-- ************************************************************
-- Generate state0 : rd_state0
-- ************************************************************

      if (reset = ACT) then
          state0  <= NOT_ACT ;
      elsif (ama_stat_rd = ACT and rd_state0 = NOT_ACT) then
          state0  <= ACT ;
```

Aug 17 11:19 1994 Who: johnf File: /c2/local_user/bma/bma_rbsm/bma_rbsm_lib/rbsm_stat_control.vhd Page 23

```
        elsif (rd_state0 = ACT and rd_state1 = ACT and
                cont_scan = NOT_ACT) then
            state0  <= ACT ;
        else
            state0 <= NOT_ACT ;
        end if;


-- ============================================================
-- Generate state1 : rd_state1
-- ============================================================

        if (reset = ACT) then
            state1  <= NOT_ACT ;
        elsif (rd_state0 = ACT and rd_state1 = NOT_ACT) then
            state1  <= ACT ;
        elsif (rd_state1 = ACT and cont_scan = NOT_ACT) then
            state1  <= ACT ;
        else
            state1 <= NOT_ACT ;
        end if;


-- ============================================================
-- Generate ama_next : ama_status_next
-- ============================================================

        if (reset = ACT) then
            ama_next  <= NOT_ACT ;
        elsif (rx_end_of_buffer = NOT ACT and ama_set(0) = NOT_ACT and
                rd_state0 = ACT and rd_state1 = NOT_ACT and
                scan_vector(0) = ACT ) then
            ama_next  <= ACT ;
        elsif (rx_end_of_buffer = NOT_ACT and ama_set(1) = NOT_ACT and
                rd_state0 = ACT and rd_state1 = NOT_ACT and
                scan_vector(1) = ACT ) then
            ama_next  <= ACT ;
        elsif (rx_end_of_buffer = NOT_ACT and ama_set(2) = NOT_ACT and
                rd_state0 = ACT and rd_state1 = NOT_ACT and
                scan_vector(2) = ACT ) then
            ama_next  <= ACT ;
        elsif (rx_end_of_buffer = NOT_ACT and ama_set(3) = NOT_ACT and
                rd_state0 = ACT and rd_state1 = NOT_ACT and
                scan_vector(3) = ACT ) then
            ama_next  <= ACT ;
        elsif (rx_end_of_buffer = NOT_ACT and ama_set(4) = NOT_ACT and
                rd_state0 = ACT and rd_state1 = NOT_ACT and
                scan_vector(4) = ACT ) then
            ama_next  <= ACT ;
        elsif (rx_end_of_buffer = NOT_ACT and ama_set(5) = NOT_ACT and
                rd_state0 = ACT and rd_state1 = NOT_ACT and
                scan_vector(5) = ACT ) then
            ama_next  <= ACT ;
        elsif (rx_end_of_buffer = NOT_ACT and ama_set(6) = NOT_ACT and
                rd_state0 = ACT and rd_state1 = NOT_ACT and
                scan_vector(6) = ACT ) then
            ama_next  <= ACT ;
        elsif (rx_end_of_buffer = NOT_ACT and ama_set(7) = NOT_ACT and
```

Aug 17 11:19 1994 Who: johnf File: /c2/local_user/bma/bma_rbsm/bma_rbsm_lib/rbsm_stat_control.vhd Page 24

```
                rd_state0 = ACT and rd_state1 = NOT_ACT and
                scan_vector(7) = ACT ) then
            ama_next  <= ACT ;
        elsif (rx_end_of_buffer = NOT_ACT and ama_set(8) = NOT_ACT and
                rd_state0 = ACT and rd_state1 = NOT_ACT and
                scan_vector(8) = ACT ) then
            ama_next  <= ACT ;
        elsif (rx_end_of_buffer = NOT_ACT and ama_set(9) = NOT_ACT and
                rd_state0 = ACT and rd_state1 = NOT_ACT and
                scan_vector(9) = ACT ) then
            ama_next  <= ACT ;
        elsif (rx_end_of_buffer = NOT_ACT and ama_set(10) = NOT_ACT and
                rd_state0 = ACT and rd_state1 = NOT_ACT and
                scan_vector(10) = ACT ) then
            ama_next  <= ACT ;
        elsif (rx_end_of_buffer = NOT_ACT and ama_set(11) = NOT_ACT and
                rd_state0 = ACT and rd_state1 = NOT_ACT and
                scan_vector(11) = ACT ) then
            ama_next  <= ACT ;
        elsif (rx_end_of_buffer = NOT_ACT and ama_set(12) = NOT_ACT and
                rd_state0 = ACT and rd_state1 = NOT_ACT and
                scan_vector(12) = ACT ) then
            ama_next  <= ACT ;
        elsif (rx_end_of_buffer = NOT_ACT and ama_set(13) = NOT_ACT and
                rd_state0 = ACT and rd_state1 = NOT_ACT and
                scan_vector(13) = ACT ) then
            ama_next  <= ACT ;
        elsif (rx_end_of_buffer = NOT_ACT and ama_set(14) = NOT_ACT and
                rd_state0 = ACT and rd_state1 = NOT_ACT and
                scan_vector(14) = ACT ) then
            ama_next  <= ACT ;
        elsif (rx_end_of_buffer = NOT_ACT and ama_set(15) = NOT_ACT and
                rd_state0 = ACT and rd_state1 = NOT_ACT and
                scan_vector(15) = ACT ) then
            ama_next  <= ACT ;
        elsif (rx_end_of_buffer = NOT_ACT and ama_set(16) = NOT_ACT and
                rd_state0 = ACT and rd_state1 = NOT_ACT and
                scan_vector(16) = ACT ) then
            ama_next  <= ACT ;
        elsif (rx_end_of_buffer = NOT_ACT and ama_set(16) = NOT_ACT and
                rd_state0 = ACT and rd_state1 = NOT_ACT and
                scan_vector(17) = ACT ) then
            ama_next  <= ACT ;
        elsif (rx_end_of_buffer = NOT_ACT and ama_set(17) = NOT_ACT and
                rd_state0 = ACT and rd_state1 = NOT_ACT and
                scan_vector(18) = ACT ) then
            ama_next  <= ACT ;
        elsif (rx_end_of_buffer = NOT_ACT and ama_set(17) = NOT_ACT and
                rd_state0 = ACT and rd_state1 = NOT_ACT and
                scan_vector(19) = ACT ) then
            ama_next  <= ACT ;
        else
            ama_next <= NOT_ACT ;
        end if;


-- ============================================================
-- Generate rx_next : rx_status_next
```

```
Aug 17 11:19 1994  Who: johnf  File  /c2/local_user/bma/bma_rbsm/bma_rbsm_lib/rbsm_stat_control.vhd Page 25

-- ==========================================================

        if (reset = ACT) then
            rx_next  <= NOT_ACT ;
        elsif ( ama_set(0) = NOT_ACT and
                rd_state0 = ACT and rd_state1 = NOT_ACT and
                scan_vector(0) = ACT ) then
            rx_next  <= ACT ;
        elsif (ama_set(1) = NOT_ACT and
                rd_state0 = ACT and rd_state1 = NOT_ACT and
                scan_vector(1) = ACT ) then
            rx_next  <= ACT ;
        elsif (ama_set(2) = NOT_ACT and
                rd_state0 = ACT and rd_state1 = NOT_ACT and
                scan_vector(2) = ACT ) then
            rx_next  <= ACT ;
        elsif (ama_set(3) = NOT_ACT and
                rd_state0 = ACT and rd_state1 = NOT_ACT and
                scan_vector(3) = ACT ) then
            rx_next  <= ACT ;
        elsif (ama_set(4) = NOT_ACT and
                rd_state0 = ACT and rd_state1 = NOT_ACT and
                scan_vector(4) = ACT ) then
            rx_next  <= ACT ;
        elsif (ama_set(5) = NOT_ACT and
                rd_state0 = ACT and rd_state1 = NOT_ACT and
                scan_vector(5) = ACT ) then
            rx_next  <= ACT ;
        elsif (ama_set(6) = NOT_ACT and
                rd_state0 = ACT and rd_state1 = NOT_ACT and
                scan_vector(6) = ACT ) then
            rx_next  <= ACT ;
        elsif (ama_set(7) = NOT_ACT and
                rd_state0 = ACT and rd_state1 = NOT_ACT and
                scan_vector(7) = ACT ) then
            rx_next  <= ACT ;
        elsif (ama_set(8) = NOT_ACT and
                rd_state0 = ACT and rd_state1 = NOT_ACT and
                scan_vector(8) = ACT ) then
            rx_next  <= ACT ;
        elsif (ama_set(8) = NOT_ACT and
                rd_state0 = ACT and rd_state1 = NOT_ACT and
                scan_vector(9) = ACT ) then
            rx_next  <= ACT ;
        elsif (ama_set(10) = NOT_ACT and
                rd_state0 = ACT and rd_state1 = NOT_ACT and
                scan_vector(10) = ACT ) then
            rx_next  <= ACT ;
        elsif (ama_set(11) = NOT_ACT and
                rd_state0 = ACT and rd_state1 = NOT_ACT and
                scan_vector(11) = ACT ) then
            rx_next  <= ACT ;
        elsif (ama_set(12) = NOT_ACT and
                rd_state0 = ACT and rd_state1 = NOT_ACT and
                scan_vector(12) = ACT ) then
            rx_next  <= ACT ;
        elsif (ama_set(13) = NOT_ACT and
                rd_state0 = ACT and rd_state1 = NOT_ACT and
                scan_vector(13) = ACT ) then
            rx_next  <= ACT ;

Aug 17 11:19 1994  Who: johnf  File: /c2/local_user/bma/bma_rbsm/bma_rbsm_lib/rbsm_stat_control.vhd Page 26

        elsif (ama_set(14) = NOT_ACT and
                rd_state0 = ACT and rd_state1 = NOT_ACT and
                scan_vector(14) = ACT ) then
            rx_next  <= ACT ;
        elsif (ama_set(15) = NOT_ACT and
                rd_state0 = ACT and rd_state1 = NOT_ACT and
                scan_vector(15) = ACT ) then
            rx_next  <= ACT ;
        elsif (ama_set(16) = NOT_ACT and
                rd_state0 = ACT and rd_state1 = NOT_ACT and
                scan_vector(16) = ACT ) then
            rx_next  <= ACT ;
        elsif (ama_set(16) = NOT_ACT and
                rd_state0 = ACT and rd_state1 = NOT_ACT and
                scan_vector(17) = ACT ) then
            rx_next  <= ACT ;
        elsif (ama_set(17) = NOT_ACT and
                rd_state0 = ACT and rd_state1 = NOT_ACT and
                scan_vector(18) = ACT ) then
            rx_next  <= ACT ;
        elsif (ama_set(17) = NOT_ACT and
                rd_state0 = ACT and rd_state1 = NOT_ACT and
                scan_vector(19) = ACT ) then
            rx_next  <= ACT ;
        else
            rx_next <= NOT_ACT ;
        end if;

end process rbsm_stat_comb;


--
-- Monitor_process is only used as a file writer so as
-- to help facilitate debug of the RBSM in system test.
--

-- synopsys_translate_off

monitor_process:
process

   file outfile: text is out " /rbsm_empty_q.mon" ;

   variable outline          : line;

begin

    wait until clock25 = '1' and clock25'event;
    wait for 10 ns ;

        if (rx_status_next = ACT and ama_status_next = NOT_ACT) then
            wait for 40 ns ;

            write(outline,string'("Just Emptied the Receive Status Queue  : "));
            write(outline,NOW);
            writeline(outfile,outline) ;

            write(outline,string'("   "));
```

```
            writeline(outfile,outline) ;

        elsif (rx_status_next = NOT_ACT and ama_status_next = ACT ) then
            wait for 40 ns ;

            write(outline,string'("Just Emptied the AMA Status Queue         "));
            write(outline,NOW);
            writeline(outfile,outline) ;

            write(outline,string'("    "));
            writeline(outfile,outline) ;


        elsif (rx status_next = ACT and ama status_next = ACT ) then
            wait for 40 ns ;

            write(outline,string'("Just Emptied the Receive Status Queue  : "));
            write(outline,NOW);
            writeline(outfile,outline) ;

            write(outline,string'("Just Emptied the AMA Status Queue      : "));
            write(outline,NOW);
            writeline(outfile,outline) ;

            write(outline,string'("    "));
            writeline(outfile,outline) ;

        end if;

end process monitor_process ;

-- synopsys_translate_on

end synthesize;
```

```
Aug 17 11:20 1994  Who: johnf  File  /c2/local_user/bma/bma_rbsm/bma rbsm_lib/rbsm status_registers.vhd Page 1

-- $Id  rbsm_status_registers.vhd v 1 16 94/06/03 17 09 41 johnf Exp $
--
--  Author      John A. Flanders
--
--
--  Title       rbsm_status_registers   rbsm_status_registers is the component used to generate four
--                                      32 wide registers and one 11 bit register used to temporarily
--                                      store information read out of the AMA Status Queue and the
--                                      Receive Status Queue.
--
--
--
--
--  Revision History
--
--  7/20/93 :                    original version
--
--


Library std;
Library synopsys ;
Library ieee ;
Library bma_lib;
Library bma_rbsm_lib;


use synopsys.attributes.all;
use ieee std_logic_1164.all.
use ieee.std_logic_arith.all;
use ieee.std_logic_unsigned.all.
use ieee.std_logic_misc.all;
use bma lib.bma_types.all;
use bma rbsm_lib.bma_rbsm_types.all.

-- synopsys_translate_off
use std.textio.all;
use ieee.std_logic_textio.all;
-- synopsys_translate_on

entity rbsm_status_registers is
    port(
        clock25             : in std logic ,   -- system clock
        reset               : in std_logic .   -- system reset
        rx_stat_rd          . in std logic .   -- Receive Queue read strobe    (from rbsm_stat_control)
        ama_stat_rd1          in std logic .   -- AMA Queue first  read strobe (from rbsm_stat_control)
        ama_stat_rd2        . in std logic .   -- AMA Queue second read strobe (from rbsm_stat_control)
        ama_stat_rd3          in std_logic     -- AMA Queue third  read strobe (from rbsm_stat_control)
        ama_status          : in long_word :   -- AMA Queue read data bus (from AMA interface)
        rcv_status          : in rx_status .   -- Receive Status Queue read data bus (from Recevie Queue interface)

        ethernet_eof        . in std_logic .   -- from rbsm_unload
        fddi_eof            : in std_logic :   -- from rbsm_unload
        cut_thru_end          in std logic .   -- from rbsm_ct_active

        rx_disable_on              in std_logic :    -- from rbsm_port_registers
        rx_multicast_disable_on    in std_logic :    -- from rbsm_port_registers
        port_blocking_on           in std_logic ;    -- from rbsm_port_registers

        rx_monitor_on       : in std_logic ;   -- from rbsm_config

Aug 17 11:20 1994  Who: johnf  File: /c2/local_user/bma/bma rbsm/bma_rbsm_lib/rbsm_status_registers.vhd Page 2

        destination_monitor : in std_logic ;   -- from rbsm_code_vectors

        dest_port_type      : in PORT_TYPE : -- from rbsm_config
        src_port_type       : in PORT_TYPE ; -- from rbsm_config

        positive_forward_enable : in std_logic ; -- from microprocessor interface
        rxport_equals_bbone     : in std_logic ; -- from rbsm_config
        invalid_dest_port       : in std_logic ; -- from rbsm_config
        disable_enet_collide    : in std_logic ; -- from mpu              ADDED 5/2/94
        src ct_active           : in std_logic : -- from rbsm_ct_active    ADDED 5/2/94

        dest_group_address    buffer std_logic ; -- ama_stat_reg2(31)
        dest_address_match    buffer std logic : -- ama_stat_reg1(22) v
        dest_address_tag    : buffer AMA_TAG   . -- ama_stat_reg2(29 downto 16)
        dest_address_data   : buffer AMA_DATA  : -- ama_stat_reg2(15 downto 0)
        dest_port_equal     : buffer std_logic ; -- ama_stat_reg2(30)
        dest_port_num         buffer port_number     ; -- ama_stat_reg2(4 downto 0)
        da_port_num         . buffer FC_PORT_NUMBER ; -- ama_stat_reg2(5 downto 0)
        dest_broadcast      : buffer std_logic ; -- ama_stat_reg2(15)
        dest_internal         buffer std_logic ; -- ama_stat_reg2(13)
        dest_filter_flag    . buffer std_logic . -- ama_stat_reg2(12)

        src_group_address   : buffer std_logic ; -- ama_stat_reg3(31)
        src_address_match   : buffer std_logic : -- ama_stat_reg1(21)
        src_address_tag     : buffer AMA_TAG   . -- ama_stat_reg3(29 downto 16)
        src_address_data    : buffer AMA_DATA  : -- ama_stat_reg3(15 downto 0)
        src_port_equal        buffer std_logic : -- ama_stat_reg3(30)
        src_internal          buffer std_logic ; -- ama_stat_reg3(13)
        src_filter_flag     . buffer std_logic ; -- ama_stat_reg3(12)

        sa_port_num         : buffer FC_PORT NUMBER ; -- ama_stat_reg1(29 downto 24)

        frame_byte_count    : buffer BYTE_CNT  ; -- rx_stat_reg(12 downto 0)
        rx_end_of_buffer    : buffer std_logic ; -- rx_stat_reg(16)
        fddi_abort          . buffer std_logic ; --

        rx_stat_reg         : buffer long_word      ; -- extra outputs
        rx_buff_reg         : buffer buffer_number ;

        rx_buffer_number    : buffer buffer_number ;
        ama_buffer_number     buffer buffer_number ;

        filler_frame        . buffer std_logic ;
        discard_frame       . buffer std_logic ;

        ethernet_rx_error   . buffer std_logic ;
        fddi_rx_error       : buffer std_logic :

        llc_frame_type        buffer std_logic ;
        enet_abort          : buffer std_logic . -- ADDED 5/2/94

        ama_stat_reg1       . buffer long_word     :
        ama_stat_reg2       : buffer long_word     :
        ama_stat_reg3         buffer long_word   ) ;

end rbsm_status_registers ;
```

Aug 17 11:20 1994 Who: johnf File /c2/local_user/bma/bma_rbsm/bma_rbsm_lib/rbsm status_registers.vhd Page 3

```
-----------------------------------------------------------
-----------------------------------------------------------

architecture synthesize of rbsm status registers is

signal runt_frame                : std_logic ;
signal frame_to_long             : std_logic ;
signal mace_overflow             : std_logic ;
signal frame collision           : std_logic ;
signal late_collision            : std_logic ; -- ADDED 5/2/94
signal framing error             : std_logic ;
signal ethernet_fcs_error        : std_logic ;

signal rx fifo full error        : std_logic ;
signal fddi_fcs_error            : std_logic ;
signal data_length_error         : std_logic ;
signal big_frame                 : std_logic ;
signal mac_reset                 : std_logic ;
signal frame_format_error        : std_logic ;
signal frame strip error         : std_logic ;
signal e_indication              : std_logic ;
signal token_receive_error       : std_logic ;
signal really_big frame          : std_logic ;
signal reserved frame_type       : std_logic ;
signal rcv_abort                 : std_logic ; -- ADDED 5/1/94

begin

dest_group_address <= ama_stat_reg2(31) ;
dest_address_match <= ama_stat_reg1(22) ;
dest_port_num      <= ama_stat_reg2(4 downto 0) ;
da port_num        <= ama_stat reg2(5 downto 0) ;

--
-- Process used to generate various muxes used to
-- select information provided by the AMA or zero
-- information if the DA is unknown.
--

process(dest address_match,ama stat_reg2)
begin

    if (dest_address_match = ACT) then

        dest address_tag     <= ama_stat_reg2(29 downto 16) ;
        dest_address_data    <= ama_stat_reg2(15 downto 0)
        dest_port_equal      <= ama_stat_reg2(30) ;
        dest broadcast       <= ama_stat_reg2(15) ;
        dest internal        <= ama_stat_reg2(13)
        dest_filter_flag     <= ama_stat_reg2(12) ;

    else

        dest_address_tag     <= (others => '0') ;
        dest_address_data    <= (others => '0') ;
        dest_port_equal      <= NOT_ACT ;
        dest broadcast       <= NOT_ACT ;
```

Aug 17 11:20 1994 Who: johnf File: /c2/local_user/bma/bma_rbsm/bma_rbsm_lib/rbsm_status_registers.vhd Page 4

```
        dest_internal        <= NOT_ACT ;
        dest_filter_flag     <= NOT_ACT ;

    end if;

end process;

src_group_address   <= ama_stat_reg3(31) ;
src_address_match   <= ama_stat_reg1(21) ;
src_address_tag     <= ama_stat_reg3(29 downto 16) ;
sa port_num         <= ama_stat_reg1(29 downto 24) ;

--
-- Process used to generate various muxes used to
-- select information provided by the AMA or zero
-- information if the SA is unknown.
--

process(src_address_match,ama_stat_reg3)
begin

    if (src_address_match = ACT) then

        src_address_data    <= ama_stat_reg3(15 downto 0) ;
        src_port_equal      <= ama_stat_reg3(30) ;
        src_internal        <= ama_stat_reg3(13) ;
        src_filter_flag     <= ama_stat_reg3(12) ;

    else

        src_address_data    <= (others => '0') ;
        src_port_equal      <= NOT_ACT ;
        src_internal        <= NOT_ACT ;
        src_filter_flag     <= NOT_ACT ;

    end if;

end process;


-- Ethernet receive error conditions

runt_frame          <= rx_stat_reg(23)   ;
frame_to_long       <= rx_stat_reg(22)   ;
mace_overflow       <= rx_stat_reg(15)   ;
frame_collision     <= rx_stat_reg(14)   ;
framing_error       <= rx_stat_reg(13)   ;
ethernet_fcs_error  <= rx_stat_reg(12)   ;

-- FDDI receive error conditions

rx_fifo_full error  <= rx_stat_reg(30)   ;
fddi_fcs_error      <= rx_stat_reg(25)   ;
data_length_error   <= rx_stat_reg(24)   ;
```

```
Aug 17 11 20 1994  Who: johnf  File: /c2/local_user/bma/bma_rbsm/bma_rbsm_lib/rbsm_status_registers.vhd Page 5

big_frame            <= rx_stat_reg(23)
mac_reset            <= rx_stat_reg(22)
e_indication         <= rx_stat_reg(17)   ;
really_big_frame     <= rx_stat_reg(14)
reserved_frame_type  <= rx_stat_reg(28)   ;  -- ADDED 4/27/94
rcv_abort            <= rx_stat_reg(15)   ;  -- ADDED 5/1/94

-- FDDI receive frame punt conditions

frame_format_error   <= rx_stat_reg(21)   ;
frame_strip_error    <= rx_stat_reg(20)   ;
token_receive_error  <= rx_stat_reg(13)   ;


-- Receive Status end of buffer indicator

rx_end_of_buffer    <= rx_stat_reg(16)

-- Receive Status buffer number

rx_buffer_number    <= rx_buff_reg

-- AMA Status buffer number

ama_buffer_number  <= ama_stat_reg1(18 downto 8)


-- FDDI  indicators

llc_frame_type      <= rx_stat_reg(27)


-- FDDI frame byte count

frame_byte_count    <= rx_stat_reg(12 downto 0)


--
-- Process used to determine if the receive frame should
-- be filtered
--

rbsm_filter_frame:
process(dest_group_address,dest_address_match,dest_port_equal,dest_internal,
        src_port_equal,src_address_match,src_internal,dest_port_type,src_port_type,
        positive_forward_enable,rxport_equals_bbone,src_group_address)
begin

    if (positive_forward_enable = NOT_ACT or rxport_equals_bbone = NOT_ACT) then

        if (dest_group_address = NOT_ACT                   and
             dest_address_match = ACT                      and
              dest_internal = NOT_ACT                      and
               dest_port_equal = ACT                       and
                src_address_match = ACT                    and
                 src_internal = NOT_ACT                    and
                  src_port_equal = ACT                     and
                   dest_port_type = src_port_type) then

Aug 17 11:20 1994  Who: johnf  File: /c2/local_user/bma/bma_rbsm/bma_rbsm_lib/rbsm_status_registers.vhd Page 6

            filter_frame <= ACT ;
        else
            filter_frame <= NOT_ACT ;
        end if;

    elsif (positive_forward_enable = ACT                   and
            rxport_equals_bbone = ACT                      and
          ((dest_group_address = NOT_ACT                   and
           dest_address_match = NOT_ACT                    and
           src_address_match = NOT_ACT)                    or
           src_group_address = ACT)) then
        filter_frame <= ACT ;

    elsif (positive_forward_enable = ACT                   and
            rxport_equals_bbone = ACT                      and
             dest_group_address = NOT_ACT                  and
              dest_address_match = ACT                     and
               dest_port_equal = ACT                       and
                dest_internal = NOT_ACT                    and
                 src_address_match = NOT_ACT) then
        filter_frame <= ACT ;

    else
        filter_frame <= NOT_ACT ;
    end if ;

end process rbsm_filter_frame;


--
-- Process used to determine if the receive frame should
-- be discarded. If yes, then update filtered frame count
-- along with the byte count.
--

rbsm_discard_frame:
process(dest_group_address,dest_address_match,dest_port_type,cut_thru_end,
        ethernet_eof,fddi_eof,llc_frame_type,rx_disable_on,rx_multicast_disable_on,
        port_blocking_on,filter_frame,rx_monitor_on,destination_monitor,ethernet_rx_error,
        fddi_abort,fddi_rx_error,dest_internal,enet_abort)
begin

    if (filter_frame = ACT                          and
        rx_monitor_on = NOT_ACT) then
        discard_frame <= ACT ;

    elsif (ethernet_eof = ACT                       and
           enet_abort = NOT_ACT                     and
           ethernet_rx_error = NOT_ACT              and
           rx_monitor_on = NOT_ACT                  and
           destination_monitor = NOT_ACT            and
           cut_thru_end = NOT_ACT                   and
          (rx_disable_on = ACT                      or

          (dest_group_address = NOT_ACT             and
           dest_address_match = NOT_ACT             and
           port_blocking_on   = ACT)                or
```

Aug 17 11:20 1994 Who: johnf File: /c2/local_user/bma/bma_rbsm/bma_rbsm_lib/rbsm_status_registers.vhd Page 7

```
          (dest_group_address = NOT_ACT           and
           dest_address_match = ACT               and
           dest_internal = NOT_ACT                and
           port_blocking_on   = ACT)              or

          (dest_group_address = ACT               and
           rx_multicast_disable_on = ACT)         or

          (dest_group_address = ACT               and
          (dest_address_match = NOT_ACT           or
           dest_internal = NOT_ACT)               and
           port_blocking_on   = ACT))) then
        discard_frame <= ACT ;

    elsif ((fddi_eof = ACT                        and
           fddi_abort = NOT_ACT                   and
           fddi_rx_error = NOT_ACT                and
           rx_monitor_on = NOT_ACT                and
           destination_monitor = NOT_ACT          and
           llc_frame_type = ACT                   and
          (rx_disable_on = ACT                    or

          (dest_group_address = NOT_ACT           and
           dest_address_match = NOT_ACT           and
           port_blocking_on   = ACT)              or

          (dest_group_address = NOT_ACT           and
           dest_address_match = ACT               and
           dest_internal = NOT_ACT                and
           port_blocking_on   = ACT)              or

          (dest_group_address = ACT               and
           rx_multicast_disable_on = ACT)         or

          (dest_group_address = ACT               and
          (dest_address_match = NOT_ACT           or
           dest_internal = NOT_ACT)               and
           port_blocking_on   = ACT))) then
        discard_frame <= ACT ;

    else
        discard_frame <= NOT_ACT ;
    end if;

end process rbsm_discard_frame;

--
-- Process used to determine if there was a late collision detected
-- on the Receive Ethernet Port. Late collision is a collision
-- detected when the byte count is greater than 68.
--

rbsm_late_error:
process(disable_enet_collide,frame_collision,frame_byte_count,src_ct_active)

begin

    if ((disable_enet_collide = NOT_ACT           and
```

Aug 17 11:20 1994 Who: johnf File: /c2/local_user/bma/bma_rbsm/bma_rbsm_lib/rbsm_status_registers.vhd Page 8

```
        frame_collision = ACT)                    and
       (frame_byte_count(7) = ACT                 or      -- Determine if receive byte count is greater
        frame_byte_count(8) = ACT                 or      -- than or equal to 128.
        frame_byte_count(9) = ACT                 or
        frame_byte_count(10) = ACT                or
        frame_byte_count(11) = ACT)) then

        late_collision <= ACT ;

    elsif ((disable_enet_collide = NOT_ACT                 and
            frame_collision = ACT                          and
            frame_byte_count(6) = ACT)                     and
           (frame_byte_count(3) = ACT                      or      -- Determine if receive byte count is greater
            frame_byte_count(4) = ACT                      or      -- than or equal to 72.
            frame_byte_count(5) = ACT)) then

        late_collision <= ACT ;

    elsif  (disable_enet_collide = NOT_ACT                 and
            frame_collision = ACT                          and     -- Determine if receive byte count is at least
            frame_byte_count(6) = ACT                      and     -- 69
            frame_byte_count(2) = ACT                      and
            frame_byte_count(0) = ACT) then

        late_collision <= ACT ;

    elsif  (disable_enet_collide = NOT_ACT                 and
            frame_collision = ACT                          and     -- Determine if receive byte count is at least
            frame_byte_count(6) = ACT                      and     -- 70
            frame_byte_count(2) = ACT                      and
            frame_byte_count(1) = ACT) then

        late_collision <= ACT ;

    elsif (frame_collision = ACT                           and
           src_ct_active = ACT) then

        late_collision <= ACT ;

    else

        late_collision <= NOT_ACT ;

    end if;

end process rbsm_late_error;

--
-- Process used to determine if the receive Ethernet packet should
-- be punted. The frame will be punted whenever the disable_enet_collide
-- bit is set and a collision is detected, or when the disable_enet_collide
-- bit is not set and a collsion is detected and the byte count is under
```

```
Aug 17 11:20 1994  Who: johnf  File  /c2/local_user/bma/bma_rbsm/bma_rbsm_lib/rbsm_status_registers.vhd Page 9

-- 67 bytes
--

rbsm_enet_punt:
process(disable_enet_collide,frame_collision,late_collision,src_ct_active)

begin

    if (disable_enet_collide = ACT               and
        src_ct_active = NOT_ACT                  and
        frame_collision = ACT) then

        enet_abort <= ACT ;

    elsif (disable_enet_collide = NOT_ACT        and
           src_ct_active = NOT_ACT               and
           frame_collision = ACT                 and
           late_collision = NOT_ACT) then

        enet_abort <= ACT ;

    else

        enet_abort <= NOT_ACT ;

    end if;

end process rbsm_enet_punt;


--
-- Process used to determine if the received Ethernet frame is
-- in error.
--

rbsm_enet_error:
process(runt_frame,frame_to_long,mace_overflow,late_collision,framing_error,
        ethernet_fcs_error,invalid_dest_port)
begin

    if (runt_frame = ACT or frame_to_long = ACT or mace_overflow = ACT or
        late_collision = ACT or framing_error = ACT or ethernet_fcs_error = ACT or
        invalid_dest_port = ACT) then
        ethernet_rx_error <= ACT ;
    else
        ethernet_rx_error <= NOT_ACT ;
    end if;

end process rbsm_enet_error;


--
-- Process used to determine if the received FDDI frame is
-- in error.
--

rbsm_fddi_error:

Aug 17 11:20 1994  Who: johnf  File: /c2/local_user/bma/bma_rbsm/bma_rbsm_lib/rbsm_status_registers.vhd Page 10

process(rx_fifo_full_error,fddi_fcs_error,data_length_error,big_frame,rcv_abort,
        mac_reset,really_big_frame,e_indication,invalid_dest_port,reserved_frame_type,
        frame_format_error,frame_strip_error,token_receive_error,rx_end_of_buffer)

begin

    if (frame_format_error = NOT_ACT                 and   -- ADDED 5/1/94
        frame_strip_error = NOT_ACT                  and   -- ADDED 5/1/94
        token_receive_error = NOT_ACT                and   -- ADDED 5/1/94
        rx_end_of_buffer = NOT_ACT                   and   -- ADDED 5/1/94
       (rx_fifo_full_error = ACT                     or
        fddi_fcs_error = ACT                         or
        data_length_error = ACT                      or
        big_frame = ACT                              or
        mac_reset = ACT                              or
        really_big_frame = ACT                       or
        e_indication = ACT                           or
        invalid_dest_port = ACT                      or
        reserved_frame_type = ACT)) then

            fddi_rx_error <= ACT ;

    elsif (frame_format_error = NOT_ACT              and   -- ADDED 5/1/94
        frame_strip_error = NOT_ACT                  and   -- ADDED 5/1/94
        token_receive_error = NOT_ACT                and   -- ADDED 5/1/94
        rx_end_of_buffer = NOT_ACT                   and   -- ADDED 5/1/94
        rcv_abort = ACT) then

            fddi_rx_error <= ACT ;

    else

            fddi_rx_error <= NOT_ACT ;

    end if;

end process rbsm_fddi_error;


--
-- Process used to determine if the received FDDI frame is
-- in error.
--

rbsm_fddi_punt:
process(frame_format_error,frame_strip_error,token_receive_error,rx_end_of_buffer)
begin

    if ((frame_format_error = ACT or frame_strip_error = ACT or
        token_receive_error = ACT) and rx_end_of_buffer = NOT_ACT) then
        fddi_abort <= ACT ;
    else
        fddi_abort <= NOT_ACT ;
    end if;

end process rbsm_fddi_punt;


rbsm_status_reg:
```

```
process
begin
    wait until clock25 = '1'

--
-- Generate 11 bit Receive Status Buffer Number Register
-- Generate 32 bit Receive Status Register
--

    if (reset = ACT) then
            rx_buff_reg <= (others => '0') ;
            rx_stat_reg <= (others => '0') ;

    elsif (rx_stat_rd = ACT) then
            rx_buff_reg <= rcv_status(42 downto 32) ;
            rx_stat_reg <= rcv_status(31 downto 0) ;
    else
            rx_buff_reg <= rx_buff_reg ;
            rx_stat_reg <= rx_stat_reg ;
    end if;


--
-- Generate 32 bit AMA Status Register used to store the
-- first AMA Status word.
--

    if (reset = ACT) then
        ama_stat_reg1 <= (others => '0') ;
    elsif (ama_stat_rd1 = ACT) then
        ama_stat_reg1 <= ama_status ;
    else
        ama_stat_reg1 <= ama_stat_reg1 ;
    end if;


--
-- Generate 32 bit AMA Status Register used to store the
-- second AMA Status word.
--

    if (reset = ACT) then
        ama_stat_reg2 <= (others => '0') ;
    elsif (ama_stat_rd2 = ACT) then
        ama_stat_reg2 <= ama_status ;
    else
        ama_stat_reg2 <= ama_stat_reg2 ;
    end if;


--
-- Generate 32 bit AMA Status Register used to store the
-- third AMA Status word.
--

    if (reset = ACT) then
        ama_stat_reg3 <= (others => '0') ;
    elsif (ama_stat_rd3 = ACT) then
```

```
        ama_stat_reg3 <= ama_status ;
    else
        ama_stat_reg3 <= ama_stat_reg3 ;
    end if;


end process rbsm_status_reg ;


--
-- Monitor_process is only used as a file writer so as
-- to help facilitate debug of the RBSM in system test.
--

-- synopsys translate_off

monitor_process:
process

   file outfile: text is out "./rbsm_status_register.mon" ;

   variable outline            line;
   variable rx_buffer_num  : std_logic_vector(11 downto 0) ;
   variable ama_buffer_num : std_logic_vector(11 downto 0) ;
   variable rcv_port_num   : std_logic_vector(7 downto 0) ;

begin

     wait until clock25 = '1' and clock25'event;
     wait for 10 ns ;

          if (ama_stat_rd1 = ACT) then
              wait for 40 ns ;

              ama_buffer_num(11) := '0' ;
              ama_buffer_num(10 downto 0) := ama_stat_reg1(18 downto 8);
              rcv_port_num(7) := '0' ;
              rcv_port_num(6 downto 0) := ama_stat_reg1(30 downto 24) ;


              write(outline,string'("AMA STATUS WORD 1                          : "));
              hwrite(outline,ama_stat_reg1) ;
              write(outline,string'(" : "));
              write(outline,NOW);
              writeline(outfile,outline) ;

              write(outline,string'("The AMA buffer number is                   : "));
              hwrite(outline,ama_buffer_num) ;
              write(outline,string'("        : "));
              write(outline,NOW);
              writeline(outfile,outline) ;

              write(outline,string'("The receive port number is                 : "));
              hwrite(outline,rcv_port_num) ;
              write(outline,string'("        : "));
              write(outline,NOW);
              writeline(outfile,outline) ;
```

Aug 17 11:20 1994 Who: johnf File: /c2/local_user/bma/bma_rbsm/bma_rbsm_lib/rbsm_status_registers.vhd Page 13

```
            wait for 40 ns ;

            write(outline,string'("AMA STATUS WORD 2                              "));
            hwrite(outline,ama_stat_reg2) ;
            write(outline,string'("  "));
            write(outline,NOW);
            writeline(outfile,outline) ;

        if (ama_stat_rd3 = ACT and rx_stat_rd = NOT_ACT ) then
            wait for 40 ns ;

            write(outline,string'("AMA STATUS WORD 3                              "));
            hwrite(outline,ama_stat_reg3) ;
            write(outline,string'(" : "));
            write(outline,NOW);
            writeline(outfile,outline) ;

            write(outline,string'("    "));
            writeline(outfile,outline) ;

        elsif (ama_stat_rd3 = ACT and rx_stat_rd = ACT ) then
            wait for 40 ns ;

            write(outline,string'("AMA STATUS WORD 3                            : "));
            hwrite(outline,ama_stat_reg3) ;
            write(outline,string'(" : "));
            write(outline,NOW);
            writeline(outfile,outline) ;

            rx_buffer_num(11) := '0' ;
            rx_buffer_num(10 downto 0) := rx_buff_reg ;

            write(outline,string'("The RX buffer number is                      : "));
            hwrite(outline,rx_buffer_num) ;
            write(outline,string'("        : "));
            write(outline,NOW);
            writeline(outfile,outline) ;


            write(outline,string'("The RX status is                             : "));
            hwrite(outline,rx_stat_reg) ;
            write(outline,string'(" : "));
            write(outline,NOW);
            writeline(outfile,outline) ;

            write(outline,string'("    "));
            writeline(outfile,outline) ;

        end if;

    end if;

end process monitor_process ;
```

Aug 17 11:20 1994 Who: johnf File: /c2/local_user/bma/bma_rbsm/bma_rbsm_lib/rbsm_status_registers.vhd Page 14

```
-- synopsys_translate_on

end synthesize;
```

What is claimed is:

1. An internetworking device comprising:

a first MAC port operative in accordance with a first network protocol;

a second MAC port comprising one of a plurality of MAC ports within said internetworking device, said second MAC port being operative in accordance with a second network protocol;

a memory, in electrical communication with said first MAC port and said second MAC port; and a frame processor, in electrical communication with said memory, said first MAC port, and said second MAC port, said first MAC port being operative to receive a packet including a header and data in said first protocol and to store said packet in said memory, said frame processor being operative to select said second MAC port from said plurality of MAC ports and to commence transmission of said packet from said memory to said second MAC port after reception of a predetermined portion of said packet in said memory and prior to the completion of reception of said packet in said memory if said first and second network protocols are the same; and said frame processor being operative to commence transmission of a representation of said packet from said memory to said second MAC port after the completion of reception of said packet in said memory if said second network protocol differs from said first network protocol.

2. The internetworking device of claim 1 wherein said first MAC port and said second MAC port each has a plurality of setable parameters and a state of said internetworking device is determined in part by said plurality of said parameters of said first MAC port and said second MAC port.

3. The internetworking device of claim 1 wherein said first MAC port and said second MAC port are Ethernet ports.

4. The internetworking device of claim 1 wherein said first MAC port, said second MAC port, said frame processor, and said memory are connected by a bus.

5. The internetworking device recited in claim 1 further comprising a code vector generator, in electrical communication with said memory, said first MAC port and said second MAC port, wherein said frame processor begins to retransmit said data packet in response to a cut-through code vector generated by said code vector generator.

6. A method of transmitting a packet from a first MAC port to a second MAC port comprising one of a plurality of MAC ports in an internetworking device wherein said first MAC port is operative in accordance with a first network protocol and said second MAC port is operative in accordance with a second network protocol, said method comprising the steps of:

receiving and storing at least a portion of said packet in a memory within said internetworking device;

analyzing said at least a portion of said packet to select said second MAC port from said plurality of MAC ports as a destination port for said packet and determining whether said second protocol is the same as said first protocol;

beginning to retransmit said packet from said memory to said second MAC port after reception of a predetermined portion of said packet in said memory and prior to the completion of reception of said packet in said memory if said first and second protocols are the same; and beginning to retransmit a representation of said packet to said second MAC port after reception of said packet in said memory if said second network protocol differs from said first network protocol.

7. The method of claim 6 wherein said first MAC port and said second MAC port each has a plurality of setable parameters and a state of said internetworking device is determined in part by said plurality of said parameters of said first MAC port and said second MAC port.

8. An internetworking device comprising:

a first MAC port having a plurality of setable parameters;

a second MAC port having a plurality of setable parameters;

a data memory, having an SRAM portion and a DRAM portion, said data memory in electrical communication with said first MAC port and said second MAC port;

an address memory unit having an address memory, said address unit in electrical communication with said first MAC port, said second MAC port and said data memory;

a code vector generator, in electrical communication with said data memory, said first MAC port, said second MAC port and said address memory unit; and a frame processor, in electrical communication with said data memory, said first MAC port, said second MAC port and said code vector generator, said first MAC port receiving a packet including a header having a source address and a destination address and data, said first MAC port storing said packet in said SRAM portion of said data memory, said first MAC port storing said packet in said DRAM portion of said data memory once said SRAM portion of said data memory has been filled with said packet, said frame processor beginning to retransmit said packet from said memory to said second MAC port after reception of a predetermined portion of said data of said packet and prior to the completed reception of said packet by said first MAC port in response to a cut-through code vector generated by said code vector generator, said code vector generator generating said cut-through code vector in response to said data being stored in said DRAM, in response to the result of said address memory unit searching said address memory for said source and destination address of said packet and in response to said plurality of parameters of said first MAC port and said second MAC port.

9. The internetworking device recited in claim 8 wherein said predetermined portion of said data of said packet fills said SRAM portion of said data memory.

10. A method for transmitting a packet received at a first MAC port of a network device in which said first MAC port is operative in accordance with a first network protocol, to a selected one of a plurality of MAC ports of said network device, wherein said selected one of said plurality of MAC ports is operative in accordance with a second network protocol, said method comprising the steps of:

commencing reception of said packet in a memory within said network device;

selecting one of said plurality of MAC ports as a destination port for said packet;

determining whether said selected one of said plurality of MAC ports is operative in accordance with said first network protocol;

initiating transmission of said packet from said memory to said selected one of said plurality of MAC ports prior to the completion of reception of said packet in said memory if said selected one of said plurality of MAC ports is operative in accordance with said first network protocol; and initiating transmission of a representation of said packet from said memory to said selected one of said plurality of MAC ports following the completion of reception of said packet in said memory if said selected one of said plurality of MAC ports is not operative in accordance with said first network protocol.

* * * * *

UNITED STATES PATENT AND TRADEMARK OFFICE
CERTIFICATE OF CORRECTION

PATENT NO : 5,748,633
DATED : May 5, 1998
INVENTOR(S) : Christopher P. Lawler, David C. Ready It is certified that error appears in the above-identified patent and that said Letters Patent are hereby corrected as shown below:

Column 5, line 43, "SPAM" should read --SRAM--.

Column 14, line 21, "(Me)" should read --($M_e$)--.

Signed and Sealed this

Fifteenth Day of May, 2001

Attest:

Nicholas P. Godici

NICHOLAS P. GODICI

*Attesting Officer* — *Acting Director of the United States Patent and Trademark Office*